US012098673B2

(12) United States Patent
Moffat

(10) Patent No.: US 12,098,673 B2
(45) Date of Patent: Sep. 24, 2024

(54) ROTARY CLOSED-CYCLE EXTERNALLY-HEATED ENGINE

(71) Applicant: Brian Lee Moffat, Sherwood, OR (US)

(72) Inventor: Brian Lee Moffat, Sherwood, OR (US)

( * ) Notice: Subject to any disclaimer, the term of this patent is extended or adjusted under 35 U.S.C. 154(b) by 0 days.

(21) Appl. No.: 18/220,792

(22) Filed: Jul. 11, 2023

(65) Prior Publication Data

US 2024/0018899 A1 Jan. 18, 2024

Related U.S. Application Data

(60) Provisional application No. 63/522,109, filed on Jun. 20, 2023, provisional application No. 63/368,356, filed on Jul. 13, 2022.

(51) Int. Cl.
*F02C 7/28* (2006.01)
*F02C 1/10* (2006.01)

(52) U.S. Cl.
CPC ................ *F02C 1/105* (2013.01); *F02C 7/28* (2013.01)

(58) Field of Classification Search
CPC .... F02C 1/105; F02C 7/28; F02C 1/10; F03G 6/004; F03G 6/02; F03G 6/04; F03G 6/092; F03G 6/108; F03G 6/111; F03G 6/117; F03G 7/045; F03G 7/06112; F03G 7/06113; F03G 7/129
See application file for complete search history.

(56) References Cited

U.S. PATENT DOCUMENTS

| | | | | |
|---|---|---|---|---|
| 3,375,664 | A * | 4/1968 | Wells, Jr. | F02C 1/10 60/326 |
| 6,032,464 | A * | 3/2000 | Swift | F02G 1/02 60/520 |
| 2013/0133325 | A1* | 5/2013 | McCall | F03D 9/25 60/645 |
| 2015/0337676 | A1* | 11/2015 | Feng | F01D 15/10 290/52 |
| 2022/0065548 | A1* | 3/2022 | Haruki | B64D 13/08 |

* cited by examiner

*Primary Examiner* — Steven M Sutherland
(74) *Attorney, Agent, or Firm* — Fulwider Patton LLP

(57) ABSTRACT

Disclosed is an apparatus, system, and method, by which a difference in the thermal energies, and/or temperatures, of two bodies, materials, gases, liquids, solids, objects, and/or other groups or collections of matter, may be harnessed to provide mechanical energy to a rotary engine and/or shaft. Also disclosed is an apparatus, system, and method, by which mechanical energy (e.g., the rotation of a shaft) may be used to produce and/or amplify a difference in the thermal energies, and/or temperatures of, and/or between, two bodies, materials, gases, liquids, solids, objects, and/or other groups or collections of matter. The disclosed thermal-to-mechanical energy conversion apparatus, as well as the complementary mechanical-to-thermal energy conversion apparatus, lacks moving parts and therefore satisfies a previously unmet need for a simple, robust, and efficient heat engine.

9 Claims, 190 Drawing Sheets

ROTARY CLOSED-CYCLE EXTERNALLY-HEATED ENGINE

CROSS-REFERENCES TO RELATED APPLICATIONS

This application claims priority to U.S. Ser. No. 63/522,109, filed Jun. 20, 2023; and U.S. Ser. No. 63/368,356, filed Jul. 13, 2022, the content of which are incorporated by reference herein in their entirety.

BACKGROUND

Thermal energy powers much of the world's mechanical work. Thermal energy is obtained from sources including, but not limited to: the burning of fossil fuels, the concentration of solar energy, geothermal energy, and the decay of radioactive materials.

The conversion of thermal energy into useful mechanical work is today accomplished through the use of heat engines. Heat engines convert thermal energy into mechanical energy. Heat engines of the prior art include technologies of two main types: internal combustion heat engines and external combustion heat engines.

Internal combustion heat (ICH) engines burn a chemical fuel inside the engine, using the heated gases produced by the combustion as a working fluid to produce a mechanical movement or force (typically in a piston). ICH engines discard, vent, and/or eject, their exhausted working fluid shortly after the completion of each combustion cycle during which it is created.

External combustion heat (ECH) engines use heat produced by the burning of fuel outside the engine to warm a working fluid typically, though not always, trapped within, and therefore integral to the ECH engine. The warmed working fluid then produces a mechanical movement or force, after which most, if not all, of that working fluid is typically cooled and recirculated and/or reused within the same ECH engine.

Externally-heated closed-cycle (EHCC) engines belong to a category of heat engines similar to ECH engines. "Closed-cycle," in this context, denotes a thermodynamic system in which a respective working fluid is permanently contained within the system. Similar to ECH engines, EHCC engines use heat from an external source to warm a working fluid. However, the source of external heat used by an EHCC engine might not be the product of combustion, e.g., as of a chemical fuel. And, unlike the category of ECH engines, all closed-cycle heat engines use a working fluid which, aside from leaks of that fluid to the outside environment, is trapped within, and integral to the EHCC engine. After its heating within an EHCC engine, and its use producing mechanical work, the working fluid of such a heat engine is cooled and recirculated.

ICH engines are a type of heat engine favored for use in automobiles because of their relatively compact sizes and high power-to-weight ratios. Externally heated (EH) engines are a type of heat engine favored for use in power plants because of their abilities to utilize heat produced through the combustion of a wide variety of relatively low-grade chemical fuels including, but not limited to: solid fuels like coal and wood, and liquid fuels like oil. EH engines are also favored for use in power plants energized by concentrated solar and nuclear decay.

Even though EH engines tend to operate more quietly, and produce relatively less exhaust pollution, their relatively high capital costs, their relatively low thermal efficiencies (the ratio of incident heat converted to mechanical work), and their relatively low power-to-weight ratios, prevent their broader use.

Most importantly, in addition to their other respective limitations, ICH and EH engines of the prior art have moving parts. Their need for, and incorporation of, moving parts tends to increase their respective costs of fabrication and maintenance, reduce their respective thermal and operational efficiencies, and reduce their respective reliabilities.

Moving parts within ICH, EH, and EHCC, engines of the prior art can reduce the efficiency of those heat engines in many ways, including, but not limited to: the tendency of moving parts to create friction, where the resulting frictional losses tend to consume mechanical energy that might have otherwise increased the useful mechanical power of which the heat engine might have otherwise been capable of providing; and, the tendency of moving parts to create paths and/or leaks, e.g., between adjacent surfaces of moving parts, through and/or between which working fluids, after absorbing thermal energy and heating, can escape the heat engine thereby wasting thermal energy that might have otherwise been available to the heat engine for mechanical work.

There is presently an unmet need for a heat engine that operates without moving parts and therefore enjoys increased and/or improved thermal and cost efficiencies, as well as increased and/or improved reliability.

SUMMARY OF THE INVENTION

Disclosed is a novel EHCC engine that operates without moving parts, does not leak its working fluid, has minimal frictional losses, requires minimal, if any, maintenance, and is characterized by an especially low cost of fabrication and operation.

More specifically, disclosed herein is a closed-cycle thermal-mechanical energy conversion apparatus comprising a hollow mechanical structure having a hermetically sealed interior fluid-flow channel, and containing a working fluid within the fluid-flow channel which, when sufficiently and appropriately heated and cooled, flows through the interior fluid-flow channel in a first rotational direction, i.e., with respect to a central axis of rotation of the hollow structure, and wherein the flow of the working fluid through the interior fluid-flow channel in a first rotational direction thereby reciprocally causes the respective hollow structure to recoil and rotate in a second rotational direction, about the central axis of rotation, said second rotational direction being opposite the first rotational direction.

Embodiments of the present disclosure comprise at least one tubular, annular, and/or internal fluid-flow channel, through which a respective working fluid flows parallel to a circular, orbital, and/or spiral fluid-flow path. The scope of the present disclosure includes embodiments comprising, utilizing, incorporating, using, and/or including, one or more hermetically sealed, and closed-cycle, fluid-flow paths (and corresponding fluid-flow channels) having any two- or three-dimensional shape.

The hollow structure which surrounds, encases, confines, contains, defines, encloses, and/or hermetically seals, a respective fluid-flow channel of a respective embodiment of the present disclosure comprises one or more channel walls which surround, encase, confine, contain, enclose, and/or hermetically seal, the respective fluid-flow channel.

Each point within the interior of an embodiment's closed-cycle fluid-flow channel is fluidly connected to each other point within the interior of the embodiment's fluid-flow channel, and no point within the interior of the embodiment's closed-cycle fluid-flow channel is fluidly connected to any point outside the embodiment's fluid-flow channel.

Embodiments of the present disclosure comprise, include, incorporate, and/or utilize, working fluids, the expansion and contraction of which those working fluids to flow within the respective embodiments, and thereby cause those respective embodiments to rotate. When an embodiment's working fluid within one part or portion of the embodiment's respective fluid-flow channel is subjected to heat, causing it to expand, and when that embodiment's working fluid within another part or portion of the embodiment's respective fluid-flow channel is subjected to cold, causing it to contract, then the working fluid so heated and cooled will flow through the respective embodiment's fluid-flow channel, thereby transferring heat from one part or portion of the embodiment, i.e., from a heated portion, to another part or portion, i.e., to a cooled portion, of the embodiment.

The fluid-flow channel of an embodiment of the present disclosure is characterized by, comprises, contains, includes, and/or incorporates, at least two channel sectors, segments, parts, and/or portions. One fluid-flow channel sector, of which a fluid-flow channel of the present disclosure is in part comprised, is an "isothermal expansion" channel sector, and this channel sector of the embodiment's fluid-flow channel is adapted and/or configured to expose working fluid flowing therethrough to thermal energy originating from a source of thermal energy, thereby increasing the temperature of working fluid flowing through that isothermal expansion channel sector. Another fluid-flow channel sector, of which a fluid-flow channel of the present disclosure is in part comprised, is an "isothermal contraction" channel sector, and this channel sector of the embodiment's fluid-flow channel is adapted and/or configured to remove thermal energy from working fluid flowing therethrough by exposing the working fluid flowing therethrough to a source of relative cold originating from an external thermal sink, thereby decreasing the temperature of working fluid flowing through that isothermal contraction channel sector.

An embodiment of the present disclosure is characterized by, comprises, contains, includes, and/or incorporates, an additional "adiabatic expansion" channel sector, segment, part, and/or portion, wherein that "adiabatic expansion" channel sector is adapted and/or configured to enable working fluid flowing therethrough to adiabatically expand following its exposure to thermal energy and its consequent heating and isothermal expansion.

An embodiment of the present disclosure is characterized by, comprises, contains, includes, and/or incorporates, an additional "adiabatic compression" channel sector, segment, part, and/or portion, wherein that "adiabatic compression" channel sector is adapted and/or configured to enable working fluid flowing therethrough to adiabatically contract following a removal of thermal energy from that working fluid and its consequent cooling and isothermal contraction. And that "adiabatic compression" channel sector is further adapted and/or configured to enable rotations of the embodiment's respective hollow structure to mechanically compress the cooled working fluid therein.

An embodiment of the present disclosure comprises a fluid-flow channel that is "linear" in that working fluid flowing therethrough may only flow through the single closed-cycle fluid-flow circuit through which all of the working fluid flows and/or must pass, e.g., a fluid-flow channel within an interior of a single unbranching tube. Another embodiment of the present disclosure comprises a fluid-flow channel that is at least partially "branched" in that the closed-cycle fluid-flow channel is comprised of at least one fluid-flow junction, through which all of the working fluid must flow, and/or pass, and is additionally comprised of two or more "parallel" fluid-flow channels through any one of which working fluid may flow out of the at least one fluid-flow junction, and from any one of which fluid may flow back to the at least one fluid-flow junction.

The fluid-flow path, and/or fluid-flow channel centerline, characteristic of a linear fluid-flow channel is a single simple closed curve which curve passes through a center of each flow-normal cross-section of the respective linear fluid-flow channel. The "channel length" of a linear fluid-flow channel is the length of the entire respective simple closed curve that defines that linear fluid-flow channel. The respective "sector length" of any sector, segment, part, and/or portion, of such a linear fluid-flow path, is the length of the single open curve passing through the center of each flow-normal cross-section of that sector, segment, part, and/or portion, of the respective linear fluid-flow channel. The "sector length" of a sector, segment, part, and/or portion, of a linear fluid-flow path, is the length of a corresponding part and/or portion of a respective entire simple closed curve that defines a corresponding complete closed-cycle linear fluid-flow channel.

The fluid-flow path, and/or fluid-flow channel centerline, characteristic of a branched fluid-flow channel is a single simple closed curve that passes through a center of each flow-normal cross-section of a respective shortest fluid-flow path by which a working fluid may flow out from at least one fluid-flow junction in the fluid-flow channel, and therefrom flow back to the at least one fluid-flow junction in the fluid-flow channel, i.e., a single simple closed curve defining a shortest fluid-flow path by which a working fluid may flow through a full circuit of an embodiment's closed-cycle fluid-flow channel, wherein the full circuit includes flow through the respective embodiment's isothermal expansion fluid-flow channel sector and its isothermal contraction fluid-flow channel sector. The "channel length" of a branched fluid-flow channel is the length of the respective shortest simple closed curve defining the shortest full-circuit fluid-flow path through the branched fluid-flow channel. The respective "sector length" of any sector, segment, part, and/or portion, of such a branched fluid-flow path is the length of the single open curve passing through the center of each flow-normal cross-section of the shortest fluid-flow path through the respective channel sector. The "sector length" of a sector, segment, part, and/or portion, of a branching fluid-flow path, is the length of a corresponding part and/or portion of a respective entire simple closed curve that defines a corresponding complete closed-cycle branching fluid-flow channel.

In general, idealized thermodynamic processes and/or systems are not achievable and/or attainable in practice, and such idealized thermodynamic processes serve as limiting cases for actual processes. For example, frictional losses of a working fluid flowing over, and/or past, the walls of a fluid-flow channel, and/or frictional losses that occur between a shaft and a respective shaft bearing, may prevent a thermodynamic machine's achievement, manifestation, and/or attainment, of an idealized thermodynamic process. However, incremental optimizations to a machine implementing, and/or executing, a thermodynamic process or system may enable the respective thermodynamic process or system to approach a respective idealized limiting case.

References within this disclosure to idealized thermodynamic processes, conditions, and/or results, are offered for the purpose of explanation and illustration, and may be difficult, if not impossible, to actually achieve and/or attain within actual embodiments thereof. In no way do discussions, within this disclosure, of idealized thermodynamic processes constitute limitations of the scope, or the value, of the present disclosure. The scope of the present disclosure includes embodiments which may not achieve idealized operations, behaviors, and/or results. This is an expected distinction between theory and reality.

The thermal efficiency of a closed-cycle heat engine is the ratio of the mechanical energy, and/or work, output by the heat engine with respect to the thermal energy input to the heat engine. The thermal energy input to a heat engine may be characterized by the temperature at which heat enters the engine, and the temperature of the thermal sink into which the engine transfers its unused and/or surplus heat. In simpler terms, the thermal efficiency of a heat engine is the percentage of thermal energy input to the heat engine that is transformed into useful work. While the maximum theoretical efficiency of a closed-cycle heat engine, such as the one disclosed herein, is equivalent to the efficiency of the Carnot cycle, the Carnot cycle offers a theoretical, and/or an idealized, thermal efficiency whereas the thermal efficiency of a real heat engine will always be less than this theoretical maximum-possible efficiency because of friction and other losses that will occur within the real heat engine.

Within fluid-flow channels of embodiment's of the present disclosure, working fluids of non-zero heat capacity are made to expand and flow in response to a heating of one part of the embodiment, and the working fluid therein, and/or in response to a cooling of another part of the embodiment, and the working fluid therein. The scope of the present invention and disclosure includes a variety of embodiments, some of which are described, and others of which, in light of those embodiments which are described and discussed, will be variations, extensions, adaptations, and alternatives, that will be obvious to those skilled in the art. Embodiments of the present invention and disclosure include, but are not limited to, embodiments comprising, utilizing, incorporating, and/or including, the following categorical types of fluid-flow channels, which categorical types of fluid-flow channels include, but are not limited to, the following:

In a first group and/or category of embodiments, an interior of a respective fluid-flow channel is characterized by an increasing cross-sectional area of the fluid-flow channel (normal to a longitudinal, and/or flow, axis of fluid flow) with respect to an increasing distance in a first direction from an initial point of working-fluid warming, up to, but not past, an initial point of working-fluid cooling. And, another interior of the fluid-flow channel is characterized by a decreasing cross-sectional area of the fluid-flow channel with respect to an increasing distance in the same first direction from an initial point of working-fluid cooling, up to, but not past, the initial point of working-fluid warming.

In a second group and/or category of embodiments, an interior of a respective fluid-flow channel is of an approximately constant cross-sectional area normal to a longitudinal, and/or flow, axis of the respective fluid-flow channel and fluid flow. However, the fluid-flow channel incorporates one or more orifice plates. An orifice plate having, and/or characterized by, an aperture of no more than an embodiment-specific minimum aperture area is positioned adjacent to an initial point of working-fluid warming. In an embodiment incorporating two or more orifice plates, the aperture areas of following, additional, successive, and/or subsequent, aperture plates increase (relative to the aperture are of the first orifice plate) in a first direction away from, and/or beyond, the initial point of working-fluid warming and up to, but not past, an initial point of working-fluid cooling. Then the aperture areas of following, additional, successive, and/or subsequent, orifice plates decrease in the same first direction away from, and/or beyond, the initial point of working-fluid cooling and up to, but not past, the initial point of working-fluid warming. The apertures within these respective orifice plates may be of any shape, relative area, and/or absolute area, and individual orifice plates may incorporate any number of apertures, e.g., where the cumulative aperture area per plate is of an appropriate value and/or size.

In a third group and/or category of embodiments, the flow-normal cross-sectional area of a respective fluid-flow channel varies in step-wise fashion. The cross-sectional area of the fluid-flow channel is minimal on, and/or at, one side of an initial point of working-fluid warming either within, or adjacent to, that point of working-fluid warming. The cross-sectional area of the fluid-flow channel then increases in stepwise fashion (i.e. not smoothly) in a first direction toward (if not already within), through (if not already past), and beyond, the initial point of working-fluid warming and up to, but not past, an initial point of working-fluid cooling. Then the cross-sectional area of the fluid-flow channel decreases in stepwise fashion (i.e. not smoothly) in the same first direction toward (if not already within), through (if not already past), and beyond, the initial point of working-fluid cooling and up to, but not past, the initial point of working-fluid warming.

In a fourth group and/or category of embodiments, a respective fluid-flow channel is of approximately constant flow-normal cross-sectional area normal to a longitudinal, and/or flow, axis of the respective fluid-flow channel and fluid flow. However, the shell, casing, wall, and/or enclosure, of the respective fluid-flow channel incorporates one or more diodic valves facilitating working-fluid flow in a first direction and frustrating working-fluid flow in a second and/or opposite direction.

Additional groups and/or categories of embodiments combine elements of the first four groups and/or categories, and still other embodiments include, incorporate, utilize, and/or comprise, still other fluid-flow channel mechanisms, geometries, designs, techniques, methods, structures, and/or features, so as to promote fluid flow in a first direction and frustrate fluid flow in an opposite direction.

Beyond the channel-geometry, and/or fluid-flow control features, described above, embodiments, and categories of embodiments, of the present disclosure may also vary in the three-dimensional shapes of their fluid-flow channels, and/or of two-dimensional projections of those fluid-flow channels. The fluid-flow channels, respective fluid-flow-channel centerlines, and/or their respective fluid-flow-channel shells, casings, walls, and/or enclosures, may be characterized by any of a variety of shapes, including, but not limited to, shapes that are approximately: circular, ellipsoidal, spiral, rectangular, and/or circum-spherical.

Embodiments of the present disclosure may vary in the numbers of separate closed-cycle fluid-flow channels operating in concert and/or cooperating, e.g., fixedly attached to a common shaft and/or to each other, to convert thermal energy into a mechanical rotation of each respective comprehensive embodiment about a shared respective central axis of rotation and/or a shared rotational shaft. Embodiments of the present disclosure may vary in the relative position and/or orientation of their respective axes of rotation, and/or in the relative position and/or orientation of their respective constituent fluid-flow channels with respect to their respective axes of rotation and/or with respect to their respective embodiments as a whole.

Embodiments of the present disclosure may vary in the type, kind, chemical composition, density, and/or physical properties, of the working fluid(s) incorporated, included, utilized, and/or used, within their respective one or more fluid-flow channels. The working fluids of embodiments of the present disclosure may vary in the state of matter characteristic of those working fluids (e.g., involving working fluids which change phase, and/or involving phase-change working fluids) during the operations of their respective heat engines, and the working fluids of embodiments of the present disclosure may include, but are not limited to, working fluids which, during the operations of their respective heat engines, are nominally, and/or at least transiently: gases, liquids, plasmas, solids (e.g., granular), and phase-changing materials, e.g., being gaseous at higher temperatures and liquid at lower temperatures.

Some embodiments of the present disclosure may be optimized to convert thermal energy into mechanical energy with respect to a particular high thermal input temperature (i.e. a particular temperature of a nominal heat source) and/or with respect to a particular range of relatively high thermal input temperatures; and/or with respect to a particular relatively low thermal sink temperature (i.e. a particular temperature of a nominal heat sink) and/or with respect to a particular range of relatively low thermal sink temperatures. Some embodiments of the present disclosure may be optimized to convert thermal energy into mechanical energy with respect to a particular difference of high and low temperatures (i.e. with respect to a particular delta temperature) and/or with respect to a particular range of differences of high and low temperatures (i.e. with respect to a particular range of delta temperatures).

Some embodiments of the present disclosure may be optimized with respect to other attributes, characteristics, variables, parameters, and/or qualities, including, but not limited to: fabrication cost, maintenance cost, operational lifetime, engine size, engine mass, engine reliability, shaft length, type of working fluid, total mass of working fluid, nominal working fluid pressure, maximum working fluid pressure, type of heat source, type of cold source (and/or type of heat sink), thermal variability and/or stability of heat source, thermal variability and/or stability of cold source (and/or heat sink), and/or minimum, nominal, average, and/or maximum, engine torque.

Embodiments of the present disclosure may vary with respect to the heat source, process, material, and/or chemical reaction, from which they are optimized to harvest and/or receive heat and/or thermal energy. Embodiments of the present disclosure may vary with respect to the heat sink, process, material, and/or chemical reaction, to which they are optimized to conduct, transmit, dispense, transfer, and/or neutralize, unused, surplus, and/or waste, heat and/or thermal energy.

Embodiments of the present disclosure may vary with respect to whether they are designed and/or operated as heat engines, i.e. to extract mechanical work from a flow of thermal energy from a heat source to a heat sink; or, by contrast, designed and/or operated as heat pumps, i.e. to respond to incident mechanical, and/or kinetic, energy applied to the respective embodiments creating, and/or manifesting, a flow of thermal energy from a heat sink (thereby tending to make the heat sink cooler) to a heat source (thereby tending to make the heat source warmer).

Within this disclosure references such as: "warmth," "warming," "heat," "heated," "hot," and "increased thermal energy," (or similar terms) are approximately equivalent, and each represents the concept and/or manifestation of the ability of a first collection of atomic nuclei, and/or matter, e.g., a heat source, to excite and/or increase the thermal motion, energy, and/or thermal potential energy, of a second, and/or another, collection of (relatively cold) atomic nuclei, and/or matter, e.g., a working fluid.

Within this disclosure references to "cold," "cooling," "chilled," and "reduced or decreased thermal energy," (or similar terms) are approximately equivalent, and each represents the concept and/or manifestation of the ability of a first collection of atomic nuclei, and/or matter, e.g., a heat sink, to reduce and/or decrease the thermal motion, energy, and/or thermal potential energy, of a second, and/or another, collection of (relatively warm) atomic nuclei, and/or matter, e.g., a working fluid.

Within this disclosure references such as: "heat source," and "thermal energy source," (or similar terms) are approximately equivalent, and each represents the concept and/or manifestation of a collection of relatively hot, and/or heat-producing, atomic nuclei, and/or matter from which the working fluid of an embodiment may be heated. It is the heat obtained from, and/or imparted by, a heat source which energizes embodiments of the present disclosure.

Within this disclosure references such as: "cold sink," "heat sink," "cold source," "thermal sink," and "thermal energy sink," (or similar terms) are approximately equivalent, and each represents the concept and/or manifestation of a collection of relatively cold, and/or heat-absorbing, atomic nuclei, and/or matter to which may flow thermal energy, and/or heat, from a working fluid, and by which a working fluid may be cooled. It is the heat absorbed by a heat sink which creates a thermal difference which provides the thermal potential energy that energizes embodiments of the present disclosure.

Within this disclosure references to "casing," "shell," "wall," "pipe," "tube," and/or "enclosure," (or similar terms) are approximately equivalent, and each refers to a barrier, e.g., rigid, which hermetically seals, surrounds, traps, encases, encloses, and/or contains, a respective fluid-flow channel through which a working fluid may flow in response to its cyclical heating and cooling. The fluid-flow channels of the present disclosure might also be described, and/or termed, as "closed-circuit loops," "closed-circuit channels," "closed-circuit fluid conduits," and "closed loop working-fluid circuits." Some embodiments of the present disclosure that utilize a tubular channel through which a working fluid flows might be termed as being a "torus."

Within this disclosure references to "tubes," "channels," "tubular channels," "fluid channels," "flow channels," "fluid-flow channels," "flow paths," "pipes," "flow pipes," and "tubular flow paths," (or similar terms) are approximately equivalent, and each refers to a hermetically sealed, closed-cycle, linear or branched fluid-flow circuit through which a heated working fluid may expand and flow, and through which a cooled working fluid may contract and flow. Similarly, references to "channel sectors," "channel parts," "channel portions," "tubular sections," "tubular segments," "tubular portions," "channel portions," "channel segments," (or similar terms), as well as terms related to "sectors," "sections," "parts," "portions," and "segments," (or similar terms), relate to fractions, parts, portions, segments, pieces, and/or sections, of an integral, closed-circuit, and hermetically sealed, complete tube, channel, and/or flow path.

In other words, an integral, closed-circuit, closed-cycle, and hermetically sealed, complete working-fluid fluid-flow tube, channel, and/or flow path, may be conceptually, operationally, physically, and/or mechanically, decomposed into a potentially incomplete set of component channel sectors, channel portions, channel parts, sub-tubes, sub-channels, and/or sub-sections. Within this disclosure references to channel sectors, channel portions, channel parts, sub-tubes, sub-channels, and/or sub-sections of an embodiment's complete, integral, closed-circuit, and hermetically sealed, complete working-fluid flow tube, channel, and/or flow path, are typically defined, distinguished, and identified, with respect to a specific type and/or characteristic heat flow, if any, and a type and/or characteristic of a change in working-fluid pressure and/or volume, which is manifested within, and/or exemplified by, those referenced channel sectors, channel portions, channel parts, sub-tubes, sub-channels, and/or sub-sections of an embodiment's comprehensive, and/or complete, working-fluid flow path.

If a particular first instance, configuration, instantiation, actuation, application, and/or operation, of an embodiment of the present disclosure is associated with, energized by, and/or caused to rotate in response to, a particular first thermal difference, then that particular first thermal difference of the particular first operation of the embodiment is defined, at least in part, by a nominal temperature of its heat source, and a nominal temperature of its complementary, and/or corresponding, heat sink. The "heat source temperature" characteristic of a particular first operation of an embodiment of the present disclosure might be a first heat-source temperature, e.g., 200 degrees Celsius. The "heat source temperature" characteristic of a particular second instance, configuration, instantiation, actuation, application, and/or operation, of the same embodiment of the present disclosure might be a second heat-source temperature, e.g., 100 degrees Celsius. A same embodiment of the present disclosure might operate in association with, in configurations manifesting, and/or in response to, a wide variety of potential heat source temperatures.

Similarly, the "heat-sink temperature" characteristic of the above particular first operation, and/or configuration, of the embodiment of the present disclosure might be a first cold-sink temperature, e.g., 80 degrees Celsius. The "cold-sink temperature" characteristic of a particular second operation, and/or configuration, of the same embodiment of the present disclosure might be a second cold-sink temperature, e.g., −20 degrees Celsius. A same embodiment of the present disclosure might operate in association with, in configurations manifesting, and/or in response to, a wide variety of potential heat sink temperatures.

The physical state (gas, liquid, solid, or plasma) of a working fluid operating within an embodiment of the present disclosure depends upon the particular temperatures, and/or thermal differences, to which that embodiment is subjected. A particular type of working fluid may exist in both liquid and gas phases when subjected to, and/or with respect to, the range of temperatures associated with, and/or characteristic of, a first thermal difference during the operation of an embodiment of the present disclosure. That same working fluid may exist solely as a gas when subjected to, and/or with respect to, the range of temperatures associated with, and/or characteristic of, a second thermal difference during the operation of the same embodiment of the present disclosure. The choice of an appropriate, if not optimal, working fluid for an embodiment of the present disclosure will often depend upon a consideration of the physical state(s) of each candidate, and/or potential, working fluid with respect to, and/or when subjected to, a particular range of thermal differences, and/or when subjected to a particular "heat source temperature" and/or a particular "heat-sink temperature."

The scope of the present disclosure includes embodiments utilizing any type, or mixture of types, of working fluid, as well as embodiments utilizing any particular working fluid or mixture of working fluids.

One might expect working fluids that become gaseous when exposed to an embodiment's "heat source temperature", but which become liquified when exposed to the respective embodiment's "heat-sink temperature," to represent a potentially promising, if not a favorable, working fluid with respect to that embodiment, when that embodiment is configured to be operated, and/or energized, by those particular heat source and heat sink temperatures, by that particular thermal range, and/or by that particular temperature difference. Many considerations will guide the selection, if not the determination, of an optimal working fluid with respect to a particular embodiment, a particular configuration an embodiment, a particular application, and/or a particular thermal difference (if not a particular range of thermal differences). The scope of the present disclosure includes embodiments utilizing, capable of utilizing, configured to utilize, and/or optimized with respect to the utilization of, any working fluid and/or mixture of working fluids.

As an example related to the suitability of a variety of potential working fluids, an embodiment of the present disclosure utilizes a working fluid that gasifies (i.e., boils and/or sublimates) in response to its exposure to the nominal "heat source temperature" characteristic of a configuration, and an operation, of that embodiment, while that working fluid forms a granular solid (i.e., freezes) in response to its exposure to the nominal "heat sink temperature" characteristic of the embodiment's configuration and operation. For example, by altering the relative geometries (e.g., cross-sectional areas) of the respective embodiment's fluid flow channel, such a solid-to-gas phase-changing working fluid might operate well, especially with respect to a particular application, and/or with respect to an application-specific embodiment configuration.

The scope of the present disclosure includes embodiments utilizing any absolute or relative quantity of a working fluid (e.g., any density, any pressure, any volume, any mass). The scope of the present disclosure includes embodiments utilizing working fluids characterized by any molecular weight, any boiling point, any freezing point, any viscosity, any critical temperature, any combination of chemicals, and any combination of physical states (with respect to a particular operational heat-source temperature, heat-sink temperature, and/or thermal difference).

As an example related to the suitability of a variety of potential working fluids, an embodiment of the present disclosure utilizes a combination of working fluid chemicals, a first one of which is a liquid across the full range of temperatures within, and/or characteristic of, a particular configurational, and/or operational, thermal difference, and a second one which is, over a particular low-temperature portion of the full range of temperatures, soluble within the first liquid working fluid chemical, but which changes from a solute across the low-temperature portion of the full range of temperatures, to a gas (separated from the first liquid working fluid chemical) at a high-temperature portion of the full range of temperatures.

The scope of the present disclosure includes, but is not limited to, embodiments which comprise, utilize, incorporate, and/or include, as a working fluid, hydrogen, nitrogen, air, helium, butane, and/or ammonia. And, the scope of the present disclosure is not limited by an embodiment's working fluid.

Within this disclosure, references are made to changes in the "volume" and "pressure" of a working fluid, e.g., as it is heated and cooled. These references are provided as generalizations indicative of approximate, typical, and/or expected, behavior. For example, changes in the pressure and volume of a flowing working fluid, e.g., especially of flowing gaseous working fluids, may be affected by the geometry of the fluid-flow channels. The scope of the present disclosure is not limited to any particular pattern of changes in the volume and/or pressure of a working fluid as it flows through the fluid-flow channel of an embodiment, and embodiments manifesting any changes, and/or patterns of changes, in the volume and/or pressure of a respective working fluid are included within the scope of the present disclosure.

Variations in the patterns of pressure and volume representative of, characteristic of, and/or manifested by, an embodiment of the present disclosure do not necessarily prevent the useful operation of the embodiment. And, while not typical of, and even though seemingly contrary to, the descriptions of working fluid behavior provided herein, such embodiments are included within the scope of the present disclosure.

Within this disclosure, references are made to changes in the "volume" of a working fluid, e.g., as it is heated and cooled. While it may not be explicitly mentioned in every case, the heating of a working fluid will cause that working fluid to expand, i.e., will cause its volume per unit of working-fluid mass to increase, which likewise corresponds to a decrease in the density of that working fluid, i.e., a decrease in its mass per unit volume.

Similarly, while it may not be explicitly mentioned in every case, the cooling of a working fluid will cause that working fluid to contract, i.e., will cause its volume per unit of working-fluid mass to decrease, which likewise corresponds to an increase in the density of that working fluid, i.e., an increase its mass per unit volume.

Discussions of changes in the volume of a working fluid, with respect to the heating and/or cooling of a respective embodiment, are generalizations, and while such generalizations may be generally and/or approximately true, particular embodiments of the present disclosure may manifest variations in the general, and/or approximate, volumetric behaviors herein specified. The scope of the present disclosure includes embodiments which manifest peculiar, specific, atypical, unusual, and/or unique, patterns of working-fluid volumetric changes in response to the heating and cooling of the respective embodiments. The scope of the present disclosure is not limited by the pattern of working-fluid volumetric changes manifested by an embodiment.

Within this disclosure, references are made to changes in the "pressure" of a working fluid, e.g., as it is heated and cooled. Discussions of changes in the pressure of a working fluid, with respect to the heating and cooling of a respective embodiment, are generalizations, and while such generalizations may be generally and/or approximately true, particular embodiments of the present disclosure may manifest variations in the general, and/or approximate, pressure behaviors herein specified. The scope of the present disclosure includes embodiments which manifest peculiar, specific, atypical, unusual, and/or unique, patterns of working-fluid pressure changes in response to the heating and cooling of the respective embodiments. The scope of the present disclosure is not limited by the pattern of working-fluid pressure changes manifested by an embodiment.

Within this disclosure, references are made to thermally-conductive working-fluid fluid-flow channel sectors, portions, sections, partitions, parts, regions, and/or zones. The shells, casings, walls, and/or enclosures, surrounding, encasing, confining, containing, defining, and/or hermetically sealing, such thermally-conductive portions of working-fluid fluid-flow channels may be comprised, fabricated, fashioned, made, and/or created, of any thermally-conductive material of fabrication, and/or any layered and/or laminate material comprising a thermally-conductive material of fabrication, including, but not limited to, materials of fabrication such as: metal, iron, silver, copper, gold, aluminum nitride, silicon carbide, aluminum, tungsten, and zinc. The scope of the present disclosure is not limited to the material(s) of which the thermally-conductive portions of working-fluid flow channels are fabricated, made, constructed, and/or comprised.

Within this disclosure, references are made to thermally insulating working-fluid fluid-flow sectors, portions, sections, partitions, parts, regions, and/or zones, e.g., adiabatic portions, of working-fluid fluid-flow channels. The shells, casings, walls, and/or enclosures, surrounding, encasing, confining, containing, defining, and/or hermetically sealing, such thermally insulating portions of working-fluid fluid-flow channels may be comprised, fabricated, fashioned, made, created, and/or lined (inside and/or out), of any thermally-insulating material of fabrication, and/or of any layered and/or laminate material comprising a thermally-insulating material of fabrication, including, but not limited to, materials of fabrication such as: plastic, glass, acrylic glass (e.g., Plexiglas), fiberglass, Teflon, polyurethane foam, expanded polystyrene, epoxy, and bronze. The shells, casings, walls, and/or enclosures, surrounding, encasing, defining, and/or hermetically sealing, such thermally insulating portions of working-fluid flow channels may also be comprised, fabricated, fashioned, made, and/or created, of a laminate or layers which include a layer, gap, space, and/or partition, comprising, including, and/or incorporating, a thermally-insulating material (e.g., plastic), gas (e.g., nitrogen), void (e.g., partial or full vacuum), and/or metamaterial, which tends to prevent or inhibit a conduction of thermal energy. Such a laminate may include, and/or incorporate, thermally-conductive materials to provide structural strength while, as a whole, being and/or remaining thermally-insulating. The scope of the present disclosure is not limited to the material(s), structures, and/or designs, of which the thermally insulating portions of working-fluid flow channels are fabricated, made, constructed, and/or comprised.

Some embodiments of the present disclosure operate in conjunction with external sources of relative heat, which warm the working-fluids of those respective embodiments from outside those embodiments, and thereby indirectly cause those working fluids to flow through their respective internal fluid-flow channels. Similarly, some embodiments of the present disclosure operate in conjunction with external sources of relative cold into which unused and/or surplus portions of externally-originating thermal energy added to an embodiment's working fluid can subsequently be removed from the embodiment's warmed working fluid, and thereafter deposited into, absorbed by, transferred to, and/or transmitted to, the external source of cold.

Some embodiments of the present disclosure operate in conjunction with internal sources of thermal energy, e.g., radioactive materials, which warm the working-fluids of those respective embodiments from inside those embodiments, and thereby directly cause those working fluids to flow through their internal fluid flow channels, e.g., through and from the isothermal expansion portion(s) of those respective embodiments.

The scope of the present disclosure includes embodiments that receive thermal energy, and/or heat, from sources including, but not limited, to: the combustion of chemical fuels (such as coal, wood, grass, gasoline, diesel, and/or oil), waste heat from industrial processes (such as those executed at oil refineries, power stations, steelmaking plants, and cement kilns), waste heat from internal combustion engines, heat produced by flared industrial gases, concentrated solar energy and/or radiation, geothermal energy, and radioactive decay. The scope of the present disclosure includes embodiments utilizing any thermal energy source, and/or heat source, from which thermal energy is received. Embodiments utilizing thermal energy received from any source, whether external or internal to the embodiment, are included within the scope of the present disclosure.

The scope of the present disclosure includes embodiments that transfer thermal energy into, and/or utilize as thermal sinks, gases (such as atmospheric air), liquids (such as bodies of water), solids (such as metal frameworks thermally-connected to their own respective "secondary" thermal sinks), and even the vacuum of space (where infrared electromagnetic radiation, and/or light, can carry thermal energy away from an embodiment). The scope of the present disclosure includes embodiments that transfer thermal energy into salt (e.g., molten salt from which thermal energy is subsequently transferred to atmospheric air). The scope of the present disclosure includes embodiments utilizing any heat sink into which thermal energy is transmitted, transferred, conducted, and/or deposited. Embodiments conducting, and/or transferring, thermal energy to any source, whether external or internal to the embodiment, are included within the scope of the present disclosure.

The scope of the present disclosure includes embodiments which incorporate, and/or utilize, mechanisms, apparatuses, and/or devices, to enhance, accelerate, and/or achieve, a transfer of thermal energy to a thermal sink, including, but not limited to, embodiments that incorporate, and/or utilize, Venturi and/or Bernoulli chillers through which flows a fluid thermal sink, the thermal-energy-transfer efficiency of which is promoted and/or increased by a reduction in the temperature and/or static pressure of the fluid thermal sink during its accelerated flow through a constriction within a Venturi and/or Bernoulli chiller).

The scope of the present disclosure includes embodiments utilizing any thermal energy sink, and/or cold source, into which it transfers thermal energy, as well as embodiments that achieve a transfer of thermal energy to a thermal sink directly, or indirectly.

An embodiment of the present disclosure will have an isothermal expansion portion of, and/or within, its complete working-fluid-flow channel into which heat from a source of thermal energy is transferred into its working fluid (thereby causing that working fluid to expand).

An embodiment of the present disclosure will have an isothermal contraction portion of, and/or within, its complete working-fluid-flow channel from which thermal energy is removed from its working fluid and thereafter transferred to an external sink of thermal energy (thereby causing that working fluid to contract).

The scope of the present disclosure includes embodiments which divide their complete working-fluid-flow channels in such a way, and/or by such proportions, so as to incorporate, include, and/or utilize, an isothermal contraction portion having a volume, sector length, size, and/or capacity, of any non-zero extent, and/or any non-zero scale, relative to the non-zero volume, sector length, size, and/or capacity of the respective embodiment's isothermal expansion working-fluid-flow-channel portion.

The scope of the present disclosure includes embodiments which divide their complete working-fluid-flow channels so as to incorporate, include, and/or utilize, an isothermal expansion portion having a non-zero volume, sector length, size, and/or capacity, of any non-zero extent, and/or non-zero scale, relative to the non-zero volume, sector length, size, and/or capacity of the respective embodiment's isothermal contraction working-fluid-flow-channel portion.

An embodiment of the present disclosure may, or may not, have an adiabatic expansion portion within its working-fluid-flow channel wherein working fluid warmed by its passage through a respective and flow-preceding isothermal expansion channel portion, and by its receipt of thermal energy therein, may continue expanding in the absence of a continued influx (or a loss) of thermal energy. The scope of the present disclosure includes embodiments which divide their complete working-fluid flow channels so as to incorporate, include, and/or utilize, an adiabatic expansion portion having a volume, sector length, size, and/or capacity, of any extent and/or scale relative to the volume, sector length, size, and/or capacity of the respective embodiment's isothermal expansion working-fluid-flow-channel portion. The scope of the present disclosure includes embodiments which do not incorporate, include, and/or utilize, an adiabatic expansion working-fluid-flow-channel portion.

An embodiment of the present disclosure may, or may not, have an adiabatic compression portion within its working-fluid-flow channel wherein working fluid cooled by its passage through a respective and flow-preceding isothermal contraction channel portion, and by its loss of thermal energy therein, may continue contracting in the absence of a continued loss (or any influx) of thermal energy, and wherein it may also be compressed as a consequence of centrifugal forces imparted to it by a rotation of the embodiment (i.e., by work performed on the cooled working fluid by the embodiment as a consequence of the embodiment's rotation). The scope of the present disclosure includes embodiments which divide their complete working-fluid-flow channels so as to incorporate, include, and/or utilize, an adiabatic compression portion having a volume, sector length, size, and/or capacity, of any extent and/or scale relative to the volume, sector length, size, and/or capacity of the respective embodiment's isothermal expansion working-fluid-flow-channel portion. The scope of the present disclosure includes embodiments which do not incorporate, include, and/or utilize, an adiabatic compression working-fluid-flow-channel portion.

Embodiments of the present disclosure may receive thermal energy from an external source (although some may receive thermal energy from an internal source of radioactive decay). Those embodiments that receive thermal energy from an external source will do so through a high-temperature thermally-conductive conduit into their respective isothermal expansion working-fluid-flow-channel portion. However, that high-temperature thermally-conductive conduit itself may be thermally connected to another high-temperature thermally-conductive conduit, element, feature, structure, and/or appendage. For example, the high-temperature thermally-conductive conduit of an embodiment may be thermally connected to a high-temperature thermally-conductive cylindrical plate that is coaxial with the rotational axis of the embodiment. As another example, the high-temperature thermally-conductive conduit of an embodiment may be thermally connected to a high-temperature thermally-conductive plate that is itself thermally connected to another high-temperature thermally-conductive structure. The scope of the present disclosure includes embodiments which receive thermal energy from an external (or internal) source, and which transfer thermal energy from such an external (or internal) source to their respective working fluids, directly or indirectly by any path, mechanism, conduit, structure, and/or thermally-conductive channel.

Embodiments of the present disclosure may receive thermal energy from an internal source including, but not limited to, an internal mass, piece, collection, and/or quantity, of a radioactive material which imparts thermal energy to the embodiment, and/or to a working fluid therein, directly, and/or indirectly through a thermally-connected, and/or thermally-conductive, pathway within the embodiment. The scope of the present disclosure includes embodiments which contain one or more radioactive materials the radioactive decay of which produces thermal energy which is transmitted, transferred, and/or conducted, to working fluids within the respective embodiments.

Embodiments of the present disclosure may receive thermal energy from an external source, the external source's heat being transmitted, transferred, and/or conducted to the respective embodiments via proximate high-temperature thermally-conductive structural members, elements, plates, and/or features. For example, an embodiment of the present disclosure receives thermal energy from steam that is proximate, and thermally connected, to a thermally-conductive feature of the embodiment through which thermal energy received from the steam is conductively transmitted, transferred, and/or conducted to a working fluid of the embodiment. Another embodiment of the present disclosure receives thermal energy from the exhaust of a combustion process, with the exhaust flowing proximate to a high-temperature thermally-conductive structural member, element, plate, and/or feature of the embodiment, through which thermal energy received from the exhaust is conductively transmitted, transferred, and/or conducted to a working fluid of the embodiment. The scope of the present disclosure includes embodiments which receive thermal energy from an external source by any direct and/or indirect thermally-conductive pathway, and/or thermally-conductive embodiment structure or feature.

Embodiments of the present disclosure may impart thermal energy received, extracted, and/or removed, from a respective warmed working fluid to an external heat sink wherein a portion of the discarded thermal energy is transmitted, transferred, and/or conducted to the heat sink via a thermally-conductive structural member, element, plate, and/or feature, of the embodiment. For example, an embodiment of the present disclosure may impart surplus, and/or waste, thermal energy to a body of relatively cool water via a thermally-conductive feature of the embodiment which is proximate to, if not in direct contact with, the body of water. Another embodiment of the present disclosure may impart surplus, and/or waste, thermal energy to a body of relatively cool air via a thermally-conductive feature of the embodiment which is in direct contact with the body of air. The scope of the present disclosure includes embodiments which transmit, transfer, and/or conduct, surplus and/or waste thermal energy to an external heat sink by any direct and/or indirect conductive pathway, and/or thermally-conductive embodiment structure or feature.

Embodiments of the present disclosure may receive thermal energy from a source which rotates with the respective embodiments, e.g., after the source is placed within a respective heat-source housing, compartment, and/or enclosure, connected to, and/or incorporated within, the mechanical structure of the respective embodiment. For example, an embodiment of the present disclosure receives thermal energy from an oxidative chemical reaction (e.g., an oxidation of iron to iron-oxide) which occurs within a thermally-conductive enclosure within the embodiment, which enclosure is fixedly attached to, and rotates with, the embodiment. The scope of the present disclosure includes embodiments which receive thermal energy from a source of heat positioned and/or encased within an enclosure attached to, and/or within, the embodiment, and which rotates with the embodiment.

Embodiments of the present disclosure may impart thermal energy to a heat sink which rotates with the respective embodiments, e.g., after the heat sink is placed within a heat-sink housing, compartment, and/or enclosure, connected to, and/or incorporated within, the mechanical structure of the embodiment. For example, an embodiment of the present disclosure imparts surplus, and/or waste, thermal energy to a quantity of "dry ice" (e.g., frozen carbon dioxide) positioned, and/or contained, within a thermally-conductive (and ventilated) enclosure within the embodiment, and which enclosure rotates with the embodiment. The scope of the present disclosure includes embodiments which discard surplus, and/or waste, thermal energy to a heat sink positioned within an enclosure fixedly attached to, and/or within, the embodiment, and which rotates with the embodiment.

The scope of the present disclosure includes embodiments which incorporate, include, and/or utilize, heat pipes within a thermal pathway, and/or thermally-conductive conduit, in order to transmit, and/or conduct, thermal energy from a heat source to an embodiment's working fluid, and/or in order to remove thermal energy from an embodiment's working fluid and transmit that removed thermal energy to a thermal sink.

Embodiments of the present disclosure may incorporate, include, and/or utilize, any number of fluidly disconnected, and/or fluidly separate, working-fluid fluid-flow channels within the same embodiment. The scope of the present disclosure includes embodiments which incorporate, include, comprise, and/or utilize, one, two, three, four, five, six, seven, eight, nine, ten, and/or any number, of fluidly disconnected, and/or fluidly separate, working-fluid flow channels. The scope of the present disclosure is not limited to, and/or by, any maximum number of fluidly disconnected, and/or fluidly separate, working-fluid flow channels. The scope of the present disclosure includes embodiments incorporating, including, and/or utilizing, any number of fluidly disconnected, and/or fluidly separate, working-fluid flow channels.

Embodiments of the present disclosure may incorporate, include, and/or utilize, any number of isothermal expansion working-fluid-flow-channel portions within any one of its one or more complete closed-cycle working-fluid-flow channels. Embodiments of the present disclosure may incorporate, include, comprise, and/or utilize, any number of fluidly connected isothermal contraction working-fluid-flow-channel portions within any one of its one or more complete closed-cycle working-fluid-flow channels. Embodiments of the present disclosure may incorporate, include, comprise, and/or utilize, any number of fluidly connected adiabatic expansion working-fluid-flow-channel portions within any one of its one or more complete closed-cycle working-fluid-flow channels. Embodiments of the present disclosure may incorporate, include, comprise, and/or utilize, any number of fluidly connected adiabatic compression working-fluid-flow-channel portions within any one of its one or more complete closed-cycle working-fluid flow channels.

The scope of the present disclosure includes embodiments having one or more working-fluid-flow channels, each or any of which incorporate, include, and/or utilize, any number of at least one fluidly connected isothermal expansion working-fluid-flow-channel portions, any number of at least one fluidly connected isothermal contraction working-fluid-flow-channel portions, any number, or none, of fluidly connected adiabatic expansion working-fluid-flow-channel portions, and/or any number, or none, of adiabatic expansion working-fluid-flow-channel portions.

Embodiments of the present disclosure may incorporate, include, and/or utilize, working-fluid flow channels in, and/or of, which the respective various working-fluid-flow-channel portions are fully insulated (e.g., through their fabrication from thermally insulating material(s), and/or through an internal and/or external cladding and/or covering of their thermally-conductive fluid-flow channel walls with thermally insulating coverings, coatings, and/or layers), are partially insulated, and/or are not insulated (i.e., and therefore remain thermally-conductive). The only exception to this is a requirement that a thermal pathway exist through which an embodiment, and/or a working fluid of the embodiment, may receive thermal energy from a heat source, and a requirement that a thermal pathway exist through which an embodiment, and/or a working fluid of the embodiment, may transmit thermal energy from the working fluid to a heat sink. The scope of the present disclosure includes embodiments which incorporate, include, comprise, and/or utilize, working-fluid flow channels of which any working-fluid-flow-channel portion is thermally insulated to any degree, including completely and not at all.

The scope of the present disclosure includes embodiments which incorporate, include, comprise, and/or utilize, working-fluid flow channels that are completely thermally insulated, but which obtain thermal energy from an internal source (within and/or beneath the insulation) and which discard thermal energy to an internal source (within and/or beneath the insulation). Such an embodiment might only operate for a limited amount of time, e.g., only until it exhausts one of its internal heat source and its internal heat sink.

Embodiments of the present disclosure may incorporate, include, comprise, and/or utilize, any type, form, shape, design, feature, and/or component, by which any, and/or all, respective working-fluid-flow-channel portions are fully or partially thermally insulated, including, but not limited to, an incorporation, inclusion, and/or utilization, of any material, and/or layer(s) of material, with which the wall of a working-fluid-flow-channel portion is fabricated, and/or an incorporation, inclusion, and/or utilization, of any material, and/or layer(s) of material, with which an exterior, and/or an interior, of a working-fluid-flow-channel portion wall is thermally insulated, e.g., as with an exterior coating, layer, and/or cladding, and/or with an interior coating, layer, and/or cladding.

Embodiments of the present disclosure may incorporate, include, comprise, and/or utilize, working-fluid-flow channels in, and/or of, which various of the respective working-fluid-flow-channel portions are thermally-conductive, but in which a transmission of heat between any adjacent working-fluid-flow-channel portions, e.g., between an isothermal expansion working-fluid-flow-channel portion and an adjacent succeeding adiabatic expansion working-fluid-flow-channel portion, and/or between an adiabatic compression working-fluid-flow-channel portion and an adjacent preceding isothermal contraction working-fluid-flow-channel portion, is inhibited through a use of thermally insulating gaskets, separators, spacers, and/or barriers, between the conjoined flanges, and/or channel walls, of adjacent working-fluid-flow-channel portions. The scope of the present disclosure includes embodiments which incorporate, include, and/or utilize, any and all forms, shapes, designs, features, and/or components, which inhibit a fluid-flow-channel lateral flow of thermal energy from the wall of one working-fluid-flow-channel portion to the wall of any respective adjacent working-fluid-flow-channel portion.

In order to promote a thermally-induced, and/or energized, flow of working fluid in a particular direction within a respective fluid-flow channel, some embodiments of the present disclosure incorporate, include, and/or utilize, diodic structural elements, features, and/or designs into, and/or within, their respective fluid-flow channels.

Some embodiments of the present disclosure incorporate, include, comprise, and/or utilize, respective fluid flow channels possessing inconstant, and/or varying, "flow-normal" cross-sectional areas (i.e., cross-sectional areas in planes normal to an axis of flow, and/or an axis of approximate radial symmetry, if any, of a fluid flow channel, which axis is approximately followed by, and/or parallel to, working fluid flowing within a respective fluid flow channel). When heated within an isothermal expansion working-fluid-flow-channel portion, an expanding working fluid will favor an expansion toward an end of that working-fluid-flow-channel portion which has a greater, rather than a lesser, flow-normal cross-sectional area, and/or a greater volume per unit length of fluid-flow channel. Similarly, when cooled within an isothermal contraction working-fluid-flow-channel portion, a contracting working fluid will favor a contraction toward an end of that working-fluid-flow-channel portion which has a lesser, rather than a greater, flow-normal cross-sectional area, and/or a lesser volume per unit length of fluid-flow channel. Thus, through an incorporation, inclusion, and/or utilization, of a working-fluid-flow channel of an appropriately varying flow-normal cross-sectional area, the direction in which an alternately expanding and contracting working fluid will flow can be determined, controlled, regulated, and/or fixed.

Some embodiments of the present disclosure incorporate, include, and/or utilize, fluid flow channels possessing, and/or characterized by, a constriction therein, e.g., possessing a constriction within the respective fluid flow channel at a point in the desired direction of working fluid flow at which working fluid flows from a respective isothermal contraction working-fluid-flow-channel portion, or an adiabatic compression working-fluid-flow-channel portion, and into a respective isothermal expansion working-fluid-flow-channel portion. The subsequent expansion of working fluid within the respective isothermal expansion working-fluid-flow-channel portion is directed away from the constriction and toward either an adiabatic expansion working-fluid-flow-channel portion, or an isothermal contraction working-fluid-flow-channel portion.

Some embodiments of the present disclosure incorporate, include, comprise, and/or utilize, respective fluid flow channels possessing one or more diodic valves which facilitate a flow of working fluid in one direction within a respective working-fluid flow channel while inhibiting a flow of working fluid in an alternate, and/or opposite, direction.

Some embodiments of the present disclosure incorporate, include, comprise, and/or utilize, respective fluid flow channels possessing an orifice plate, e.g., possessing an orifice plate at a point in the desired direction of working fluid flow at which working fluid flows from a respective isothermal contraction working-fluid-flow-channel portion, or an adiabatic compression working-fluid-flow-channel portion, and into a respective isothermal expansion working-fluid-flow-channel portion. The subsequent expansion of working fluid within the respective isothermal expansion working-fluid-flow-channel portion is directed away from the constrictive orifice plate and toward either an adiabatic expansion working-fluid-flow-channel portion, or an isothermal contraction working-fluid-flow-channel portion.

Some embodiments of the present disclosure incorporate, include, comprise, and/or utilize, adiabatic expansion working-fluid-flow-channel portions, and/or adiabatic compression working-fluid-flow-channel portions, of differing sector lengths, flow distances, and/or volumes. Some embodiments of the present disclosure incorporate, include, comprise, and/or utilize, an adiabatic compression working-fluid-flow-channel portion, and do not incorporate, include, comprise, and/or utilize, an adiabatic expansion working-fluid-flow-channel portion, so that working fluid expanding within a respective isothermal expansion working-fluid-flow-channel portion, will have a relatively shorter flow path to a complementary isothermal contraction working-fluid-flow-channel portion, with respect to a desired direction of flow as compared to an alternate, and/or opposite, direction of flow. Such an asymmetry in the relative positions, separations, and/or distributions, of respective isothermal expansion working-fluid-flow-channel portions and isothermal contraction working-fluid-flow-channel portions will promote working-fluid flow in the direction affording the greatest proximity of a respective isothermal expansion working-fluid-flow-channel portion and a respective isothermal contraction working-fluid-flow-channel portion. In other words, working fluid heated and expanding within an isothermal expansion working-fluid-flow-channel portion will tend to flow in a direction which most quickly, and/or immediately, brings it to a corresponding, and/or complementary, isothermal contraction working-fluid-flow-channel portion.

Some embodiments of the present disclosure may utilize an initial forced rotation of an embodiment, and/or its working-fluid-flow channel, in order to establish what thereafter becomes a self-reinforcing direction of working fluid flow through the embodiment.

Some embodiments of the present disclosure may allow a flow of working fluid to be initiated, and thereafter maintained, in any, and/or either, available direction (e.g., clockwise or counterclockwise). It is possible that some of these embodiments may occasionally become stuck and unable to initiate a directional flow of working fluid, at least for a relatively short period of time.

The scope of the present disclosure includes embodiments which establish, and/or promote, a direction of working fluid flow, within their respective working-fluid-flow channels, through their incorporation, inclusion, and/or utilization, of fluid-flow channel features, including, but not limited to: diodic valves, orifice plates, constrictions, varying flow-normal cross-sectional areas and/or tapers, and/or varying separation distances between respective isothermal expansion, and isothermal contraction, working-fluid-flow-channel portions. The scope of the present disclosure includes embodiments which establish, and/or promote, a direction of working fluid flow, within their respective working-fluid-flow channels, through their utilization of an initial forced rotation. The scope of the present disclosure includes embodiments which establish, and/or promote, a direction of working fluid flow, by any and all structural designs, operational protocols, and/or impositions of external work on an embodiment and/or its working fluid. The scope of the present disclosure is not limited by the designs, structures, manners, methods, and/or operational protocols, by which an embodiment may establish, and/or promote, a direction of working fluid flow.

The scope of the present disclosure includes embodiments incorporating, including, comprising, and/or utilizing, working-fluid flow channels, and/or working-fluid flow paths, including, but not limited to, those of any shape (e.g., of a respective fluid-flow path and/or centerline), of any size (e.g., channel length, and/or flow path length), of any flow-normal cross-sectional area(s), as well as including, but not limited to, those that having fluid-flow paths that are circular, those that are elliptical, those that are hexagonal, those that are ellipsoidal (e.g., carrying working fluid out of, and/or not parallel to, the plane of rotation), and those that are spiral (e.g., about a respective axis of rotation).

The scope of the present disclosure includes embodiments incorporating, including, and/or utilizing, any number of fluidly separated, and/or fluidly independent, closed-cycle working-fluid-flow channels, and/or working-fluid-flow paths. The scope of the present disclosure includes embodiments incorporating, including, comprising, and/or utilizing, fluidly connected working-fluid-flow channels, and/or working-fluid-flow paths, which circle, and/or orbit, a respective rotational axis, one or more times in order to complete a closed-cycle flow circuit and return flowing working fluid to a respective starting point in a respective working-fluid flow channel, and/or working-fluid flow path.

The scope of the present disclosure includes embodiments incorporating, including, comprising, and/or utilizing, working-fluid flow channels, and/or working-fluid flow paths, which are centered about a respective axis of rotation, as well as those which are not centered about a respective axis of rotation (e.g., which are off-axis and/or precessional with respect to a respective embodiment's axis of rotation). The scope of the present disclosure includes embodiments incorporating, including, and/or utilizing, working-fluid-flow channels, and/or working-fluid-flow paths, which are located within a plane, as well as those which are not planar.

The scope of the present disclosure is not limited to the shape, extent, and/or complexity, of an embodiment's working-fluid-flow channel, and/or its working-fluid-flow path. The scope of the present disclosure includes embodiments incorporating, including, comprising, and/or utilizing, any and every variety of working-fluid-flow channel, and/or working-fluid-flow path.

Embodiments of the present disclosure can operate as heat engines, i.e., contributing, and/or imparting, torque and/or rotation (in a first rotational direction) to a rotational shaft, when subjected to heat and cold of appropriate temperatures (e.g., with respect to the chemical attributes of a respective working fluid). However, embodiments of the present disclosure can also operate as heat pumps, producing thermal differences when work is applied to the embodiment, e.g., by forcibly causing its rotation in a rotational direction opposite the first rotational direction. When operated as a heat pump, through a forced rotation of a respective shaft in a rotational direction opposite the first rotational direction, the isothermal expansion working-fluid-flow-channel portion of the heat engine is caused to become hot and the isothermal contraction working-fluid-flow-channel portion of the heat engine is caused to become cold. Heat-pump embodiments of the present disclosure can be used, and/or operated, to provide heat (e.g., in the winter), and cold (e.g., in the summer), and can be also be used as cryogenic coolers.

Each of the example embodiments herein illustrated and discussed can operate as both a heat engine and, when forcibly rotated, as a heat pump. Since the discussion of each illustrated embodiment's operation as a heat pump would be redundant and obvious to one skilled in the art, such discussions are not offered herein.

Some heat-engine embodiments of the present disclosure are bi-directional in that a reversal of hot and cold inputs can cause a second, and/or reversed, direction of rotation. Similarly, some heat-pump embodiments of the present disclosure are bi-directional in that a reversal of a forced rotation of a respective embodiment shaft can cause a reversed pattern of heating and cooling within the embodiment.

Embodiments of the present disclosure that are able to produce heat, and/or to heat their respective working fluids, electrically, e.g., via a Peltier thermoelectric heater/cooler and/or via an electrical resistor, and subsequently conduct, transmit, and/or transfer, a portion of that heat to a respective first working-fluid-flow-channel portion of a heat engine, and are able to discharge surplus, and/or waste, heat from a respective second working-fluid-flow-channel portion of the heat engine, can be made to rotate in a first direction as though heated by a more typical, e.g., external, non-electrical heat source. Furthermore, embodiments of the present disclosure that are properly, and/or appropriately, configured can, e.g., through an electrical heating of the second working-fluid-flow-channel portion of the heat engine, and a complementary cooling of the first working-fluid-flow-channel portion of the heat engine, then cause that embodiment to rotate in a second direction opposite the first direction.

The scope of the present disclosure includes embodiments which are able to heat their working fluid, within particular respective first working-fluid-flow-channel portions, with thermal energy produced by first electrical circuits, devices, components, and/or mechanisms, thereby causing a rotation of the respective embodiments in first directions of rotation. The scope of the present disclosure includes embodiments which are also able to heat their working fluid, within particular respective second working-fluid-flow-channel portions, which are different from the respective first working-fluid-flow-channel portions, with thermal energy produced by second electrical circuits, devices, components, and/or mechanisms, thereby causing a reversed rotation of the respective embodiments in second directions of rotation. The scope of the present disclosure includes embodiments which incorporate, include, and/or utilize, electrically powered heat producing circuits, devices, components, and/or mechanisms.

Thus, embodiments of the present disclosure can operate as "heat motors" when caused to rotate by electrically created heat, sometimes in conjunction with electrically created cold. By controlling, regulating, and/or adjusting, the electrical signal(s) transmitted to a properly configured heat-motor embodiment of the present disclosure, such a heat-motor embodiment can be caused to rotate, and/or to apply a torque to, a shaft, in a first rotational direction. Furthermore, by reversing the polarity, and/or voltage, of the electrical signal(s) so transmitted, a properly, and/or appropriately, configured heat-motor embodiment of the present disclosure can similarly be caused to rotate, and/or to apply a torque, to a shaft, in a second, and/or an opposite, direction. Thus, electrically heated, and electrically controlled, heat engines can operate as electrical motors, e.g., to rotate wheels and propellers. Such electrically controlled, heat engines, i.e., such heat motors, are able to manifest shaft torque, and shaft rotation, with a solid-state motor, i.e., lacking any moving parts other than the rotating embodiments themselves. Such solid-state motors may find utility in applications within harsh environments where typical electrical motors might fail.

The scope of the present disclosure includes embodiments which incorporate any number, i.e., one or more, potentially separate and/or independent heat engines, mounted, and/or affixed, to a shared rotational shaft, each contributing to the total torque imparted to the shared shaft in response to an appropriate warming and cooling of each such heat engine. The scope of the present disclosure includes embodiments which incorporate any number, i.e., one or more, potentially separate and/or independent heat motors, mounted, and/or affixed, to a shared rotational shaft, each contributing to the total torque imparted to the shared shaft in response to an appropriate electrically mediated, controlled, created, and/or caused, warming and cooling of each such heat motor. The scope of the present disclosure includes embodiments which incorporate any number, i.e., one or more, potentially separate and/or independent heat pumps, mounted, and/or affixed, to a shared rotational shaft, each contributing to the thermal difference manifested by the heat pump in response to an appropriate forced rotation of the shared rotational shaft.

The scope of the present disclosure is not limited by the number of fluidly isolated heat engines, or heat motors, contributing torque to a shared shaft; nor by the number of fluidly isolated heat pumps, sharing torque received from a shared shaft.

The scope of the present disclosure includes embodiments of heat engines, heat motors, and/or heat pumps, which are designed to operate, and/or are operated, at any rate of rotational speed, e.g., at any RPM. The scope of the present disclosure includes embodiments of heat engines, and/or heat motors, designed to create, and/or which do create when operated, any degree of respective shaft torque and/or rotational speed. The scope of the present disclosure includes embodiments of heat pumps designed to create thermal differences (i.e., to heat and cool), and/or which do create thermal differences when operated, of any respective hot and cold temperatures.

The scope of the present disclosure includes embodiments of heat engines, heat motors, and/or heat pumps, which incorporate, include, and/or utilize, brakes, the activation of which enable operators, and/or automated systems, to reduce, regulate, control, and/or adjust, a respective speed of rotation, e.g., RPM, of a respective heat engine, heat motor, and/or heat pump. The inclusion, and/or addition, of brakes to embodiments of the present disclosure will be obvious to those skilled in the art.

The scope of the present disclosure includes embodiments which incorporate, include, and/or utilize, rotational shafts, and which are attached, affixed, and/or connected, to those rotational shafts. However, the scope of the present disclosure also includes embodiments which are not attached, or otherwise connected, to rotational shafts. For example, a heat engine of the present disclosure might incorporate, include, comprise, and/or utilize, a solar heater (which provides heat to a working fluid of the heat engine) and float in a body of water (which provides cold and receives heat from a working fluid of the heat engine), and its rotations might provide a useful mechanical work, such as providing an aesthetically pleasing visual effect, and/or providing shipping lane information to transiting ships.

The scope of the present disclosure includes embodiments of heat engines, heat motors, and/or heat pumps, which incorporate, include, comprise, and/or utilize, externallyaccessible valves which permit an addition, removal, and/or alteration, of the respective working fluid(s) therein, including, but not limited to, an alteration of the type, and/or pressure, of a respective working fluid therein.

The scope of the present disclosure includes embodiments of heat engines, heat motors, and/or heat pumps, which incorporate, include, comprise, and/or utilize, rigid fluid channel walls, as well as those which incorporate, include, comprise, and/or utilize, flexible fluid channel walls. An embodiment incorporating, including, comprising, and/or utilizing, flexible fluid channel walls might, after the addition, introduction, and/or infusion, of an appropriate working fluid, at an appropriate pressure, possess semi-rigid fluid channel walls, e.g., like the wall of a basketball or the wall of an automobile tire. Such embodiments might be relatively easier to store and transport, while still providing the operational benefits of a fully rigid embodiment (with respect to certain applications). However, one might expect that with respect to most applications, rigid fluid channel walls would be preferred, especially if a working fluid is potentially flammable, and/or under significant pressure, while with respect to other, less-common applications, flexible fluid channel walls might offer advantages over rigid fluid channel walls.

Embodiments of the present disclosure operating as heat engines may be used for applications including, but not limited to: driving generators to produce electrical power from external sources of thermal energy, e.g., from concentrated solar energy, from geothermal energy, and from industrial waste heat (e.g., for cogeneration). Many of the embodiments (e.g., heat engine embodiments) illustrated and discussed herein are configured to energize generators for the purpose of converting a thermal-difference potential energies into electrical energies. However, while many, if not all, embodiments of the present disclosure may be adapted to convert a thermal energy into an electrical energy, e.g., through the operable connection of a generator, many, if not all, embodiments of the present disclosure may also be adapted for other applications, purposes, and/or types of energy conversion. For example, some embodiments may be configured to convert thermal energies to mechanical rotations of propellers, signs, antennas, etc. The scope of the present disclosure is not limited by the adaptation, configuration, and/or application, to which the torque produced by a heat-engine embodiment hereof is applied. And heat-engine embodiments manifesting, and/or designed to manifest, any adaptation, configuration, and/or application, of the torque produced by such heat-engine embodiments, in response to an embodiment-appropriate thermal difference, is included within the scope of the present disclosure.

Embodiments of the present disclosure operating as heat motors may be used for applications including, but not limited to: a reversible rotation of wheels and propellers, especially in harsh environments (e.g., on Mars), and satellite reaction wheels.

Embodiments of the present disclosure operating as heat pumps may be used for applications including, but not limited to: condensing fresh water from the atmosphere when rotated by wind turbines, and cooling homes and office buildings.

Embodiments of the present disclosure may vary with respect to the application, mechanism, machine, process, device, and/or purpose, to which the mechanical energy, or the heat pumping, they produce is applied. The scope of the present disclosure includes all applications to which embodiments of the present disclosure can, and/or might, be applied.

Included within the present disclosure are:

1. A closed-cycle thermal-to-mechanical energy conversion apparatus, comprising: a fluid-flow channel adapted to contain a working fluid, said fluid-flow channel having a closed-curve centerline axis of a channel length, and having an axis of rotation; said fluid-flow channel having a first channel sector having a first channel sector inlet and a first channel sector outlet; said fluid-flow channel having a second channel sector having a second channel sector inlet and a second channel sector outlet, wherein the first and second channel sectors do not overlap; a heat-receiving thermal conductor thermally connected to an interior of the first channel sector; a heat-absorbing thermal conductor thermally connected to an interior of the second channel sector; a working fluid contained within the fluid-flow channel; wherein the working fluid expands within the first channel sector when the heat-receiving thermal conductor is configured to have a first temperature; wherein the working fluid contracts within the second channel sector when the heat-absorbing thermal conductor is configured to have a second temperature, the second temperature being lower than the first temperature; wherein the expansion of working fluid within the first channel sector, and the contraction of working fluid within the second channel sector, causes the working fluid to flow through the fluid-flow channel in a first direction about the axis of rotation; wherein the flow of working fluid within the fluid-flow channel in a first direction about the axis of rotation causes the fluid-flow channel to rotate about the axis of rotation in a second direction opposite the first direction.
2. The closed-cycle thermal-to-mechanical energy conversion apparatus of 1, wherein said fluid-flow channel has a third channel sector having a third channel sector inlet and a third channel sector outlet, wherein the first, second, and third channel sectors do not overlap; wherein the working fluid expanded within the first channel sector thereafter continues expanding adiabatically as the working fluid flows through the third channel sector.
3. The closed-cycle thermal-to-mechanical energy conversion apparatus of 1, wherein said fluid-flow channel has a third channel sector having a third channel sector inlet and a third channel sector outlet, wherein the first, second, and third channel sectors do not overlap; wherein the working fluid contracted within the second channel sector thereafter continues contracting adiabatically as the working fluid flows through the third channel sector.
4. The closed-cycle thermal-to-mechanical energy conversion apparatus of 1, wherein said fluid-flow channel has third and fourth channel sectors having respective third and fourth channel sector inlets and respective third and fourth channel sector outlets, wherein the first, second, third, and fourth, channel sectors do not overlap; wherein the working fluid expanded within the first channel sector thereafter continues expanding adiabatically as the working fluid flows through the third channel sector, and wherein the working fluid contracted within the second channel sector thereafter continues contracting adiabatically as the working fluid flows through the fourth channel sector.
5. The closed-cycle thermal-to-mechanical energy conversion apparatus of 1, wherein the sector length of the first channel sector is one of three-quarters the channel length of the fluid-flow channel, one-half the channel length of the fluid-flow channel, one-third the channel length of the fluid-flow channel, and one-quarter the channel length of the fluid-flow channel.

6. The closed-cycle thermal-to-mechanical energy conversion apparatus of 1, wherein the sector length of the second channel sector is one of three-quarters the channel length of the fluid-flow channel, one-half the channel length of the fluid-flow channel, one-third the channel length of the fluid-flow channel, and one-quarter the channel length of the fluid-flow channel.
7. The closed-cycle thermal-to-mechanical energy conversion apparatus of 4, wherein the sector length of the third channel sector is one of three-quarters the channel length of the fluid-flow channel, one-half the channel length of the fluid-flow channel, one-third the channel length of the fluid-flow channel, and one-quarter the channel length of the fluid-flow channel.
8. The closed-cycle thermal-to-mechanical energy conversion apparatus of 4, wherein the sector length of the fourth channel sector is one of three-quarters the channel length of the fluid-flow channel, one-half the channel length of the fluid-flow channel, one-third the channel length of the fluid-flow channel, and one-quarter the channel length of the fluid-flow channel.
9. The closed-cycle thermal-to-mechanical energy conversion apparatus of 1, wherein the first channel sector outlet has approximately the same flow-normal cross-sectional area as does the first channel sector inlet.
10. The closed-cycle thermal-to-mechanical energy conversion apparatus of 1, wherein the first channel sector outlet has a greater flow-normal cross-sectional area than does the first channel sector inlet.
11. The closed-cycle thermal-to-mechanical energy conversion apparatus of 1, wherein the second channel sector outlet has approximately the same flow-normal cross-sectional area as does the second channel sector inlet.
12. The closed-cycle thermal-to-mechanical energy conversion apparatus of 1, wherein the second channel sector outlet has a lesser flow-normal cross-sectional area than does the second channel sector inlet.
13. The closed-cycle thermal-to-mechanical energy conversion apparatus of 1, wherein the heat-receiving thermal conductor is thermally connected to a source of thermal energy external to the apparatus.
14. The closed-cycle thermal-to-mechanical energy conversion apparatus of 13, wherein the external source of thermal energy is one of a geothermal heat, a heat of chemical combustion, a concentrated solar energy, a warm surface-water ocean thermal energy, a waste heat of an industrial process, a waste heat of an ICH engine, and a radioactive-decay heat.
15. The closed-cycle thermal-to-mechanical energy conversion apparatus of 1, wherein the heat-receiving thermal conductor is thermally connected to a source of thermal energy internal within the apparatus.
16. The closed-cycle thermal-to-mechanical energy conversion apparatus of 15, wherein the internal source of thermal energy is one of a heat of a chemical reaction, and a radioactive-decay heat.
17. The closed-cycle thermal-to-mechanical energy conversion apparatus of 1, wherein the heat-absorbing thermal conductor is thermally connected to a thermal sink external to the apparatus.
18. The closed-cycle thermal-to-mechanical energy conversion apparatus of 17, wherein the external thermal sink is one of a liquid, a gas, a solid, a body of water, an atmospheric air, a metal framework with a large heat capacity, a cool deep-water ocean thermal sink, a portion of a crust at a shallow depth beneath a surface of the Earth, and a vacuum of space.
19. The closed-cycle thermal-to-mechanical energy conversion apparatus of 1, wherein the working fluid is one of butane, ammonia, water, air, helium, hydrogen, nitrogen, carbon dioxide, alcohol, mercury, neon, argon, and oxygen.
20. The closed-cycle thermal-to-mechanical energy conversion apparatus of 1, wherein the first temperature is greater than or equal to a threshold high temperature.
21. The closed-cycle thermal-to-mechanical energy conversion apparatus of 20, wherein the threshold high temperature is one of 0 degrees Celsius, 10 degrees Celsius, 20 degrees Celsius, 60 degrees Celsius, 100 degrees Celsius, 200 degrees Celsius, 400 degrees Celsius, 600 degrees Celsius, and 800 degrees Celsius.
22. The closed-cycle thermal-to-mechanical energy conversion apparatus of 1, wherein the second temperature is less than or equal to a threshold low temperature.
23. The closed-cycle thermal-to-mechanical energy conversion apparatus of 22, wherein the threshold low temperature is one of 200 degrees Celsius, 100 degrees Celsius, 60 degrees Celsius, 40 degrees Celsius, 20 degrees Celsius, 10 degrees Celsius, 0 degrees Celsius, −10 degrees Celsius, −20 degrees Celsius, −40 degrees Celsius, −80 degrees Celsius, −100 degrees Celsius, −150 degrees Celsius, and −200 degrees Celsius.

Included within the present disclosure are:

24. A mechanical-to-thermal energy conversion apparatus, comprising: a fluid-flow channel adapted to contain a working fluid, said fluid-flow channel having a closed-curve centerline axis of a channel length, and having rotational shaft; said fluid-flow channel having a first channel sector having a first channel sector inlet and a first channel sector outlet; said fluid-flow channel having a second channel sector having a second channel sector inlet and a second channel sector outlet, wherein the first and second channel sectors do not overlap; a heat-transmitting thermal conductor thermally connected to an interior of the first channel sector; a heat-receiving thermal conductor thermally connected to an interior of the second channel sector; a working fluid contained within the fluid-flow channel; wherein the working fluid is compressed within the first channel sector, and raised to a first temperature, when the rotational shaft is rotated in a first rotational direction at a rotational speed; wherein the working fluid expands within the second channel sector, and falls to a second temperature, when the rotational shaft is rotated in the first rotational direction at the rotational speed, the second temperature being lower than the first temperature; wherein rotation of the rotational shaft in the first rotational direction at the rotational speed, causes the working fluid to flow through the fluid-flow channel in a second rotational direction, opposite the first rotational direction.
25. The closed-cycle thermal-to-mechanical energy conversion apparatus of 24, wherein the heat-transmitting thermal conductor is thermally connected to a thermal sink external to the apparatus.
26. The closed-cycle thermal-to-mechanical energy conversion apparatus of 1, wherein the heat-receiving thermal conductor is thermally connected to a thermal source external to the apparatus.

27. The closed-cycle thermal-to-mechanical energy conversion apparatus of 24, wherein the working fluid is one of butane, ammonia, water, air, helium, hydrogen, nitrogen, carbon dioxide, alcohol, mercury, neon, argon, and oxygen.

Included within the present disclosure are:

28. A closed-cycle thermal-to-mechanical energy conversion apparatus, comprising: a fluid-flow channel adapted to contain a working fluid, said fluid-flow channel having a closed-curve centerline axis of a channel length, and having an axis of rotation; said fluid-flow channel having a first channel sector; said fluid-flow channel having a second channel sector, wherein the first and second channel sectors do not overlap; a first electrically energized working-fluid heater thermally connected to an interior of the first channel sector; a first thermal sink thermally connected to an interior of the second channel sector; a working fluid contained within the fluid-flow channel; wherein the working fluid expands within the first channel sector when the first working-fluid heater is energized; wherein the expansion of working fluid within the first channel sector causes the working fluid to flow through the fluid-flow channel in a first direction about the axis of rotation; wherein the flow of working fluid within the fluid-flow channel in a first direction about the axis of rotation causes the fluid-flow channel to rotate about the axis of rotation in a second direction opposite the first direction.

29. The closed-cycle thermal-to-mechanical energy conversion apparatus of 28, further comprising a rotational shaft rigidly connected to the apparatus.

30. The closed-cycle thermal-to-mechanical energy conversion apparatus of 28, wherein the first working-fluid heater is one of an electrical resistor, and a Peltier thermoelectric heater.

31. The closed-cycle thermal-to-mechanical energy conversion apparatus of 28, wherein the first thermal sink is a Peltier thermoelectric cooler.

32. The closed-cycle thermal-to-mechanical energy conversion apparatus of 28, further comprising a second electrically energized working-fluid heater thermally connected to an interior of the second channel sector, and a second thermal sink thermally connected to an interior of the first channel sector.

33. The closed-cycle thermal-to-mechanical energy conversion apparatus of 32, wherein the second working-fluid heater is one of an electrical resistor, and a Peltier thermoelectric heater.

34. The closed-cycle thermal-to-mechanical energy conversion apparatus of 32, wherein the second thermal sink is a Peltier thermoelectric cooler.

35. The closed-cycle thermal-to-mechanical energy conversion apparatus of 32, wherein the working fluid expands within the second channel sector when the second working-fluid heater is energized, and wherein the expansion of working fluid within the second channel sector causes the working fluid to flow through the fluid-flow channel in a second direction about the axis of rotation, the second direction being opposite the first direction; wherein the flow of working fluid within the fluid-flow channel in the second direction about the axis of rotation causes the fluid-flow channel to rotate about the axis of rotation in the first direction opposite the second direction Included within the present disclosure are:

36. A heat engine, comprising: a working fluid; a diodic tube forming a closed-loop working-fluid-flow circuit into which the working fluid is sealed and through which the working fluid may flow freely; wherein a first portion of the tube is adapted to thermally connect the working fluid within that first portion of the tube to a first temperature; and, wherein a second portion of the tube is adapted to thermally connect the working fluid within that second portion of the tube to a second temperature, not equal to the first temperature.

37. The heat engine of claim 36, further comprising a third portion of the tube thermally insulated so as to prevent a conduction of thermal energy to or from the working fluid within that third portion of the tube.

38. The heat engine of claim 36, further comprising third and fourth portions of the tube thermally insulated so as to prevent a conduction of thermal energy to or from the working fluid within those third and fourth tube portions, positioned on opposite sides of the first tube portion, and positioned on opposite sides of the second tube portion.

39. The heat engine of claim 36 wherein the diodic tube comprises a constriction which regulates a direction of working-fluid flow through the diodic tube.

40. The heat engine of claim 36 wherein the diodic tube further comprises a diodic valve fixedly attached to an interior of the diodic tube and regulating a direction of working-fluid flow through the diodic tube.

41. The heat engine of claim 36 further comprising a shaft having a longitudinal axis of symmetry that passes through the closed-loop working-fluid-flow circuit.

42. The heat engine of claim 41 wherein the tube is an annular tube having an axis of radial symmetry that is coaxial with the longitudinal axis of symmetry of the shaft.

43. The heat engine of claim 36 wherein the first temperature is greater than the second temperature and the heat engine manifests a torque in a first rotational direction.

44. The heat engine of claim 36 wherein the first temperature is lesser than the second temperature and the heat engine manifests a torque in a second rotational direction that is opposite the first rotational direction.

45. The heat engine of claim 36 further comprising a thermally conductive plate, adapted to reach the first temperature, said plate being thermally connected to the first portion of the tube.

46. The heat engine of claim 36 further comprising a thermally conductive plate, adapted to reach the second temperature, said plate being thermally connected to the second portion of the tube.

47. The heat engine of claim 36 further comprising two thermally conductive plates, a first of the two thermally conductive plates adapted to reach the first temperature, said first plate being thermally connected to the first portion of the tube, and a second of the two thermally conductive plates adapted to reach the second temperature, said second plate being thermally connected to the second portion of the tube.

48. The heat engine of claim 36 further comprising a source of thermal energy of at least the first temperature, said source of thermal energy being thermally connected to the first portion of the tube.

49. The heat engine of claim 48 wherein the source of thermal energy is one of a radioactive material, an electromagnetically radiating body, steam, an industrial process, an exothermic chemical reaction, and an electrical heater.

50. The heat engine of claim 36 further comprising a thermal sink of no less than the second temperature, said thermal sink being thermally connected to the second portion of the tube.

51. The heat engine of claim 50 wherein the thermal sink is one of a body of water, a gas, the atmosphere, a receiver of infrared electromagnetic radiation, and a cool portion of the Earth's crust.

52. The heat engine of claim 36 further comprising a thermally conductive structure thermally connected to one of the first and second portions of the tube.

53. The heat engine of claim 36 wherein a portion of the diodic tube comprises a plurality of parallel tubes.

54. The heat engine of claim 36 further comprising a second working fluid and a second diodic tube into which the second working fluid is sealed, said second diodic tube being fluidly-isolated from the first diodic tube, said second diodic tube forming a second closed-loop working-fluid-flow circuit through which the second working fluid may flow freely.

55. The heat engine of claim 54 further comprising a third working fluid and a third diodic tube into which the third working fluid is sealed, said third diodic tube being fluidly-isolated from the first and second diodic tubes, said third diodic tube forming a third closed-loop working-fluid-flow circuit through which the third working fluid may flow freely.

56. The heat engine of claim 36 further comprising a generator to which the diodic tube is operably connected and adapted to produce an electrical power in response to a rotation of the diodic tube.

57. The heat engine of claim 36 further comprising thermally-conductive radial fins within one of the first and second portions of the tube wherein the radial fins are adapted to increase the rate at which a thermal energy of the working fluid changes.

Included within the present disclosure are:

58. A heat engine, comprising: a rotational shaft having a longitudinal axis of radial symmetry; a hermetically sealed cylindrical chamber fixedly attached to the rotational shaft and sharing the shaft's axis of radial symmetry; a thermally non-conductive annular disk fixedly attached to an interior of the cylindrical chamber and sharing the cylindrical-chamber's axis of radial symmetry, said annular disk dividing an interior of the cylindrical chamber into upper and lower cylindrical chambers, said annular disk being separated from a radially innermost wall of the cylindrical chamber by an innermost annular gap, and being separated from a radially outermost wall of the cylindrical chamber ay an outermost annular gap, said innermost and outermost annular gaps providing fluid communication between the upper and lower cylindrical chambers; one or more channel walls fixedly attached to an upper surface of the annular disk and to a lower surface of an upper wall of the cylindrical chamber and radiating outward in a spiral fashion, said outward spiral having a first rotational direction about the rotational shaft, said one or more channel walls extending from the edge of the innermost annular gap to the edge of the outermost annular gap, thereby creating one or more upper spiral channels; one or more channel walls fixedly attached to a lower surface of the annular disk and to an upper surface of a lower wall of the cylindrical chamber and radiating inward in a spiral fashion, said inward spiral having the first rotational direction about the rotational shaft, said one or more channel walls extending from the edge of the outermost annular gap to the edge of the innermost annular gap, thereby creating one or more lower spiral channels; a working fluid sealed within the cylindrical chamber; wherein a radially innermost annular hot-expansion portion of the upper wall of the cylindrical chamber is adapted to thermally connect the working fluid within the one or more spiral channels thereunder to a high temperature; wherein a radially outermost annular adiabatic-expansion portion of the upper wall of the cylindrical chamber is adapted to thermally isolate the working fluid within the one or more spiral channels thereunder; wherein the radially outermost side wall of the cylindrical chamber is adapted to thermally isolate the working fluid flowing longitudinally from the one or more radially distal ends of the one or more upper spiral channels to the one or more radially distal ends of the one or more lower spiral channels; wherein a radially outermost annular cold-contraction portion of the lower wall of the cylindrical chamber is adapted to thermally connect the working fluid within the one or more spiral channels thereabove to a low temperature; wherein a radially innermost annular adiabatic-compression portion of the lower wall of the cylindrical chamber is adapted to thermally isolate the working fluid within the one or more spiral channels thereabove; and, wherein the radially innermost side wall of the cylindrical chamber is adapted to thermally isolate the working fluid flowing longitudinally from the one or more radially proximal ends of the one or more lower spiral channels to the one or more radially proximal ends of the one or more upper spiral channels.

59. The heat engine of claim 58 wherein the one or more upper spiral channels is one upper spiral channel, and the one or more lower spiral channels is one lower spiral channel.

60. The heat engine of claim 58 wherein the one or more upper spiral channels is a plurality of upper spiral channels, and the one or more lower spiral channels is a plurality of lower spiral channels.

Included within the present disclosure are:

61. A reversible motor, comprising: a rotational shaft having a longitudinal axis of radial symmetry; a hermetically sealed cylindrical chamber fixedly attached to the rotational shaft and sharing the shaft's axis of radial symmetry; a thermally non-conductive disk fixedly attached to an interior of the cylindrical chamber, dividing an interior thereof into upper and lower cylindrical chambers, said disk oriented at an oblique angle such that the disk's axis of radial symmetry is not coaxial with the cylindrical chamber's axis of radial symmetry; an upper working fluid sealed within the upper cylindrical chamber; a lower working fluid sealed within the lower cylindrical chamber; first and second upper electrical heaters within the upper cylindrical chamber and positioned at radially opposite sides of the rotational shaft; and, first and second lower electrical heaters within the lower cylindrical chamber and vertically aligned with the first and second upper electrical heaters.

62. The reversible motor of claim 61 further comprising first and second commutators electrically connected to the first upper and second lower electrical heaters; and, third and fourth commutators electrically connected to the second upper and first lower electrical heaters.

63. The reversible motor of claim 62, wherein second and third commutators are the same commutator.

64. The reversible motor of claim 61 wherein the application of an electrical power to the first upper and second lower electrical heaters causes the rotational shaft to rotate in a first rotational direction.

65. The reversible motor of claim 61 wherein the application of an electrical power to the second upper and first lower electrical heaters causes the rotational shaft to rotate in a second rotational direction opposite the first rotational direction.

66. The reversible motor of claim 61 wherein the electrical heaters are Peltier thermoelectric heaters/coolers.

67. The reversible motor of claim 61 wherein the electrical heaters are electrical resistive heaters.

BRIEF DESCRIPTION OF THE DRAWINGS

FIG. 120 shows a side sectional view of the tenth embodiment of the present invention;

FIG. 121 shows a perspective side sectional view of the tenth embodiment of the present invention;

FIG. 122 shows a perspective top-down sectional view of the tenth embodiment of the present invention;

FIG. 123 shows a perspective bottom-up sectional view of the tenth embodiment of the present invention;

FIG. 124 shows a perspective side view of an eleventh embodiment of the present invention;

FIG. 125 shows a side view of the eleventh embodiment of the present invention;

FIG. 126 shows a side view of the eleventh embodiment of the present invention;

FIG. 127 shows a side view of the eleventh embodiment of the present invention;

FIG. 128 shows a side view of the eleventh embodiment of the present invention;

FIG. 129 shows a top-down view of the eleventh embodiment of the present invention;

FIG. 130 shows a bottom-up view of the eleventh embodiment of the present invention;

FIG. 131 shows a side sectional view of the eleventh embodiment of the present invention;

Figure 132:
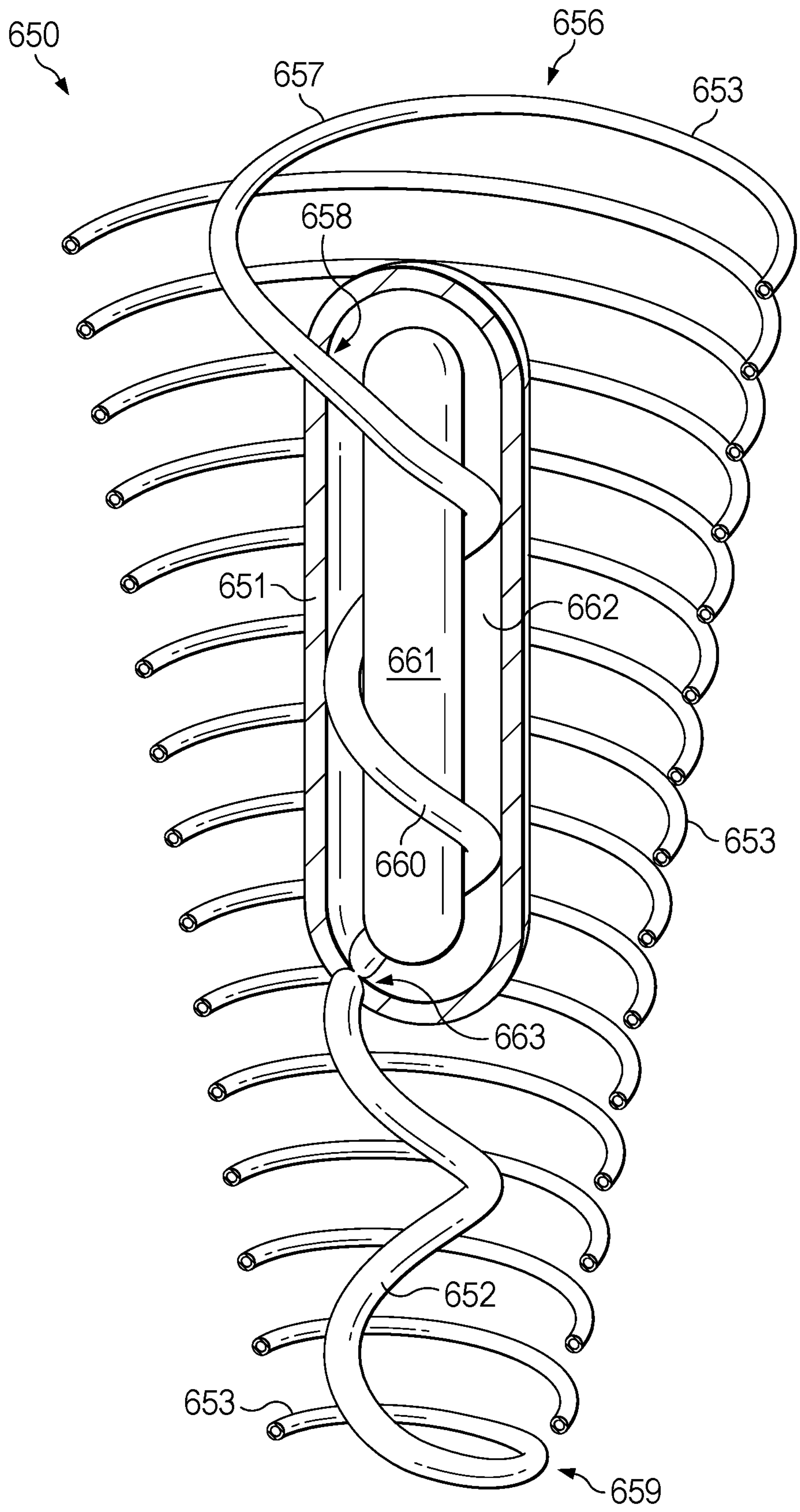
Figure 133:
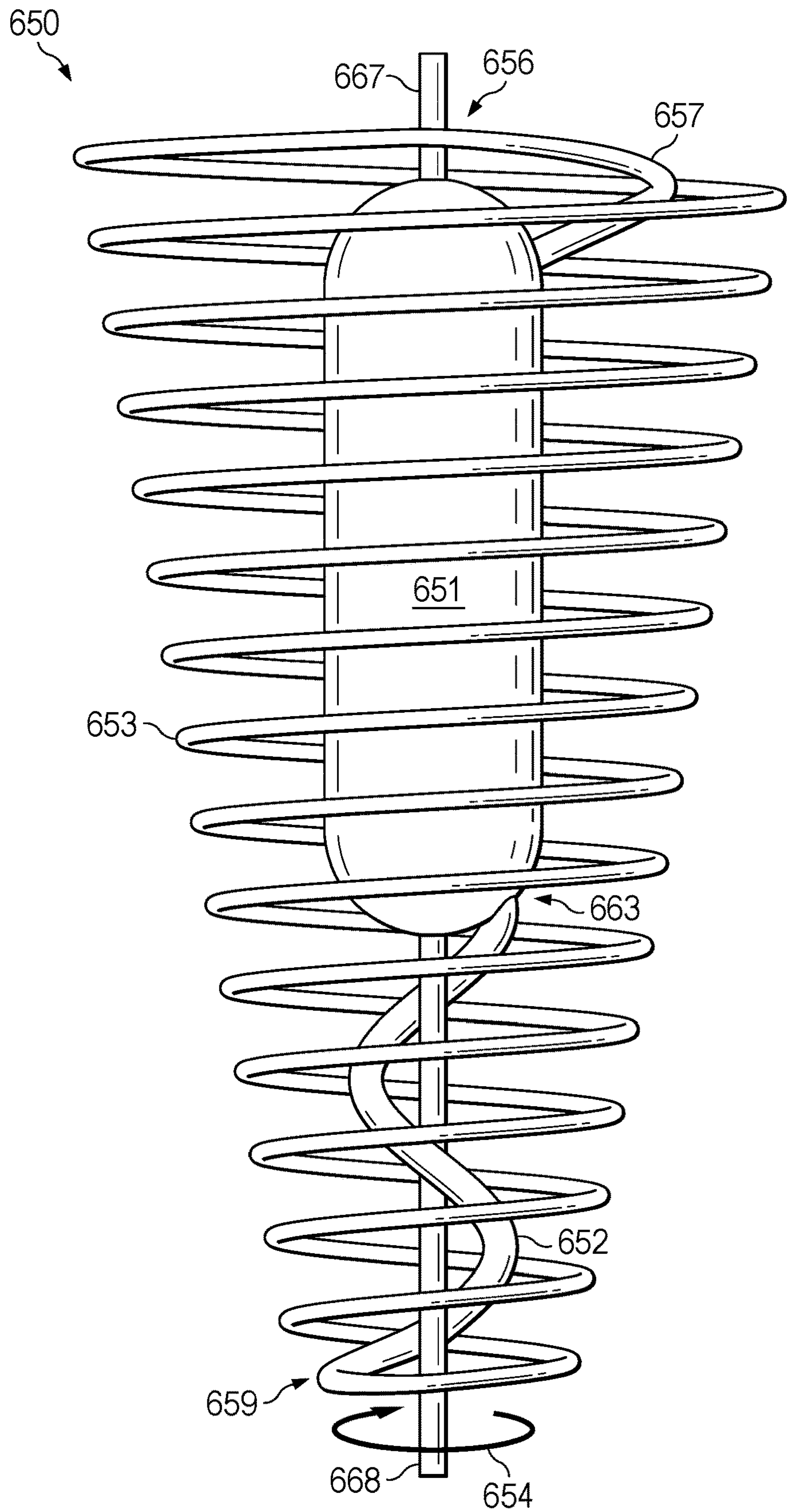
Figure 134:
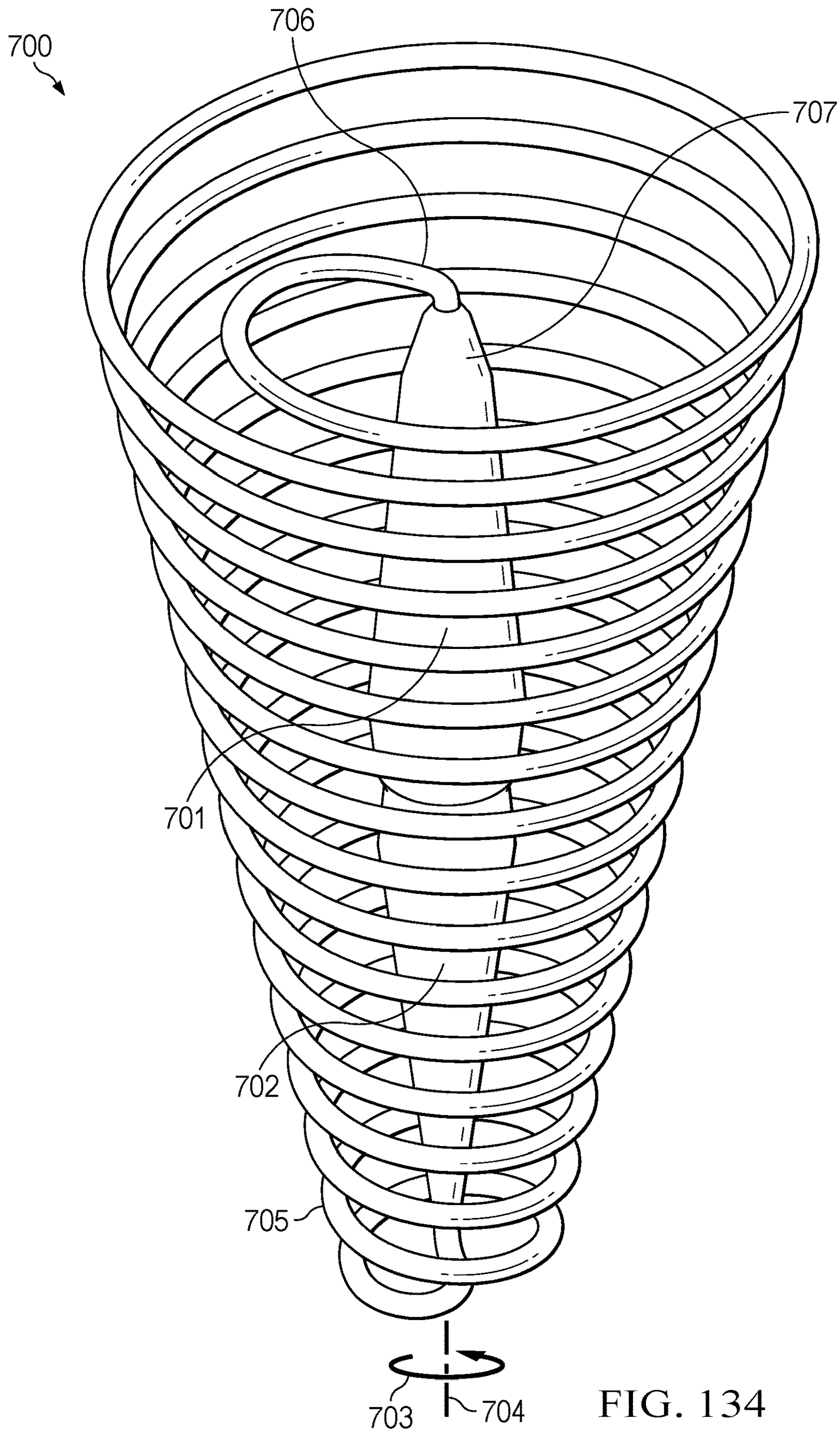
Figure 135:
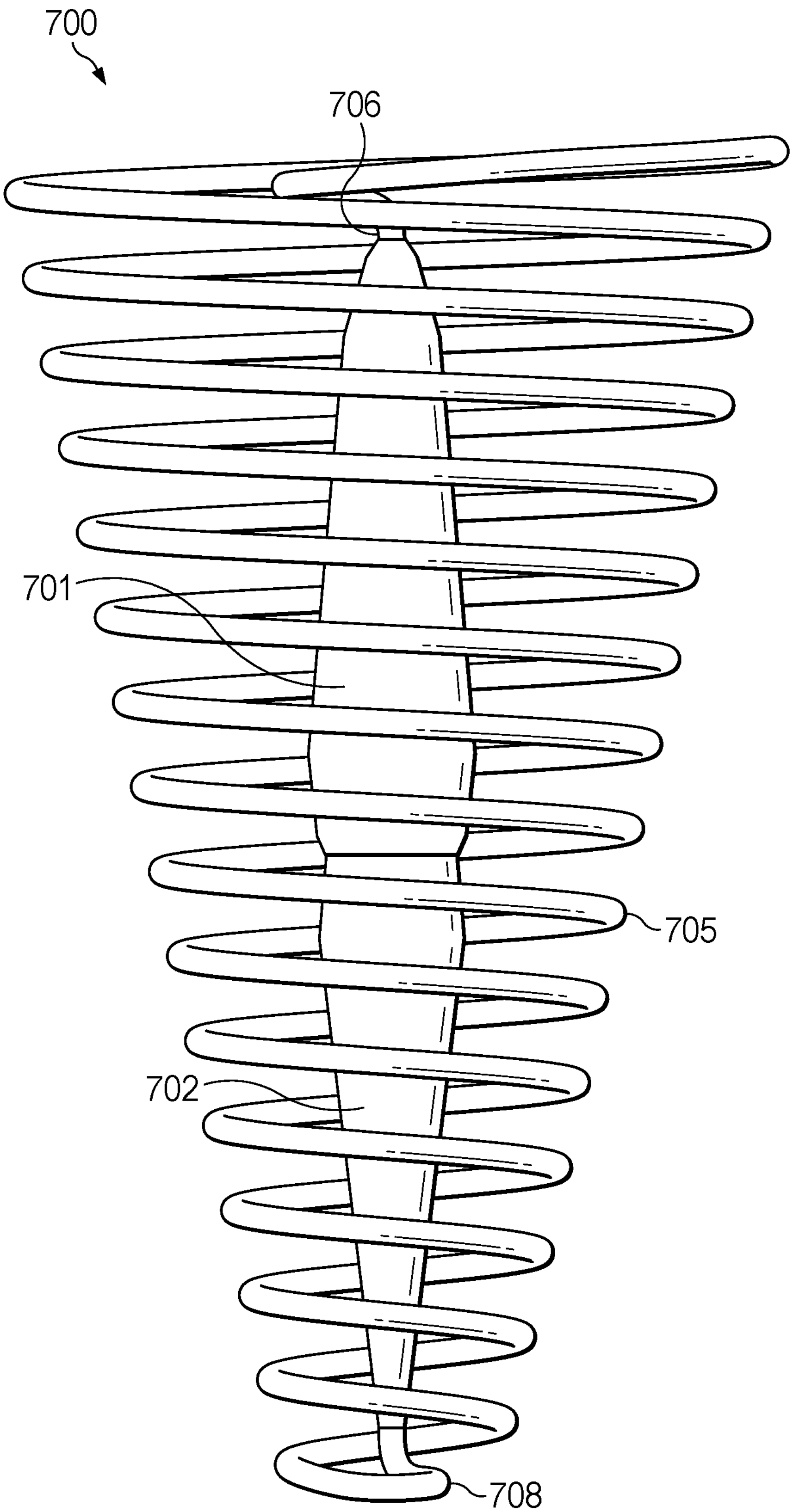
Figure 136:
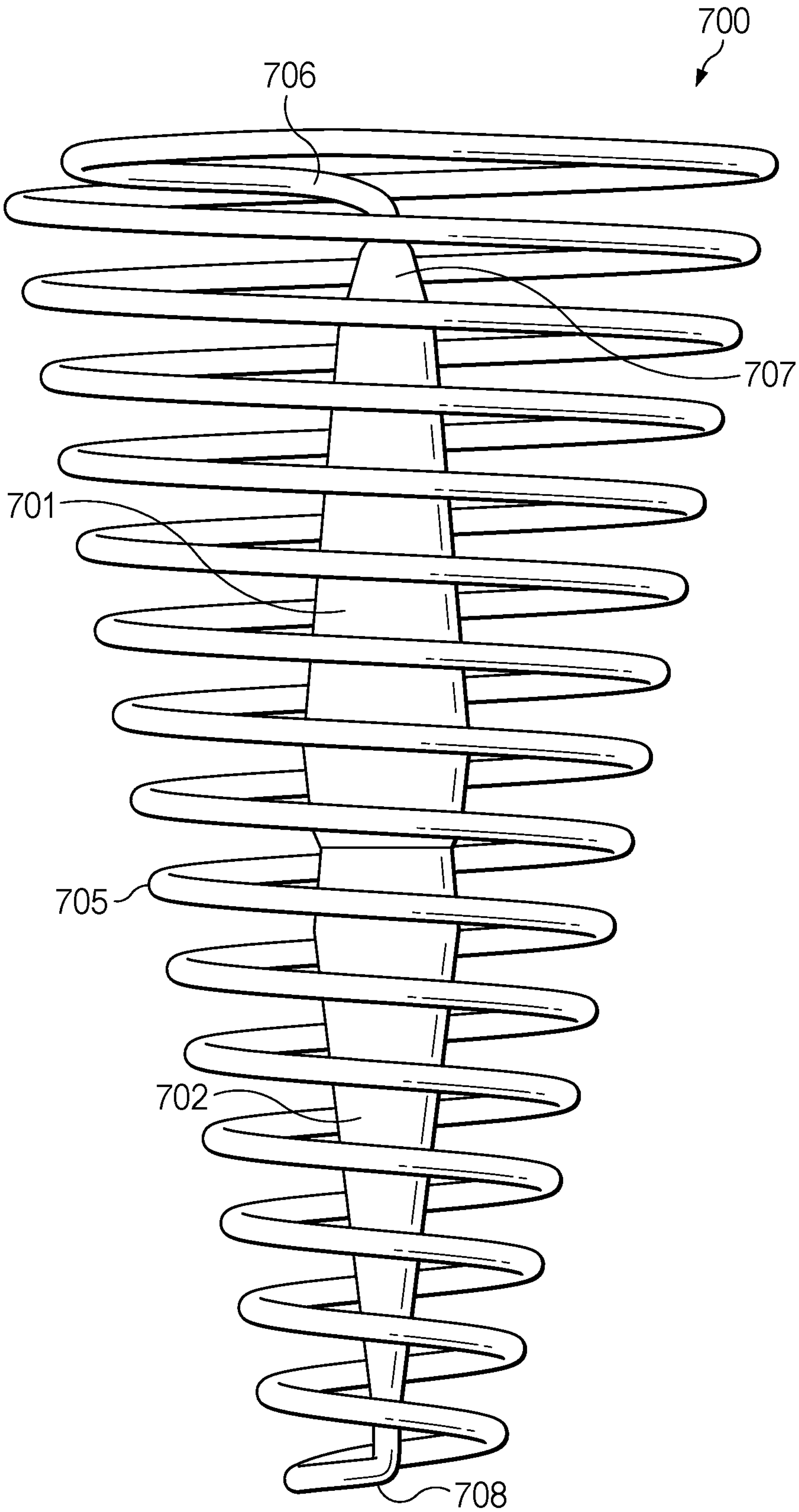
Figure 137:
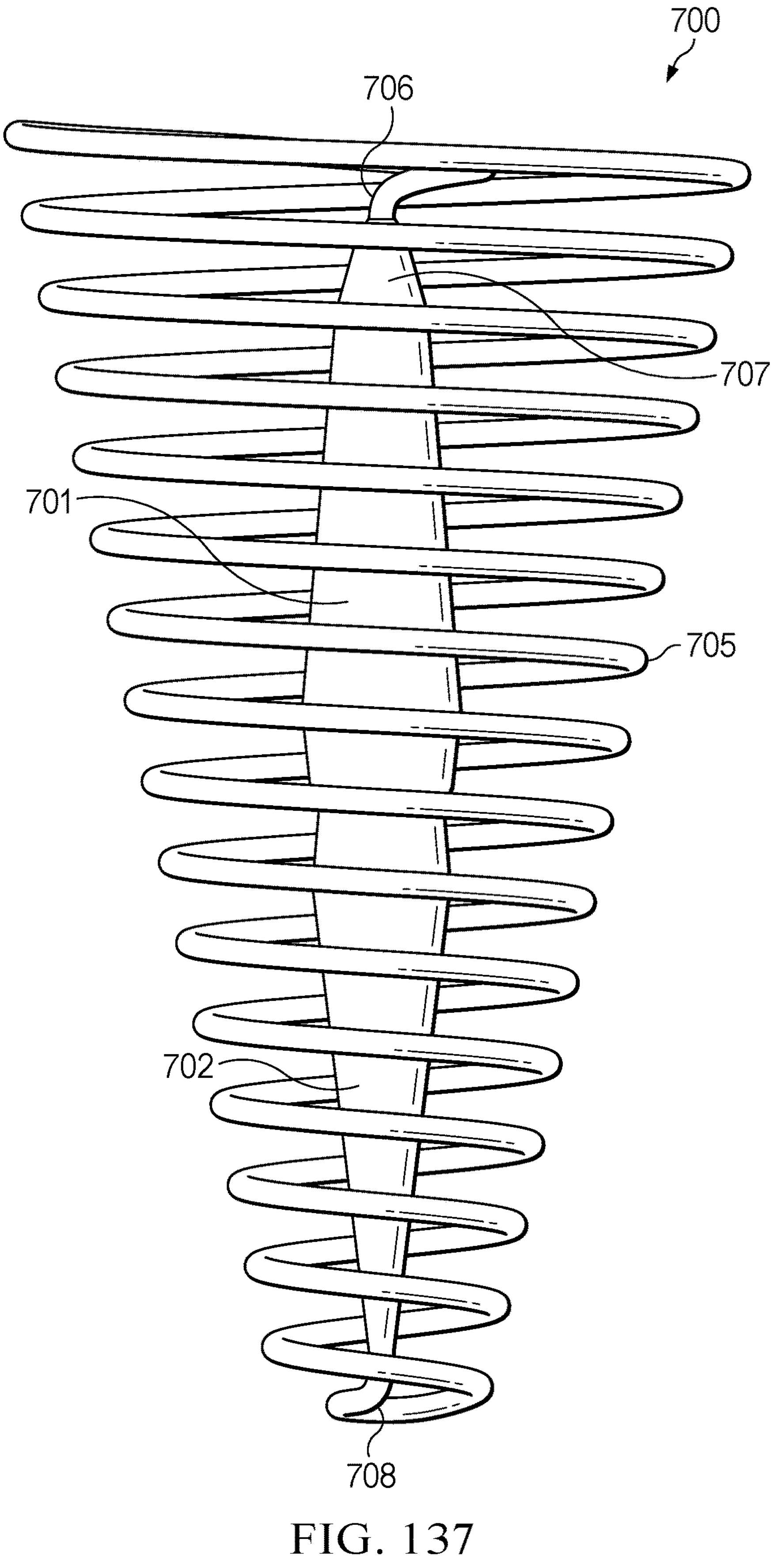
Figure 138:
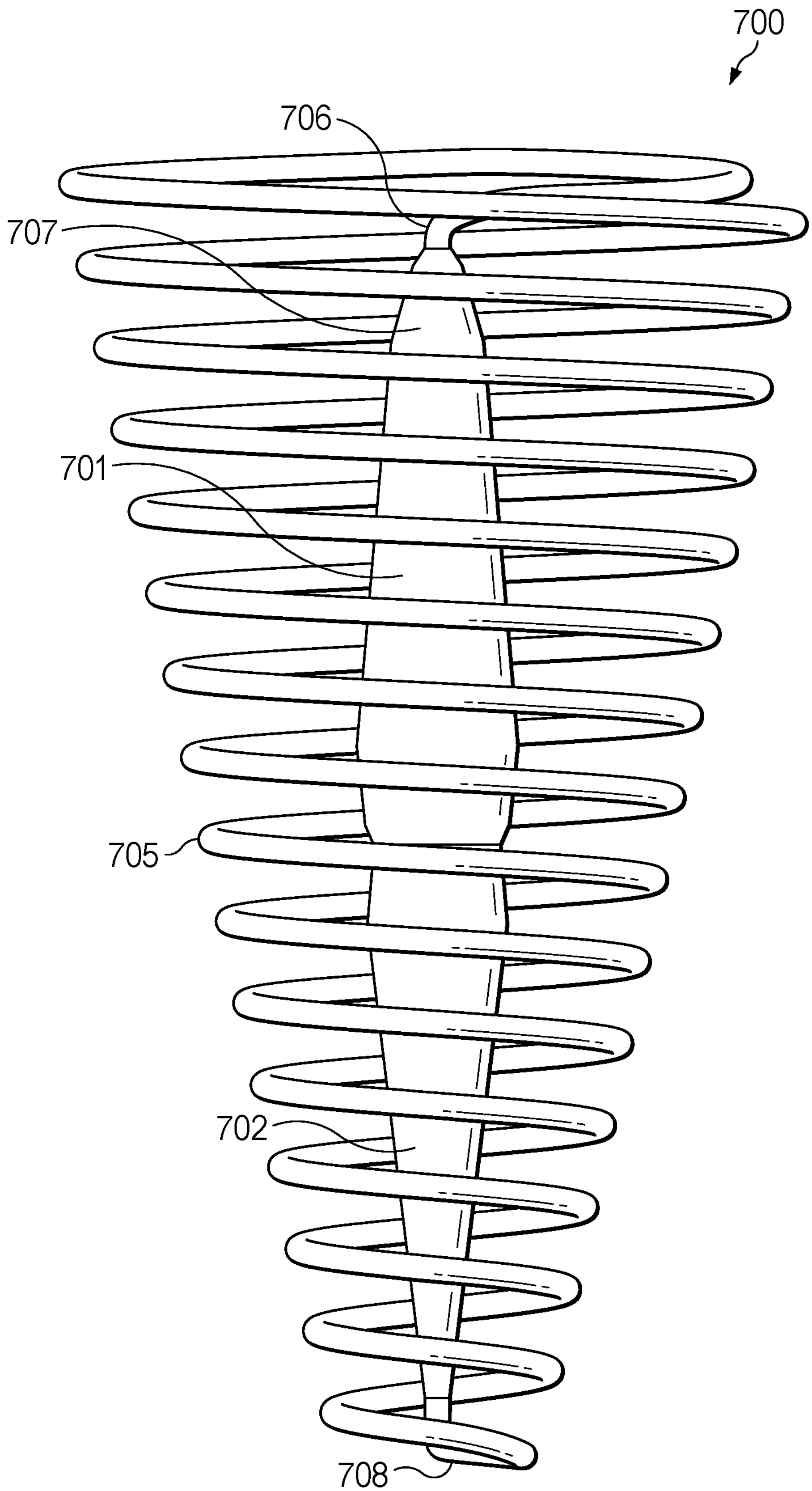
Figure 139:
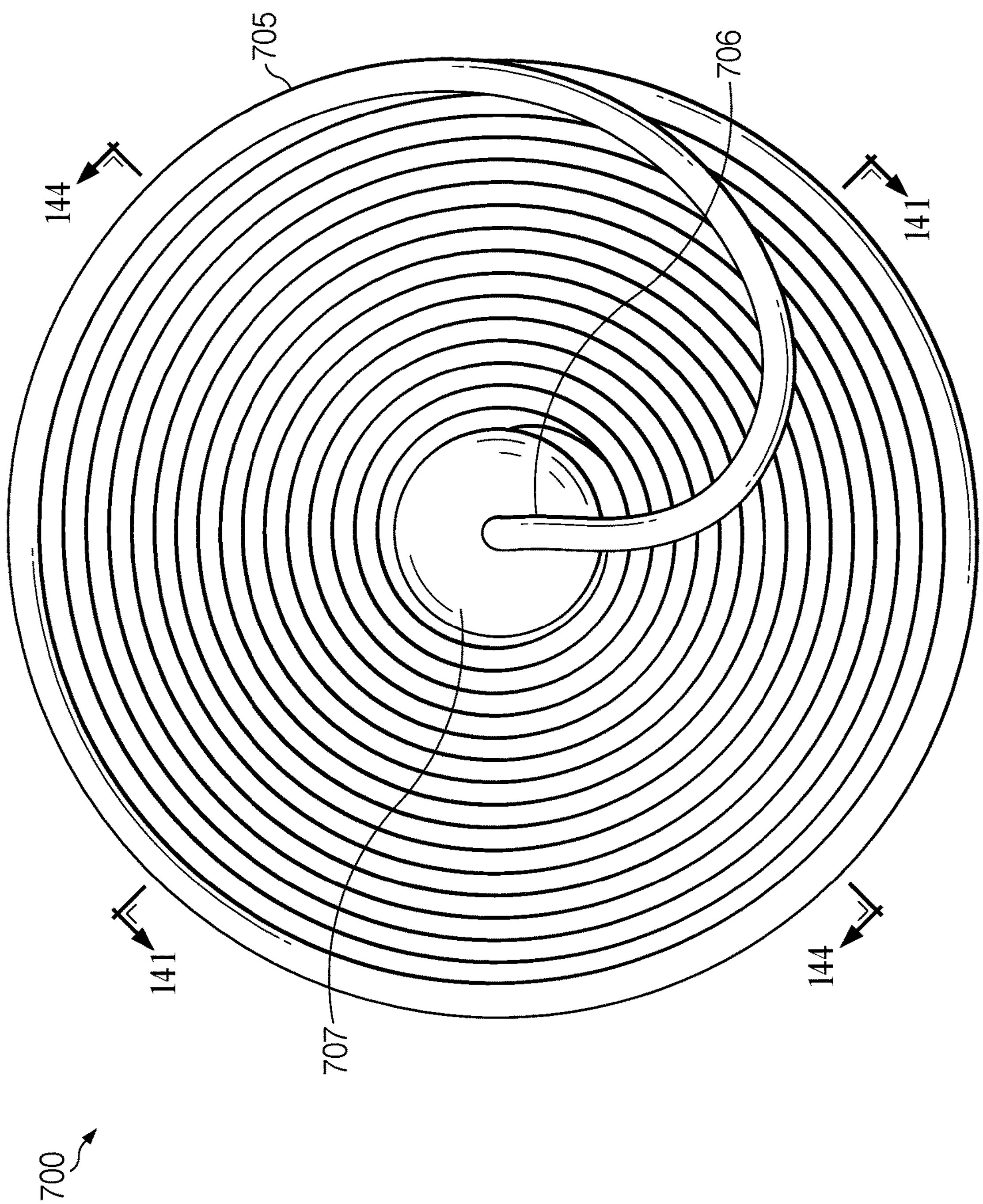
Figure 140:
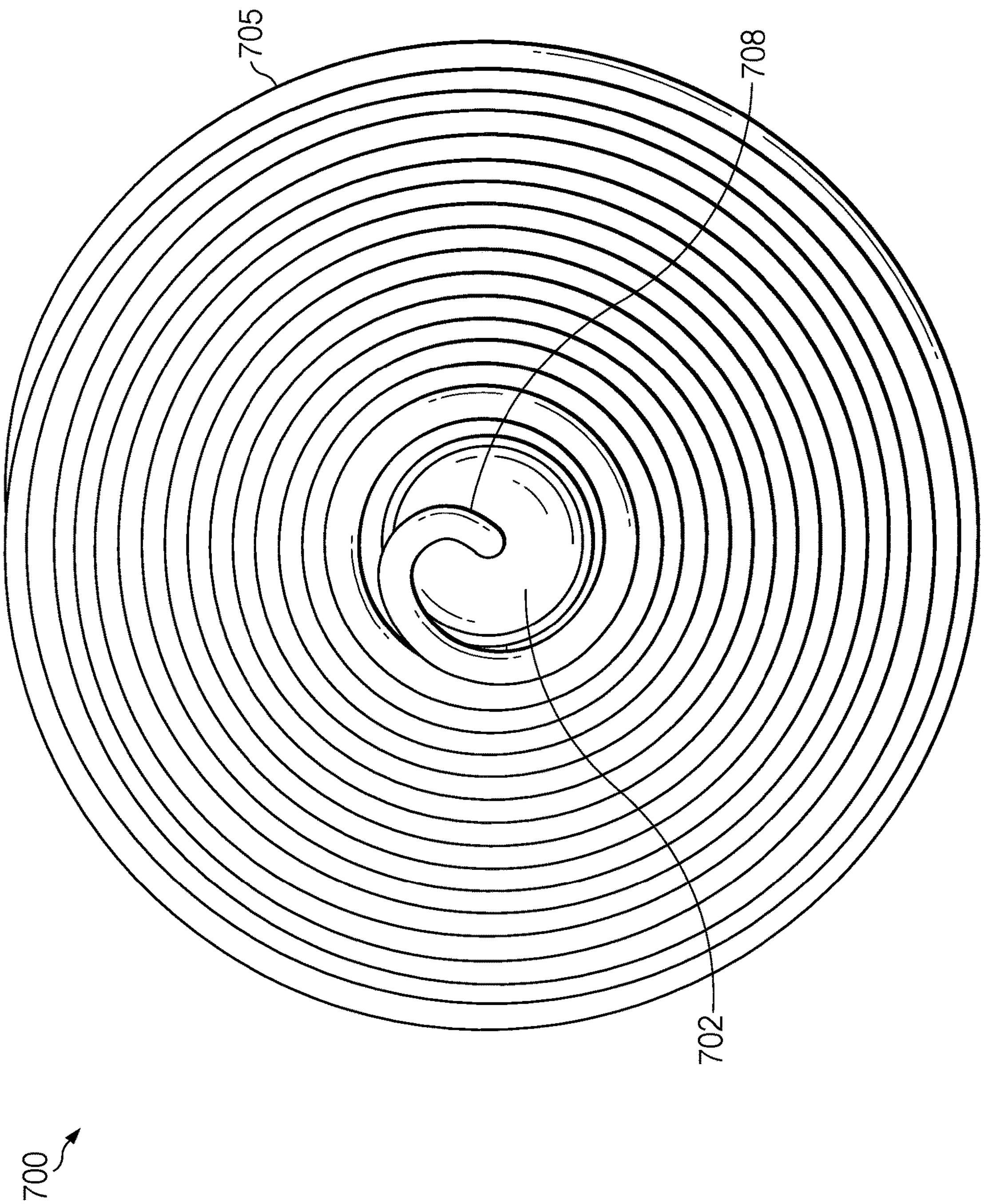
Figure 141:
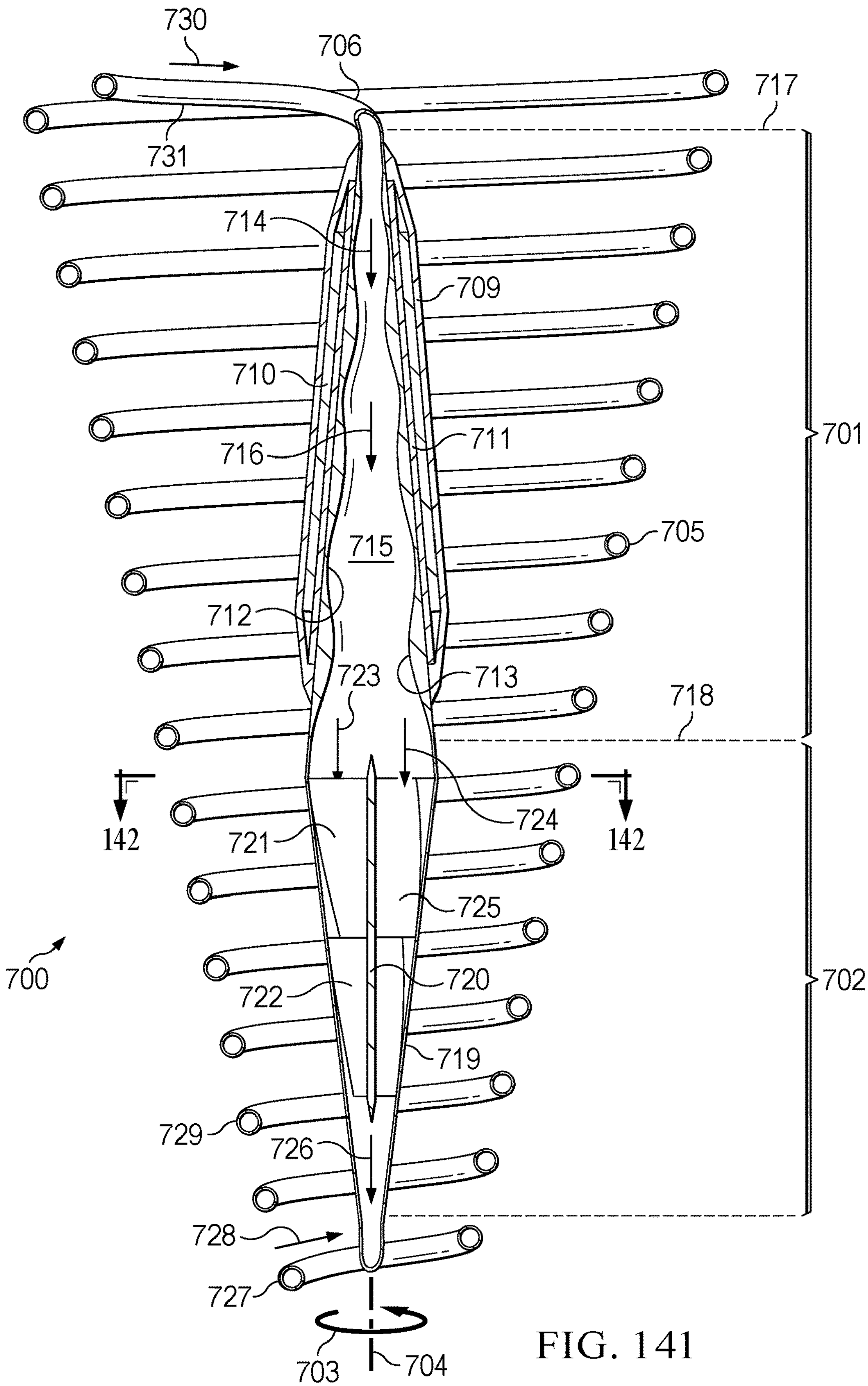
Figure 142:
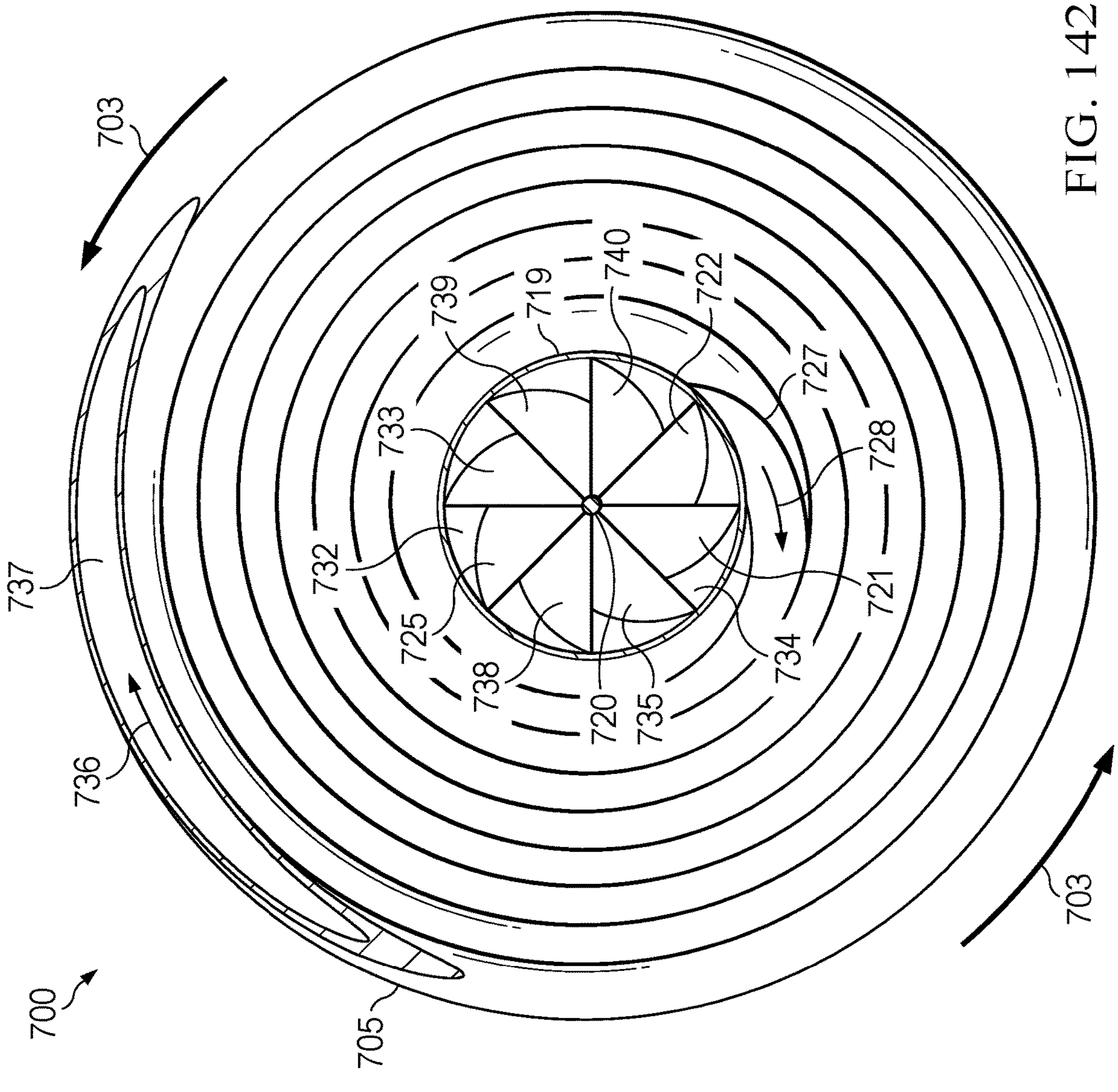
Figure 143:
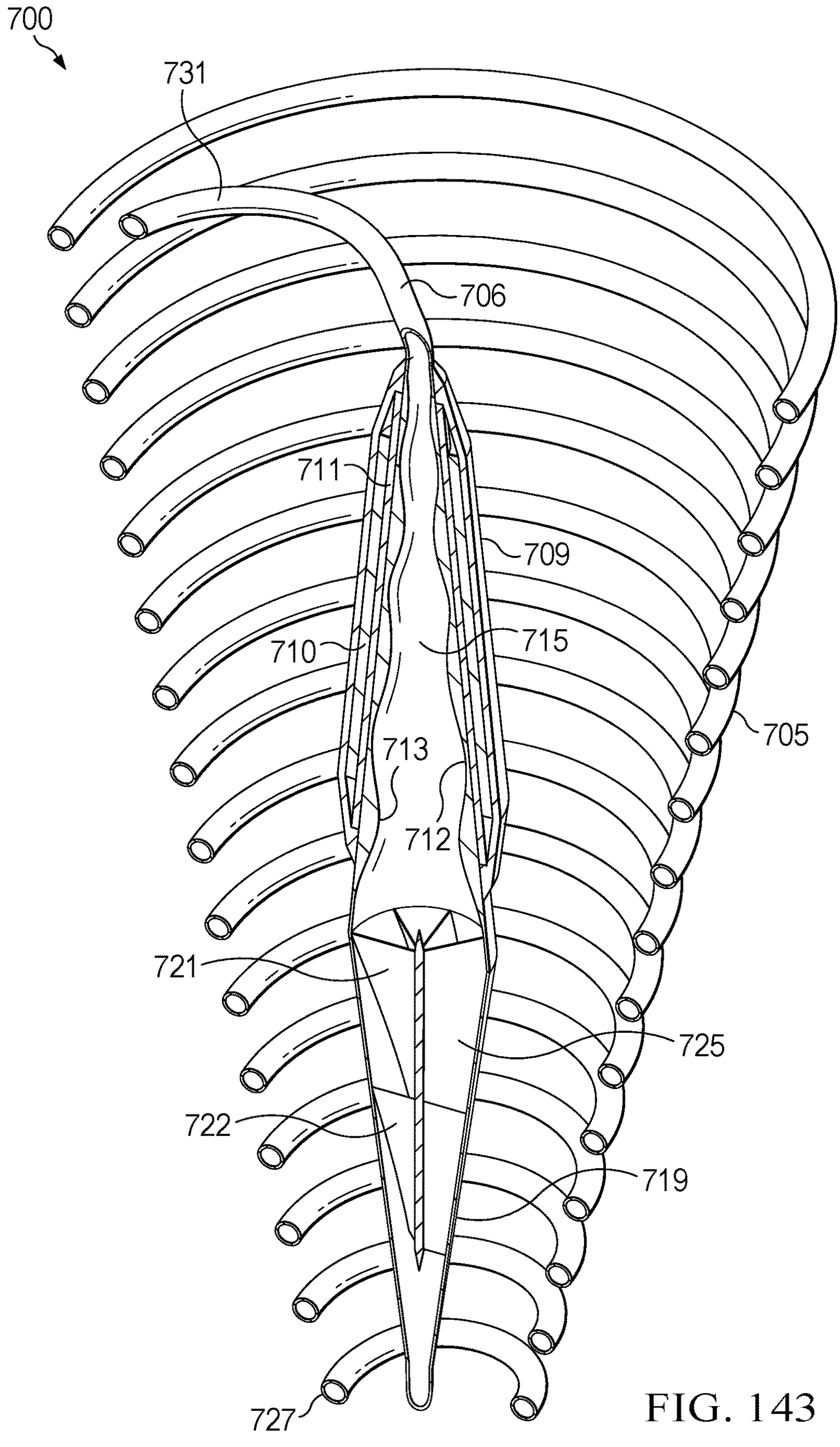
Figure 144:
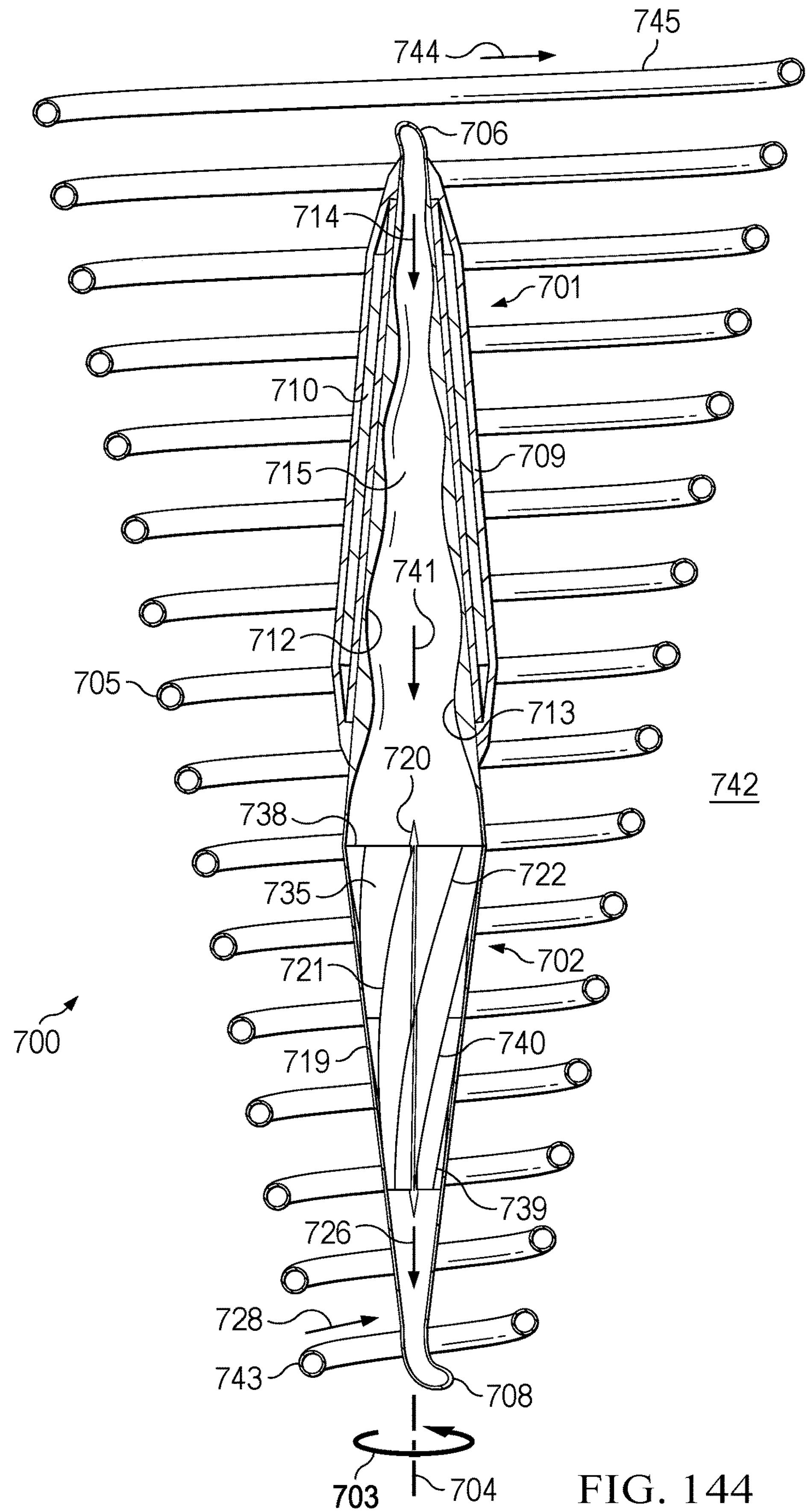
Figure 145:
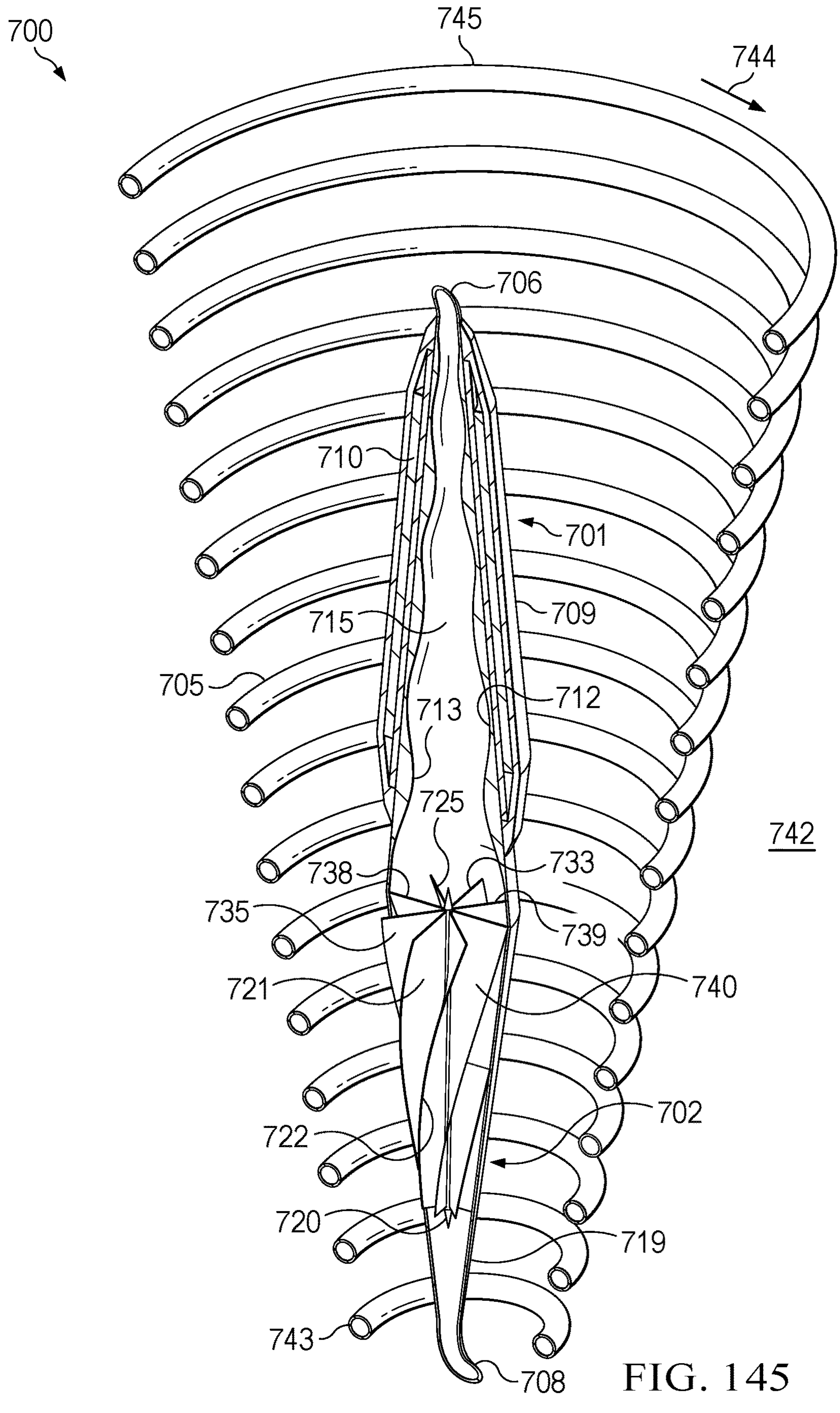
Figure 146:
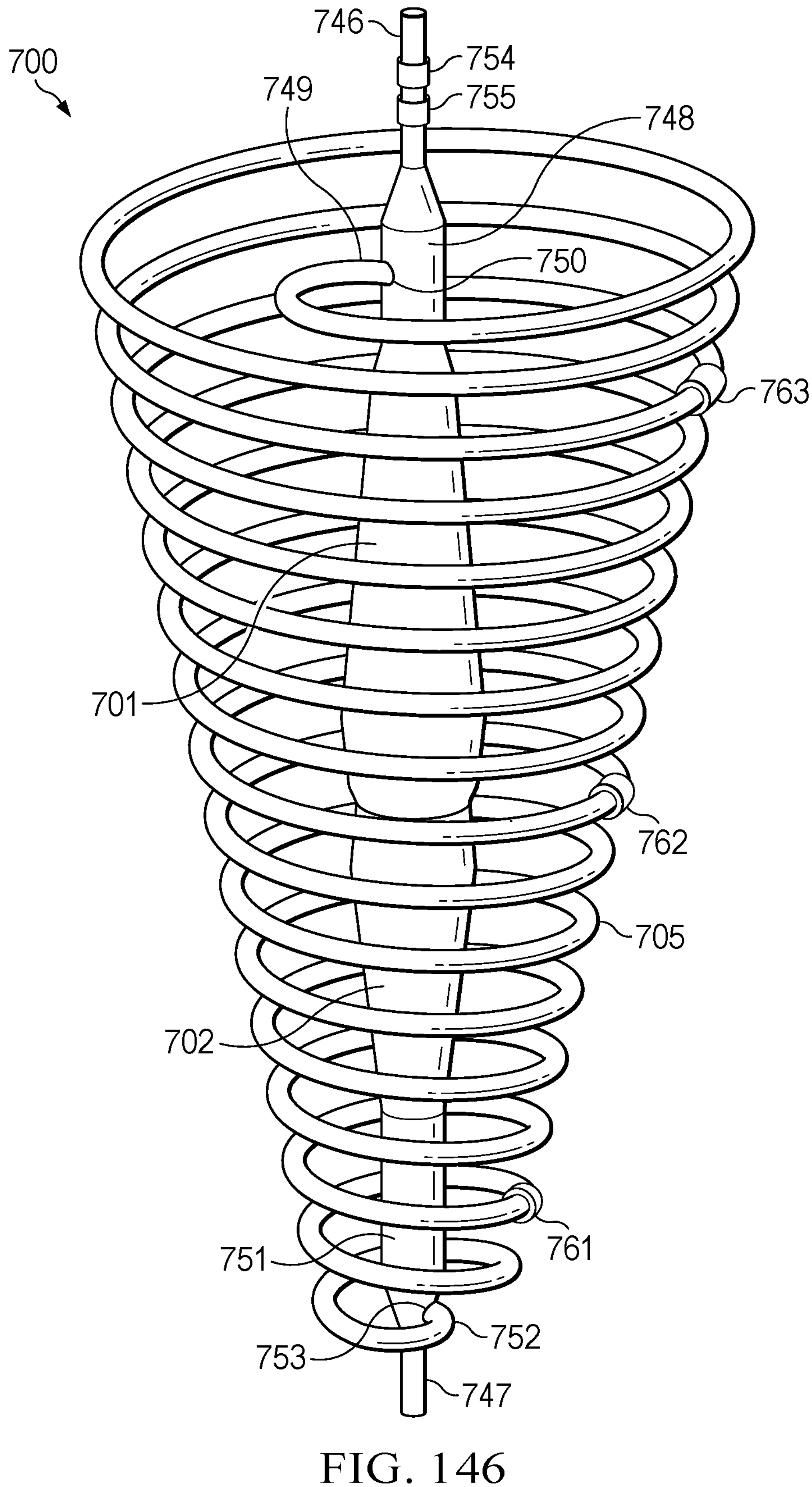
Figure 147:
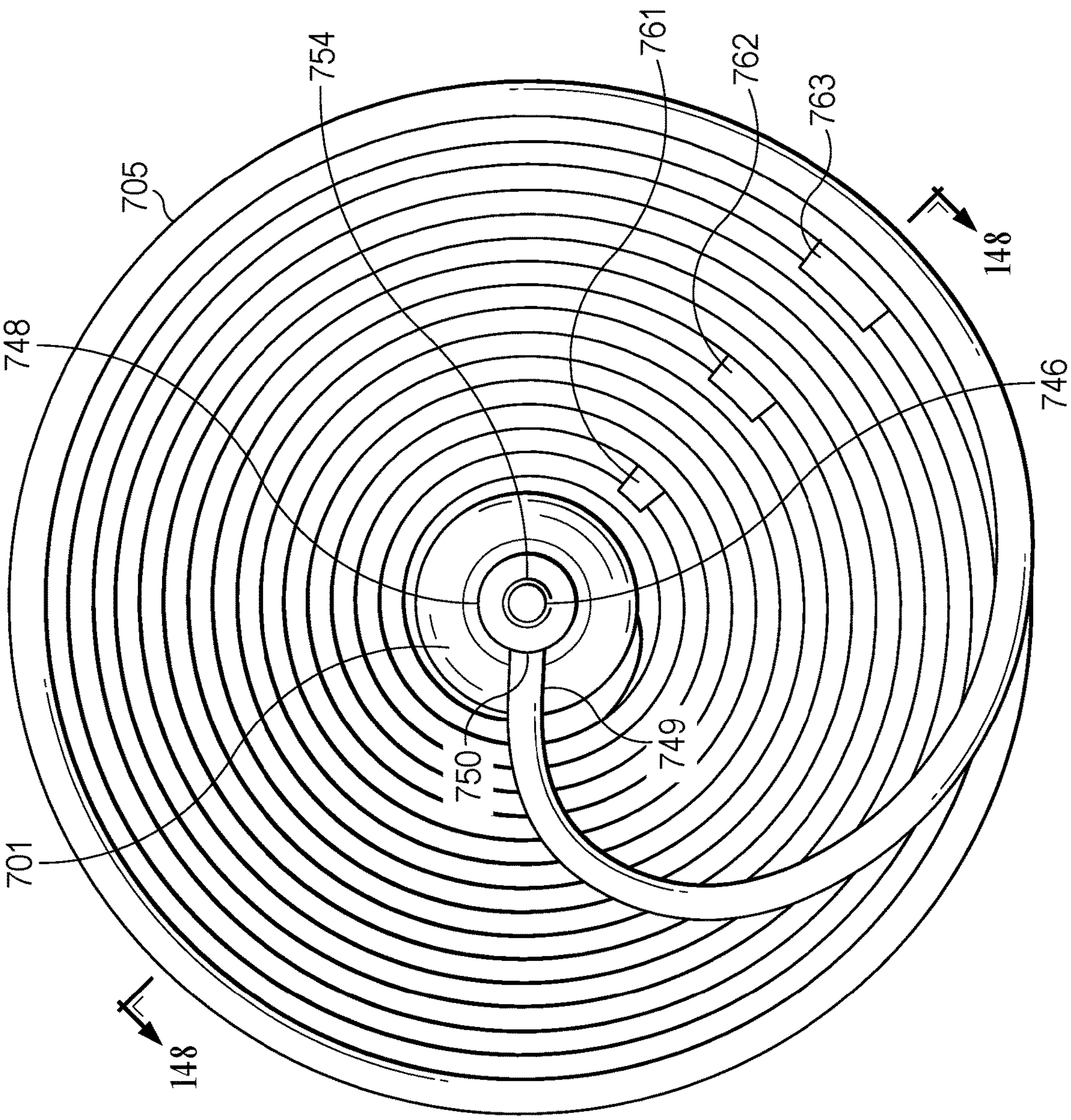
Figure 148:
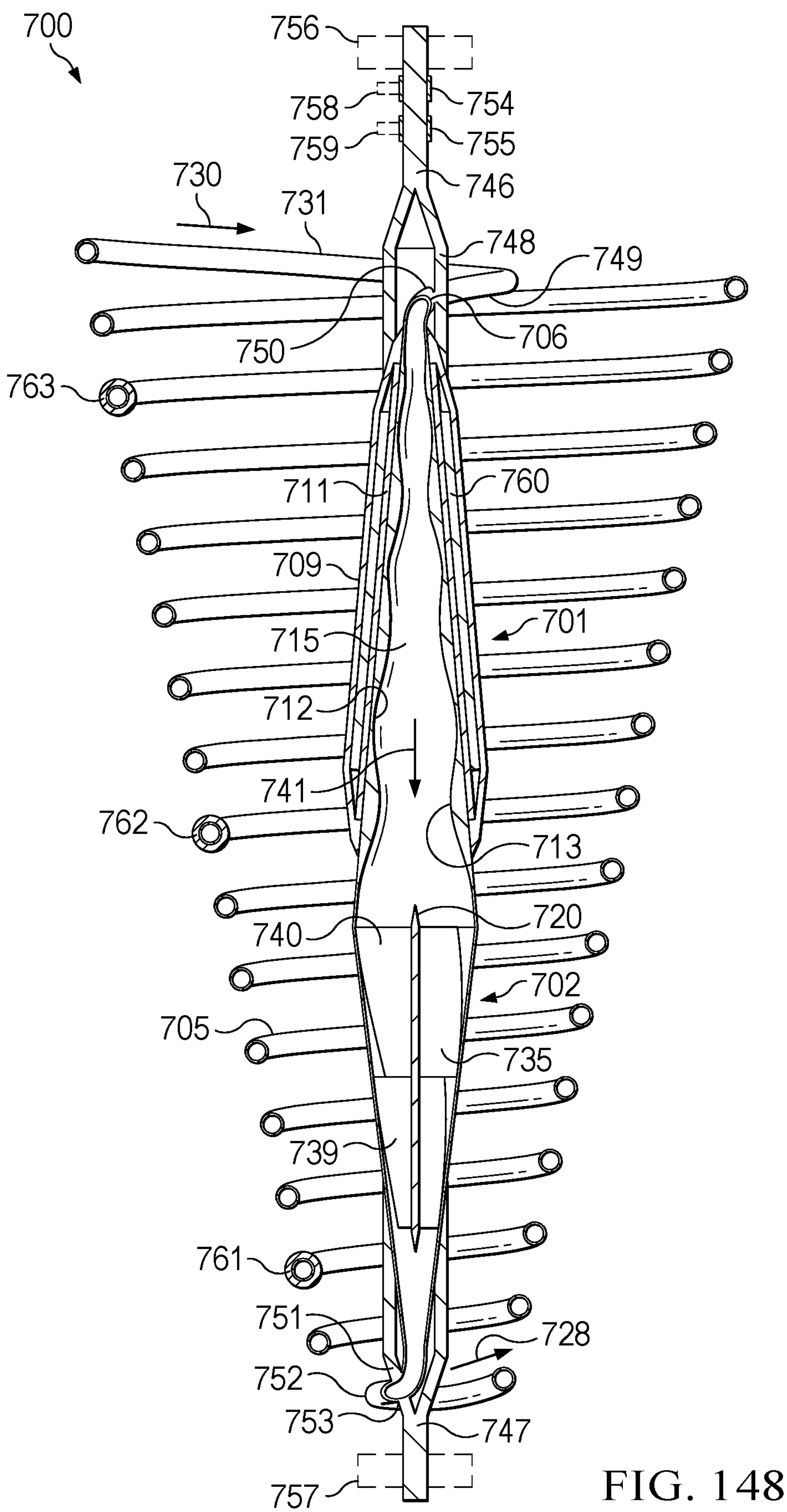
Figure 149:
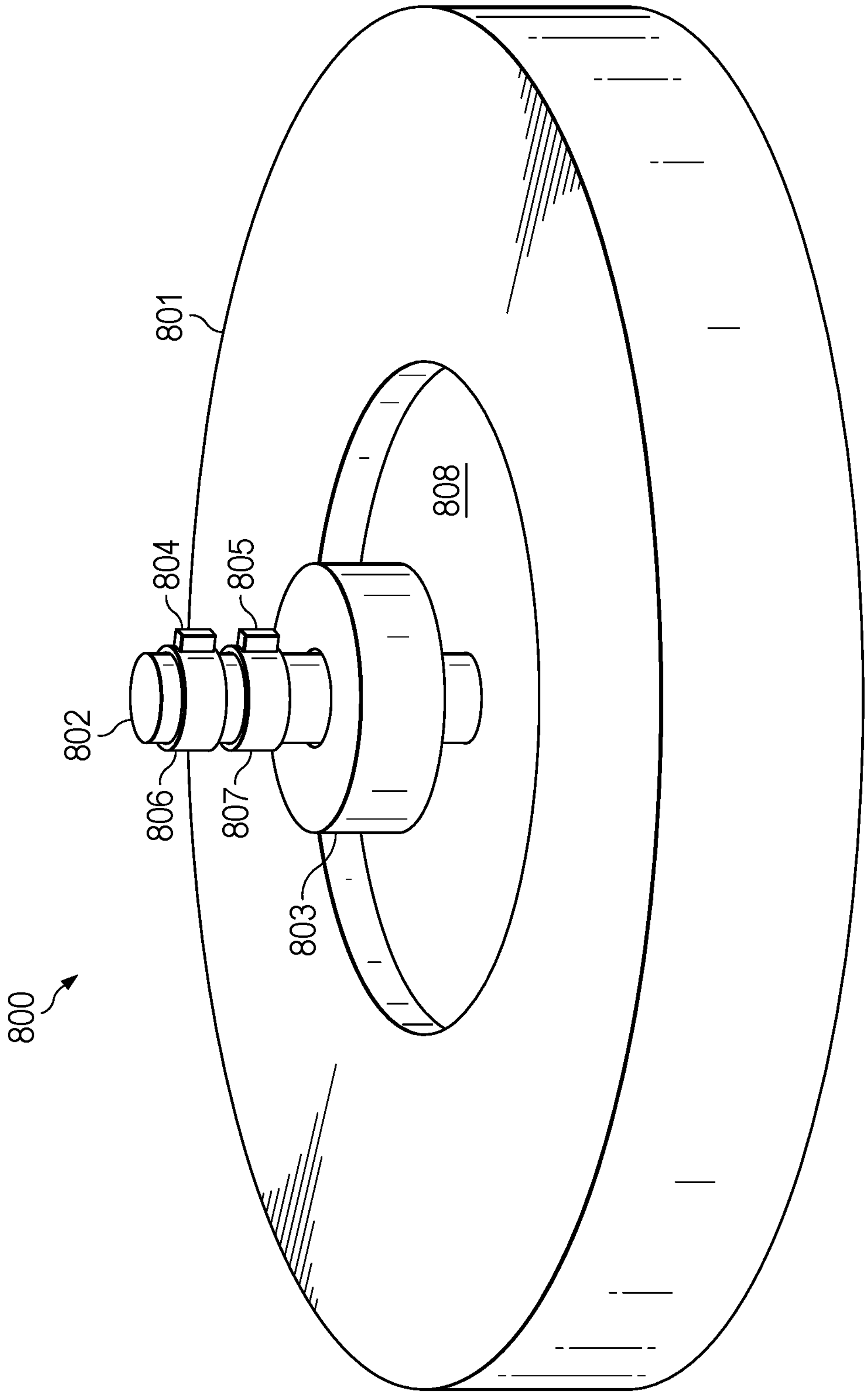
Figure 150:
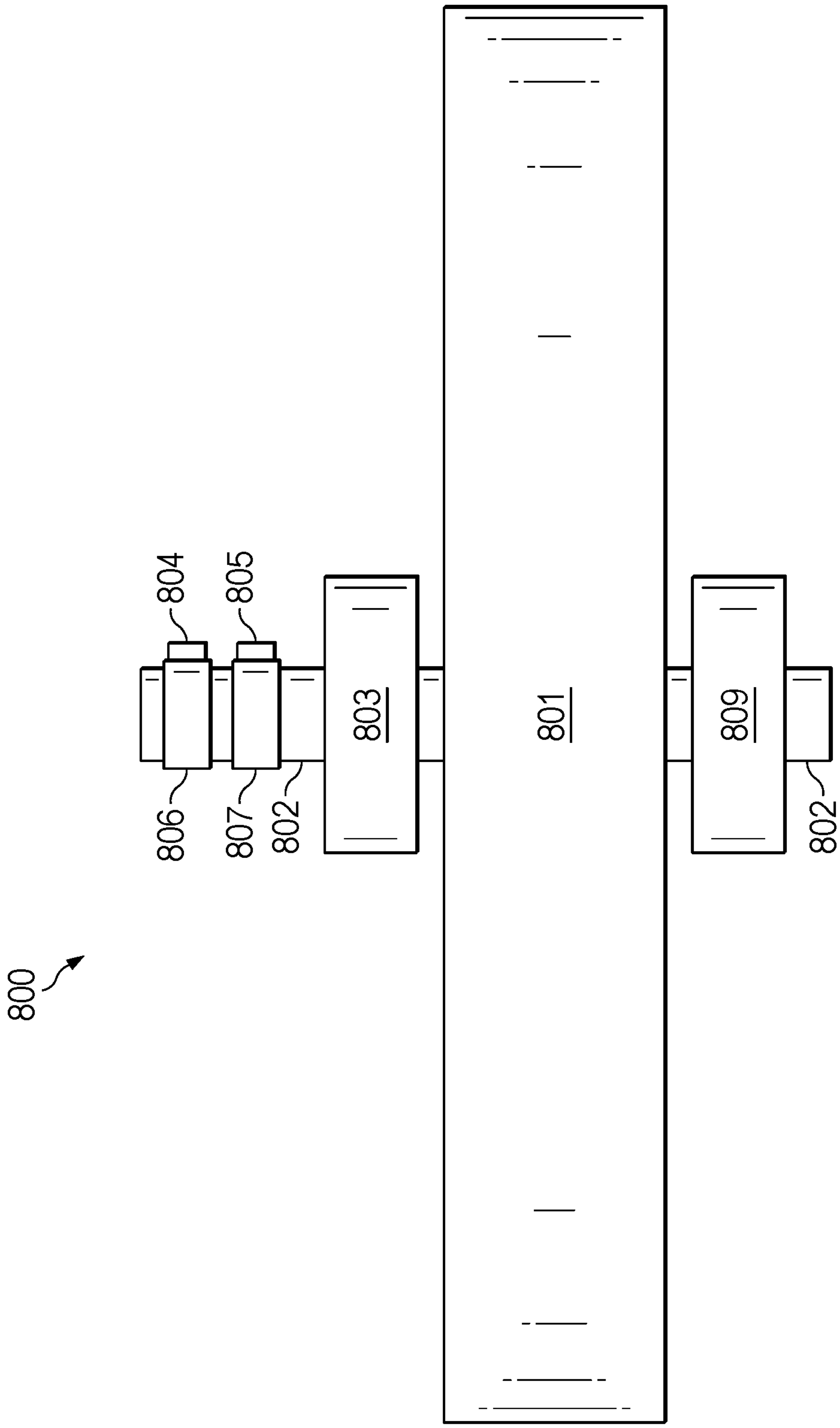
Figure 151:
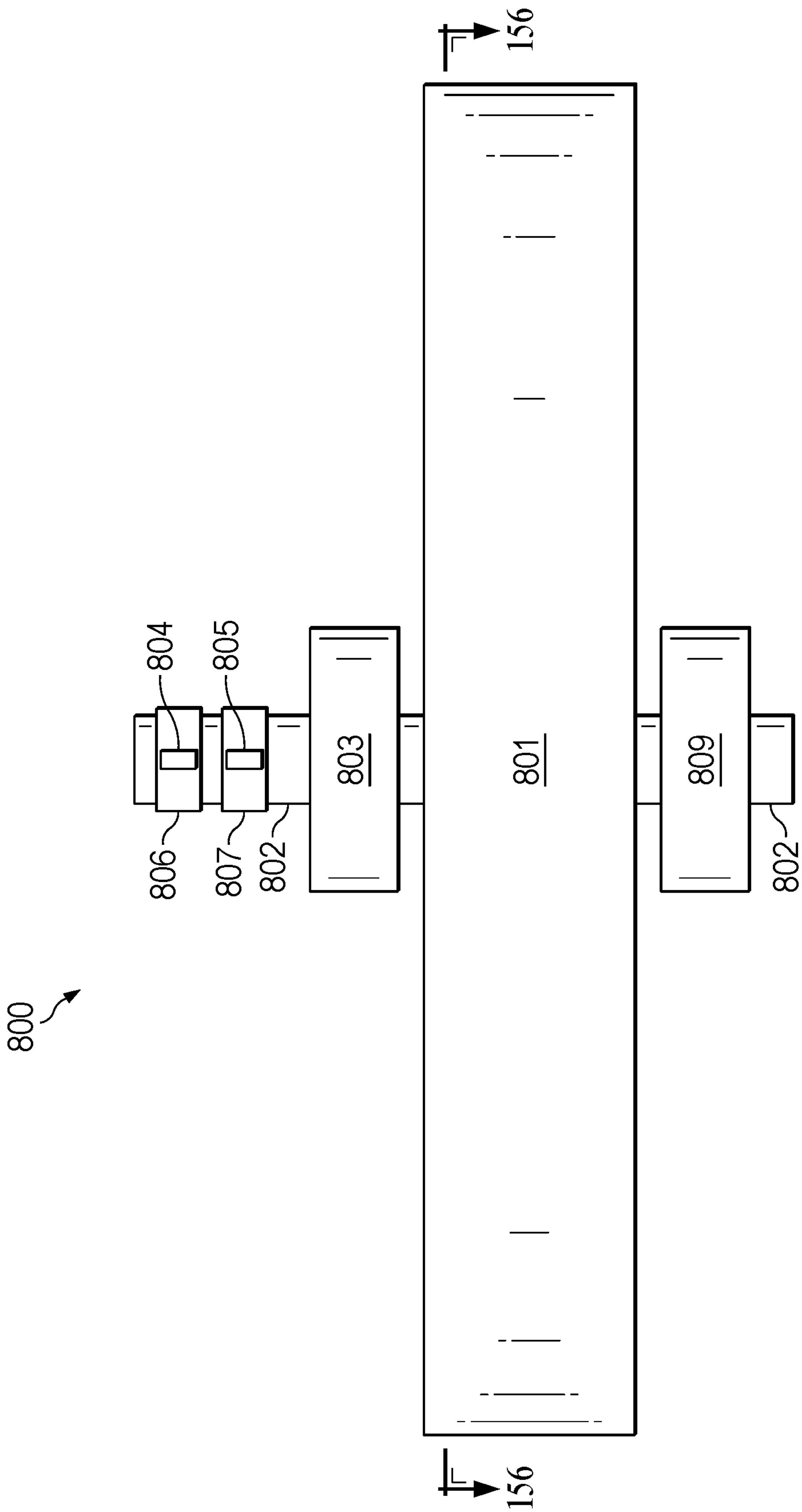
Figure 152:
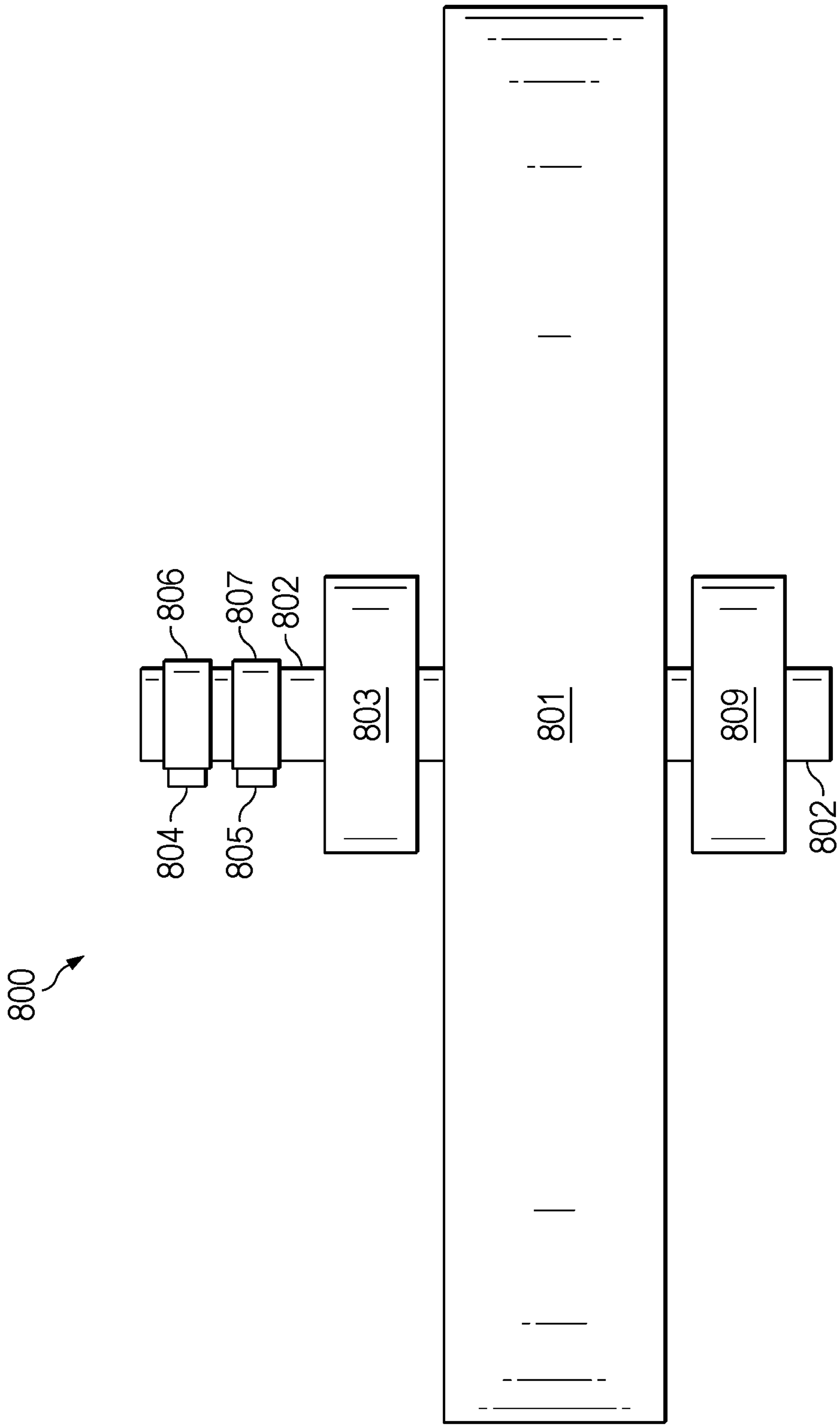
Figure 153:
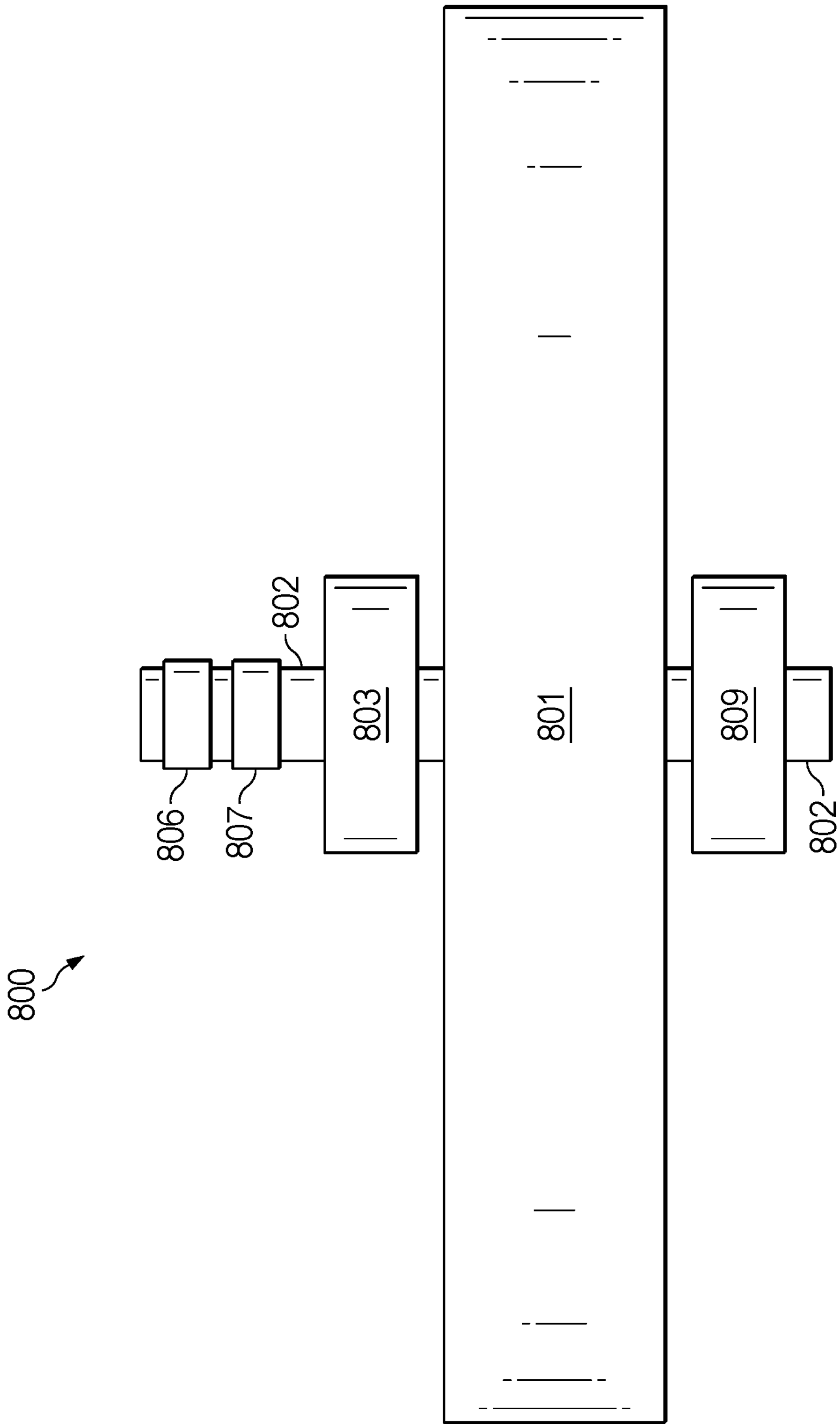
Figure 154:
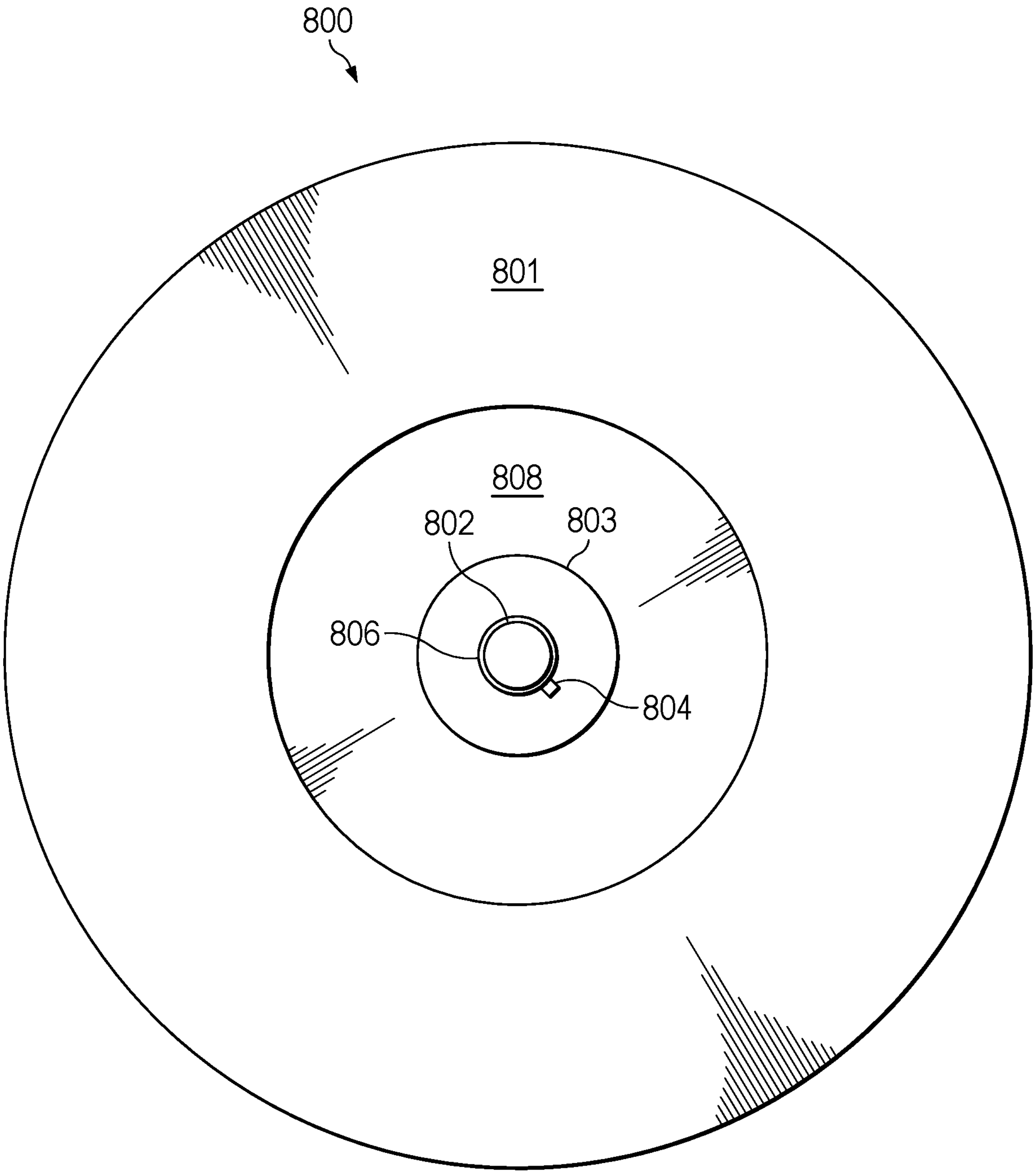
Figure 155:
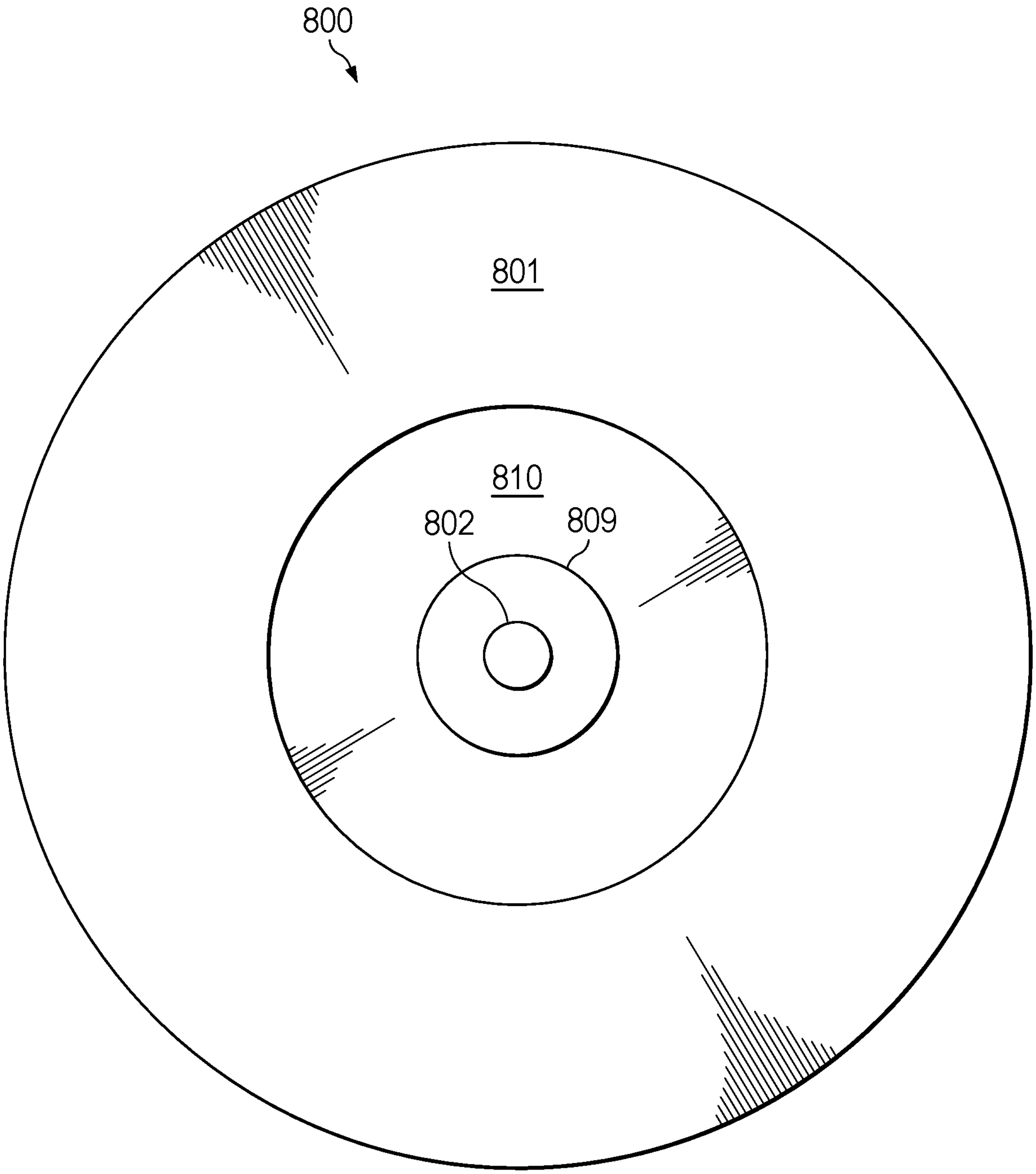
Figure 156:
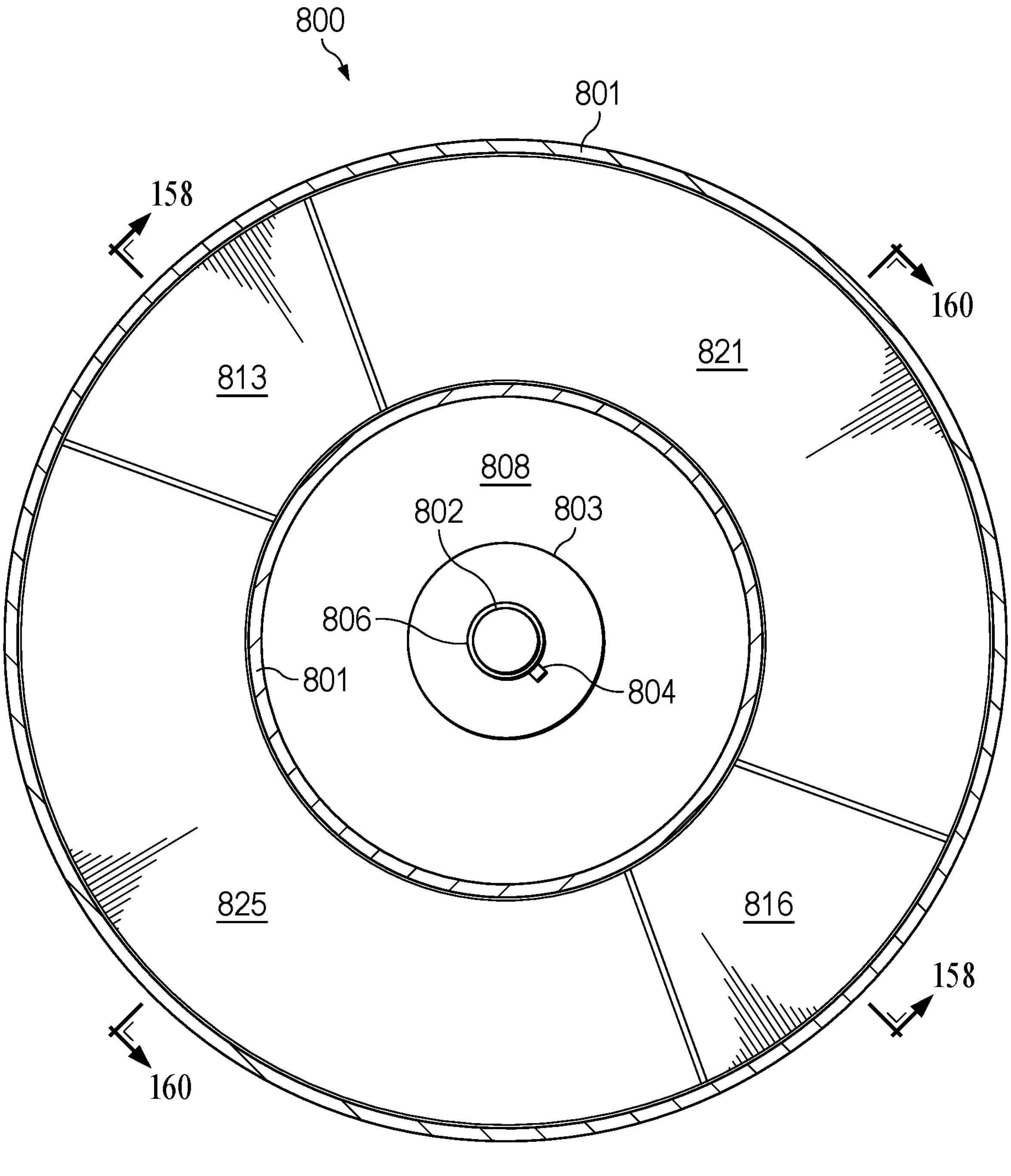
Figure 157:
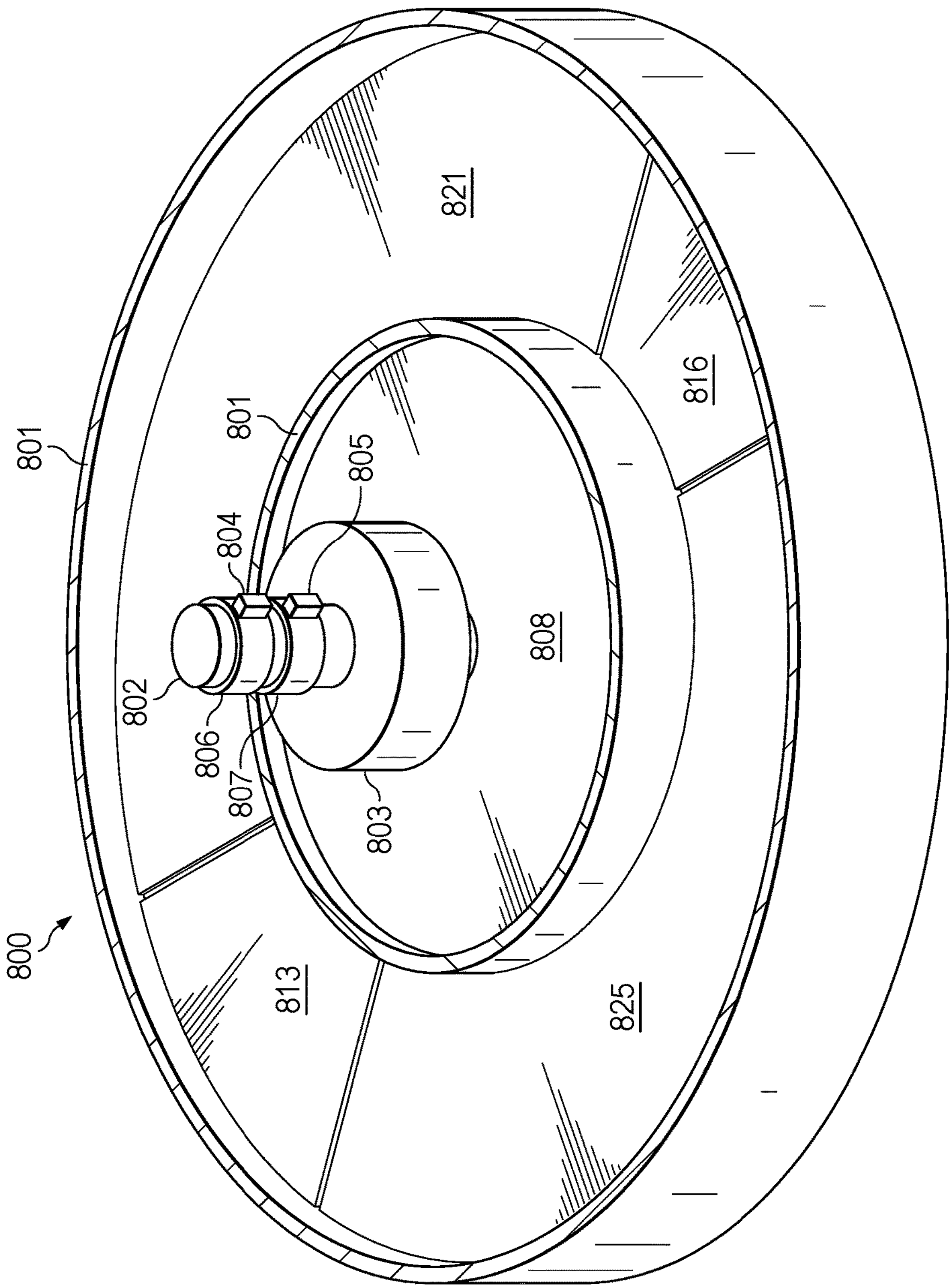
Figure 158:
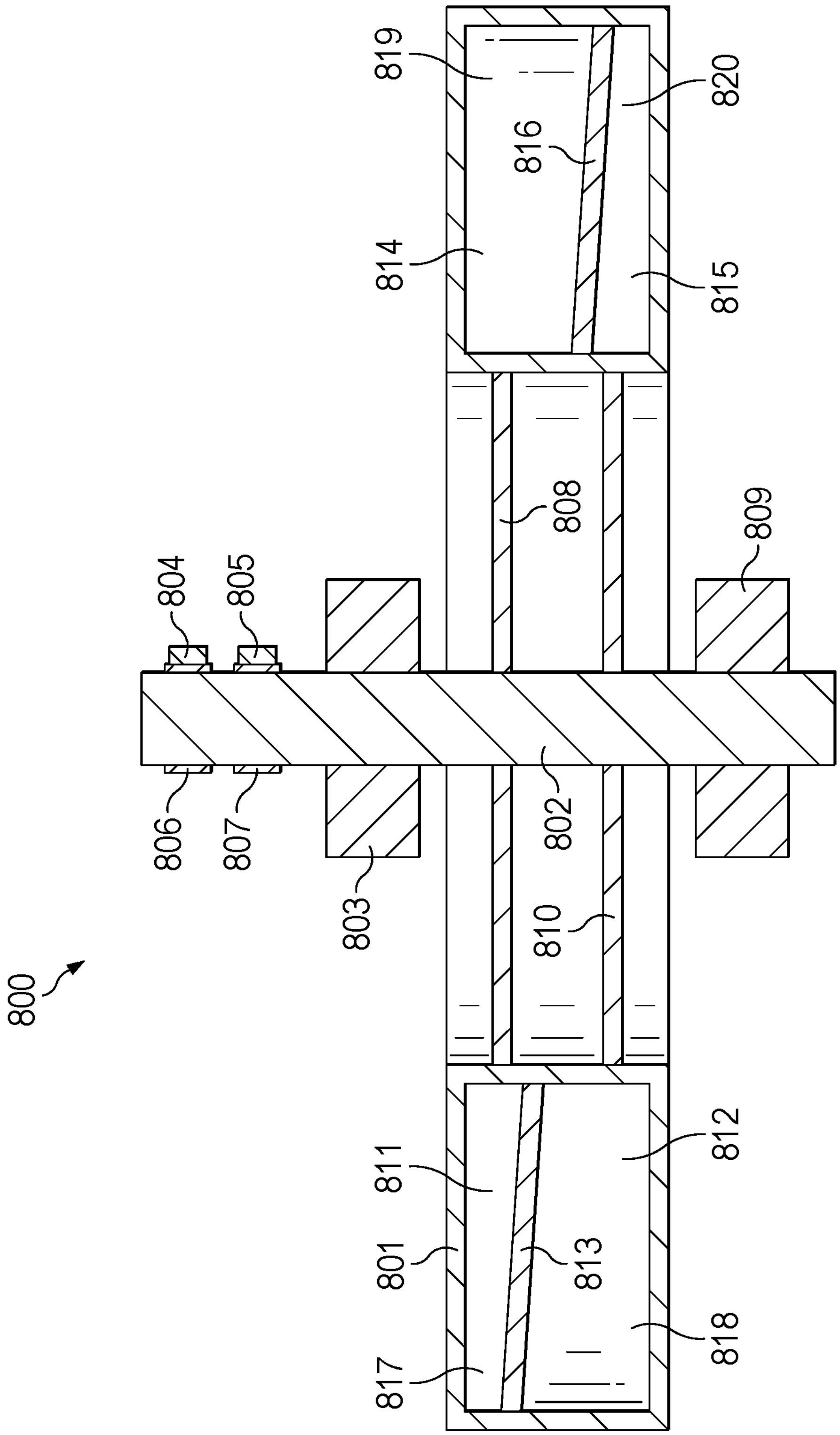
Figure 159:
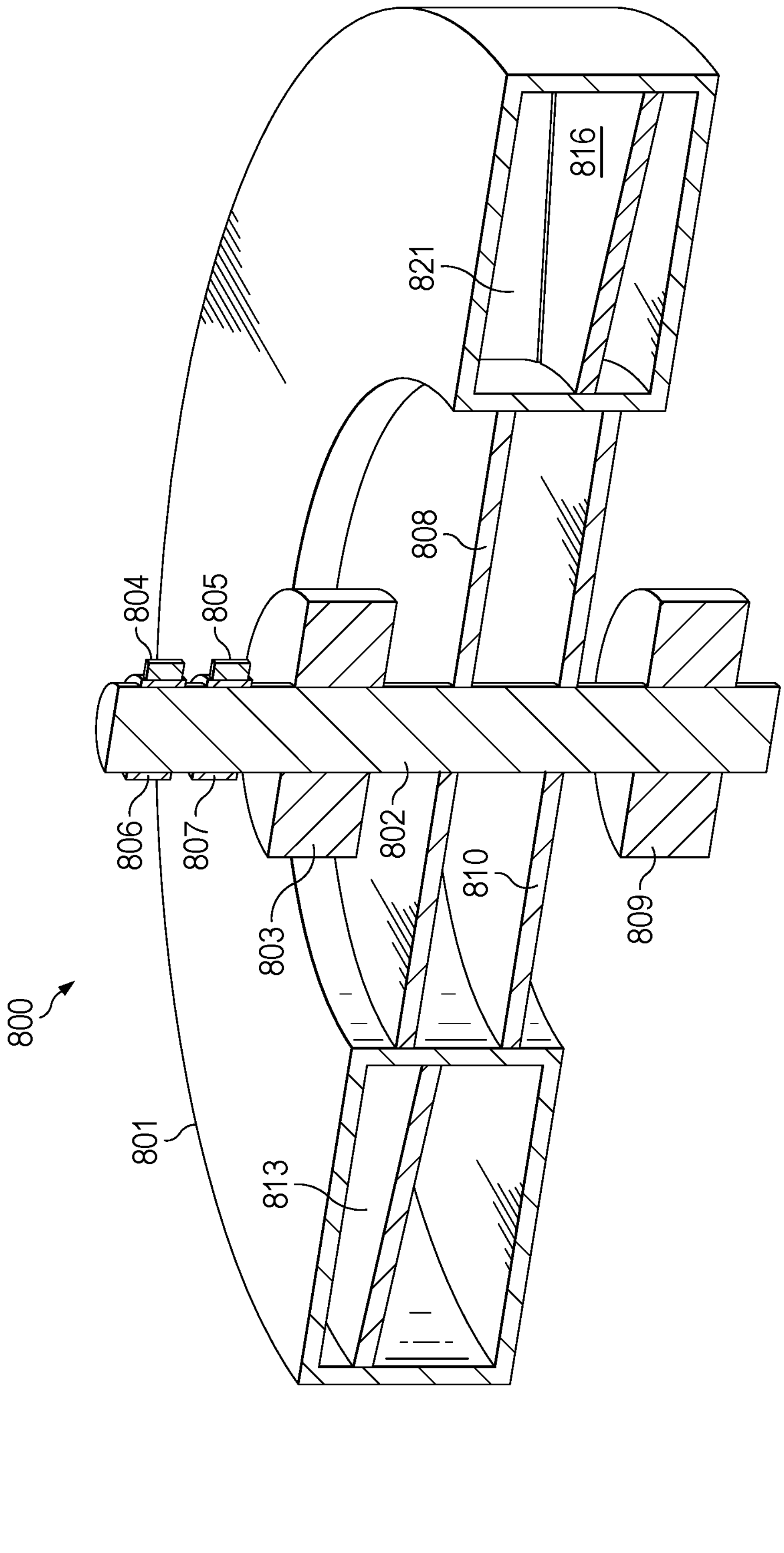
Figure 160:
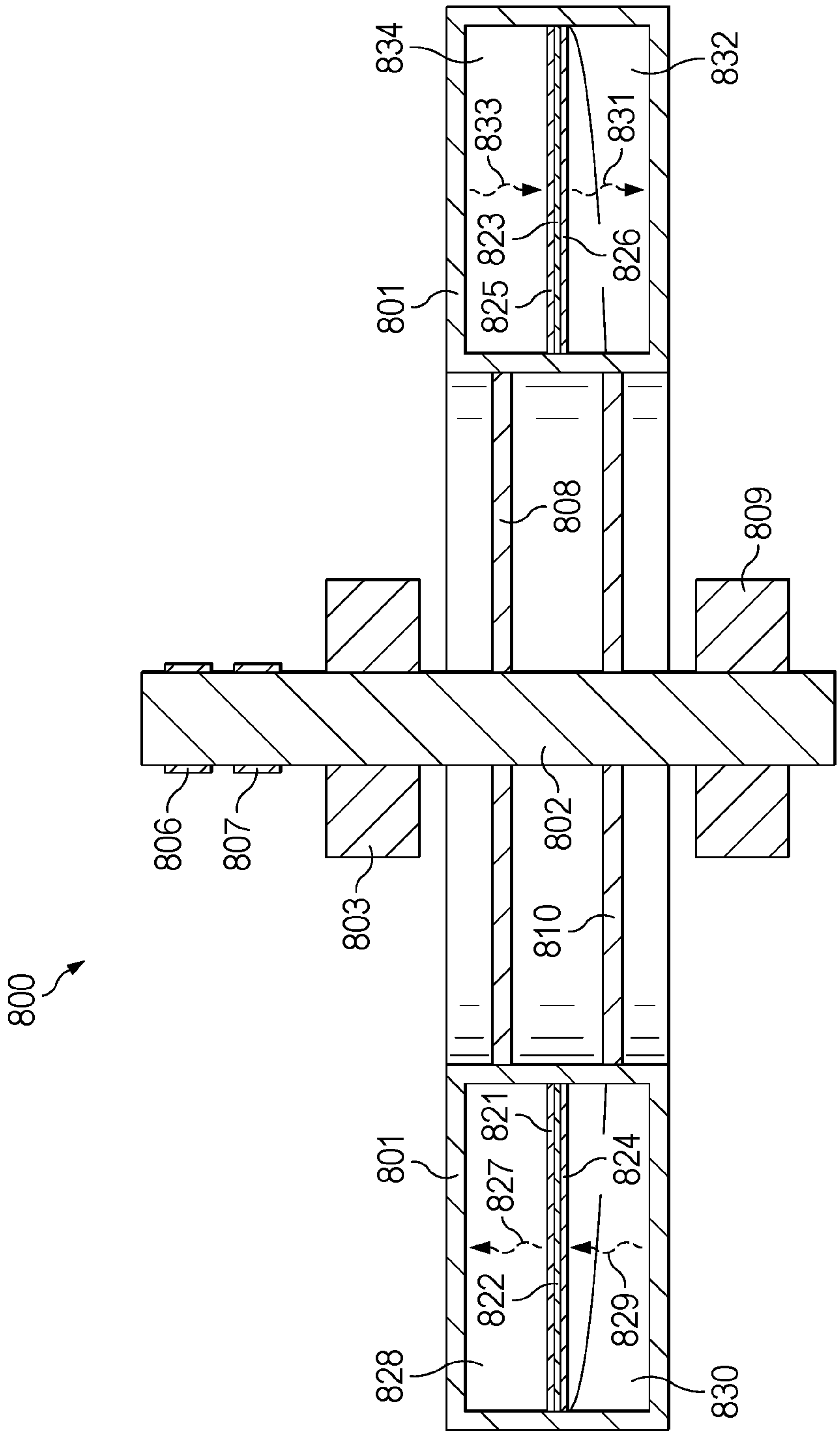
Figure 161:
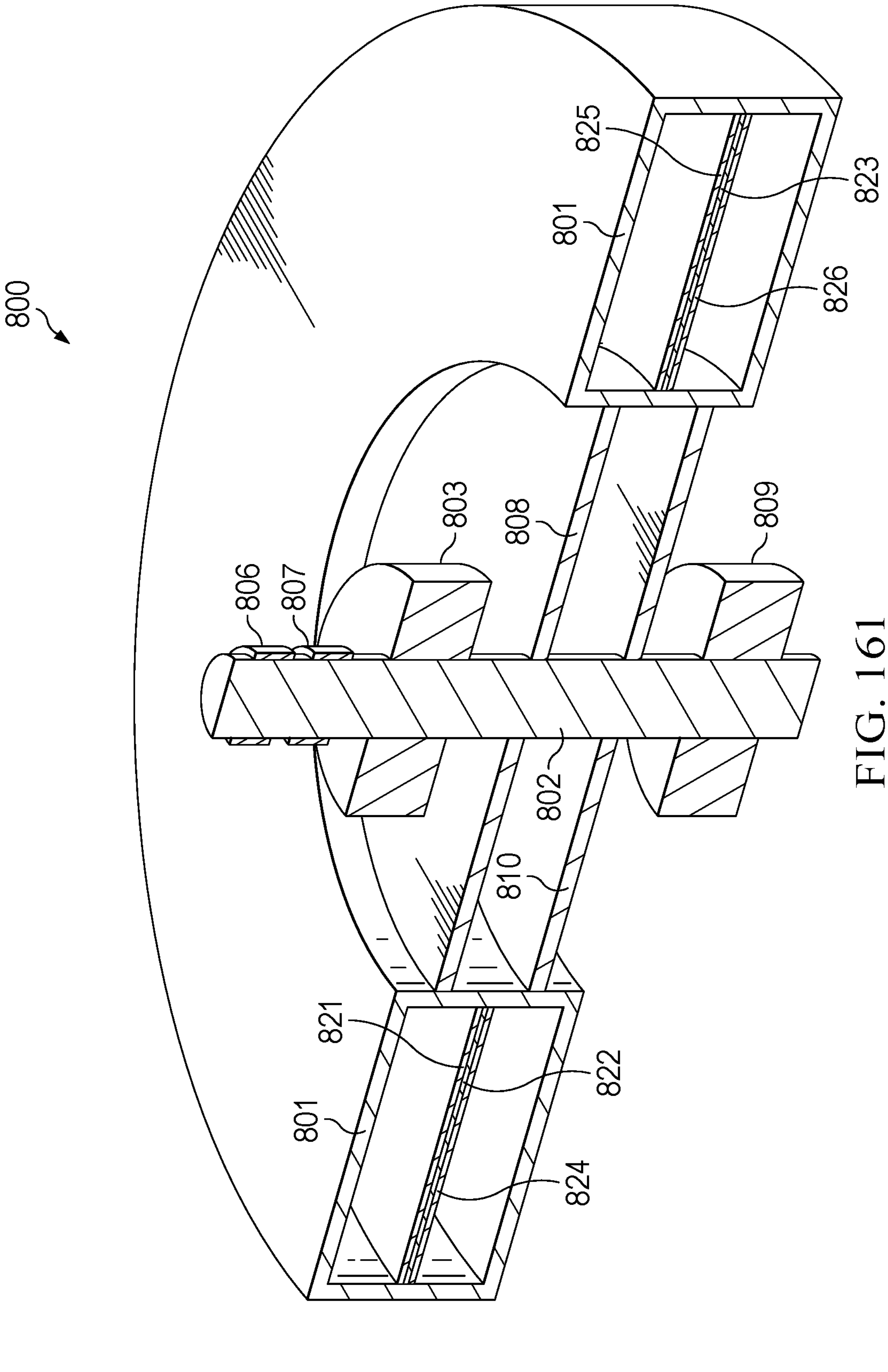
Figure 162:
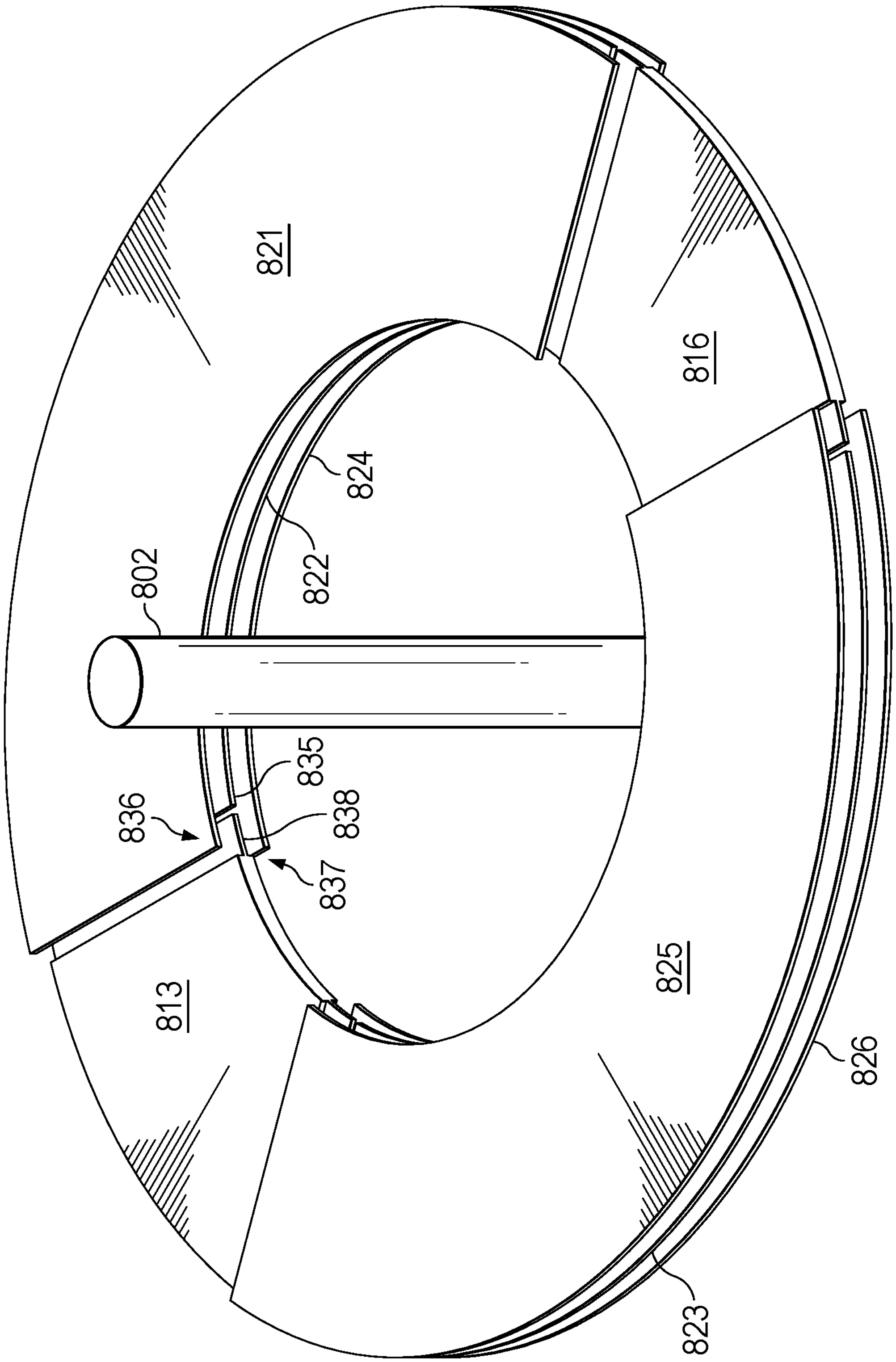
Figure 163:
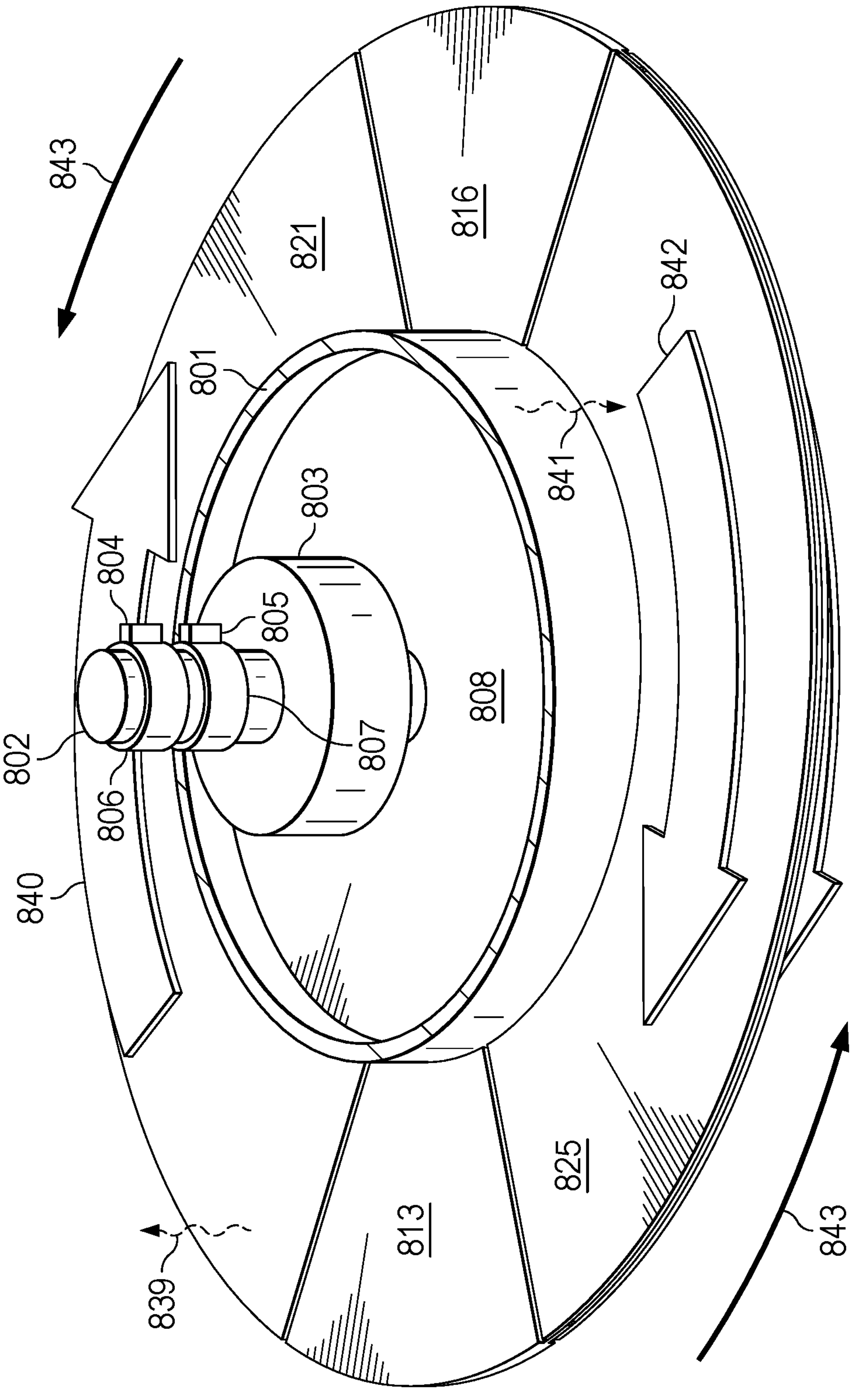
Figure 164:
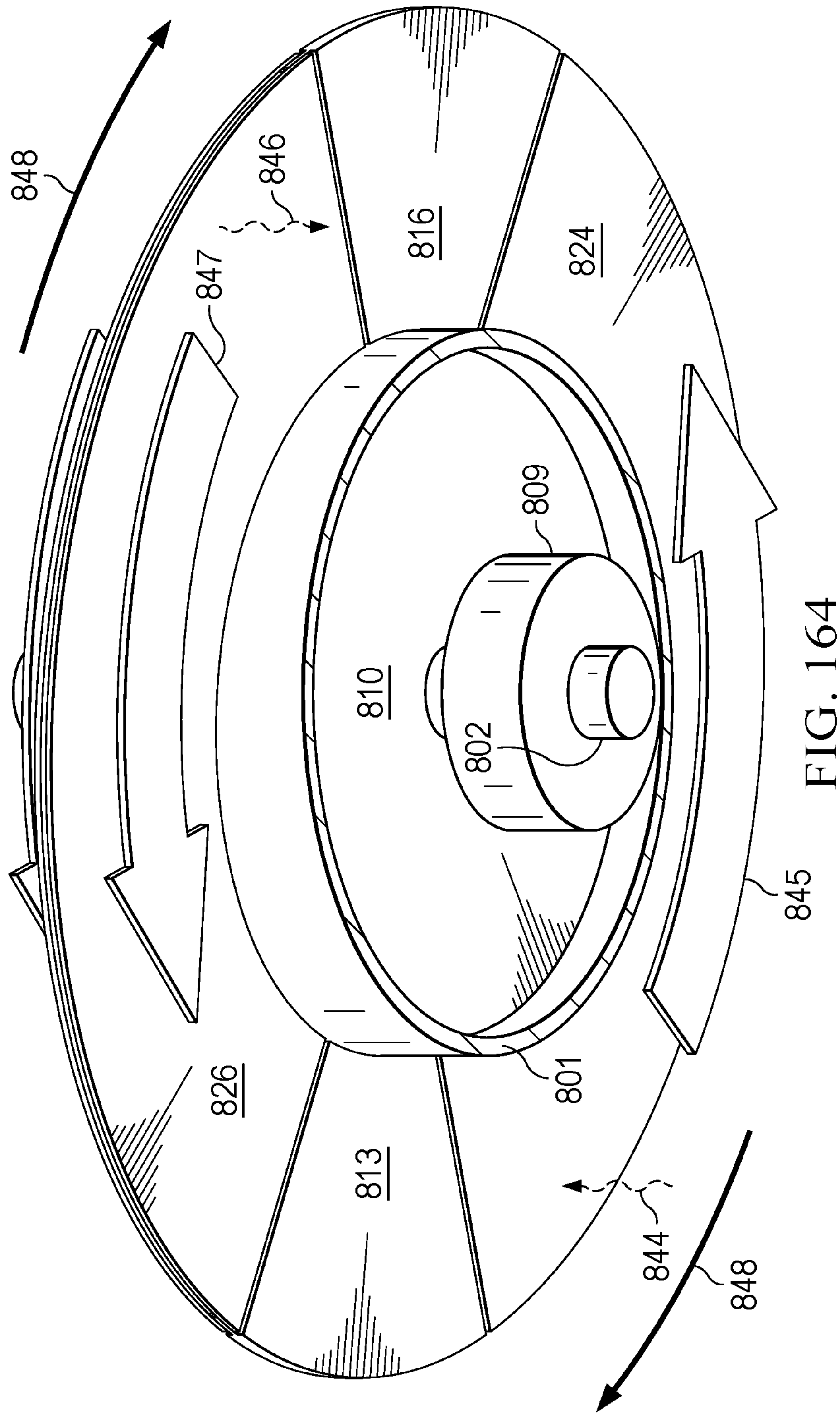
Figure 165:
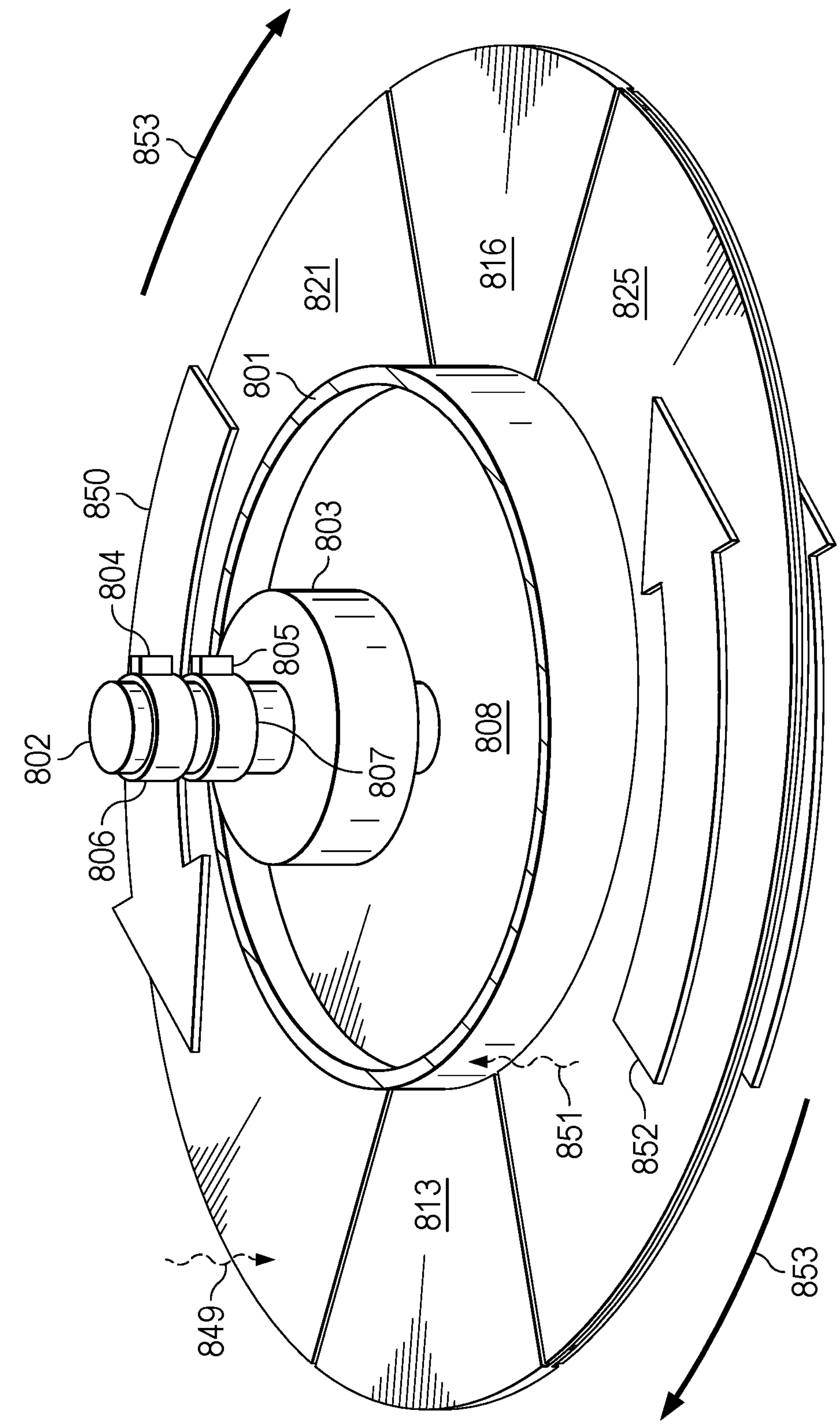
Figure 166:
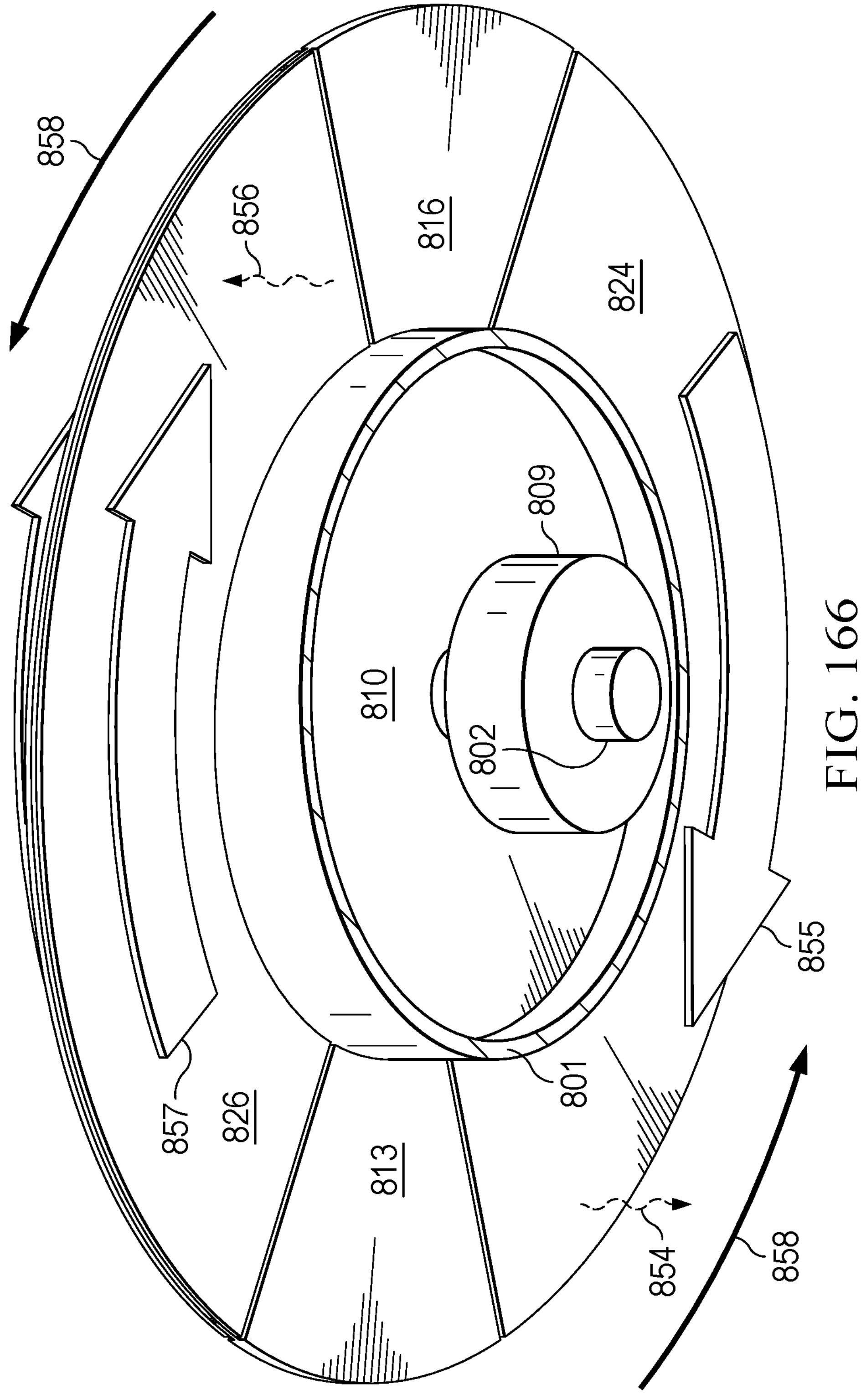
Figure 167:
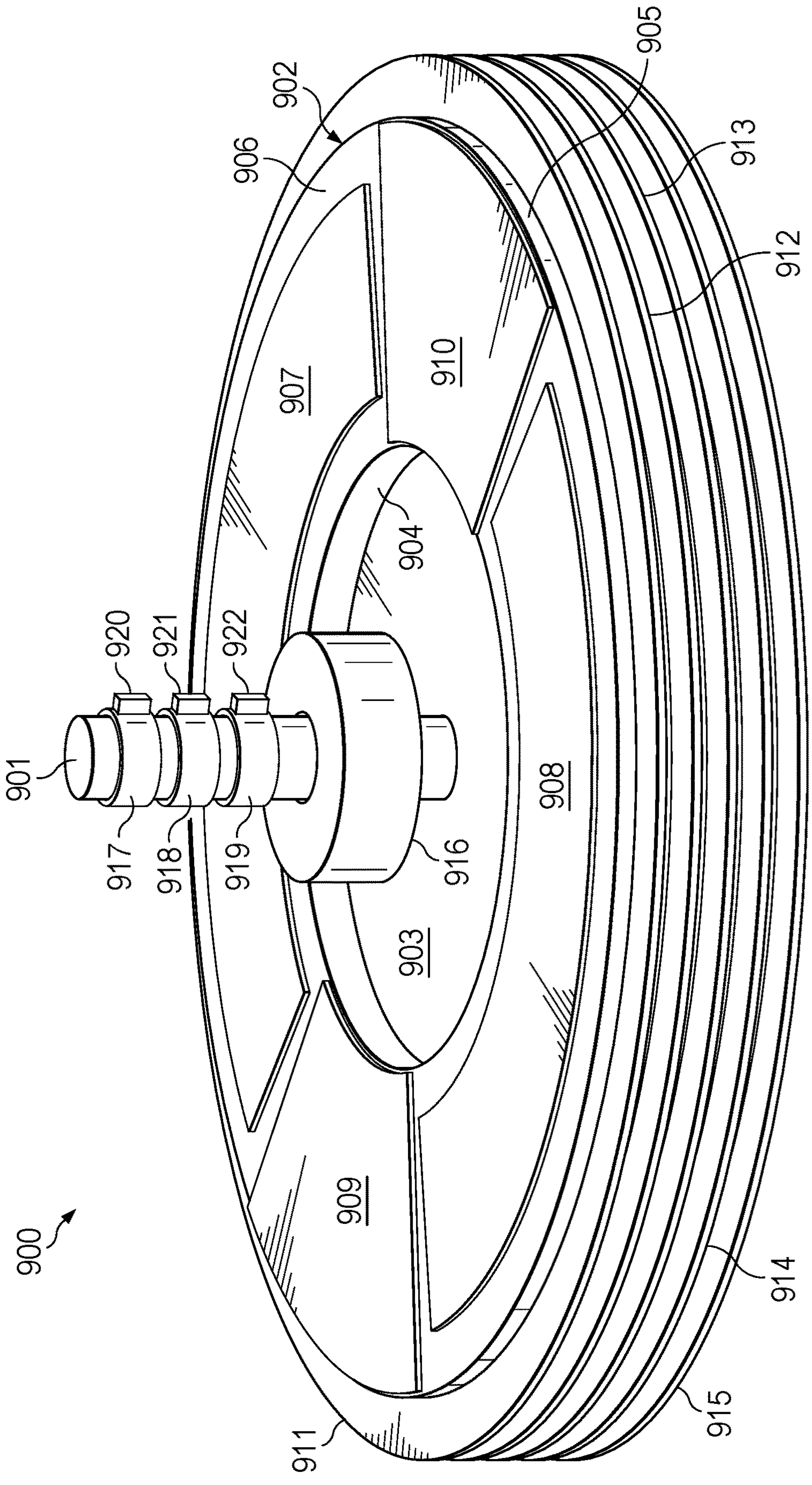
Figure 168:
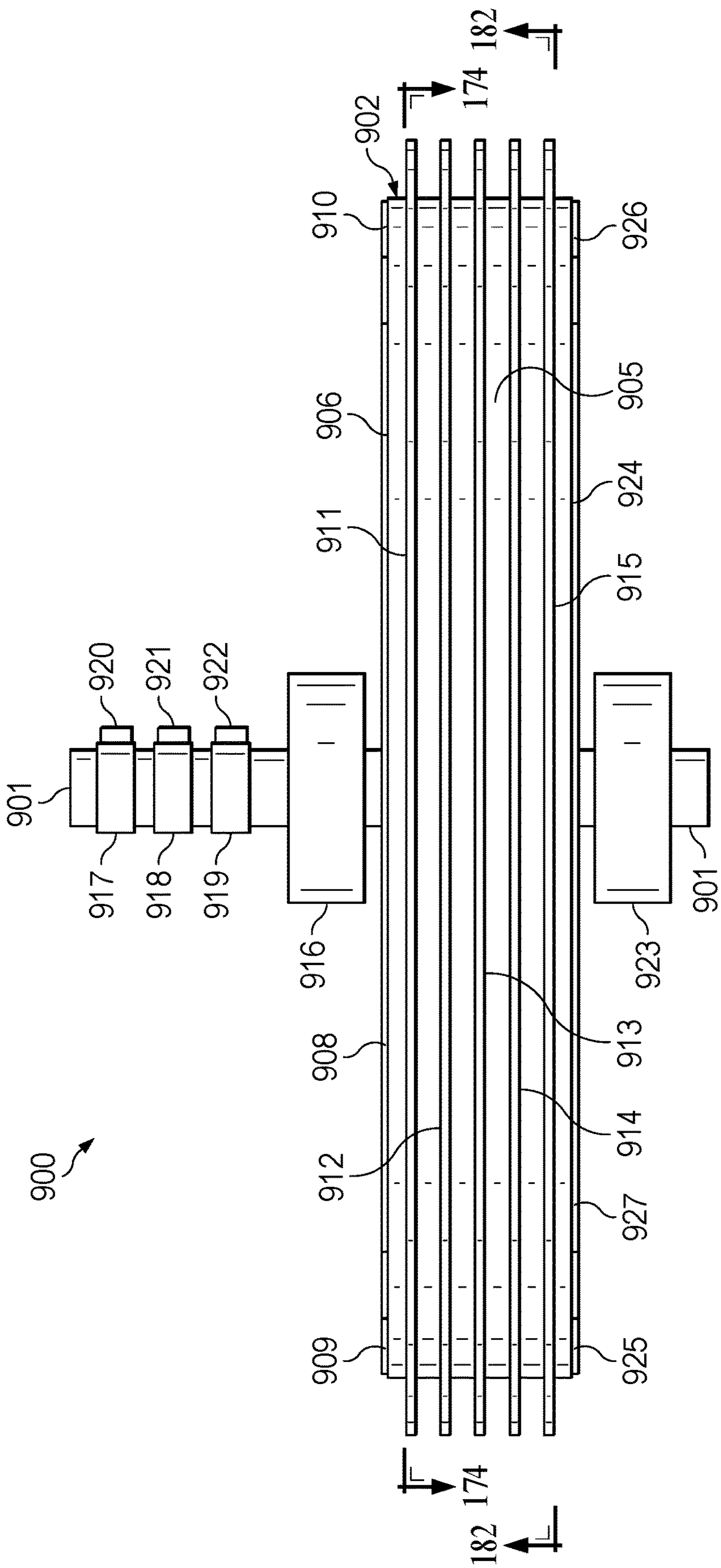
Figure 169:
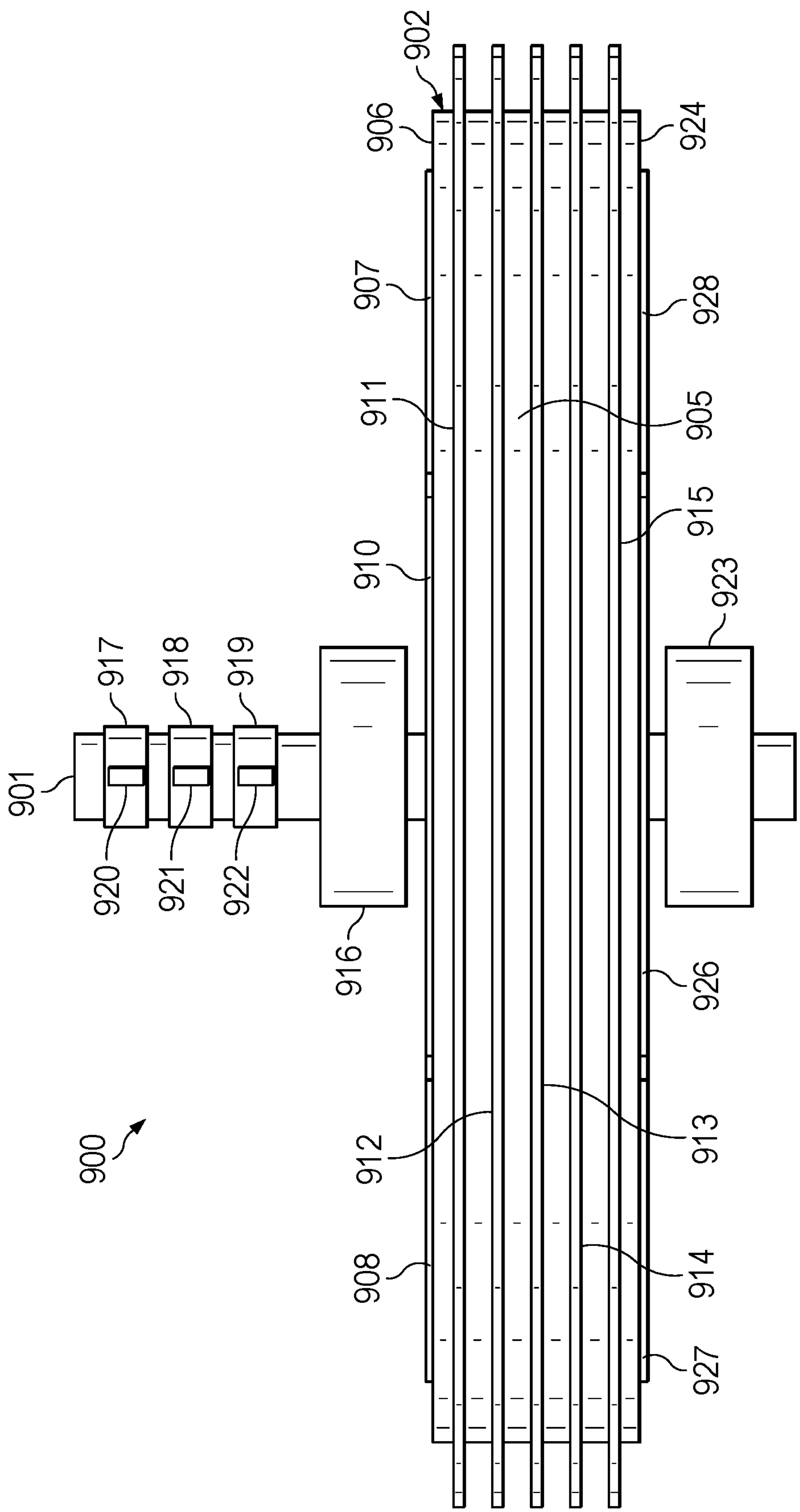
Figure 170:
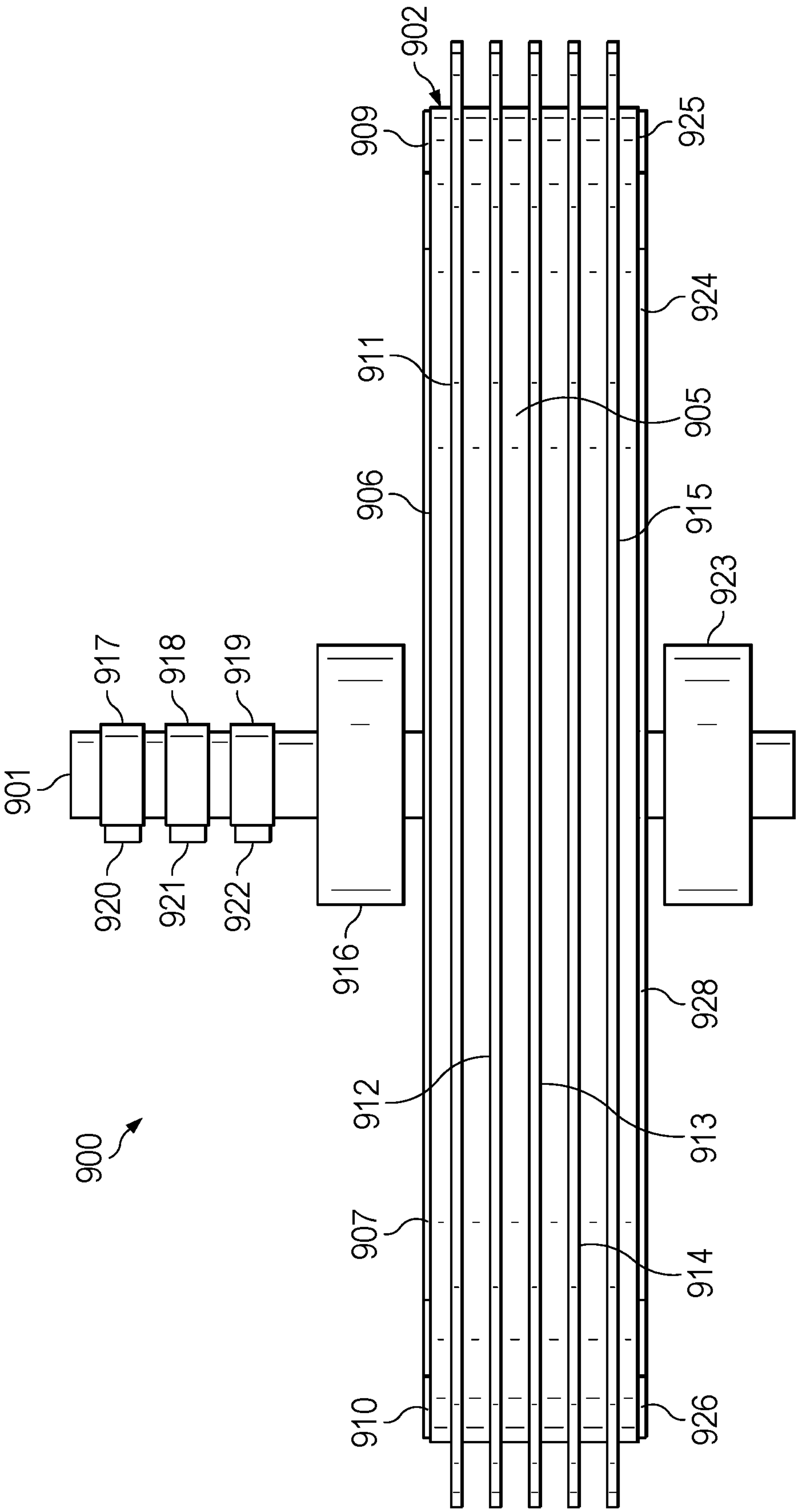
Figure 171:
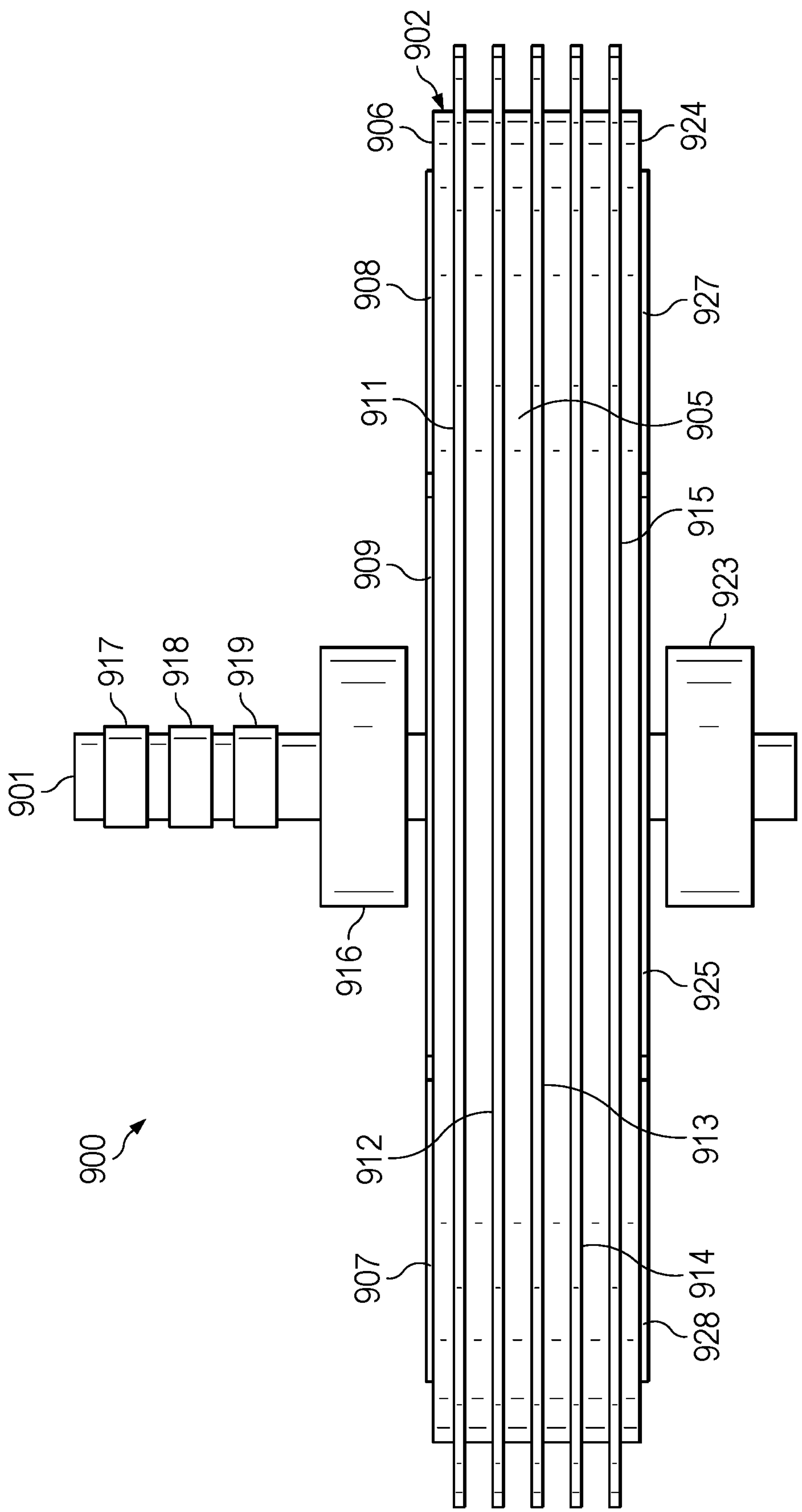
Figure 172:
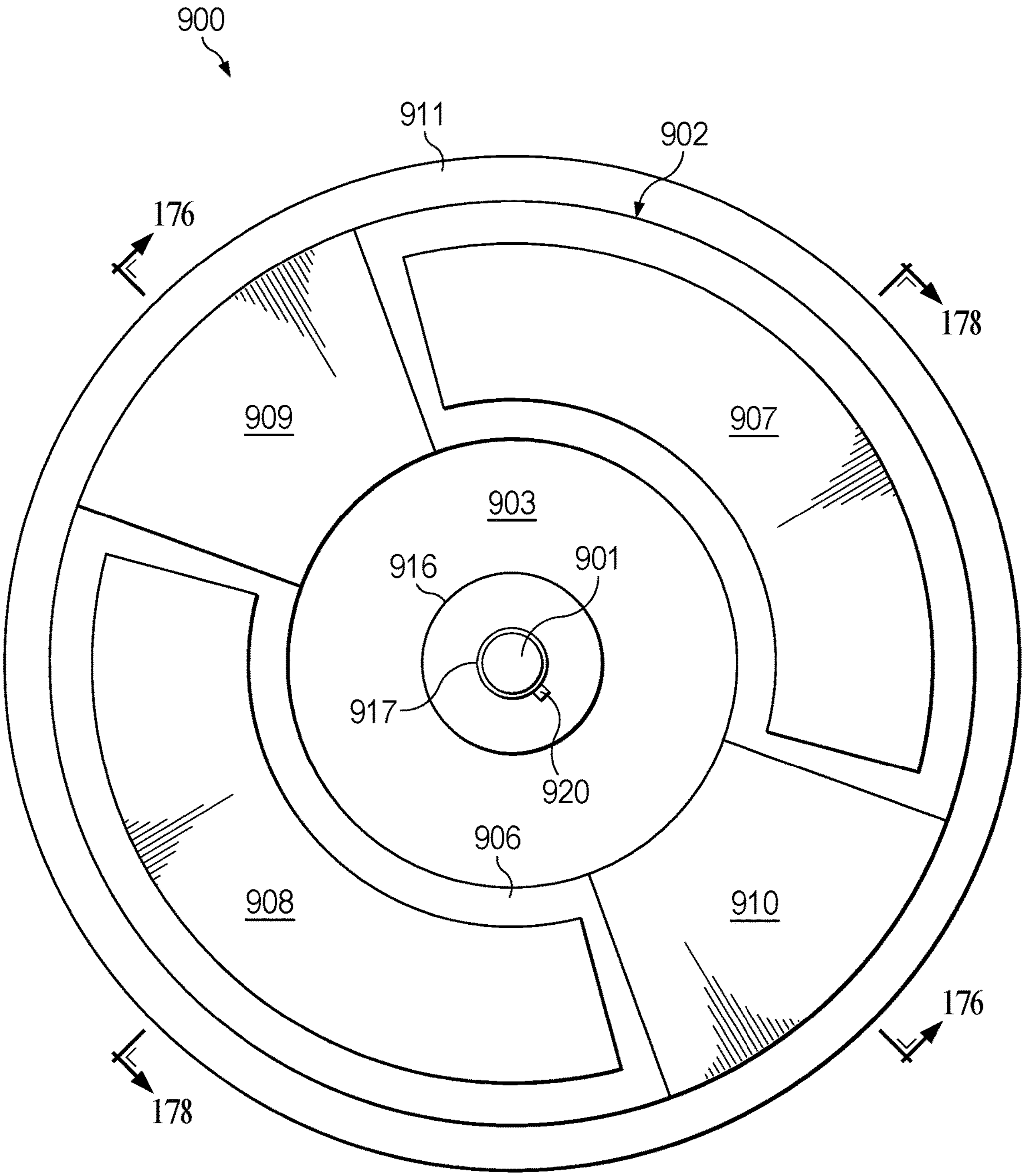
Figure 173:
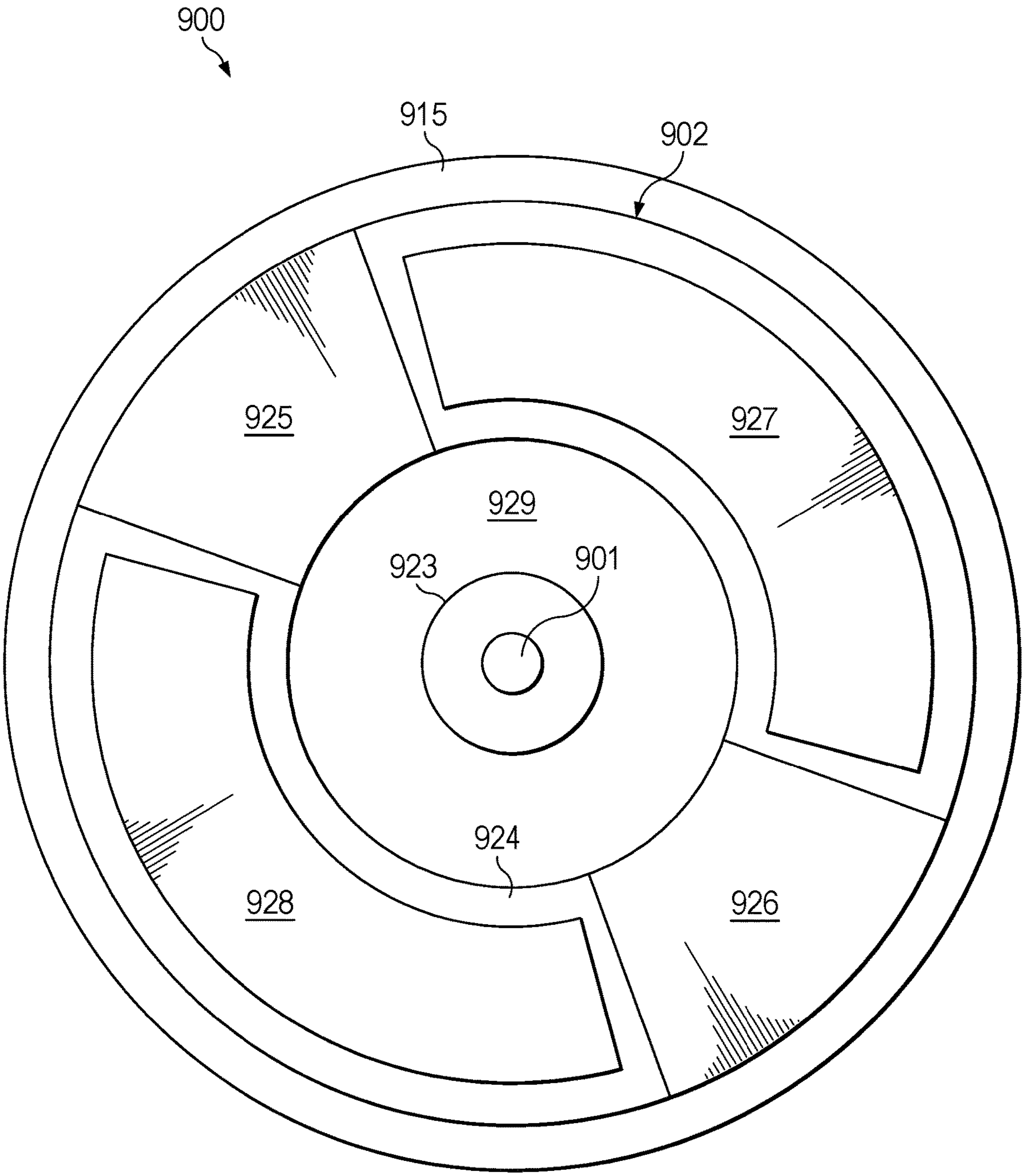
Figure 174:
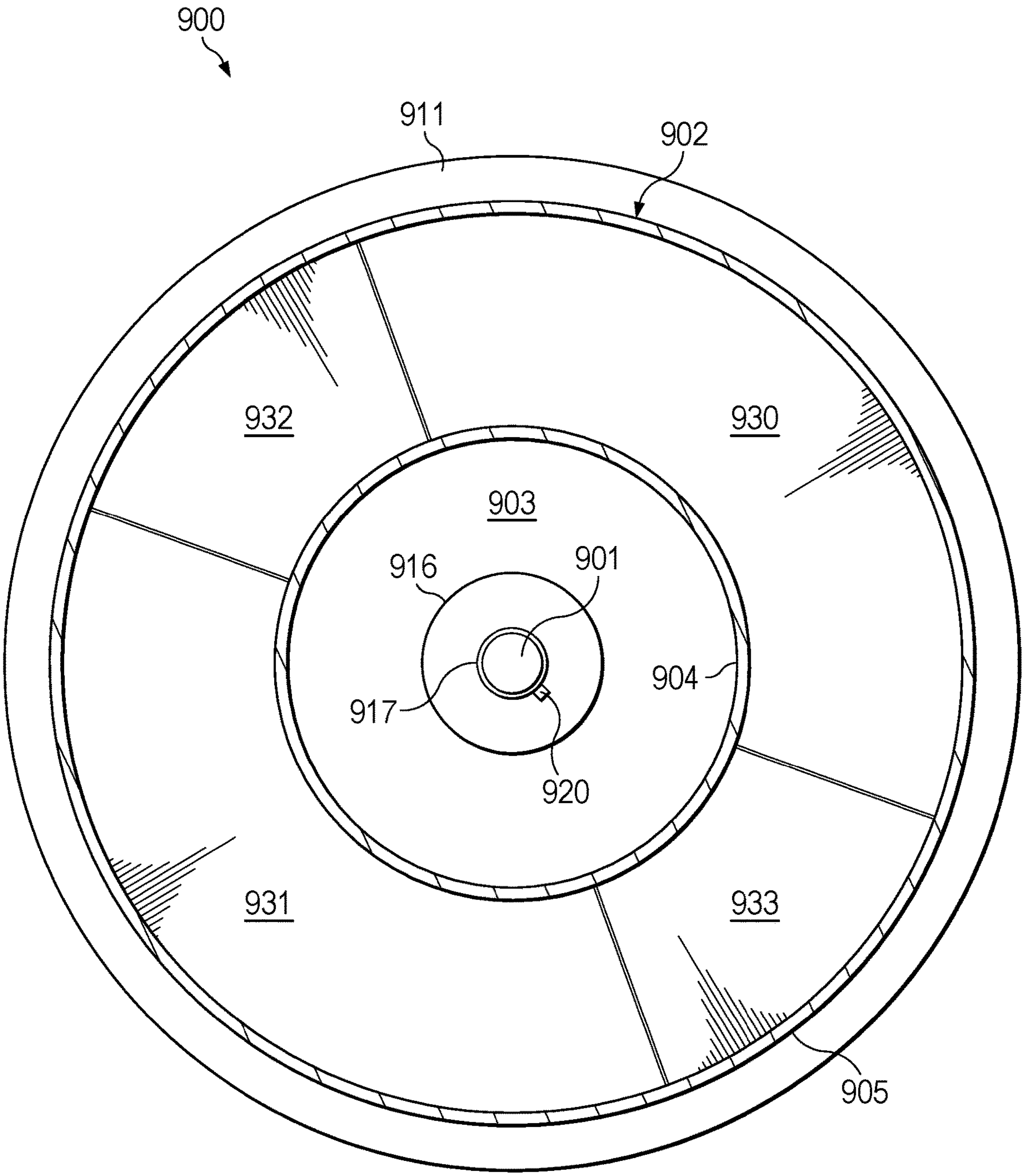
Figure 175:
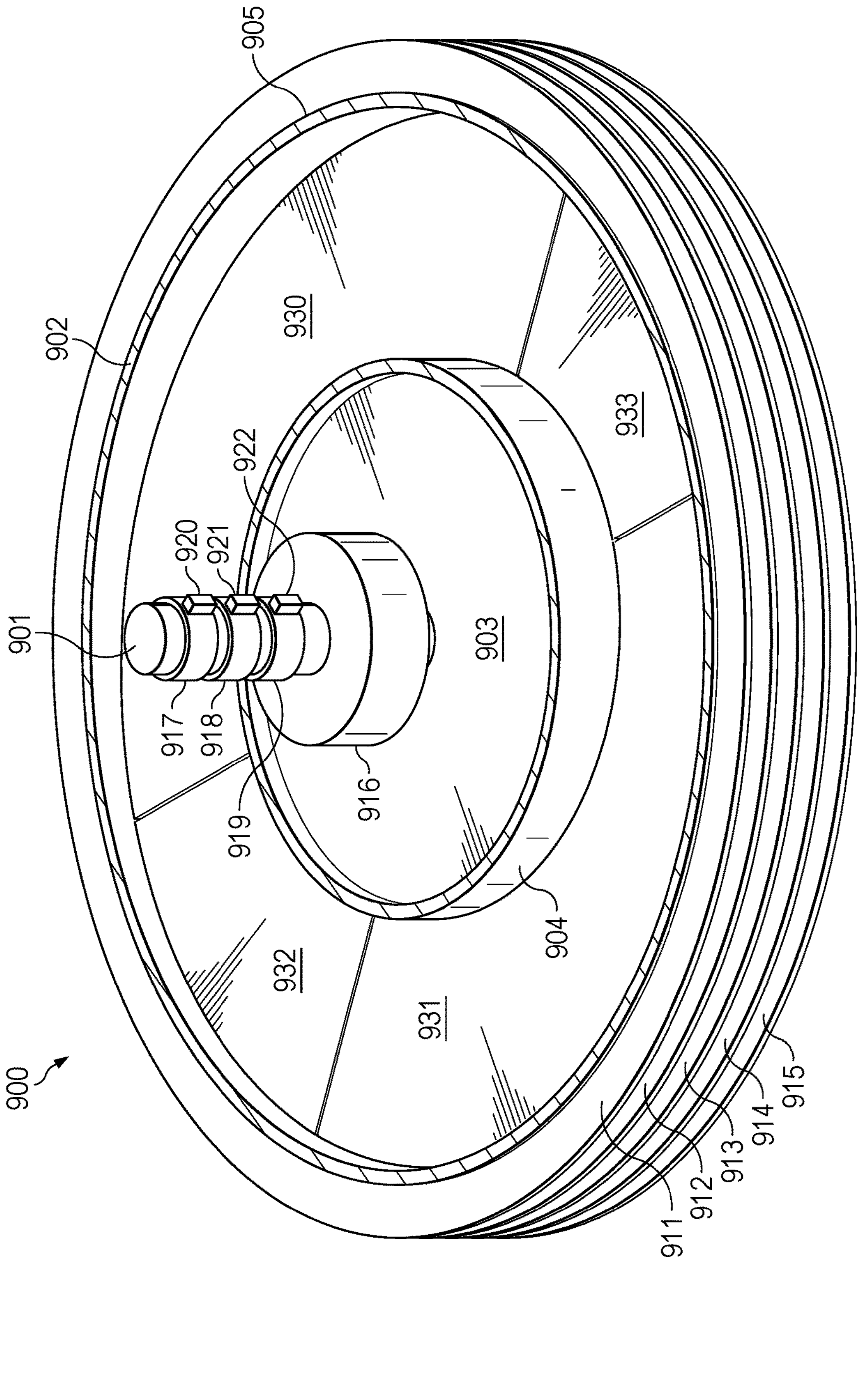
Figure 176:
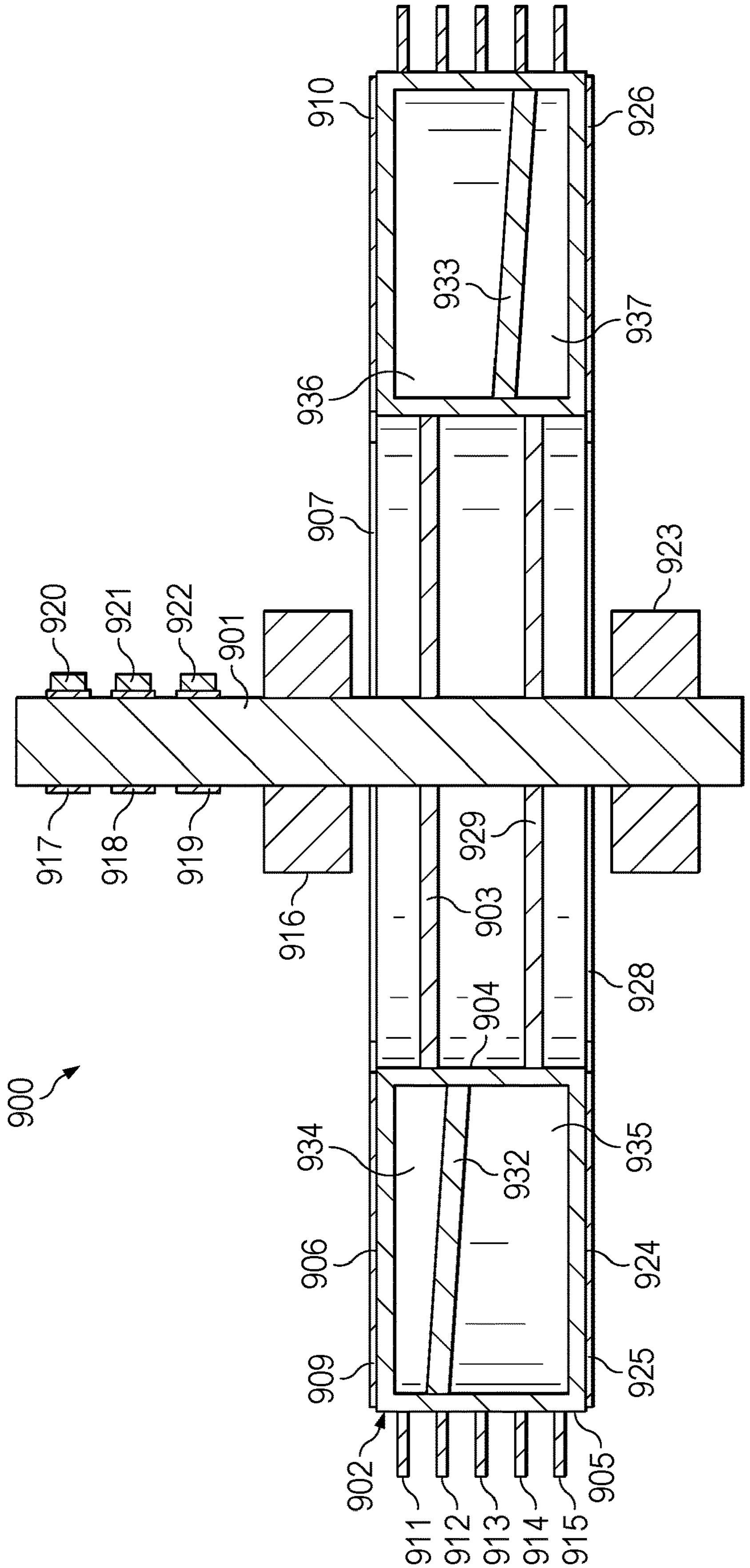
Figure 177:
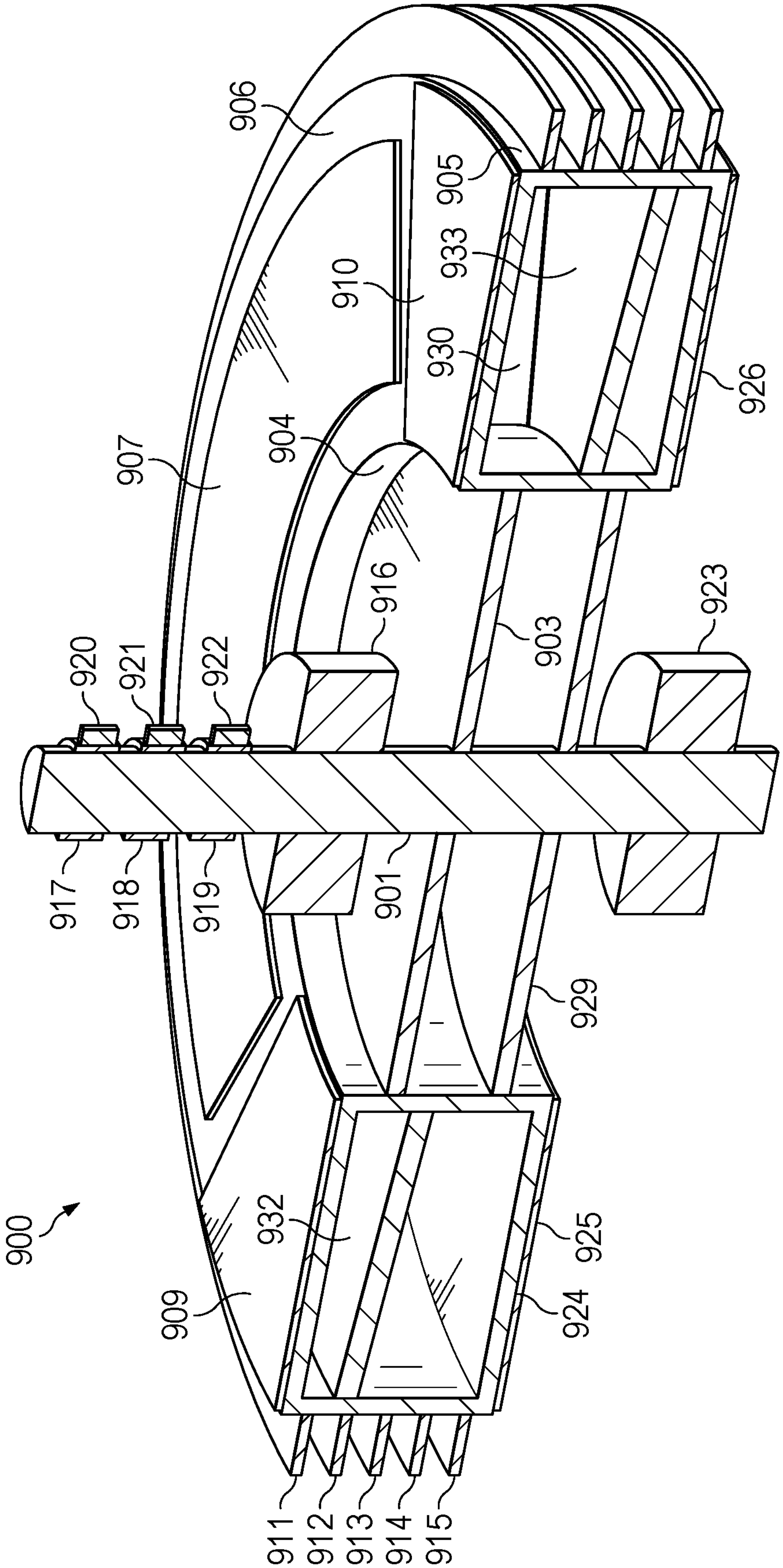
Figure 178:
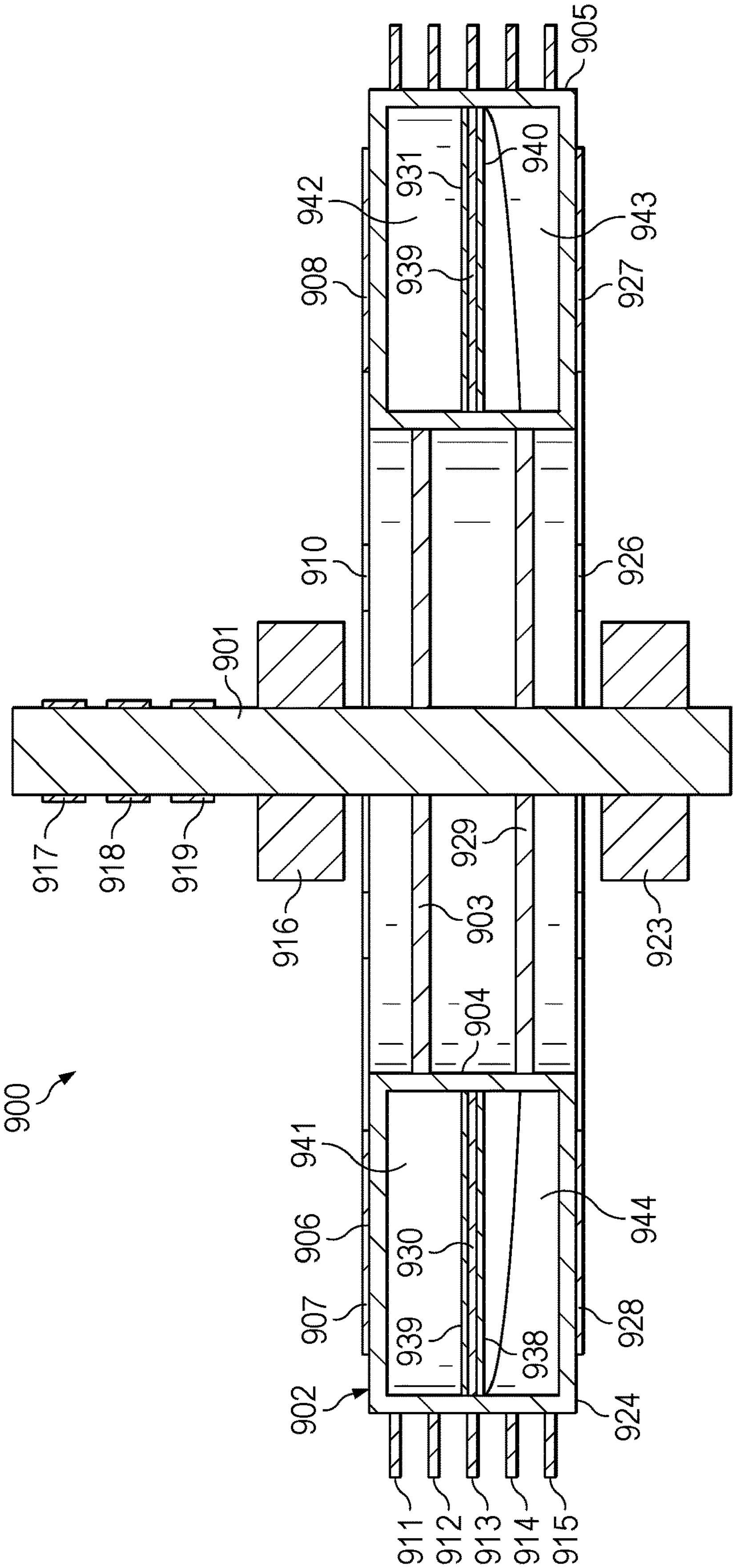
Figure 179:
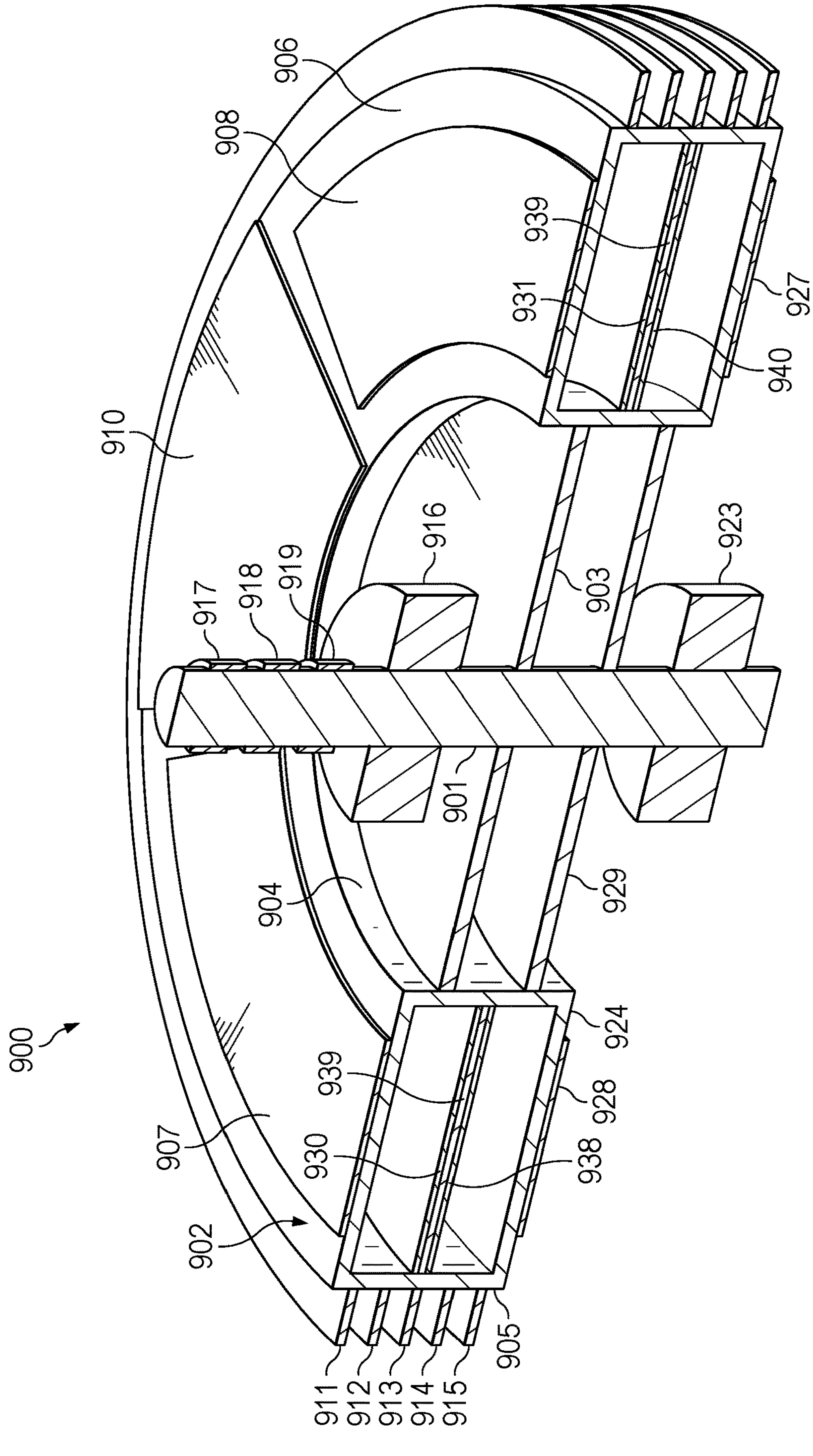
Figure 180:
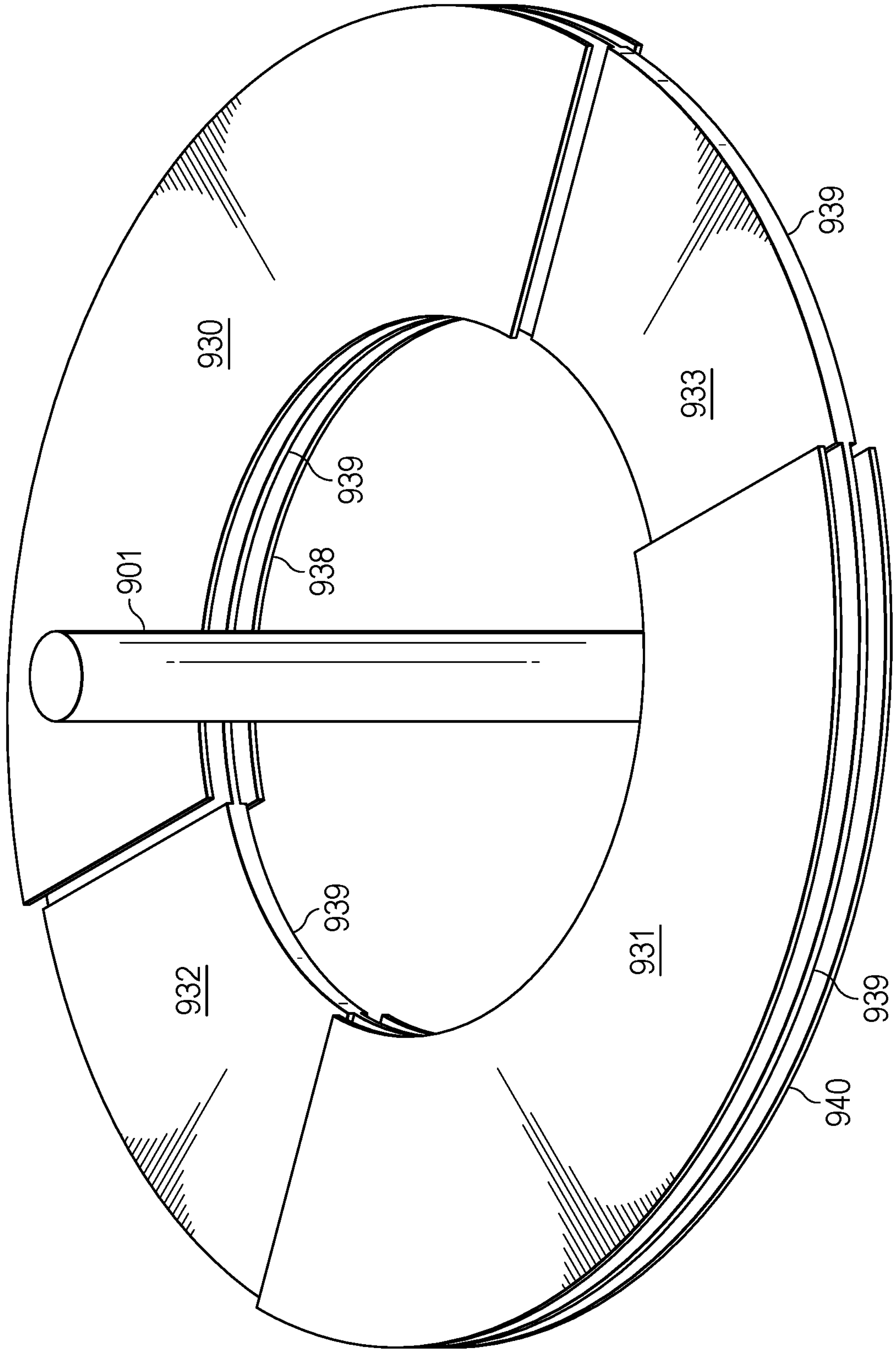
Figure 181:
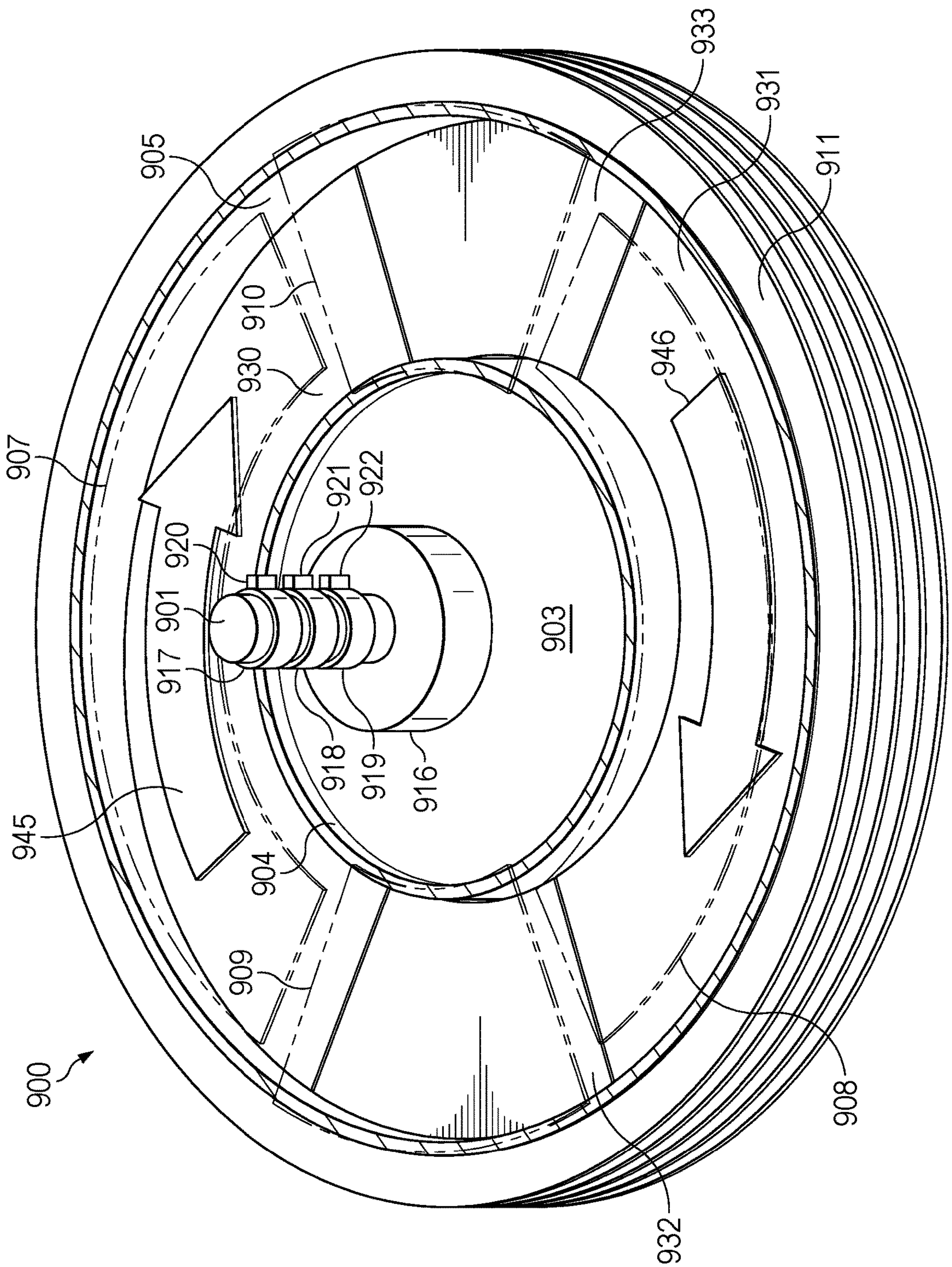
Figure 182:
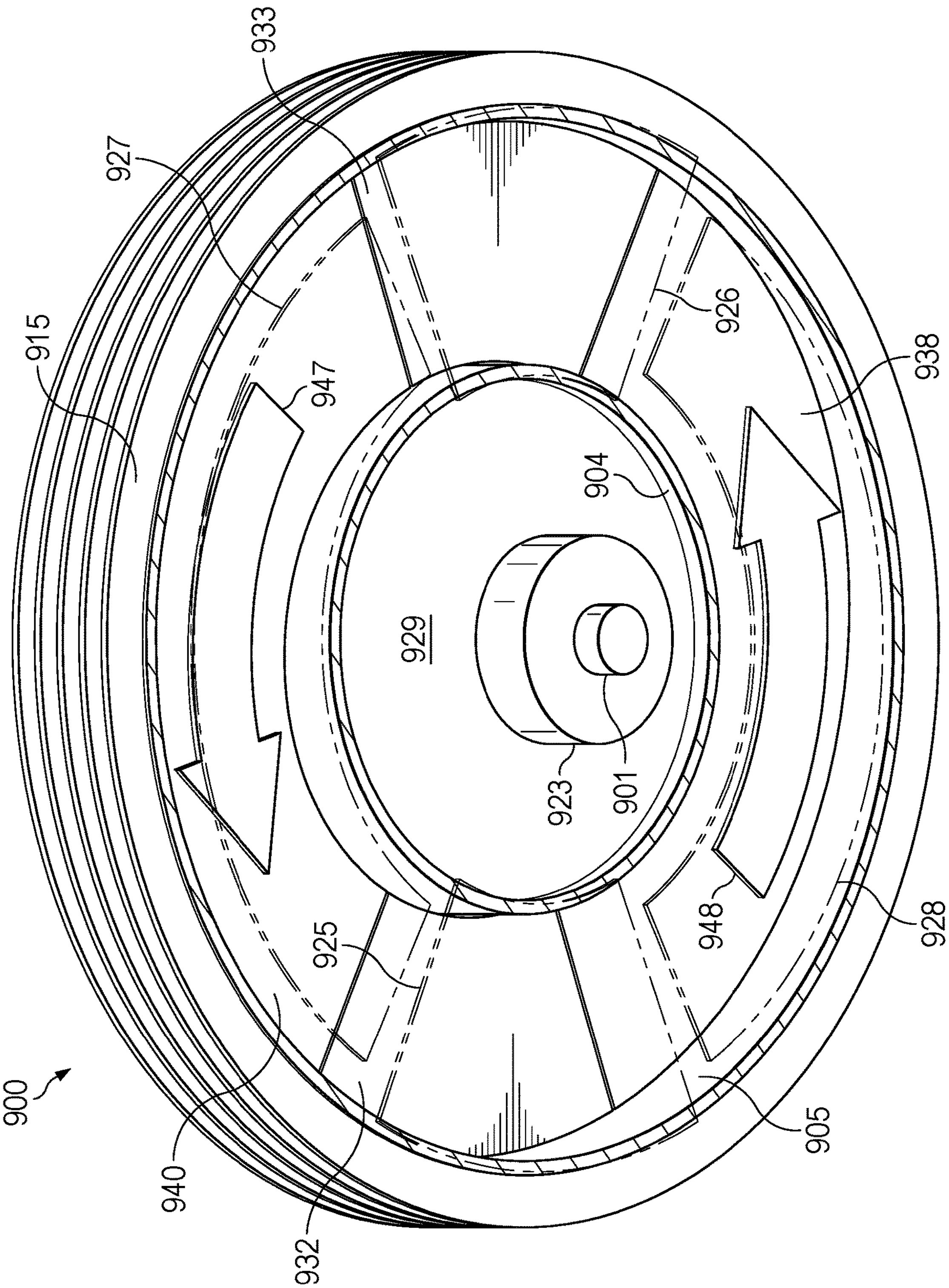
Figure 183:
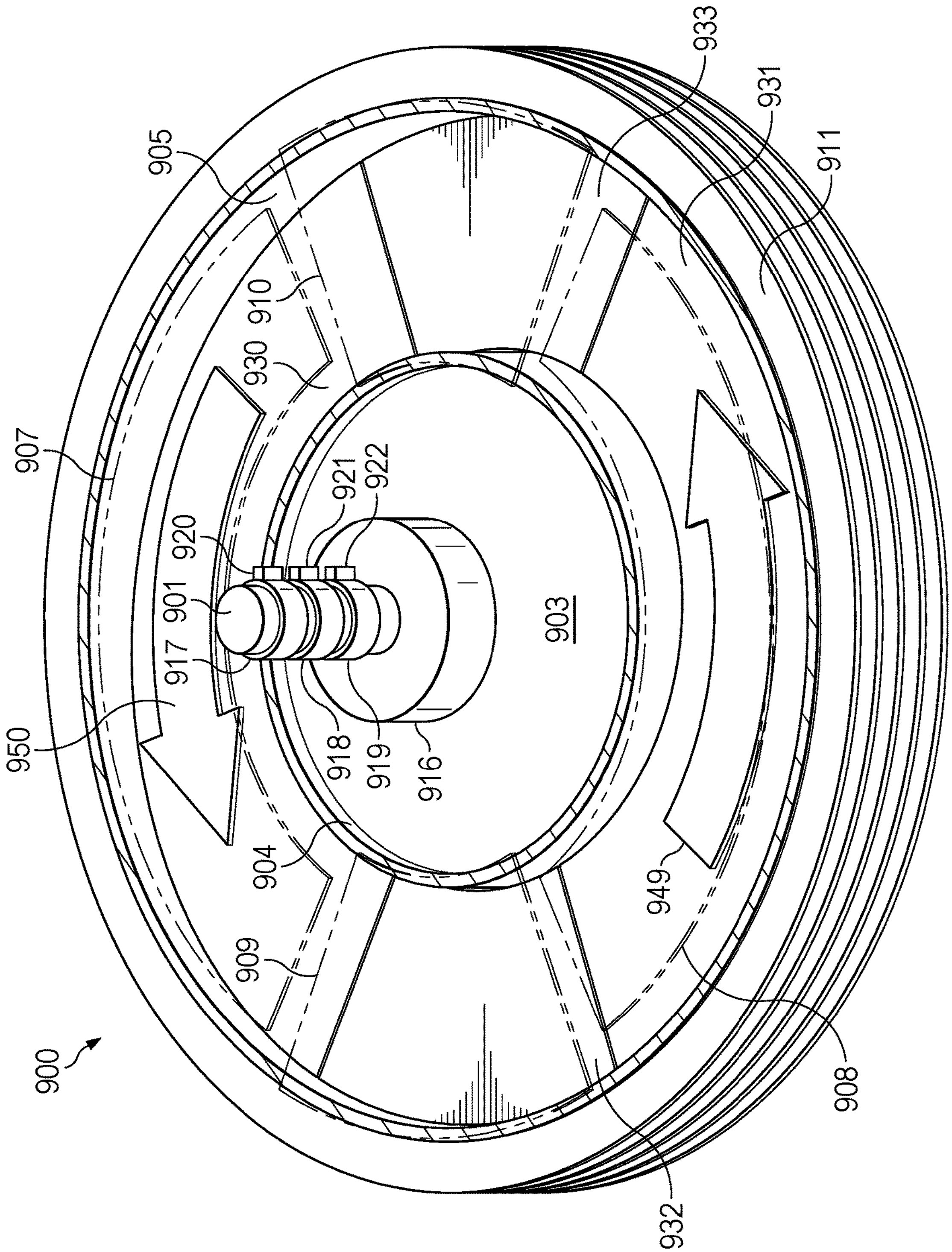
Figure 184:
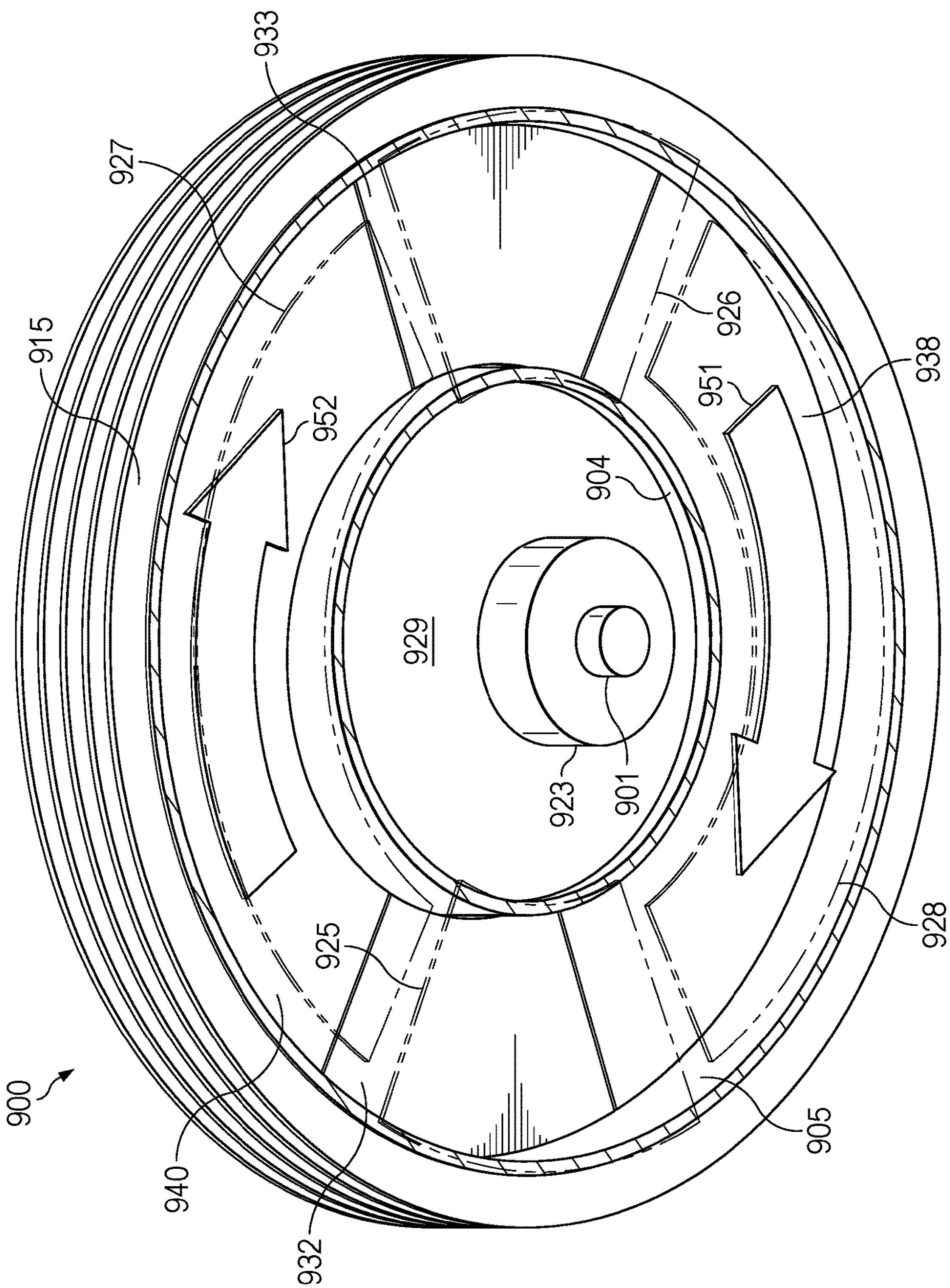
Figure 185:
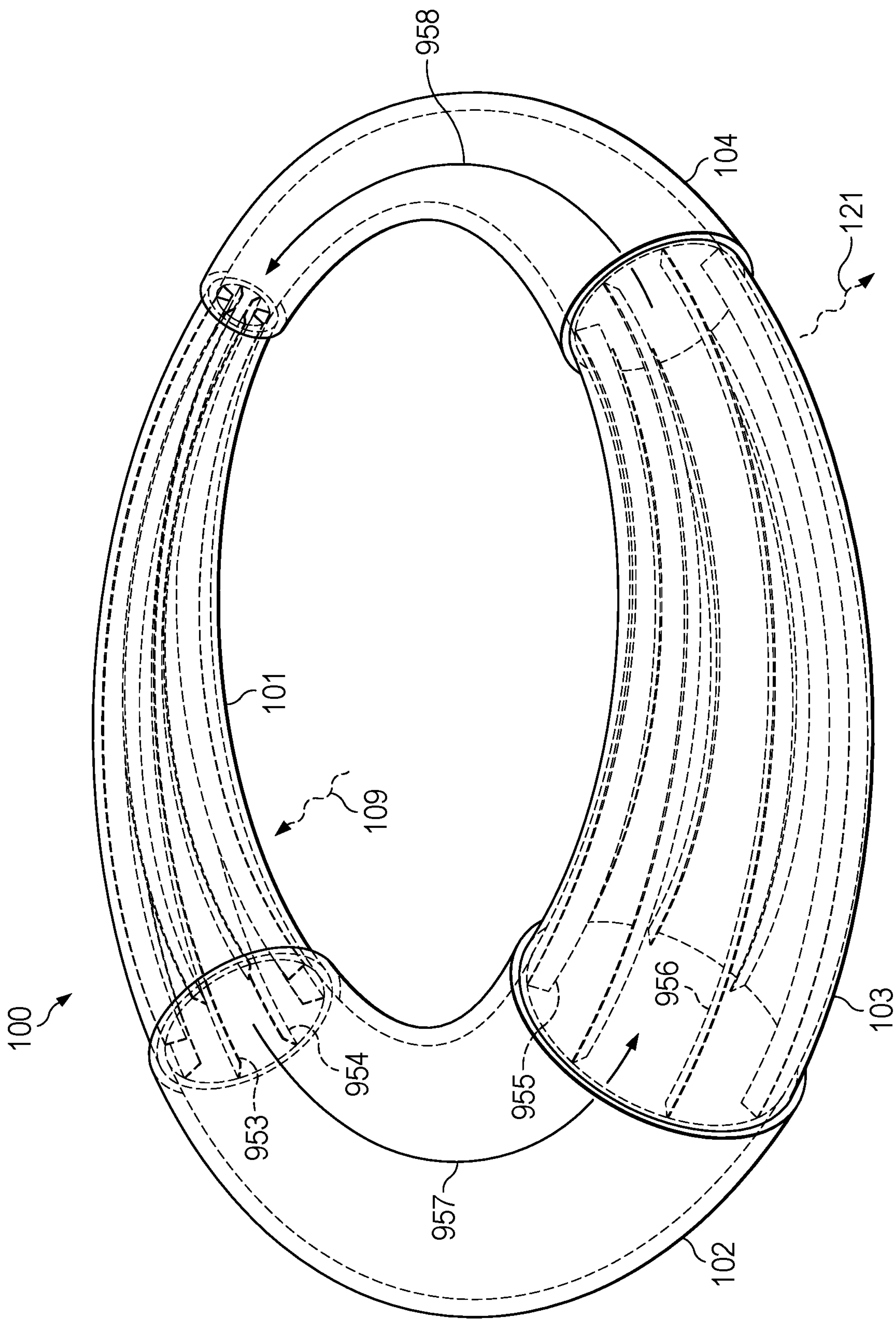
Figure 186:
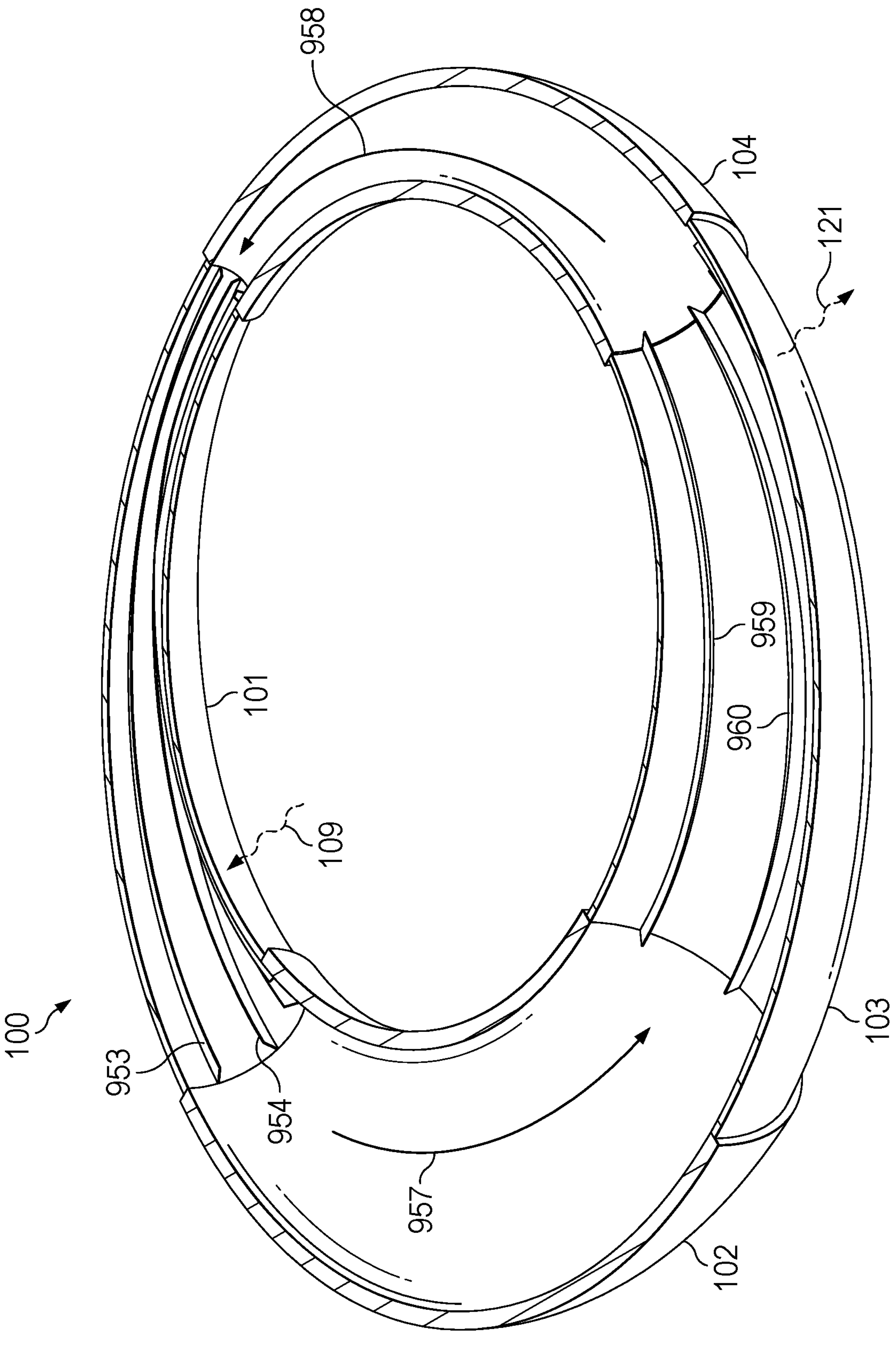
Figure 187:
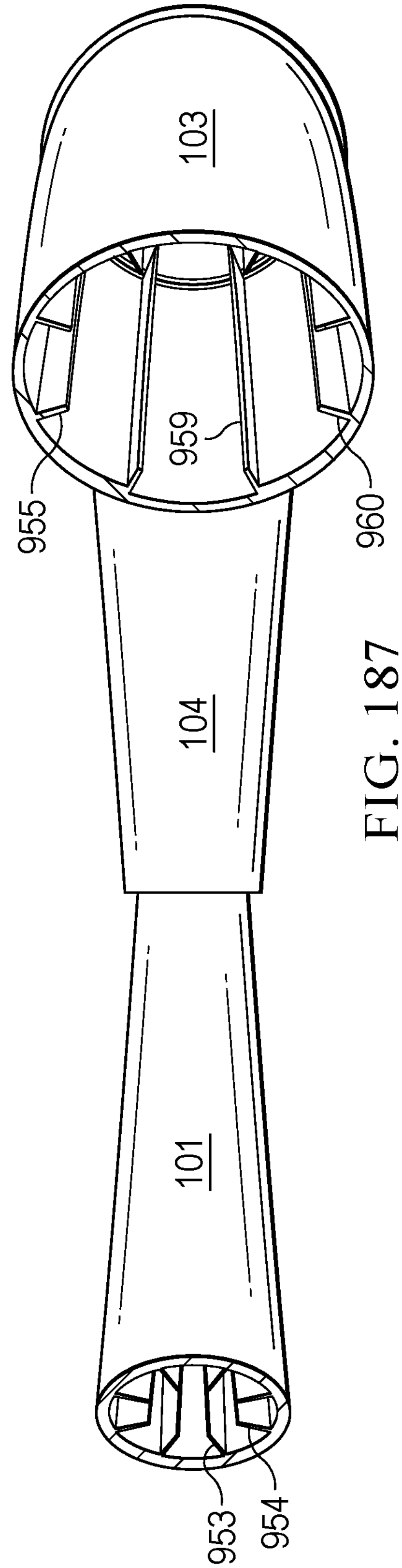
Figure 188:
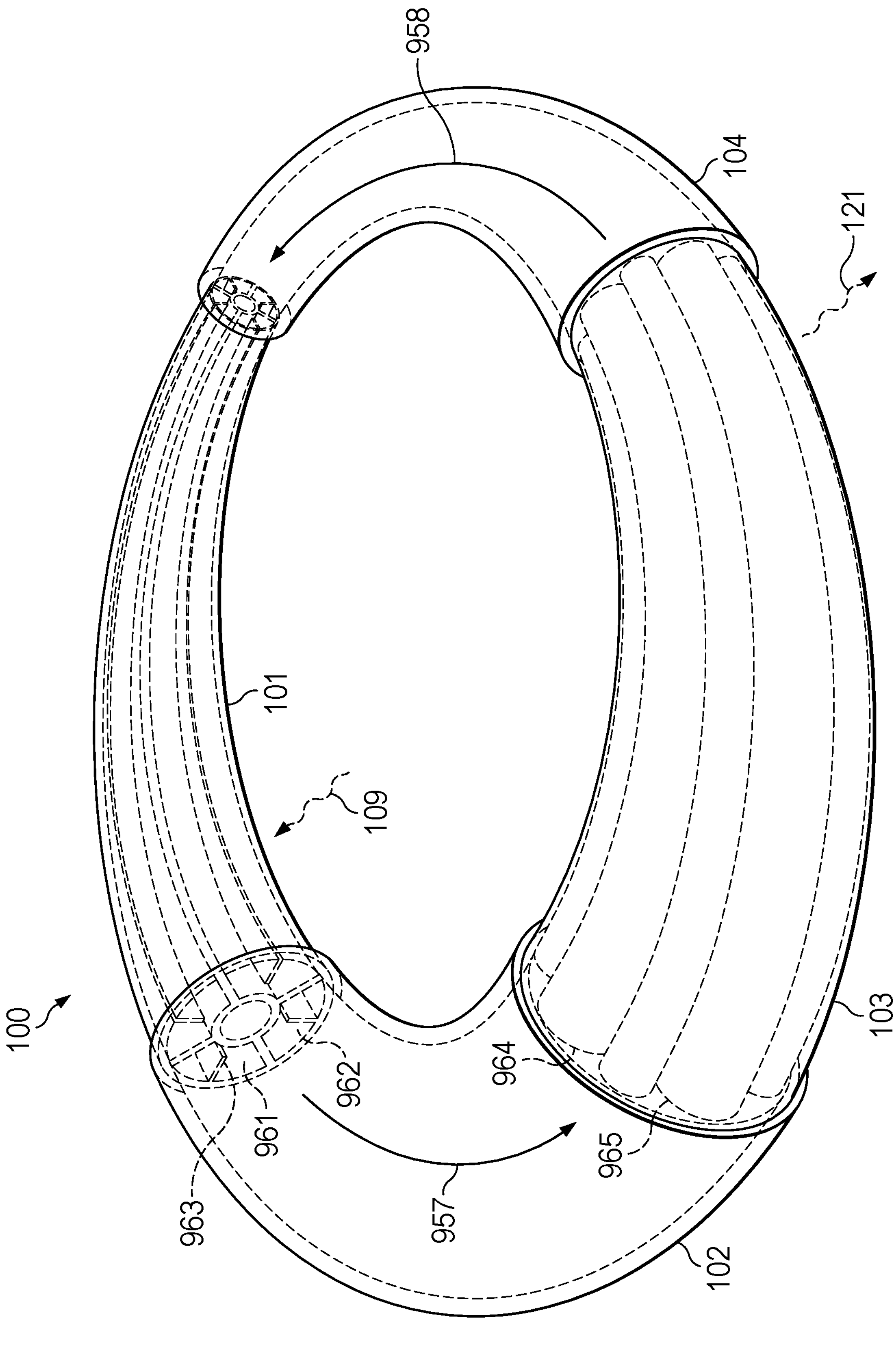
Figure 189:
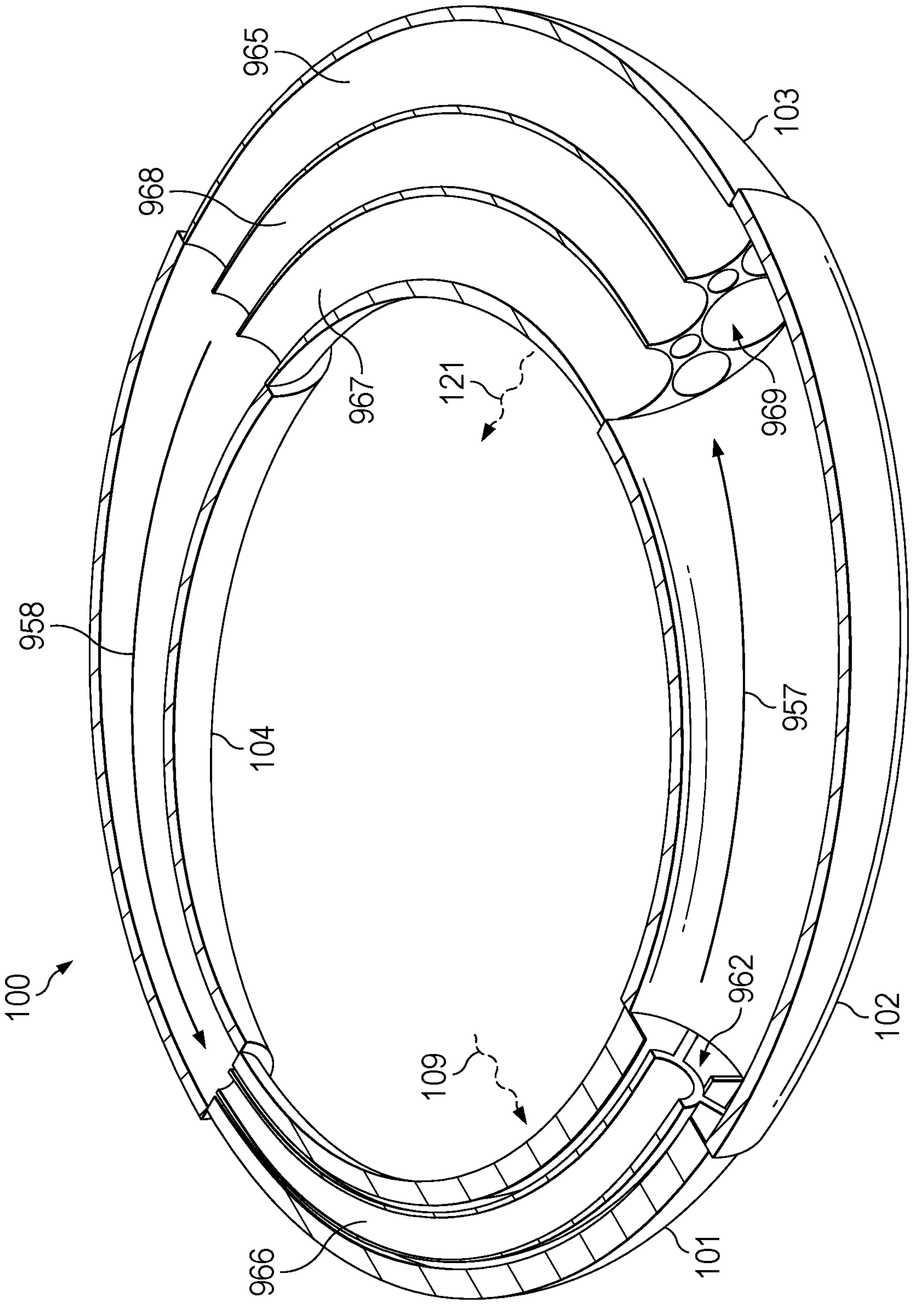
Figure 190:
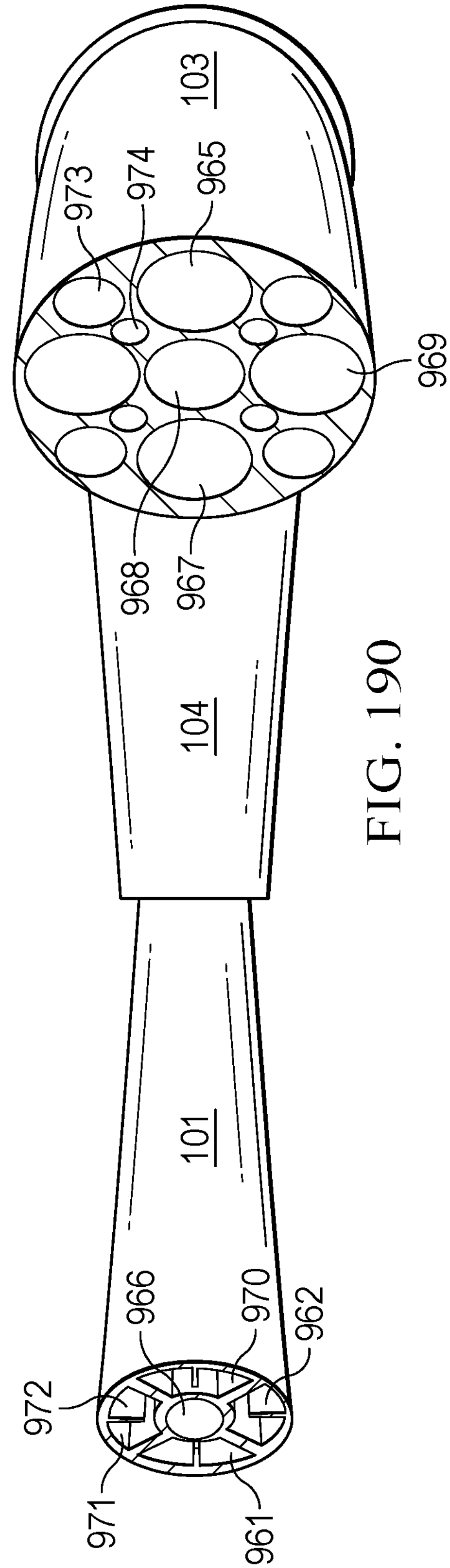

FIG. 132 shows a perspective side sectional view of the eleventh embodiment of the present invention;

FIG. 133 shows a side view of a modified version of the eleventh embodiment of the present invention;

FIG. 134 shows a perspective side view of a twelfth embodiment of the present disclosure;

FIG. 135 shows a side view of the twelfth embodiment of the present disclosure;

FIG. 136 shows a side view of the twelfth embodiment of the present disclosure;

FIG. 137 shows a side view of the twelfth embodiment of the present disclosure;

FIG. 138 shows a side view of the twelfth embodiment of the present disclosure;

FIG. 139 shows a top-down view of the twelfth embodiment of the present disclosure;

FIG. 140 shows a bottom-up view of the twelfth embodiment of the present disclosure;

FIG. 141 shows a side sectional view of the twelfth embodiment of the present disclosure;

FIG. 142 shows a top-down sectional view of the twelfth embodiment of the present disclosure;

FIG. 143 shows a perspective side sectional view of the twelfth embodiment of the present disclosure;

FIG. 144 shows a side sectional view of the twelfth embodiment of the present disclosure;

FIG. 145 shows a perspective side sectional view of the twelfth embodiment of the present disclosure;

FIG. 146 shows a perspective side view of a modified version of the twelfth embodiment of the present disclosure;

FIG. 147 shows a top-down view of the modified version of the twelfth embodiment of the present disclosure;

FIG. 148 shows a side sectional view of the modified version of the twelfth embodiment of the present disclosure;

FIG. 149 shows a perspective side view of a thirteenth embodiment of the present disclosure;

FIG. 150 shows a side view of a thirteenth embodiment of the present disclosure;

FIG. 151 shows a side view of a thirteenth embodiment of the present disclosure;

FIG. 152 shows a side view of a thirteenth embodiment of the present disclosure;

FIG. 153 shows a side view of a thirteenth embodiment of the present disclosure;

FIG. 154 shows a top-down view of a thirteenth embodiment of the present disclosure;

FIG. 155 shows a bottom-up view of a thirteenth embodiment of the present disclosure;

FIG. 156 shows a top-down sectional view of a thirteenth embodiment of the present disclosure;

FIG. 157 shows a perspective view of a side sectional view of a thirteenth embodiment of the present disclosure;

FIG. 158 shows a side sectional view of a thirteenth embodiment of the present disclosure;

FIG. 159 shows a perspective view of a side sectional view of a thirteenth embodiment of the present disclosure;

FIG. 160 shows a side sectional view of a thirteenth embodiment of the present disclosure;

FIG. 161 shows a perspective view of a side sectional view of a thirteenth embodiment of the present disclosure;

FIG. 162 is an illustration of the channel separation barrier of a thirteenth embodiment of the present disclosure;

FIG. 163 is an illustration of the upper fluid channel of a thirteenth embodiment of the present disclosure;

FIG. 164 is an illustration of the lower fluid channel of a thirteenth embodiment of the present disclosure;

FIG. 165 is an illustration of the upper fluid channel of a thirteenth embodiment of the present disclosure;

FIG. 166 is an illustration of the lower fluid channel of a thirteenth embodiment of the present disclosure;

FIG. 167 shows a perspective side view of a fourteenth embodiment of the present disclosure;

FIG. 168 shows a side view of a fourteenth embodiment of the present disclosure;

FIG. 169 shows a side view of a fourteenth embodiment of the present disclosure;

FIG. 170 shows a side view of a fourteenth embodiment of the present disclosure;

FIG. 171 shows a side view of a fourteenth embodiment of the present disclosure;

FIG. 172 shows a top-down view of a fourteenth embodiment of the present disclosure;

FIG. 173 shows a bottom-up view of a fourteenth embodiment of the present disclosure;

FIG. 174 shows a top-down sectional view of a fourteenth embodiment of the present disclosure;

FIG. 175 shows a perspective view of a top-down sectional view of a fourteenth embodiment of the present disclosure;

FIG. 176 shows a side sectional view of a fourteenth embodiment of the present disclosure;

FIG. 177 shows a perspective view of a side sectional view of a fourteenth embodiment of the present disclosure;

FIG. 178 shows a side sectional view of a fourteenth embodiment of the present disclosure;

FIG. 179 shows a perspective view of a side sectional view of a fourteenth embodiment of the present disclosure;

FIG. 180 is an illustration of the channel separation barrier of a fourteenth embodiment of the present disclosure;

FIG. 181 shows a perspective top-down sectional view of a fourteenth embodiment of the present disclosure;

FIG. 182 shows a perspective bottom-up sectional view of a fourteenth embodiment of the present disclosure;

FIG. 183 shows a perspective top-down sectional view of a fourteenth embodiment of the present disclosure;

FIG. 184 shows a perspective bottom-up sectional view of a fourteenth embodiment of the present disclosure;

FIG. 185 shows a semi-transparent perspective side view of a modified version of the first embodiment of the present disclosure;

FIG. 186 shows a perspective top-down sectional view of a modified version of the first embodiment of the present disclosure;

FIG. 187 shows a perspective side sectional view of a modified version of the first embodiment of the present disclosure;

FIG. 188 shows a semi-transparent perspective side view of a modified version of the first embodiment of the present disclosure;

FIG. 189 shows a perspective top-down sectional view of a modified version of the first embodiment of the present disclosure;

FIG. 190 shows a perspective side sectional view of the same modified version of the first embodiment of the present disclosure;

DETAILED DESCRIPTIONS OF THE EMBODIMENTS

For a fuller understanding of the nature and objects of the invention, reference should be made to the preceding Summary of the Invention, taken in connection with the accompanying drawings. The following figures offer explanatory illustrations. The following figures, and the illustrations offered therein, in no way constitute limitations, either explicit or implicit, of the present invention and/or of the present disclosure.

Figure 1:
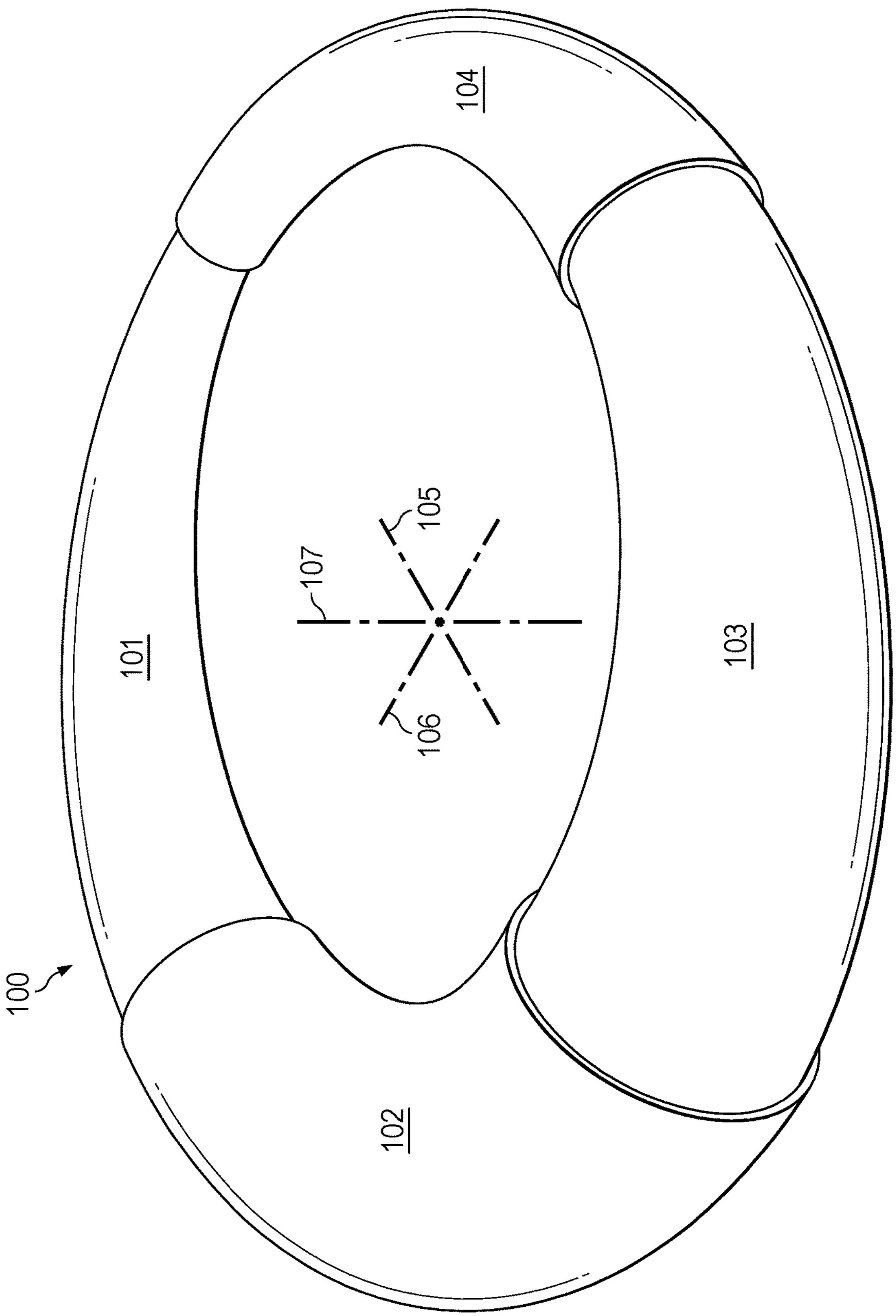
FIG. 1 is a perspective top-down view of a first embodiment of the present invention.

FIG. 1 shows a perspective top-down view of a first embodiment 100 of the present disclosure. The embodiment comprises a hollow toroidal tubular channel structure the channel walls 101-104, shell, hull, casing, and/or body of which surrounds, hermetically seals, encases, and/or encloses, a respective single fluid-flow toroidal tubular channel (not visible). The hollow toroidal tubular channel structure is divided into, and/or comprised of, four fluidly-connected and fluidly-interconnected toroidal tubular channel sections, segments, portions, and/or parts.

Two of the toroidal tubular channel sections, i.e. the embodiment's "warming," and/or isothermal expansion," channel section 101 and the embodiment's "cooling," and/or isothermal contraction, channel section 103, of the embodiment's toroidal tubular channel shell, are thermally-conductive and thermally connect respective portions of the embodiment's internal fluid-flow channel to the surroundings, exterior, and/or environment, of the embodiment, and/or of the respective portions of the embodiment's toroidal tubular channel shell, and tend to offer little, if any, resistance to a conduction and/or a transmission of thermal energy across and/or through the respective toroidal tubular channel walls.

Two other toroidal tubular channel sections, i.e. the embodiment's "adiabatic-expansion" channel section 102 and the embodiment's "adiabatic-compression" channel section 104, of the embodiment's toroidal tubular channel shell, are thermally insulating and/or insulated, and are interposed between, adjacent to, and fluidly connected with, the embodiment's two thermally-conductive toroidal tubular channel sections 101 and 103. The two thermally insulated toroidal tubular channel sections 102 and 104 resist to a significant degree, if not entirely, the conduction and/or transmission of thermal energy across and/or through their respective channel walls.

An approximately planar circular fluid-flow path (not visible), fluid-flow axis, and/or fluid-flow centerline, exists within, and passes through, an interior of the embodiment's toroidal tubular fluid-flow channel (not visible) and defines an embodiment-specific "fluid-flow plane". Axes 105 and 106 are positioned within the embodiment's fluid-flow plane. Axis 107 defines an embodiment-specific axis of rotation and is approximately, if not entirely, normal to the embodiment's fluid-flow plane, and is positioned near, if not at, a radial center of the embodiment's approximately circular fluid-flow path.

Not shown is a heat-conduction, heat-conducting, and/or "working," fluid, e.g., gas, liquid, and/or phase-changing gas and liquid, within an interior and/or lumen (not visible) of the embodiment's interior toroidal fluid-flow channel, wherein the toroidal fluid-flow channel is positioned inside and/or within the embodiment's respective toroidal tubular channel shell 101-104. The embodiment's working fluid has a heat capacity and tends to respond to a conduction, transmission, influx, addition, and/or receipt, of thermal energy into an interior of the embodiment's warming toroidal tubular channel section 101 by expanding, and/or manifesting an increase in its volume per unit of working fluid mass (with a corresponding decrease in the density) of that "warmed" working fluid. The working fluid tends to respond to a conduction, transmission, outflux, reduction, and/or loss, of thermal energy out of, and/or from, an interior of the embodiment's cooling toroidal tubular channel section 103 by contracting, and/or manifesting a decrease in its volume per unit of working fluid mass (with a corresponding increase in the density), of that "cooled" working fluid.

When the embodiment experiences a net inflow of thermal energy at, and/or into, its warming toroidal tubular channel section 101, and/or the respective portion (not visible) of its internal fluid-flow channel, and/or experiences a net outflow of thermal energy from its cooling toroidal tubular channel section 103, and/or the respective portion (not visible) of its internal fluid-flow channel, then the embodiment's working fluid (not shown) tends to respond and/or react by flowing in a first direction through and/or about the embodiment's approximately circular, and/or toroidal, internal fluid-flow channel (not visible) which fluid-flow channel is positioned within, and/or defined by, the embodiment's toroidal tubular channel shell 101-104, with the result being that the so flowing working fluid tends to flow through the embodiment in an approximately circular, and/or toroidal, path, and in a first rotational direction, about the embodiment's axis of rotation 107.

In response to an inflow of thermal energy into the working fluid within the isothermal expansion channel section 101 of the embodiment's toroidal tubular fluid-flow channel, the working fluid heated therein will tend to expand and flow out of that isothermal expansion channel section, and therefrom flow into the succeeding adjacent adiabatic expansion channel section 102. Furthermore, in response to an outflow of thermal energy from the working fluid within its isothermal contraction channel section 103, the working fluid heated therein will tend to contract thereby creating a partial vacuum that will tend to pull expanding working from out of the preceding adjacent adiabatic expansion channel section.

Similarly, in response to an outflow of thermal energy from the working fluid within its isothermal contraction channel section 103, the working fluid cooled therein tends to contract causing its volume per unit working-fluid mass to decrease, and/or causing its density (working-fluid mass per unit volume) to increase. The resulting contracted working fluid then tends to be pushed into and through the succeeding adjacent adiabatic compression channel section 104 as a result of the rotation of the embodiment. Furthermore, the centrifugal forces caused by, and/or resulting from, the rotations of the embodiment tend to compress the cooled and contracted working fluid as it flows through the adiabatic compression channel section. Eventually, the centrifugal forces caused by the rotations of the embodiment tend to push the compressed and cooled working fluid out of the adiabatic compression channel section, and (back) into the isothermal expansion channel section 101—where the cyclic heating and cooling, and working-fluid flow, will continue.

The resulting thermally-driven, and/or thermally-induced, annular, toroidal, and approximately circular flow, and/or rotation, of the embodiment's working fluid through the embodiment's internal toroidal fluid-flow channel tends to result in a counter rotation, and/or recoil, of the embodiment's toroidal tubular shell in a second and opposite rotational direction about the embodiment's axis of rotation.

A conservation of angular momentum tends to cause the thermally-driven circular flow of the embodiment's working fluid in a first rotational direction within the embodiment's circular fluid-flow channel (not visible) within the embodiment's toroidal tubular channel shell 101-104, to be balanced by, and/or to create as a reaction, and/or a recoil, a counter rotation of the embodiment's toroidal tubular shell in a second rotational direction opposite that of the first rotational direction of the flow of the working-fluid.

The embodiment's warming toroidal tubular channel section 101 may be heated by any type, variety, kind, and/or category of thermal source, and/or by heat arising from any type, variety, kind, and/or category of chemical, physical, mechanical, electromagnetic, radiological, and/or motion-related, reaction, interaction, event, process, and/or manifestation. Sources of heat which might warm an embodiment's warming channel section, include, but are not limited to, those which are inherently, or at least partially: chemical, e.g., an exothermic oxidation of iron; electromagnetic, e.g., an illumination with, and/or by, sunlight; radiological, e.g., a proximity to a radioisotope and/or to a decay thereof; compressive, e.g., alterations in the pressure of an adjacent and/or surrounding gas; electrical, e.g., an electrically energized resistive electrical load; and/or magnetic, e.g., an induction of electrical eddy currents in an electrical conductor.

The embodiment's cooling toroidal tubular channel section 103 may be cooled by any type, variety, kind, and/or category of thermal sink, and/or by a cooling arising from any type, variety, kind, and/or category of chemical, physical, mechanical, electromagnetic, and/or motion-related, reaction, interaction, event, process, and/or manifestation. Sources of cold which might cool an embodiment's cooling channel section, include, but are not limited to, those which are inherently, or at least partially: chemical, e.g., an endothermic chemical reaction; a phase-change of a material, e.g., a melting of ice; conductive, e.g., a thermal conduction of heat into an adjacent piece of metal with a large heat capacity; electrical, e.g., a Peltier cooler; and/or electromagnetic, e.g., a radiation of infrared light from an exterior surface of the cooling channel section.

The embodiment's warming toroidal tubular channel section 101, and/or its cooling toroidal tubular channel section 103, may be comprised, fabricated, fashioned, made, and/or created, of any thermally-conductive material of fabrication, and/or of a layered and/or laminate material comprising a thermally-conductive material of fabrication, including, but not limited to, materials of fabrication such as: metal, iron, silver, copper, gold, aluminum nitride, silicon carbide, aluminum, tungsten, and zinc.

The embodiment's "adiabatic-expansion" toroidal tubular channel section 102, and/or its "adiabatic-compression" toroidal tubular channel section 104, may be comprised, fabricated, fashioned, made, created, and/or lined (inside and/or out), of any thermally-insulating material of fabrication, and/or of a layered and/or laminate material comprising a thermally-insulating material of fabrication, including, but not limited to, materials of fabrication such as: plastic, glass, acrylic glass (e.g., Plexiglas), fiberglass, Teflon, polyurethane foam, expanded polystyrene, epoxy, and bronze. The embodiment's "adiabatic-expansion" toroidal tubular channel section, and/or its "adiabatic-compression" toroidal tubular channel section, may also be comprised, fabricated, fashioned, made, and/or created, of a laminate or layers which include a layer, gap, space, and/or partition, comprising, including, and/or incorporating, a thermally-insulating material (e.g., plastic), gas (e.g., nitrogen), void (e.g., partial or full vacuum), and/or metamaterial, which tends to prevent or inhibit a conduction of thermal energy. Such a laminate may include, and/or incorporate, thermally-conductive materials to provide structural strength while, as a whole, being and/or remaining thermally-insulating.

The embodiment of the present disclosure illustrated in FIG. 1 includes, incorporates, utilizes, and/or comprises, one each of a fluidly-interconnected "warming" toroidal tubular channel section 101, an "adiabatic-expansion" toroidal tubular channel section 102, a "cooling" toroidal tubular channel section 103, and an "adiabatic-compression" toroidal tubular channel section 104—in that relative ordering with respect to the nominal direction of working-fluid flow within the embodiment's interior fluid-flow channel (not visible).

Other embodiments of the present disclosure may include any number of "warming" and "cooling" toroidal tubular channel sections. And, with respect to an embodiment's nominal direction of working-fluid flow, any number of an embodiment's "warming" toroidal tubular channel sections may be followed by, and adjacent to, a respective "adiabatic-expansion" toroidal tubular channel section, with the remainder of the embodiment's "warming" toroidal tubular channel sections being followed by, and adjacent to, respective "cooling" toroidal tubular channel sections. Likewise, with respect to an embodiment's nominal direction of working-fluid flow, any number of an embodiment's "cooling" toroidal tubular channel sections may be followed by, and adjacent to, a respective "adiabatic-compression" toroidal tubular channel section, with the remainder of the embodiment's "cooling" toroidal tubular channel sections being followed by, and adjacent to, respective "warming" toroidal tubular channel sections. Embodiments characterized by any number of "warming," "cooling," "adiabatic expansion," and "adiabatic compression," toroidal tubular channel sections, and/or by any relative ordering of those kinds, varieties, and/or types, of toroidal tubular channel sections, are included within the scope of the present disclosure.

The embodiment of the present disclosure illustrated in FIG. 1 includes, incorporates, utilizes, and/or comprises, a "warming" toroidal tubular channel section 101, an "adiabatic-expansion" toroidal tubular channel section 102, a "cooling" toroidal tubular channel section 103, and an "adiabatic-compression" toroidal tubular channel section 104, of approximately equal circumferential, and/or channel, length and/or angular extent (e.g., approximately 90 degrees each with respect to their radial extents within the embodiment's rotational plane, as defined by the plane containing the axes 105 and 106, and about the embodiment's axis of rotation 107). Other embodiments of the present disclosure may include "warming," "cooling," "adiabatic expansion," and "adiabatic compression" toroidal tubular channel sections of any relative radial angular extent about a respective axis of rotation, and/or any absolute and/or relative circumferential, and/or channel, length.

Embodiments characterized by "warming," "cooling," "adiabatic expansion," and "adiabatic compression" toroidal tubular channel sections of any relative radial angular extent, about a respective axis of rotation, and/or of any absolute and/or relative circumferential, and/or channel, length, if any, are included within the scope of the present disclosure. Embodiments characterized by "warming," "cooling," and "adiabatic expansion" (but lacking "adiabatic compression") toroidal tubular channel sections of any relative radial angular extent about a respective axis of rotation, and/or any absolute and/or relative circumferential, and/or channel, length, if any, are included within the scope of the present disclosure. Embodiments characterized by "warming," "cooling," and "adiabatic compression" (but lacking "adiabatic expansion") toroidal tubular channel sections of any relative radial angular extent about a respective axis of rotation, and/or any absolute and/or relative circumferential, and/or channel, length, if any, are included within the scope of the present disclosure. And, embodiments characterized by "warming," and "cooling," (but lacking "adiabatic expansion" and "adiabatic compression") toroidal tubular channel sections of any relative radial angular extent about a respective axis of rotation, and/or any absolute and/or relative circumferential, and/or channel, length, if any, are included within the scope of the present disclosure.

Disclosed herein is a closed-loop, closed-cycle, fluid-flow channel surrounded, encased, enclosed, contained, and/or defined by, and/or hermetically sealed within, a surrounding toroidal tubular channel shell, casing, wall, and/or enclosure, wherein the fluid-flow channel within, and the respective surrounding toroidal tubular channel shell, includes, incorporates, utilizes, and/or comprises, at least one warming toroidal tubular channel section and at least one cooling toroidal tubular channel section for which a warming of the warming channel section, and/or a cooling of the cooling channel section, will tend to cause a working fluid within the respective fluid-flow channel to circulate in an embodiment-specific, and an operational-specific, nominal, and/or first, rotational direction, which will thereby tend to cause, evoke, produce, and/or create, a counter-rotation, and/or a rotational recoil, of the respective toroidal tubular fluid-flow channel, and its respective surrounding toroidal tubular shell, with said channel and shell rotation being in an embodiment-specific, and an operational-specific, nominal, and/or second, rotational direction that is opposite the first rotational direction in which flows the working fluid.

Figure 2:
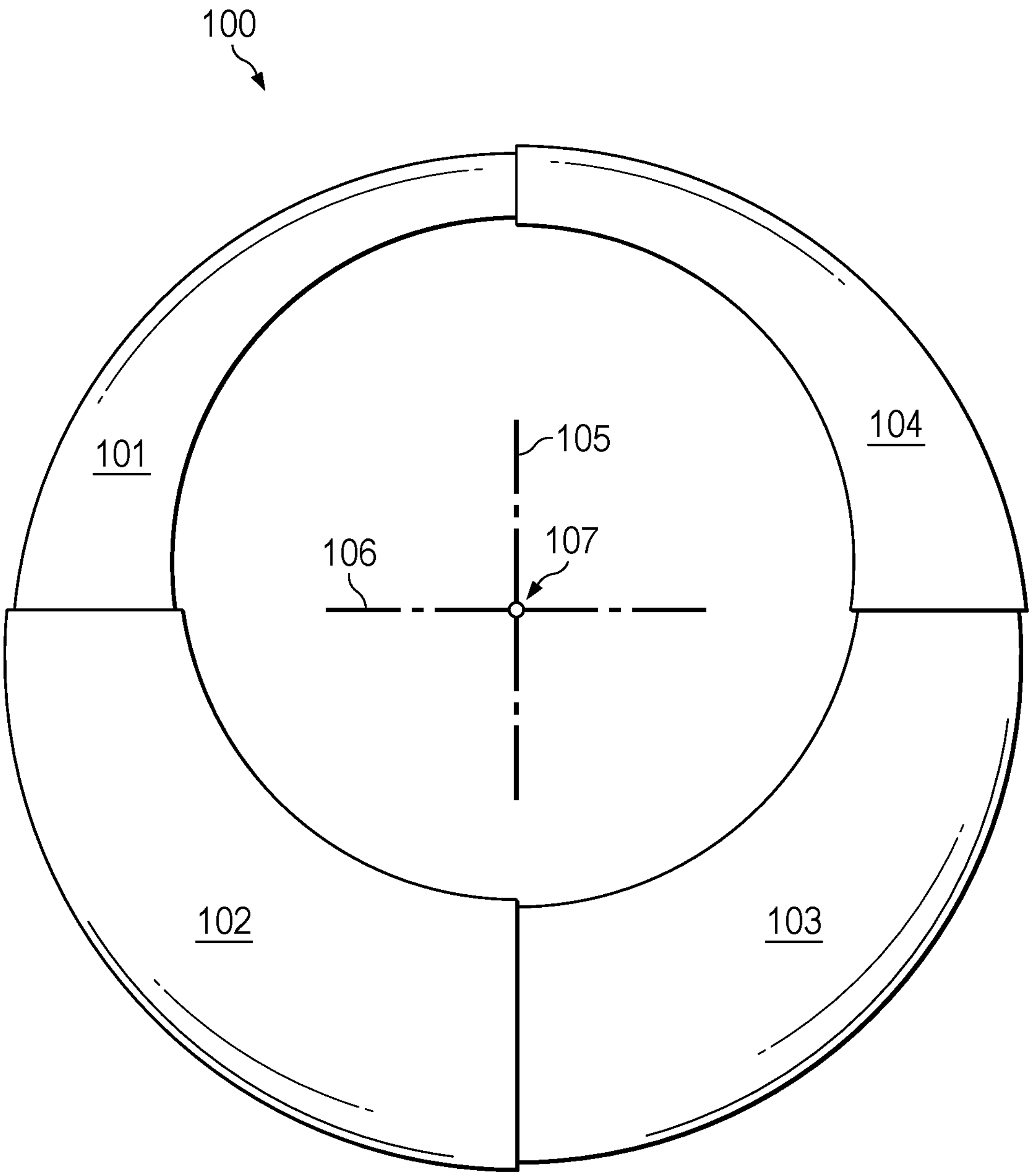
FIG. 2 is a top-down view of the first embodiment of the present invention.

FIG. 2 shows a top-down view of the same embodiment 100 of the present disclosure that is illustrated in FIG. 1. The toroidal tubular channel walls of the "warming" 101 and "cooling" 103 toroidal tubular channel sections are thinner than the walls of the "adiabatic expansion" 102 and "adiabatic compression" 104 toroidal tubular channel sections because, with respect to the illustrated embodiment, the walls of the thermally-conductive "warming" and "cooling" channel sections are made of a relatively thin-walled thermally-conductive metal, while the walls of the thermally insulating "adiabatic expansion" and "adiabatic compression" channel sections are made of a relatively thick-walled thermally insulating plastic. The inner, and/or interior, surfaces of the respective thermally-conductive and thermally-insulating channel sections are aligned so as to reduce any turbulence within a working fluid flowing therethrough, which is why the differences in toroidal tubular channel wall thicknesses of the embodiment illustrated in FIGS. 1 and 2 are most visible on the exterior, and/or from outside, of the embodiment.

Figure 3:
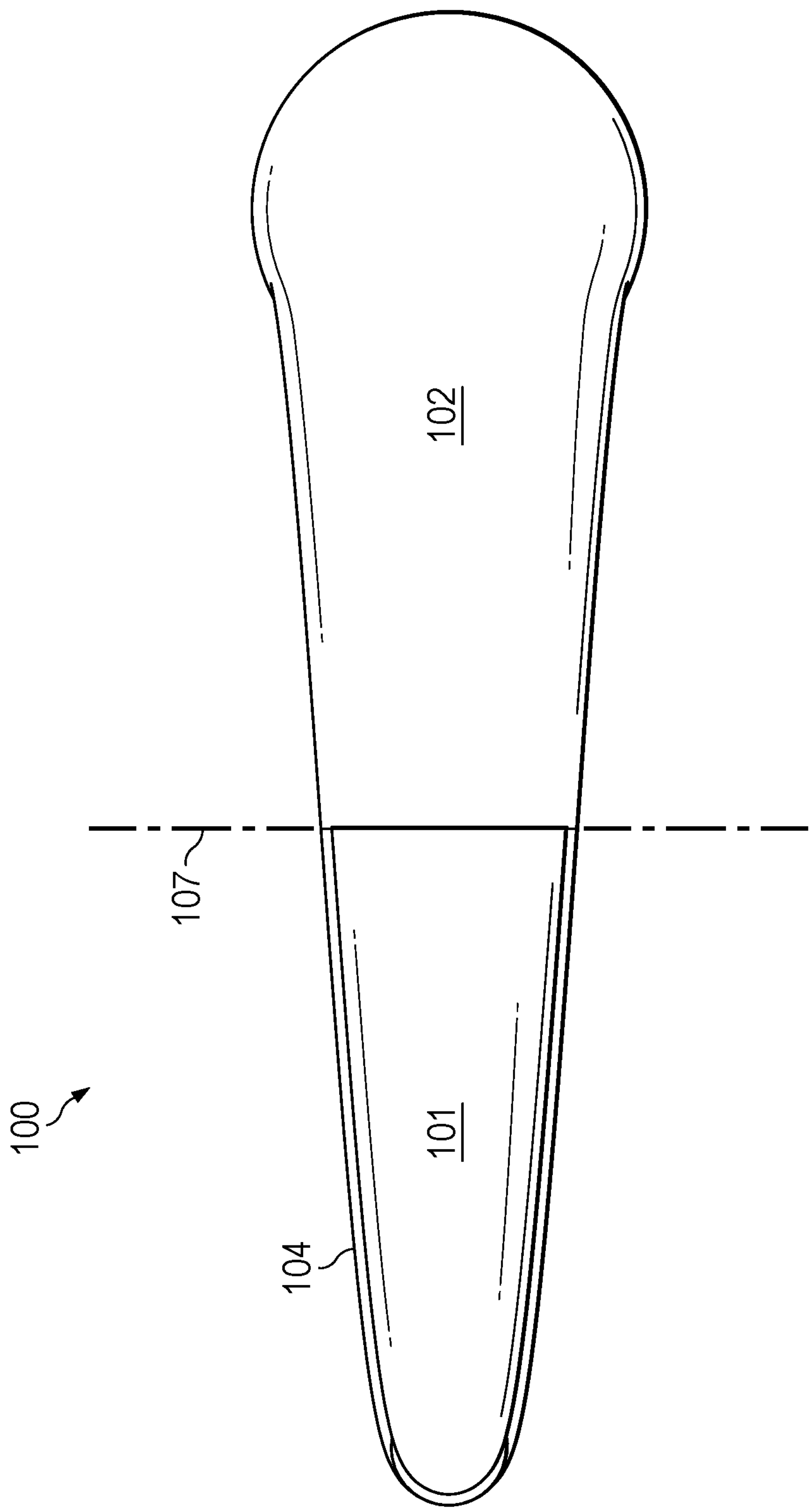
FIG. 3 is a side view of the first embodiment of the present invention.

FIG. 3 shows a side view of the same embodiment 100 of the present disclosure that is illustrated in FIGS. 1 and 2.

Figure 4:
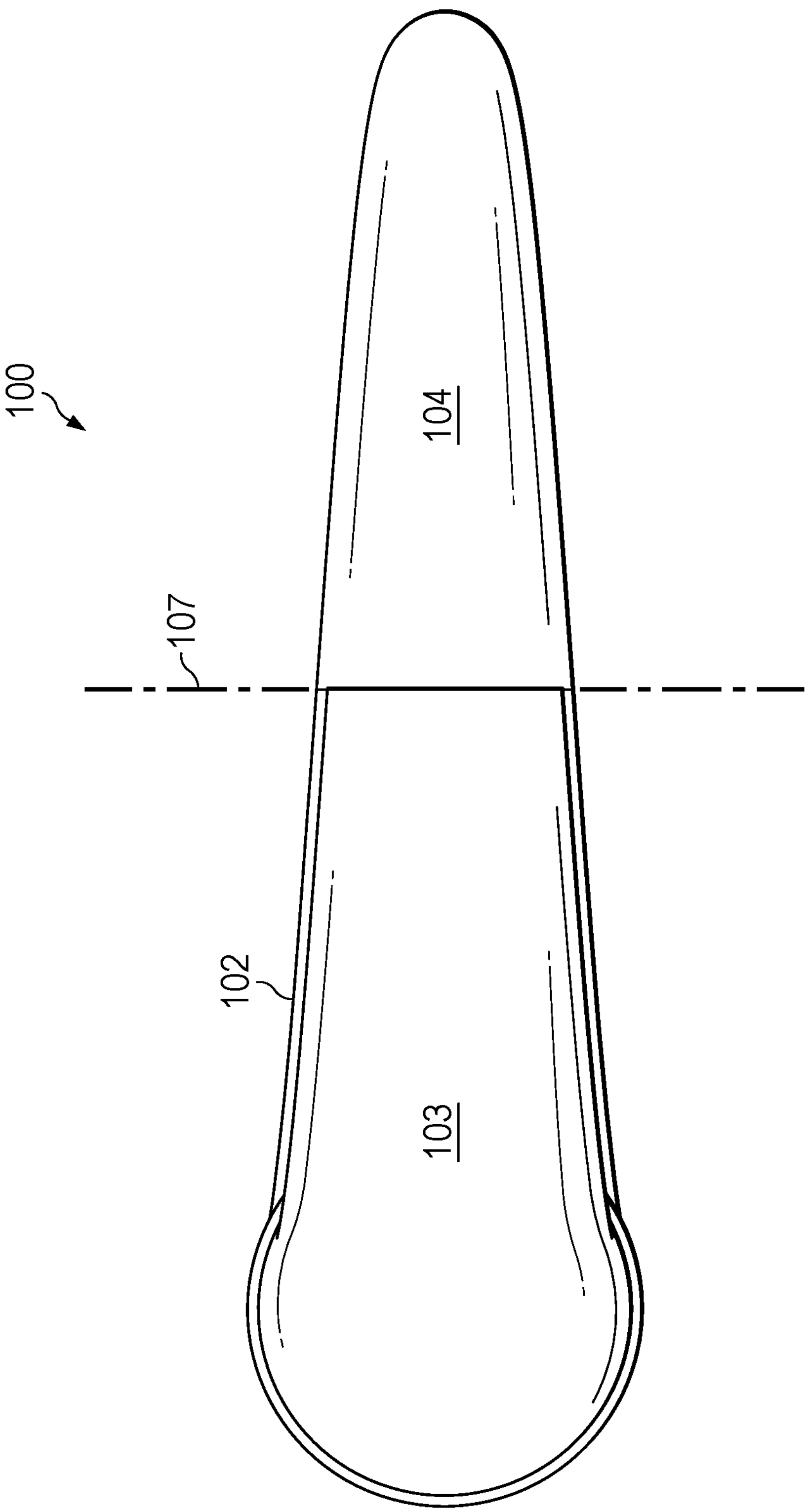
FIG. 4 is a side view of the first embodiment of the present invention.

FIG. 4 shows a side view of the same embodiment 100 of the present disclosure that is illustrated in FIGS. 1-3.

Figure 5:
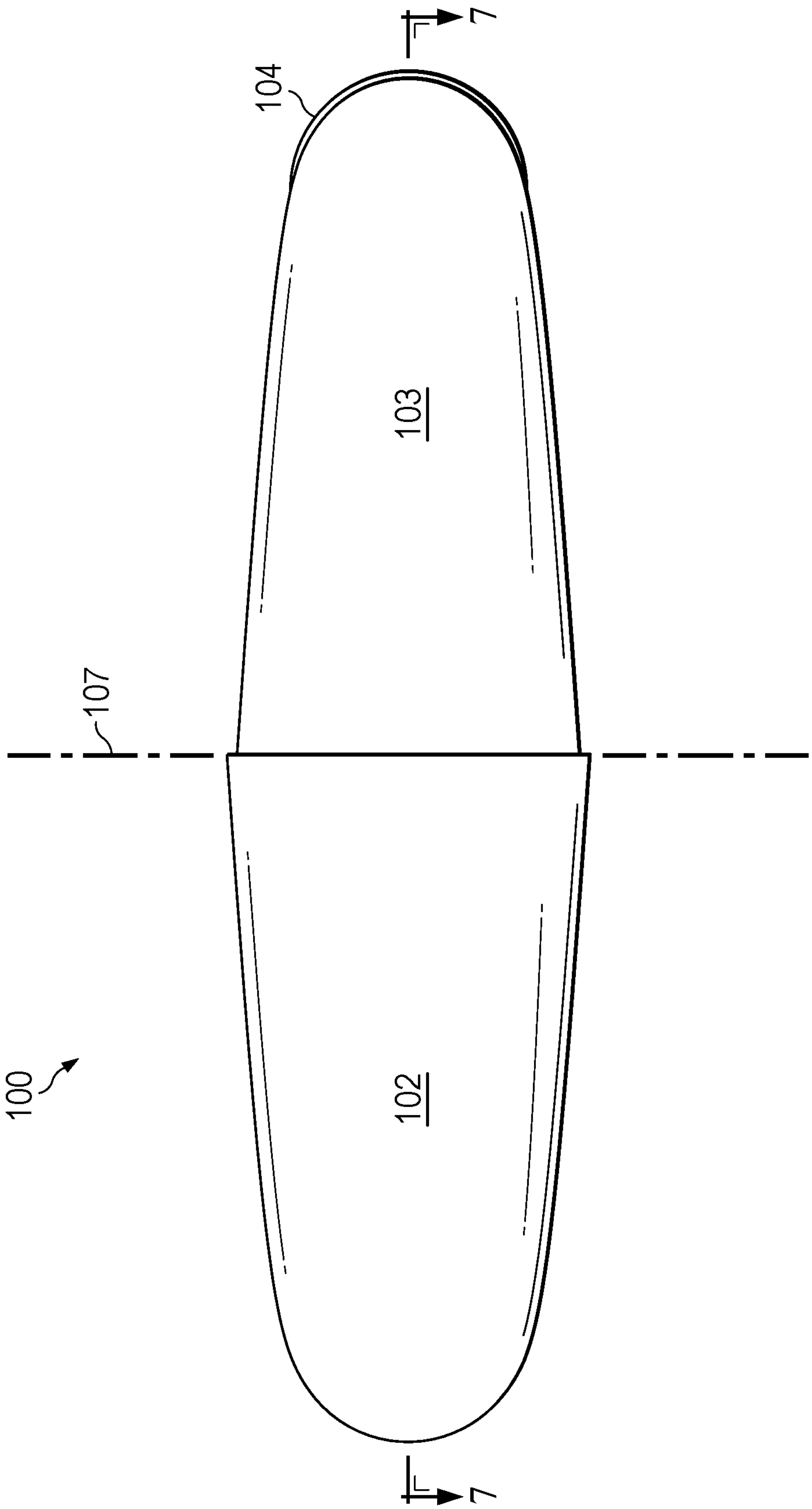
FIG. 5 is a side view of the first embodiment of the present invention.

FIG. 5 shows a side view of the same embodiment 100 of the present disclosure that is illustrated in FIGS. 1-4.

Figure 6:
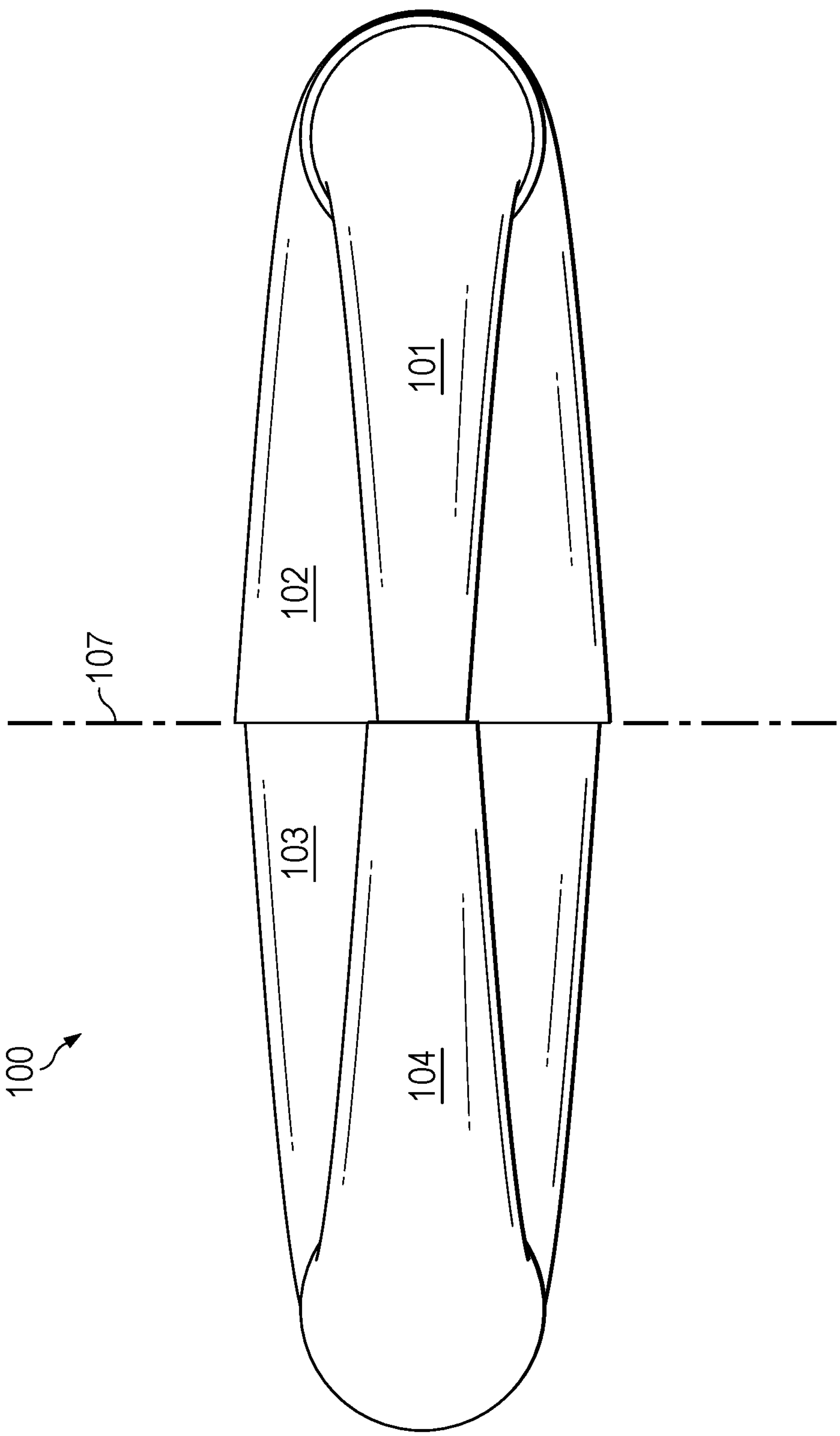
FIG. 6 is a side view of the first embodiment of the present invention.

FIG. 6 shows a side view of the same embodiment 100 of the present disclosure that is illustrated in FIGS. 1-5.

Figure 7:
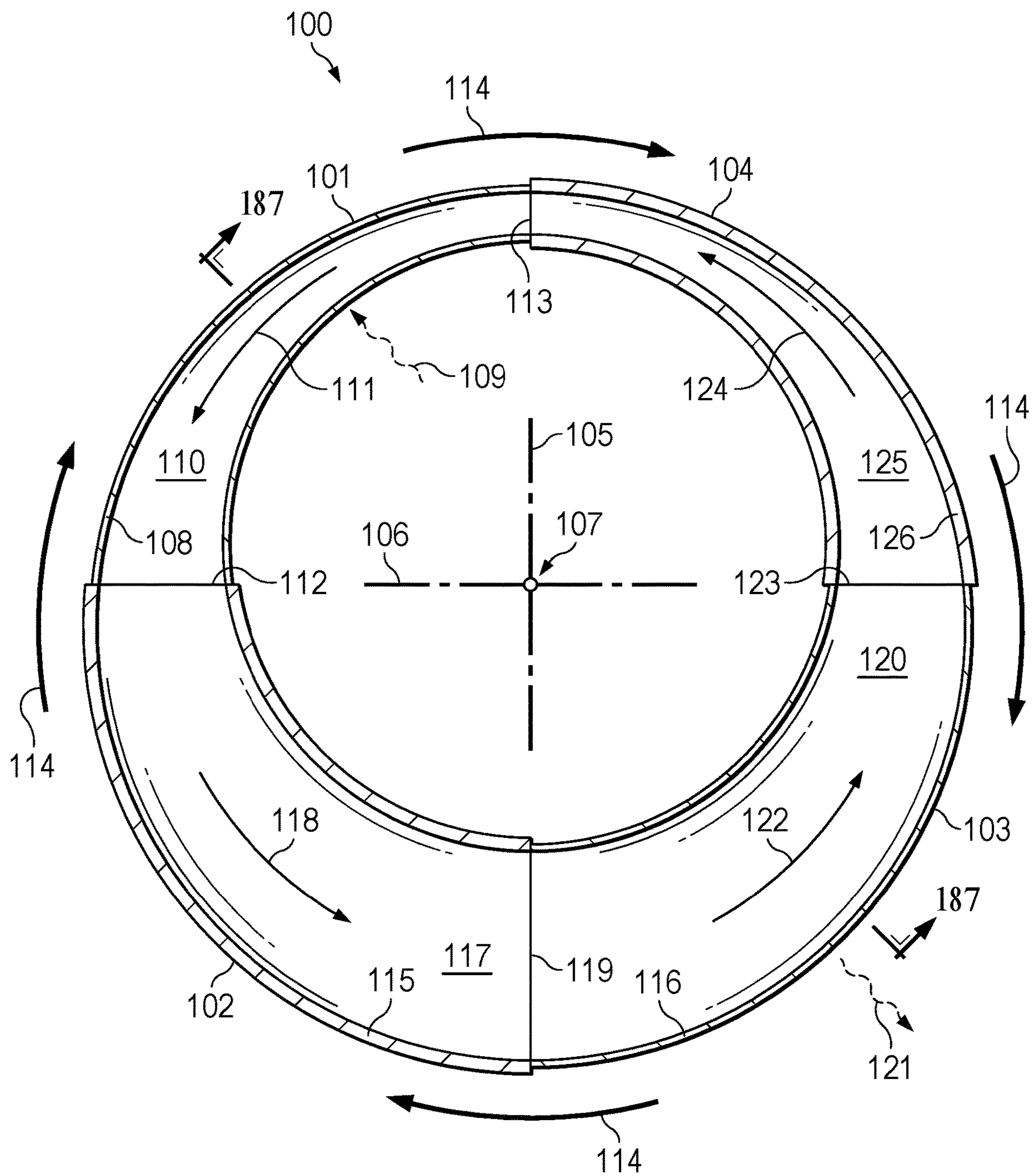
FIG. 7 is a top-down sectional view of the first embodiment of the present invention.

FIG. 7 shows a top-down sectional view of the same embodiment 100 of the present disclosure that is illustrated in FIGS. 1-6 wherein the horizontal section plane is specified in FIGS. 3-6 and the section is taken across line 7-7.

The toroidal tubular channel wall, shell, enclosure, and/or casing 108 of the embodiment's "warming" toroidal tubular channel section 101 is comprised of a thermally-conductive material, e.g., copper. And, that toroidal tubular channel wall of the "warming" channel section readily conducts heat, e.g., 109, from outside the embodiment, through the thermally-conductive toroidal tubular channel wall 108, and to, and/or into, the working fluid (not shown) within the respective "warming" portion 110 of the embodiment's working-fluid-flow channel.

A conduction 109 and/or transmission of thermal energy and/or heat from outside the "warming" toroidal tubular channel section 101 of the embodiment to the working fluid (not shown) inside the respective "warming" portion 110 of the embodiment's working-fluid-flow channel tends to cause the warmed working fluid to expand. And, this increase in the volume of the warmed working fluid tends to cause that working fluid to flow 111 toward that end 112 of the "warming" portion of the embodiment's working-fluid-flow channel which possesses the greatest cross-sectional area, and/or the greatest volume per unit channel length, and away from that end 113 of the "warming" portion of the embodiment's working-fluid-flow channel which possesses the least cross-sectional area, and/or the least volume per unit channel length. The lowest energy state, and therefore the energetically preferred energy state, of the expanding warmed working fluid is found at the more voluminous, and/or spacious, end of the "warming" portion of the embodiment's working-fluid-flow channel where the warmed working fluid may more freely expand and flow.

One might expect a movement of warmed working fluid in an opposite direction, i.e. toward the narrowed end 113 of the "warming" portion 110 of the embodiment's working-fluid-flow channel, to inhibit, if not counteract, an expansion of the volume of the warmed working fluid. For this reason, the approximately conical, and/or tapered, geometry of the "warming" portion of the embodiment's working-fluid-flow channel tends to force an expanding warmed working fluid within the working-fluid-flow channel to flow toward the wider end 112 of that "warming" portion of the embodiment's working-fluid-flow channel, thereby tending to establish and enforce a diodicity within the working-fluid-flow channel, as well as a first rotational direction, e.g., 111, of working-fluid flow within the embodiment.

In response to an approximately circular flow of working fluid within the "warming" portion 110 of the embodiment's working-fluid-flow channel, the embodiment and/or its toroidal tubular channel wall, shell, enclosure, and/or casing, is caused to recoil, and/or to counter-rotate 114, with the counter-rotation tending to be centered about and/or at the embodiment's axis of rotation 107, and with that counter-rotation tending to be in a second rotational direction 114 opposite that of the first-rotational-direction rotational flow, e.g., 111, of the working fluid within the embodiment's toroidal tubular channel wall, shell, enclosure, and/or casing.

The toroidal tubular channel wall, shell, enclosure, and/or casing 115, of the embodiment's "adiabatic-expansion" toroidal tubular channel section 102 is comprised of a thermally-insulating material, e.g., plastic. And, with respect to the embodiment 100 illustrated in FIG. 7, the wall 115 of the "adiabatic-expansion" toroidal tubular channel section is thicker than the thermally-conductive walls 108 and 116 of the respective "warming" 101 and "cooling" 103 toroidal tubular channel sections. The wall of the "adiabatic-expansion" toroidal tubular channel section does not readily, efficiently, or to a significant degree, if at all, conduct thermal energy and/or heat between a working fluid (not shown) within the respective "adiabatic-expansion" portion 117 of the embodiment's working-fluid-flow channel, and the environment, and/or fluid (e.g., atmospheric air), outside the "adiabatic-expansion" toroidal tubular channel section, and/or outside the embodiment as a whole.

The working fluid (not shown) warmed within the "warming" portion 110 of the embodiment's working-fluid-flow channel continues flowing 118 into the relatively more voluminous "adiabatic-expansion" portion 117 of the embodiment's working-fluid-flow channel, and therein continues to expand, and to do work on the embodiment, and/or on the walls of the embodiment's working-fluid-flow channel, at the same time that the pressure of the flowing and expanding working fluid continues to decrease. Thus, the working fluid warmed, and made to expand, within the "warming" portion 110 of the embodiment's working-fluid-flow channel tends to depressurize within the "adiabatic-expansion" portion of the embodiment's working-fluid-flow channel.

In response to the approximately circular flow 118 of the working fluid (not shown) within and through the "adiabatic-expansion" portion 117 of the embodiment's working-fluid-flow channel, the counter-rotation 114 of the embodiment is amplified, and/or the torque (about, and/or relative to, the embodiment's axis of rotation 107) applied to the embodiment by the flowing working fluid is increased.

The working fluid flowing 118 through the "adiabatic-expansion" portion 117 of the embodiment's working-fluid-flow channel, and depressurizing as it flows, eventually reaches, and then flows through and past, a junction 119 which delineates an end of the "adiabatic-expansion" portion of the embodiment's working-fluid-flow channel, and a beginning of the "cooling" portion 120 of the embodiment's working-fluid-flow channel.

The working-fluid-flow toroidal tubular channel wall, shell, enclosure, and/or casing 116 of the embodiment's "cooling" toroidal tubular channel section 103 is comprised of a thermally-conductive material, e.g., copper. And, that channel wall of the "cooling" toroidal tubular channel section readily conducts heat, e.g., 121, from the working fluid (not shown) flowing 122 through the respective "cooling" portion 120 of the embodiment's working-fluid-flow channel, through the thermally-conductive channel wall 116, and to, and/or into, the environment outside the "cooling" toroidal tubular channel section, and outside the embodiment as a whole.

A conduction 121 and/or transmission of thermal energy and/or heat from the working fluid (not shown) within the "cooling" toroidal tubular channel section 120 of the embodiment to the environment outside the embodiment tends to cause a reduction in, and/or of, the volume per unit working-fluid mass of the cooled working fluid, which tends to cause that working fluid to flow 122 toward an end 123 of the "cooling" portion of the embodiment's working-fluid-flow channel with the least flow-normal cross-sectional area. The lowest energy state, and therefore the energetically preferred energy state, of the cooled working fluid, is found at the most constricted, and/or narrowest end 123, of the "cooling" portion of the embodiment's working-fluid-flow channel where the cooled working fluid may best separate itself from the more expanded working fluid entering the "cooling" portion of the embodiment's working-fluid-flow channel at its widest end 119.

In response to an approximately circular flow 122 of working fluid within the "cooling" portion 120 of the embodiment's working-fluid-flow channel, the embodiment and/or its toroidal tubular channel wall, shell, enclosure, and/or casing, is caused to counter-rotate 114 with the counter-rotation tending to be centered about and/or at the embodiment's axis of rotation 107 and with the counter-rotation tending to be in a rotational direction 114 opposite that of the rotational flow 118 of the working fluid within the embodiment's toroidal tubular channel wall, shell, enclosure, and/or casing.

The working fluid (not shown) cooled within the "cooling" portion 120 of the embodiment's working-fluid-flow channel continues flowing 124 into the relatively less voluminous, and/or more constricted, "adiabatic-compression" portion 125 of the embodiment's working-fluid-flow channel. As the embodiment rotates 114 in response to the flow of working fluid through and/or within its working-fluid-flow channel, the embodiment's rotating toroidal tubular channel wall, shell, enclosure, and/or casing, tends to centrifugally compress, and/or do work on, the relatively "cool" working fluid, thereby decreasing the volume per unit working-fluid mass, and increasing the pressure, of that "cooled" working fluid. Thus, the working fluid cooled and compacted within the "cooling" portion 120 of the embodiment's working-fluid-flow channel tends to be further compacted and/or compressed, and to have its volume per unit working-fluid mass, further decreased, within the "adiabatic-compression" portion of the embodiment's working-fluid-flow channel. The embodiment's rotational compression of the working fluid within the "adiabatic-compression" portion of the embodiment's working-fluid-flow channel tends to diminish the angular momentum and rotational kinetic energy of the embodiment, thereby tending to reduce the rotation 114 of the embodiment, and/or to resist the torque and rotation imparted to the embodiment by the flow of its working fluid through the other portions of the embodiment's fluid-flow channel.

With respect to the embodiment 100 illustrated in FIG. 7, the toroidal tubular channel wall, shell, enclosure, and/or casing, 126 of the "adiabatic-compression" toroidal tubular channel section 104, similarly to the toroidal tubular channel wall 115 of the "adiabatic-expansion" toroidal tubular channel section 102, is thicker than the thermally-conductive channel walls 108 and 116 of the respective "warming" and "cooling" toroidal tubular channel sections 101 and 103. The toroidal tubular channel wall, shell, enclosure, and/or casing, of the "adiabatic-compression" toroidal tubular channel section does not readily, efficiently, or to a significant degree, conduct thermal energy and/or heat between a working fluid flowing through the respective "adiabatic-compression" portion 125 of the embodiment's working-fluid-flow channel and the environment outside the "adiabatic-compression" toroidal tubular channel section and/or outside the embodiment as a whole.

The working fluid (not shown) flowing 124 through the "adiabatic-compression" portion 125 of the embodiment's working-fluid-flow channel, decreasing in volume per unit working-fluid mass, and growing in pressure, as it does so, eventually reaches, and then flows through and past, the junction 113 which delineates an end of the "adiabatic-compression" portion of the embodiment's working-fluid-flow channel, and a beginning of the "warming" portion 110 of the embodiment's working-fluid-flow channel.

The approximately conical shape of the "warming" portion 110 of the embodiment's working-fluid-flow channel, in which one end 113 of that portion of the embodiment's working-fluid-flow channel is characterized by a lesser cross-sectional area than the other respective end 112, causes the heat, e.g., 109, induced expansion of the working fluid flowing therein, and therethrough, to tend to flow away from the narrower end 113, where the space and/or volume within the toroidal tubular channel that is available to the working fluid is least, and toward the less-constricted end 112, where the working fluid may more freely and rapidly expand. Thus, the conical quality of the "warming" portion of the embodiment's working-fluid-flow channel tends to promote a first rotational direction 111 of working-fluid flow within the "warming" portion of the embodiment's working-fluid-flow channel, while tending to inhibit, if not prevent, a second and/or opposite direction of flow, in response to a heating of the working fluid within the "warming" portion of the embodiment's fluid-flow channel. In other words, an expanding working fluid will typically flow toward, and into, the most voluminous space available to it where its ability to expand is maximized, and, by contrast, will not typically or spontaneously flow away from a more spacious location toward, and/or into, a more constricted location where its ability to expand will be inhibited.

Similarly, if the influx 109 of heat into the interior of the "warming" portion 110 of the embodiment's working-fluid-flow channel is uniform with respect to the amount of heat conducted per unit of surface area of the toroidal tubular channel shell 101 surrounding that portion of the embodiment's working-fluid-flow channel, then the amount of thermal energy so transferred to a working fluid therein, e.g., on the basis of thermal energy transferred per unit volume of working fluid, will be greatest at the narrower end 113 of the "warming" portion of the embodiment's working-fluid-flow channel than at the wider end 112. Therefore, the expansion of the working fluid resulting from a uniform influx of heat across, over, and/or around, the toroidal tubular channel shell 101 will be greatest in that portion of the working fluid near the narrower end of the "warming" portion of the embodiment's working-fluid-flow channel than at the wider end. This non-uniform increase in volume will tend to cause the working fluid near the narrower end 113 of the "warming" portion of the embodiment's working-fluid-flow channel to push the working fluid within the other parts of the "warming" portion of the embodiment's fluid-flow channel toward the wider end 112.

In addition to the progressive increase in the flow-normal cross-sectional area of the "warming" portion 110 of the embodiment's working-fluid-flow channel, with respect to a first rotational direction of working-fluid flow 111, the cross-sectional area the "adiabatic-expansion" portion of the embodiment's working-fluid-flow channel progressively increases with respect to that same first direction 111 and 118 of the working fluid's flow. These two factors, and the preference of the warmed working fluid to flow into portions of the working-fluid-flow channel that allow and/or provide for greater expansion of the working fluid, result in the working fluid continuing to flow through the "adiabatic-expansion" portion of the embodiment's working-fluid-flow channel in the same rotational direction in which it flowed 111 through the "warming" portion of the embodiment's working-fluid-flow channel.

As working fluid (not shown) flows through the "adiabatic-expansion" portion 117 of the embodiment's working-fluid-flow channel, it continues its progressive expansion so as to fill the increasingly and/or progressively more voluminous working-fluid-flow channel. However, this continued expansion of the working fluid as it flows through the "adiabatic-expansion" portion of the embodiment's working-fluid-flow channel happens in the absence of any additional influx of thermal energy—thus, as it flows through the "adiabatic-expansion" portion of the embodiment's working-fluid-flow channel, the pressure of the adiabatically expanding working fluid tends to decrease.

Because the "adiabatic-expansion" portion 117 of the embodiment's working-fluid-flow channel is tapered, and/or approximately frustoconical, and a first end 112 of that portion of the embodiment's working-fluid-flow channel is characterized by a lesser flow-normal cross-sectional area than a second end 119, the pressure of the working fluid flowing at and/or past the second end will tend to be lesser and/or lower than the pressure of the working fluid flowing at and/or past the first end. Thus, the expanding and depressurizing working fluid within the "adiabatic-expansion" portion 117 of the embodiment's working-fluid-flow channel tends to flow away from the relatively more constricted and more pressurized first end of the "adiabatic-expansion" portion 117 of the embodiment's working-fluid-flow channel and flow toward the relatively more spacious and less pressurized second end.

Thus, the tapered, and/or conical, quality of the "adiabatic-expansion" portion 117 of the embodiment's working-fluid-flow channel tends to promote a direction 118 of working-fluid flow that is the same as the first rotational direction 111 of working-fluid flow typical of the "warming" portion 110 of the embodiment's working-fluid-flow channel. The pressure gradient established and/or typical of the working fluid within the "adiabatic-expansion" portion of the embodiment's working-fluid-flow channel, with respect to the first 112 and second 119 ends of that "adiabatic-expansion" portion of the embodiment's working-fluid-flow channel, tends to establish and/or reinforce the first rotational direction of working-fluid flow 111 and 118, while also tending to inhibit, if not prevent, a second and/or opposite direction of flow.

The working fluid (not shown) flowing through the "cooling" portion 120 of the embodiment's working-fluid-flow channel tends to experience a progressive cooling, and a progressive contraction, as it flows 122 from a first end 119 of that portion of the embodiment's working-fluid-flow channel to and/or toward a second end 123 of that portion of the working-fluid-flow channel.

The pressure gradient established and/or typical of the working fluid (not shown) within, and/or flowing 122 through, the "cooling" portion 120 of the embodiment's working-fluid-flow channel, with respect to the first 119 and second 123 ends of that "cooling" portion of the embodiment's working-fluid-flow channel, tends to establish and/or reinforce the first rotational direction of working-fluid flow 111, 118, and 122, while also tending to inhibit a second and/or opposite direction of flow.

As the embodiment's working fluid (not shown) flows 122 through the "cooling" portion 120 of the embodiment's fluid-flow channel it loses thermal energy that flows 121 into the environment, e.g., atmospheric air, outside the embodiment. This cooling of the working fluid as it flows through the "cooling" portion of the embodiment's working-fluid-flow channel tends to cause the temperature, and volume per unit working-fluid mass, of that working fluid to progressively decrease as it flows therethrough. However, the channel wall of the adjacent "adiabatic-compression" portion 125 of the embodiment's working-fluid-flow channel is insulated and/or insulating, which prevents additional thermal energy of the working fluid from escaping into the environment outside the embodiment.

The flow-normal cross-sectional area the "adiabatic-compression" portion 125 of the embodiment's working-fluid-flow channel progressively decreases with respect to the direction 124 of the working fluid's flow therethrough. In the absence of an inflow of thermal energy, the working fluid that flows into the "adiabatic-compression" portion of the embodiment's working-fluid-flow channel tends to lack a sufficient pressure to flow away from the constricted end 113 of the "adiabatic-compression" portion of the embodiment's working-fluid-flow channel, and/or to flow toward, and/or maintain its position near, the relatively wider end 123 of the "adiabatic-compression" portion of the embodiment's working-fluid-flow channel. Instead, the rotation 114 of the embodiment, and/or the rotation of the embodiment's toroidal tubular channel shell 101-104, which tends to result as a counter-rotation, and/or a recoil, to the thermally-driven flow of the working fluid through the other portions 110, 117, and 120 of the embodiment's working-fluid-flow channel, tends to forcefully drive "forward" (e.g., in rotational direction 124) and compress the working fluid otherwise energetically stalled at the entrance 123 of the "adiabatic-compression" portion of the embodiment's working-fluid-flow channel. Thus, the rotation 114 of the embodiment tends to cause the depressurized and compressed working fluid to "fall," and/or to be "pushed," toward the relatively narrow end 113 of the "adiabatic-compression" portion 125 of the embodiment's working-fluid-flow channel.

Working fluid cooled within the "cooling" portion 120 of the embodiment's working-fluid-flow channel, which subsequently flows into the "adiabatic-compression" portion 125 of the embodiment's working-fluid-flow channel, therein tends to lack the thermal energy and/or pressure that it would require in order to flow away from the constricted end 113 of that "adiabatic-compression" portion 125 of the working-fluid-flow channel (as it would if expanding in response to an increase in its temperature) in a working-fluid-flow direction opposite that of the nominal rotational direction 124 of working-fluid flow. Because of its lack of thermal energy and/or pressure, working fluid within the "adiabatic-compression" portion of the embodiment's working-fluid-flow channel tends to "stall." However, that otherwise stalled cold and compressed working fluid is driven to flow in the same direction 124 as is the rest of the embodiment's working fluid by the rotations 114 of the embodiment and its toroidal tubular channel.

The rotational and/or centrifugal force imparted to the working fluid as a consequence of the rotation 114 of the embodiment, tends to drive the cooled working fluid through the "adiabatic-compression" portion 125 of the embodiment's working-fluid-flow channel toward the constricted end 113 of that channel section, and, as the working fluid is driven into more-and-more-highly constricted portions of the "adiabatic-compression" portion of the embodiment's working-fluid-flow channel, that cooled working fluid is mechanically compressed, before eventually being driven out of that "adiabatic-compression" portion of the embodiment's working-fluid-flow channel, and into the "warming" portion 110 of the embodiment's working-fluid-flow channel—where the working fluid is again heated and where it begins another rotational cycle through the embodiment.

The frustoconical, and/or tapered, quality of the "adiabatic-compression" portion 125 of the embodiment's working-fluid-flow channel tends to allow the embodiment to perform work on the compacted working fluid passively flowing therein, and that work tends to be at the expense of the rotational kinetic energy of the embodiment. The mechanical work performed by the embodiment on the working fluid within the "adiabatic-compression" portion of the embodiment's working-fluid-flow channel tends to resist, oppose, and/or diminish, the rotational direction 111, 118, 122, and 124 of the flow of working fluid, and thereby tends to resist, oppose, and/or diminish, the rotation 114 of the embodiment, and/or of the embodiment's toroidal tubular channel shell 101-104.

Figure 8:
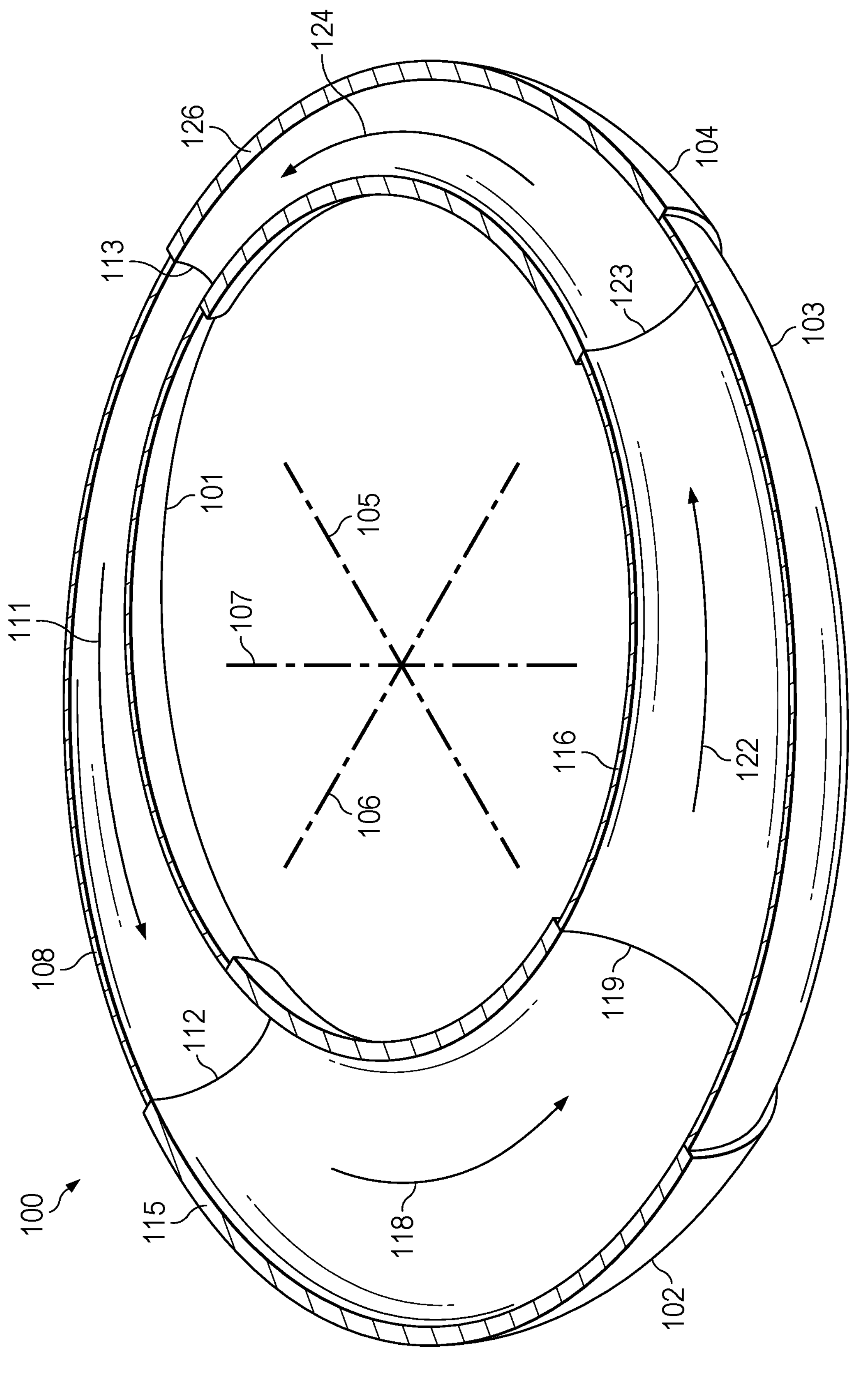
FIG. 8 is a perspective top-down sectional view of the first embodiment of the present invention.

FIG. 8 shows a perspective top-down sectional view of the same embodiment 100 of the present disclosure that is illustrated in FIGS. 1-7 wherein the horizontal section plane is specified in FIGS. 3-6 and the section is taken across line 7-7.

The scope of the present disclosure includes, but is not limited to, embodiments, such as the one illustrated in FIGS. 1-8, which include, incorporate, utilize, comprise, and/or manifest, conical, frustoconical, and/or tapered, portions of their respective toroidal tubular channels which include, incorporate, utilize, comprise, and/or manifest, any absolute and/or relative angle(s) of their respective conical, frustoconical, and/or tapered, toroidal tubular channels, and/or portions thereof; any absolute and/or relative rates of volumetric expansion and/or contraction with respect to incremental, and/or unit, distances of flow along their respective working-fluid-flow paths, and/or with respect to incremental, and/or unit, angular positions relative to their respective axes of rotation; and/or any absolute and/or relative rates of change in the flow-normal cross-sectional areas of their respective working-fluid-flow channels along their respective working-fluid-flow paths, with respect to incremental, and/or unit, distances of flow along their respective working-fluid-flow paths, and/or with respect to incremental, and/or unit, angular positions relative to their respective axes of rotation.

The scope of the present disclosure includes, but is not limited to, embodiments including, incorporating, utilizing, comprising, and/or manifesting, thermally-conductive and/or thermally-insulating toroidal tubular channel shells, walls, enclosures, and/or casings of any absolute and/or relative wall thicknesses.

The scope of the present disclosure includes, but is not limited to, embodiments of any absolute and/or relative size, length, width, height, embodiment volume, and/or respective working-fluid-flow-channel volume. The scope of the present disclosure includes embodiments of any mass and/or weight.

The scope of the present disclosure includes, but is not limited to, embodiments designed, fabricated, optimized, and/or created, for the purpose of operating in a gaseous environment (e.g., air), in a liquid environment (e.g., in a lake or ocean), and/or in a vacuum (e.g., in outer space).

The rotational-axis-normal (i.e., normal to an axis of rotation) cross-sectional working-fluid-flow channel shape of the embodiment illustrated in FIGS. 1-8, is approximately circular. However, the scope of the present disclosure includes, but is not limited to, embodiments which include, incorporate, utilize, comprise, and/or manifest, any rotational-axis-normal cross-sectional working-fluid-flow channel shape, including, but not limited to, rotational-axis-normal cross-sectional working-fluid-flow channel shapes that are: circular, elliptical, hexagonal, rectangular, triangular, and/or irregular. The scope of the present disclosure includes, but is not limited to, embodiments which include, incorporate, utilize, comprise, and/or manifest, working-fluid-flow channel shapes that are non-planar, and/or working-fluid-flow channel shapes in which a respective working fluid flows within, and/or parallel to, a plane that is not normal to an axis of a respective embodiments rotation.

The scope of the present disclosure includes, but is not limited to, embodiments characterized by any absolute and/or relative working-fluid-flow channel diameter and/or cross-sectional area.

The embodiment 100 illustrated in FIGS. 1-8, is illustrated and described as a closed-cycle external heat engine. However, the same embodiment, if rotated in a direction opposite that of its nominal, heat-engine rotational direction 114, e.g., by an external source of mechanical energy, will tend to operate as a "heat pump." When operated as a heat pump, the embodiment 100 will tend to produce heat within the working fluid within its "warming" toroidal tubular channel section 101, and a portion of that heat will then tend to pass through the channel wall 108 of that toroidal tubular channel section and thereby, and/or thereafter, heat the environment outside that toroidal tubular channel section. And, when operated as a heat pump, the embodiment will tend to cool the working fluid within its "cooling" toroidal tubular channel section 103, and that cooled working fluid will tend to absorb heat from the channel wall 116 of that toroidal tubular channel section, thereby tending to absorb heat from the environment outside that toroidal tubular channel section. In this way, the same embodiment that produced mechanical energy and/or motion when subjected to heat at its "warming" toroidal tubular channel section, and cold at its "cooling" toroidal tubular channel section, will, when operated as a heat pump, tend to emit heat at its "warming" toroidal tubular channel section, and absorb heat (and/or "emit" cold) at its "cooling" toroidal tubular channel section. The scope of the present disclosure includes any and all embodiments which produce mechanical energy, power, and/or motion, when appropriately subjected to sources of heat and/or cold, and also all embodiments which produce heat and cold when subjected to appropriately applied mechanical energy, power, and/or motion.

The varieties of embodiments, their geometries, their working fluids, their operations, and their applications, enumerated within the "Summary of the Invention" section of this disclosure apply to the embodiment illustrated and discussed in relation to FIGS. 1-8, and the scope of the present disclosure includes all such variations of the embodiment illustrated in FIGS. 1-8.

Disclosed in this specification, and in FIGS. 1-8, is a circular tapered tube comprising: an internal fluid-flow channel containing a working fluid and having four functional channel sections including: a first functional channel section with an expanding taper in a first direction through the fluid-flow channel and having a tubular channel wall adapted to conduct heat from outside the embodiment to an interior of the first functional channel section; a second functional channel section with an expanding taper in the first direction through the fluid-flow channel and having a tubular channel wall adapted to thermally insulate an interior of the second functional channel section; a third functional channel section with an constricting taper in the first direction through the fluid-flow channel and having a tubular channel wall adapted to conduct heat from an interior of the first functional channel section to an exterior of the embodiment; a fourth functional channel section with an constricting taper in the first direction through the fluid-flow channel and having a tubular channel wall adapted to thermally insulate an interior of the second functional channel section; wherein heat originating from a thermal source outside the embodiment and conducted across the channel wall of the first functional channel section warms the working fluid therein causing that working fluid to expand and flow in the first direction through the fluid-flow channel; wherein heat originating from the working fluid within the third functional channel section and conducted across the channel wall of that third functional channel section to a thermal sink outside the embodiment causes that working fluid to contract and flow in the first direction through the fluid-flow channel; and wherein the flow of the working fluid in the first direction through the fluid-flow channel causes the embodiment to rotate in a second direction, opposite the first direction.

Disclosed in this specification, and in FIGS. 1-8, is a rotatable heat engine comprising: an annular tubular channel; a working fluid sealed within the annular tubular channel; wherein the annular tubular channel is adapted to conduct heat from an external thermal source to working fluid within an interior of a first portion of the annular tubular channel, thereby warming that working fluid and causing it to expand and flow in a first direction through the annular tubular channel; and wherein the annular tubular channel is adapted to conduct heat from working fluid within an interior of a second portion of the annular tubular channel to an external thermal sink, thereby cooling that working fluid and causing it to contract and flow in the first direction through the annular tubular channel; wherein the rotatable annular tubular channel is configured to rotate in a second direction opposite the first direction.

Disclosed in this specification, and in FIGS. 1-8, is a method for converting a temperature difference into a rotational motion, comprising: forming a hollow circular tube having a narrow tube portion, of minimal flow-normal cross-sectional area, at a first end of the hollow circular tube, and having a wide tube portion, of maximal flow-normal cross-sectional area, at a second end of the hollow circular tube, wherein the second end is opposite the first end; placing a working fluid into an interior of the hollow circular tube; adapting a heat-receiving portion of the hollow circular tube adjacent to, and on a first side of, the narrow tube portion to have a thermally-conductive tube wall and to receive heat of a high temperature; adapting a cold-receiving portion of the hollow circular tube adjacent to, and on a second side of, the wide tube portion to have a thermally-conductive tube wall and to receive cold of a low temperature; adapting an adiabatic expansion portion of the hollow circular tube to fluidly connect the heat-receiving portion of the hollow circular tube to the wide tube portion and to have a thermally insulating tube wall; adapting an adiabatic compression portion of the hollow circular tube to fluidly connect the narrow tube portion to the cold-receiving portion of the hollow circular tube and to have a thermally insulating tube wall; applying a heat of the high temperature to the heat-receiving portion of the hollow circular tube; and, applying a cold of the low temperature to the cold-receiving portion of the hollow circular tube.

Figure 9:
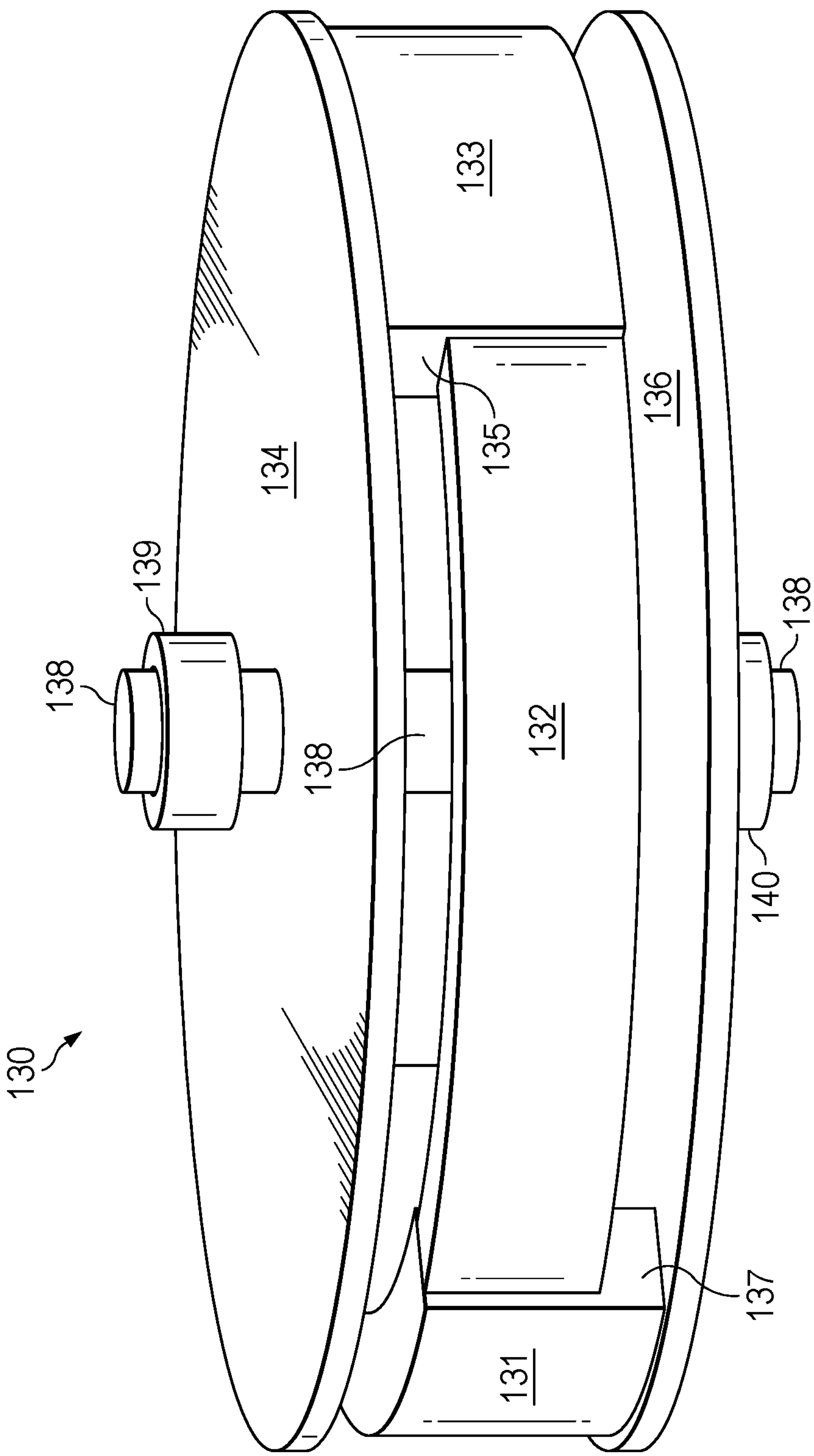
FIG. 9 shows a perspective side view of a second embodiment of the present invention.

FIG. 9 shows a perspective side view of a second embodiment 130 of the present disclosure. As is the case with the embodiment 100 illustrated in FIGS. 1-8, the embodiment 130 illustrated in FIG. 9 comprises a single annular workingfluid-flow channel (not visible) which has a rectangular flow-normal cross-sectional shape, and which is encased within, and/or surrounded by, an outer annular tubular channel shell, wall, hull, enclosure, and/or casing, e.g., 131-133.

The annular tubular channel shell of the embodiment 130 is divided into four fluidly-connected and fluidly-interconnected tubular channel sections, segments, portions, and/or parts, e.g., 131-133. The channel walls of two opposing tubular channel sections 131 and 133 are thermally-conductive. And, the walls of the other two intermediate, and/or intermediary, tubular channel sections, e.g., 132, are thermally insulated and not thermally-conductive.

An upper thermally-conductive plate 134 is thermally-connected to a section 133 of the tubular channel shell by a thermal bridge 135. When exposed to an external source of heat, a portion of the heat source's thermal energy is conducted to, and/or into, the upper thermally-conductive plate, and therethrough conducted to, and/or into, the thermal bridge, and therethrough to, and/or into, the walls of the respective tubular channel section 133, thereby, therethrough, and/or thereafter, heating a working fluid (not shown) within tubular section 133.

A lower thermally-conductive plate 136 is thermally-connected to a section 131 of the tubular channel shell, which is opposite the tubular channel section 133. The lower thermally-conductive plate is thermally connected to tubular-channel-shell section 131 by a thermal bridge 137. When exposed to an external, and relatively cold, thermal sink, a portion of the thermal energy within the working fluid within the tubular channel within tubular channel section 131 is conducted to, and/or into, the walls of that tubular channel section, and therethrough to, and/or into, the thermal bridge 137, and therethrough to, and/or into, the lower thermally-conductive plate 136, thereby cooling the working fluid within tubular channel section 131.

The embodiment 130 illustrated in FIG. 9 can also be configured such, and/or so, that the upper thermally-conductive plate 134 is thermally-connected to a thermal sink (of relative cold) thereby cooling the working fluid within tubular channel section 133, and such, and/or so, that the lower thermally-conductive plate 136 is thermally-connected to a thermal source (of relative heat) thereby warming the working fluid within tubular channel section 131. When so configured, the embodiment illustrated in FIG. 9 will rotate in the same direction, regardless of which thermally-conductive plate is heated and which is cooled, due to working-fluid-flow-constraining diodic structures within the embodiment's annular tubular channel.

The heat engine illustrated in FIG. 9 incorporates, utilizes, and/or comprises, a thermally insulating shaft, tube, and/or rod 138 which is affixed to the upper 134 and lower 136 thermally-conductive plates. The shaft rotates when the thermally-conductive plates, and the tubular channel shell to which the plates are affixed, rotate. The thermally insulated shaft does not conduct thermal energy between the upper and lower thermally-conductive plates. Bearings 139 and 140 enable the embodiment 130 to be rotatably connected to an non-rotating, and/or a differently-rotating, external structure, framework, object, and/or mechanism, and those upper and lower bearings facilitate an axial rotation of the shaft, and the heat engine embodiment 130 of which it is a part, relative to such a non-rotating, and/or a differently-rotating, external structure, framework, object, and/or mechanism.

Figure 10:
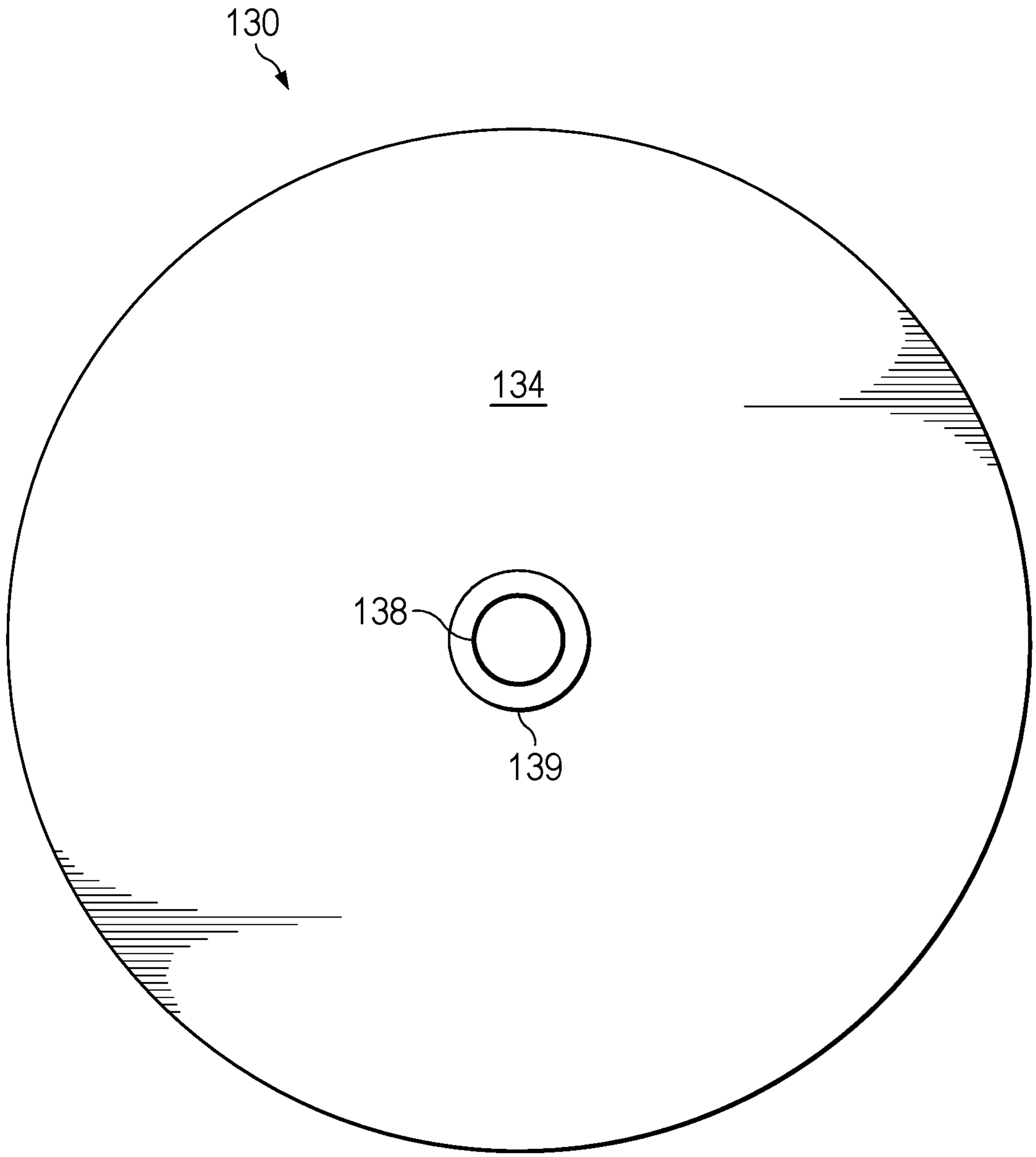
FIG. 10 shows a top-down view of the second embodiment of the present invention.

FIG. 10 shows a top-down view of the same embodiment 130 of the present disclosure that is illustrated in FIG. 9.

Figure 11:
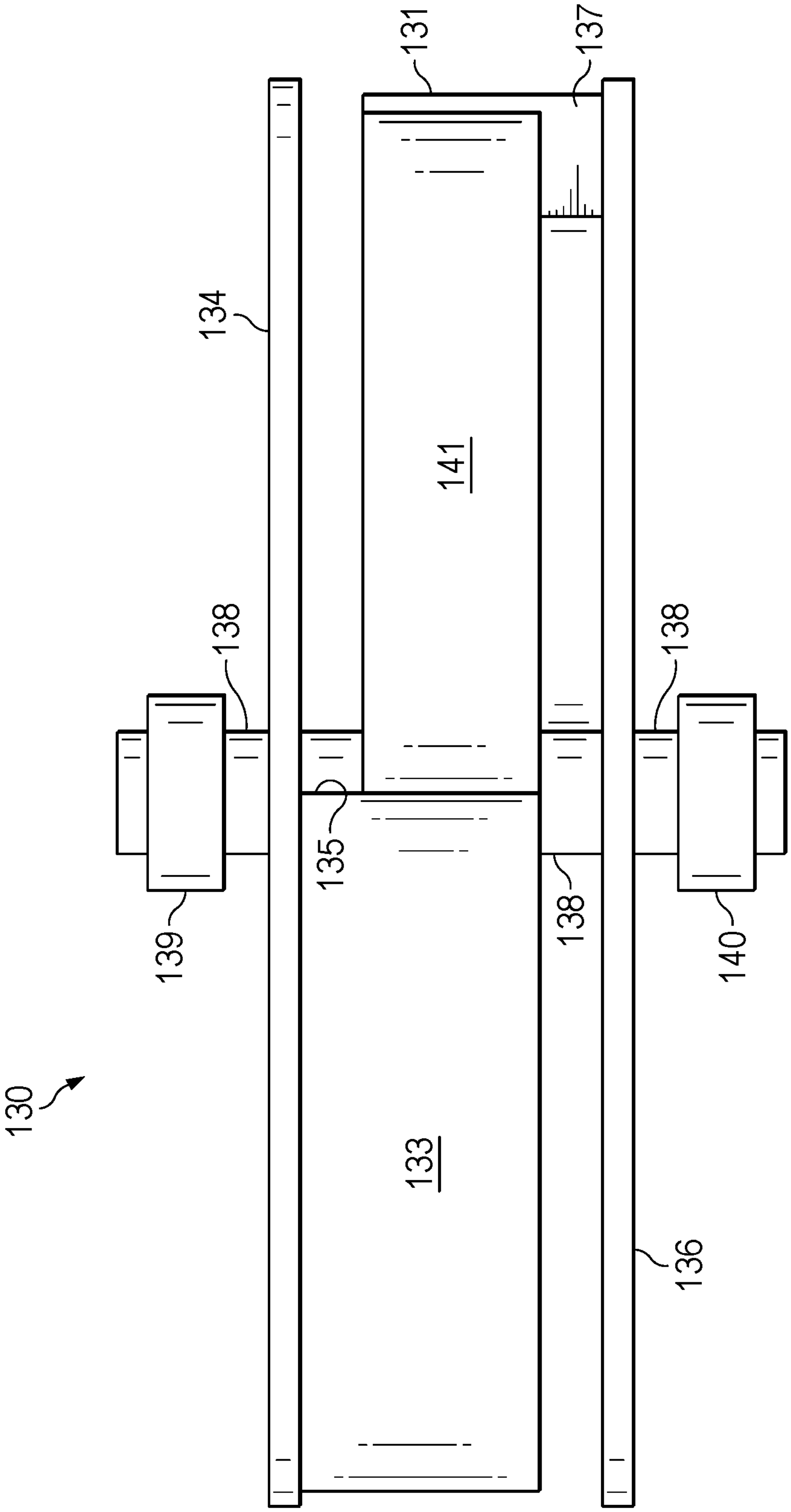
FIG. 11 shows a side view of the second embodiment of the present invention.

FIG. 11 shows a side view of the same embodiment 130 of the present disclosure that is illustrated in FIGS. 9 and 10. A thermally insulated tubular channel section 141 is positioned between, and fluidly connects, thermally-conductive tubular channel sections 131 and 133.

Figure 12:
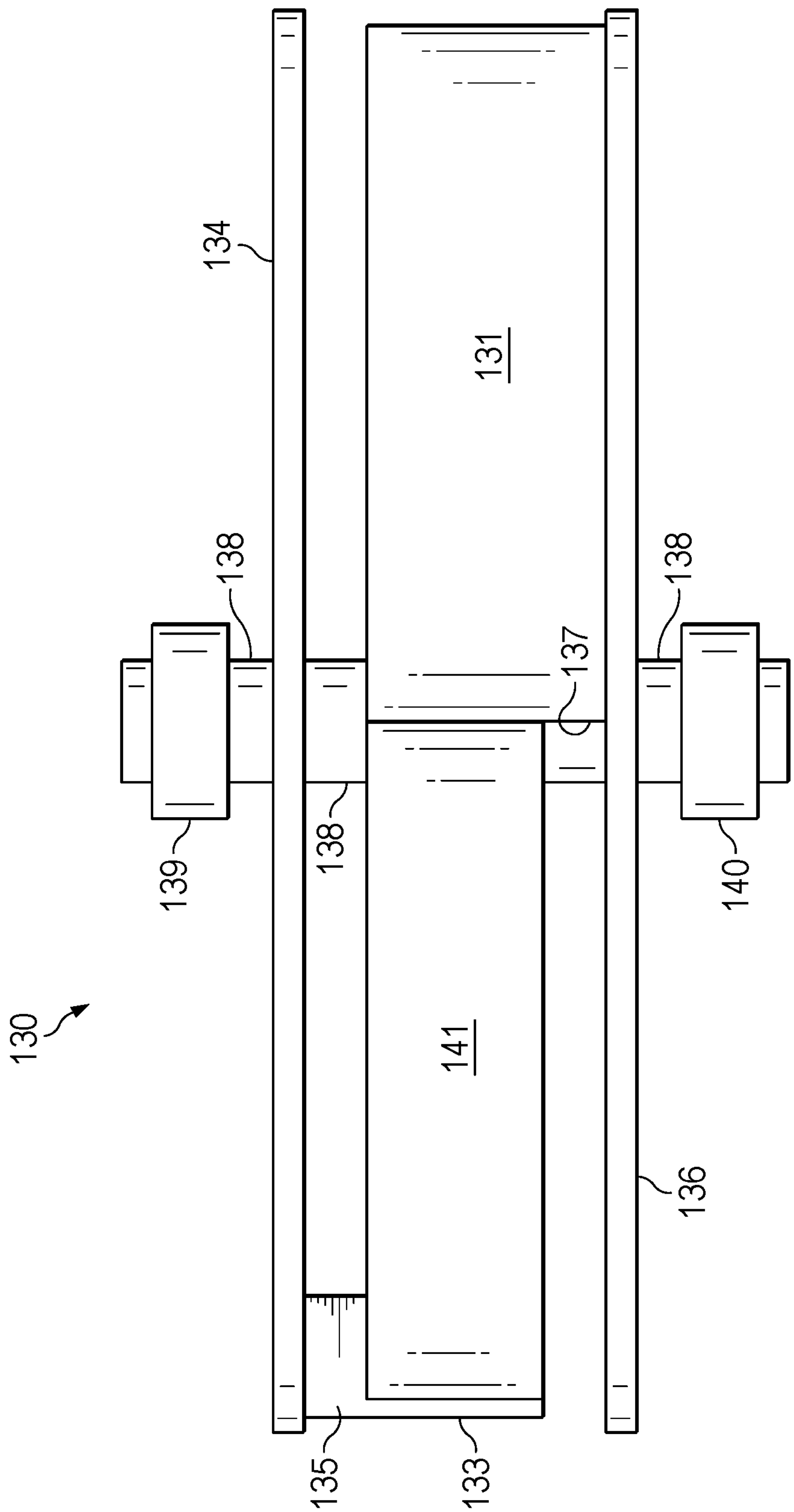
FIG. 12 shows a side view of the second embodiment of the present invention.

FIG. 12 shows a side view of the same embodiment 130 of the present disclosure that is illustrated in FIGS. 9-11.

Figure 13:
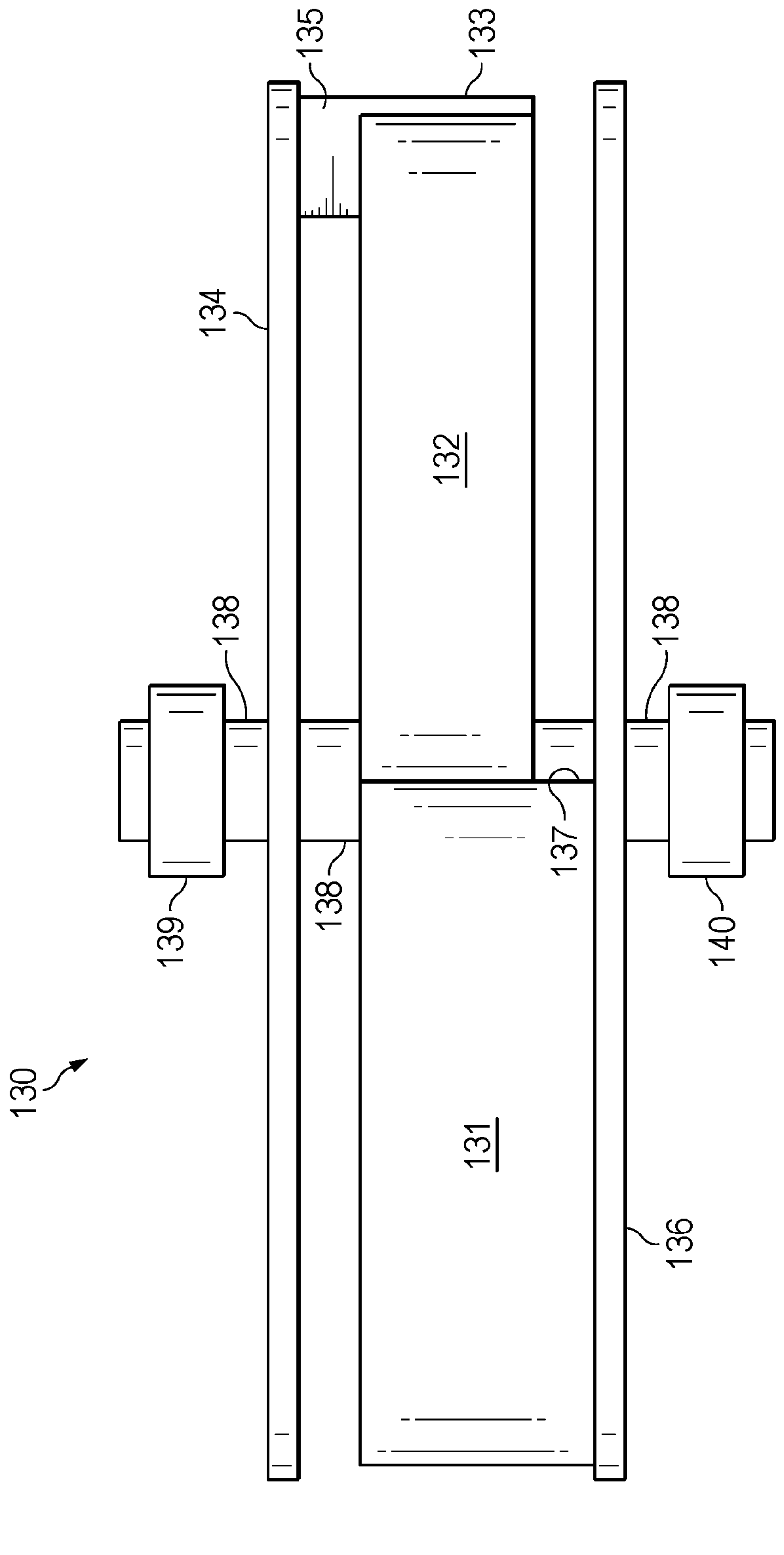
FIG. 13 shows a side view of the second embodiment of the present invention.

FIG. 13 shows a side view of the same embodiment 130 of the present disclosure that is illustrated in FIGS. 9-12.

Figure 14:
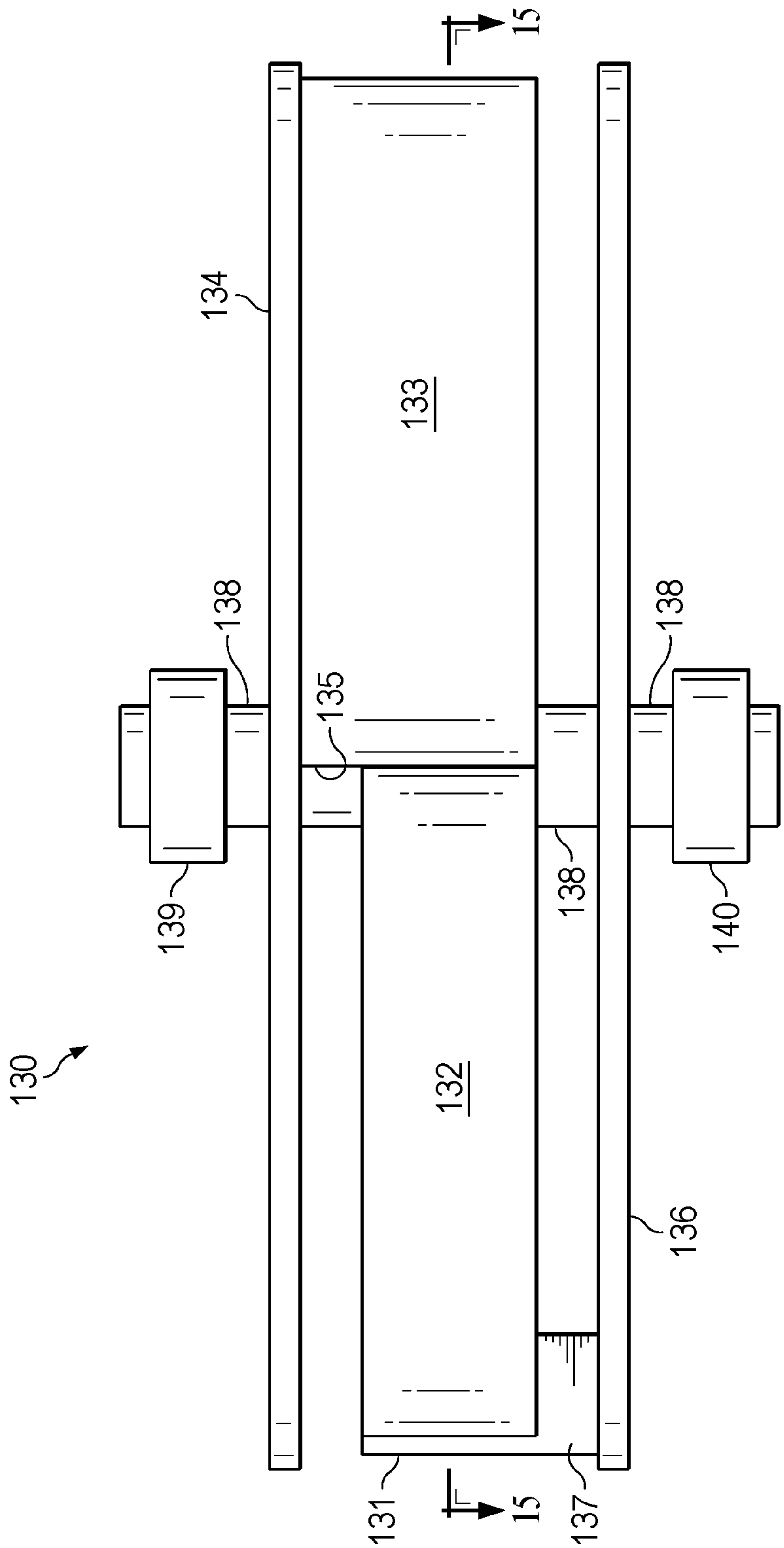
FIG. 14 shows a side view of the second embodiment of the present invention.

FIG. 14 shows a side view of the same embodiment 130 of the present disclosure that is illustrated in FIGS. 9-13.

Figure 15:
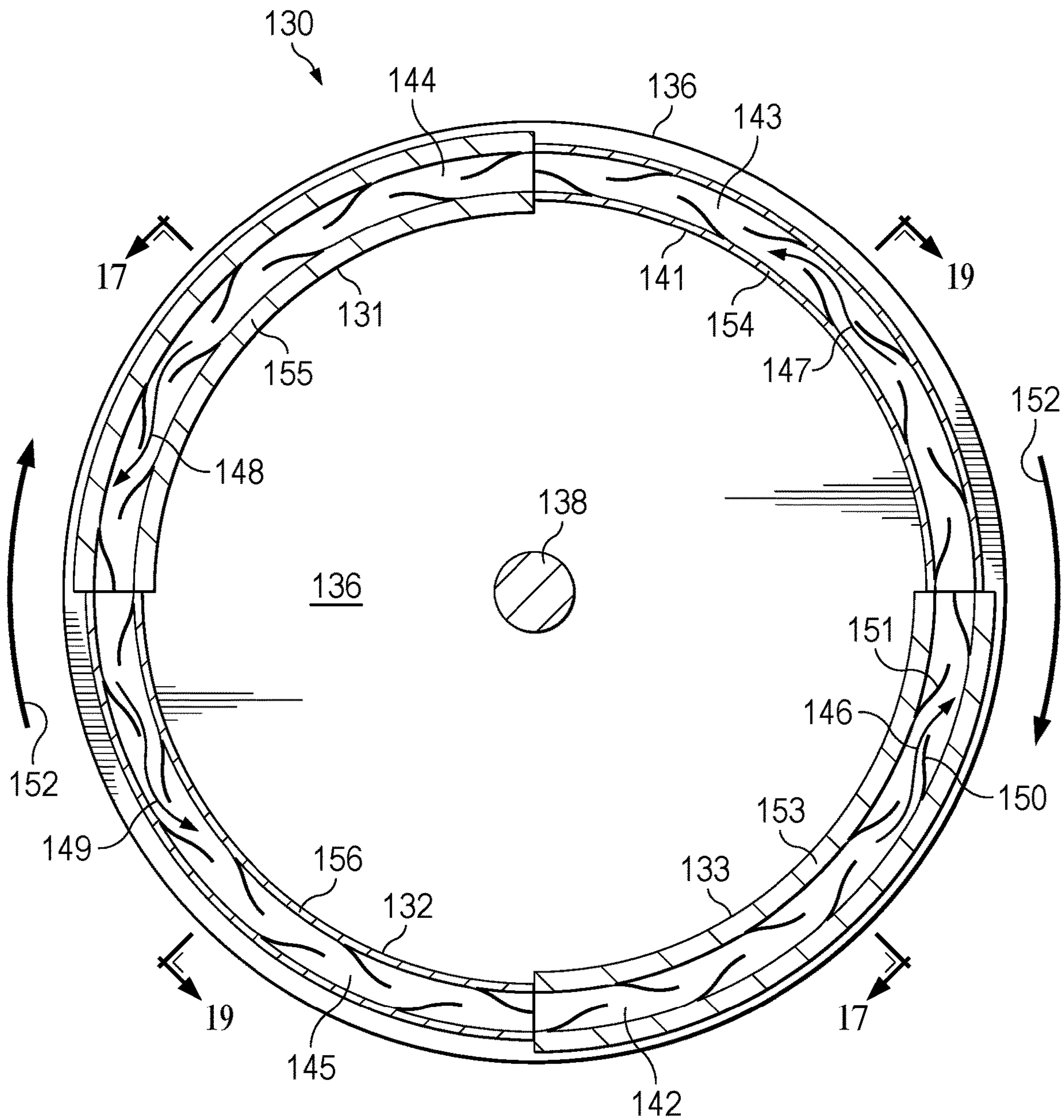
FIG. 15 shows a top-down sectional view of the second embodiment of the present invention.

FIG. 15 shows a top-down sectional view of the same embodiment 130 of the present disclosure that is illustrated in FIGS. 9-14 wherein the horizontal section plane is specified in FIG. 14 and the section is taken across line 15-15.

Illustrated in FIG. 15 is an embodiment 130 configured to operate as a heat engine, in which a working fluid (not shown) is hermetically sealed, trapped, contained, encased, and/or enclosed, within a fluidly interconnected tubular casing 131-133, and 141. And, that working fluid is alternately heated and cooled in such a way that the working fluid flows from where it is heated and expands to where it is cooled and contracts. A circular array of diodic elements, e.g., 150 and 151, determine a preferred direction, e.g., 146, of working-fluid flow through and/or within the embodiment's working-fluid-flow channel 142-145. Relatively little pressure is required in order to achieve a flow of working fluid in a first preferred direction of flow 146-149 (i.e. counterclockwise with respect to the orientation and perspective of the illustration in FIG. However, and by contrast, due to the inherent diodicity of the diodic elements within the working-fluid-flow channel, a relatively large amount of pressure is, and/or would be, required in order to achieve a flow of working fluid in a second, opposite direction of flow (not shown, and, i.e., clockwise with respect to the orientation and perspective of the illustration in FIG. 15). Due to the diodic effect of the diodic elements, the working fluid will tend to flow in a preferred direction of flow, e.g., 146, and not in an opposite direction of flow.

When the working fluid (not shown) of embodiment 130 flows 146 in a counterclockwise direction through the embodiment's working-fluid-flow channel 142-145, the embodiment is driven to rotate 152 in an opposite, clockwise direction. And, while the working fluid in three 142-144 of the embodiment's four working-fluid-flow channel portions, sections, partitions, parts, regions, and/or zones, is driven to flow by a pressure gradient, with the working fluid flowing from regions of relative higher pressure to regions of relatively lower pressure, the cooled working fluid within the fourth portion 145 of the working-fluid-flow channel is driven to flow as a result of the embodiment's rotations 152 doing work on the working fluid within that portion of the working-fluid-flow channel, i.e. by an inertia of the working fluid resisting the rotation of the embodiment and being compressed, e.g., by centrifugal forces, in the process. The working fluid flowing through the fourth portion of the fluid-flow channel is compressed as a result of the rotation of the embodiment, and the inertia of the working fluid therein, causing the working fluid to resist that rotation.

The single working-fluid-flow channel 142-145 through which the embodiment's working fluid flows comprises four channel portions, sections, partitions, parts, regions, and/or zones, based on the prevalent, dominant, and/or characteristic direction of thermal transfer, or on the absence of such thermal transfer, in conjunction with the characteristic relative volume per unit working-fluid mass (and/or working-fluid density) and pressure of the working fluid within the respective portion of the fluid-flow channel.

A first portion 142 of the embodiment's working-fluid-flow channel, which is encased by a first channel section 133 of the embodiment's annular tubular channel casing, is exposed to an external source of heat, i.e. a source of thermal energy having a temperature that is greater than the relatively cold temperature of the working fluid (not shown) that enters the first annular tubular channel section 142. A portion of the heat imparted to the embodiment via and/or through its upper thermally-conductive plate (not visible, 134 in FIG. 14) and its corresponding, and/or respective thermal bridge (not visible, 135 in FIG. 14) is then transmitted and/or conducted to the thermally-conductive channel walls 153 of the respective annular tubular channel section 133 and therethrough to the working fluid flowing within that first portion of the working-fluid-flow channel.

Upon being warmed by, and/or upon receiving heat from, the channel walls 153 of the annular tubular channel section 133, the working fluid (not shown) will tend to expand and flow away from that portion of the working-fluid-flow channel, which will tend to drive and/or push the warmed working fluid out of annular tubular channel portion 142 of the working-fluid-flow channel, and into annular tubular channel portion 143. The diodic elements, e.g., 150 and 151, arrayed throughout the working-fluid-flow channel frustrate clockwise flows of working fluid through and/or within the working-fluid-flow channel, while facilitating, enabling, and/or permitting, counterclockwise flows, e.g., 146, of working fluid therethrough.

The upper thermally-conductive plate (not visible, 134 in FIG. 14) and its corresponding, and/or respective thermal bridge (not visible, 135 in FIG. 14), as well as the channel walls 153 of the first section 133 of the embodiment's annular tubular channel casing, may be made, fabricated, constructed, fashioned, and/or comprised of, a thermally-conducting material. Materials of which the channel walls of the first section of the annular tubular channel casing may be made include, but are not limited to: metal, iron, silver, copper, gold, aluminum nitride, silicon carbide, aluminum, tungsten, and zinc.

External sources of heat that might be used to heat, warm, and/or impart thermal energy to, the upper thermally-conductive plate (134 in FIG. 14) of an embodiment 130 could include, but are not limited to: sunshine, steam, flames, radioactive material, heated water, exhaust of internal combustion engines, rotting organic material, waste heat produced by computers and/or other electronic devices, discharging batteries, Peltier thermocouples (warm side), and electrical transformers.

The channel walls 154 of the respective annular tubular channel section 141 are thermally insulating and do not conduct thermal energy into, or out from, the working-fluid-flow channel and the working fluid therein. Upon entering working-fluid-flow channel portion 143, and while flowing 147 therethrough, the working fluid tends to neither receive any additional thermal energy from outside the embodiment, nor to lose any thermal energy to the environment outside the embodiment.

Working fluid (not shown) flowing out of working-fluid-flow channel portion 142 and into working-fluid-flow channel portion 143 will tend to have achieved a relatively high and/or elevated rate of flow by the time it enters working-fluid-flow channel portion 143. The rate at which the working fluid flows through working-fluid-flow channel portion 143 will tend to continue to increase as it flows through that working-fluid-flow channel portion and it will tend to continue to expand in response to, and/or as a consequence of, the thermal energy it absorbed while within, and/or flowing through, working-fluid-flow channel portion 142. However, the expansion of the working fluid as it flows through portion 143 of the embodiment's working-fluid-flow channel is adiabatic and is no longer energized by a continued, and/or a continuing, inflow and/or influx of additional thermal energy, and/or heat, from outside the embodiment. Because of this, the continued expansion of the working fluid within annular tubular channel section 141 tends to be associated with a relatively rapid decrease in the pressure of the working fluid.

The second section 141 of the embodiment's annular tubular channel casing, may be made, fabricated, constructed, fashioned, and/or comprised of, a thermally insulating material. Materials of which the walls of the second section of the annular tubular channel casing may be made, and/or materials of which the channel walls of the second section of the annular tubular channel casing may be lined, include, but are not limited to: plastic, glass, acrylic glass (e.g., Plexiglas), fiberglass, Teflon, polyurethane foam, expanded polystyrene, epoxy, and bronze. The channel walls of the second section of the annular tubular channel casing may also be made of, and/or lined with, any thermally-insulating material of fabrication, and/or of a layered and/or laminate material comprising a thermally-insulating material of fabrication. The channel walls of the second section of the annular tubular channel casing may also be comprised, fabricated, fashioned, made, and/or created, of a laminate or layers which include a layer, gap, space, and/or partition, comprising, including, and/or incorporating, a thermally insulating material (e.g., plastic), gas (e.g., nitrogen), void (e.g., partial or full vacuum), and/or metamaterial, which tends to prevent or inhibit a conduction of thermal energy. Such a laminate may include, and/or incorporate, thermally-conductive materials to provide structural strength while, as a whole, being and/or remaining thermally-insulating.

A third portion 144 of the embodiment's working-fluid-flow channel, which is encased by a third section 131 of the embodiment's annular tubular channel casing, is exposed to an external source of cold, i.e. a sink of thermal energy having a temperature that is less than the relatively warm temperature of the working fluid that enters annular tubular channel section 131. A portion of the heat, and/or thermal energy, within the working fluid that flows 148 into, within, and/or through, annular tubular channel section 131 will tend to flow, be conducted, and/or be transmitted, from the working fluid and into the channel walls 155 of annular tubular channel section 131. The loss of thermal energy tends to cause the unit volume (i.e., the volume per unit working-fluid mass) of the working fluid to drop, and/or cause the density (i.e., the mass per unit working-fluid volume) of the working fluid to increase.

A portion of the thermal energy removed from the working fluid as it flows through and/or within working-fluid-flow channel portion 144 will tend to flow into a respective thermal bridge (not visible, 137 in FIG. 14) and therethrough into the lower thermally-conductive plate 136. Thermal energy transmitted from the working fluid flowing through the portion 144 of the embodiment's working-fluid-flow channel to the embodiment's lower thermally-conductive plate will thereafter and therethrough tend to be conducted and/or transmitted to the external source of relative cold.

As it chills and/or cools, the working fluid flowing through and/or within working-fluid-flow channel portion 144 tends to create a partial vacuum that tends to pull working fluid from portion 143 of the working-fluid-flow channel, thereby accelerating and/or promoting the expansion, and loss of pressure, within that working fluid flowing through working-fluid-flow channel portion 143 and flowing toward working-fluid-flow channel portion 144.

The lower thermally-conductive plate 136 and its corresponding, and/or respective thermal bridge (not visible, 137 in FIG. 14), as well as the channel walls 155 of section 131 of the embodiment's annular tubular channel casing, may be made, fabricated, constructed, fashioned, and/or comprised of, a thermally conducting material. Materials of which the walls of the third section of the tubular casing may be made include, but are not limited to: metal, iron, silver, copper, gold, aluminum nitride, silicon carbide, aluminum, tungsten, and zinc.

External sources of cold, i.e., external thermal sinks, that might be used to cool, chill, and/or remove heat from, the lower thermally-conductive plate 136 of embodiment 130 could include, but are not limited to: ice, water, air, fluidic venturi tubes, Peltier thermocouples (cold side), evaporative coolers (i.e. evaporating liquids), dry ice, depressurizing (e.g., leaking) gas, and/or the vacuum of space (e.g., through the emission of infrared electromagnetic radiation from the lower thermally-conductive plate).

When working fluid cooled within working-fluid-flow channel portion 144 flows 148 out of that working-fluid-flow channel portion and flows 149 into working-fluid-flow channel portion 145, it tends to continue flowing 149 in a counterclockwise direction because this direction of flow tends to minimize its potential energy with respect to the rotations 152 of the embodiment. As the working fluid flows within working-fluid-flow channel portion 145, the embodiment tends to do work on it, and it tends to be compressed therein, e.g., by centrifugal forces produced by the embodiment's rotation 152. The compression of the working fluid within working-fluid-flow channel portion 145 is adiabatic as the channel walls 156 of annular tubular channel section 132 are insulating and inhibit any further cooling of the working fluid therein.

The compression of the working fluid within working-fluid-flow channel portion 145 tends to cause the pressure of that working fluid to increase, even as it drives the cooled working fluid toward working-fluid-flow channel portion 142.

After flowing through, and then out of, working-fluid-flow channel portion 145, the cooled and compressed working fluid again enters, flows into, and then flows 146 through, working-fluid-flow channel portion 142—thereby repeating a cyclic pattern of working-fluid flow through the working-fluid-flow channel, and/or through the channel portions thereof.

The fourth section 132 of the embodiment's annular tubular channel casing, may be made, fabricated, constructed, fashioned, and/or comprised of, a thermally insulating material. Materials of which the walls of the second section of the annular tubular channel casing may be made, and/or materials of which the walls of the second section of the annular tubular channel casing may be lined, include, but are not limited to: plastic, glass, acrylic glass (e.g., Plexiglas), fiberglass, Teflon, polyurethane foam, expanded polystyrene, epoxy, and bronze. The channel walls of the fourth section of the annular tubular channel casing may also be made of, and/or lined with, any thermally insulating material of fabrication, and/or of a layered and/or laminate material comprising a thermally insulating material of fabrication. The walls of the fourth section of the annular tubular channel casing may also be comprised, fabricated, fashioned, made, and/or created, of a laminate or layers which include a layer, gap, space, and/or partition, comprising, including, and/or incorporating, a thermally insulating material (e.g., plastic), gas (e.g., nitrogen), void (e.g., partial or full vacuum), and/or metamaterial, which tends to prevent or inhibit a conduction of thermal energy. Such a laminate may include, and/or incorporate, thermally-conductive materials to provide structural strength while, as a whole, being and/or remaining thermally insulating.

In an alternate configuration of the embodiment 130 illustrated in FIGS. 9-15, an external heat source (not shown) imparts thermal energy to the lower thermally-conductive plate 136 causing the channel walls of thermally-conductive annular tubular channel section 131, and working fluid flowing therein and/or therethrough, to warm and expand. By contrast, an external source of cold, and/or an external thermal sink, removes thermal energy from the upper thermally-conductive plate (not visible, 134 in FIG. 14) causing the channel walls of thermally-conductive annular tubular channel section 133, and working fluid flowing therein and/or therethrough, to cool and contract. The alternate configuration of embodiment 130 tends to rotate in the same direction as the configuration of the embodiment 130 illustrated in FIGS. 9-15. And, the working fluid flowing through the working-fluid-flow channel of the alternately configured embodiment 130, tends to flow in the same direction as the working fluid flows through the working-fluid-flow channel of the embodiment 130 illustrated in FIGS. 9-15.

Figure 16:
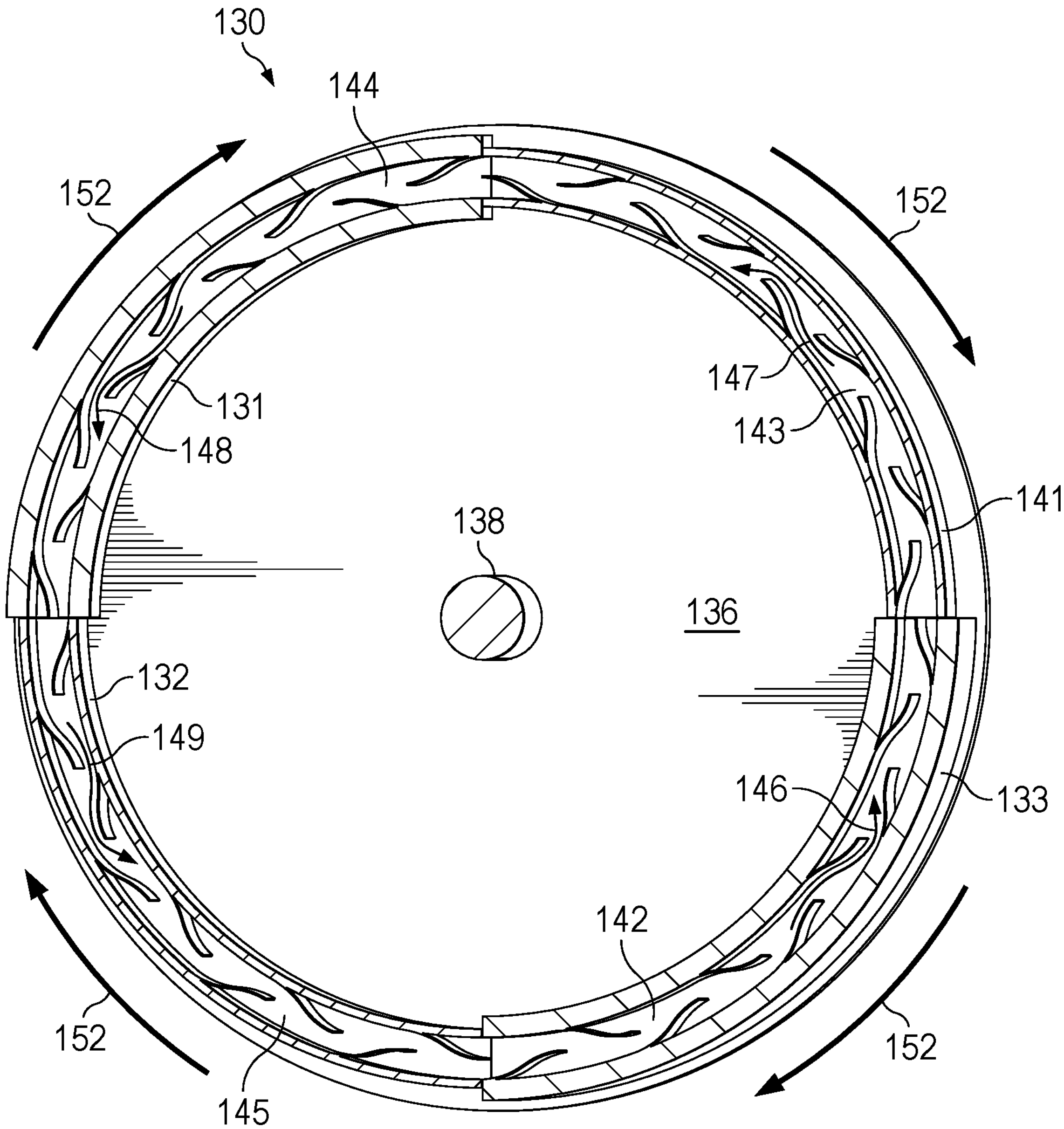
FIG. 16 shows a perspective top-down sectional view of the second embodiment of the present invention.

FIG. 16 shows a perspective top-down sectional view of the same embodiment 130 of the present disclosure that is illustrated in FIGS. 9-15 wherein the horizontal section plane is specified in FIG. 14 and the section is taken across line 15-15.

Figure 17:
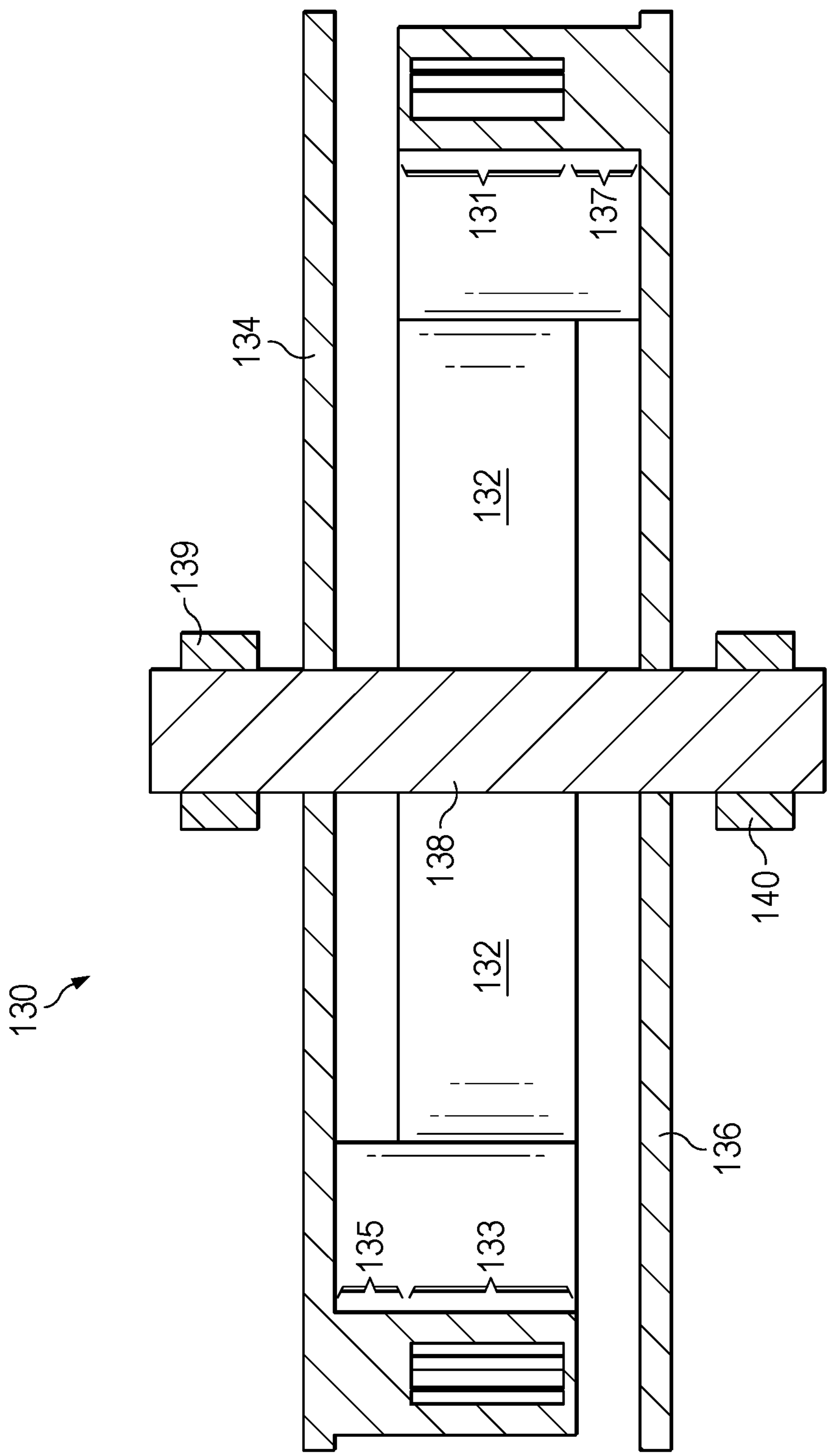
FIG. 17 shows a side sectional view of the second embodiment of the present invention.

FIG. 17 shows a side sectional view of the same embodiment 130 of the present disclosure that is illustrated in FIGS. 9-16 wherein the vertical section plane is specified in FIG. and the section is taken across line 17-17.

Figure 18:
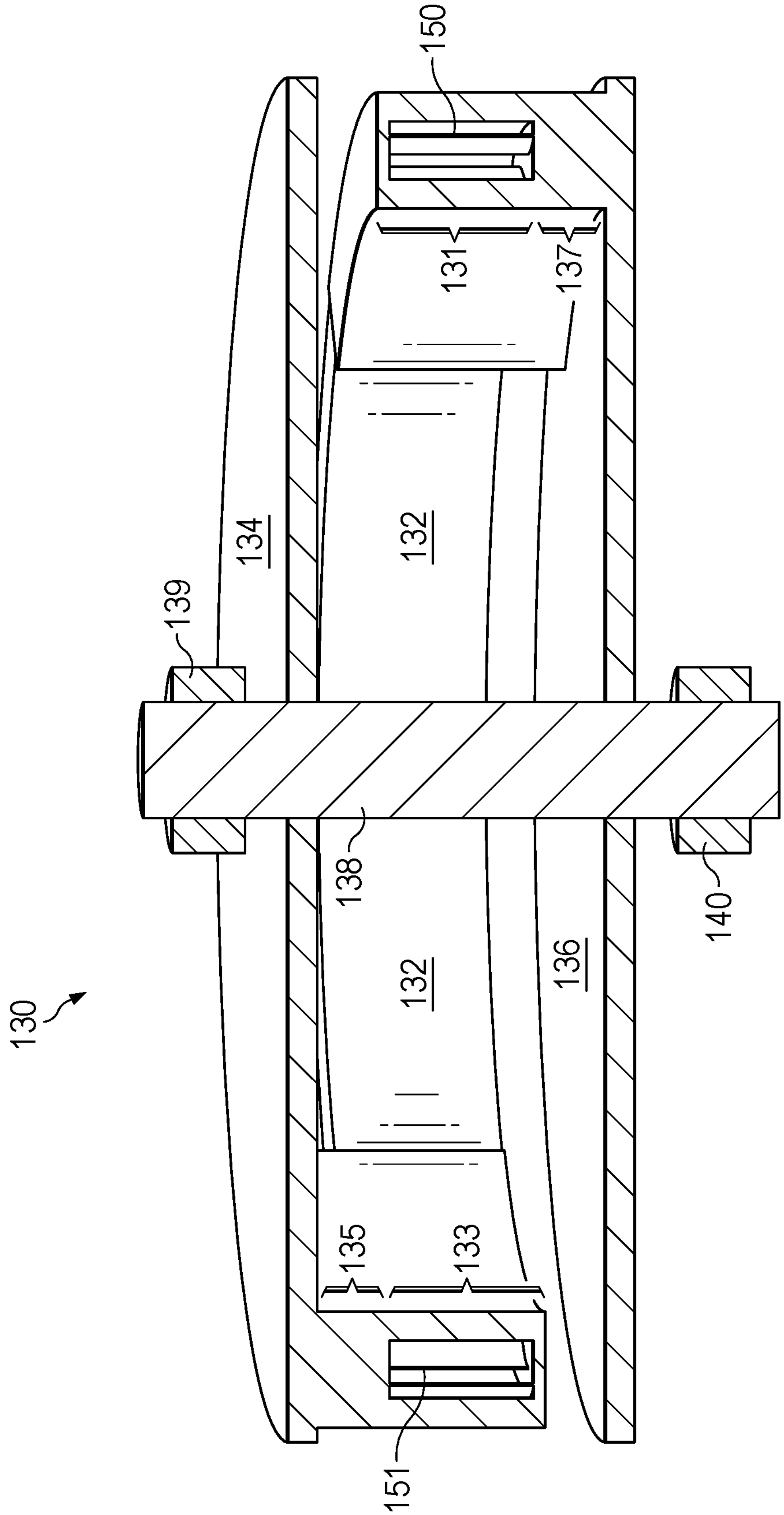
FIG. 18 shows a perspective side sectional view of the second embodiment of the present invention.

FIG. 18 shows a perspective side sectional view of the same embodiment 130 of the present disclosure that is illustrated in FIGS. 9-17 wherein the vertical section plane is specified in FIG. 15 and the section is taken across line 17-17.

Figure 19:
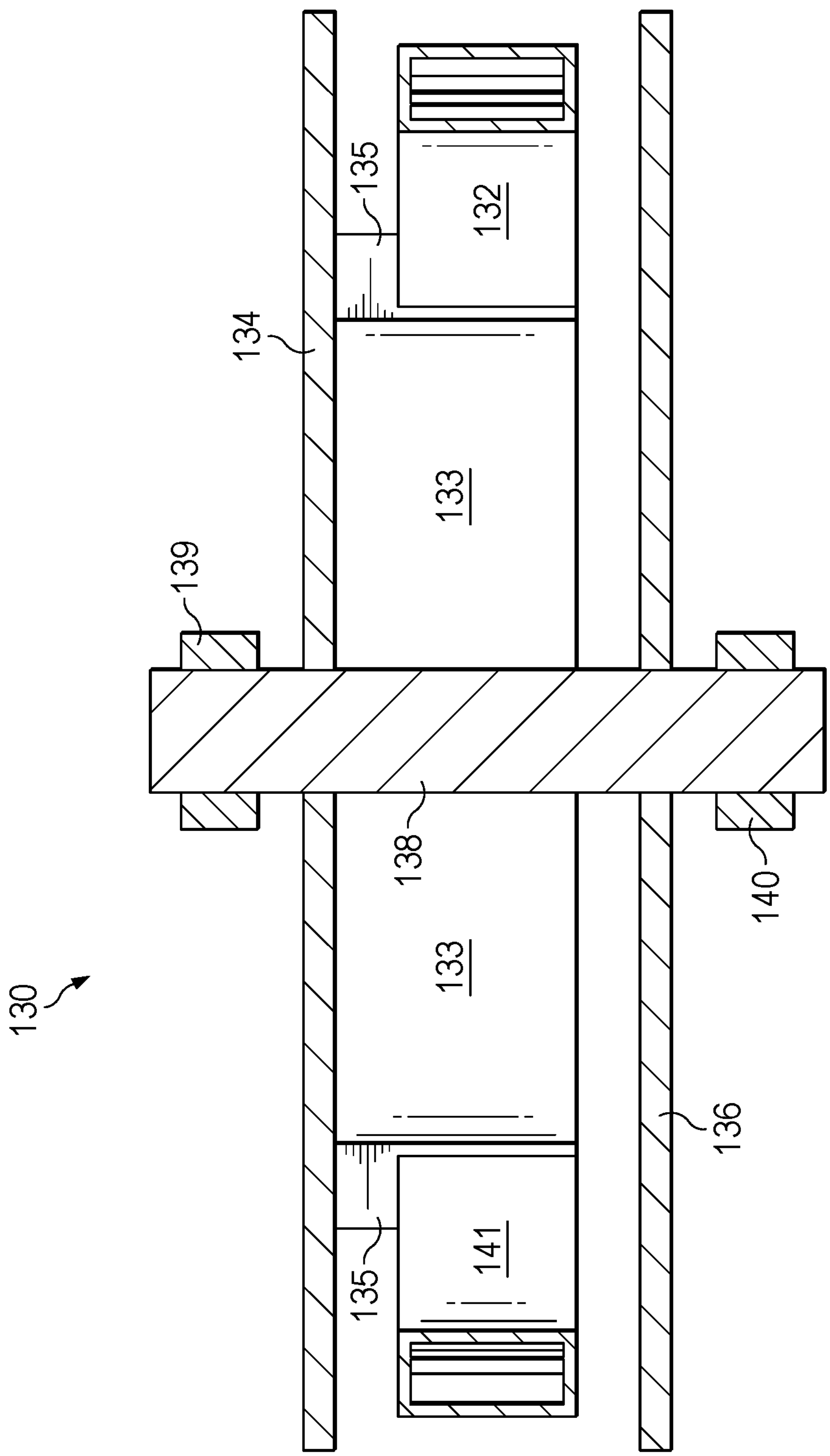
FIG. 19 shows a side sectional view of the second embodiment of the present invention.

FIG. 19 shows a side sectional view of the same embodiment 130 of the present disclosure that is illustrated in FIGS. 9-18 wherein the vertical section plane is specified in FIG. and the section is taken across line 19-19.

Figure 20:
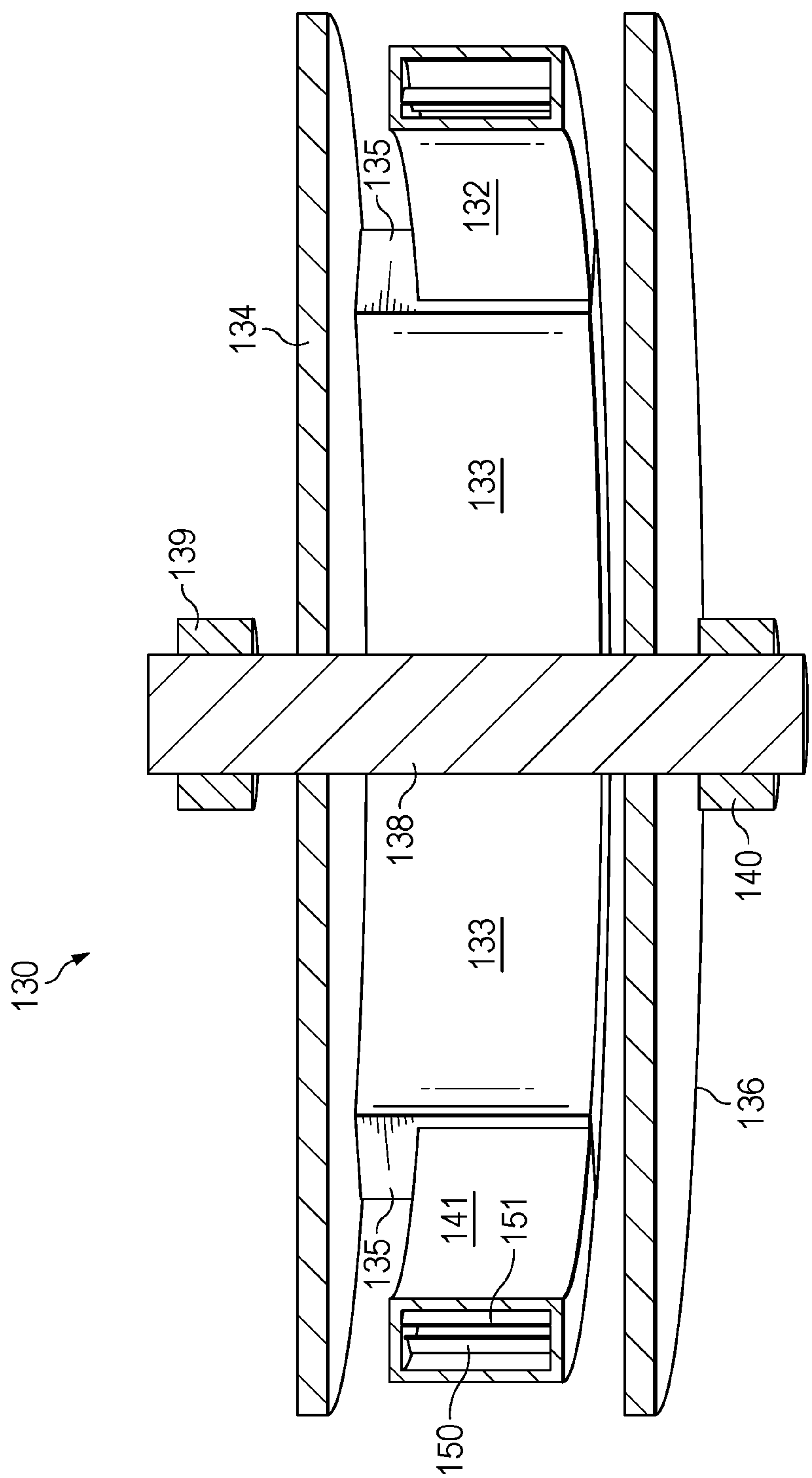
FIG. 20 shows a perspective side sectional view of the second embodiment of the present invention.

FIG. 20 shows a perspective side sectional view of the same embodiment 130 of the present disclosure that is illustrated in FIGS. 9-19 wherein the vertical section plane is specified in FIG. 15 and the section is taken across line 19-19.

The varieties of embodiments, their geometries, their working fluids, their operations, and their applications, enumerated within the "Summary of the Invention" section of this disclosure apply to the embodiment illustrated and discussed in relation to FIGS. 9-20, and the scope of the present disclosure includes all such variations of the embodiment illustrated in FIGS. 9-20.

Disclosed in this specification, and in FIGS. 9-20, is a reversible, closed-cycle, externally-heated heat engine, comprising: a circular fluid-flow channel, of approximately constant flow-normal cross-sectional area, containing a working fluid, and a shaft of rotation; said fluid-flow channel having a plurality of diodic structures therein; said fluid-flow channel comprising a first fluid-flow-channel sector in which working fluid is thermally connected to an external source of a first temperature; said fluid-flow channel comprising a second fluid-flow-channel sector in which working fluid flows adiabatically; said fluid-flow channel comprising a third fluid-flow-channel sector in which working fluid is thermally connected to an external source of a second temperature; said fluid-flow channel comprising a fourth fluid-flow-channel sector in which working fluid flows adiabatically; wherein working fluid flows within the fluid-flow channel in a first rotational direction when the first temperature is greater than the second temperature; wherein working fluid flows within the fluid-flow channel in the first rotational direction when the first temperature is lesser than the second temperature; and, wherein a flow of working fluid within the fluid-flow channel in the first rotational direction causes the shaft to rotate in a second rotational direction which is opposite the first rotational direction.

Disclosed in this specification, and in FIGS. 9-20, is a closed-cycle, externally-heated heat engine, comprising: a circular fluid-flow channel, having a centerline in a centerline plane, containing a working fluid, and having a shaft of rotation that is normal to the centerline plane; a first thermal plate parallel to the centerline plane, a radial center of which is rigidly connected to the shaft; a second thermal plate parallel to the centerline plane, a radial center of which is rigidly connected to the shaft; wherein the first thermal plate and the second thermal plate are on opposite sides of the intermediate centerline plane; and, wherein a heating of the first or second thermal plate, and a cooling of the other second or first thermal plate, causes the shaft to rotate in a first direction of rotation.

Disclosed in this specification, and in FIGS. 9-20, is a method for converting a thermal difference into a rotational motion of a shaft, comprising: forming a thermally non-conducting shaft; forming a hollow annular tube, having an approximately constant flow-normal cross-sectional area, and having radial axis of symmetry that is coaxial with a longitudinal axis of the shaft; attaching an upper circular, thermally-conductive plate to the shaft at a circular center of the plate and adjacent to an upper side of the hollow annular tube; attaching a lower circular, thermally-conductive plate to the shaft at a circular center of the plate and adjacent to a lower side of the hollow annular tube; sealing a working fluid within an interior of the hollow annular tube; fixedly attaching to an interior of the hollow annular tube a plurality of diodic structures that permit the working fluid to flow in a first direction through the hollow annular tube, but obstruct the working fluid from flowing in a second, opposite direction; adapting a heat-receiving portion of the hollow annular tube to have a tubular inlet and a tubular outlet, to have a thermally-conductive tube wall, and to receive heat of a high temperature; thermally connecting the upper thermally-conductive plate to the heat-receiving portion of the hollow annular tube; adapting a cold-receiving portion of the hollow annular tube to have a tubular inlet and a tubular outlet, to have a thermally-conductive tube wall, and to receive cold of a low temperature; thermally connecting the lower thermally-conductive plate to the cold-receiving portion of the hollow annular tube; adapting an adiabatic expansion portion of the hollow annular tube to have a thermally insulating tube wall and to fluidly connect an outlet of the heat-receiving portion of the hollow annular tube to an inlet of the cold-receiving portion of the hollow annular tube; adapting an adiabatic compression portion of the hollow annular tube to have a thermally insulating tube wall and to fluidly connect an outlet of the cold-receiving portion of the hollow annular tube to an inlet of the heat-receiving portion of the hollow annular tube; applying a heat of the high temperature to the upper thermally-conductive plate; and, applying a cold of the low temperature to the lower thermally-conductive plate.

Figure 21:
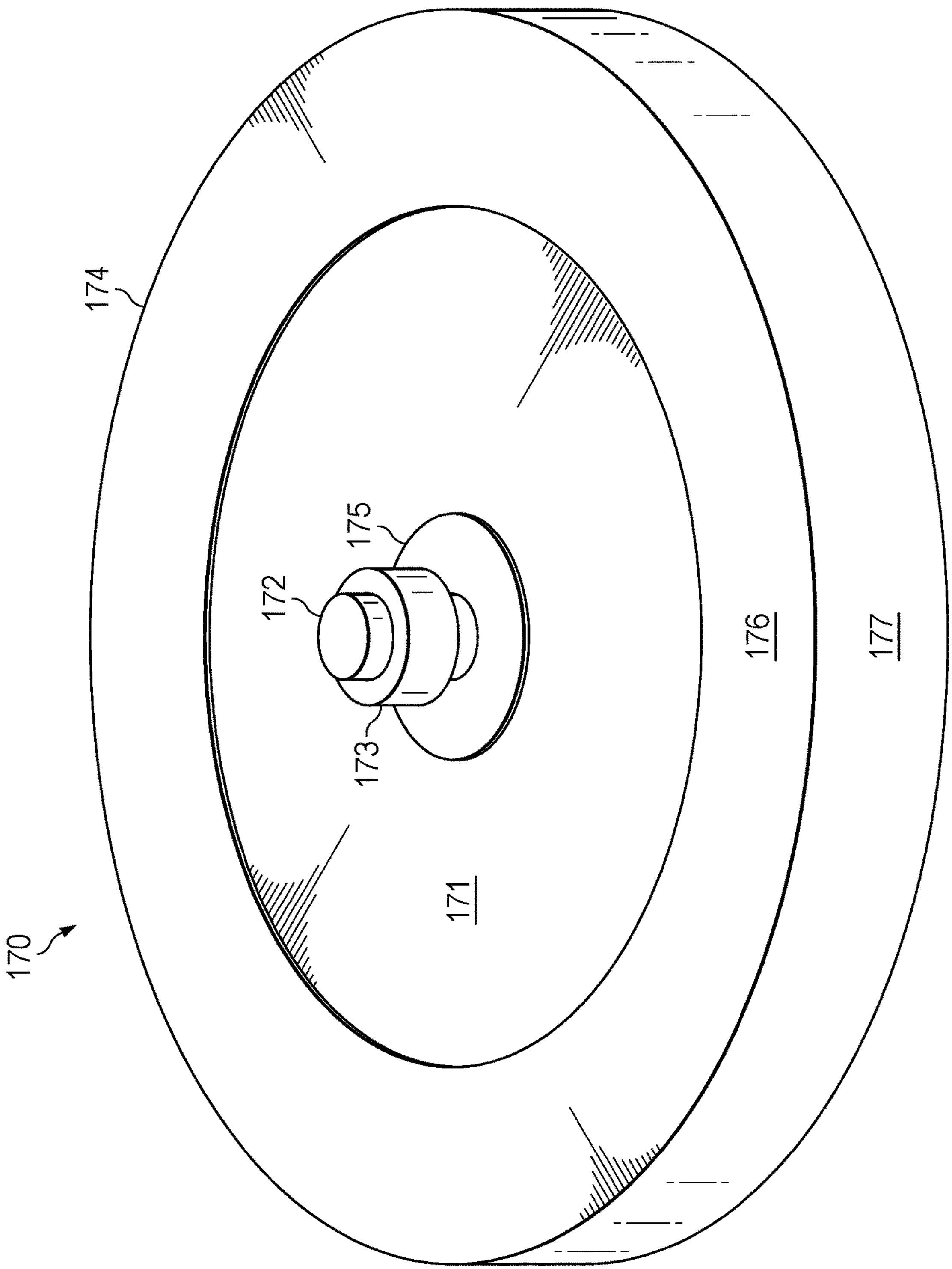
FIG. 21 shows a top-down perspective view of a third embodiment of the present invention.

FIG. 21 shows a top-down perspective view of an embodiment 170 of the present disclosure.

The embodiment illustrated in FIG. 21 has a shape, form, and/or geometry, that is approximately cylindrical and/or disk-shaped. The embodiment 170 is configured to receive heat from a thermal source external to the embodiment, and/or attached to an outer surface of the embodiment, through a warming of an annular thermally-conductive "hot plate" 171 positioned at an upper end and/or side of the disk. And the embodiment is configured to impart, discharge, dissipate, and/or to transmit, thermal energy to a thermal sink (i.e. source of cold) external to the embodiment, and/or attached to an outer surface of the embodiment, through a cooling of an annular thermally-conductive "cold plate" (not visible) positioned at a lower end and/or side of the disk.

The annular thermally-conductive hot plate 171 transmits and/or conducts thermal energy from an external thermal source (source of heat) to a working fluid (not shown) inside the embodiment that is thermally-connected, and/or thermally exposed, to the hot plate.

In response to a warming of its hot plate, and a cooling of its cold plate, the embodiment tends to rotate about a thermally insulating central shaft 172 and an axis of rotation (not shown). Upper 173 and lower (not visible) bearings, when attached to positionally-fixed, non-rotating, or other-rotating (i.e., rotating at a different rate and/or direction), external, and/or other, structure (not shown), mechanism, framework, and/or structural support, facilitate a rotation of the shaft, and the embodiment, with respect to the other structure, mechanism, and/or support.

With the exception of the upper hot plate 171 and the lower cold plate (not visible), the exterior wall, hull, shell, casing, enclosure, and/or surface, that comprises the exterior of the embodiment's "motive disk" 174, as well as the shaft 172, are comprised of thermally insulating materials and/or combinations of materials. Visible in FIG. 21, is an upper central annular insulated surface 175, an upper peripheral annular insulated surface 176, and an outer cylindrical insulated surface 177.

Figure 22:
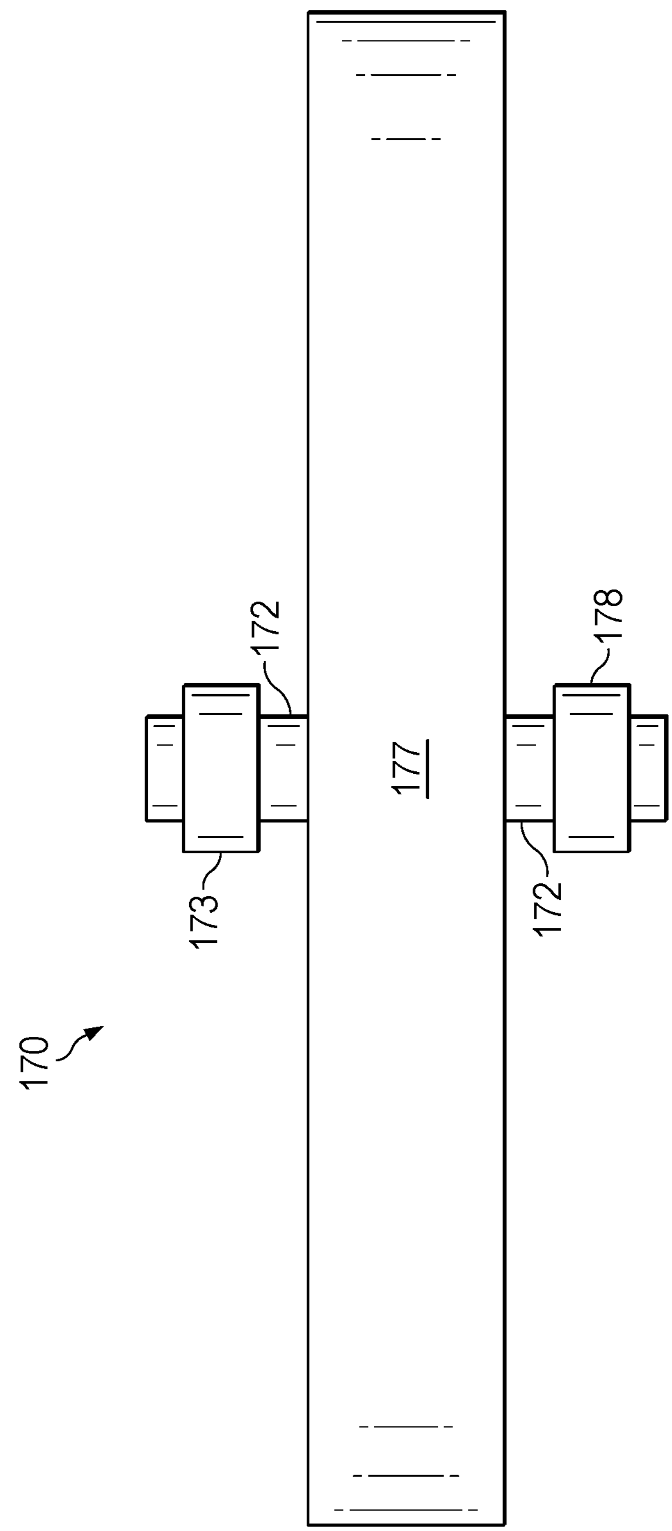
FIG. 22 shows a side view of the third embodiment of the present invention.

FIG. 22 shows a side view of the same embodiment 170 of the present disclosure that is illustrated in FIG. 21. Both of the embodiment's upper 173 and lower 178 bearings are visible in FIG. 22. Shaft 172 is a continuous thermal insulating, and/or insulated, rod, axle, pole, and/or cylinder, and passes through the embodiment's motive disk (174 in FIG. 21). Rotations of the shaft, and/or the embodiment, are facilitated by the upper and lower bearings rotatably-connected thereto.

Figure 23:
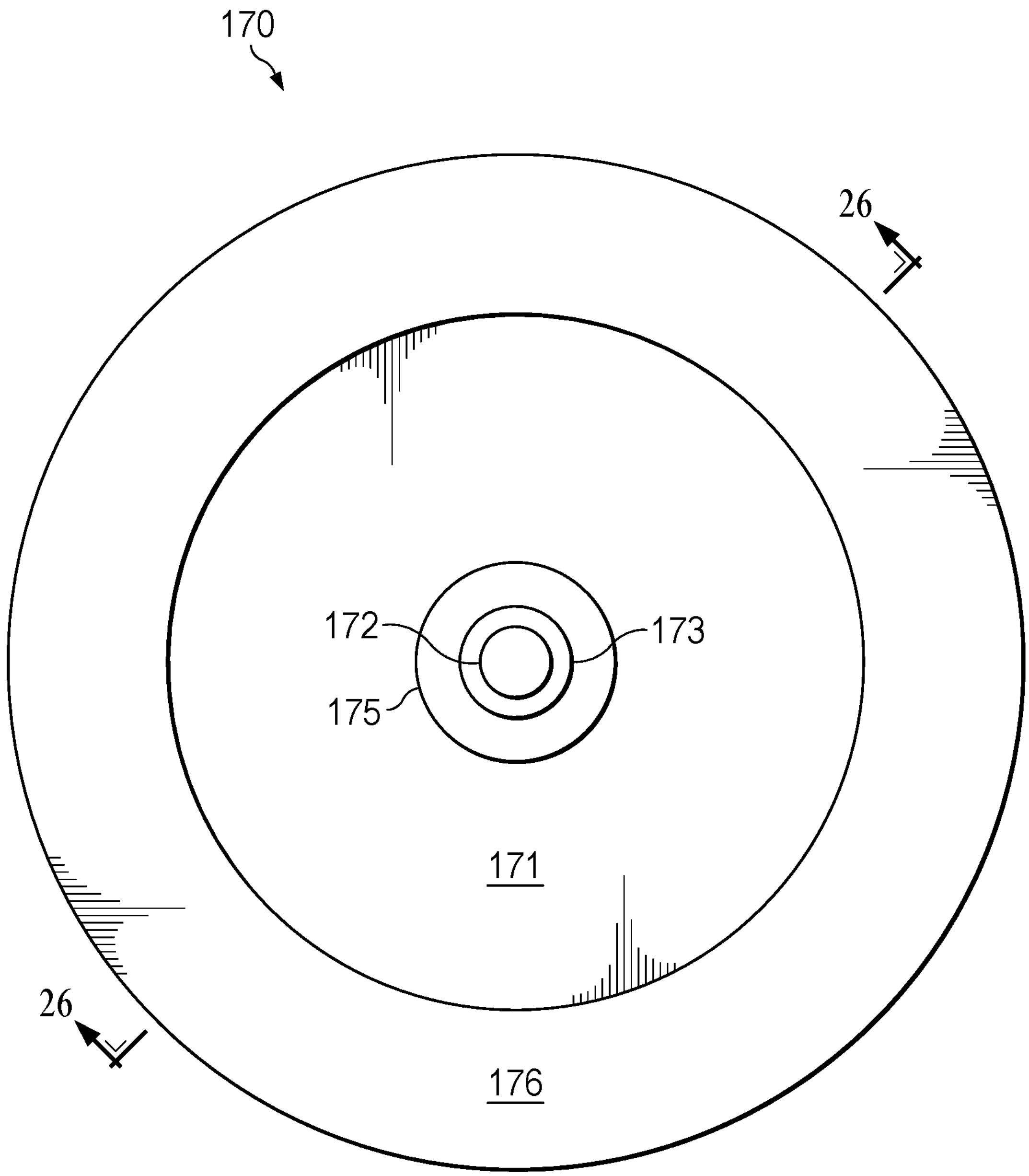
FIG. 23 shows a top-down view of the third embodiment of the present invention.

FIG. 23 shows a top-down view of the same embodiment 170 of the present disclosure that is illustrated in FIGS. 21 and 22.

Figure 24:
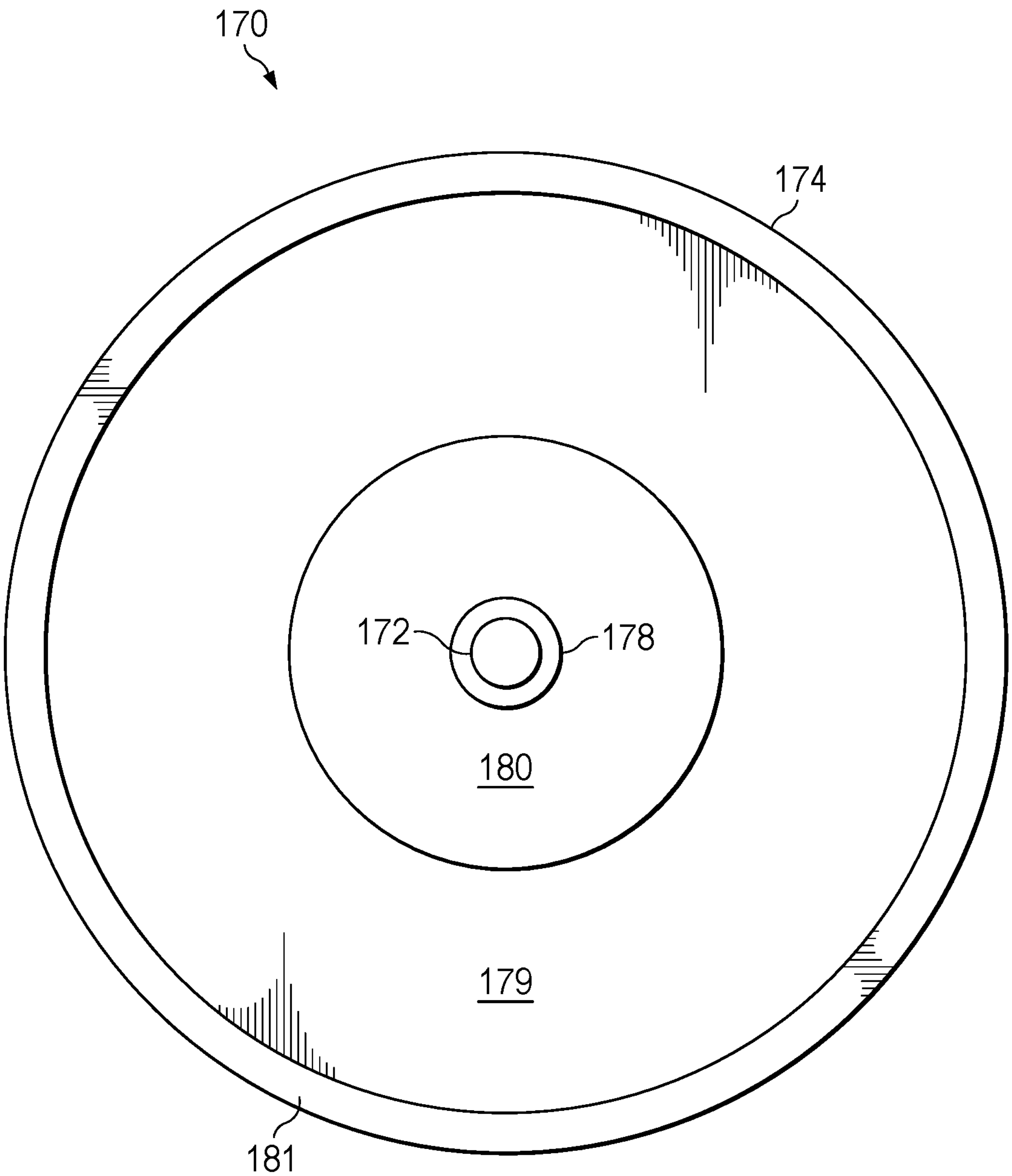
FIG. 24 shows a bottom-up view of the third embodiment of the present invention.

FIG. 24 shows a bottom-up view of the same embodiment 170 of the present disclosure that is illustrated in FIGS. 21-23.

On the lower end and/or side of the embodiment's motive disk 174, an annular thermally-conductive cold plate 179 transmits and/or conducts thermal energy from a working fluid (not shown, and thermally-connected to the cold plate) inside the embodiment to an external thermal sink (source of cold).

Between the cold plate 179 and the shaft 172 is a lower central annular insulated surface 180, and a relatively narrow lower peripheral annular insulated surface 181. While the hot plate (171 in FIGS. 21 and 23) is relatively close to the shaft 172 and relatively distant from the periphery of the motive disk 174, the cold plate 179 is relatively distant from the shaft and relatively close to the periphery of the motive disk.

Figure 25:
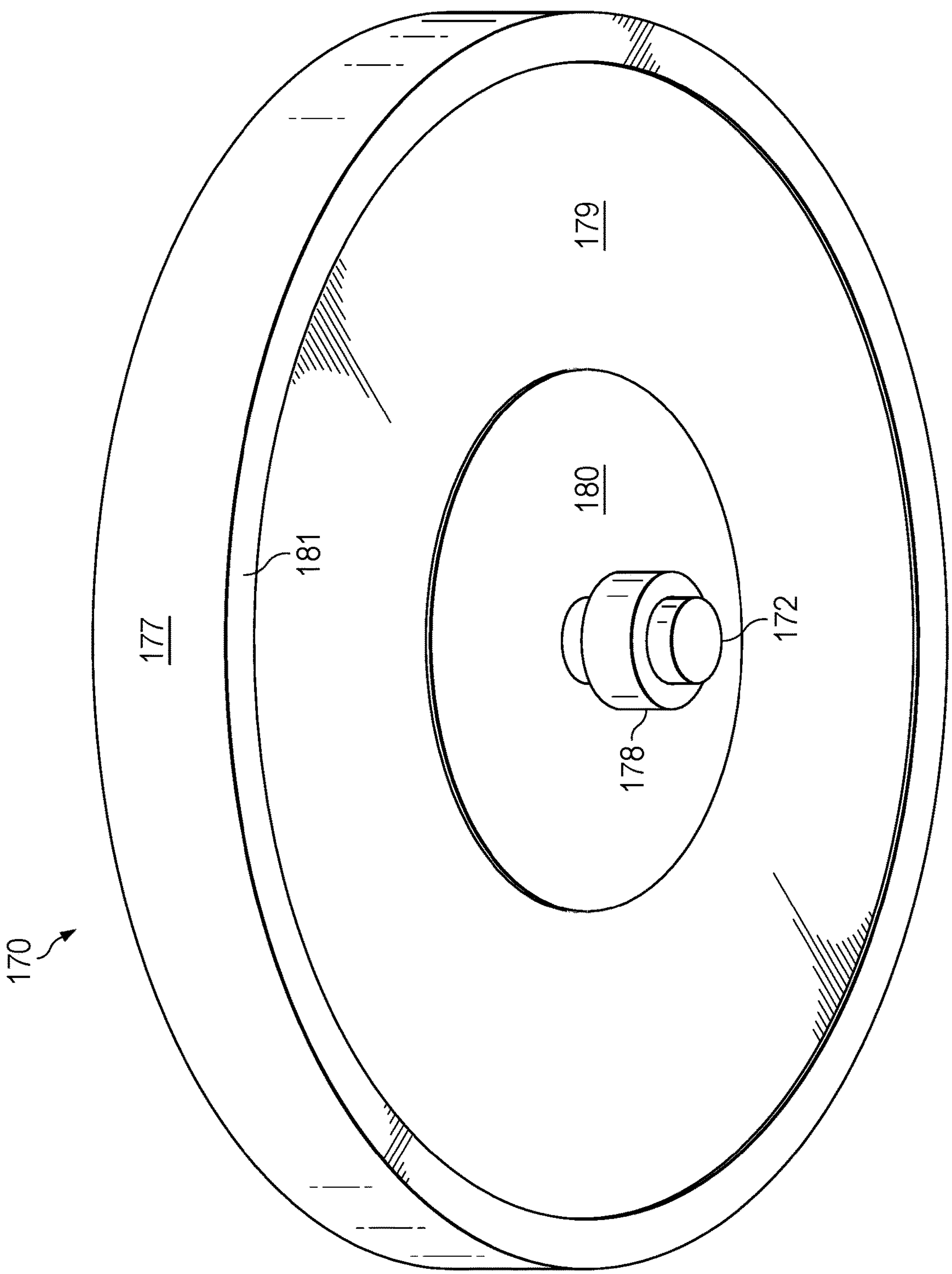
FIG. 25 shows a perspective bottom-up view of the third embodiment of the present invention.

FIG. 25 shows a perspective bottom-up view of the same embodiment 170 of the present disclosure that is illustrated in FIGS. 21-24.

Figure 26:
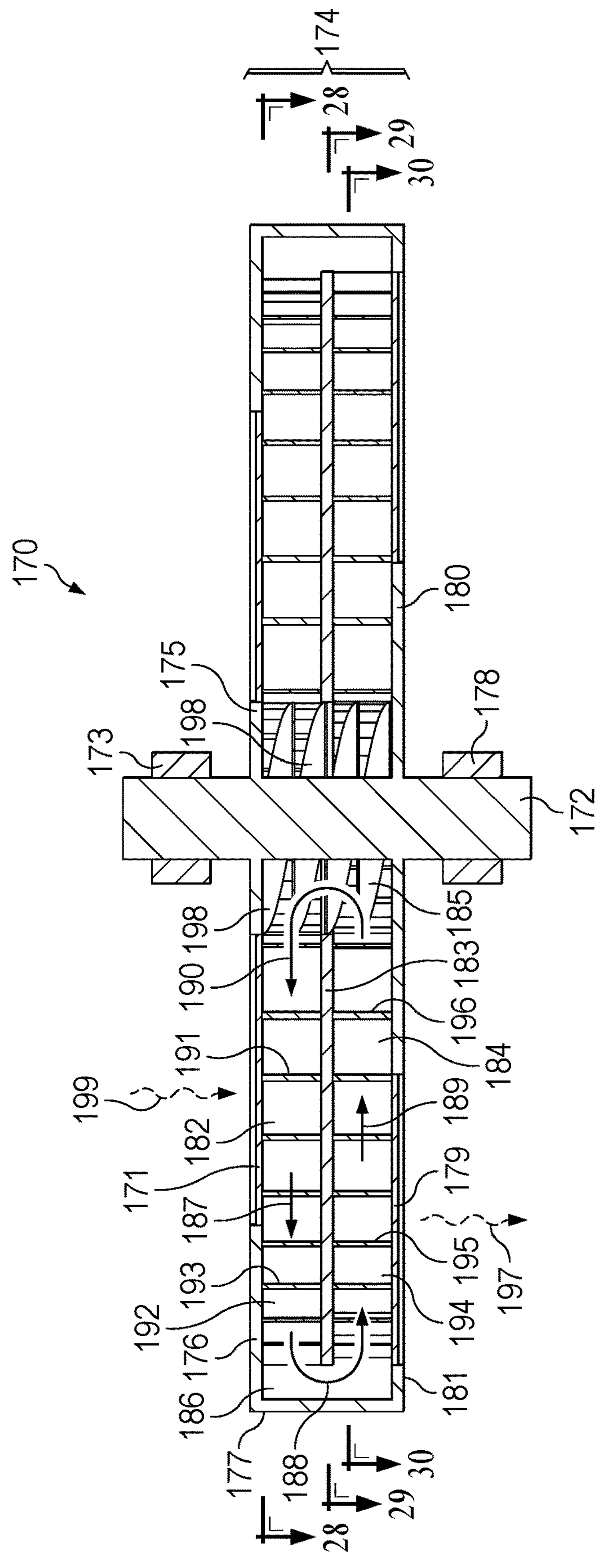
FIG. 26 shows a side sectional view of the third embodiment of the present invention.

FIG. 26 shows a side sectional view of the same embodiment 170 of the present disclosure that is illustrated in FIGS. 21-25 wherein the vertical section plane is specified in FIG. 23 and the section is taken across line 26-26.

The motive disk 174 of the embodiment 170 has spirally-shaped channels, e.g., 182, in an upper half of the motive disk, i.e. in the portion of the disk above an insulated medial dividing disk 183. And, the motive disk has counter-rotated spirally-shaped channels, e.g., 184, in a lower half of the motive disk, i.e. in the portion of the disk below the medial dividing disk. At a radial center of the motive disk, fluidly connecting a radially central end of the lower channels to a radially central end of the upper channels is a central annular conduit 185. And, at the periphery of the motive disk, fluidly connecting a peripheral, and/or outer radial, end of the upper channels to a peripheral, and/or outer radial, end of the lower channels is a peripheral annular conduit 186.

The working-fluid-flow channel of the embodiment 170 is a branched fluid-flow channel. Working fluid flowing through the embodiment passes through two working-fluid-flow junctions, and all of the embodiment's working fluid flows through those working-fluid-flow junctions. One of the embodiment's working-fluid-flow junctions, the central annular conduit 185, is positioned at the radial center of the motive disk, and it connects branching working-fluid-flow channels positioned above and below the embodiment's medial dividing disk 183. The other of the embodiment's working-fluid-flow junctions, the peripheral annular conduit 186, is positioned at the radial periphery of the motive disk, and it also connects the branching working-fluid-flow channels positioned above and below the embodiment's medial dividing disk.

Working fluid that flows together out of the uppermost end of the thermally insulated central annular conduit 185, then splits, and/or separates, as it then flows into, and/or is distributed across and/or through, the plurality of "warming" working-fluid-flow channels positioned above the medial dividing disk 183, which channels spiral away from the central annular conduit and toward the periphery of the upper side of the motive disk 174. That working fluid thereafter flows out of the radially outermost ends of those uppermost, and/or outward spiraling, working-flow-channels, and flows back together and then flows together into the uppermost end of the peripheral annular conduit 186. That working fluid thereafter flows down and through the peripheral annular conduit, after which it then flows together out of the lowermost end of the peripheral annular conduit, and then splits, and/or separates, as it then flows into, and/or is distributed across and/or through, the plurality of "cooling" working-fluid-flow channels positioned below the medial dividing disk, which channels spiral away from the peripheral annular conduit and toward the radial center of the lower side of the motive disk. And, that working fluid then flows back together and then flows together into the lowermost end of the central annular conduit, after which it then again flows together out of the uppermost end of the central annular conduit, and then again splits, and/or separates, as it then again flows into, and/or is distributed across and/or through, the plurality of "warming" working-fluid-flow channels positioned above the medial dividing disk.

The two working-fluid-flow junctions of the embodiment's working-fluid-flow channel are fluidly connected, and/or interconnected, by upper and lower pluralities of parallel spiraling working-fluid-flow channels.

The heating of working fluid (not shown) in a relatively central annular, and/or radial, portion of the upper channels (i.e., working-fluid-flow channels of the upper level of the motive disk), and the complementary cooling of working fluid in a relatively peripheral annular, and/or radial, portion of the lower channels (i.e., working-fluid-flow channels of the lower level of the motive disk), creates an energetic and volumetric imbalance that tends to induce a flow of working fluid, e.g., 187-190, that cyclically, and continuously, flows from a radially-central heated portion of the upper channels, to a radially-peripheral insulated portion of the upper channels, to a radially-peripheral chilled portion of the lower channels, to a radially-central insulated portion of the lower channels, and then back to the upper heated portion, and so on . . . . The thermally-driven flow of working fluid through the upper and lower channels of the motive disk 174 of the embodiment, creates an angular momentum in, and/or of, the working fluid which is countered, balanced, and/or compensated for, by an equal and opposite angular momentum of the motive disk. The angular rotation of the motive disk rotates the fixedly attached shaft 172 which is thereby able to do mechanical and/or rotary work.

Please note that while the illustrated arrows 187-190 indicate flow directions that are parallel to the hot 171 and cold 179 plates (e.g., arrows drawn as parallel to a radial line drawn normal to the shaft 172), the working fluid actually flows in, and/or along, approximately spiral and/or curved paths, and/or within spiral and/or curved channels, within the upper and lower levels of the motive disk 174. The illustrated arrows indicate a pattern of flow with respect to radial distance from the center and/or shaft 172 of the embodiment, and do not show the actual spiraling patterns of working-fluid flow that would have components of motion into and out from the illustration page. The conceptual working-fluid-flow illustrated arrows are included for the purpose of illustration and explanation and are not limitations of the present disclosure.

When thermal energy and/or heat, e.g., 199, as from an external heat source (not shown) impinges upon, is transmitted to, and/or is absorbed by, hot plate 171, a portion of that heat warms the hot plate and the thermally-connected lateral channel walls, e.g., 191, of the embodiment's "warming" channels, and/or isothermal expansion channels, e.g., 182. A portion of the heat within the hot plate and isothermal expansion channel walls is transmitted, conducted, transferred, and/or imparted to, working fluid (not shown) within, and/or flowing through, the isothermal expansion channels, thereby causing that working fluid to warm and expand (e.g., with respect to the volume of each unit mass of working fluid).

The expanding working fluid (not shown) within the isothermal expansion channels flows 187 away from the center of the motive disk 174 (through spiraling working-fluid-flow channels), and away from the radial center of the hot plate 171, toward the periphery of the motive disk, imparting rotational kinetic energy to the motive disk, and shaft, in the process. The expanding working fluid flows out of the radially distal exit apertures of the isothermal expansion channels and into the radially proximal (and adjacent) entrance apertures of the adiabatic expansion channels, e.g., 192.

The adiabatic expansion channels, e.g., 192, are thermally insulated between the upper peripheral annular insulated surface 176 above, the insulated medial dividing disk 183 below, and the lateral thermally non-conductive, and/or insulated, channel walls, e.g., 193, of the adiabatic expansion channels. As the working fluid continues to expand within the adiabatic expansion channels, its pressure falls. When the expanded and depressurized working fluid flows out of the radially distal exit apertures of the adiabatic expansion channels, it then flows 188 from the upper level of the motive disk 174 to the lower level by flowing into, down, and through, the peripheral annular conduit 186, therefrom flowing into the radially distal entrance apertures of the isothermal contraction channels, e.g., 194, of the lower level.

The thermally-conductive lateral channel walls, e.g., 195, of the isothermal contraction channels, e.g., 194, and the thermally-connected, and thermally-conductive cold plate 179, absorb, remove, receive, and/or acquire, thermal energy from the working fluid (not shown) flowing through them. A portion of the thermal energy absorbed by the cold plate and lateral channel walls of the isothermal contraction channels is transmitted 197, conducted, transferred, and/or imparted to, a thermal sink (cold source, not shown) thermally connected, and/or attached, to the cold plate 179.

As the working fluid (not shown) flowing through and/or within the isothermal contraction channels, e.g., 194, becomes colder, its volume per unit mass of working fluid decreases and it becomes increasingly compressed and more dense. Working fluid flows out of the radially proximal exit apertures of the isothermal contraction channels and into the radially distal, and adjacent, entrance apertures of the adiabatic compression channels, e.g., 184.

Within the adiabatic compression channels, e.g., 184, the working fluid (not shown) is thermally isolated between the insulating medial dividing disk 183 above, the lower central annular insulated surface 180 below, and the lateral thermally insulating, and/or insulated, channel walls, e.g., 196, of the adiabatic compression channels. Within the adiabatic compression channels, the rotation and/or spinning of the embodiment, and the motive disk 174 thereof, mechanically compress the chilled working fluid, thereby increasing its pressure as it further reduces the volume per unit mass of working fluid of the cooled working fluid.

Working fluid (not shown) flowing out of the radially proximal exit apertures of the adiabatic compression channels flows 190 from the lower level of the motive disk 174 to the upper level by flowing into, up, and through, the insulated central annular conduit 185 from where it flows 190 back into the radially proximal entrance apertures of the isothermal expansion channels, e.g., 182, to begin the cyclical pattern of thermally-driven flow again.

Within the central annular conduit 185 is a screw-shaped working-fluid elevator 198 the tends to lift working fluid that flows into the lower end of that central annular conduit from the radially proximal exit apertures of the adiabatic compression channels of the lower level of the motive disk 174, thereby facilitating the subsequent flow of that working fluid upward and into the radially proximal entrance apertures of the isothermal expansion channels of the upper level of the motive disk. The working-fluid elevator tends to mechanically elevate, in a "screw-like" fashion, working fluid when the embodiment 170, and the motive disk 174 thereof, rotate in a nominal direction, i.e. the direction of motive disk rotation that results from the nominal pattern of working-fluid flow.

Figure 27:
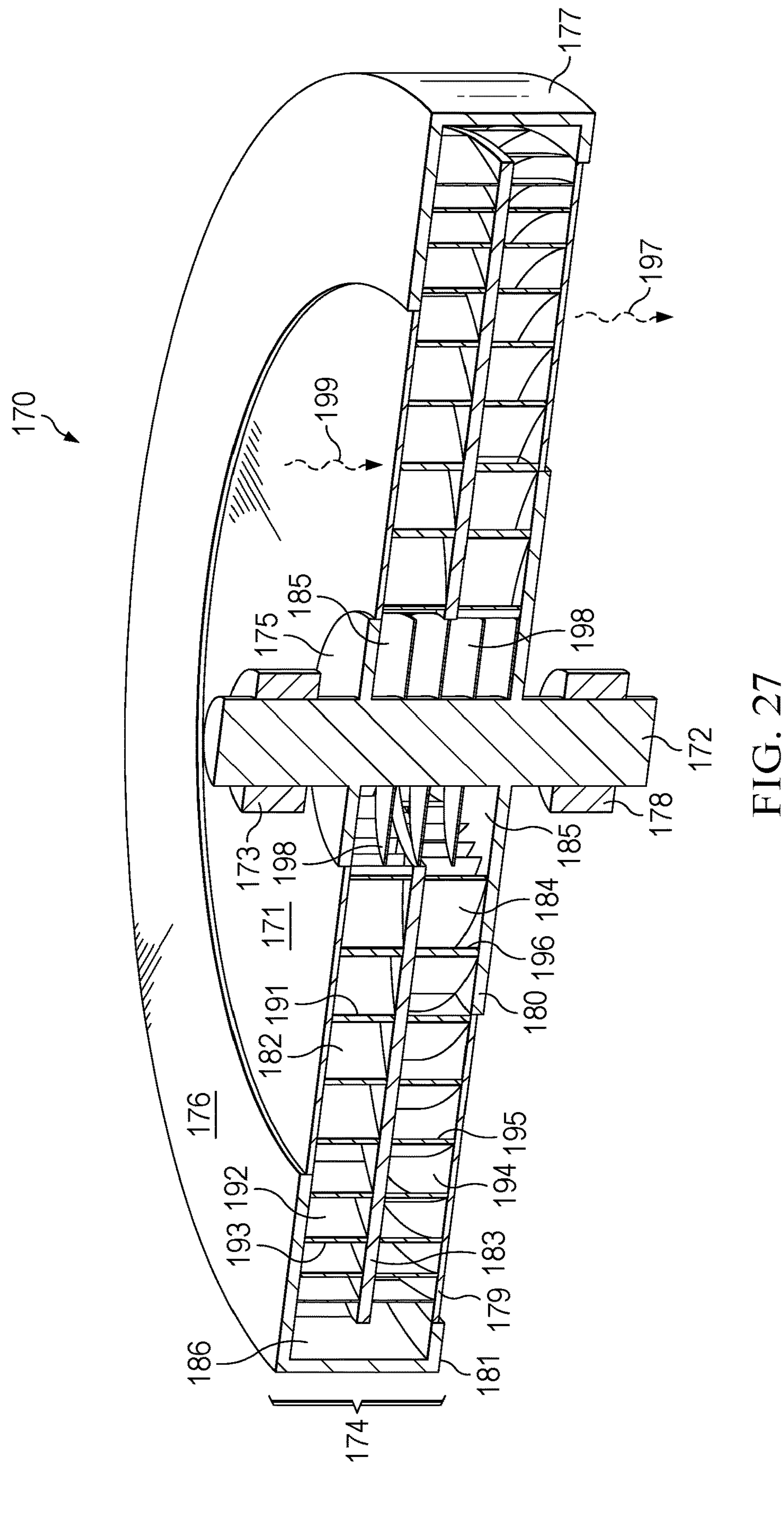
FIG. 27 shows a perspective view of the third embodiment of the present invention.

FIG. 27 shows a perspective view of the same side sectional view illustrated in FIG. 26, which is a side sectional view of the same embodiment 170 of the present disclosure that is illustrated in FIGS. 21-25 wherein the vertical section plane is specified in FIG. 23 and the section is taken across line 26-26.

Figure 28:
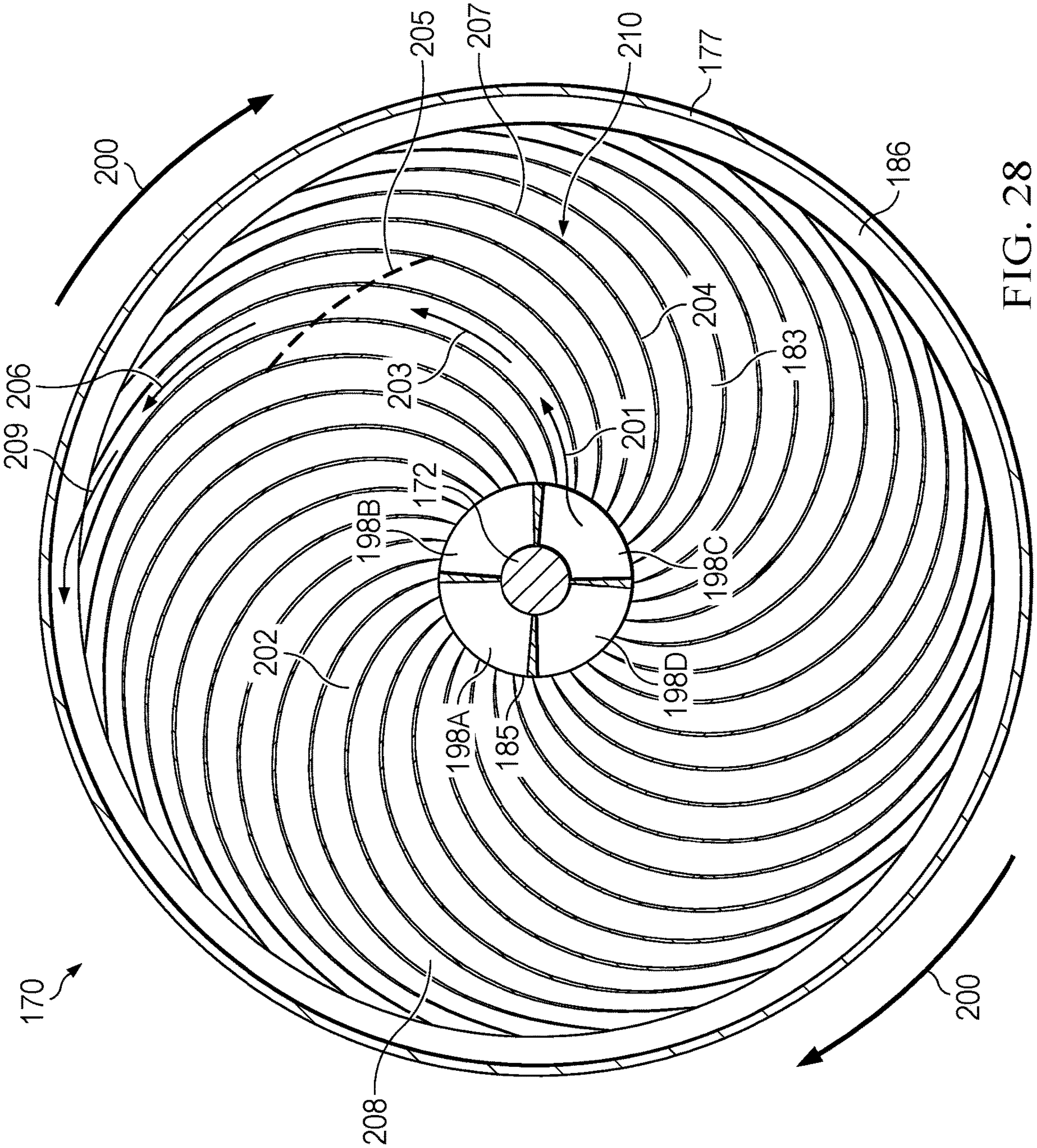
FIG. 28 shows a top-down sectional view of the third embodiment of the present invention.

FIG. 28 shows a top-down sectional view of the same embodiment 170 of the present disclosure that is illustrated in FIGS. 21-27 wherein the horizontal section plane is specified in FIG. 26 and the section is taken across line 28-28.

Within the central annular conduit 185 there are four 198A-198D interleaved helical surfaces, and/or screws. When the embodiment 170, and the motive disk (174 in FIG. 26) thereof, rotate 200 under the influence of, and/or in reaction to, a thermally-driven flow of the working fluid (not shown) within the motive disk, the interleaved helical screws apply an elevating mechanical force to cold and compressed working fluid flowing out of the radially proximal exit apertures of the adiabatic compression channels (not visible) positioned below the medial dividing disk 183, thereby promoting an upward flow, e.g., 201, of that working fluid to and into the radially proximal entrance apertures of the isothermal expansion channels above the medial dividing disk.

After flowing 201 to and through the radially proximal entrance apertures of the isothermal expansion channels, e.g., 202, the working fluid (not shown) flows, e.g., 203, through those isothermal expansion channels wherein it receives thermal energy, and/or heat, from the hot plate above (not visible, 171 in FIG. 27), and from the thermally-connected lateral channel walls, e.g., 204, of the isothermal expansion channels. As the working fluid warms as it flows, e.g., 203, through the isothermal expansion channels, and that warmed working fluid expands (e.g., the volume of each unit mass of working fluid increases) and flows, e.g., 203, away from the radial center of the motive disk (174 in FIG. 26) and/or from the shaft 172.

When the warming working fluid (not shown) flowing, e.g., 203, through the isothermal expansion channels, e.g., 202, reaches and flows past, the radial extent (graphically illustrated by dashed line 205) of the hot plate above (not visible, 171 in FIG. 27), it flows through the radially distal exit apertures of the isothermal expansion channels, flowing into the adjacent and fluidly-connected radially proximal entrance apertures of the adiabatic expansion channels, e.g., 208. In the illustration of FIG. 28, the radially distal exit apertures of three of the isothermal expansion channels are separated from the adjacent radially proximal entrance apertures of three of the adiabatic expansion channels by a dashed line 205 demarking the radially distal circular edge of the hot plate above at which edge the respective exit and entrance apertures are positioned and fluidly connected, and/or interconnected.

The adiabatic expansion channels, e.g., 208, within the embodiment's motive disk (174 in FIG. 27) are encased by the upper peripheral annular insulated surface (176 in FIG. 27) above, the insulating medial dividing disk 183 below, and the insulating lateral channel walls, e.g., 207, of those adiabatic expansion channels. And, while the working fluid (not shown) flows, e.g., 206, through the adiabatic expansion channels, it no longer receives thermal energy and/or heat from the hot plate (not visible, 171 in FIG. 27) or the thermally-conductive lateral channel walls, e.g., 204, of the isothermal expansion channels, or any other source of heat, either internal or external. The working fluid tends to continue expanding as it flows 206 through the adiabatic expansion channels and/or as it flows away from the shaft at the center of the motive disk (174 in FIG. 26).

When the working fluid flowing through the adiabatic expansion channels reaches the exit apertures of the adiabatic expansion channels, i.e. at the distal radial periphery of those channels, it flows, e.g., 209, into the insulated peripheral annular conduit 186 and therethrough down to the entrance apertures of the isothermal contraction channels on the lower level of the motive disk (174 in FIG. 27), i.e., positioned below the medial dividing disk 183.

Each of the thermally-conductive lateral channel walls, e.g., 204, of the isothermal expansion channels, e.g., 202, is made structurally continuous with a complementary, aligned, and/or positionally respective, thermally-insulated lateral wall, e.g., 207, of the adiabatic expansion channels, e.g., 208, by a junction, e.g., 210, seam, abutment, and/or joint.

As the working fluid (not shown) flows away from the center of the motive disk (174 in FIG. 26), and/or away from the shaft 172, flowing through the plurality of isothermal expansion channels, and the plurality of fluidly connected adiabatic expansion channels, it follows a plurality of approximately spiral and/or curved pathways, e.g., 201, 203, 206, and 209, that deflect the expanding and flowing working fluid from an initial radial trajectory, e.g., 201, near the center of the motive disk, to an approximately tangential trajectory, e.g., 209, at the periphery of the motive disk. The deflection of the outwardly flowing working fluid applies a torque to the motive disk, thereby tending to cause it to rotate 200 in a direction substantially opposite that of the tangential direction, e.g., 209, of the working-fluid flow at the periphery of the motive disk.

Figure 29:
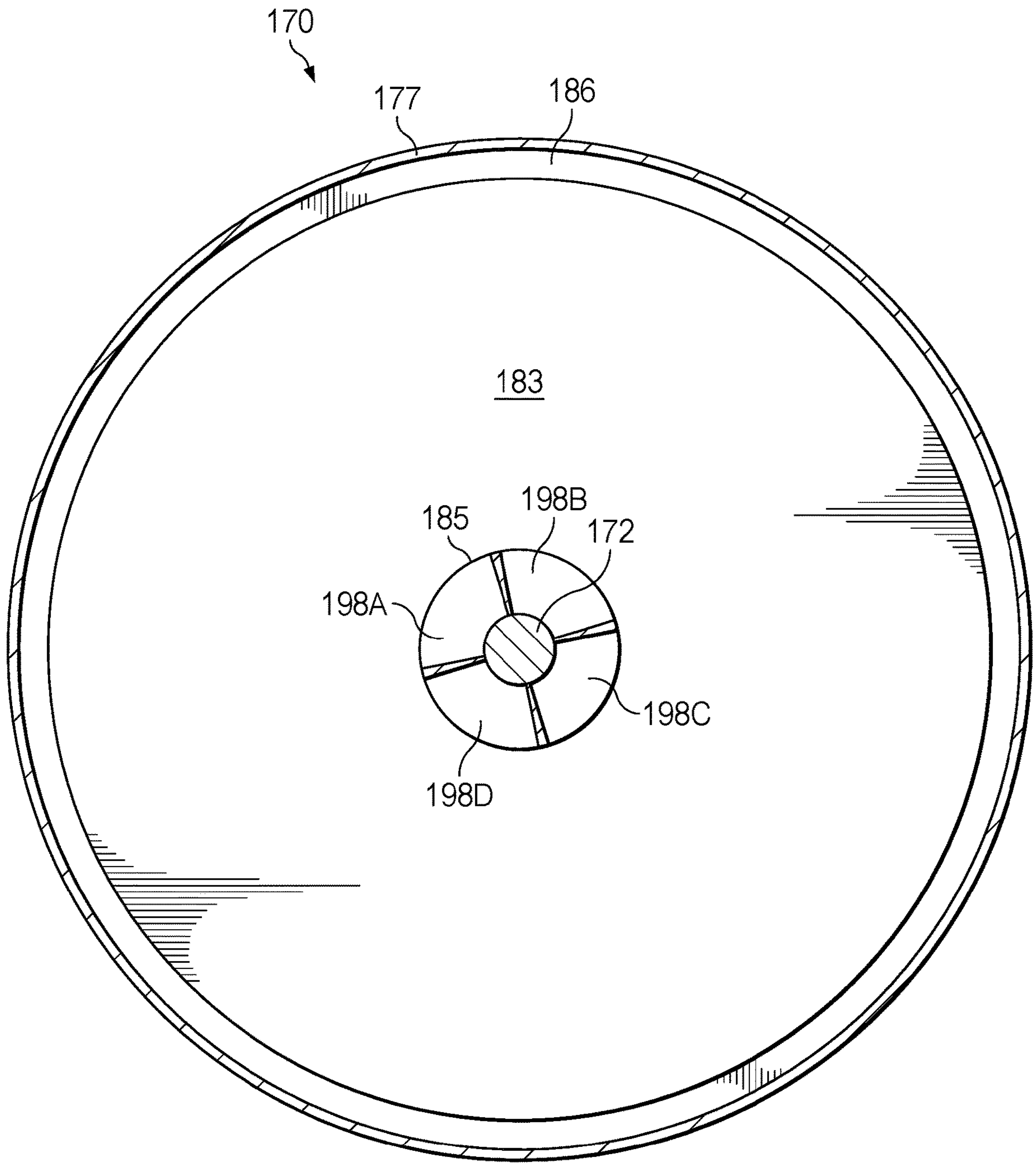
FIG. 29 shows a top-down sectional view of the third embodiment of the present invention.

FIG. 29 shows a top-down sectional view of the same embodiment 170 of the present disclosure that is illustrated in FIGS. 21-28 wherein the horizontal section plane is specified in FIG. 26 and the section is taken across line 29-29. Visible in FIG. 29 is the thermally insulating medial dividing disk 183 which separates the upper and lower channels within the motive disk (174 in FIG. 27).

Figure 30:
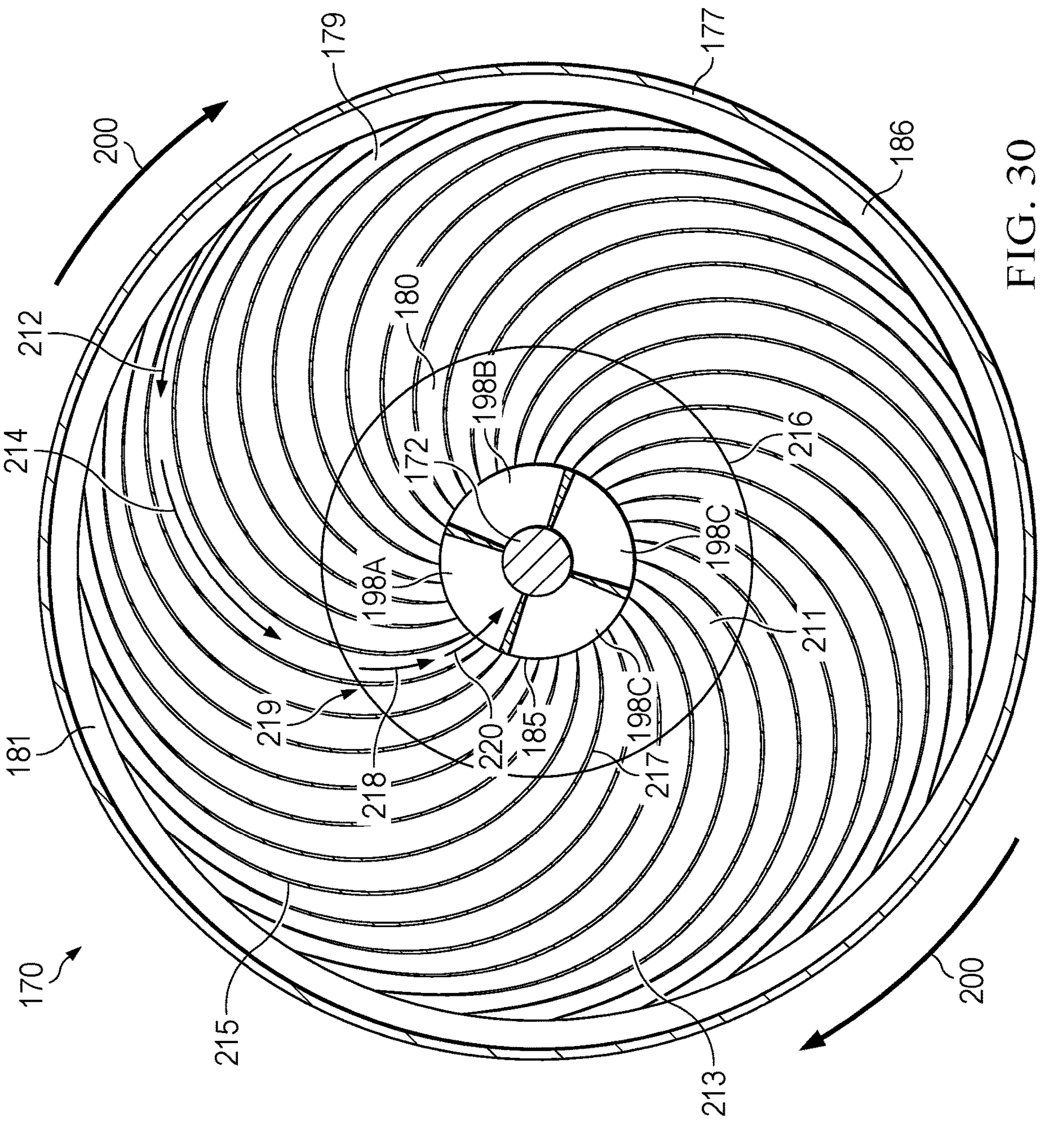
FIG. 30 shows a top-down sectional view of the third embodiment of the present invention.

FIG. 30 shows a top-down sectional view of the same embodiment 170 of the present disclosure that is illustrated in FIGS. 21-29 wherein the horizontal section plane is specified in FIG. 26 and the section is taken across line 30-30. FIG. 30 illustrates the working-fluid-flow channels of the lower level of the embodiment's motive disk (174 in FIG. 27).

After flowing out of the distal exit apertures of the adiabatic expansion channels (e.g., 208 in FIG. 28) in the upper level of the embodiment's motive disk (174 in FIG. 27), i.e., positioned above the medial dividing disk 183, the relatively expanded and relatively depressurized working fluid (not shown) flows (e.g., 209 in FIG. 28) into the thermally insulated peripheral annular conduit 186, and thereafter flows down and through the peripheral annular conduit 186 and therefrom flows, e.g., 212, to, and into, the radially distal entrances to the isothermal contraction channels, e.g., 213, in the lower level of the motive disk, i.e., positioned below the medial dividing disk.

As the working fluid (not shown) flows, e.g., 214, through the plurality of approximately parallel, spiraling isothermal contraction channels, e.g., 213, the working fluid yields, conducts, transfers, radiates, and/or imparts, a portion of its thermal energy, and/or heat, to, and/or into, the thermally-conductive cold plate 179 below the working fluid, and/or to, and/or into, the thermally-conductive lateral channel walls, e.g., 215, of the isothermal contraction channels. The cold plate and the lateral channel walls of the isothermal contraction channels are thermally connected to a thermal sink (not shown), and/or to a source of cold, outside of the embodiment with the thermal sink either being external to the embodiment, and/or attached to the embodiment's cold plate.

As the working fluid (not shown) loses heat and becomes colder while flowing through isothermal contraction channels, e.g., 213, the volume of the working fluid (i.e., its volume per unit mass of working fluid) decreases, and/or its density (mass of working fluid per unit volume) increases, and it progressively, incrementally, and/or steadily, compresses, and/or is compressed. As the working fluid is chilled within the isothermal contraction channels, e.g., 213, its loss of volume tends to create a partial vacuum that tends to draw additional working fluid from the peripheral annular conduit 186, as well as from the radially distal entrance apertures of the isothermal contraction channels. In approximate, and/or general, terms, the compression and/or contraction of working fluid within the isothermal contraction channels in the lower level of the motive disk (174 in FIG. 26) pulls the embodiment and the motive disk (174 in FIG. 26) in the same rotational direction 200 as did, and/or does, the forceful expansion of the working fluid within the isothermal expansion channels (e.g., 202 in FIG. 28) in the upper level of the motive disk, in concert with the forceful expansion of the working fluid within the adiabatic expansion channels (e.g., 208 in FIG. 28) in the upper level of the motive disk.

The inner circular boundary 216 of the cold plate demarks, defines, and/or establishes, the location, position, and/or bound, at which the radially proximal exit aperture of each isothermal contraction channel, e.g., 213, fluidly connects with, abuts, and/or transitions to, an immediately adjacent radially distal entrance aperture of a respective adiabatic compression channel, e.g., 211. At, and/or above, the inner circular boundary 216 of the cold plate, the thermally-conductive lateral wall of each isothermal contraction channel transitions into a respective, complementary, and/or aligned, thermally-non-conductive and/or insulated lateral wall of an adiabatic compression channel, at a respective seam, e.g., 219, joint, abutment, and/or union.

When the working fluid (not shown) flows past the circular boundary 216 of the cold plate, and thereby enters the radially distal entrance apertures of the adiabatic compression channels, e.g., 211, it is surrounded on all sides by insulated lateral channel walls, barriers, and/or surfaces. Above the working fluid is the insulated and/or insulating medial dividing disk (183 in FIG. 27). Below the working fluid is the insulated and/or insulating lower central annular insulated surface 180. And the lateral channel walls, e.g., 217, of the adiabatic compression channels are also insulated and/or insulating, and/or are not thermally-conductive. Thus, as cooled working fluid flows, e.g., 218, into and through the adiabatic compression channels, it is shielded from any further loss of thermal energy, and/or heat, and therefore does not experience further compression as a result of a continuing reduction in its temperature.

However, as the working fluid (not shown) flows, e.g., 218, through the plurality of spiraling adiabatic compression channels, e.g., 211, the thermally-driven flow of the working fluid in the other parts, portions, and/or channels, of the embodiment, and the motive disk (174 in FIG. 27) thereof, is propelling the embodiment, and the motive disk thereof, to rotate in a direction 200. As the embodiment rotates in direction 200, the adiabatic compression channels do work on the working fluid therein, mechanically driving it closer and closer to the radial center of the motive disk, and thereby compressing it further by doing mechanical work on it as a consequence of, and/or by means of, the rotation 200 of those channels. The compressive work performed and/or imposed upon the working fluid by the rotating adiabatic compression channels tends to increase the pressure of that working fluid as, and/or because, it mechanically reduces the volume per unit mass of working fluid of that working fluid.

After the working fluid (not shown) flows through the adiabatic compression channels, e.g., 211, and reaches the radially proximal exit apertures of those adiabatic compression channels, it then flows, e.g., 220, into and upward within the central annular conduit (185 in FIG. 29). Within the central annular conduit, the four interleaved helical screws 198A-198D, which are rotated 200 with the embodiment 170, will tend to mechanically lift, and/or elevate, the relatively cold, compact, and dense, working fluid until it reaches and flows into the radially proximal entrance apertures of the plurality of spiraling isothermal expansion channels (e.g., 202 in FIG. 28) in the upper level of the motive disk. After flowing (back) into isothermal expansion channels, the relatively cold and dense working fluid will begin another cycle of heating and cooling, thereby consuming, and/or absorbing, heat from the external heat source, and imparting, and/or discharging, it to the external cold source, and converting that thermal flux into potentially useful mechanical rotary motion 200.

Within the central annular conduit 185 there are four 198A-198D interleaved helical surfaces, and/or screws. When the embodiment 170, and the motive disk (174 in FIG. 26) thereof, rotate 200 under the influence of, and/or in reaction to, the thermally-driven flow of the working fluid (not shown) within the motive disk, the interleaved helical screws apply an upwardly-screwing, and/or elevating force to cold and compressed working fluid flowing out of the radially proximal exit apertures of the adiabatic compression channels, e.g., 211, thereby promoting the upward flow, e.g., 201, of that working fluid to the upper level of the motive disk, and therefrom a lateral flow into the radially proximal entrance apertures of the isothermal expansion channels (e.g., 202 in FIG. 28).

The designations "radially proximal" and "radially distal" denote the relative radial distances from the shaft 172, and/or from the rotational axis and/or center of the motive disk (174 in FIG. 27). Radially proximal features are relatively close to the center of the motive disk, whereas radially distal features are relatively far, and/or more distant, from the center of the motive disk.

Figure 31:
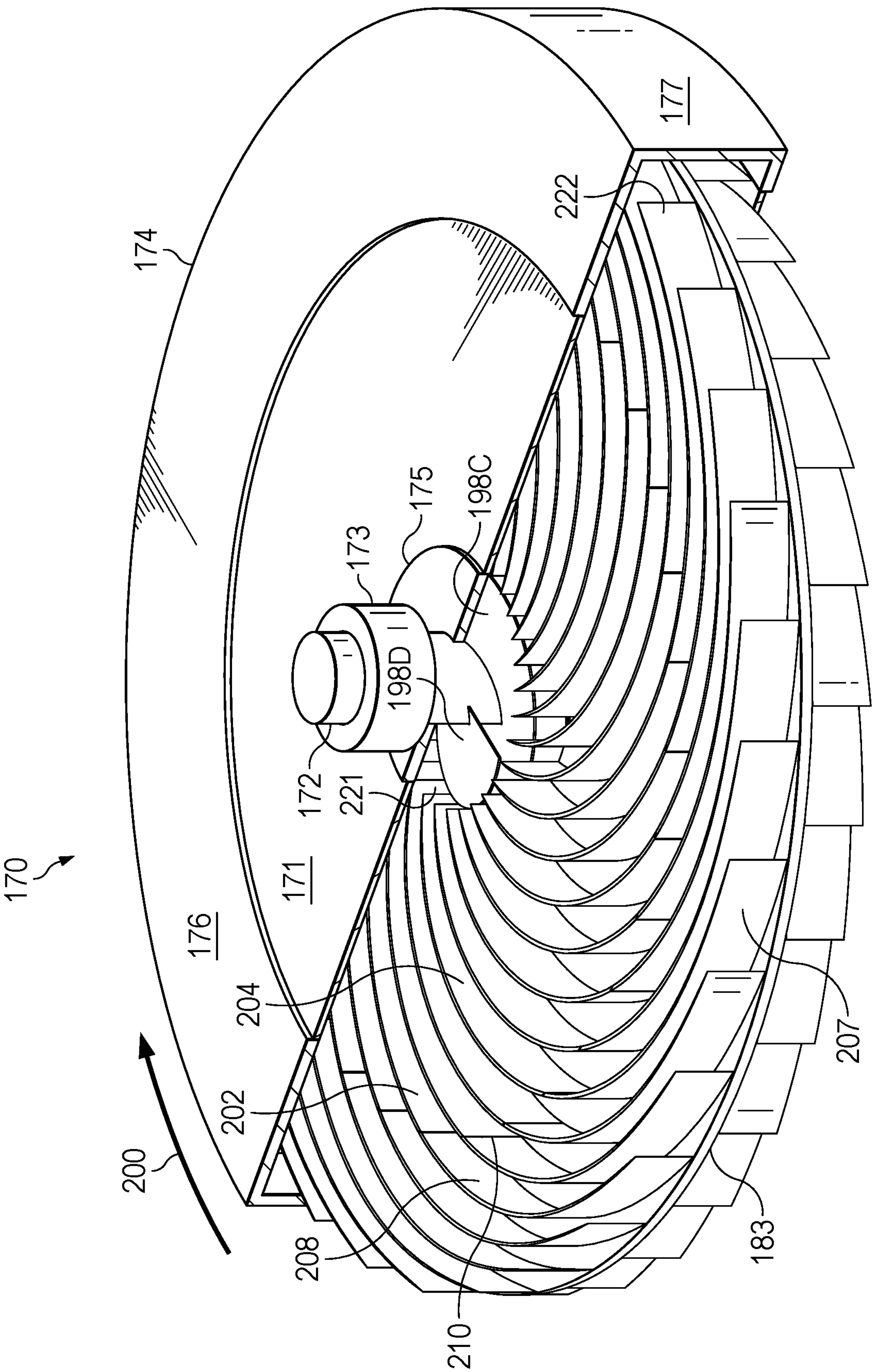
FIG. 31 shows a perspective top-down sectional view of the third embodiment of the present invention.

FIG. 31 shows a perspective top-down sectional view of the same embodiment 170 of the present disclosure that is illustrated in FIGS. 21-30 wherein a portion, segment, and/or part, of the outer casing, e.g., 171, 175, 176, and 177, of the motive disk 174 has been removed to reveal an interior of the motive disk through and/or around which a working fluid (not shown) flows. The vertical section plane is specified in FIG. 23 and the section is taken across line 26-26.

Visible within the illustration of FIG. 31 are the radially proximal entrance apertures, e.g., 221, of the isothermal expansion channels, e.g., 202. Also visible are the radially distal exit apertures, e.g., 222, of the adiabatic expansion channels, e.g., 208.

The radially distal exit apertures (e.g., defined as an inner or radially-proximal side of a virtual cylindrical surface passing through the lateral wall junctions, e.g., 210, where the thermally-conductive lateral channel walls of the isothermal expansion channels transition to the thermally non-conductive lateral channel walls of respective and adjacent adiabatic expansion channels) of the isothermal expansion channels, e.g., 202, and the radially proximal, and adjacent, entrance apertures (e.g., defined as an outer side or radially-distal side of that virtual cylindrical surface) of the adiabatic expansion channels, e.g., 208, are virtual apertures defining, demarking, and/or denoting, where the isothermal expansion channels and the adiabatic expansion channels meet and fluidly connect and/or interconnect.

The complementary radially-distal exit apertures of the isothermal expansion channels, and the radially-proximal entrance apertures of the adiabatic expansion channels, are two and/or opposite sides of the same virtual cylindrical surface which passes through, and/or is aligned with, the lateral wall junctions, e.g., 210, where the thermally-conductive lateral channel walls of the isothermal expansion channels transition to the thermally non-conductive lateral channel walls of the adiabatic expansion channels. The radially-distal exit apertures of the isothermal expansion channels, and the radially-proximal entrance apertures of the adiabatic expansion channels, define and/or denote where these different types of channels meet, abut, and/or are joined to one another so as to create fluidly and physically connected working-fluid flow channels.

The radially-distal exit apertures of the isothermal expansion channels are on an inner and/or proximal side (with respect to the shaft 172 and/or center of the motive disk 174) of the virtual cylindrical surface, while the radially-proximal entrance apertures of the adiabatic expansion channels are on an outer and/or distal side of that same virtual cylindrical surface.

The shaft 172, and the entire motive disk 174 (i.e. its external casing, e.g., 171 and 176, as well as its internal channels, e.g., 202 and 208, medial dividing disk 183, and its interleaved helical screws 198A-198D), are rigidly assembled, attached, and/or connected, to one another, and/or constitute a single rigid structure. In response to a warming of the embodiment's hot plate 171, and a chilling of its cold plate (179 in FIG. 26), the embodiment 170 tends to rotate 200. Upper 173 and lower (178 in FIG. 26) bearings permit the embodiment to rotate with respect to, and/or relative to, a relatively non-rotating, and/or differently-rotating, external mechanism, structure, device and/or platform, and/or permit the embodiment to be rotatably connected to such a non-rotating, and/or differently-rotating, external structure.

Figure 32:
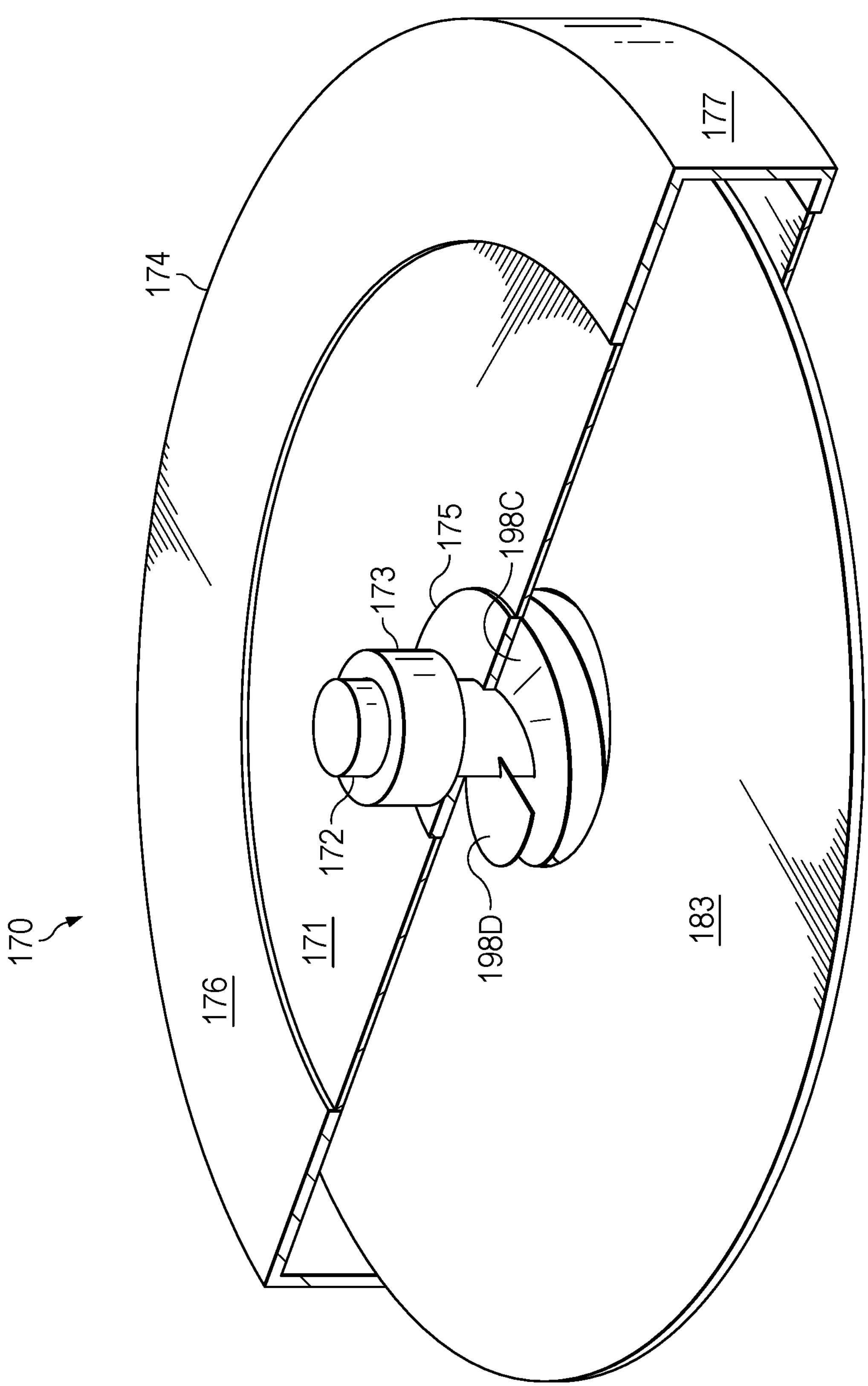
FIG. 32 shows a perspective top-down sectional view of the third embodiment of the present invention.

FIG. 32 shows a perspective top-down sectional view of the same embodiment 170 of the present disclosure that is illustrated in FIGS. 21-31 wherein a portion of the outer casing, e.g., 171, 175, 176, and 177, of the motive disk 174, as well as all of the lateral channel walls of the working fluid channels, e.g., 202 and 208 in FIG. 31, have been removed to reveal the remaining portions of the interior of the motive disk through and/or around which the working fluid (not shown) flows. The vertical section plane is specified in FIG. 23 and the section is taken across line 26-26. Visible in FIG. 32 is the insulated medial dividing disk 183 which physically, as well as thermally, separates the working-fluid flow channels of the upper and lower levels of the motive disk. Also visible in FIG. 32 are the interleaved helical screws, e.g., 198C and 198D.

Figure 33:
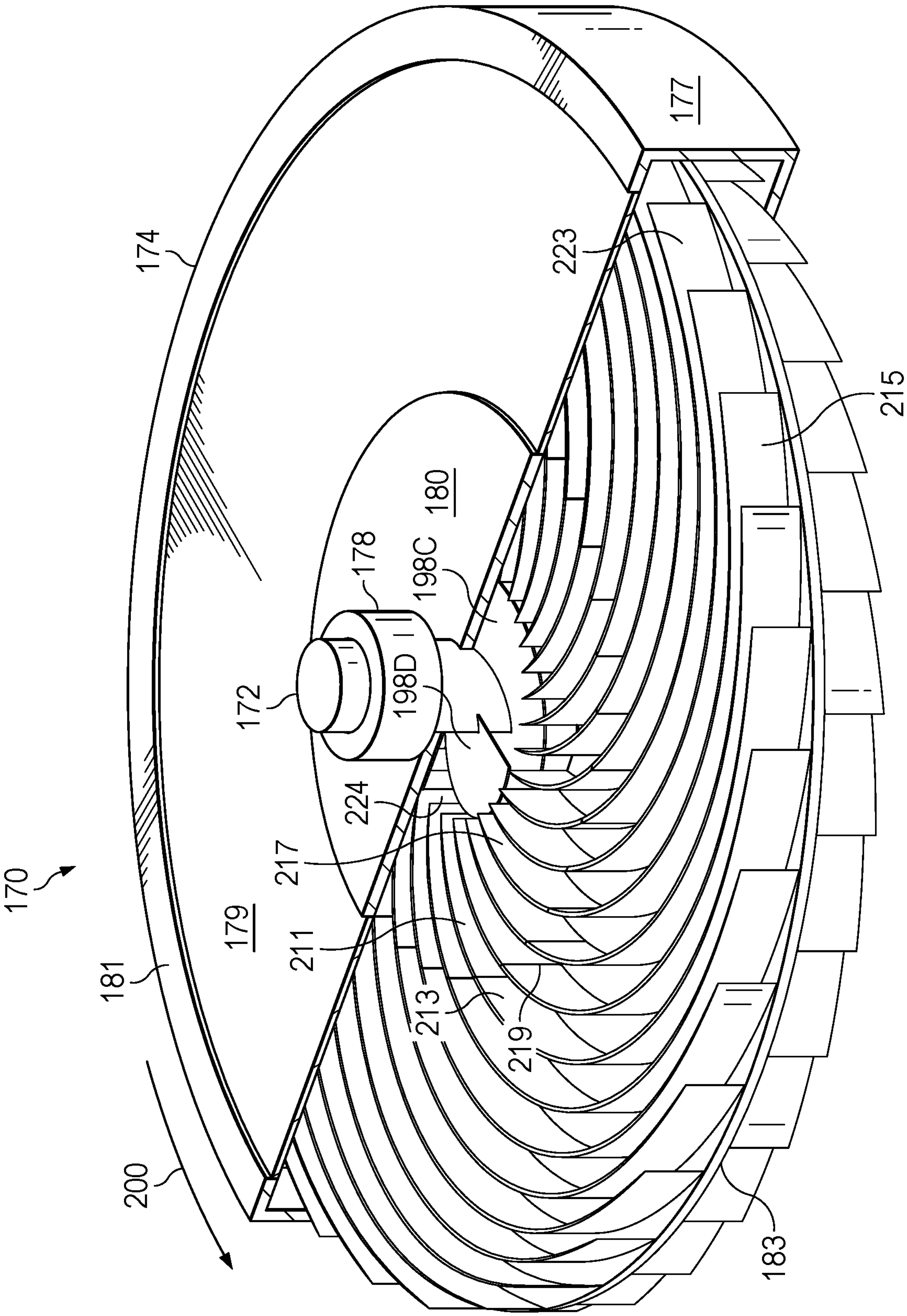
FIG. 33 shows a perspective bottom-up sectional view of the third embodiment of the present invention.

FIG. 33 shows a perspective bottom-up sectional view of the same embodiment 170 of the present disclosure that is illustrated in FIGS. 21-32 wherein a portion, segment, and/or part, of the outer casing, e.g., 179, 180, and 181, of the motive disk 174 has been removed to reveal an interior of the motive disk through and/or around which a working fluid (not shown) flows. The vertical section plane is specified in FIG. 23 and the section is taken across line 26-26.

Visible within the illustration of FIG. 33 are the radially-distal entrance apertures, e.g., 223, of the isothermal contraction channels, e.g., 213. Also visible are the radially-proximal exit apertures, e.g., 224, of the adiabatic compression channels, e.g., 211.

The radially-proximal exit apertures (e.g., defined as an outer or radially-distal side of a virtual cylindrical surface passing through the channel-lateral-wall junctions, e.g., 219, where the thermally-conductive lateral walls of the isothermal contraction channels, e.g., 213, transition to the thermally non-conductive lateral walls of the adiabatic compression channels, e.g., 211) of the isothermal contraction channels, and the radially-distal entrance apertures (e.g., defined as an inner side or radially-distal side of that virtual cylindrical surface) of the adiabatic expansion channels, e.g., 211, are virtual apertures defining, demarking, and/or denoting, where respective isothermal contraction channels and adiabatic compression channels meet, abut, and fluidly connect.

The complementary radially-proximal exit apertures of the isothermal contraction channels and the radially-distal entrance apertures of the adiabatic compression channels, are two and/or opposite sides of the same virtual cylindrical surface which passes through the channel lateral-wall junctions, e.g., 219, where the thermally-conductive lateral walls of the isothermal contraction channels transition to the thermally non-conductive lateral walls of the adiabatic compression channels. The radially-proximal exit apertures of the isothermal contraction channels and the radially-distal entrance apertures of the adiabatic compression channels, define and/or denote where these different types of channels meet, abut, fluidly connect, and/or are physically and fluidly connected, and/or joined to one another.

The shaft 172, and the entire motive disk 174 (i.e. its external casing, e.g., 179 and 180, as well as its internal channels, e.g., 211 and 213, medial dividing disk 183, and its interleaved helical screws 198A-198D), are rigidly assembled, attached, and/or connected, to one another, and constitute a single fixed structure. In response to a warming of the embodiment's hot plate (171 in FIG. 26), and a chilling of its cold plate 179, the embodiment 170 tends to rotate 200. Upper (173 in FIG. 26) and lower 178 bearings permit the embodiment to rotate with respect to, and/or relative to, a relatively non-rotating, and/or differently-rotating, external mechanism, structure, device and/or platform, and/or to be therethrough rotatably connected to such a non-rotating, and/or differently-rotating external structure.

The varieties of embodiments, their geometries, their working fluids, their operations, and their applications, enumerated within the "Summary of the Invention" section of this disclosure apply to the embodiment illustrated and discussed in relation to FIGS. 21-33, and the scope of the present disclosure includes all such variations of the embodiment illustrated in FIGS. 21-33.

Disclosed in this specification, and in FIGS. 21-33, is a closed-cycle, externally-heated heat engine, comprising: a branched fluid-flow channel, having upper and lower spiraling working-fluid-flow channel sectors, and containing a working fluid; a shaft of rotation at a radial center of, and normal to, the upper and lower spiraling working-fluid-flow sector; wherein the upper spiraling working-fluid-flow sector is configured to direct a flow of expanding working fluid away from a radially central working-fluid-flow junction and toward, and into, a radially peripheral working-fluid-flow junction; wherein the lower spiraling working-fluid-flow sector is configured to direct a flow of contracting working fluid away from the radially peripheral working-fluid-flow junction and toward, and into, the radially central working-fluid-flow junction; wherein a heat-induced expansion of the working fluid within the upper spiraling working-fluid-flow sector causes that working fluid to flow through the upper spiraling working-fluid-flow sector thereby rotating the shaft of rotation in a first direction; wherein a cold-induced contraction of the working fluid within the lower spiraling working-fluid-flow sector causes that working fluid to flow through the lower spiraling working-fluid-flow sector thereby rotating the shaft of rotation in the first direction.

Disclosed in this specification, and in FIGS. 21-33, is a closed-cycle, externally-heated and externally-cooled heat engine, comprising: a spiraling fluid-flow channel, containing a working fluid, and having upper and lower spiraling fluid-flow channel sectors; the upper spiraling fluid-flow channel sector adapted to conductively transmit heat from an external thermal source to the working fluid within the upper spiraling fluid-flow channel; the lower spiraling fluid-flow channel sector adapted to conductively transmit heat from the working fluid within the lower spiraling fluid-flow channel to an external thermal sink; and, a shaft at the radial center of the upper and lower spiraling fluid-flow channel sectors configured to rotate in response to a flow of the working fluid through the spiraling fluid-flow channel.

Disclosed in this specification, and in FIGS. 21-33, is a method for converting a thermal difference into a rotational motion of a shaft, comprising: forming a thermally non-conductive shaft; fixedly attaching a sealed cylindrical chamber casing to the shaft; fixedly attaching an annular disk to the shaft at a centered position within the cylindrical chamber, said annular disk having an inner annular gap between the disk and the shaft, as well as an outer annular gap between the disk and a radially outermost side of the cylindrical chamber; forming upper spiral channels between the annular disk and the upper side of the cylindrical chamber by fixedly attaching spiral-channel walls therebetween; forming lower spiral channels between the annular disk and the lower side of the cylindrical chamber by fixedly attaching spiral-channel walls therebetween; adapting a heat-receiving portion of the upper side of the cylindrical chamber to have a thermally-conductive chamber wall and to receive heat of a high temperature; adapting a cold-receiving portion of the lower side of the cylindrical chamber to have a thermally-conductive chamber wall and to receive cold of a low temperature; sealing a working fluid within the sealed cylindrical chamber; applying a heat of the high temperature to the heat-receiving portion; and, applying a cold of the low temperature to the cold-receiving portion.

Figure 34:
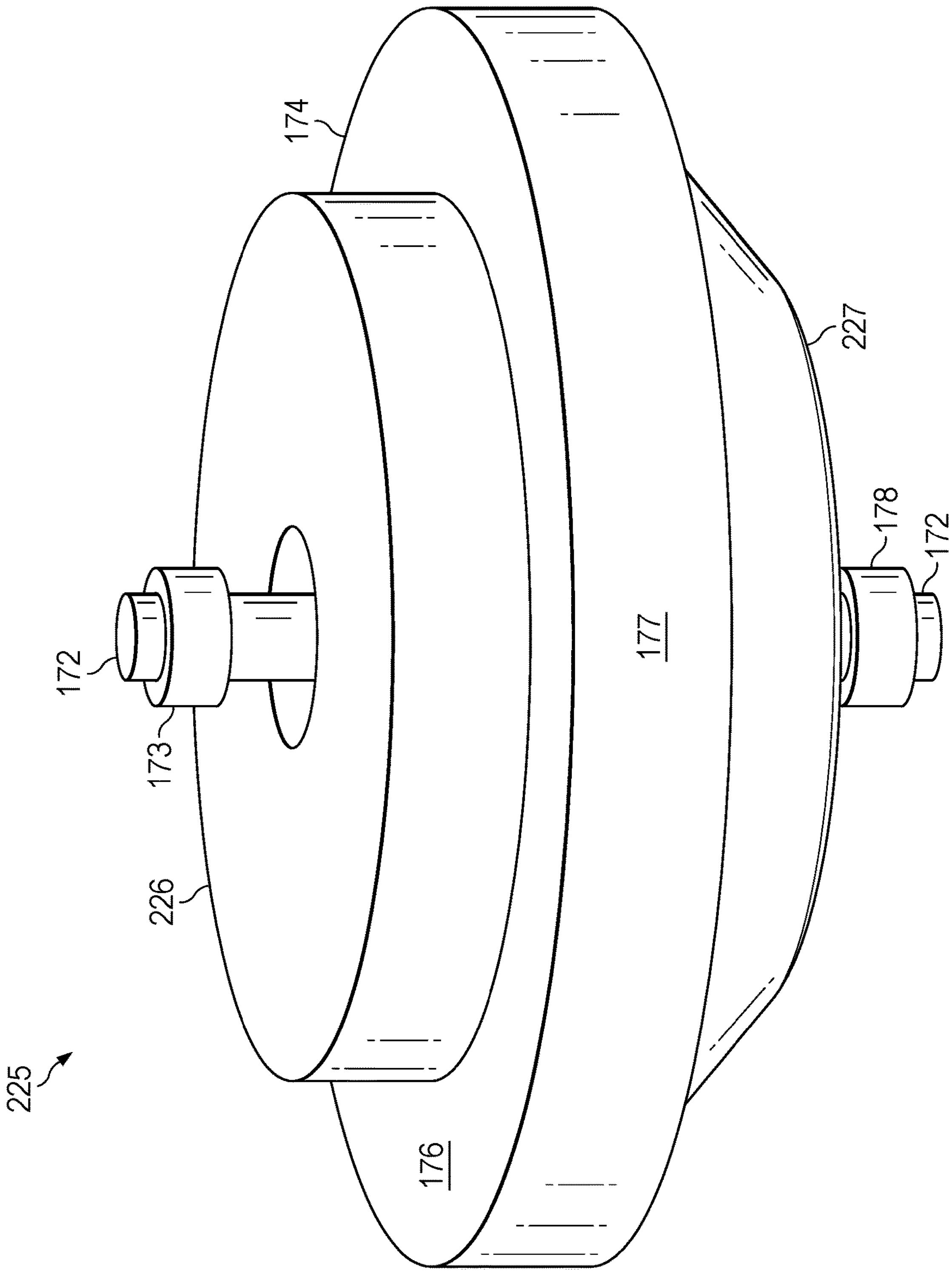
FIG. 34 shows a side perspective view of a fourth embodiment of the present invention.

FIG. 34 shows a side perspective view of an embodiment 225 of the present disclosure. The embodiment 225 illustrates an application, and/or modification, of embodiment 170, as illustrated in FIGS. 21-33. Embodiment 225 comprises an embodiment 170, i.e., it includes all of the structural and operational, attributes and features of embodiment 170, as well as an attached heat source 226 (e.g., a mass of fissionable, and/or radioactive, material), and a heat dissipating shroud 227 adapted and configured to increase the surface area through, and/or across, which the embodiment 225 can conductively transmit heat to a thermal sink, and/or to a source of cold (not visible, e.g., a pool of water).

Embodiment 225 is adapted to operate adjacent to an upper surface of a body of water (not visible) into which it transmits, and/or imparts, a portion of the heat and/or thermal energy that it receives from a heat source embedded within a heat-source encapsulating chamber 226. The body of water serves as a sink of thermal energy.

Figure 35:
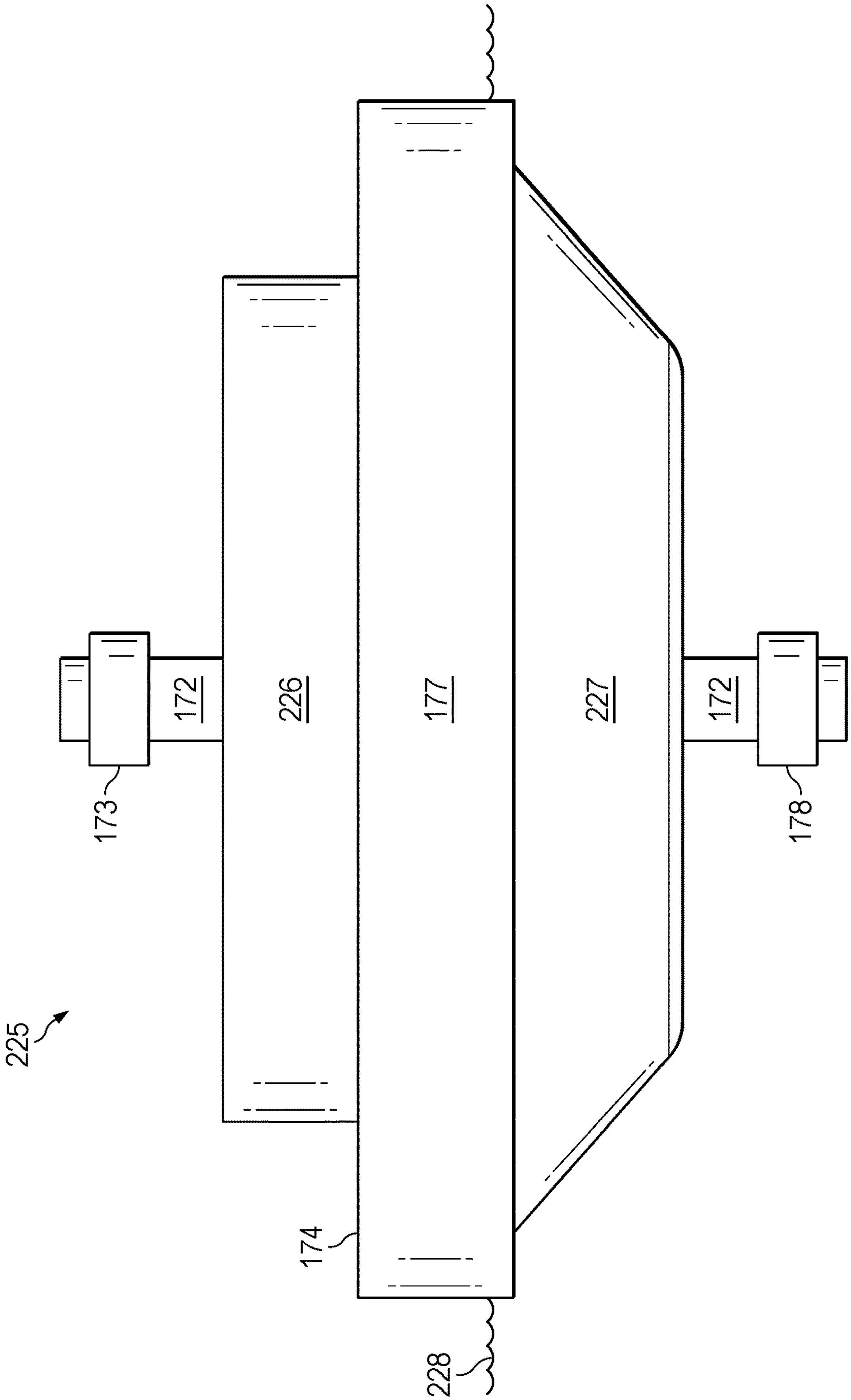
FIG. 35 shows a side view of the fourth embodiment of the present invention.

FIG. 35 shows a side view of the same embodiment 225 of the present disclosure that is illustrated in FIG. 34. The embodiment illustrated in FIG. 35 is configured to operate adjacent to an upper surface 228 of a body of water into which thermal energy is transmitted by the embodiment's cold plate (not visible, 179 in FIG. 25), and the embodiment's thermally connected isothermal contraction channels (not visible, e.g., 194 in FIG. 26).

Figure 36:
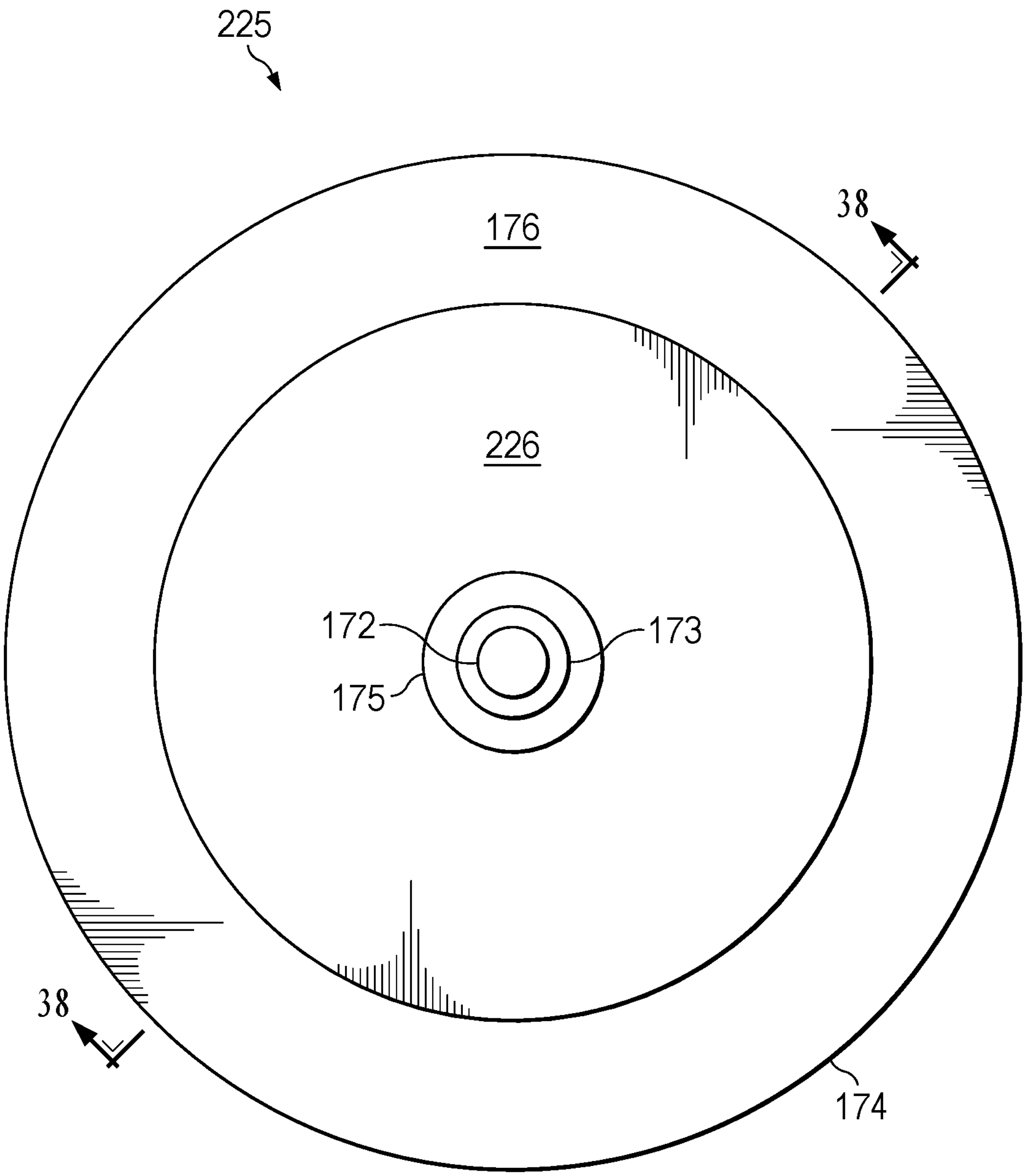
FIG. 36 shows a top-down view of the fourth embodiment of the present invention.

FIG. 36 shows a top-down view of the same embodiment 225 of the present disclosure that is illustrated in FIGS. 34 and 35.

Figure 37:
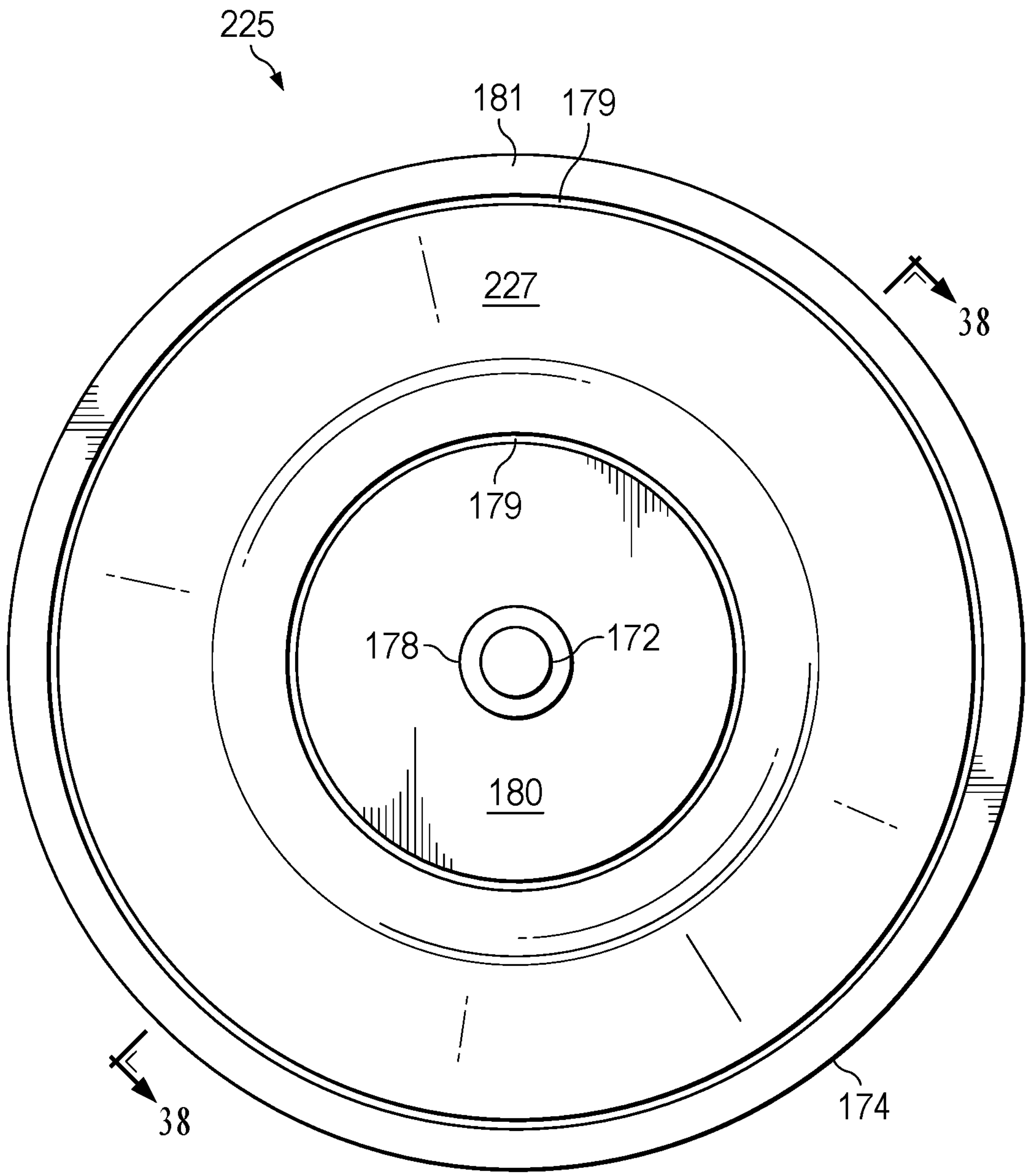
FIG. 37 shows a bottom-up view of the fourth embodiment of the present invention.

FIG. 37 shows a bottom-up view of the same embodiment 225 of the present disclosure that is illustrated in FIGS. 34-36. The heat dissipating shroud 227 is attached to, and thermally connected with, the embodiment's cold plate 179.

Figure 38:
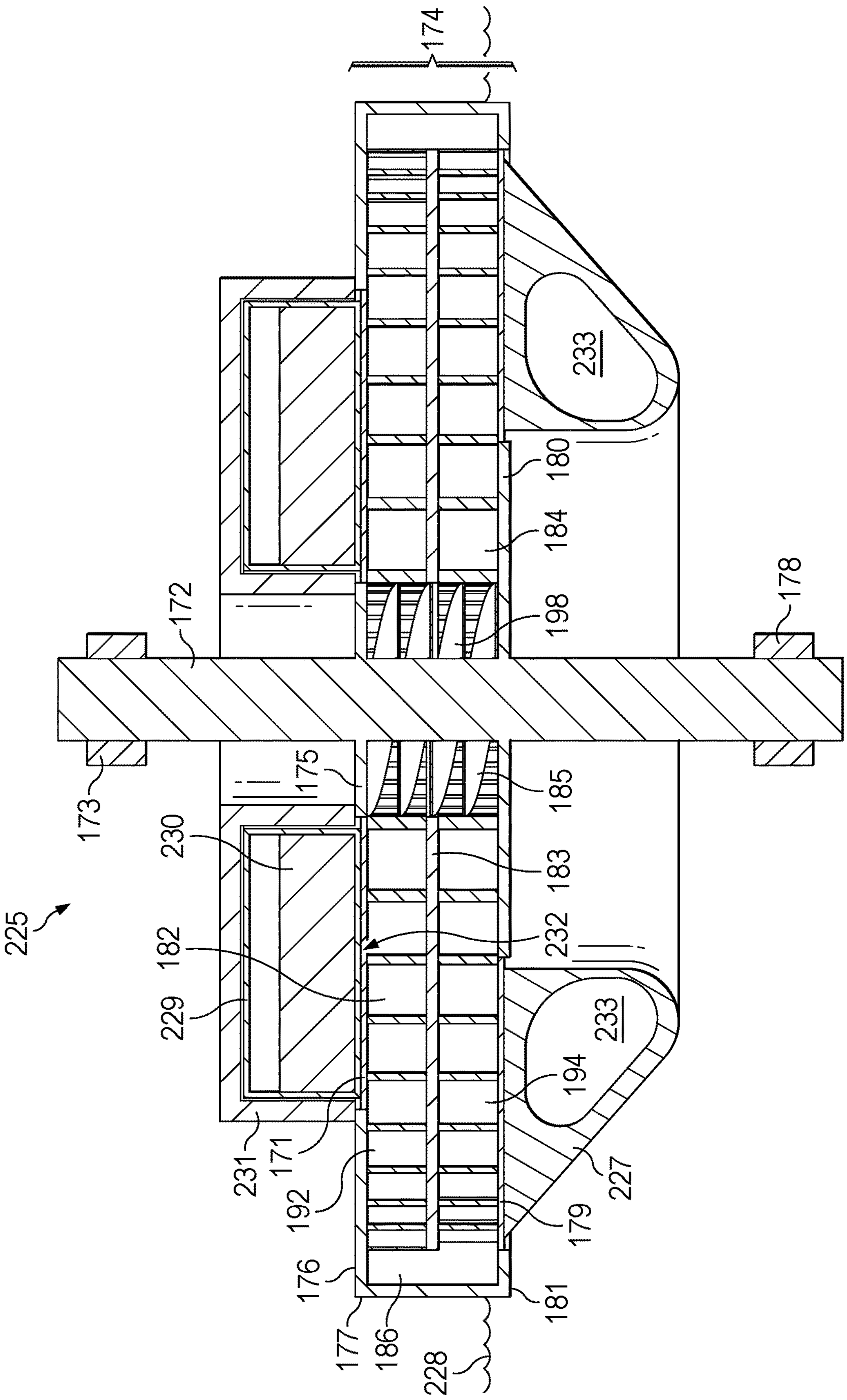
FIG. 38 shows a side sectional view of the fourth embodiment of the present invention.

FIG. 38 shows a side sectional view of the same embodiment 225 of the present disclosure that is illustrated in FIGS. 34-37 wherein the vertical section plane is specified in FIGS. 36 and 37 and the section is taken across line 38-38.

Thermally connected to the embodiment's hot plate 171, is a thermally-conductive annular chamber 229, container, and/or tube containing a heat-producing, heat-generating, and/or exothermic, substance 230, and/or material, e.g., a mass of a radioactive material. The annular chamber, and the heat-producing material therein, are surrounded on the sides and top by a layer 231 of insulating, and/or thermally non-conducting, material.

The thermal energy and/or heat produced by the heat-producing material 230, is transmitted and/or conducted to the thermally-conductive walls of the annular chamber 229. Due to the layer 231 of insulation covering the inner, outer, and upper surfaces of the annular chamber, the heat imparted to the annular chamber by the heat-producing material tends to be primarily, if not entirely, transmitted, imparted, and/or conducted, to the underlying hot plate 171 of the embodiment 225, thereby crossing, traversing, and/or passing between, the two sides of the seam 232, junction, and/or interface, separating the thermally-conductive lower surface of the annular chamber and the thermally-conductive upper surface of the hot plate.

Heat produced by the heat-producing material 230, and imparted to the hot plate 171 via the lower wall of the annular chamber 229, tends to increase the temperature of a working fluid (not shown) flowing within the embodiment's isothermal expansion channels, e.g., 182. Portions of that warmed working fluid tend to expand and flow from those isothermal expansion channels into and through the embodiment's adiabatic expansion channels, e.g., 192. From there the working fluid flows into, around, and through the peripheral annular conduit 186, and therefrom into and through the embodiment's isothermal contraction channels, e.g., 194.

A portion of the thermal energy and/or heat of the working fluid flowing into and through the embodiment's isothermal contraction channels, e.g., 194, tends to flow into, and/or to be conducted and/or transmitted to, and/or into, the embodiment's cold plate 179 where through it tends to flow into, and/or to be conducted and/or transmitted to, and/or into, the embodiment's heat dissipating shroud 227. Because the surface area of the heat dissipating shroud is greater than that of the cold plate, the heat dissipating shroud facilitates, accelerates, and/or improves the transmission, conduction, and/or transfer of thermal energy from the embodiment's isothermal contraction channels to the body of water 228 within which, and/or upon which, the embodiment is positioned and tends to rotate.

In order to reduce the mass and/or rotational inertia of the embodiment, the embodiment's heat dissipating shroud 227 is hollow and the annular conduit 233 therein contains a heat-conducting fluid and/or gas which facilitates the transmission of thermal energy from the embodiment's hot plate 179 to the outer surfaces of the heat dissipating shroud, and therethrough to the body of water in which the heat dissipating shroud is immersed. Another embodiment, similar to the one illustrated in FIGS. 34-38 contains a hollow annular conduit 233 that is lined with a "wick" through which a fluid, e.g., water, within the hollow conduit is moved by capillary action, with the combined water and wick configuration of the hollow annular conduit acting as a "heat pipe" to accelerate a transmission of thermal energy from an upper end and/or side of the hollow annular conduit to a lower end and/or side of the hollow annular conduit. Another embodiment, similar to the one illustrated in FIGS. 34-38 contains a vacuum within the conduit. And yet another embodiment similar to the one illustrated in FIGS. 34-38 contains foam and/or another insulating material within the conduit.

The cooled working fluid (not shown) flowing out of the embodiment's isothermal contraction channels, e.g., 194, flows into the embodiment's adiabatic compression channels, e.g., 184, where the cooled working fluid tends to be mechanically compressed by a rotation of the embodiment, and its motive disk 174. The compressed and cooled working fluid flowing out of the embodiment's adiabatic compression channels flows into and through the embodiment's central annular conduit 185, through which it returns to, and re-enters, the embodiment's isothermal expansion channels, e.g., 182, thereby beginning another cycle of working-fluid flow and working-fluid-mediated thermal exchange through the embodiment's working-fluid-flow channels.

With the exception of the heat-producing substance 230, the enclosing annular chamber 229, the partially enclosing layer 231 of insulation around the outer surfaces of that annular chamber, and the heat dissipating shroud 227, the embodiment 225 is identical to the embodiment 170 which is illustrated and discussed with respect to FIGS. 21-33, and a detailed explanation of the design, fabrication, and operation, of both embodiments 170 and 225 is not repeated here in order to avoid redundancy.

Figure 39:
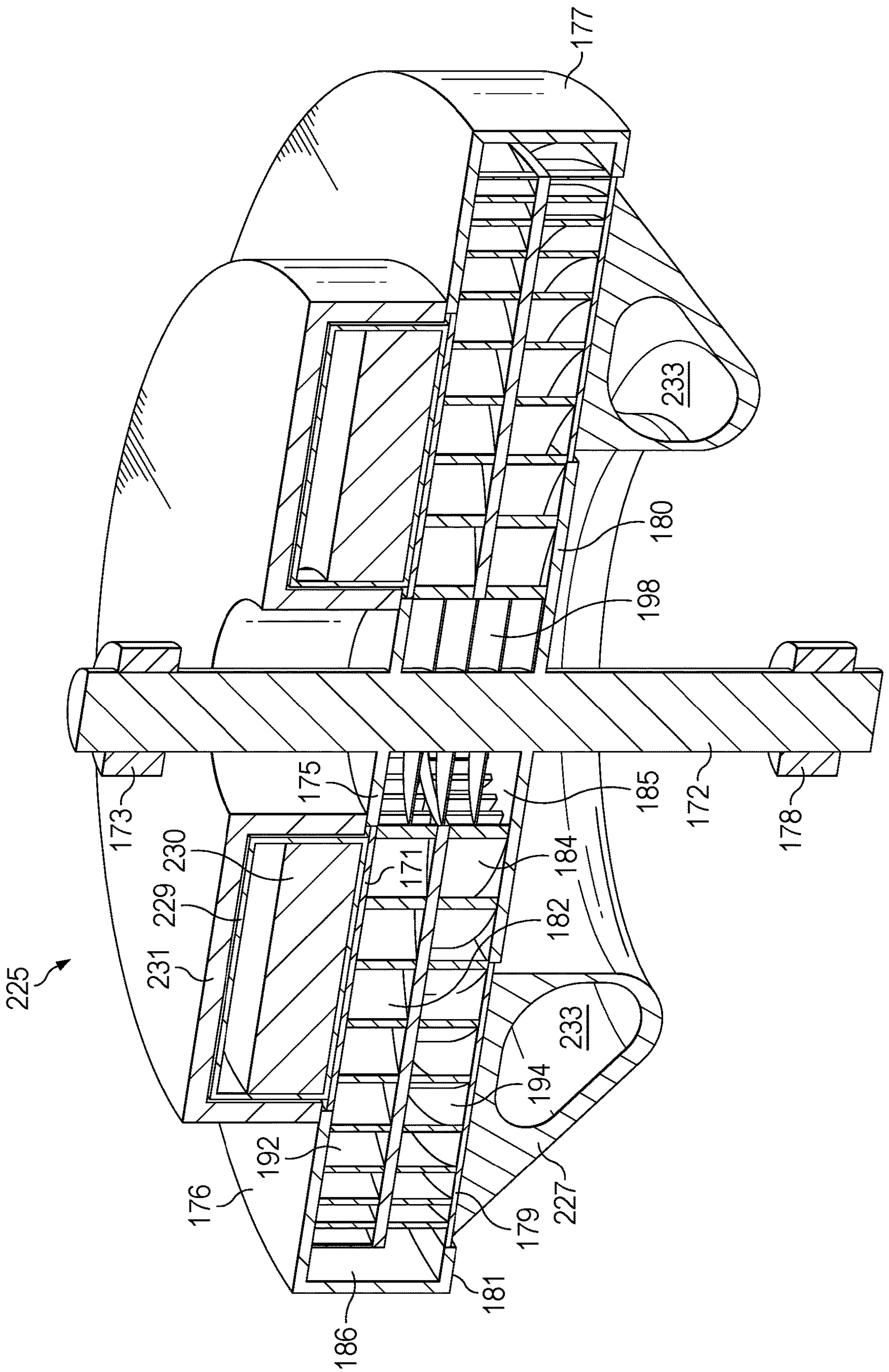
FIG. 39 shows a perspective view of the fourth embodiment of the present invention.

FIG. 39 shows a perspective view of the same side sectional view illustrated in FIG. 38, which is a side sectional view of the same embodiment 225 of the present disclosure that is illustrated in FIGS. 34-37 wherein the vertical section plane is specified in FIGS. 36 and 37 and the section is taken across line 38-38.

The varieties of embodiments, their geometries, their working fluids, their operations, and their applications, enumerated within the "Summary of the Invention" section of this disclosure apply to the embodiment illustrated and discussed in relation to FIGS. 34-39, and the scope of the present disclosure includes all such variations of the embodiment illustrated in FIGS. 34-39.

One embodiment similar to the embodiment illustrated in FIGS. 34-39 comprises, incorporates, includes, and/or utilizes, a heat-producing material 230 that is and/or contains, at least in part, a radioactive material, and/or mixture of radioactive materials, including, but not limited to: uranium 235, thorium, americium, plutonium, cesium, plutonium, and/or nuclear waste. Embodiments similar to the embodiment illustrated in FIGS. 34-39 provide a useful means, method, mechanism, process, and/or machine, by which a radioactive waste material may be converted into electrical power, and, if so desired, therefrom a chemical fuel such as hydrogen gas may be generated and/or produced (e.g., by an electrolysis of water).

Disclosed in this specification, and in FIGS. 34-39, is a closed-cycle, externally-heated and externally-cooled heat engine, comprising: a spiraling fluid-flow channel, containing a working fluid, and having upper and lower spiraling fluid-flow channel sectors; the upper spiraling fluid-flow channel sector adapted to conductively transmit heat from an external thermal source to the working fluid within the upper spiraling fluid-flow channel; the lower spiraling fluid-flow channel sector adapted to conductively transmit heat from the working fluid within the lower spiraling fluid-flow channel to an external thermal sink; a thermal source configured to be thermally connected to the upper spiraling fluid-flow channel sector and the working fluid therein; a thermal dissipation shroud adapted to increase a surface area across which, and/or through which, a surplus thermal energy may be conducted from the lower spiraling fluid-flow channel sector and the working fluid therein; and, a shaft at the radial center of the upper and lower spiraling fluid-flow channel sectors configured to rotate in response to a flow of the working fluid through the spiraling fluid-flow channel.

Figure 40:
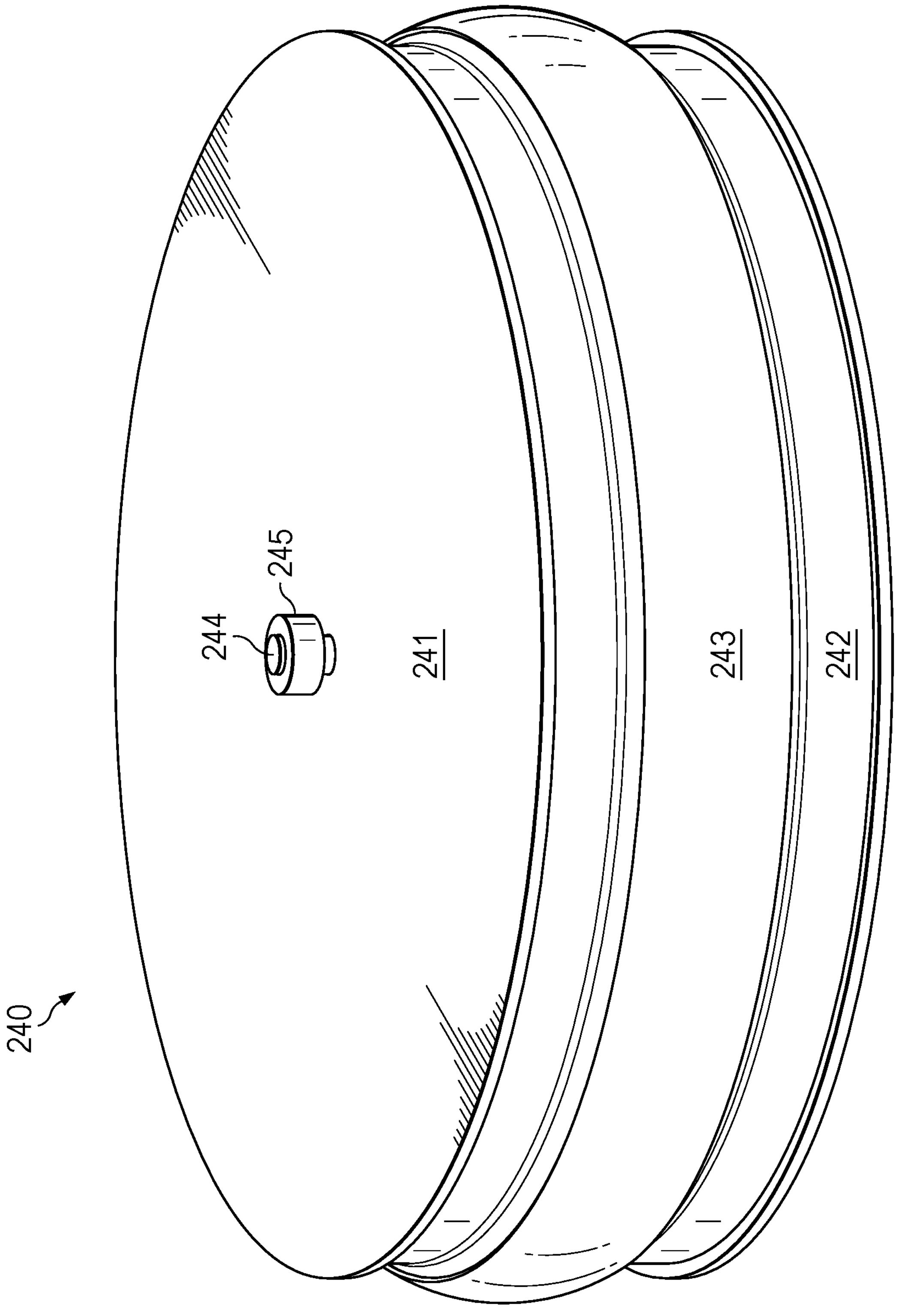
FIG. 40 shows a perspective side view of a fifth embodiment of the present invention.

FIG. 40 shows a perspective side view of an embodiment 240 of the present disclosure. Embodiment 240 incorporates, includes, utilizes, confines, entraps, and/or contains, a working fluid (not shown) constrained to flow within a plurality of spiraling channels (not visible) within the embodiment. Within an upper portion of each spiral channel, the working fluid therein, and/or flowing therethrough, receives thermal energy and/or heat from an upper hot plate 241, when that hot plate, in kind and/or similarly, receives thermal energy and/or heat from an external heat source (not shown). Within a lower portion of each spiral channel, the working fluid therein, and/or flowing therethrough, tends to lose thermal energy, and/or to be chilled and/or cooled, as a result of its contact with a lower cold plate 242, when that cold plate, in kind and/or similarly, is in thermal contact with a heat sink, and/or a sink of thermal energy and/or cold from an external source of cold (not shown). The upper hot plate is structurally connected and/or attached to the lower cold plate by an intermediate outer insulating coupler 243, collar, band, and/or belt, comprised of a thermally insulating and/or non-thermally-conductive material. A sufficient, and configuration-appropriate, warming of the embodiment's upper hot plate 241, and a sufficient, and configuration-appropriate, cooling of the embodiment's lower cold plate 242, tends to cause the working fluid (not shown) within the embodiment to flow through spiral channels and to thereby cause the embodiment, as well as the embodiment's rigidly affixed central shaft 244, axle, and/or rod, to rotate. Rotations of the embodiment, and its shaft, with respect to a non-rotating structure, platform, object, and/or mechanism to which the embodiment is rotatably connected, are facilitated by upper 245 and lower (not visible) shaft bearings. The upper and lower shaft bearings are rotatably connected to the embodiment's shaft, and when an outer portion, part, and/or surface, of each bearing is fixedly attached to a non-rotating, and/or to a differently-rotating, external structure, platform, mechanism, and/or apparatus, the upper and lower bearings facilitate rotations of the embodiment and its shaft relative to the non- or differently-rotating external structure.

Figure 41:
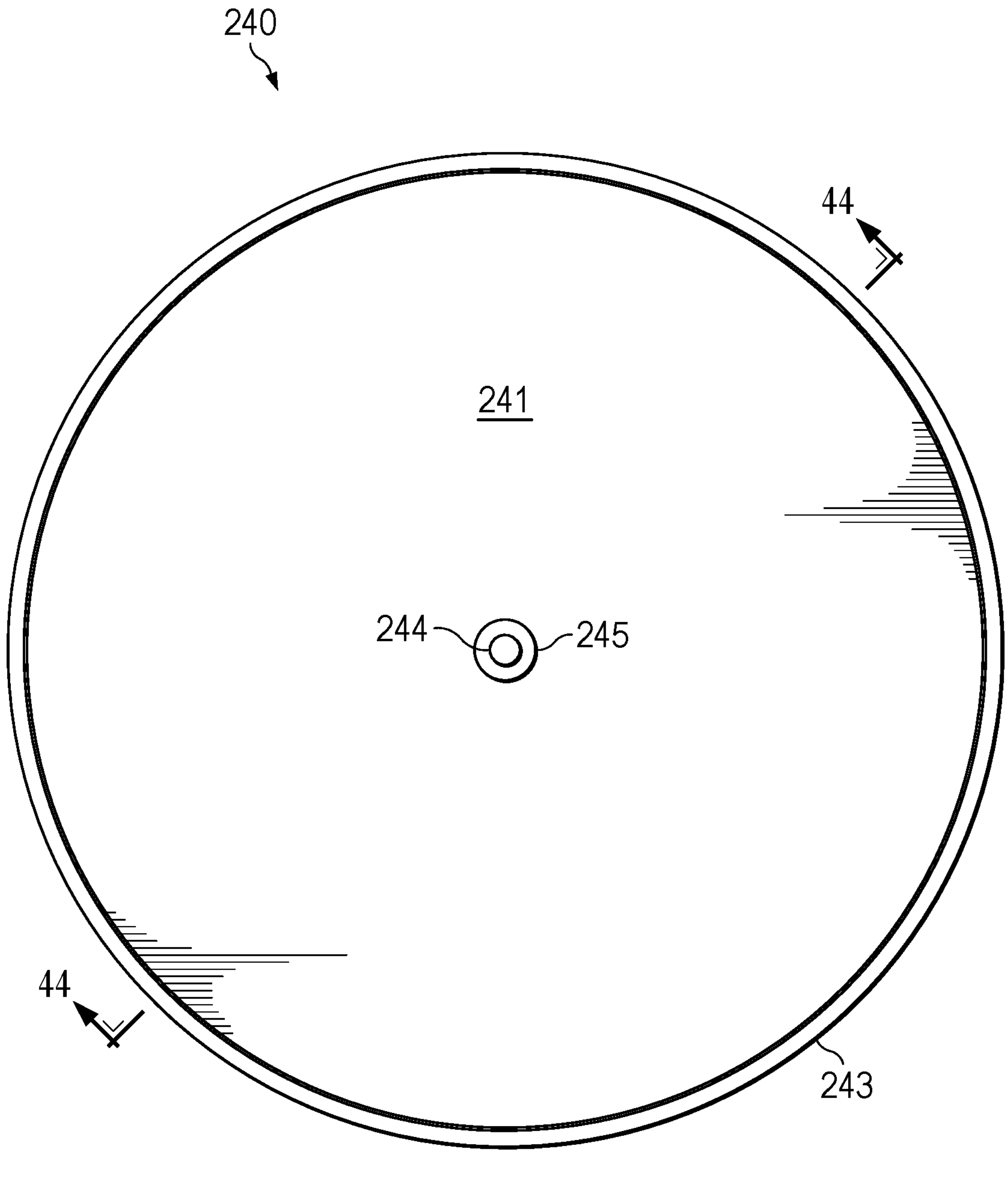
FIG. 41 shows a top-down view of the fifth embodiment of the present invention.

FIG. 41 shows a top-down view of the same embodiment 240 of the present disclosure that is illustrated in FIG. 40.

Figure 42:
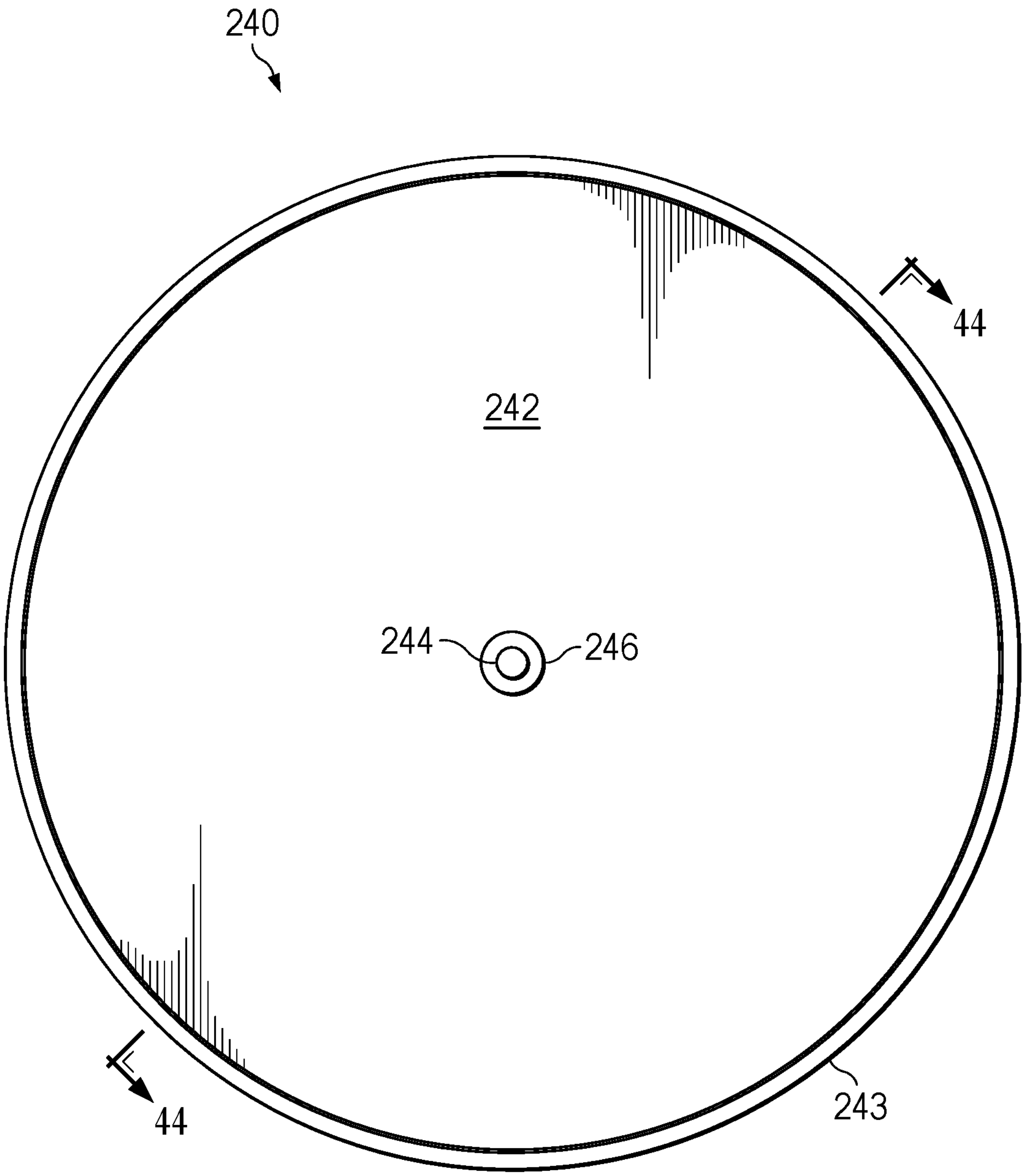
FIG. 42 shows a bottom-up view of the fifth embodiment of the present invention.

FIG. 42 shows a bottom-up view of the same embodiment 240 of the present disclosure that is illustrated in FIGS. 40 and 41. A lower shaft bearing 246, rotatably connected and/or coupled to the embodiment's shaft 244, facilitates rotations of the embodiment and its shaft relative to a non-rotating, and/or differently-rotating, structure, platform, mechanism, and/or apparatus, to which an outer portion, part, and/or surface, of the lower bearing is attached.

Figure 43:
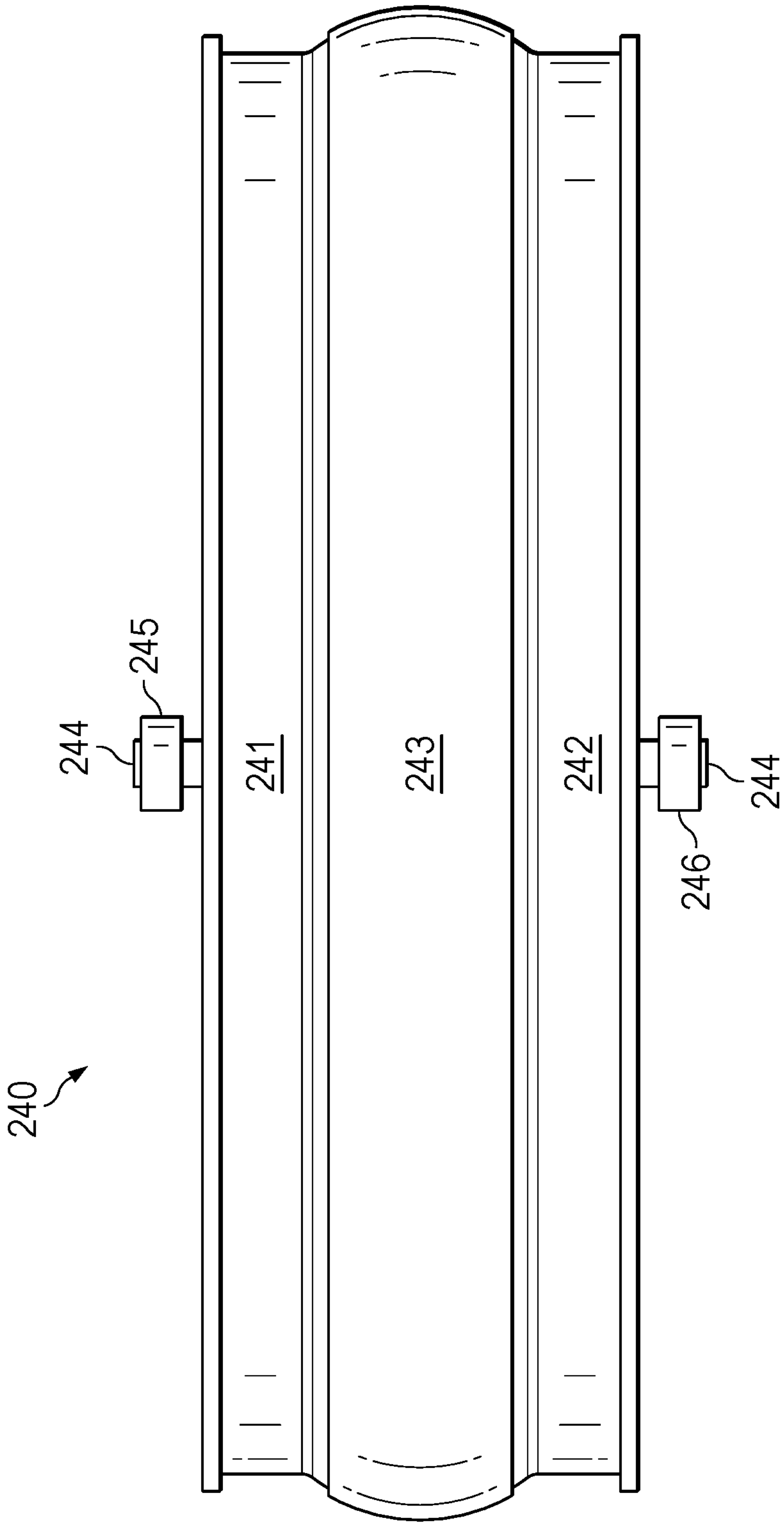
FIG. 43 shows a side view of the fifth embodiment of the present invention.

FIG. 43 shows a side view of the same embodiment 240 of the present disclosure that is illustrated in FIGS. 40-42.

Figure 44:
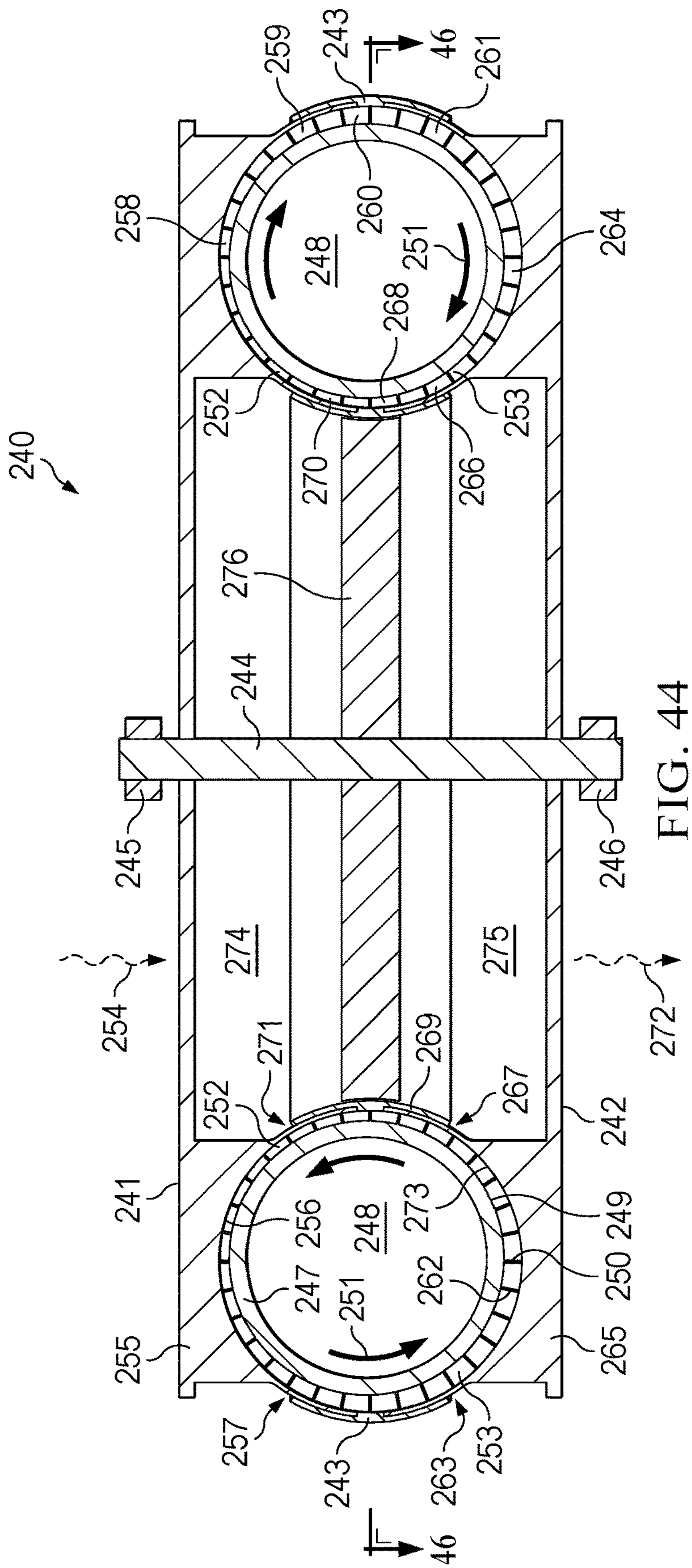
FIG. 44 shows a side sectional view of the fifth embodiment of the present invention.

FIG. 44 shows a side sectional view of the same embodiment 240 of the present disclosure that is illustrated in FIGS. 40-43 wherein the vertical section plane is specified in FIGS. 41 and 42 and the section is taken across line 44-44.

Radially centered about shaft 244 is an annular hollow tube 247 comprised, fabricated, and/or made, of an insulating, and/or a thermally non-conductive, material. Sealed within a hollow interior 248 of the annular tube, and/or encased by and/or within the annular tube, is a gas, e.g., nitrogen or air.

Arrayed about, and/or attached to, an outer surface 249 of the annular tube 247 is a plurality of thermally non-conductive fluid channel walls, e.g., 250, each of which is normal to that outer surface 249 and spirals around the center, and/or circular central, fluid-flow longitudinal, and/or annular, axis of the annular tube. Each fluid channel wall, of the plurality of fluid channel walls, follows, and/or is positioned so as to manifest, a spiraling and/or helical path about the outer surface of the annular tube.

A working fluid (not shown) flowing around the outer surface, e.g., 249, of the annular tube 247, and flowing between each adjacent pair of fluid channel walls, e.g., 250 and 262, and/or within each fluid channel, e.g., 252 and 253, flows in a circular, e.g., 251, path (i.e. with the illustrated path 251 being representative of the direction of that component of the working fluid's spiraling rotary flow, about the outer surface of the annular tube, that is tangential to the circular central, fluid-flow longitudinal, and/or annular, axis of the annular tube. Though the illustrated working-fluid-flow arrows are drawn within the interior of that annular tube, they illustrate the fluid-flow-axis rotational pattern of working-fluid flow through the working-fluid-flow channels.

Working fluid (not shown) flows within, and/or through, each of the embodiment's fluid channels flows in a helical, and/or spiral, path about the outside 249 of the annular tube 247, and also flows in a helical, and/or spiral, path about the radial perimeter of the embodiment, e.g., about the shaft 244, and/or about a central, vertical, and/or rotational, axis of the annular tube.

Each of the plurality of radial fluid channel walls, e.g., 250 and 262, is comprised, fabricated, and/or made, of an insulating, and/or thermally non-conductive, material, e.g., of the same material of which the annular tube is comprised, fabricated, and/or made.

As working fluid (not shown) flows through the plurality of helical and/or toroidal working-fluid-flow channels, the working fluid passes, and/or flows, through a constricted portion, e.g., 252, of each respective working-fluid-flow channel, i.e. a portion of each respective working-fluid-flow channel within which the flow-normal cross-sectional area of the working-fluid-flow channel is minimal with respect to adjacent portions, and/or with respect to other, and/or all, portions, of the working-fluid-flow channel. This is a portion of, and/or a point within, each of the embodiment's plurality of working-fluid-flow channels, that demarks, defines, represents, and/or marks, a beginning of an isothermal expansion portion and/or sector of each respective working-fluid-flow channel.

Working fluid (not shown) flowing through a constricted portion of a working-fluid-flow channel, i.e. a working-fluid-flow-channel portion of minimal flow-normal cross-sectional area, thereafter flows through a respective isothermal expansion portion, e.g., 252, of that respective working-fluid-flow channel. Within this portion of a working-fluid-flow channel, working fluid flows beneath, and/or adjacent to, a relatively thick portion, e.g., 255, of the embodiment's hot plate 241, and therefrom absorbs thermal energy from the hot plate, which absorbs thermal energy from an external heat source (not shown), thereby causing that working fluid to warm and expand.

Due to its physical and thermal contact with, and/or fluid and thermal connection to, the thick portion, e.g., 255, of the embodiment's hot plate, the working fluid flowing within an isothermal expansion portion of each respective working-fluid-flow channel tends to absorb, and/or conductively receive, thermal energy and/or heat from the hot plate, thereby being warmed, and/or experiencing an increase in temperature, as a result.

Due to its receipt of thermal energy, and/or heat, from the embodiment's hot plate 241, the working fluid (not shown) flowing adjacent to that hot plate will tend to warm and expand. As the working fluid flowing adjacent to the hot plate, e.g., within fluid channel 258, gains, gathers, and/or acquires, thermal energy and/or heat from the hot plate, it tends to expand and flow away from the constricted portion, e.g., 252, of its respective fluid channel, and tends to flow toward a succeeding portion, e.g., 260, of the respective fluid channel, toward which the flow-normal cross-sectional area grows incrementally greater, and within which thermal energy and/or heat is no longer added, nor available, to the working fluid.

After working fluid (not shown) flows into a portion, e.g., 259, of its respective working-fluid-flow channel that is not, and/or is no longer, adjacent to the thick portion, e.g., 255, of the hot plate 241, the fluidly connected portion, e.g., 259, that it flows into is adjacent to, and thermally connected to, a relatively thin portion, e.g., 257, and/or extension of the hot plate. As a result of its significantly reduced thickness, and reduced heat capacity, thermal energy and/or heat tends to flow into the adjacent working-fluid-flow channels, and the working fluid therein, at a relatively lesser rate. The reduced rate at which thermal energy and/or heat flows to, and/or into, the working fluid within these portions, e.g., 259, of the working-fluid-flow channels provides a transition, and/or a transitional portion of each respective working-fluid-flow channel, between each respective preceding isothermal expansion portion of a working-fluid-flow channel, and a respective approaching adiabatic expansion portion, e.g., 260, of each respective working-fluid-flow channel.

After working fluid (not shown) flows out from under the relatively thinner extension, e.g., 257, of the hot plate 241, it flows into and through a relatively short adiabatic expansion portion, e.g., 260, of each respective working-fluid-flow channel. The adiabatic expansion portion of a working-fluid-flow channel is bounded by respective adjacent working-fluid-flow channel walls, e.g., 250 and 262, on either side of the working-fluid-flow channel, by the outer and/or upper surface 249 of the annular tube 257 on a lower and/or radially-inner side of the working-fluid-flow channel, and by an inner surface of the outer insulated and/or insulating coupler 243 on the upper and/or radially-outer side of the working-fluid-flow channel.

Within the adiabatic expansion portion, e.g., 260, of each working-fluid-flow channel, the working fluid tends to continue expanding, though in the absence of a continued influx of thermal energy, and/or heat, thereby causing the continued expansion of that working fluid to be accompanied by a reduction in the pressure of that working fluid.

After working fluid (not shown) flows out of a portion of a fluid channel that is adjacent to the outer insulating coupler 243, it then flows into and through a portion, e.g., 261, of the respective working-fluid-flow channel that is adjacent to, and thermally-connected with, a relatively thin portion, e.g., 263, and/or extension, of the embodiment's cold plate 242 into which thermal energy, and/or heat, flows from the working fluid therein at a relatively low rate due to the reduced heat capacity of the relatively thin extension of the cold plate into which the thermal energy and/or heat flows.

After working fluid (not shown) flows out of a portion, e.g., 261, of a working-fluid-flow channel that is adjacent to the relatively thin portion, e.g., 263, and/or extension, of the cold plate 242, it then flows into an isothermal contraction portion, e.g., 264, of the respective working-fluid-flow channel that is adjacent to, and thermally connected to, the thick portion, e.g., 265, of the embodiment's cold plate 242.

Due to its physical and thermal contact with, and/or fluid and thermal connection to, the thick portion, e.g., 265, of the embodiment's cold plate, the working fluid flowing within, and/or through, the isothermal contraction portion, e.g., 264, of a working-fluid-flow channel tends to transfer, conduct, impart, and/or give up, at a relatively maximal rate, thermal energy and/or heat to the cold plate, thereby being chilled and/or experiencing a reduction in its temperature, as a result.

Due to its transfer of a significant portion of its thermal energy, and/or heat, to the embodiment's cold plate 242, the working fluid (not shown) flowing adjacent to the cold plate will tend to cool and contract.

After working fluid (not shown) flows out of a portion, e.g., 264, of a working-fluid-flow channel that is adjacent to the thick portion, e.g., 265, of the embodiment's cold plate 242, it then flows into a portion, e.g., 253 and 266, of the respective working-fluid-flow channel that is adjacent to another relatively thin portion, e.g., 267, and/or extension, of the cold plate 242, wherein and/or where through thermal energy, and/or heat, continues to flow from the working fluid therein, albeit at a relatively low rate.

After working fluid (not shown) flows out of a portion, e.g., 266, of a working-fluid-flow channel that is adjacent to the relatively thin portion, e.g., 267, and/or extension, of the cold plate 242, it then flows into and through an adiabatic compression portion, e.g., 268, of the respective working-fluid-flow channel. The adiabatic compression portion of a fluid channel is bounded by respective adjacent working-fluid-flow channel walls, e.g., 250 and 262, on either side of the working-fluid-flow channel, by the outer and/or upper surface 249 of the annular tube 257 on a lower and/or radially-inner side of the fluid channel, and by an inner surface of the inner insulated and/or insulating coupler 269 on the upper and/or radially-outer side of the working-fluid-flow channel.

Within the adiabatic compression portion, e.g., 268, of a working-fluid-flow channel, the compression of the working fluid therein tends to continue due to the rotation of the embodiment doing work on the working fluid (not shown), and mechanically compressing the working fluid therein. The mechanical compression of the cooled and/or chilled working fluid within each respective adiabatic compression working-fluid-flow portion, and/or sector, tends to increase the pressure of that working fluid.

After working fluid (not shown) flows out of an adiabatic compression portion, e.g., 268, of a working-fluid-flow channel, it then flows into and through a portion, e.g., 270, of the respective working-fluid-flow channel that is adjacent to a relatively thin portion, e.g., 271, and/or extension, of the hot plate 241. Within this portion of a working-fluid-flow channel, the working fluid receives some thermal energy and/or heat from the extension of the hot plate, albeit at a lesser rate than it will receive it when it advances further through the respective working-fluid-flow channel, and flows adjacent to the relatively thick portion, e.g., 255, of the hot plate. Due to the influx and/or inflow of thermal energy from the hot plate, the working fluid begins to warm and to expand, thereby initiating and/or continuing a flow through the working-fluid-flow channel.

After working fluid (not shown) flows out of a portion, e.g., 270, of a working-fluid-flow channel that is adjacent to a relatively thin portion, e.g., 271, and/or extension, of the hot plate 241, it then flows into and through an isothermal expansion portion, e.g., 258, of the respective working-fluid-flow channel. And from there it continues manifesting another cycle of thermally-driven flow through the respective working-fluid-flow channel.

Thermal energy and/or heat, e.g., 254, imparted to an outer surface of the embodiment's hot plate 241 tends to increase the temperature of the thermally-conductive material, e.g., 255, of which the hot plate is comprised. And, working fluid (not shown) flowing through the embodiment's working-fluid-flow channels, e.g., 258, adjacent to the hot plate tends to come into contact with a surface, e.g., 256, of the hot plate, and therefrom, thereby, and/or therethrough, receive thermal energy and/or heat from the hot plate, which tends to warm the working fluid and, with respect to a particular working-fluid-flow channel, cause a portion of that working fluid to expand and thereby flow away from the point, position, and/or region, of the warming, toward a point, position, and/or region, of non-warming, i.e. an adiabatic point, position, and/or region, within the respective working-fluid-flow channel.

Thermal energy and/or heat, e.g., 272, drawn from an outer surface of the embodiment's cold plate 242 tends to reduce the temperature of the thermally-conductive material, e.g., 265, of which the cold plate is comprised. And, working fluid (not shown) flowing through the embodiment's working-fluid-flow channels, e.g., 264, adjacent to the cold plate tends to come into contact with a surface, e.g., 273, of the cold plate, and therefrom, thereby, and/or therethrough, impart, transmit, conduct, and/or give, thermal energy, and/or heat, to the cold plate, which tends to cool the working fluid and, with respect to a particular working-fluid-flow channel, cause a portion of that working fluid to contract within that region and/or portion of the respective working-fluid-flow channel, and to thereafter be mechanically compressed by the rotation of the embodiment.

In order to prevent a "leakage" of thermal energy from the hot plate 241 to the cold plate 242 through a gaseous interior 274 and 275, a thermally-insulating and/or insulated medial disk 276 separates the upper 274 and lower 275 gas, e.g., air, pockets within the embodiment. Separating and sealing the interior junction and/or seam between the adjacent relatively-thin extension 271 of the hot plate 241 and the relatively-thin extension 267 of the cold plate 242 is an inner insulated and/or insulating coupler 269. And, separating and sealing the exterior junction and/or seam between the adjacent relatively-thin extension 257 of the hot plate 241 and the relatively-thin extension 263 of the cold plate 242 is an outer insulated and/or insulating coupler 243.

As working fluid (not shown) within each of the plurality of helical working-fluid-flow channels, e.g., 252, 253, 258-261, 264, 266, 268, and 270, spirally flows around the periphery of the outer surface 249 of the embodiment's annular tube 247, and flows radially (albeit in a spiraling fashion) about the embodiment's axis of rotation and shaft 244, the embodiment is compelled, e.g., by conservation of momentum, to rotate about the embodiment's axis of rotation and shaft in an opposite direction. Thus, the application of heat, e.g., 254, to the embodiment's hot plate 241, and the removal of heat, e.g., 272, and/or the application of cold, to the embodiment's cold plate 242, results in a rotation of the embodiment, about the embodiment's axis of rotation and shaft, from which mechanical work may be extracted.

Each of the plurality of helical and/or toroidal working-fluid-flow channels illustrated in FIGS. 40-44 revolves about the embodiment's annular tube 247 twice before fluidly reconnecting to its beginning, and/or to where it began. Thus, each of the plurality of helical and/or toroidal working-fluid-flow channels includes, incorporates, utilizes, and/or comprises, two constricted portions, sections, partitions, parts, regions, and/or zones. Likewise, each of the plurality of helical and/or toroidal working-fluid-flow channels includes, incorporates, utilizes, and/or comprises, two isothermal expansion portions, two adiabatic expansion portions, two isothermal contraction portions, and two adiabatic compression portions. In other words, each of the plurality of helical and/or toroidal working-fluid-flow channels includes, incorporates, utilizes, and/or comprises, two repetitions of a flow-direction ordered series of working-fluid-flow channel portions. Within each of the plurality of helical and/or toroidal working-fluid-flow channels, working fluid flows through a first constricted portion, a subsequent isothermal expansion portion, a subsequent adiabatic expansion portion, a subsequent isothermal contraction portion, and then through a subsequent adiabatic compression portion, after which it flows through a second constricted portion, a subsequent isothermal expansion portion, a subsequent adiabatic expansion portion, a subsequent isothermal contraction portion, and then through a subsequent adiabatic compression portion. Working fluid flows through the same ordered series of working-fluid-flow channel portions once, and then twice, and in the same order, thereby flowing through each type of fluid channel portion twice during its flow through each complete helical and/or toroidal working-fluid-flow channel.

Each of the working-fluid-flow channels within an embodiment similar to the one illustrated in FIGS. 40-44 is separate and not fluidly connected to any other working-fluid-flow channel within that embodiment, thereby maximizing local pressure changes manifested by working fluids flowing within those fluid channels, e.g., by preventing leakage of working fluid between and/or among fluid channels characterized by working fluids of differing pressures. And, in another embodiment similar to the one illustrated in FIGS. 40-44, the working-fluid-flow channels, while substantially fluidly disconnected, are nonetheless fluidly connected, e.g., by small apertures in the working-fluid-flow channel walls, which facilitates a relatively slow equilibration and/or distribution of working fluid, e.g., by mass of working fluid, within, and/or throughout, the embodiment, while substantially preserving local working-fluid pressure differences.

Figure 45:
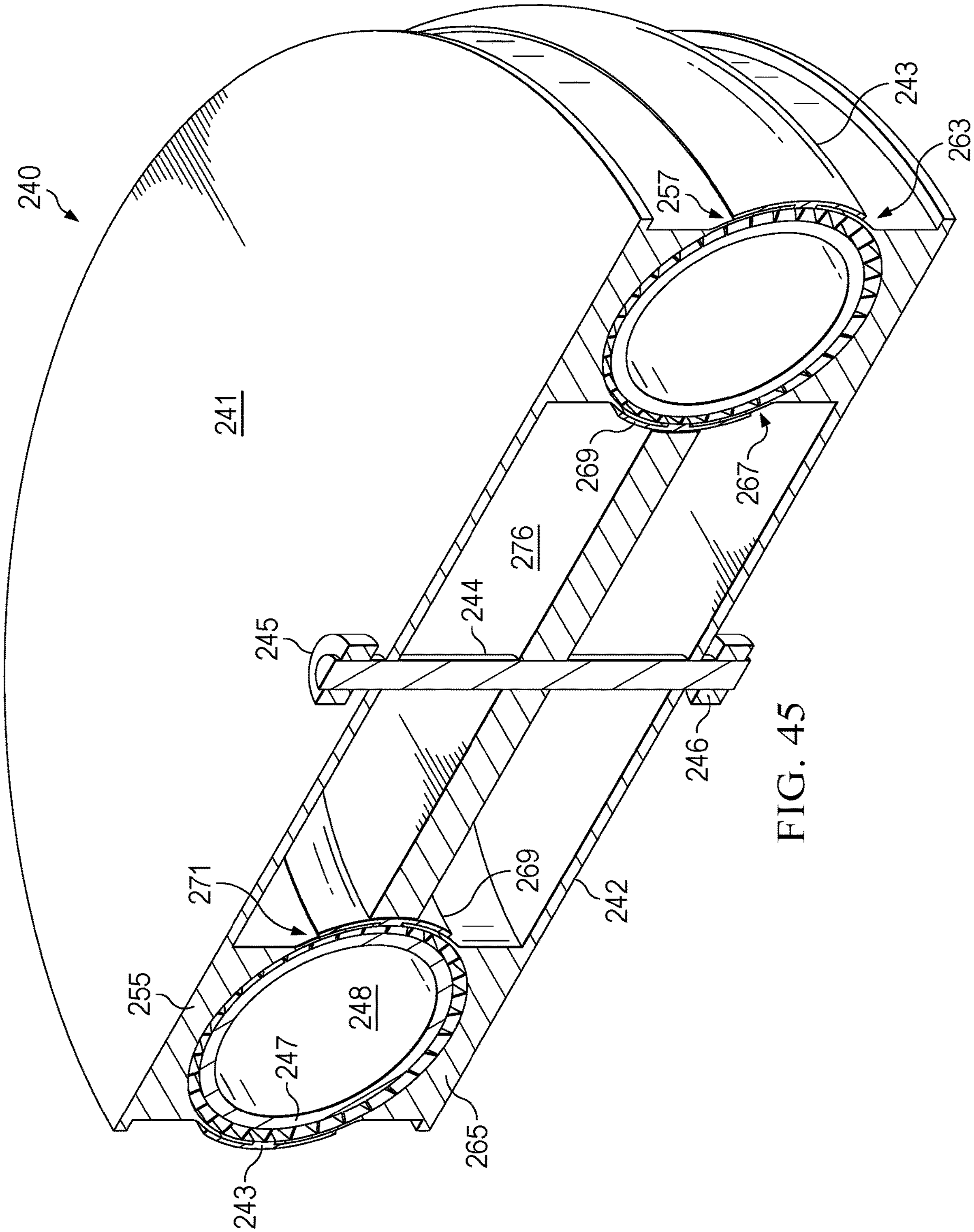
FIG. 45 shows a perspective view of the fifth embodiment of the present invention.

FIG. 45 shows a perspective view of a side sectional view of the same embodiment 240 of the present disclosure that is illustrated in FIGS. 40-44 wherein the vertical section plane is specified in FIGS. 41 and 42 and the section is taken across line 44-44.

Figure 46:
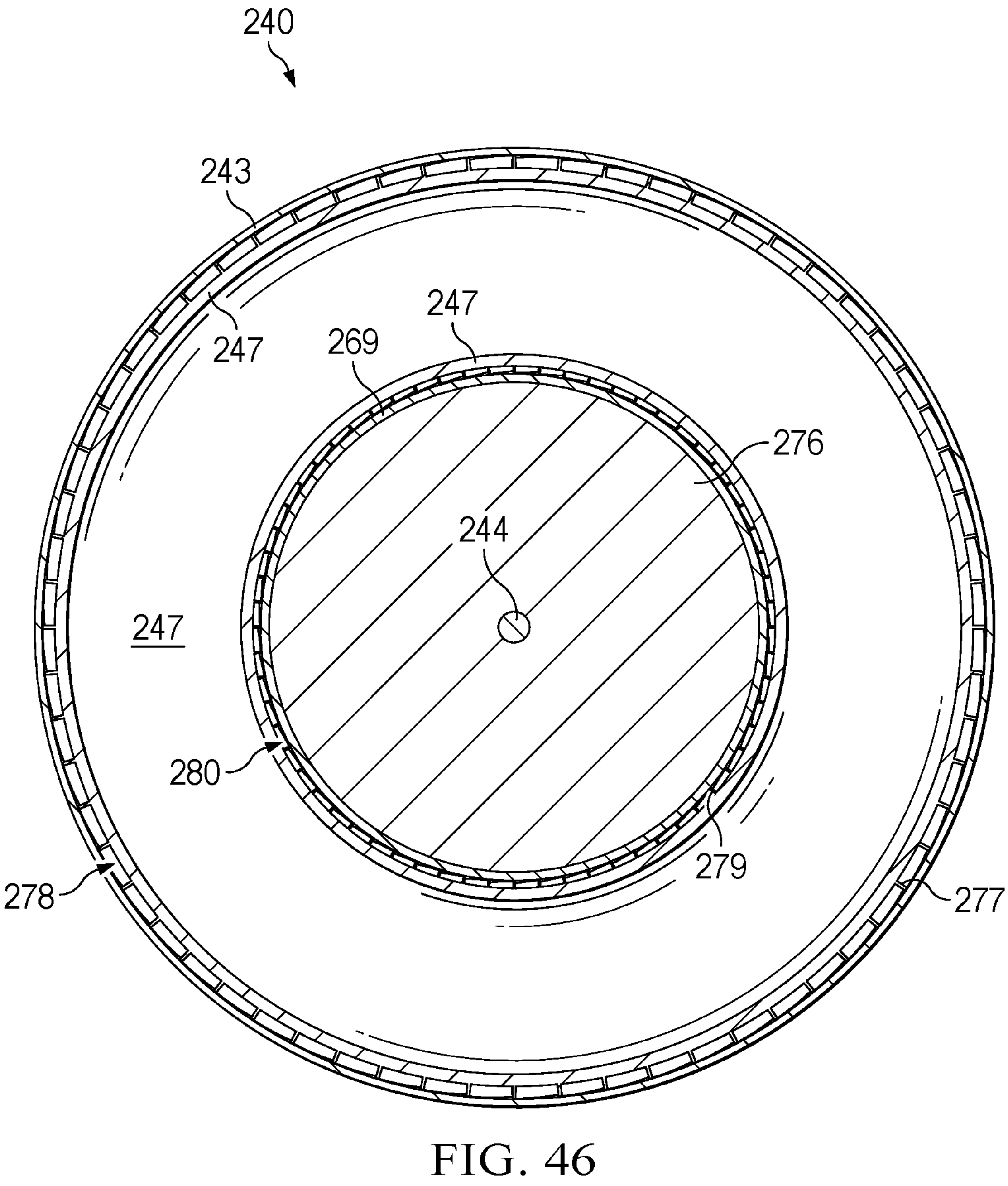
FIG. 46 shows a top-down sectional view of the fifth embodiment of the present invention.

FIG. 46 shows a top-down sectional view of the same embodiment 240 of the present disclosure that is illustrated in FIGS. 40-45 wherein the horizontal section plane is specified in FIG. 44 and the section is taken across line 46-46.

Because the section plane passes through a vertical center of the embodiment 240, it passes through the elevation within the embodiment whereat the hot plate (241 in FIG. 44) and the cold plate (242 in FIG. 44) are physically joined, and/or connected, by an outer intermediate insulating coupler 243 and by an inner intermediate coupler 269.

Therefore, with respect to the sectional illustration of FIG. 46, the working-fluid-flow channel walls, e.g., 277, adjacent to an outer periphery of the embodiment, connect with, and/or are bounded by, the outer intermediate insulating coupler 243 (and, with respect to this sectional illustration are not shown connecting with, and/or being bounded by, extensions of either the hot plate or the cold plate). Similarly, the most radially distal portions of each of the plurality of working-fluid-flow channels, e.g., 278, and/or the portions of those working-fluid-flow channels adjacent to an outer periphery of the embodiment, are thermally insulated. The outer fluid channel cross-sections, e.g., 278, illustrated in FIG. 46 constitute adiabatic expansion portions, and/or sectors, of their respective working-fluid-flow channels.

Therefore, with respect to the sectional illustration of FIG. 46, the working-fluid-flow channel walls, e.g., 279, adjacent to an inner periphery of the embodiment's annular tube 247, connect with, and/or are bounded by, the inner intermediate insulating coupler 269 (and, with respect to this sectional illustration are not shown connecting with, and/or being bounded by, extensions of either the hot plate or the cold plate). Similarly, the most radially innermost portions of each of the embodiment's plurality of working-fluid-flow channels, e.g., 280, and/or the portions of those working-fluid-flow channels adjacent to an inner periphery of the embodiment's annular tube, are thermally insulated. The inner working-fluid-flow channel cross-sections, e.g., 280, illustrated in FIG. 46 constitute adiabatic compression portions of their respective working-fluid-flow channels.

Figure 47:
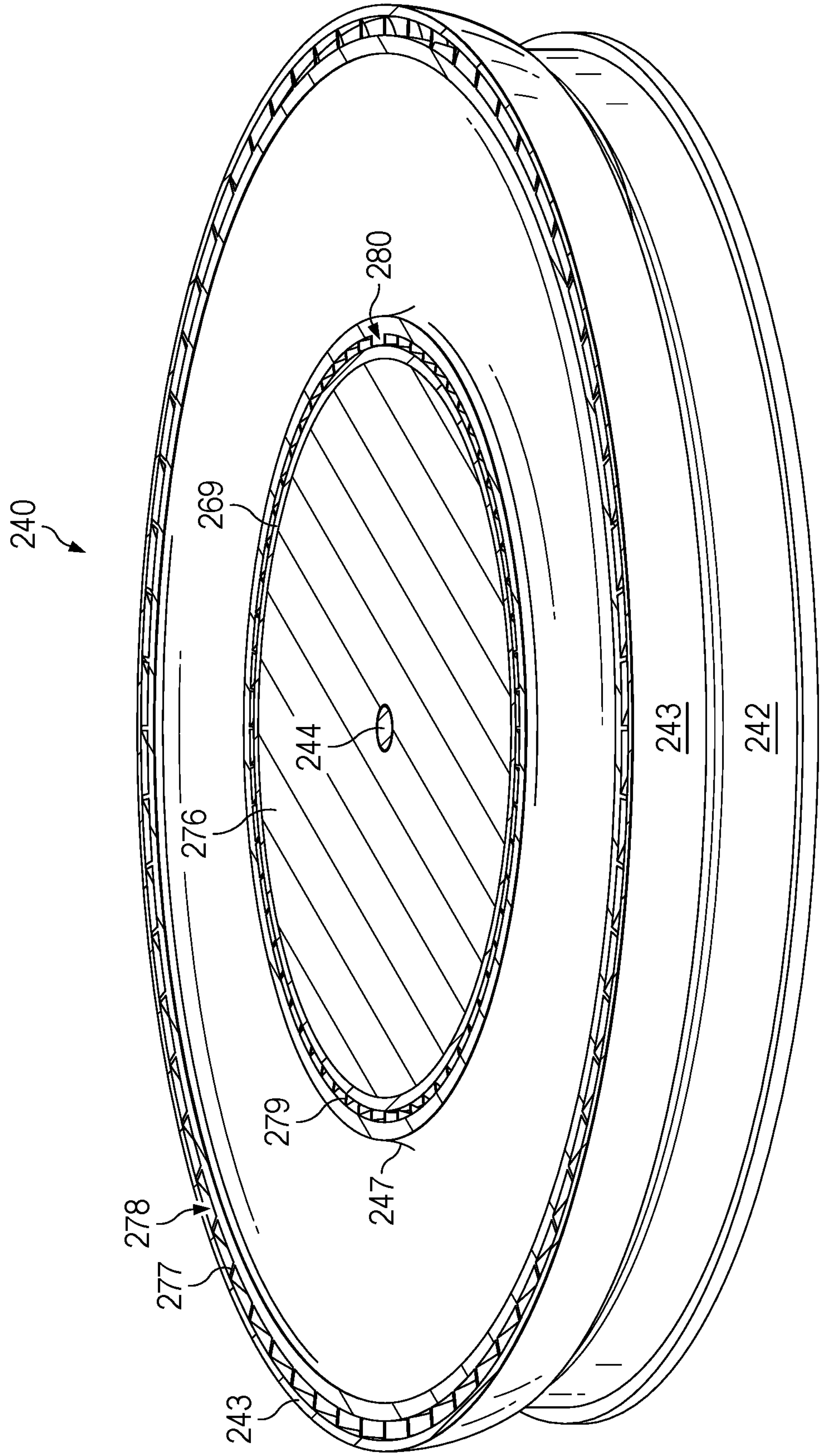
FIG. 47 shows a perspective view of the fifth embodiment of the present invention.

FIG. 47 shows a perspective view of a top-down sectional view of the same embodiment 240 of the present disclosure that is illustrated in FIGS. 40-46 wherein the horizontal section plane is specified in FIG. 44 and the section is taken across line 46-46.

Figure 48:
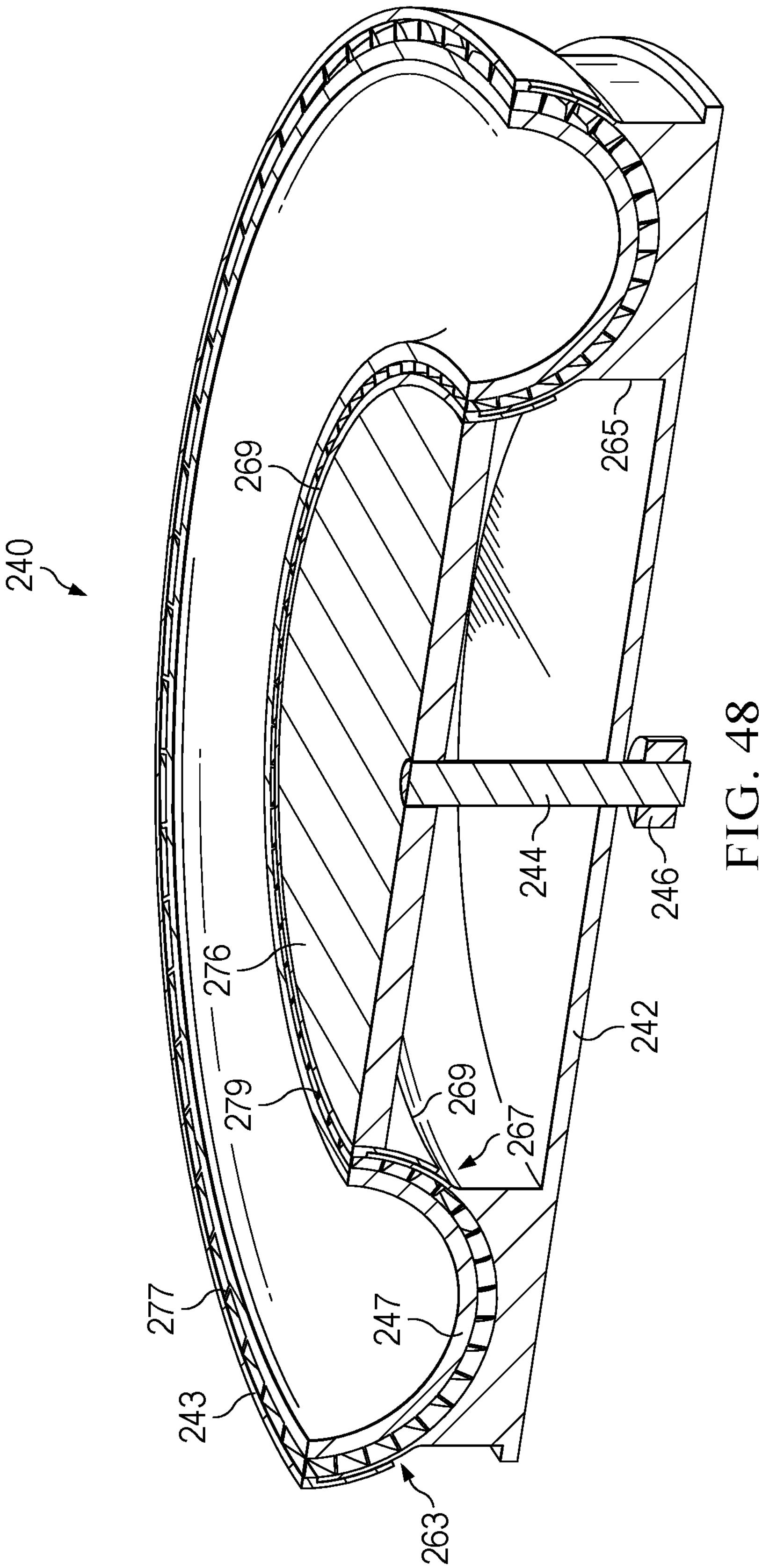
FIG. 48 shows a perspective sectional view of the fifth embodiment of the present invention.

FIG. 48 shows a perspective sectional view of the same embodiment 240 of the present disclosure that is illustrated in FIGS. 40-47 wherein the sectional view is the result of two sections of the embodiment. The vertical section plane of the sectional view is specified in FIGS. 41 and 42 and the section is taken across line 44-44. The horizontal section plane of the sectional view is specified in FIG. 44 and the section is taken across line 46-46.

The working fluid (not shown) flows in a spiral fashion about the exterior of the annular tube 247. The cold plate 242 is connected to the hot plate (not visible in the sectional view) by inner 269 and outer 243 insulating couplers, the lower half of each being visible in the sectional view of FIG. 48.

Figure 49:
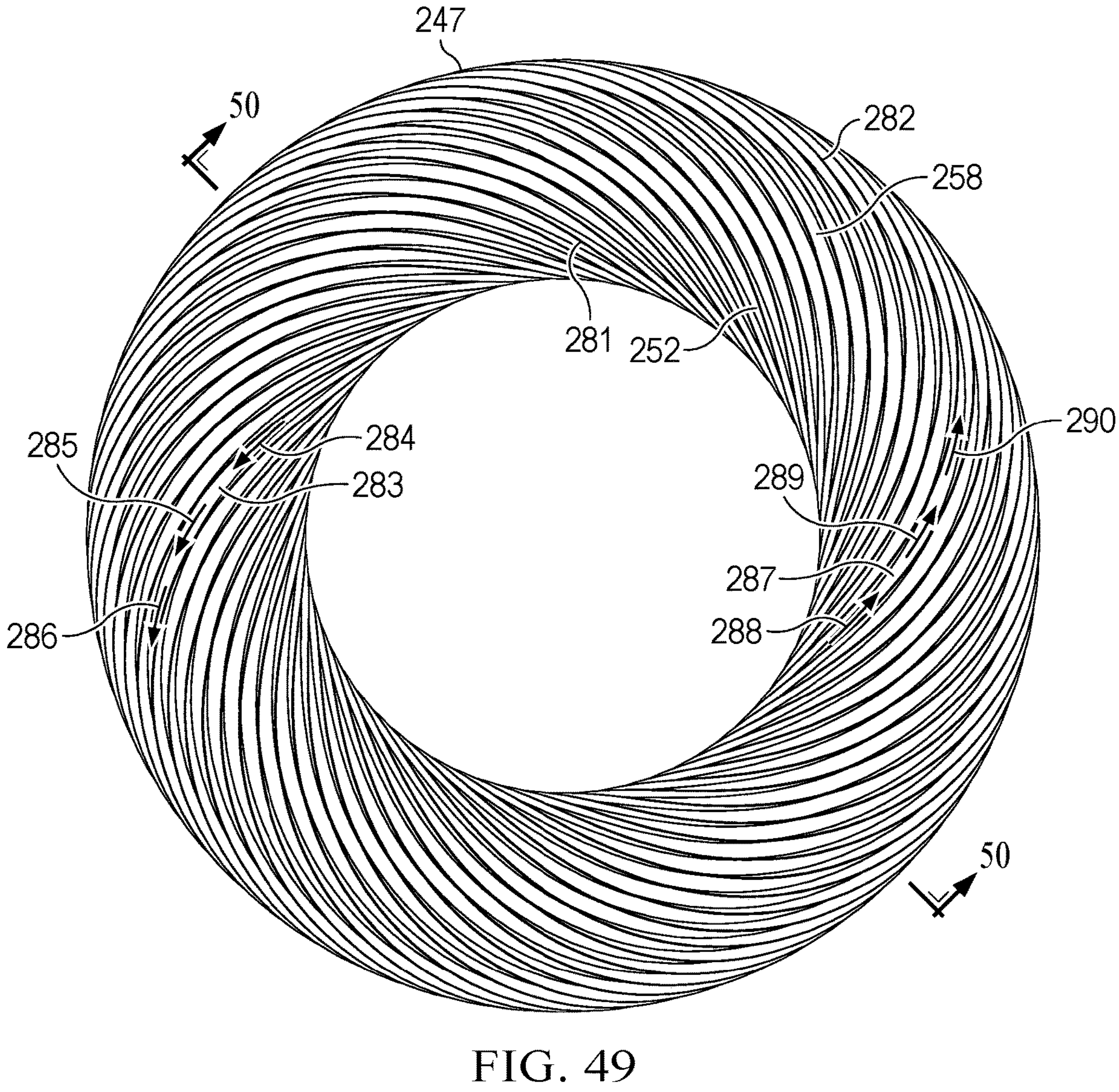
FIG. 49 shows a top-down view of a component of the fifth embodiment of the present invention.

FIG. 49 shows a top-down view of annular tube 247 and the plurality of working-fluid-flow channel lateral walls, e.g., 281 and 282, comprising, in part, and/or a part of, the same embodiment 240 of the present disclosure that is illustrated in FIGS. 40-48.

The working-fluid-flow-channel portions, and/or sectors, 252 and 258 of the respective working-fluid-flow channels illustrated in FIG. 49, are the same working-fluid-flow-channel portions 252 and 258 illustrated in FIG. 44. With respect to any particular vertical radial cross-section of the annular tube 247 and the plurality of working-fluid-flow channel lateral walls, e.g., 281 and 282, thereof, each working-fluid-flow channel portion, within each such section, will be distinct on the basis of its proximity to the hot plate, its proximity to the cold plate, its proximity to the inner insulating coupler, its proximity to the outer insulating coupler, its proximity to the inner extensions of the hot and cold plates, and its proximity to the outer extensions of the hot and cold plates. These distinctions are related to the positions of each sectioned working-fluid-flow-channel with respect to its relative angular position about the annular tube 247, and/or about the circular longitudinal axis at the center of that annular tube.

At an innermost angular position, relative to the center of the annular tube 247, i.e. at a working-fluid-flow-channel position nearest the shaft of the embodiment (244 in FIG. 47), working fluid (not shown) therein flows adjacent to the inner insulating coupler (269 in FIG. 44). This working-fluid-flow channel portion, at this innermost radial position relative to the center of the annular tube, constitutes the adiabatic compression portion of each fluid channel within the embodiment.

Likewise, at an uppermost angular position relative to the center of the annular tube, i.e. at a fluid-channel position nearest the upper surface of the embodiment's hot plate (241 in FIG. 44), working fluid therein flows adjacent to that hot plate and absorbs thermal energy and/or heat from that hot plate which causes the working fluid therein to increase in temperature and volume. This fluid channel portion at this uppermost radial position relative to the center of the annular tube constitutes the isothermal expansion portion of each fluid channel within the embodiment.

Similarly, the adiabatic expansion portion of each fluid channel is positioned at an outermost angular position relative to the center of the annular tube wherein working fluid (not shown) flows adjacent to the embodiment's outer insulating coupler (243 in FIG. 44). And, the isothermal contraction portion of each fluid channel is positioned at a lowermost angular position (not visible) relative to the center of the annular tube wherein working fluid flows adjacent to the embodiment's cold plate (242 in FIG. 44).

Within working-fluid-flow channel 283, working fluid (not shown) flows 284 away from the preceding respective channel constriction (positioned at an angular position, e.g., 252, relative to the center of the annular tube (247 in FIG. 44), thereby flowing adjacent to the embodiment's hot plate (241 in FIG. 44), and/or flowing within an isothermal expansion working-fluid-flow channel portion, and, as it flows, absorbing thermal energy and/or heat from the adjacent hot plate. The working fluid continues to flow 285 adjacent to the hot plate, and continues to absorb thermal energy and/or heat from the hot plate, and thereby continues to experience and/or manifest an increase in both temperature and volume. The working fluid continues to flow 286 adjacent to the hot plate, as it flows towards an adjacent, and/or neighboring, adiabatic expansion working-fluid-flow channel portion (positioned at the outermost angular position relative to the center of the annular tube) wherein working fluid flows adjacent to the embodiment's outer insulating coupler (243 in FIG. 44).

Within fluid channel 287, working fluid (not shown) flows 288-290 for the same reasons as it does with respect to the fluid flow indicated by, and discussed above relative to, fluid-flow arrows 284-286.

Figure 50:
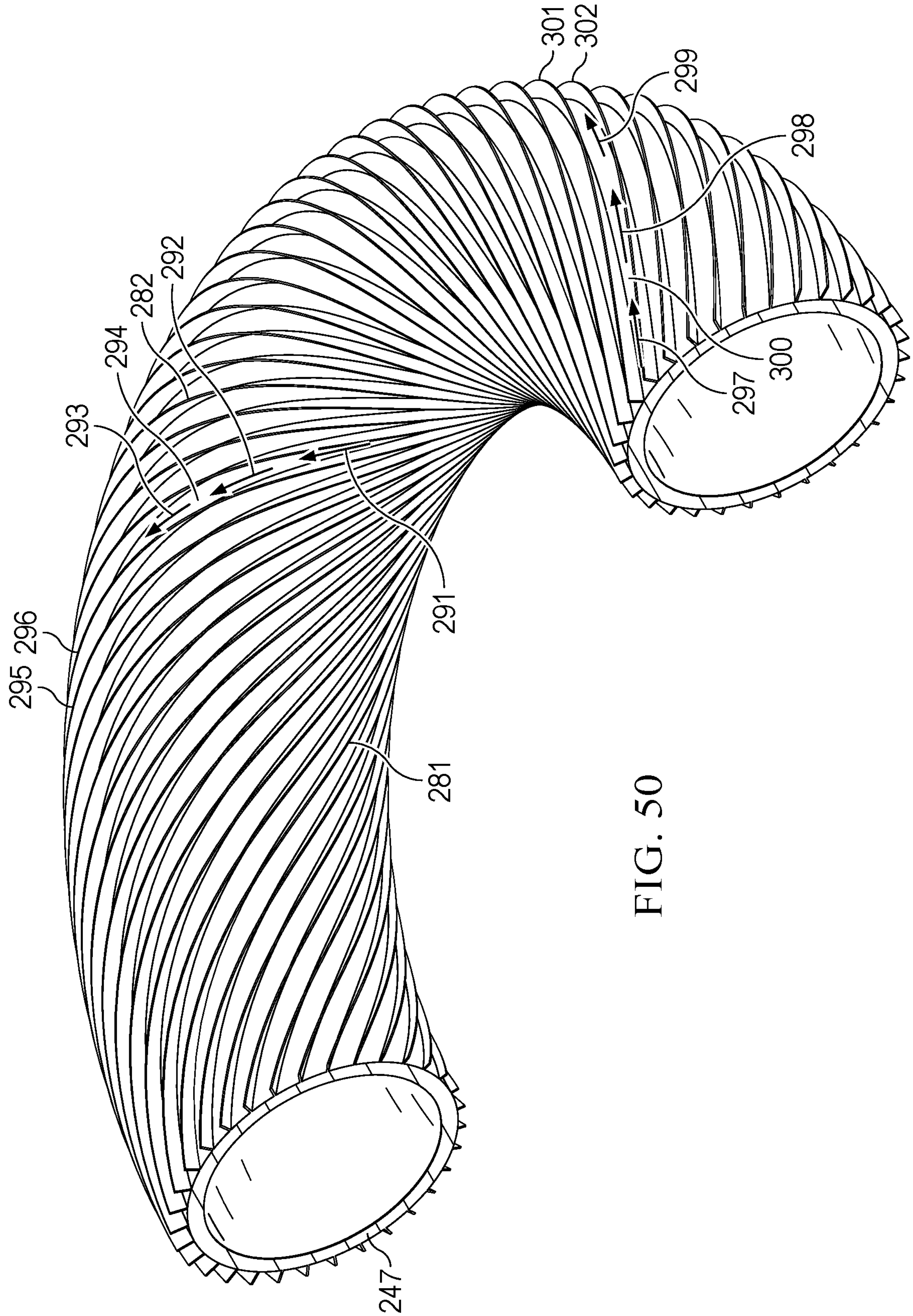
FIG. 50 shows a perspective side sectional view of a component of the fifth embodiment of the present invention.

FIG. 50 shows a perspective side sectional view of the annular tube 247 illustrated in FIG. 49, wherein the vertical section plane is specified in FIG. 49 and the section is taken across line 50-50. FIG. 50 provides a sectional view of annular tube 247, as well as the plurality of working-fluid-flow-channel lateral walls, e.g., 281 and 282, physically connected to an outer surface (249 in FIG. 44) of that annular tube, which comprise a part of the embodiment 240 of the present disclosure that is illustrated in FIGS. 40-49.

Within the full embodiment 240 (not visible), working fluid (not shown) flows, e.g., 291-293, within a plurality of working-fluid-flow channels, e.g., working-fluid-flow channel 294, where each working-fluid-flow channel, e.g., 294, is bounded laterally by a pair of adjacent working-fluid-flow channel walls, e.g., 295 and 296. As another example, working fluid flows, e.g., 297-299, within working-fluid-flow channel 300 which is bounded laterally by adjacent working-fluid-flow channel walls, e.g., 301 and 302.

Figure 51:
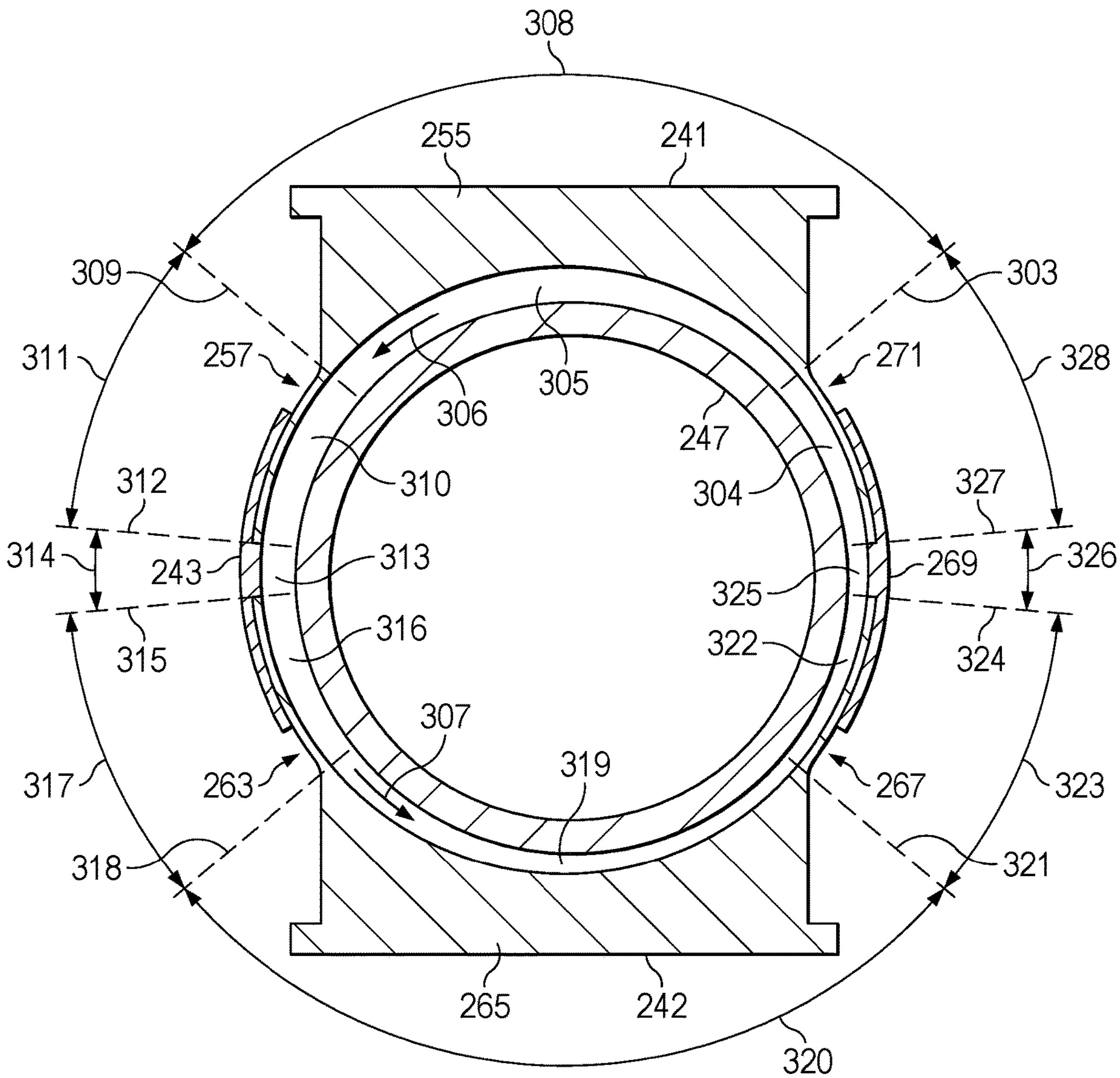
FIG. 51 shows a schematic close-up illustration of a cross-section of a component of the fifth embodiment of the present invention.

FIG. 51 shows a schematic close-up illustration of a cross-section of a segment of the annular tube 247 of the embodiment of the present disclosure that is illustrated in FIGS. 40-50. The illustrated schematic cross-section of the segment of the embodiment's annular tube is similar to the leftmost portion of the cross-sectional view of the embodiment as illustrated in FIG. 44. However, the illustration in FIG. 51 lacks working-fluid-flow-channel walls and the discrete working-fluid-flow channels which those working-fluid-flow-channel walls create, establish, bound, and/or define.

FIG. 51 illustrates the relationship between the angular orientation of a point within, and/or portion of, a working-fluid-flow channel with respect to the center of the immediately adjacent cross-section and/or geometry of the annular tube 247 about which the embodiment's working-fluid-flow channels are positioned, spirally-arrayed, and/or bounded. FIG. 51 also illustrates the operationally distinct angular regions which characterize, delineate, and/or determine, the conditions experienced by working fluid (not shown) flowing therethrough, as well as the behavior of the working fluid flowing therethrough. The illustration in FIG. 51 omits working-fluid-flow channel walls, and the therewithin discriminated working-fluid-flow channels. For the sake of clarity, the working-fluid flow patterns illustrated in FIG. 51 omit any component of working-fluid flow that is toroidal about the embodiment's shaft (244 in FIG. 44) and/or rotational axis, and/or parallel (in a circular fashion) to the circular center, and/or circular longitudinal axis, of the annular tube.

With respect to the orientation of the illustration in FIG. 51, working fluid (not shown) flowing, e.g., 306 and 307, within, and/or through, an embodiment (240 in FIG. 44) of the present disclosure, flows through a plurality of working-fluid-flow channels (the separating working-fluid-flow channel walls of which are omitted from FIG. 51), spirally arrayed around and/or about the underlying annular tube 247, with a component of working-fluid flow that is counterclockwise (with respect to the orientation of the illustration in FIG. 51), i.e., a component of working-fluid flow that flows from a radially innermost position, e.g., 325, across the innermost surface, and/or base, of the hot plate 241/255, e.g., 305, to a radially outermost position, e.g., 313, across the innermost surface, and/or top, of the cold plate 242/265, e.g., 319, and then back around to a radially inner position where begins another cycle of rotational flow.

When working fluid (not shown) flowing through a working-fluid-flow channel, i.e. with a component of working-fluid flow that is counterclockwise around and/or about the underlying annular tube 247, crosses and/or passes through a radial plane 303, thereby flowing out of working-fluid-flow-channel portion 304 and into working-fluid-flow-channel portion 305, it begins to experience a significant influx of thermal energy, and/or heat, and a significant rise in its temperature, as well as an expansion of its volume per unit mass of working fluid, as thermal energy, and/or heat, flows from the relatively thick portion 255 of the hot plate 241 into the working fluid through the thermal and physical connection of that working fluid to a lower, and/or innermost, surface of the hot plate. A radially innermost surface of the hot plate forms an outermost, and/or uppermost, bounding surface (i.e., a channel bounding surface opposite the outer surface of the underlying annular tube 247) of the plurality of working-fluid-flow channels flowing therethrough and/or thereby.

As the working fluid (not shown) flowing through portions of working-fluid-flow channels positioned within angular region 308, and/or flowing through working-fluid-flow channel portion 305, absorbs thermal energy and/or heat from hot plate 241, its temperature increases and it expands, thereby, and/or therefore, tending to flow, e.g., 306, away from the bounding radial plane 303 of that working-fluid-flow channel portion.

When working fluid (not shown) flowing through a working-fluid-flow channel crosses and/or passes through a radial plane 309, thereby flowing out of working-fluid-flow-channel portion 305 and into working-fluid-flow-channel portion 310, it continues, albeit at a lesser rate, to experience an influx of thermal energy, and/or heat, from the hot plate 241 to which it remains thermally and physically connected via the relatively thin extension 257 of the hot plate that bounds the outermost sides of the working-fluid-flow channels passing through angular region 311. A radially innermost surface of the relatively thin extension of the hot plate forms an outermost bounding surface of the plurality of working-fluid-flow channels flowing therethrough and/or thereby.

As the working fluid (not shown) flowing through portions of working-fluid-flow channels positioned within angular region 311, and/or flowing through working-fluid-flow-channel portion 310, continues to absorb thermal energy, and/or heat, from hot plate 241, its temperature continues to increase and it continues to expand, thereby, and/or therefore, continuing to flow in a counterclockwise direction around the exterior of the annular tube 247 (even as it flows annularly around the rotational axis and/or shaft, 244 in FIG. 48, of the embodiment) and away from the bounding radial plane 309 of that working-fluid-flow channel portion.

When working fluid (not shown) flowing through a working-fluid-flow channel crosses and/or passes through a radial plane 312, thereby flowing out of working-fluid-flow-channel portion 310 and into working-fluid-flow-channel portion 313, it tends to continue expanding. However, while flowing through this working-fluid-flow-channel portion there is no longer any influx of thermal energy, and/or heat, from the hot plate 241. In fact, this portion of a working-fluid-flow channel is completely insulated, thereby neither permitting an influx, nor an outflow, of thermal energy, and/or heat, relative to the working fluid. A radially innermost surface of the outer insulating coupler 243 forms an outermost bounding surface of the plurality of working-fluid-flow channels flowing therethrough and/or thereby. The continued expansion of the working fluid within this portion of a working-fluid-flow channel causes the pressure of the working fluid to decrease.

As the working fluid (not shown) flows through portions of working-fluid-flow channels positioned within angular region 314, and/or as the working fluid flows through working-fluid-flow-channel portion 313, it continues to expand even though this expansion is not accompanied by a change in the thermal energy, and/or heat, of the working fluid. Therefore, as the working fluid flows through working-fluid-flow-channel portion 313 its pressure decreases as it expands.

When working fluid (not shown) flowing through a working-fluid-flow channel crosses and/or passes through a radial plane 315, thereby flowing out of working-fluid-flow-channel portion 313 and into working-fluid-flow-channel portion 316, it begins to lose thermal energy, and/or heat, to a relatively thin extension 263 of the embodiment's cold plate 242, causing its temperature to decline, and causing its volume per unit working-fluid mass to decrease. A radially innermost surface of a relatively thin extension of the cold plate forms an outermost surface of the plurality of working-fluid-flow channels flowing therethrough and/or thereby.

As the working fluid (not shown) flowing through portions of working-fluid-flow channels positioned within angular region 317, and/or flowing through working-fluid-flow-channel portion 316, imparts and/or loses thermal energy, and/or heat, to the cold plate 242, its temperature decreases and it contracts, thereby, and/or therefore, tending to cause it to flow in a counterclockwise direction to replace the more extensive volumetric contractions of the working fluid further along in, and/or within relatively more flow-distant portions of, the respective working-fluid-flow-channel portions, i.e., in the working-fluid-flow-channel portions that have lost even more thermal energy and contracted to an even greater extent.

When working fluid (not shown) flowing through a working-fluid-flow channel crosses and/or passes through a radial plane 318, thereby flowing out of working-fluid-flow-channel portion 316 and into working-fluid-flow-channel portion 319, it continues losing thermal energy, and/or heat, to the cold plate 242. And, because it is now losing thermal energy, and/or heat, to the relatively thick portion 265 of the cold plate, the rate of that loss increases significantly. A radially innermost surface of the thick part of the cold plate forms a radially outermost surface of the plurality of working-fluid-flow channels flowing therethrough and/or thereby.

As the working fluid (not shown) flowing through portions of working-fluid-flow channels positioned within angular region 320, and/or flowing through working-fluid-flow-channel portion 319, loses, imparts, and/or yields, thermal energy, and/or heat, to the cold plate 242, its temperature decreases and it contracts, thereby, and/or therefore, tending to continue to flow, e.g., 307, away from the bounding radial plane 318 of that working-fluid-flow-channel portion and toward the working-fluid-flow-channel portion wherein the temperature reduction and the resulting contraction are greatest, e.g., being drawn 307 in a counterclockwise direction by the partial vacuum within more distant portions of the respective working-fluid-flow-channel portion, sector, and/or segment.

When working fluid (not shown) flowing through a working-fluid-flow channel crosses and/or passes through a radial plane 321, thereby flowing out of working-fluid-flow-channel portion 319 and into working-fluid-flow-channel portion 322, it continues to lose thermal energy, and/or heat, to the cold plate 242, although within working-fluid-flow-channel portion 322 the rate of loss is reduced. A radially innermost surface of a relatively thin extension 267 of the cold plate forms an outermost surface of the plurality of working-fluid-flow channels flowing therethrough and/or thereby. And, the reduced heat capacity, and/or rate of heat conduction, of the thin extension of the cold plate is incapable of absorbing thermal energy and/or heat from the working fluid at the same rate as is the thick portion 265 of the cold plate.

As the working fluid (not shown) flowing through portions of working-fluid-flow channels positioned within angular region 323, and/or flowing through working-fluid-flow-channel portion 322, imparts and/or loses thermal energy, and/or heat, to cold plate 242, its temperature continues to decrease and it continues to contract, thereby continuing to draw working fluid from the preceding fluid channel portion 319.

When working fluid (not shown) flowing through a working-fluid-flow channel crosses, and/or passes through, a radial plane 324, thereby flowing out of working-fluid-flow-channel portion 322 and into working-fluid-flow-channel portion 325, it is within a portion of working-fluid-flow channel that is fully insulated, so it neither acquires nor loses thermal energy, and/or heat, therein. A radially innermost surface of the inner insulating coupler 269 forms an outermost surface of the plurality of working-fluid-flow channels flowing therethrough and/or thereby.

As the working fluid (not shown) flowing through portions of working-fluid-flow channels positioned within angular region 326, and/or flowing through working-fluid-flow-channel portion 325, that working fluid is subjected to mechanical work imposed, and/or powered, by the rotation of the embodiment. This mechanical work of the embodiment on the cooled working fluid flowing within working-fluid-flow-channel portion 325 further compresses the working fluid, i.e., compressing working fluid already contracted by a loss of thermal energy, thereby further reducing its volume, and therefore further increasing its pressure.

When working fluid (not shown) flowing through a working-fluid-flow channel crosses and/or passes through a radial plane 327, thereby flowing out of working-fluid-flow-channel portion 325 and into working-fluid-flow-channel portion 304, it begins to absorb thermal energy, and/or heat, from a relatively thin extension 271 of the hot plate 241, which causes its temperature and its volume to increase. A radially innermost surface of the relatively thin extension of the hot plate forms an outermost surface of the plurality of working-fluid-flow channels flowing therethrough and/or thereby.

As the working fluid (not shown) flowing through portions of working-fluid-flow channels positioned within angular region 328, and/or flowing through working-fluid-flow-channel portion 304, absorbs thermal energy, and/or heat, from the relatively thin extension 271 of the hot plate 241, its temperature increases and it expands, thereby, and/or therefore, tending to flow away from the bounding radial plane 327 of that working-fluid-flow channel portion.

And, when working fluid (not shown) flowing through a working-fluid-flow channel crosses and/or passes through a radial plane 303, thereby flowing out of working-fluid-flow-channel portion 304 and into working-fluid-flow-channel portion 305, the cycle of thermal exchange, and thermally and mechanically driven flow, begins again, and/or continues, in a cyclical fashion.

When the hot plate 241 of the embodiment 240, is thermally connected to a thermal source, and/or to a source of heat, and cold plate 242 is thermally connected to a thermal sink, and/or to a source of cold, then working fluid within the plurality of working-fluid-flow channels flows in a first helical direction, e.g., 288-290 of FIG. 49, about the exterior of the embodiment's annular hollow tube 247, wherein the first helical direction of working fluid flow corresponds to a working fluid flow having a first circular, and/or tangential, direction of flow, i.e., a clockwise (with respect to the orientation of the illustration in FIG. 49) circular direction of flow about the embodiment's central shaft (244 in FIG. 40). The flow of working fluid through the embodiment's plurality of working-fluid-flow channels in the first helical direction of flow about the exterior of the embodiment's annular hollow tube, causes the embodiment to rotate in a second, and opposite, direction about the embodiment's central shaft.

However, if and/or when the hot plate 241 of the embodiment 240, is thermally connected to a thermal sink, and/or to a source of cold, and cold plate 242 is thermally connected to a thermal source, and/or to a source of heat, then working fluid within the plurality of working-fluid-flow channels flows in a second helical direction, opposite the first helical direction, about the exterior of the embodiment's annular hollow tube 247, wherein the second helical direction of working fluid flow corresponds to a working fluid flow having a second circular, and/or tangential, direction of flow, opposite the first circular direction of flow, i.e., a counter-clockwise (with respect to the orientation of the illustration in FIG. 49) circular direction of flow about the embodiment's central shaft (244 in FIG. 40). The flow of working fluid through the embodiment's plurality of working-fluid-flow channels in the second helical direction of flow about the exterior of the embodiment's annular hollow tube, causes the embodiment to rotate in the first, and opposite, direction about the embodiment's central shaft.

Thus, reversing the application of hot and cold to the embodiment 240 illustrated in FIGS. 40-51, a reversal in the direction in which the embodiment, and its shaft, rotate.

The varieties of embodiments, their geometries, their working fluids, their operations, and their applications, enumerated within the "Summary of the Invention" section of this disclosure apply to the embodiment illustrated and discussed in relation to FIGS. 40-51, and the scope of the present disclosure includes all such variations of the embodiment illustrated in FIGS. 40-51.

Disclosed in this specification, and in FIGS. 40-51, is a closed-cycle, externally-heated and externally-cooled heat engine, comprising: a plurality of closed-cycle, fluidly-disconnected helical fluid-flow channels, spirally arrayed about an annular tube, each said helical fluid-flow channel containing a working fluid; a central shaft extending from a lower side of the annular tube to an upper side and parallel to an axis of radial symmetry of the annular tube; a first thermally-conducting heat conduit at an upper side of the annular tube and thermally connected to an adjacent, upper isothermal heat-modification portion of each of the plurality of helical fluid-flow channels; a second thermally-conducting heat conduit at a lower side of the annular tube and thermally connected to an adjacent, lower isothermal heat-modification portion of each of the plurality of helical fluid-flow channels; a constriction within a vertically medial, and radially shaft-proximal, portion of each of the plurality of helical fluid-flow channels, each said constriction intermediating respective, and fluidly connected therethrough, upper and lower heat-modification portion of each respective helical fluid-flow channel; wherein the plurality of closed-cycle, fluidly-disconnected helical fluid-flow channels are configured such that a thermal connection of an external heat source to the first thermally-conducting heat conduit, and a thermal connection of an external heat sink to the second thermally-conducting heat conduit, will cause the central shaft to rotate in a first rotational direction; and, wherein the plurality of closed-cycle, fluidly-disconnected helical fluid-flow channels are configured such that a thermal connection of an external heat sink to the first thermally-conducting heat conduit, and a thermal connection of an external heat source to the second thermally-conducting heat conduit, will cause the central shaft to rotate in a second rotational direction, said second rotational direction being opposite the first rotational direction.

Figure 52:
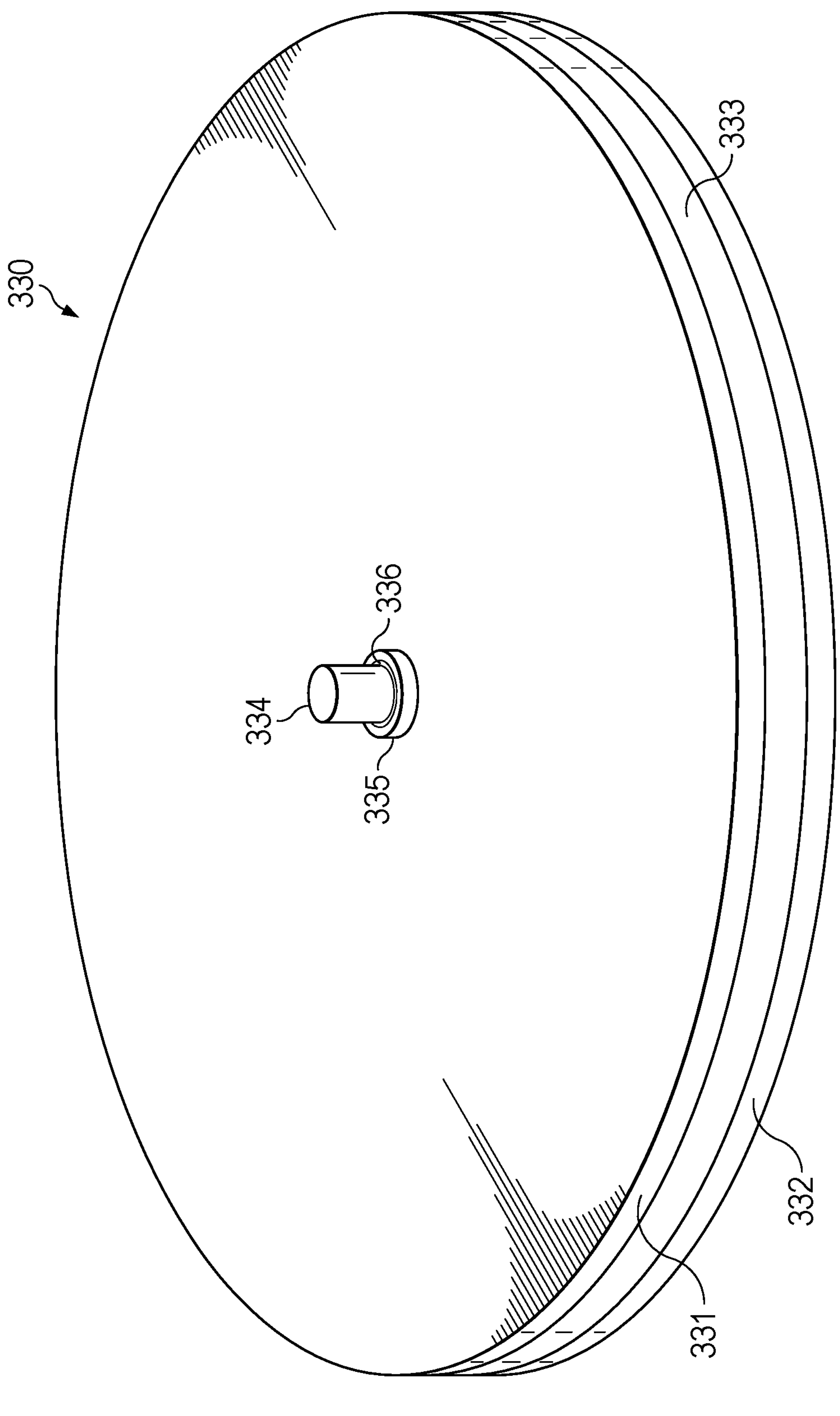
FIG. 52 shows a perspective side view of a sixth embodiment of the present invention.

FIG. 52 shows a perspective side view of an embodiment 330 of the present disclosure. Embodiment 330 incorporates, includes, utilizes, confines, entraps, and/or contains, a working fluid (not shown) constrained to flow within a single spiraling channel (not visible) positioned, and/or encased, within the embodiment. Working fluid flowing within a portion of the spiral channel receives thermal energy, and/or heat, from an upper hot plate 331, when that hot plate, in kind and/or similarly, receives thermal energy, and/or heat, from an external heat source (not shown). Working fluid flowing within another portion of the spiral channel tends to lose thermal energy, and/or to be chilled, and/or cooled, as a result of its contact with a lower cold plate 332, when that cold plate, in kind and/or similarly, is in thermal contact with a heat sink, a sink of thermal energy, and/or cold from an external source of cold (not shown). The upper hot plate is structurally connected and/or attached to the lower cold plate by an outer intermediate insulating coupler 333, and/or insulating connector, comprised of a thermally insulating and/or non-conductive material.

When its hot plate 331 is exposed to a source of thermal energy, and/or heat, and its cold plate 332 is exposed to a heat sink, and/or an absorber of thermal energy, and/or heat, working fluid (not shown) within the embodiment 330 tends to flow in a spiral fashion about the embodiment's axis of rotation (e.g., the axis of rotation being coaxial with an axis of shaft 334 radial symmetry) in a first rotational direction, which tends to cause the embodiment's casing 331-333 to rotate in a second, and opposite, rotational direction. As the embodiment rotates, so too does the fixedly attached shaft 334 which is coaxial with the embodiment's axis of rotation. An upper shaft-attachment collar 335, and/or cylindrical extrusion, of the embodiment's hot plate is attached to an insulating sleeve 336, which, in turn, is attached to the shaft 334. The insulating sleeve between the hot plate and the shaft insulates the shaft from the hot plate and inhibits, if not prevents, a conduction of thermal energy from the hot plate to the cold plate via the shaft.

Figure 53:
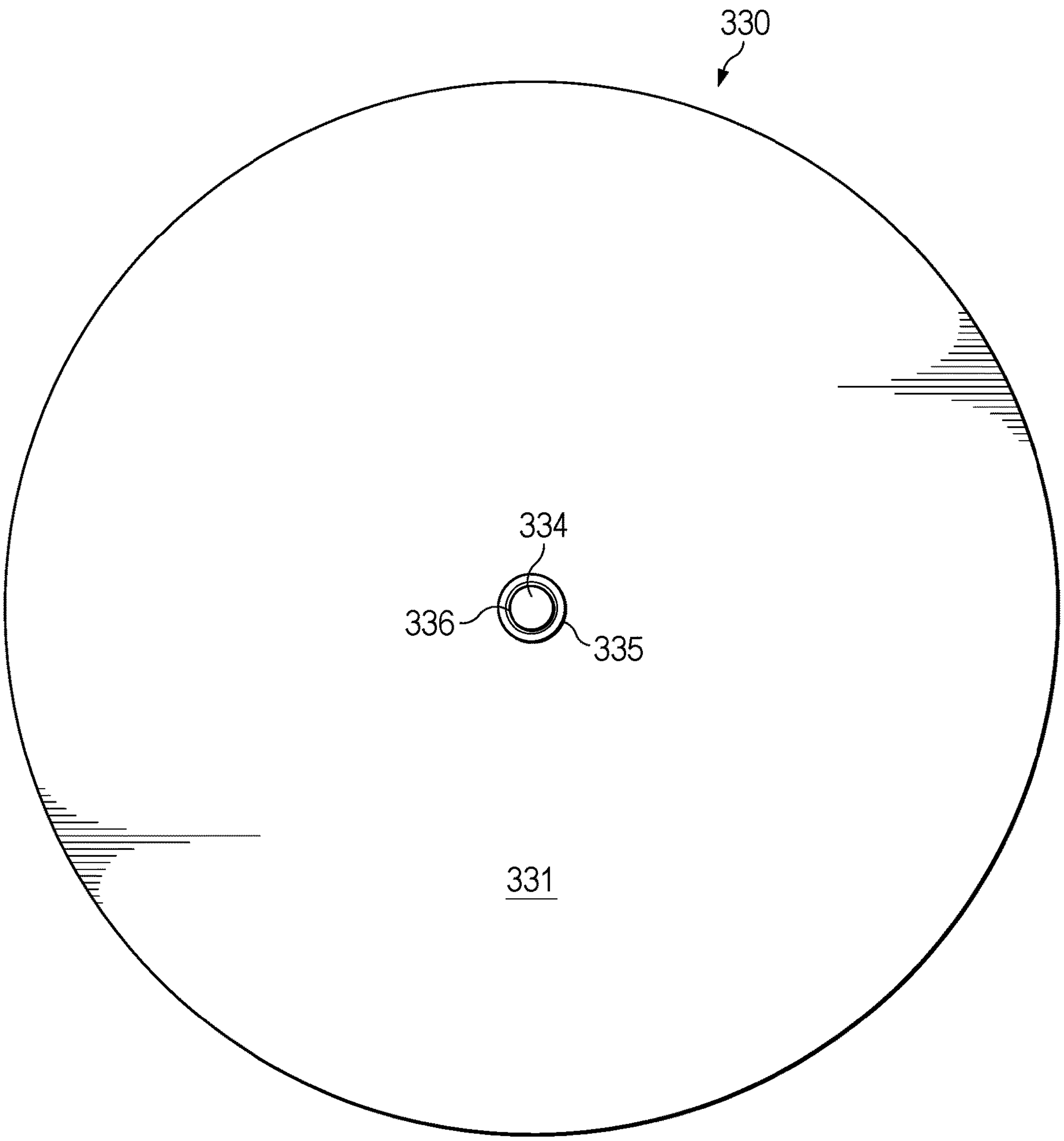
FIG. 53 shows a top-down view of the sixth embodiment of the present invention.

FIG. 53 shows a top-down view of the same embodiment 330 of the present disclosure that is illustrated in FIG. 52.

Figure 54:
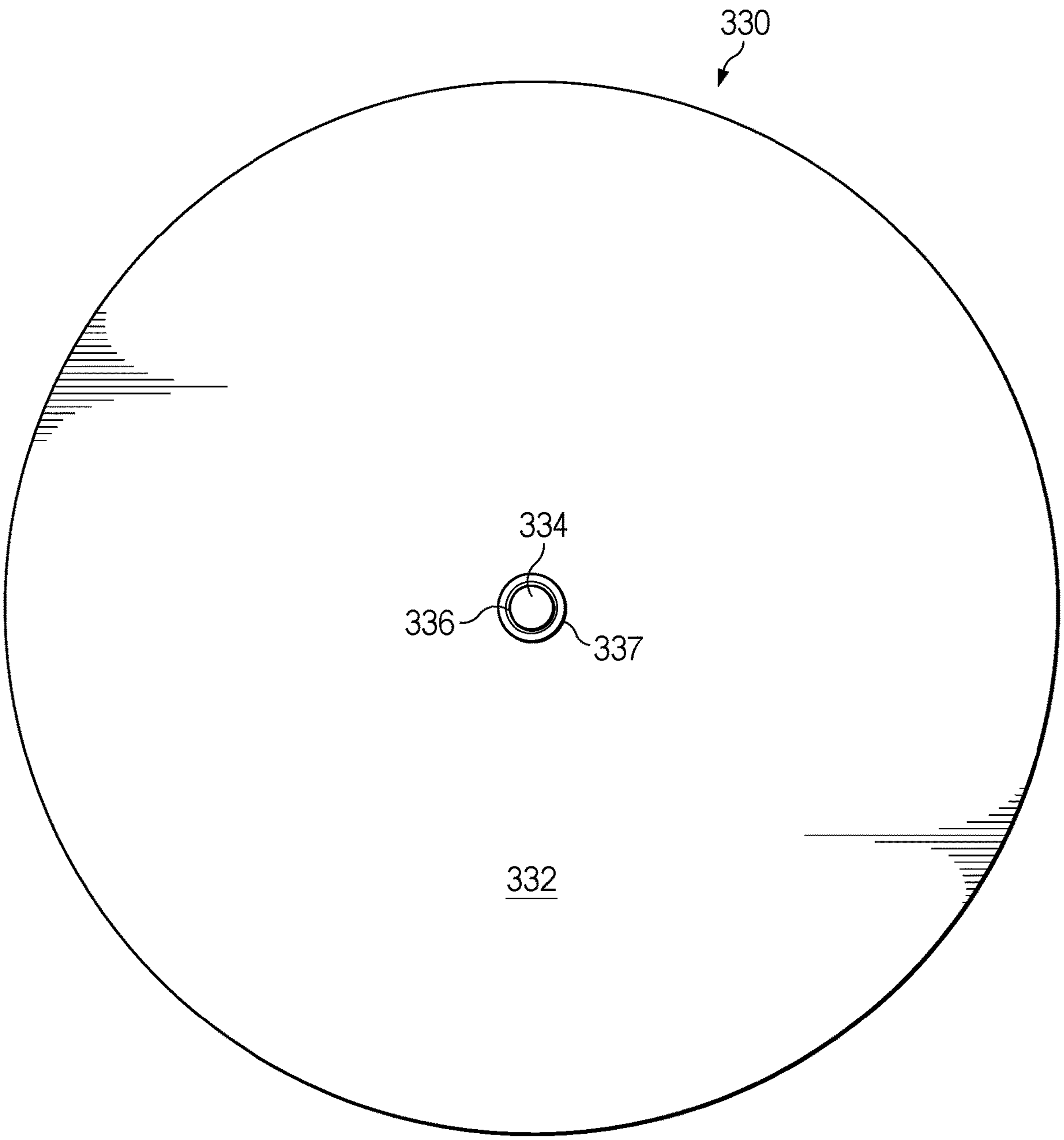
FIG. 54 shows a top-down view of the sixth embodiment of the present invention.

FIG. 54 shows a bottom-up view of the same embodiment 330 of the present disclosure that is illustrated in FIGS. 52 and 53.

As the embodiment 330 rotates, so too does fixedly attached shaft 334. A lower shaft-attachment collar 337, and/or cylindrical extrusion, of the cold plate 332, is attached to insulating sleeve 336, which, in turn, is attached to the shaft 334. The insulating sleeve 336 between the cold plate and the shaft insulates the shaft from the cold plate and inhibits, if not prevents, a conduction of thermal energy from the shaft into the cold plate via the shaft.

Figure 55:
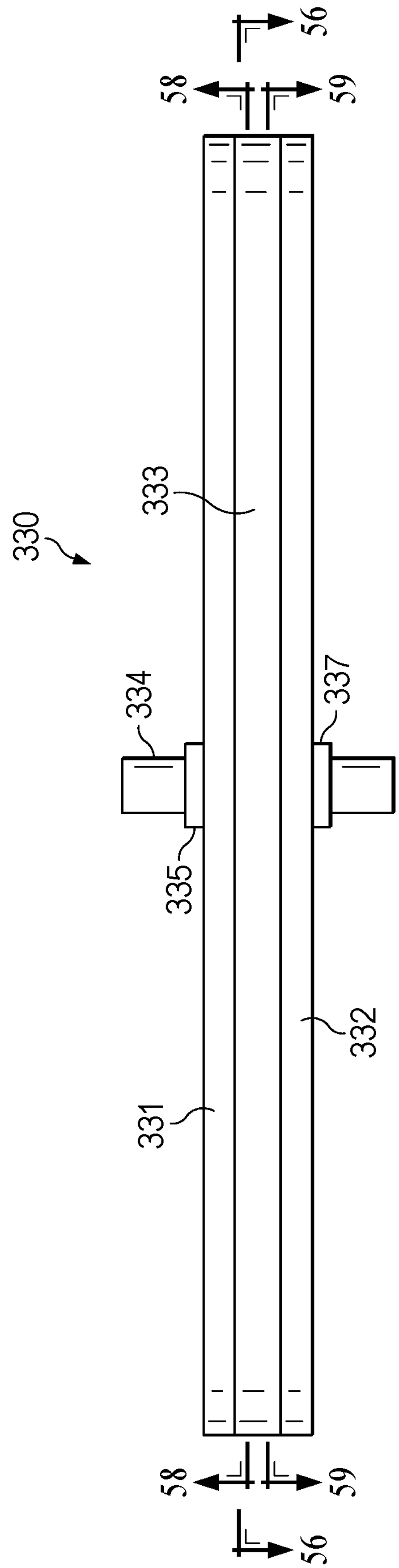
FIG. 55 shows a side view of the sixth embodiment of the present invention.

FIG. 55 shows a side view of the same embodiment 330 of the present disclosure that is illustrated in FIGS. 52-54.

Figure 56:
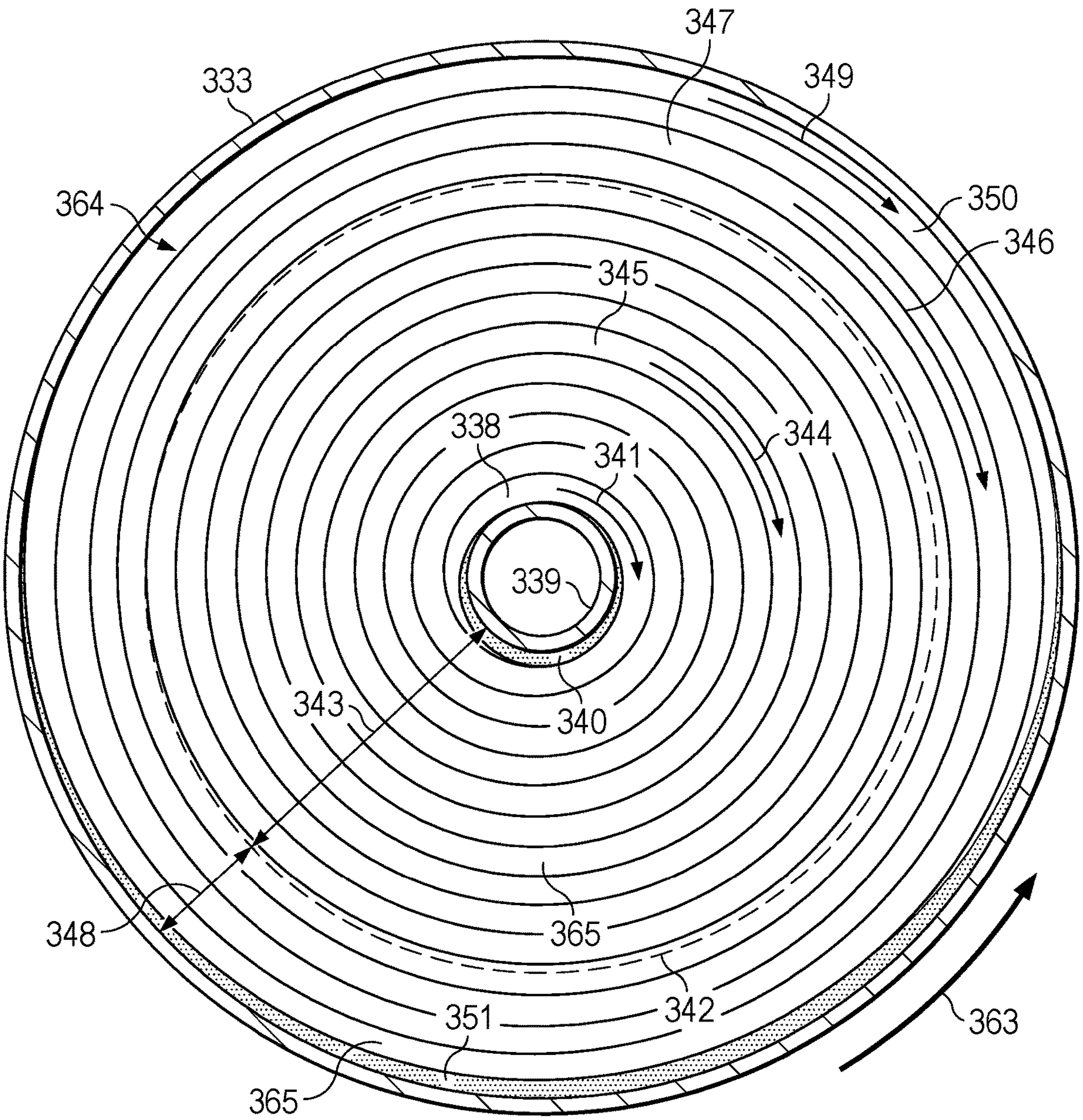
FIG. 56 shows a graphic illustration that explains the operation of the sixth embodiment of the present invention.

FIG. 56 shows a graphic illustration, incorporating symbolic elements, that is provided to explain the operation of the same embodiment 330 of the present disclosure that is illustrated in FIGS. 52-55. The illustration provided in FIG. 56 is not intended to be a feature-complete cross-sectional view of the embodiment. However, the illustration in FIG. 56 is based on, and/or corresponds to, a top-down cross-sectional view of the embodiment corresponding to a horizontal section of the embodiment 330 wherein the horizontal section plane is specified in FIG. 55 and taken across line 56-56.

An upper portion of the embodiment's single spiral fluid channel, i.e. the portion viewable within FIG. 56, is radially, and/or laterally, bounded by an inner insulating cylindrical wall 339 and an outer insulating cylindrical wall 333. The spiral fluid channel is similarly comprised of insulated, insulating, and/or thermally non-conductive, lateral, and/or approximately tangential, fluid-channel walls, e.g., 364, as well as an insulated, insulating, and/or thermally non-conductive, medial disk 365 an upper surface of which comprises a bottom fluid-channel wall.

Working fluid (not shown) flows into a radially-innermost portion 338 of the upper fluid channel from and/or through an innermost vertical fluid conduit 340 which fluidly connects the lower and upper portions of the embodiment's spiral fluid channel. Upon entering, and/or flowing up and into, the radially-innermost portion 338 of the upper spiral fluid channel, the working fluid flows 341 away from the center of the embodiment in a first, and/or clockwise, rotational direction (with respect to the top-down view, and/or orientation, of the illustration in FIG. 56) through the upper spiral fluid channel.

From the time the working fluid flows, e.g., 341, into the radially-innermost portion 338 of the upper spiral fluid channel, and until the time it flows beyond the outermost radial extent and/or edge (represented, and/or denoted, symbolically by dashed line 342) of the embodiment's hot plate (331 in FIGS. 52, 53, and 55), i.e. while the working fluid flows within the isothermal expansion portion 343 of the embodiment's spiral fluid channel, the working fluid absorbs thermal energy, and/or heat, from the hot plate, which is positioned immediately above that portion (343) of the spiral fluid channel, and to which hot plate the working fluid flowing therein, and/or therethrough, is fluidly and thermally connected. The hot plate (which comprises an upper wall of, and/or an upper surface within, the isothermal expansion portion 343 of the embodiment's fluid channel, is in thermal and fluid contact with working fluid flowing through that portion of the embodiment's fluid channel.

As the working fluid (not shown) flows, e.g., 344, through and/or within the isothermal expansion portion 343 of the embodiment's spiral fluid channel, e.g., within spiral-fluid-channel portion 345, it absorbs thermal energy and/or heat from the hot plate (331 in FIGS. 52, 53, and which adjoins, and/or in part comprises, an upper surface of that channel. And, as the working fluid flowing therethrough absorbs thermal energy, and/or heat, it warms and expands, causing it to flow ever more rapidly through the spiral fluid channel, and flow away from the innermost vertical fluid conduit 340, and flow toward an outermost vertical fluid conduit 351. As the working fluid flows in response to an increase in its temperature, and its consequent thermally-induced expansion, the embodiment tends to rotate 363 in a second, and opposite, i.e. counterclockwise, rotational direction (with respect to the top-down orientation of the illustration in FIG. 56).

After the working fluid (not shown) flows, e.g., 346, into a portion, e.g., 347, of the spiral fluid channel that is radially beyond, and/or outside, the radial extent, e.g., 342, of the hot plate (331 in FIGS. 52, 53, and 55) above, it enters an adiabatic expansion portion 348 of the spiral fluid channel. Within this portion of the embodiment's spiral fluid channel, working fluid tends to continue expanding, however, it does so without a continued absorption of, and/or increase in, thermal energy, and/or heat. Thus, the continued expansion of the working fluid within the adiabatic expansion portion 348 of the spiral fluid channel tends to cause the pressure of the working fluid flowing therein to decrease.

Eventually, the working fluid (not shown) flows, e.g., 349, into an outermost portion 350 of the upper portion of the embodiment's spiral fluid channel. And, from there it begins flowing out of the outermost portion 350 of the upper portion of the embodiment's spiral fluid channel, and flowing down and into an outermost vertical fluid conduit 351 fluidly connecting the upper and lower portions of the embodiment's spiral fluid channel. After flowing into the outermost vertical fluid conduit, the working fluid then flows into the lower portion (not visible) of the embodiment's spiral fluid channel. And, after flowing through that lower portion (not visible) of the embodiment's spiral fluid channel, the working fluid again flows up and out from the embodiment's innermost vertical fluid conduit 340 to again flow through the upper fluid channel. This pattern of flow through the fluidly-connected upper and lower spiral fluid channels continues as long as the embodiment's hot plate (331 in FIGS. 52, 53, and 55) is sufficiently, and/or appropriately, warm, and the embodiment's cold plate (332 in FIGS. 52, 54, and 55) is sufficiently, and/or appropriately, cool.

Figure 57:
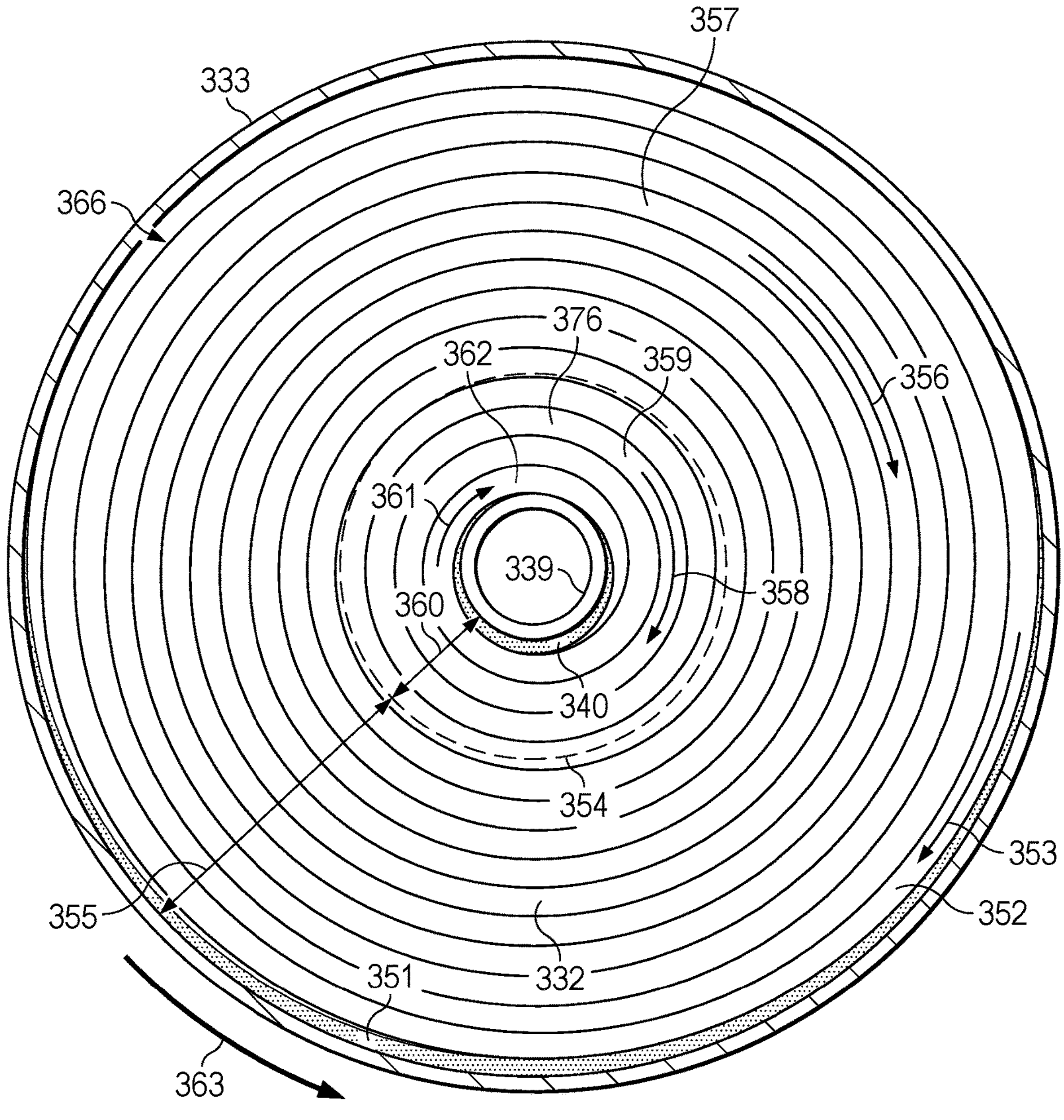
FIG. 57 shows another graphic illustration that explains the operation of the sixth embodiment of the present invention.

FIG. 57 incorporates symbolic elements that are provided to explain the operation of the same embodiment 330 of the present disclosure that is illustrated in FIGS. 52-56. The illustration provided in FIG. 57 is not intended to be a feature-complete cross-sectional view of the embodiment. However, the illustration is based on, and/or corresponds to, a top-down cross-sectional view corresponding to a horizontal section of the embodiment 330 wherein the horizontal section plane is specified in FIG. 55 and taken across line 59-59. The section plane of FIG. 57 is positioned immediately below the thermally non-conductive medial disk (365 in FIG. 56).

FIG. 57 shows a graphic illustration similar to the graphic illustration presented in FIG. 56. While FIG. 56 illustrates an upper portion of the embodiment's 330 spiral fluid channel (from a top-down perspective), FIG. 57 illustrates the complementary lower portion of that spiral fluid channel (also from a top-down perspective). Working fluid (not shown) flowing out of the upper portion of the embodiment's single spiral fluid channel, and thereafter flowing down into and through the outermost vertical fluid conduit 351, which fluidly connects the upper and lower portions of the embodiment's spiral fluid channel), thereafter flows into and through the lower portion of that spiral fluid channel until it flows out of the lower portion of the spiral fluid channel, and into, and through, the innermost vertical fluid conduit 340 therethrough returning to the upper spiral fluid channel.

A lower portion of the embodiment's single spiral fluid channel, i.e. the portion viewable within FIG. 57, is radially, and/or laterally, bounded by the inner insulating cylindrical wall 339 and the outer insulating cylindrical wall 333. These are the same inner and outer insulating cylindrical walls which radially, and/or laterally, bound the upper portion of the embodiment's single spiral fluid channel. The lower portion of the spiral fluid channel is similarly comprised of insulated, insulating, and/or thermally non-conductive, lateral, and/or tangential, fluid-channel walls, e.g., 366, as well as by an insulated, insulating, and/or thermally non-conductive, medial disk (not visible above the section plane, 365 in FIG. 56) a lower surface of which comprises an upper channel wall of the lower spiral fluid channel. The medial disk is positioned between, and vertically separates, the upper and lower portions of the embodiment's spiral fluid channel. The lower channel walls, and/or surfaces, bounding the lower spiral fluid channels are comprised of the cold plate (332 in FIGS. 52, 54, and 55) within the isothermal contraction portion 355 of the embodiment's spiral fluid channel, and a lower annular insulated, insulating, and/or thermally non-conductive, plate 376 within the adiabatic compression portion 360 of the embodiment's spiral fluid channel.

Working fluid (not shown) flows 353 into a radially-outermost portion 352 of the lower spiral fluid channel from and/or through the outermost vertical fluid conduit 351 that fluidly connects the upper and lower portions of the embodiment's spiral fluid channel. Upon entering, and/or flowing down and into, the radially-outermost portion 352 of the lower spiral fluid channel, the working fluid flows 353 away from the periphery of the embodiment, and toward the center (i.e., toward the inner insulating cylindrical wall 339), in the same first, and/or clockwise, rotational direction (with respect to the orientation of the illustration in FIG. 57) through the lower spiral fluid channel as characterizes the working fluid flow through the upper spiral fluid channel.

From the time the working fluid flows, e.g., 353, into the radially-outermost portion 352 of the lower spiral fluid channel, until the time it flows radially beyond the innermost radial extent, and/or edge (represented, and/or denoted, symbolically by dashed line 354), of the embodiment's cold plate (332 in FIGS. 52, 54, and 55), i.e. while the working fluid flows within the isothermal contraction portion 355 of the embodiment's spiral fluid channel, the working fluid imparts, yields, and/or transfers, a portion of its thermal energy, and/or heat, to the cold plate positioned immediately below that portion of the spiral fluid channel to which it is fluidly and thermally connected. The cold plate (which comprises a lower wall of, and/or a lower surface within, the isothermal contraction portion 355 of the embodiment's spiral fluid channel) is in thermal and fluid contact with the working fluid flowing through that isothermal contraction portion of the embodiment's spiral fluid channel.

As the working fluid (not shown) flows, e.g., 356, through, and/or within, the isothermal contraction portion 355 of the embodiment's spiral fluid channel, e.g., within fluid channel portion 357, it imparts, yields, and/or transfers, a portion of its thermal energy, and/or heat, to the cold plate (332 in FIGS. 52, 54, and 55). And, as it loses thermal energy, and/or heat, to the cold plate, it cools and contracts. The contraction, and/or partial-vacuum, driven flow of the working fluid within the isothermal contraction portion 355 of the embodiment's spiral fluid channel, contributes to the rotation of the embodiment in the second rotational direction, i.e. counterclockwise (with respect to the orientation of the illustration in FIG. 57), opposite that of the flow of the contracting working fluid (which flows in the first, and/or clockwise rotational direction).

After the working fluid (not shown) flows, e.g., 358, into a portion, e.g., 359, of the spiral fluid channel that is radially inside the radial extent, e.g., 354, of the cold plate (332 in FIGS. 52, 54, and 55) below, it enters an adiabatic compression portion 360 of the spiral fluid channel. Within this portion of the embodiment's spiral fluid channel, the working fluid tends to continue contracting, however, it does so without a continued loss of thermal energy, and/or heat. The continued contraction, and/or compression, of the working fluid within the adiabatic compression portion 360 of the spiral fluid channel is driven by the counterclockwise rotation of the embodiment, and the resulting mechanical work done on, i.e., the resulting mechanical compression of, the working fluid caused by the counterclockwise-rotations of the lower portion of the spiral fluid channel (e.g., by the lateral walls of that lower spiral channel) of the embodiment. The continued contraction, and/or compression, of the working fluid within the adiabatic compression portion 360 of the spiral fluid channel tends to cause an increase in the pressure of the working fluid therein as it is compressed.

Eventually, the working fluid (not shown) flows, e.g., 361, into an innermost portion 362 of the lower portion of the embodiment's spiral fluid channel. And, from there, the working fluid begins flowing out of the innermost portion 362 of the lower portion of the embodiment's spiral fluid channel, and into and up the innermost vertical fluid conduit 340 that fluidly connects the upper and lower portions of the embodiment's spiral fluid channel. After flowing into and through the innermost vertical fluid conduit, the working fluid flows into and through the upper portion (not visible) of the embodiment's spiral fluid channel. And, after flowing through that upper portion (not visible) of the embodiment's spiral fluid channel, the working fluid again flows out of that upper portion of the embodiment's spiral fluid channel, and into, and down through, the embodiment's outermost vertical fluid conduit 351 to therethrough return to the lower portion of the embodiment's spiral fluid channel wherefrom it continues its cyclical spiral flow within and/or throughout the embodiment.

Figure 58:
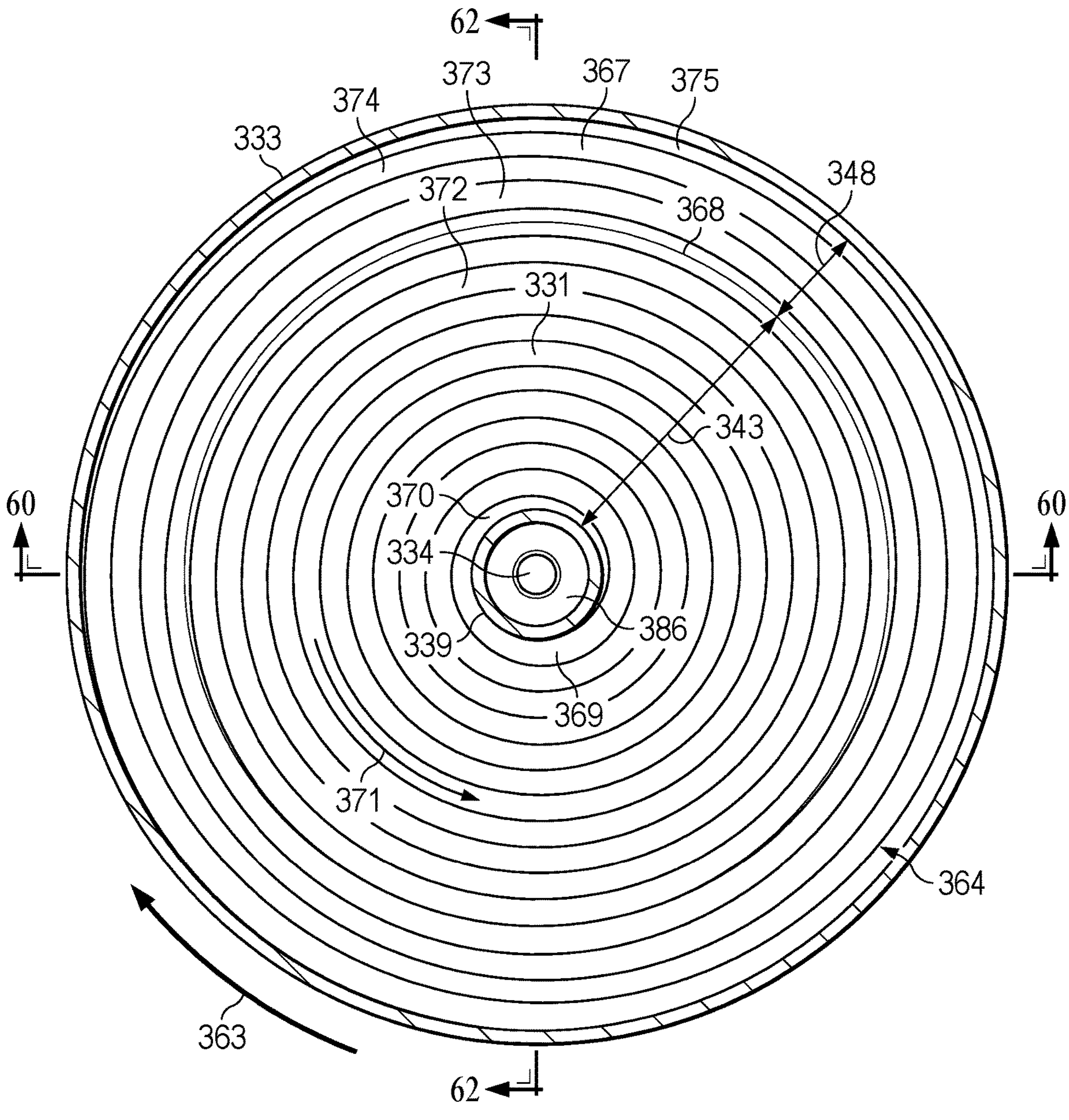
FIG. 58 shows a bottom-up sectional view of the sixth embodiment of the present invention.

FIG. 58 shows a bottom-up sectional view of the same embodiment 330 of the present disclosure that is illustrated in FIGS. 52-57 wherein the horizontal section plane is specified in FIG. 55 and the section is taken across line 58-58. The section plane of FIG. 58 is positioned immediately above the thermally non-conductive medial disk (365 in FIG. 56).

Visible above the section plane, and therefore within of the sectional view of FIG. 58, is the annular underside, and/or portion, of the embodiment's 330 hot plate 331 which is fluidly and thermally connected to an interior of the embodiment's isothermal expansion portion 343 of the upper portion of its single spiral fluid channel. Also visible within FIG. 58, and adjacent to the hot plate, is an upper annular thermally non-conductive plate 367 made of, and/or comprising, an insulated, insulating, and/or thermally non-conductive, material. A lower surface of the upper annular insulated, insulating, and/or thermally non-conductive, plate replaces a lower surface of the hot plate as an uppermost fluid channel wall within the embodiment's adiabatic expansion portion 348 thereby preventing a continued influx of thermal energy, and/or heat, to, and/or into, the working fluid flowing therethrough. A seam 368, joint, junction, union, and/or abutment, delineates the radial, and/or lateral, separation of the hot plate 331 from the upper annular insulated, insulating, and/or thermally non-conductive, plate 367.

Positioned between the shaft 334 and the inner insulating cylindrical wall 339, and approximately co-planar with the upper annular thermally non-conductive plate 367, is an upper insulated, insulating, and/or thermally non-conductive, disk 386 which prevents an influx, and/or inflow, of thermal energy, and/or heat, from the hot plate 331 into the annular gas-filled space surrounding the shaft, and laterally, and/or radially, separating the shaft from the approximately coaxial inner insulating cylindrical wall 339. Insulation provided by the lower annular thermally non-conductive plate 376 prevents an outflow of thermal energy and/or heat to the cold plate from the annular gas-filled space surrounding the shaft, and laterally, and/or radially, separating the shaft from the approximately coaxial inner insulating cylindrical wall.

The innermost (340 in FIG. 56) and the outermost (351 in FIG. 56) vertical fluid conduits are not visible in FIG. 58 since they are positioned below the section plane, and outside of the sectional view. However, working fluid (not shown) enters the upper spiral fluid channel, e.g., 369, through the innermost vertical fluid conduit, which, though not visible in FIG. 58, is positioned approximately adjacent to, and below (i.e. positioned in front of the section plane, and outside of the sectional view), the fluid channel location 370 (see 340 in FIG. 56).

As the working fluid (not shown) flows, e.g., 371, through the isothermal expansion portion 343, e.g., spiral fluid channel at 372, of the upper spiral fluid channel which is that portion of the spiral fluid channel below, and/or adjacent to, the hot plate 331, it absorbs thermal energy, and/or heat, from the hot plate, via the lower surface of that hot plate, which is fluidly and thermally connected to the working fluid within vertically adjacent portions of the isothermal expansion portion 343 of the upper portion of the spiral fluid channel. And, as the working fluid flowing, e.g., 371, through the isothermal expansion portion of the upper portion of the spiral fluid channel absorbs thermal energy, and/or heat, from the hot plate, the temperature and volume of the working fluid increase, thereby causing it to flow away from the embodiment's center, e.g., away from the inner insulating cylindrical wall 339, and toward the periphery of the embodiment, e.g., toward the outer insulating cylindrical wall 333. And, as the working fluid flows, e.g., 371, in a first, and/or counterclockwise, rotational direction (with respect to the orientation of the illustration in FIG. 58), the structural portion of the embodiment, e.g., the lateral walls of the upper portion of the spiral fluid channel, and its attached shaft, rotate 363 in a second and opposite, and/or clockwise, rotational direction (with respect to the orientation of the illustration in FIG. 58).

When the working fluid (not shown) flows past the seam 368, joint, junction, union, and/or abutment, delineating the radial separation of the hot plate 331 from the upper annular insulated, insulating, and/or thermally non-conductive, plate 367, it then flows beneath, and/or adjacent to, the upper annular thermally non-conductive plate, and/or flows within the adiabatic expansion portion 348 of the upper portion of the embodiment's spiral fluid channel. While flowing beneath, under, and/or adjacent to, the upper annular thermally non-conductive plate 367, e.g., in spiral fluid channel portion 373, the working fluid no longer receives additional thermal energy and/or heat as it continues to expand. Despite the cessation of the influx of thermal energy, and/or heat, to, and/or into, the working fluid as it flows within the adiabatic expansion portion 348 of the embodiment's spiral fluid channel, the working fluid tends to continue expanding thus tending to cause its pressure to decrease.

After flowing through the last integral portion, e.g., 374, of the spiral fluid channel positioned within the adiabatic expansion portion 348 of the embodiment's spiral fluid channel, the working fluid (not shown) flows into a portion of the spiral fluid channel fluidly connected to the outermost vertical fluid conduit, which, though not visible in FIG. 58, is positioned approximately vertically adjacent to, and below (i.e. positioned in front of the section plane, and outside of the sectional view), the fluid channel location 375 (see 351 in FIG. 56).

Working fluid (not shown) that flows from the adiabatic expansion portion 348 of the upper spiral fluid channel and into the outermost vertical fluid conduit (not visible in FIG. 58 due to its position below the section plane, and therefore outside of the sectional view) therefrom flows into the isothermal contraction portion (not visible, see 355 in FIG. 57) of the lower spiral fluid channel. And, continuing the cyclic flow of working fluid throughout the embodiment 330, working fluid that flows from the isothermal contraction portion of the lower spiral fluid channel, thereafter flows into the adiabatic compression portion (not visible, see 360 in FIG. 57) of the lower spiral fluid channel, and thereafter flows from that adiabatic compression portion of the lower spiral fluid channel and into the innermost vertical fluid conduit (not visible) from where it flows into the isothermal expansion portion 343 of the upper spiral fluid channel, thereby completing another thermally-driven cycle of working fluid flow.

Figure 59:
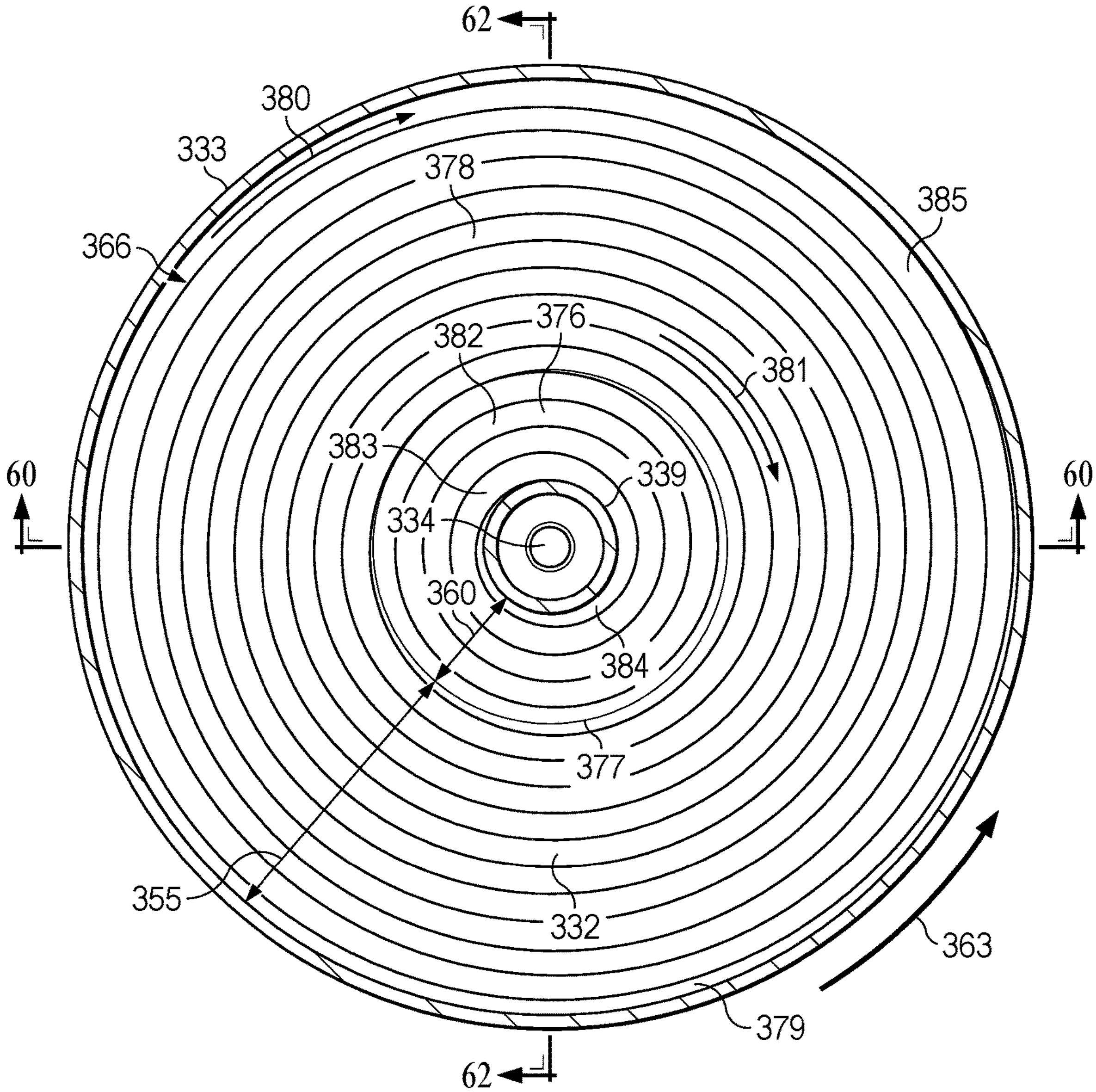
FIG. 59 shows a top-down sectional view of the sixth embodiment of the present invention.

FIG. 59 shows a top-down sectional view of the same embodiment 330 of the present disclosure that is illustrated in FIGS. 52-58 wherein the horizontal section plane is specified in FIG. 55 and the section is taken across line 59-59. Unlike the graphically modified bottom-up cross-sectional illustration of FIG. 56, the cross-sectional view of FIG. 59 is top-down in which orientation the directions of flow and rotation are reversed relative to those illustrated in FIG. 56. The section plane of FIG. 59 is positioned immediately below the thermally non-conductive medial disk (365 in FIG. 56).

An annular portion of the embodiment's 330 cold plate 332 is fluidly and thermally connected to an interior of the embodiment's isothermal contraction portion 355 within the lower portion of the embodiment's single fluid channel. Radially adjacent to the cold plate is a lower annular thermally non-conductive plate 376 made of, and/or comprising, an insulated, insulating, and/or thermally non-conductive, material. An upper surface of the lower annular insulated, insulating, and/or thermally non-conductive, plate replaces an upper surface of the cold plate within the embodiment's adiabatic compression portion 360 thereby preventing a continued outflow, and/or loss, of thermal energy, and/or heat, from the working fluid therein. A seam 377, joint, junction, union, and/or abutment, delineates the radial, and/or lateral, separation of the cold plate 332 from the lower annular insulated, insulating, and/or thermally non-conductive, plate 376.

The innermost (340 in FIG. 56) and the outermost (351 in FIG. 56) vertical fluid conduits are not visible in FIG. 59 since they are positioned above the section plane and are therefore outside of the sectional view. However, working fluid (not shown) enters the lower fluid channel, e.g., 378, through the outermost vertical fluid conduit, which, though not visible in FIG. 59, is positioned approximately vertically adjacent to, and above (i.e. above the section plane, and therefore outside of the sectional view), the fluid channel location 379 (see 351 in FIG. 56).

As the working fluid (not shown) flows, e.g., 380, into and through the isothermal contraction portion 355, e.g., spiral fluid channel at 385, of the lower spiral fluid channel which is that portion of the spiral fluid channel above, and/or vertically adjacent to, the cold plate 332, it imparts, yields, and/or transfers, a portion of its thermal energy, and/or heat, to the cold plate, via an upper surface of that cold plate which is fluidly and thermally connected to the working fluid within vertically adjacent portions of the isothermal contraction portion 355 of the spiral fluid channel. And, as the working fluid flowing, e.g., 381, through the isothermal contraction portion of the spiral fluid channel imparts, yields, and/or transfers, a portion of its thermal energy, and/or heat, to the cold plate, the temperature and volume of the working fluid decrease, thereby causing the contracting working fluid to pull working fluid toward the embodiment's center, e.g., toward the inner insulating cylindrical wall 339, and away from the periphery of the embodiment, e.g., away from the outer insulating cylindrical wall 333. And, as the working fluid flows, e.g., 381, in a first, and/or clockwise (with respect to the top-down perspective, and/or orientation, of the illustration in FIG. 59), rotational direction, the structural portion of the embodiment, and its attached shaft 334, rotate 363 in a second and opposite, and/or counterclockwise (with respect to the top-down perspective, and/or orientation, of the illustration in FIG. 59), rotational direction.

When, while flowing along a spiral path through the isothermal contraction portion 355 of the lower spiral fluid channel toward the center of the embodiment, the working fluid (not shown) flows past the seam 377, joint, junction, union, and/or abutment, which delineates the radial separation of the cold plate 332 from the lower annular insulated, insulating, and/or thermally non-conductive, plate 376. After flowing past the seam 377, the working fluid then flows above, and/or vertically adjacent to, the lower annular thermally non-conductive plate, and/or flows within the adiabatic compression portion 360 of the embodiment's spiral fluid channel. While flowing above, over, and/or vertically adjacent to, the lower annular thermally non-conductive, plate 376, e.g., in fluid channel portion 382, the working fluid no longer loses additional thermal energy, and/or heat, to the cold plate. Despite the cessation of the outflow of thermal energy, and/or heat, from the working fluid to the cold plate as the working fluid flows within the adiabatic compression portion 360 of the embodiment's spiral fluid channel, the working fluid tends to continue contracting, and/or tends to be mechanically compressed, as a result of the work performed upon it by the rotation 363 of the embodiment, thus tending to cause its pressure to increase.

After flowing through the last integral portion, e.g., 383, of the spiral fluid channel positioned within the adiabatic compression portion 360 of the embodiment's spiral fluid channel, the working fluid (not shown) flows into a portion of the spiral fluid channel fluidly connected to the innermost vertical fluid conduit (340 in FIG. 57), which, though not visible in FIG. 59, is positioned approximately vertically adjacent to, and above (i.e., in front of the section plane and therefore outside the sectional view) the fluid channel location 384 (see 340 in FIG. 56).

Working fluid (not shown) that flows from the adiabatic compression portion 360 of the lower spiral fluid channel, and into the innermost vertical fluid conduit (not visible above the section plane, see 340 in FIG. 57) therefrom flows into the isothermal expansion portion (not visible, see 343 in FIGS. 56 and 58) of the upper spiral fluid channel. And, continuing the cyclic flow of working fluid through, and/or throughout, the embodiment 330, working fluid that flows from the isothermal expansion portion of the upper spiral fluid channel, thereafter flows into the adiabatic expansion portion (not visible, see 348 in FIGS. 56 and 58) of the upper spiral fluid channel, and thereafter flows from that adiabatic expansion portion of the upper spiral fluid channel and into the outermost vertical fluid conduit (not visible, see 351 in FIG. 57) from where it flows down and into the isothermal contraction portion 355 of the lower spiral fluid channel, thereby completing another thermally-driven cycle of working fluid flow.

Figure 60:
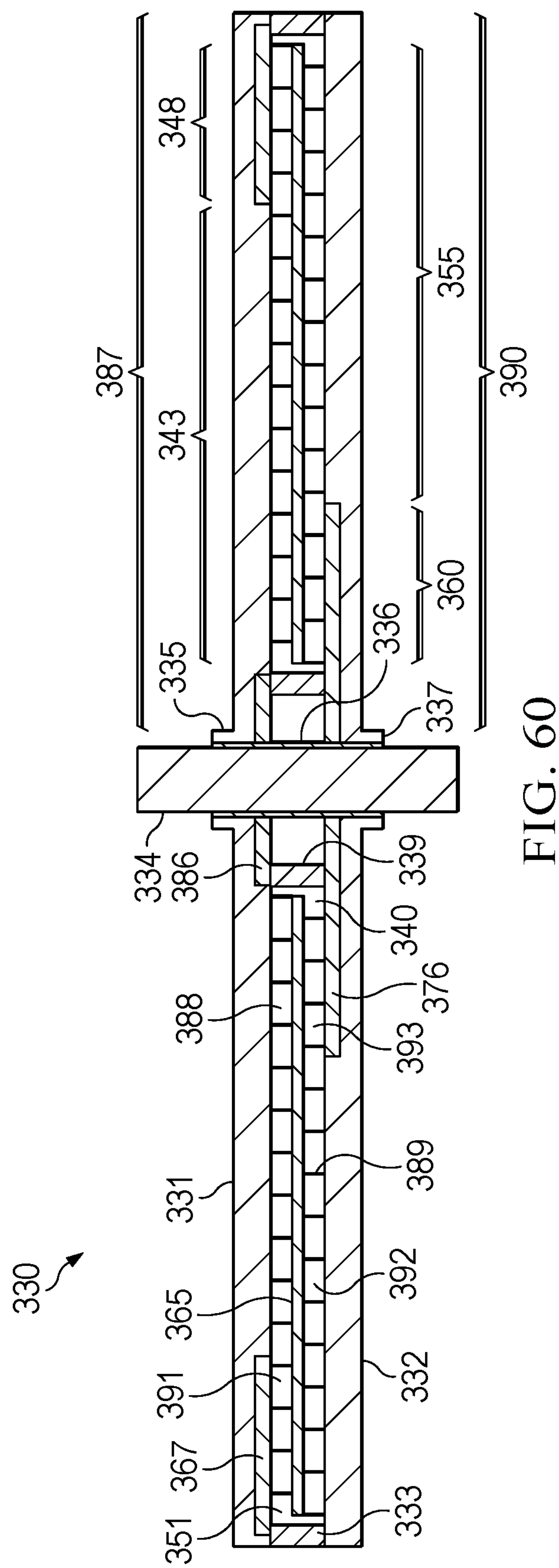
FIG. 60 shows a side sectional view of the sixth embodiment of the present invention.

FIG. 60 shows a side sectional view of the same embodiment 330 of the present disclosure that is illustrated in FIGS. 52-59 wherein the vertical section plane is specified in FIG. 53 and the section is taken across line 60-60.

An upper hot plate 331 absorbs thermal energy, and/or heat, from an external source of thermal energy, and/or heat (not shown). The hot plate is able to absorb thermal energy, and/or heat, from an external source over a relatively large radial extent 387, and over a correspondingly relatively large thermal absorption surface area. The thermal energy, and/or heat, absorbed by the hot plate is conducted, transmitted, and/or imparted, to a working fluid (not shown) within an isothermal expansion portion (343 in FIGS. 56 and 58) of the embodiment's spiral fluid channels, e.g., 388, which is positioned and/or lies within the fluid-conducting gap, e.g., 388, between a lower surface of the upper hot plate 343 and the medial thermally non-conductive disk 365.

Working fluid (not shown) absorbs thermal energy, and/or heat, from the hot plate 331 through, and/or by means of, a lower thermal conduction surface of the hot plate, said conduction surface being in thermal and fluid connection with the working fluid flowing thereunder. The lower thermal conduction surface of the hot plate has a relatively smaller annular and/or radial extent 343 than does the hot plate's upper thermal absorption surface area.

The fluid-channel walls, e.g., 389, which separate adjacent spiral fluid channels from one another are made of an insulated, insulating, and/or thermally non-conductive, material and do not transmit, conduct, and/or transfer, thermal energy and/or heat between working fluids, e.g., of differing temperatures, flowing on either side of a spiral-fluid-channel wall.

After flowing through and/or past the spiral fluid channels of the embodiment's isothermal expansion portion (343 in FIGS. 56 and 58), working fluid (not shown) flows into and through the embodiment's adiabatic expansion portion (348 in FIGS. 56 and 58). The portion of the embodiment's spiral fluid channel positioned within, and/or passing through, the adiabatic expansion portion of the embodiment's spiral fluid channel, e.g., 391, is bounded above by an upper annular thermally non-conductive plate 367 and bounded below by the medial thermally non-conductive disk 365. While flowing through the portion of the embodiment's spiral fluid channel positioned within the embodiment's adiabatic expansion portion, the working fluid tends to continue expanding although without a continued influx of thermal energy and/or heat from the hot plate 331, which causes the expansion therein to result in a reduction in the pressure of the working fluid flowing therethrough.

After flowing through the portion of the embodiment's spiral fluid channel positioned within the embodiment's adiabatic expansion portion 348, working fluid (not shown) flows into the peripheral and/or outermost vertical fluid conduit 351 through which it flows from the upper portion of the embodiment's spiral fluid channel to the lower portion of that spiral fluid channel. The working fluid flowing down into, and through, and out, from the outermost vertical fluid conduit 351, then flows into, and through, the portion of the embodiment's spiral fluid channel positioned within the embodiment's isothermal contraction portion 355.

A lower cold plate 332 removes, absorbs, and/or captures, thermal energy, and/or heat, from working fluid flowing through the embodiment's isothermal contraction portion 355 of its spiral fluid channel, and transmits, conducts, and/or transfers, that absorbed thermal energy, and/or heat, to an external source of cold (not shown). The cold plate is able to transmit thermal energy, and/or heat, to an external cold source over a relatively large radial extent 390, and over a correspondingly relatively large thermal transmission surface area. The thermal energy, and/or heat, transmitted to an external cold source (and/or heat sink) by the cold plate is captured, and/or absorbed, by the cold plate from working fluid (not shown) flowing within the embodiment's isothermal contraction portion (355 in FIGS. 57 and 59) of the embodiment's spiral fluid channel, which is positioned and/or lies within the fluid-conducting gap, e.g., 392, vertically bounded between an upper surface of the lower cold plate 355 and a lower surface of the medial thermally non-conductive disk 365.

Working fluid (not shown) imparts, yields, and/or transfers, a portion of its thermal energy, and/or heat, to the cold plate 332 through, and/or by means of, an upper thermal conduction surface of the cold plate, said conduction surface being in thermal and fluid connection with the working fluid flowing thereabove. The upper thermal conduction surface of the cold plate has a relatively smaller annular and/or radial extent 355 than does the cold plate's lower thermal transmission surface area 390.

After flowing through, and/or past, the isothermal contraction portion (355 in FIGS. 57 and 59) of the embodiment's spiral fluid channel, working fluid (not shown) flows into, and through, the embodiment's adiabatic compression portion (360 in FIGS. 57 and 59). The adiabatic compression portion of the embodiment's spiral fluid channel, e.g., 393, is bounded below by an upper surface of the lower annular insulated, insulating, and/or thermally non-conductive, plate 376 and above by a lower surface of the medial thermally non-conductive disk 365. While flowing through the embodiment's adiabatic compression portion, the working fluid tends to continue contracting, although this continued contraction, and/or compression, tends to be the result of, and/or is augmented by, a mechanical work performed on the working fluid therein by the rotation (363 in FIG. 59) of the embodiment 330, and occurs without additional outflow of thermal energy, and/or heat, to the cold plate. The mechanical compression of the working fluid tends to cause the pressure of the working fluid to increase.

After flowing through the portion of the embodiment's spiral fluid channel positioned within the embodiment's adiabatic compression portion 360, working fluid (not shown) flows into the central, and/or innermost, vertical fluid conduit 340 through which it flows from the lower portion of the embodiment's spiral fluid channel to the upper portion of the embodiment's spiral fluid channel. The working fluid flowing up, and through, and out from, the innermost vertical fluid conduit 340, then flows into and through the portion of the embodiment's spiral fluid channel positioned within the embodiment's isothermal expansion portion 343.

With respect to the orientation and/or position of the vertical section plane by which the illustration of FIG. 60 has been defined, and/or configured, the effective widths, e.g., at the elevation of the medial thermally non-conductive disk 365, of the sectioned outermost vertical fluid conduit 351 on the left and right sides of the section are approximately equal, as are the effective widths of the sectioned innermost vertical fluid conduit 340 on the left and right sides of the section.

Note that with respect to a unit of radial distance from the inner insulating cylindrical wall 339, the total, and/or accumulated, flow-normal cross-sectional areas of the spiral fluid channel at that radial distance (e.g., the cross-sectional area of the sectioned portions of the spiral fluid channel with respect to a vertically oriented cylindrical section surface through the spiral fluid channel, said cylindrical section surface being coaxial with the embodiment's shaft) increases in proportion to the square of that radial distance.

Thus, the accumulated, flow-normal cross-sectional area of the spiral fluid channel laterally adjacent to the embodiment's inner insulating cylindrical wall 339, whereat the isothermal expansion portion 343 of the embodiment's spiral fluid channel begins, is significantly less than is the accumulated, flow-normal cross-sectional area of the spiral fluid channel whereat the isothermal expansion portion of the embodiment's spiral fluid channel ends, i.e., vertically adjacent to seam 368. Thus, with respect to its accumulated, per-unit-radial-distance, cross-sectional area, the cross-sectional area (and by extension the effective channel volume) available to the warming and expanding working fluid flowing through the isothermal expansion portion of the embodiment's spiral fluid channel increases exponentially with respect to the working fluid flow therethrough.

Similarly, the accumulated, flow-normal cross-sectional area of the spiral fluid channel whereat the isothermal expansion portion of the embodiment's spiral fluid channel ends, and the adiabatic expansion portion 348 of the embodiment's spiral fluid channel begins, i.e., vertically adjacent to seam 368, is significantly less than is the accumulated, flow-normal cross-sectional area of the spiral fluid channel whereat the adiabatic expansion portion of the embodiment's spiral fluid channel ends, e.g., laterally adjacent to the outer insulating cylindrical wall 333. Thus, with respect to its accumulated, per-unit-radial-distance, cross-sectional area, the cross-sectional area (and by extension the effective channel volume) available to the adiabatically expanding working fluid flowing through the adiabatic expansion portion of the embodiment's spiral fluid channel increases exponentially with respect to the working fluid flow therethrough.

Similarly, the accumulated, flow-normal cross-sectional area of the spiral fluid channel whereat the adiabatic expansion portion 348 of the embodiment's spiral fluid channel ends, and the isothermal contraction portion 355 of the embodiment's spiral fluid channel begins, e.g., laterally adjacent to the outer insulating cylindrical wall 333, is significantly greater than is the accumulated, flow-normal cross-sectional area of the spiral fluid channel whereat the isothermal contraction portion of the embodiment's spiral fluid channel ends, i.e., vertically adjacent to seam 377. Thus, with respect to its accumulated, per-unit-radial-distance, cross-sectional area, the cross-sectional area (and by extension the effective channel volume) available to the isothermally contracting working fluid flowing through the isothermal contraction portion of the embodiment's spiral fluid channel decreases exponentially with respect to the working fluid flow therethrough.

And, similarly, the accumulated, flow-normal cross-sectional area of the spiral fluid channel whereat the isothermal contraction portion 355 of the embodiment's spiral fluid channel ends, and the adiabatic compression portion 360 of the embodiment's spiral fluid channel begins, i.e., vertically adjacent to seam 377, is significantly greater than is the accumulated, flow-normal cross-sectional area of the spiral fluid channel whereat the adiabatic compression portion of the embodiment's spiral fluid channel ends, e.g., laterally adjacent to the inner insulating cylindrical wall 339. Thus, with respect to its accumulated, per-unit-radial-distance, cross-sectional area, the cross-sectional area (and by extension the effective channel volume) available to the adiabatically compressing working fluid flowing through the adiabatic compression portion of the embodiment's spiral fluid channel decreases exponentially with respect to the working fluid flow therethrough.

The relatively minimal accumulated cross-sectional area of the spiral fluid channel between the adiabatic compression portion of the embodiment's spiral fluid channel and the isothermal expansion portion of the embodiment's spiral fluid channel, acts as a diodic constriction permitting working-fluid flow in a first rotational direction, e.g., 371 in FIG. 58, while inhibiting working-fluid flow in a second, and/or opposite, rotational direction.

Figure 61:
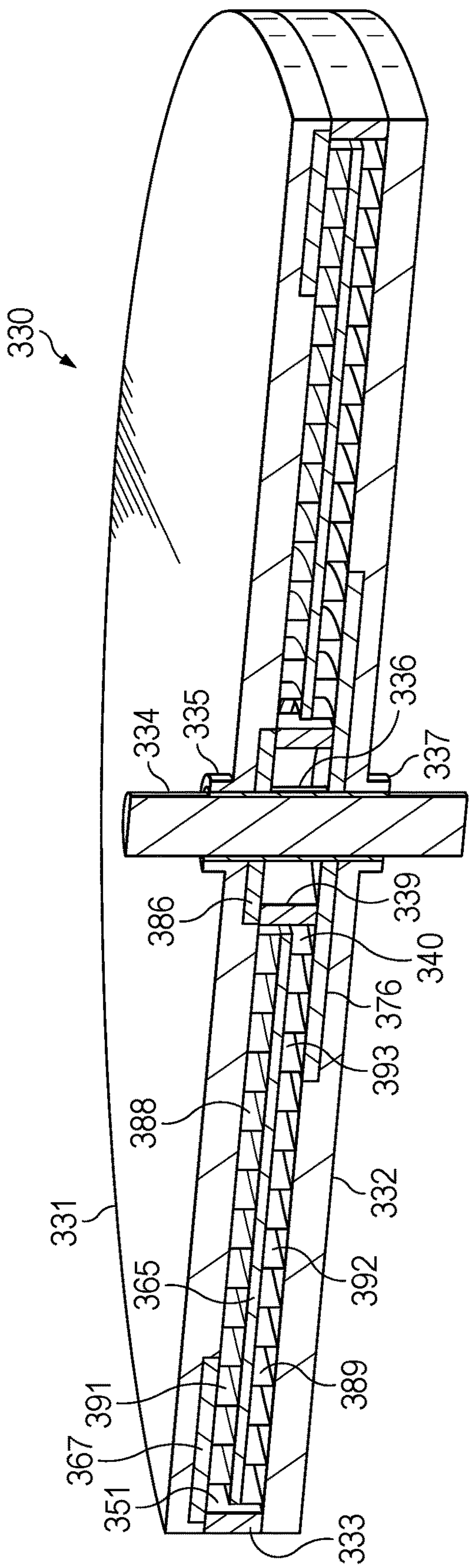
FIG. 61 shows a perspective view of the sixth embodiment of the present invention.

FIG. 61 shows a perspective view of the side sectional view illustrated in FIG. 60 wherein the vertical section plane is specified in FIG. 53 and the section is taken across line 60-60.

Figure 62:
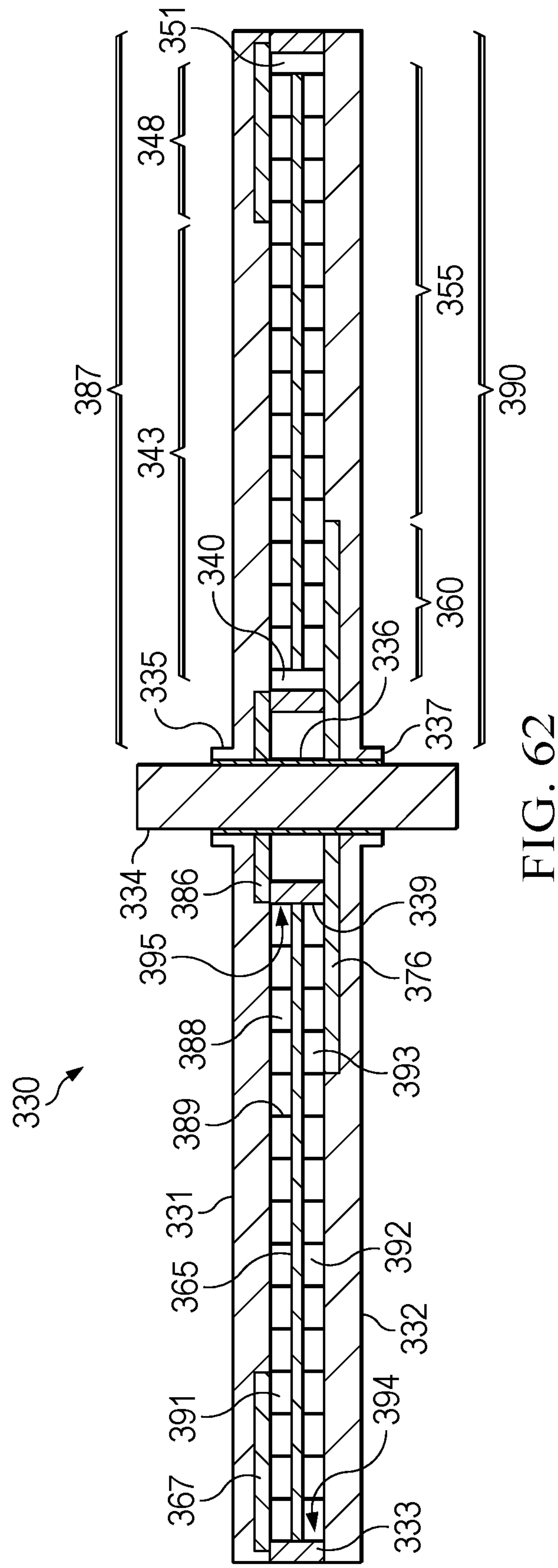
FIG. 62 shows a side sectional view of the sixth embodiment of the present invention.

FIG. 62 shows a side sectional view of the same embodiment 330 of the present disclosure that is illustrated in FIGS. 52-61 wherein the vertical section plane is specified in FIG. 53 and the section is taken across line 62-62.

The innermost 340 and outermost 351 vertical fluid conduits are not radially, and/or bilaterally, symmetrical with respect to the section plane of FIG. 62. And, whereas the flow-normal cross-sectional profiles of these vertical fluid conduits were approximately symmetrical and, with respect to vertical flows of working fluid, of equal flow channel widths and/or flow-normal areas, the cross-sectional profiles of these vertical fluid conduits in the sectional view of FIG. 62 are maximally dissimilar and asymmetrical. And, with respect to the section of FIG. 62, and/or the section plane taken across the line 62-62 of FIG. 53, vertical flows of working fluid are facilitated by relatively maximal flow-normal cross-sectional areas with respect to the right side of the sectioned embodiment (i.e. where the innermost 340 and outermost 351 vertical fluid conduits are specified), and vertical flows of working fluid are not possible with respect to the left side of the sectioned embodiment.

With respect to the vertical section of the embodiment illustrated in FIG. 60, the outermost vertical fluid conduit (351 in FIG. 60) is visible and present on both sides of the sectioned embodiment and/or sectional view. However, due to the inherent asymmetry of the embodiment's spiral-shaped outermost vertical fluid conduit, the vertical section of the embodiment illustrated in FIG. 62, passes through a vertical section of the embodiment with respect to which there is no outermost vertical fluid conduit on the left side, e.g., at position 394. With respect to the vertical section of the embodiment illustrated in FIG. 62, the outermost vertical fluid conduit 351 is only visible on the right side. And, the section plane illustrated in FIG. 62 is the radial position, and/or angular orientation, where, on the right side of the embodiment, the outermost vertical fluid conduit is of maximal flow-normal cross-sectional area with respect to the embodiment's entire outermost vertical fluid conduit.

With respect to the vertical section of the embodiment illustrated in FIG. 60, the innermost vertical fluid conduit (340 in FIG. 60) is visible and present on both sides of the sectioned embodiment and/or sectional view. However, due to the inherent asymmetry of the embodiment's spiral-shaped innermost vertical fluid conduit, the vertical section of the embodiment illustrated in FIG. 62, passes through a vertical section of the embodiment with respect to which there is no innermost vertical fluid conduit on the left side, e.g., at position 395. With respect to the vertical section of the embodiment illustrated in FIG. 62, the innermost vertical fluid conduit 340 is only visible on the right side. And, the section plane illustrated in FIG. 62 is the radial position, and/or angular orientation, where, on the right side of the embodiment, the innermost vertical fluid conduit is of maximal flow-normal cross-sectional area with respect to the embodiment's entire innermost vertical fluid conduit.

Figure 63:
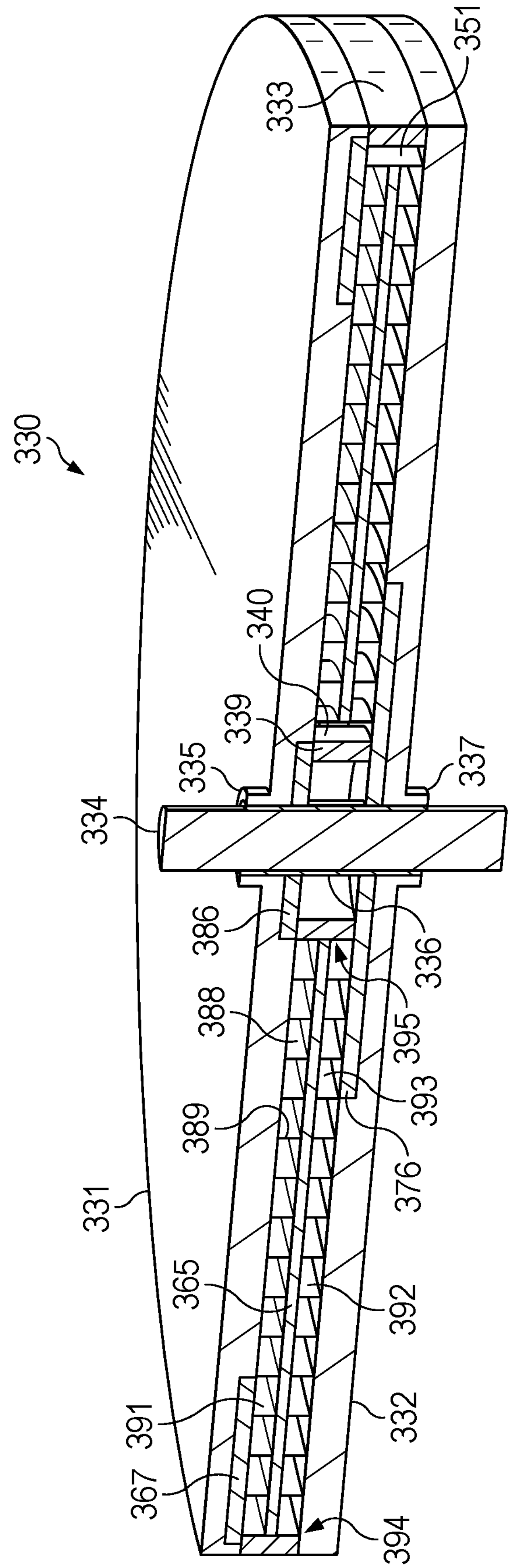
FIG. 63 shows a perspective view of the sixth embodiment of the present invention.

FIG. 63 shows a perspective view of the side sectional view illustrated in FIG. 62 wherein the vertical section plane is specified in FIG. 53 and the section is taken across line 62-62.

Figure 64:
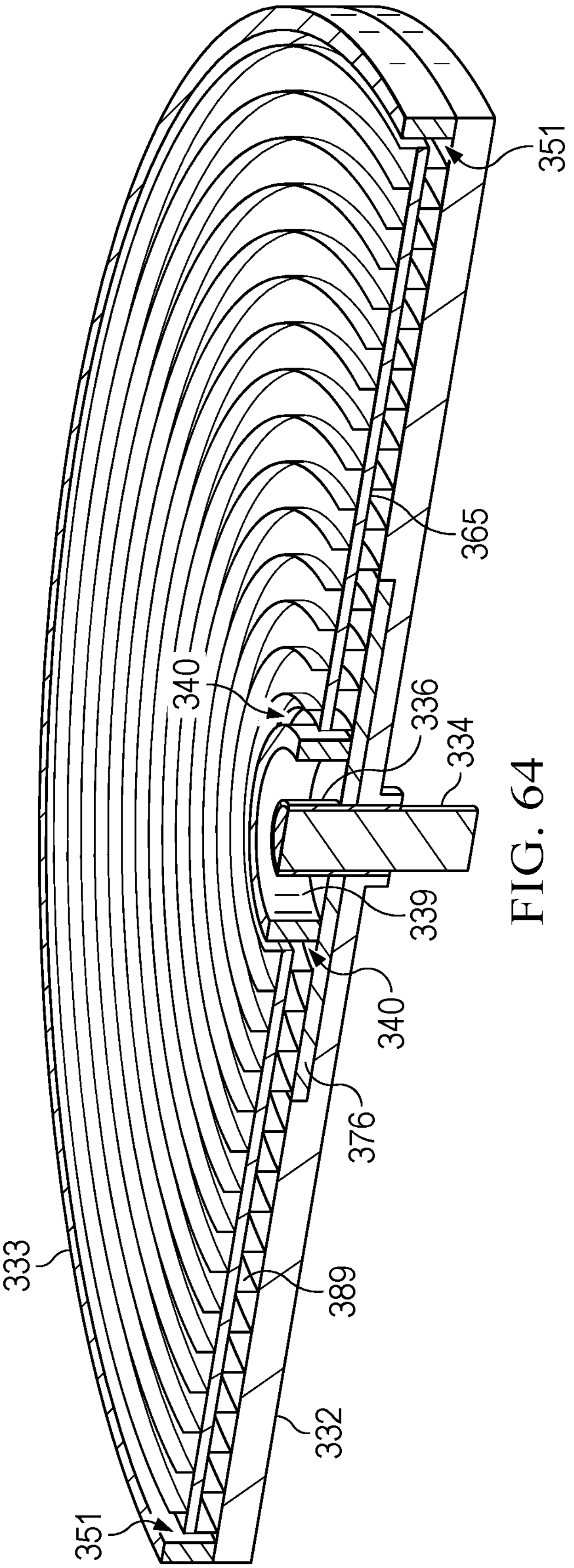
FIG. 64 shows a perspective side and top-down sectional view of the sixth embodiment of the present invention.

FIG. 64 shows a perspective side and top-down sectional view of the same embodiment 330 of the present disclosure that is illustrated in FIGS. 52-63 wherein the vertical section plane is specified in FIG. 53 and the section is taken across line 60-60, and the horizontal section plane is specified in FIG. 55 and taken across line 56-56.

FIG. 64 illustrates the geometry and/or structural configuration characteristic of the innermost vertical fluid conduit 340 and the outermost vertical fluid conduit 351. After flowing radially outward across, and/or through, the upper portion of the embodiment's spiral fluid channel, i.e. that portion of the spiral fluid channel above the embodiment's medial thermally non-conductive disk 365, working fluid (not shown) flows into, down, and through the outermost vertical fluid conduit 351 where it thereafter flows into and through the lower portion of the embodiment's spiral fluid channel, i.e. that portion of the spiral fluid channel below the embodiment's medial thermally non-conductive disk. And, after flowing radially inward across, and/or through, the lower portion of the embodiment's spiral fluid channel, working fluid (not shown) flows into, up, and through the innermost vertical fluid conduit 340 where it thereafter returns to, and/or flows into and through, the upper portion of the embodiment's spiral fluid channel.

The varieties of embodiments, their geometries, their working fluids, their operations, and their applications, enumerated within the "Summary of the Invention" section of this disclosure apply to the embodiment illustrated and discussed in relation to FIGS. 52-64, and the scope of the present disclosure includes all such variations of the embodiment illustrated in FIGS. 52-64.

Disclosed in this specification, and in FIGS. 52-64, is a closed-cycle, externally-heated and externally-cooled heat engine, comprising: a fluid-flow channel, having upper and lower spiraling portions vertically separated by a medial disk, and containing a working fluid; a shaft of rotation at a radial center of, and normal to, the medial disk; a disk-shaped heat-receiving thermal conduit thermally-connected to an interior of vertically adjacent portions of the upper spiraling portion of the fluid-flow channel; a disk-shaped heat-discharging thermal conduit thermally-connected to an interior of vertically adjacent portions of the lower spiraling portion of the fluid-flow channel; wherein the upper spiraling portion of the fluid-flow channel is configured to rotate the shaft in a first rotational direction when the heat-receiving thermal conduit is warmed by an external thermal source; wherein the lower spiraling portion of the fluid-flow channel is configured to rotate the shaft in the first rotational direction when the heat-discharging thermal conduit is cooled by an external thermal sink.

Figure 65:
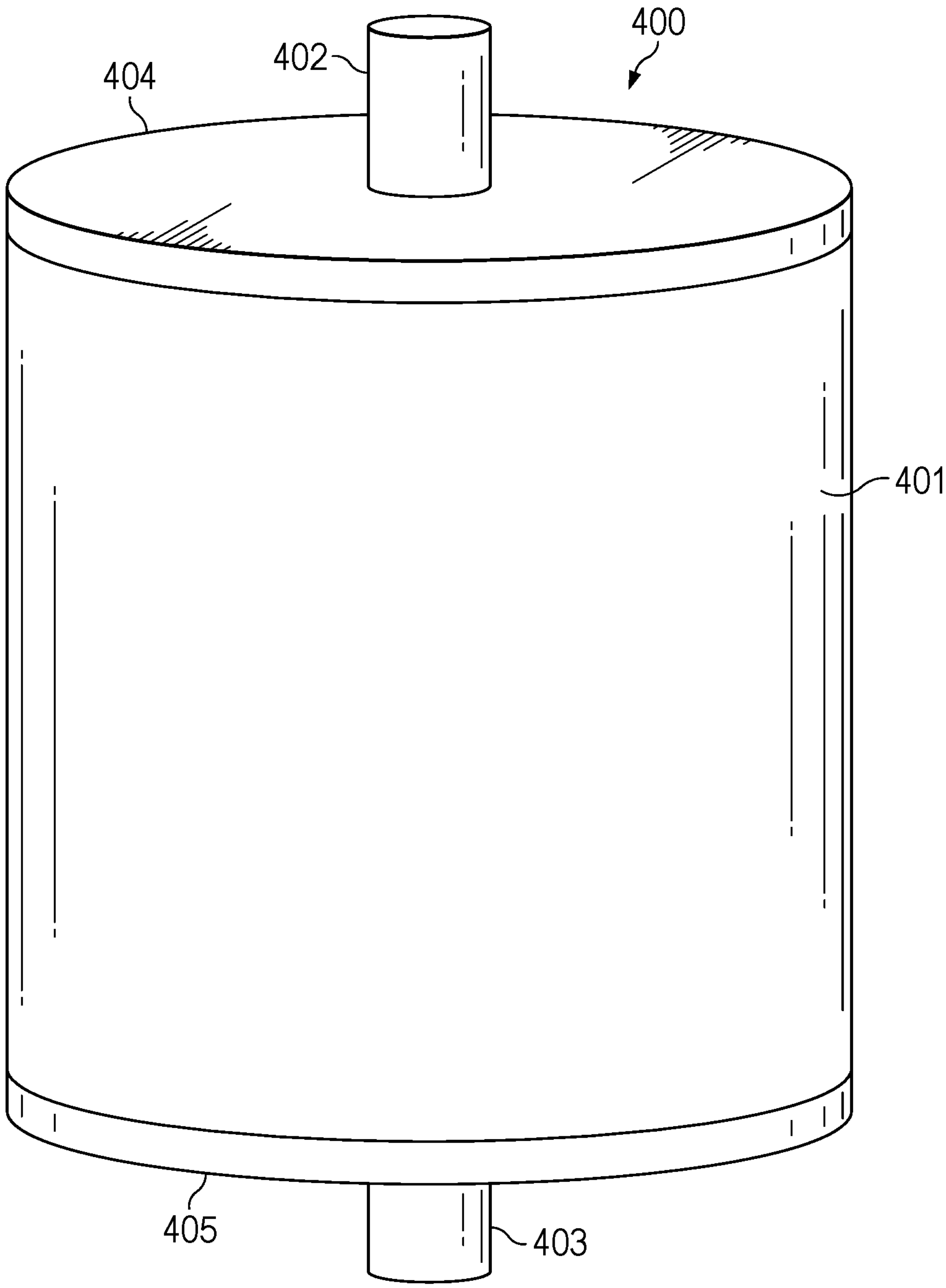
FIG. 65 shows a perspective side view of a seventh embodiment of the present invention.

FIG. 65 shows a perspective side view of an embodiment 400 of the present disclosure. Embodiment 400 contains within an insulating, and/or thermally-non-conductive, outer cylindrical casing 401, five elliptical tubular working-fluid flow channels (not visible), and/or tubes, arrayed obliquely about a central axis of rotation of the embodiment. The embodiment's axis of rotation is coaxial with the longitudinal axes of hot 402 and cold 403 rotational shafts so that as the embodiment rotates, the hot and cold rotational shafts which are fixedly attached to the embodiment also rotate. The embodiment may be fashioned with one or both rotational shafts being of greater length. Rotational bearings (not shown) may be used to permit the embodiment, and its rotational shafts, to rotate freely within, and/or relative to, another non-rotating, and/or differently-rotating, external structure, assembly, platform, and/or machine. A gear attached to one or both rotational shafts may be used to translate a rotation of the embodiment to a rotation of a rotor of a generator thereby permitting the generator to produce electrical power in response to rotations of the embodiment. A propeller, and/or turbine, attached to one or both rotational shafts may be used to translate a rotation of the embodiment to a rotation of the one or both propellers, and/or turbines, thereby permitting the propellers, and/or turbines, to push a fluid in response to rotations of the embodiment.

Each of the five elliptical tubular working-fluid-flow channels, and/or tubes (not visible), within an interior of the embodiment, contains a working fluid which is heated, as it flows through an upper portion (not visible) of each elliptical working-fluid-flow tube, by heat applied to the hot thermal plate 404 of the embodiment. The working fluid within each elliptical working-fluid-flow tube is cooled, as it flows through a lower portion (not visible) of each elliptical working-fluid-flow tube, by cold applied to the cold thermal plate 405 of the embodiment.

Because of the heating of an upper portion of each elliptical working-fluid-flow tube (not visible), and the working fluid flowing therethrough, and the cooling of a lower portion of each elliptical working-fluid-flow tube (not visible), and the working fluid flowing therethrough, the embodiment rotates when heat of an appropriate temperature is applied to the hot thermal plate 404, and cold of an appropriate temperature is applied to the cold thermal plate 405.

Figure 66:
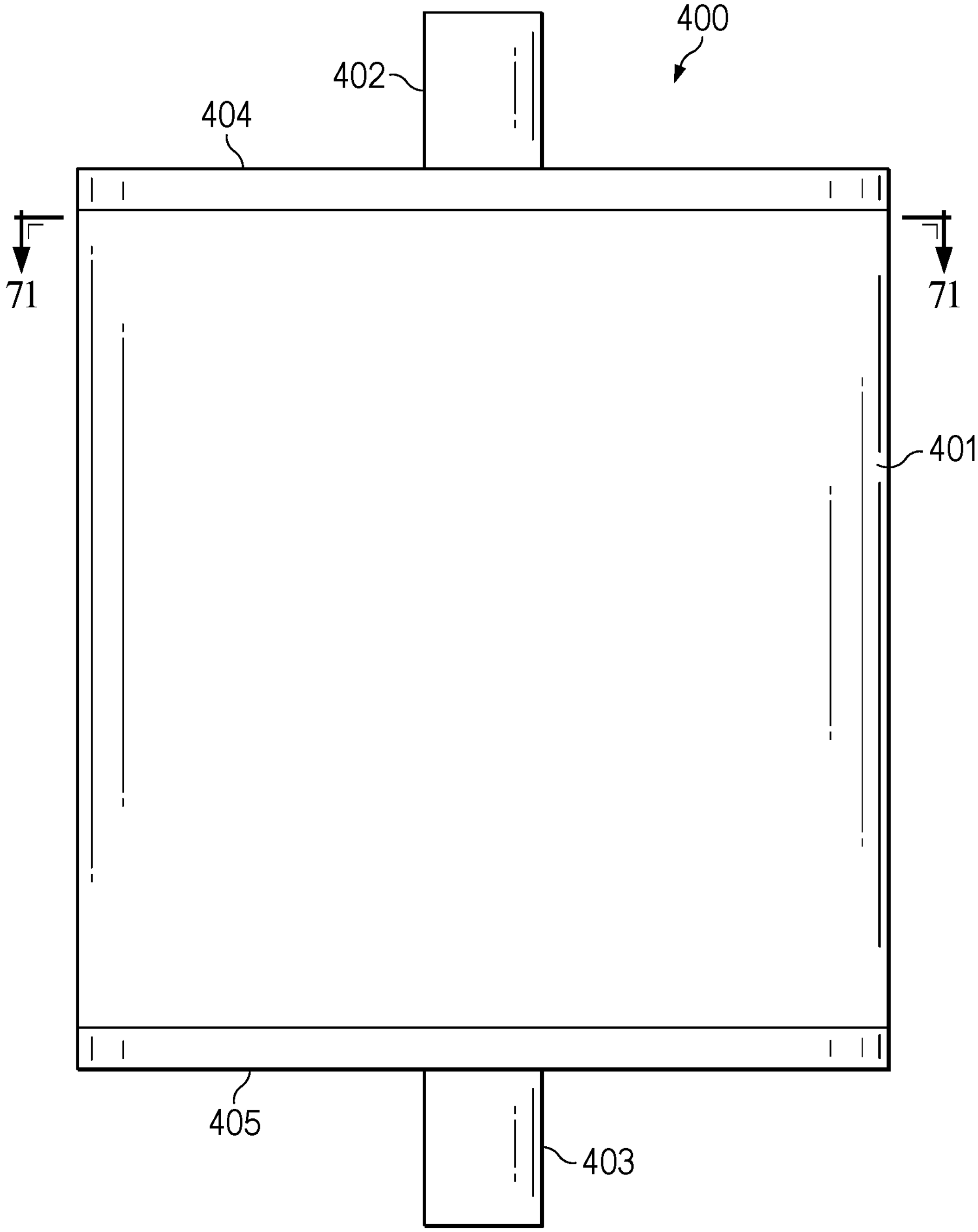
FIG. 66 shows a side view of the seventh embodiment of the present invention.

FIG. 66 shows a side view of the same embodiment 400 of the present disclosure that is illustrated in FIG. 65.

Figure 67:
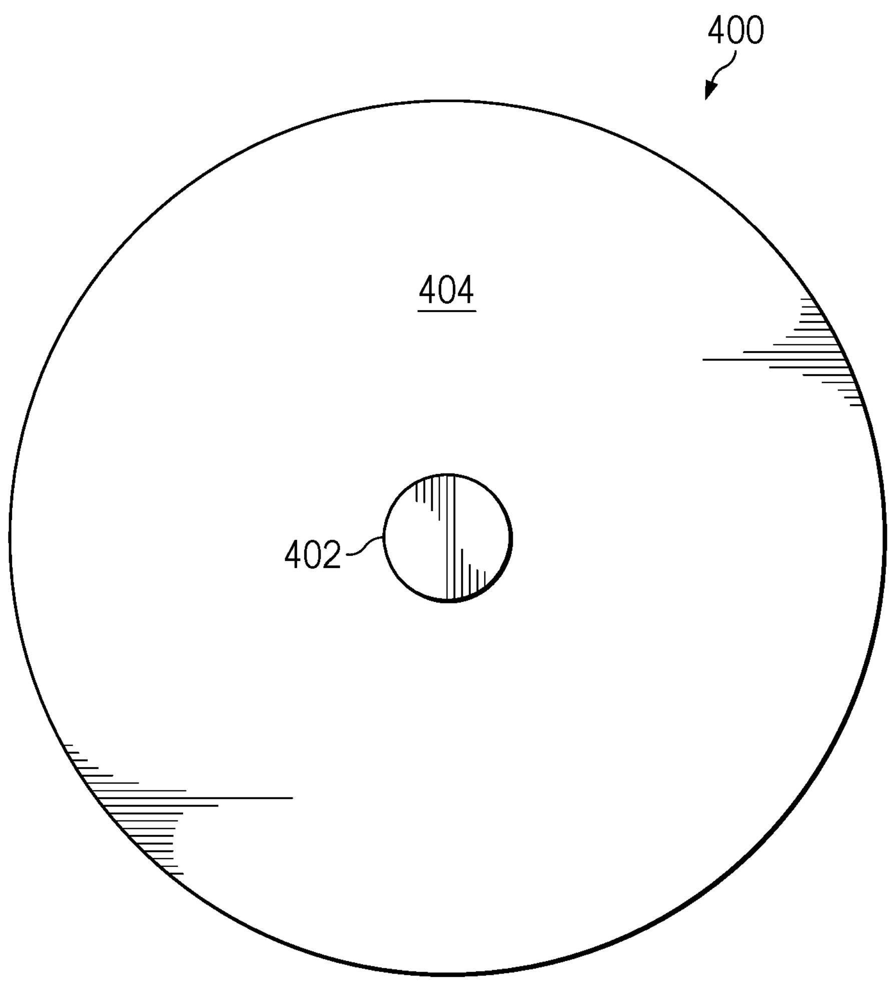
FIG. 67 shows a top-down view of the seventh embodiment of the present invention.

FIG. 67 shows a top-down view of the same embodiment 400 of the present disclosure that is illustrated in FIGS. 65 and 66.

Figure 68:
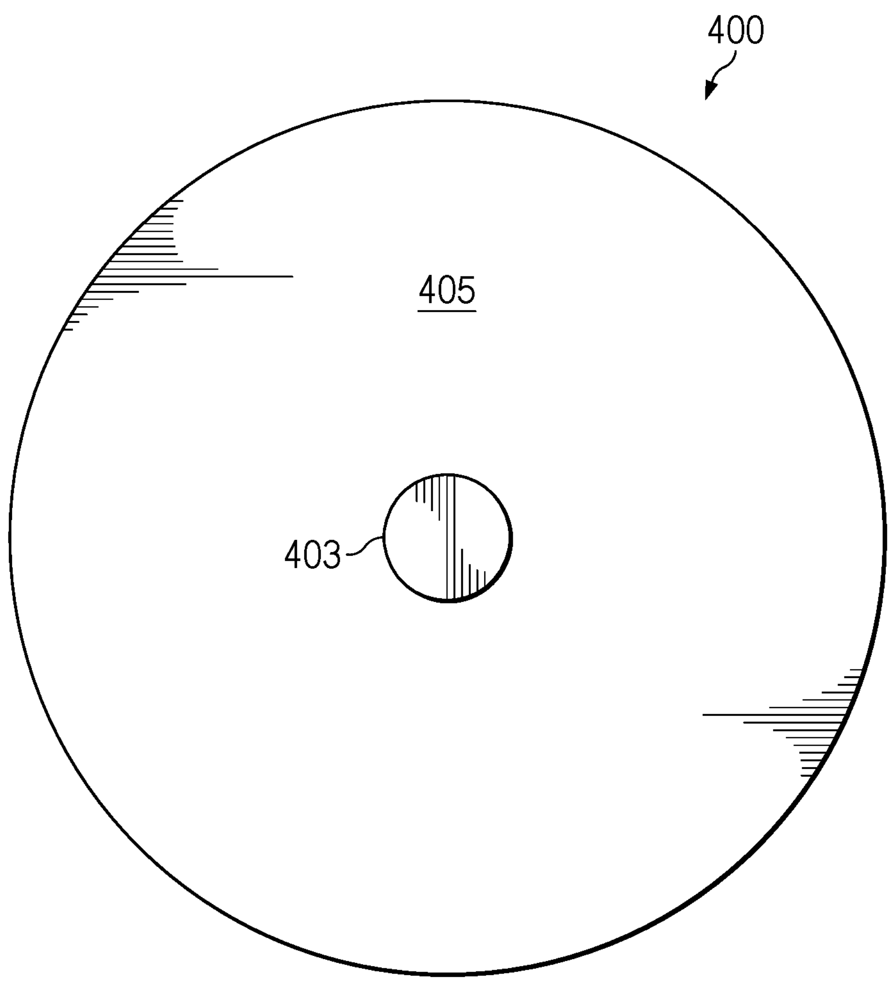
FIG. 68 shows a bottom-up view of the seventh embodiment of the present invention.

FIG. 68 shows a bottom-up view of the same embodiment 400 of the present disclosure that is illustrated in FIGS. 65-67.

Figure 69:
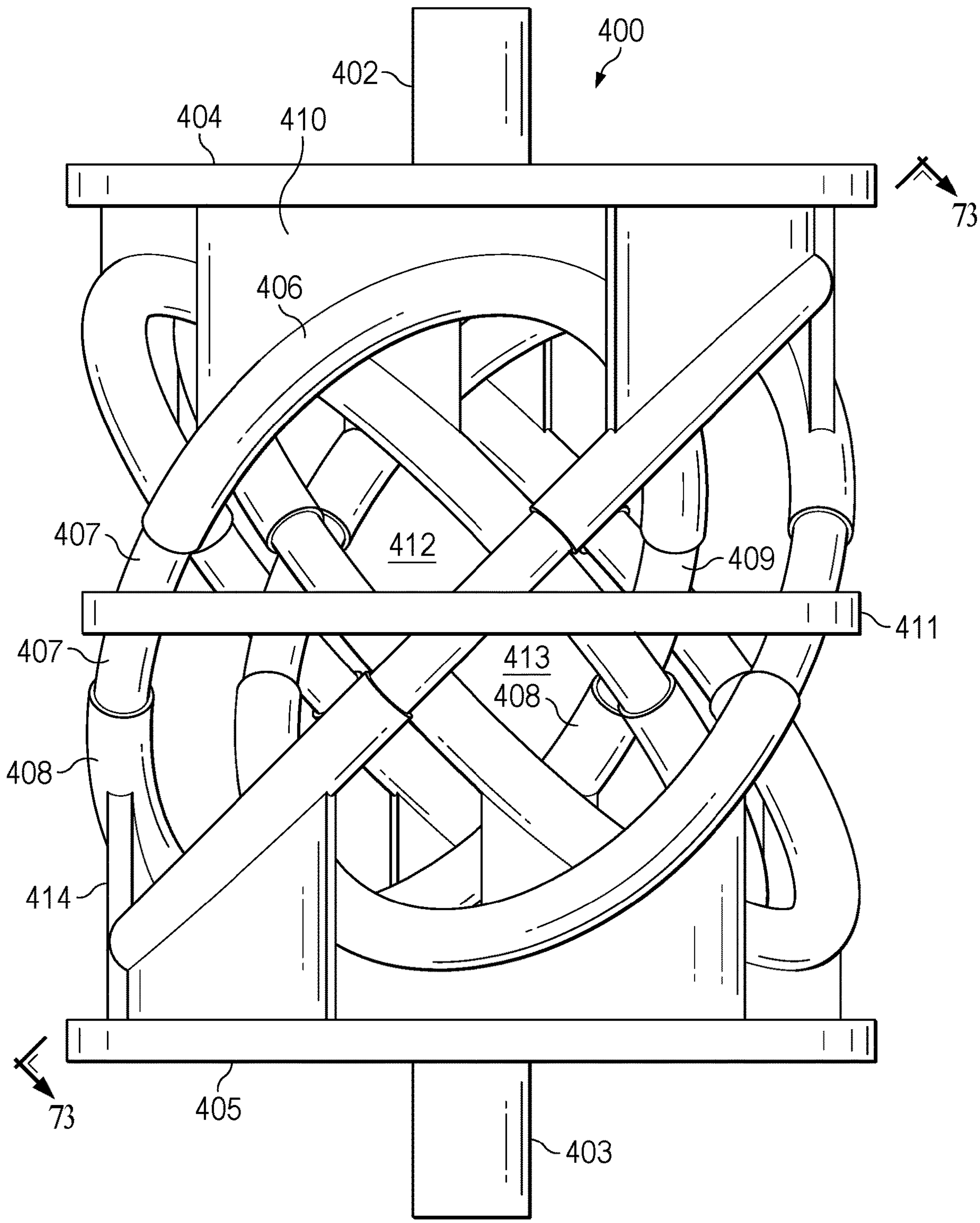
FIG. 69 shows a side view of the seventh embodiment of the present invention.

FIG. 69 shows a side view of the same embodiment 400 of the present disclosure that is illustrated in FIGS. 65-68. However, in FIG. 69 the outer thermally-non-conductive cylindrical casing (401 in FIG. 65) has been removed in order to reveal, expose, and/or illustrate, an interior of the embodiment.

The interior of the embodiment contains five elliptical working-fluid-flow tubes, e.g., 406-409, each having a tube interior fluidly isolated from the tube interiors of the other elliptical fluid-flow tubes, and each of the five working-fluid-flow tubes providing a closed-cycle working-fluid-flow conduit.

Each elliptical working-fluid-flow tube contains, and/or comprises, four different, but fluidly-interconnected, elliptical-tube portions. Each elliptical working-fluid-flow tube comprises an isothermal expansion portion, e.g., 406, in which heat imparted to the embodiment's hot thermal plate 404 by an external heat source (not shown) is transferred to the working fluid within, and/or flowing through, the respective isothermal expansion tube portion, thereby tending to increase a pressure of that working fluid and cause that working fluid to expand (with respect to its volume per unit of working-fluid mass), and/or to become less dense.

The thermally-conductive wall of the isothermal expansion portion, e.g., 406, of each elliptical working-fluid-flow tube is thermally connected to, and receives thermal energy originating from, and/or in, the hot thermal plate 404, by, and/or through, a respective hot vertical thermal conduit, e.g., 410. Each of the embodiment's five hot vertical thermal conduits, thermally connects, and/or transfers heat from, the hot thermal plate (and therethrough from an external heat source, not shown, to which the hot thermal plate is thermally connected) to the isothermal expansion portion of each respective elliptical working-fluid-flow tube.

Each elliptical working-fluid-flow tube comprises an adiabatic expansion portion, e.g., 407, in which working fluid within, and/or flowing through, that respective adiabatic expansion tube portion, which was heated within, and/or as it flowed through, the respective preceding fluidly-connected isothermal expansion tube portion, e.g., 406, is thermally isolated, and tends to continue expanding even as its pressure tends to decrease.

Each elliptical working-fluid-flow tube comprises an isothermal contraction portion, e.g., 408, in which thermal energy, and/or heat, is drawn, and/or removed, from the working fluid flowing therethrough and transferred to the embodiment's cold thermal plate 405 from which that thermal energy is thereafter transferred to, and/or removed by, an external cold source, and/or a thermal sink (not shown), thermally connected to the cold thermal plate, thereby tending to cause that working fluid to contract (with respect to its volume per unit working-fluid mass), and/or to become more dense.

The thermally-conductive walls of the isothermal contraction portion, e.g., 408, of each elliptical fluid-flow tube are thermally connected to the cold thermal plate 405 by respective cold vertical thermal conduits, e.g., 414. Each of the embodiment's five cold vertical thermal conduits, thermally connects, and/or transfers heat from, the wall of the isothermal contraction portion of each respective elliptical fluid-flow tube (and from the working fluid therein, and/or flowing through, the respective isothermal contraction tube portion), to the cold thermal plate (and therethrough to an external thermal sink, not shown).

Each elliptical working-fluid-flow tube comprises an adiabatic compression portion, e.g., 409, in which working fluid therein, and/or flowing through, that respective adiabatic compression tube portion, is thermally isolated, and, at least in part due to the compressive rotations of the embodiment, which tend to push, and/or drive, the cooled working fluid within the adiabatic compression tube portion, is mechanically compressed. Working fluid cooled and contracted while flowing through an isothermal contraction portion, e.g., 408, of an elliptical working-fluid-flow tube, subsequently flows into, and through, a respective fluid-connected adiabatic compression tube portion, wherein that cooled and contracted working fluid tends to be, and/or to become, mechanically compressed and thereby to have its pressure increased, even in the absence of additional chilling.

The adiabatic portion, e.g., 407, of each of the embodiment's elliptical working-fluid-flow tubes, as well as the adiabatic compression portion, e.g., 409, of each of the embodiment's elliptical working-fluid-flow tubes, passes through a medial, and/or central, insulating disk 411 which prevents heat within the upper isothermal expansion tube portions, e.g., 406, the hot vertical thermal conduits, e.g., 410, and the hot plate 404; from mixing with the cold within the lower isothermal contraction tube portions, e.g., 408, the cold vertical thermal conduits, e.g., 414, and the cold plate 405. The central insulating disk 411 reduces, if not prevents, a mixing of heat and cold outside of the interiors of the elliptical working-fluid-flow tubes, and the thermal inefficiencies that such a mixing would create.

Figure 70:
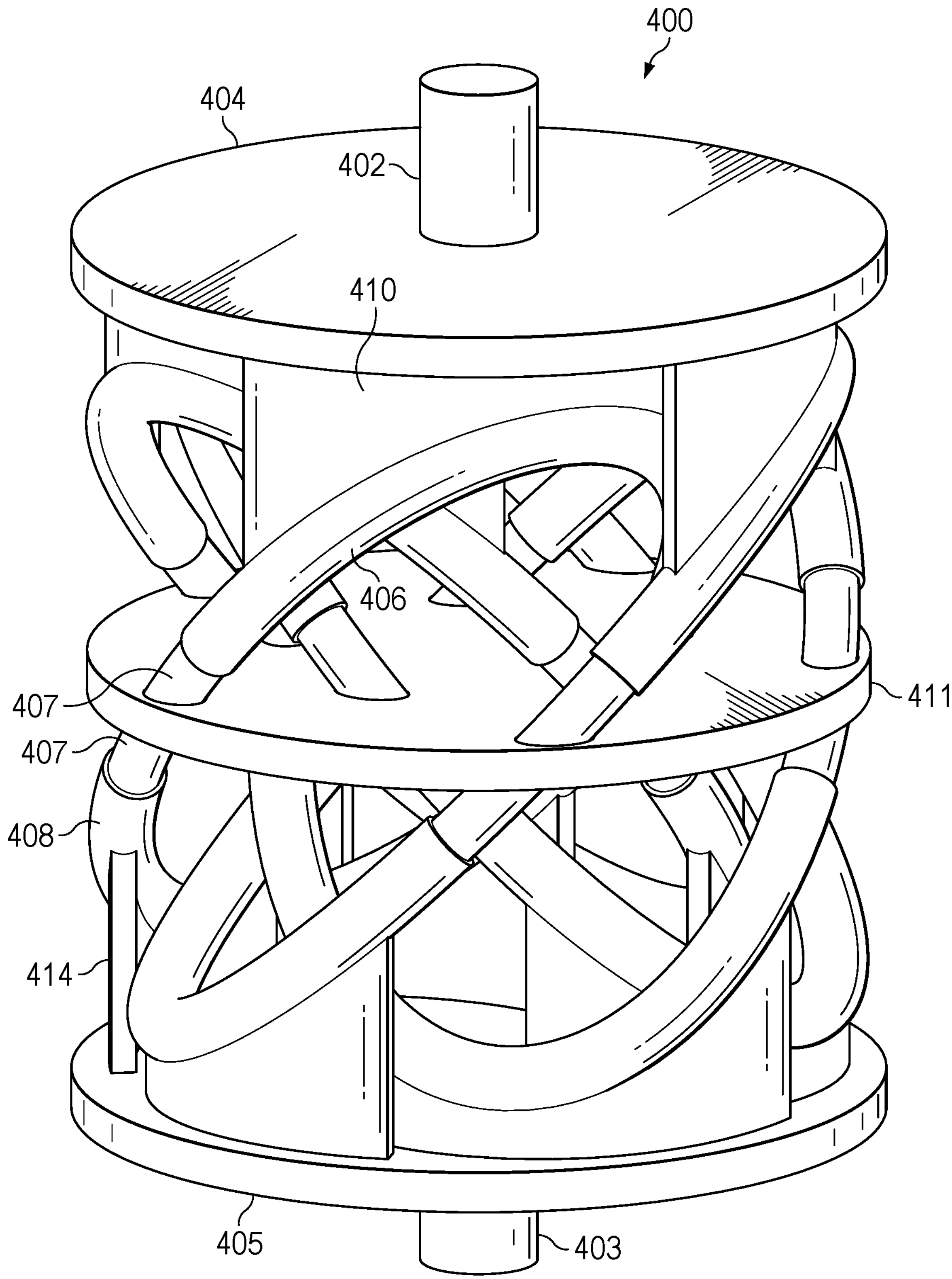
FIG. 70 shows a perspective view of the seventh embodiment of the present invention.

FIG. 70 shows a perspective view of the same side view illustrated in FIG. 69 wherein the outer thermally-non-conductive cylindrical casing 401 has been removed in order to reveal and/or expose an interior of the embodiment.

Figure 71:
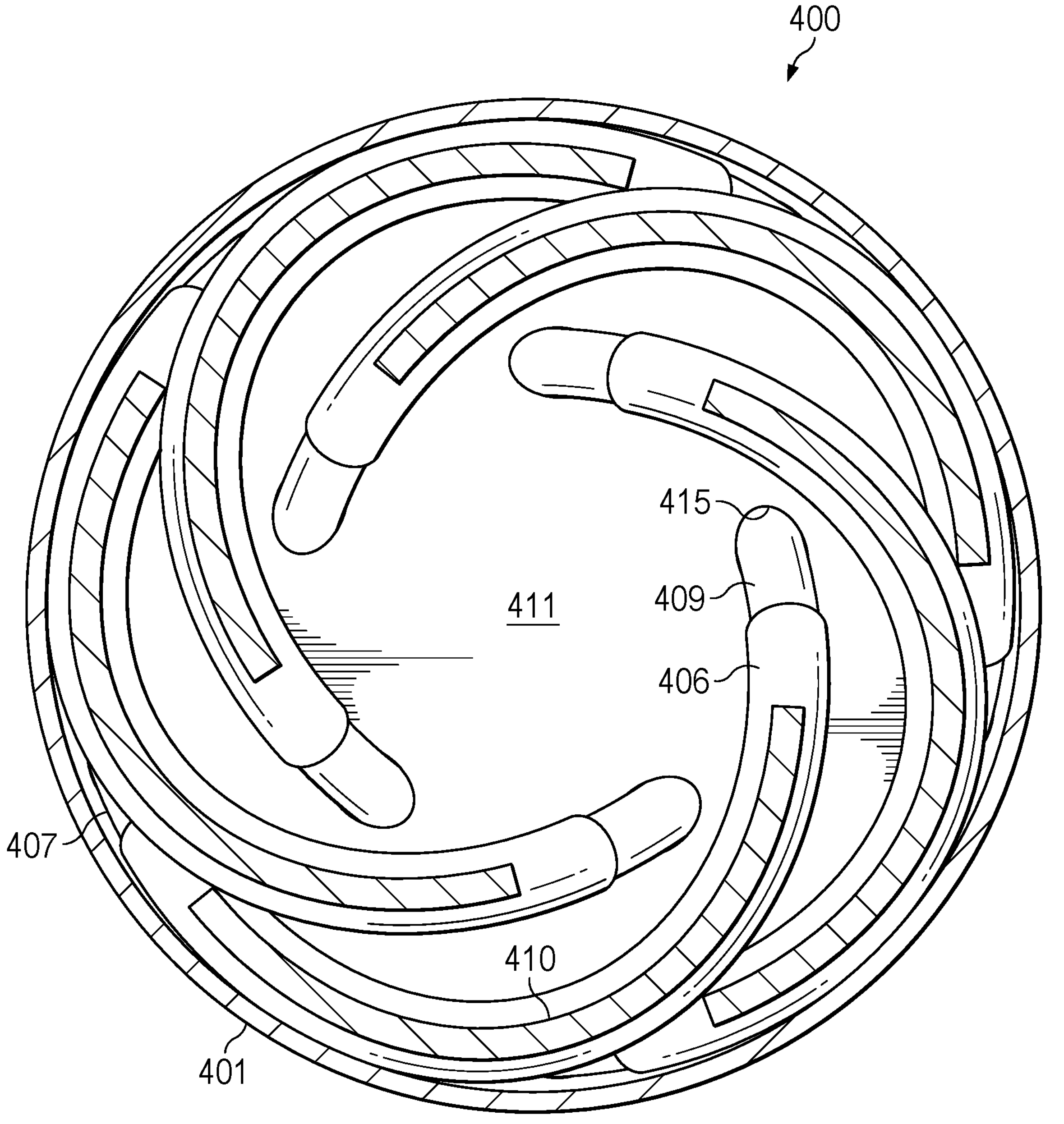
FIG. 71 shows a top-down sectional view of the seventh embodiment of the present invention.

FIG. 71 shows a top-down sectional view of the same embodiment 400 of the present disclosure that is illustrated in FIGS. 65-70 wherein the horizontal section plane is specified in FIG. 66 and the section is taken across line 71-71.

The adiabatic portions, e.g., the adiabatic compression portion, e.g., 409, of each elliptical tube passes through, e.g., at 415, the central insulating disk 411.

Figure 72:
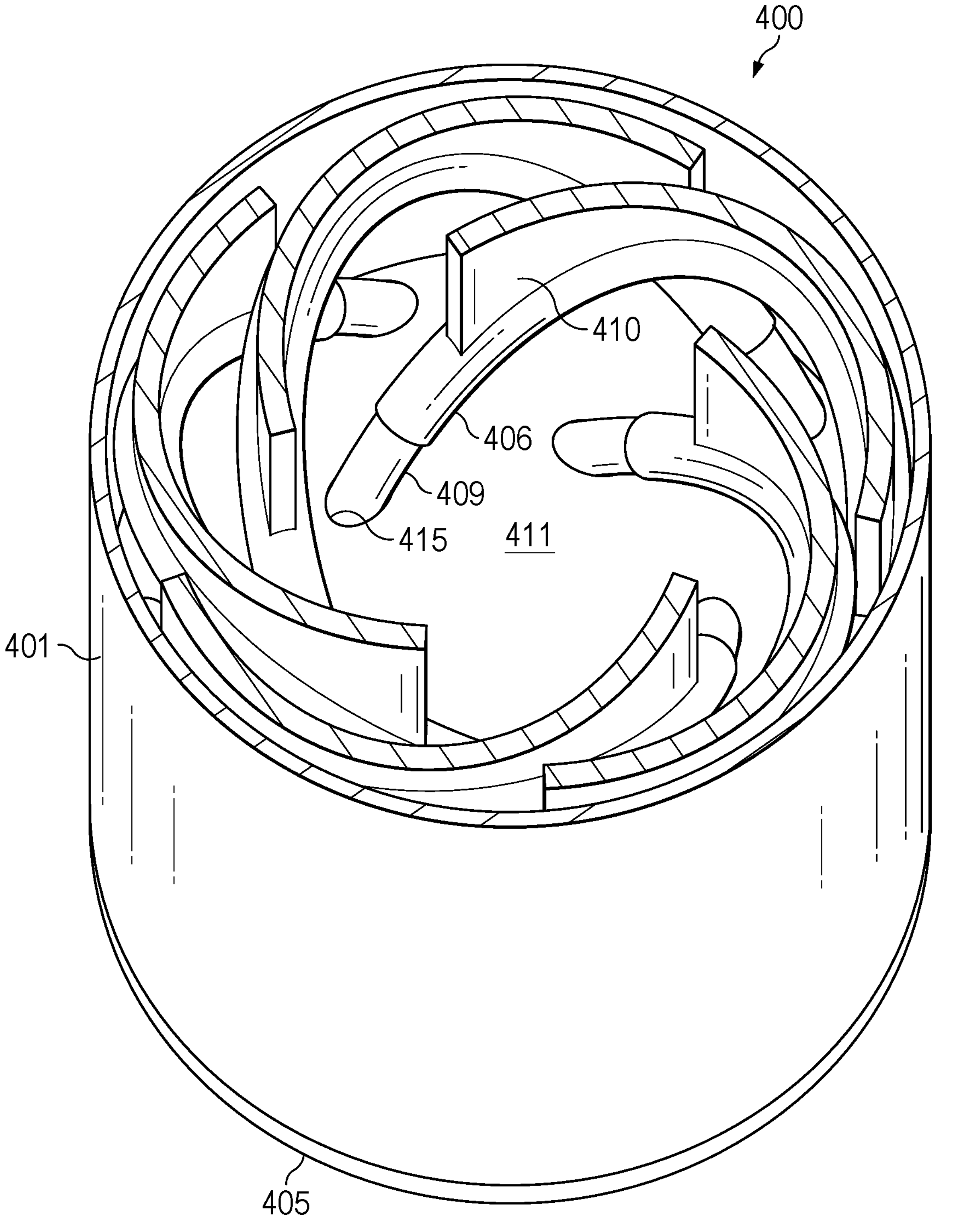
FIG. 72 shows a perspective top-down sectional view of the seventh embodiment of the present invention.

FIG. 72 shows a perspective top-down sectional view of the same embodiment 400 of the present disclosure that is illustrated in FIGS. 65-71 wherein the horizontal section plane is specified in FIG. 66 and the section is taken across line 71-71.

Figure 73:
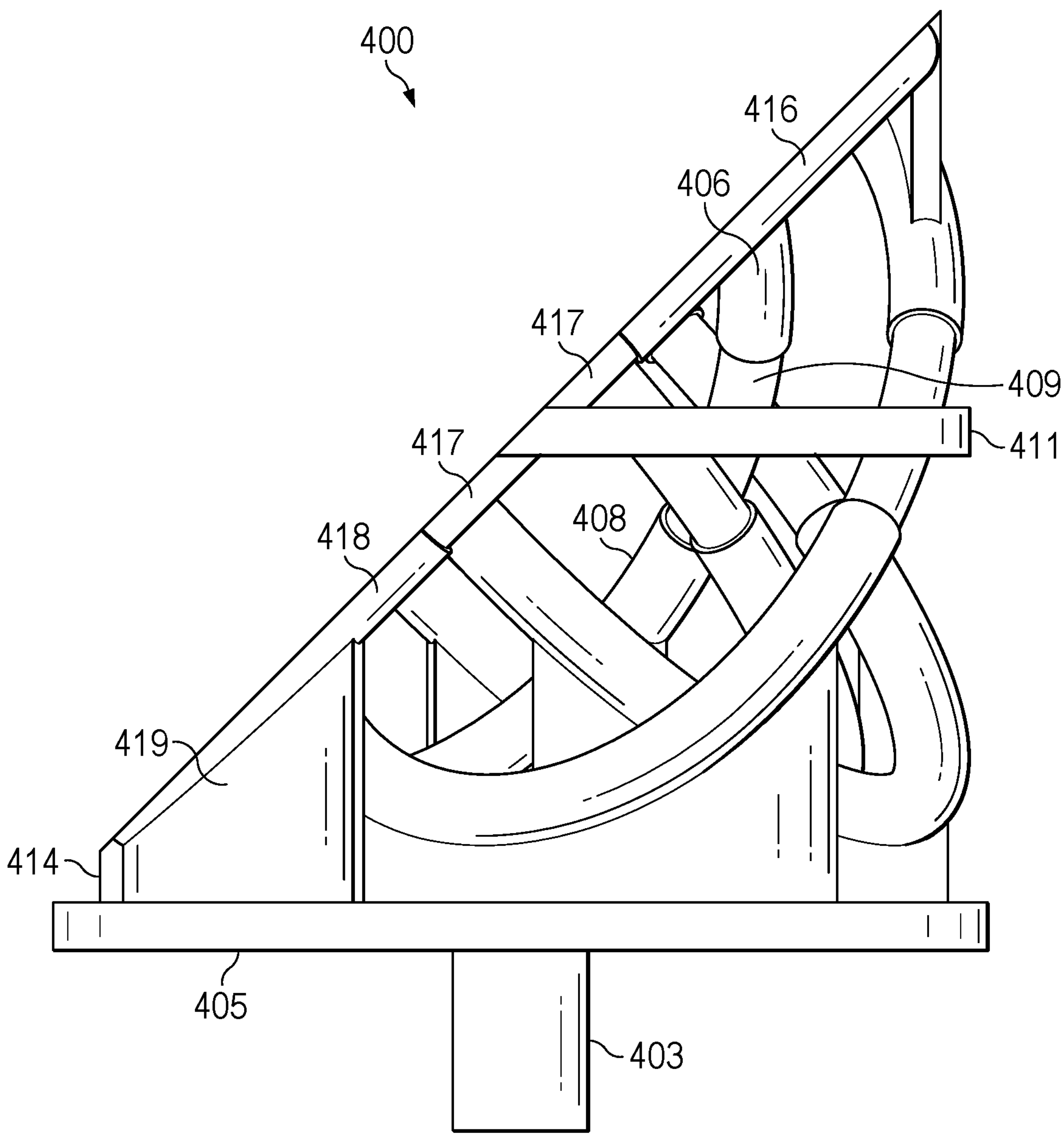
FIG. 73 shows a side view of an oblique sectional view of the seventh embodiment of the present invention.

FIG. 73 shows a side view of an oblique section of the same embodiment 400 of the present disclosure that is illustrated in FIGS. 65-72 wherein the oblique section plane is specified in FIG. 69 and the section is taken across line 73-73, and the view and/or perspective illustrated in FIG. 73 is parallel to the section plane.

Visible in the sectional view of FIG. 73 are portions of a first elliptical tube, e.g., 406, 408, and 409, and a respective cold vertical thermal conduit, e.g., 414.

Also visible in the sectional view of FIG. 73 are portions of a second elliptical tube, e.g., 416-418, which has been sectioned within, and/or at, a plane containing an axis of fluid flow (i.e., a centerline axis, not shown) through the second elliptical tube, and/or, a plane containing the radial centers of circular flow-normal cross-sections of the second elliptical tube along its length. Visible in the sectional view of FIG. 73 is an isothermal expansion portion, e.g., 416, an adiabatic expansion portion, e.g., 417, and an isothermal contraction portion, e.g., 418, of the second elliptical tube. Also visible in the sectional view of FIG. 73 is a cold vertical thermal conduit, e.g., 419, of the second elliptical tube.

Figure 74:
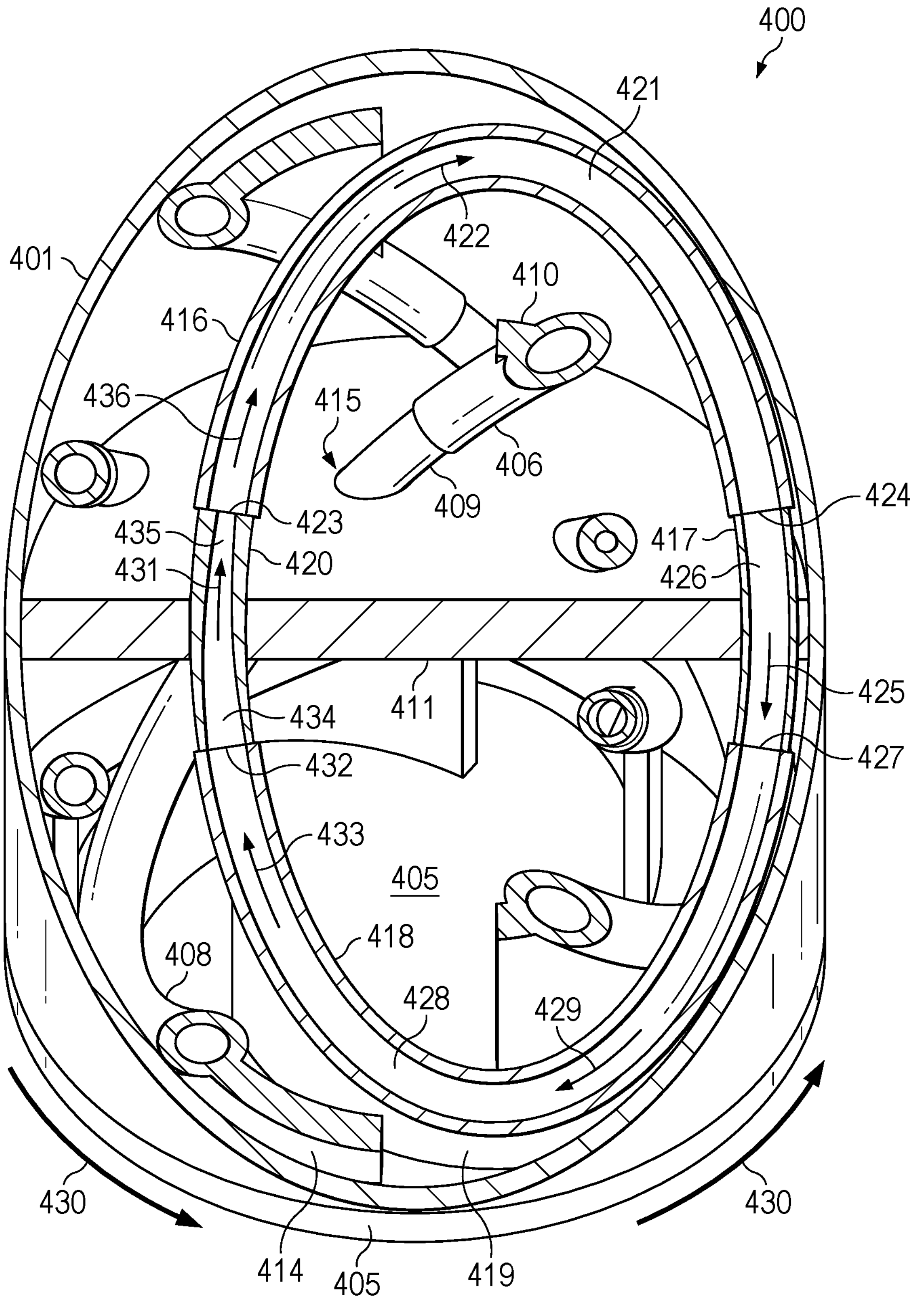
FIG. 74 shows an oblique sectional view of the seventh embodiment of the present invention.

FIG. 74 shows an oblique sectional view of the same embodiment 400 of the present disclosure that is illustrated in FIGS. 65-73 wherein the oblique section plane is specified in FIG. 69 and the section is taken across line 73-73, and the view and/or perspective illustrated in FIG. 74 is normal to the section plane.

Each of the embodiment's 400 five elliptical tubes, e.g., 406, 408-409 and 416-418, are structurally and functionally similar, and each is therefore similar in both structure and function to the single elliptical tube 416-418, and 420 illustrated within FIG. 74.

A working fluid (not shown) is hermetically sealed, trapped, enclosed, and/or contained, within a lumen, e.g., 421, channel, and/or fluid-flow circuit or conduit, within an interior of a tube, and/or tubular wall, e.g., 416.

Heat, and/or thermal energy, applied to a hot thermal plate (404 in FIG. 69) is transmitted, transferred, and/or conducted, to each of five thermally connected hot vertical thermal conduits (e.g., 410 in FIG. 69), each hot vertical thermal conduit being thermally connected to a respective isothermal expansion portion, e.g., 406, of an elliptical tube. In FIG. 74, heat applied to the embodiment's hot thermal plate (not visible above the section plane of FIG. 74) is transmitted, transferred, and/or conducted, to a hot vertical thermal conduit and is then transmitted, transferred, and/or conducted, to the thermally-conductive tubular walls of a respective isothermal expansion portion, e.g., 416.

The thermally-conductive tubular walls of an isothermal expansion portion, e.g., 416, of an elliptical working-fluid-flow tube surround, enclose, and/or contain, a central isothermal expansion tubular channel, e.g., 421, through which flows, e.g., 422, a working fluid (not shown). As working fluid flows through the central isothermal expansion tubular channel of the isothermal expansion portion of an elliptical working-fluid-flow tube, it absorbs thermal energy, and/or heat, from the thermally-conductive walls of that isothermal expansion portion of the respective elliptical fluid-flow tube. Thus, as working fluid flows through the central isothermal tubular channel of a respective isothermal expansion portion of an elliptical working-fluid-flow tube, its temperature increases and it expands, thereby causing the heated working fluid to flow out of the respective isothermal expansion portion of the elliptical tube.

When exposed to sources of heat and cold at its hot (404 in FIG. 69) and cold 405 thermal plates, respectively, the embodiment rotates 430 about its central rotational axis (which is coaxial with the longitudinal axes of rotational symmetry of the hot, 402 in FIG. 69, and cold, 403 in FIG. 69, shafts) in a direction opposite that of the flow of the heated and cooled working fluids within the embodiment's elliptical fluid-flow channels.

A relatively small adiabatic-to-hot aperture, e.g., 423, at one end of a constriction in the adiabatic compression portion, e.g., 420, which is fluidly connected to, adjacent to, and which precedes, each isothermal expansion portion, e.g., 416, slightly obstructs, i.e., to a relatively minimal degree, a flow of working fluid in a first direction, e.g., 431 and 436, whereas that same relatively small adiabatic-to-hot aperture significantly obstructs, i.e., to a relatively maximal degree, a working-fluid flow of a second, and/or opposite direction. Thus, the diodic constriction in the adiabatic compression portion of each elliptical fluid-flow tube causes working fluid within each respective elliptical fluid-flow tube to flow in the first direction.

Working fluid (not shown) flowing, e.g., 422, out of an elliptical tube's isothermal expansion portion, e.g., 416, and/or, working fluid flowing into an elliptical tube's hot-to-adiabatic aperture, e.g., 424, separating an elliptical tube's isothermal expansion portion from its respective, adjacent, and/or succeeding, fluidly connected, adiabatic expansion portion, e.g., 417, flows from a heated tubular channel, e.g., 421, and flows, e.g., 425, into a thermally isolated, insulated, and/or adiabatic, tubular channel, e.g., 426, that is enclosed within the thermally non-conductive, insulated, and/or insulating, tubular walls of each respective elliptical tube's adiabatic expansion portion.

The working fluid flowing, e.g., 425, within the adiabatic expansion portion, e.g., 417, of an elliptical fluid-flow tube, tends to continue expanding, even though thermally isolated, and/or even in the absence of a continued influx of additional thermal energy. This adiabatic expansion of the working fluid tends to cause a volume per unit working-fluid mass to increase, and a pressure of that working fluid to decrease.

Working fluid (not shown) flowing, e.g., 425, out of an elliptical fluid-flow tube's adiabatic expansion portion, e.g., 417, and/or, working fluid flowing through an adiabatic-to-cold aperture, e.g., 427, flows from a thermally isolated tubular fluid-flow channel, e.g., 426, into a relatively chilled, cooled, and/or cold, tubular fluid-flow channel, e.g., 428, enclosed within the thermally-conductive, and relatively cold, tubular walls of each respective elliptical fluid-flow tube's isothermal contraction portion, e.g., 418.

Thermal energy removed, and/or drawn, from the embodiment's cold thermal plate (405 in FIG. 69), e.g., by, and/or through, its thermal connection to an external heat sink (not shown), in turn removes, and/or draws, thermal energy from each of five thermally connected cold vertical thermal conduits e.g., 419, to which the cold thermal plate is physically and thermally connected. And, the removal of thermal energy from the cold thermal conduits in turn removes thermal energy from the tube wall of each respective isothermal contraction portion, e.g., 418, of an elliptical working-fluid-flow tube, as well as from the working fluid flowing therethrough.

With respect to the embodiment 400 illustrated in FIG. 74, thermal energy removed from the embodiment's cold thermal plate 405 removes thermal energy from a cold vertical thermal conduit, e.g., 419, which, in turn, removes thermal energy from the thermally-conductive tubular walls of a respective isothermal contraction portion, e.g., 418.

The thermally-conductive tubular walls of an isothermal contraction portion, e.g., 418, of an elliptical working-fluid-flow tube surround, enclose, and/or contain, a central isothermal contraction tubular channel, e.g., 428, through which flows, e.g., 429, a working fluid (not shown). As working fluid flows through the central isothermal contraction tubular channel of the isothermal contraction portion of an elliptical working-fluid-flow tube, it imparts, transfers, and/or transmits, a portion of its thermal energy, and/or heat, to the thermally-conductive walls of that isothermal contraction portion of the respective elliptical working-fluid-flow tube. Thus, as working fluid flows through the central isothermal contraction tubular channel of the isothermal contraction portion of an elliptical working-fluid-flow tube, its temperature decreases and it contracts, thereby causing the volume of each unit mass of that working fluid to decrease, and/or correspondingly causing the density of that working fluid to increase.

The incremental and/or ongoing loss of thermal energy by the working fluid (not shown) flowing, e.g., 429, through the central isothermal contraction tubular channel, e.g., 428, within the isothermal contraction portion, e.g., 418, of each respective elliptical fluid-flow tube, causes that working fluid to contract as it flows therethrough. This incremental, and/or ongoing, contraction of the working fluid within the isothermal contraction portion, e.g., 418, of each respective elliptical working-fluid-flow tube, causes the working fluid to flow into and through each isothermal contraction tube portion, and/or to metaphorically be "pulled" from the adiabatic-to-cold aperture, e.g., 427, at a first end of each isothermal contraction tube portion, toward, and/or to, a respective cold-to-adiabatic aperture, e.g., 432, at an opposite, and/or distal, end of each isothermal contraction tube portion.

Working fluid (not shown) flowing, e.g., 433, out of an elliptical tube's isothermal contraction portion, e.g., 418, and/or, working fluid flowing through a cold-to-adiabatic aperture, e.g., 432, separating an elliptical tube's isothermal contraction portion from its respective, adjacent, and/or succeeding, fluidly-connected, adiabatic compression portion, e.g., 420, flows from a chilled tubular channel, e.g., 428, and flows, e.g., 433, into a thermally isolated, insulated, and/or adiabatic, tubular channel, e.g., 434/435, enclosed within the thermally non-conductive, insulated, and/or insulating, tubular walls of the respective elliptical fluid-flow tube's adiabatic compression portion.

With respect to the illustration in FIG. 74, the embodiment tends to rotate 430 in a first direction about the embodiment's rotational axis of symmetry (not shown, but coaxial with the longitudinal axes of radial symmetry of the hot, 402 in FIG. 70, and cold, 403 in FIG. 70, shafts) in response to a temperature-driven rotation, e.g., 422, 425, and 429, of the working fluid within each of the embodiment's five elliptical tubes, e.g., 416-418 and 420, in a second, and opposite, direction about the embodiment's rotational axis of symmetry. The inertia of the flowing, e.g., 422, working fluid causes the working fluid (not shown) within the adiabatic compression portion, e.g., 420, of each elliptical fluid-flow tube to be pushed, to be driven, to be compressed, and/or to flow, in the same direction of rotation as the working fluid flowing through the other elliptical tube portions, e.g., 416-418, of each respective elliptical fluid-flow tube.

The rotationally "forced" flow, e.g., 431, of the chilled working fluid (not shown) within the adiabatic compression portion, e.g., 420, of each elliptical working-fluid-flow tube, tends to cause that working fluid to be compressed, compacted, and/or "squeezed," which tends to increase the pressure of that working fluid. In the embodiment illustrated in FIGS. 65-74, the tapered, frustoconical, narrowing, and/or constricted, tubular channel, e.g., 434/435, of the adiabatic compression portion, e.g., 420, of each elliptical tube acts as a diode inhibiting only slightly a flow of working fluid in a first direction, e.g., 431, but inhibiting to a significant degree, if not obstructing, a flow of working fluid through each elliptical working-fluid-flow tube in a second and/or opposite direction, i.e., in a rotational direction, e.g., 430.

As working fluid (not shown) flows, e.g., 431, through the thermally isolated, insulated, and/or adiabatic compression tubular channel, e.g., 434/435, enclosed within the thermally non-conductive, insulated, and/or insulating, tubular walls of each respective elliptical fluid-flow tube's adiabatic compression portion, e.g., 420, it first flows into an initial portion, e.g., 434, of that adiabatic compression tube portion, and then flows toward a distal portion, e.g., 435, of that adiabatic compression tube portion, with the distal portion being characterized by a relatively smaller, and/or lesser, flow-normal cross-sectional area. Therefore, as working fluid flows through the ever narrowing, and/or increasingly constricted, tubular channel within each respective adiabatic compression tube portion, the working fluid therein is driven, by the rotational force imparted to it by the rotation 430 of the embodiment, into a narrower and narrower channel thereby mechanically compressing that working fluid.

When compressed working fluid (not shown) flows 436 through, and out from, the relatively small, narrow, and/or constricted, adiabatic-to-hot aperture, e.g., 423, it is exposed to the heat, and/or thermal energy, within the thermally-conductive walls of the isothermal expansion portion, e.g., 416, of the respective elliptical tube, thereby causing the compressed working fluid to expand and flow, e.g., 422, away from the relatively narrow adiabatic-to-hot aperture and toward the relatively unconstricted isothermal expansion, e.g., 416, adiabatic expansion, e.g., 417, and isothermal contraction, e.g., 418, portions of the respective elliptical fluid-flow tube.

Figure 75:
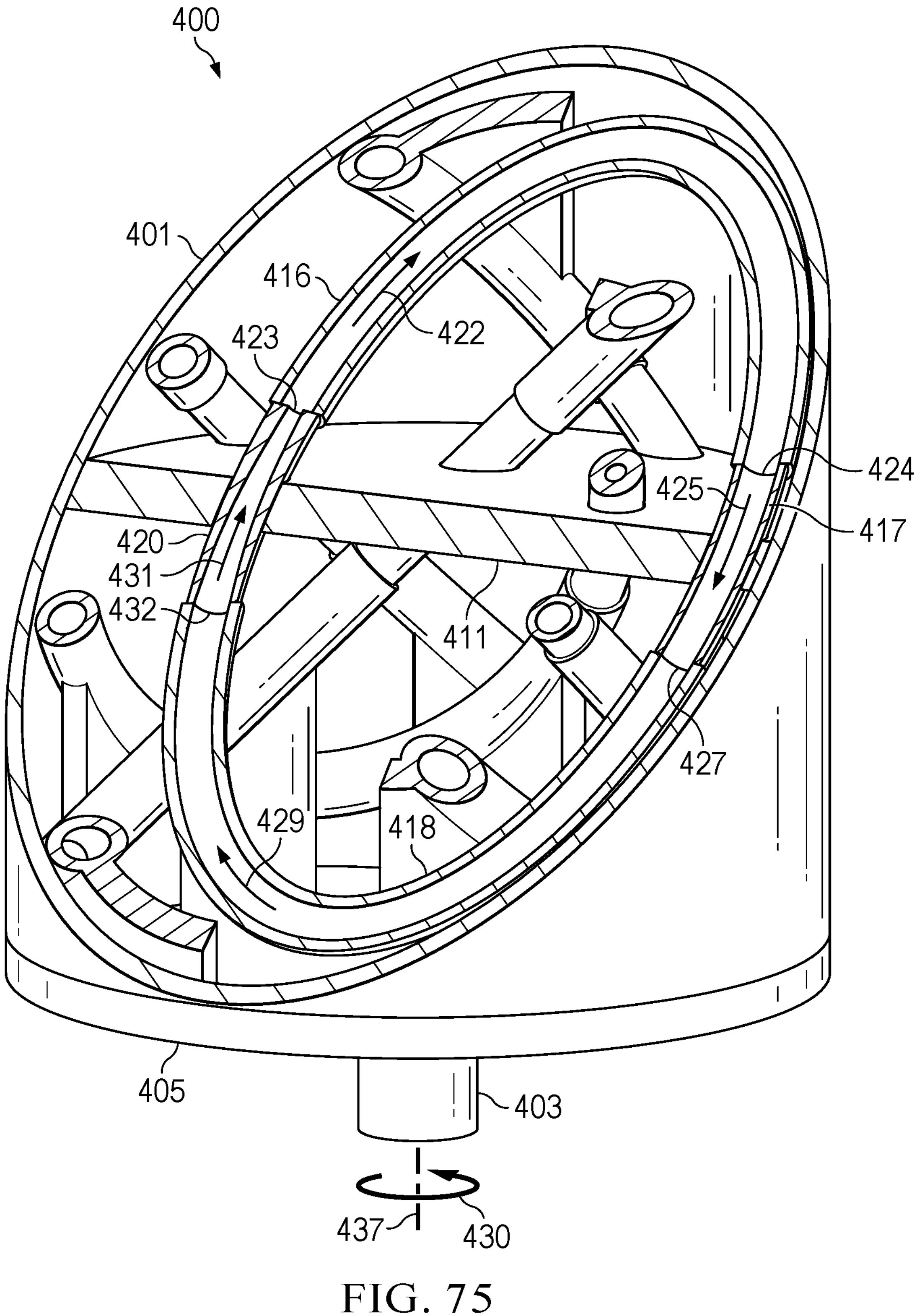
FIG. 75 shows a perspective side view of an oblique sectional view of the seventh embodiment of the present invention.

FIG. 75 shows a perspective side view of the oblique sectional view illustrated in FIG. 74. FIG. 75 is an illustration of the same embodiment 400 of the present disclosure that is illustrated in FIGS. 65-74 wherein the oblique section plane is specified in FIG. 69 and the section is taken across line 73-73.

As working fluid (not shown) flows, e.g., 422, 425, 429, and 431, in an elliptical path, i.e., through an elliptical working-fluid-flow tube, e.g., 416-418 and 420, about an axis of rotation 437 of the embodiment 400, the embodiment responds by rotating 430 in a first rotational direction which is opposite the direction of working-fluid-flow rotation. The working fluid within each of the embodiment's five elliptical fluid-flow tubes flows in a same second direction about the shared and/or common axis of rotation 437, and the magnitude of the torque of the consequent rotation 430 of the embodiment's shaft 403, in the first and opposite direction about that same axis of rotation, tends to be equal to the sum of the magnitudes of the individual torques exerted on the embodiment by the working-fluid flow within each of the embodiment's five elliptical fluid-flow paths.

In this way, heat applied to the hot thermal plate (not visible, 404 in FIG. 65) of the embodiment, and cold applied to the embodiment's cold thermal plate 405, result in a flow of working fluid (not shown) in a second rotational direction about the embodiment's axis of rotation 437 through each of the embodiment's respective five elliptical fluid-flow tubes, which causes a rotation 430 of the embodiment about the embodiment's axis of rotation in a first and opposite direction to that of the direction with which working fluid flows within, and/or through, each of the elliptical fluid-flow tubes.

Figure 76:
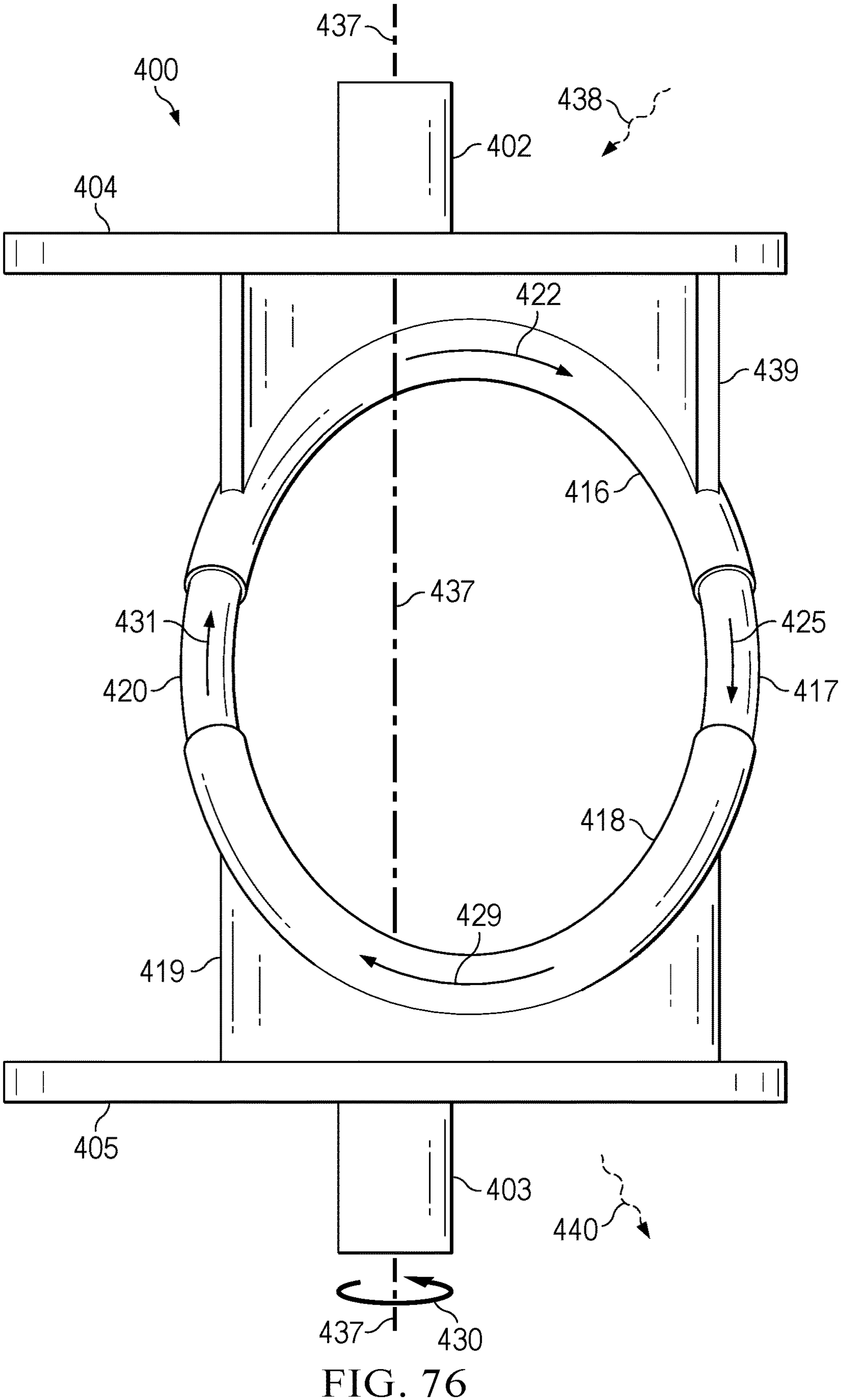
FIG. 76 shows a side view of a partial and/or incomplete version of the seventh embodiment of the present invention.

FIG. 76 shows a side view of a partial and/or incomplete version of the same embodiment 400 of the present disclosure that is illustrated in FIGS. 65-75. The partial embodiment illustrated in FIG. 76 lacks the outer insulating cylindrical casing 401, and the central insulating disk 411. In addition, the partial embodiment illustrated in FIG. 76, lacks all but one of the embodiment's five elliptical tubes. The partial version of the embodiment 400 illustrated in FIG. 76 is provided so as to better illustrate the off-axis, and/or oblique, positions, and/or orientations, of the embodiment's five elliptical fluid-flow tubes.

When an external source of heat, e.g., 438, and/or thermal energy, imparts thermal energy to the embodiment's hot thermal plate 404, a portion of that thermal energy is transmitted, conducted, and/or flows, into a thermally connected hot vertical thermal conduit, e.g., 439, from where, and/or through which, a portion of that thermal energy is then transmitted, conducted, and/or flows, into a thermally connected, and thermally-conductive, isothermal expansion portion, e.g., 416, of a respective elliptical working-fluid-flow tube.

A portion of the thermal energy imparted to the thermally-conductive wall of the isothermal expansion tube portion, e.g., 416, is therethrough transmitted, conducted, and/or flows, into a respective working fluid (not shown) within, and/or flowing through, a respective tubular channel (not visible, e.g., 421 in FIG. 74), within that isothermal expansion tube portion. The warmed, and/or heated, working fluid within the isothermal expansion tube portion of the respective illustrated elliptical fluid-flow tube responds to the absorption of thermal energy by expanding and flowing through the respective tubular channel within the isothermal expansion tube portion, e.g., 417. With respect to a top-down perspective of the partial embodiment illustrated within FIG. 76, the working fluid heated within the tubular channel of the illustrated respective isothermal expansion tube portion flows, e.g., 422, in a clockwise direction about the embodiment's axis of rotation 437. In response to that clockwise flow of working fluid within, and/or through, the tubular channel of the respective isothermal expansion tube portion, the embodiment responds by rotating in an opposite counterclockwise direction 430 about the embodiment's axis of rotation.

Warmed working fluid (not shown) flows out of the isothermal expansion tube portion, e.g., 416, of the illustrated elliptical working-fluid-flow tube, and flows, e.g., 425, into the thermally non-conductive, and/or insulated, adiabatic expansion portion, e.g., 417, of the illustrated elliptical working-fluid-flow tube, where that working fluid continues to expand adiabatically resulting in an increase in volume per unit working-fluid mass, and a loss of pressure, within the adiabatically-expanded working fluid.

Adiabatically expanded and depressurized working fluid (not shown) flows out of the adiabatic expansion portion, e.g., 417, of the illustrated elliptical working-fluid-flow tube, and flows, e.g., 429, into the isothermal contraction portion, e.g., 418, of the illustrated elliptical working-fluid-flow tube, where that working fluid is then cooled by the chilled walls of the thermally-conductive isothermal contraction tube portion. Thermal energy removed from the working fluid within, and/or flowing through, the isothermal contraction tube portion is absorbed into the thermally-conductive wall of that tube portion. A portion of the thermal energy transferred from the working fluid and into the wall of the isothermal contraction tube portion is then transmitted, conducted, and/or flows, into a respective thermally-connected cold vertical thermal conduit, e.g., 419, and a portion of that transferred thermal energy is then transferred, conducted, and/or flows, into the embodiment's cold thermal plate 405, from where it is then transferred, e.g., 440, conducted, and/or flows, into an external thermal sink (not shown), and/or an external source of relative cold.

Cooled, and/or chilled, working fluid (not shown) flows out of the isothermal contraction tube portion, e.g., 418, of the illustrated elliptical working-fluid-flow tube, and then flows, e.g., 431, into the adiabatic compression portion, e.g., 420, of the illustrated elliptical working-fluid-flow tube. Within the adiabatic compression tube portion, the cooled working fluid is mechanically compacted and/or compressed therein by the rotation 430 of the embodiment. And, when compressed working fluid flows, e.g., 422, into the isothermal expansion portion, e.g., 416, of the illustrated elliptical tube, it is again heated, causing it to again expand, and again causing that working fluid to flow through the illustrated elliptical fluid-flow tube, and again causing the embodiment to rotate 430.

Figure 77:
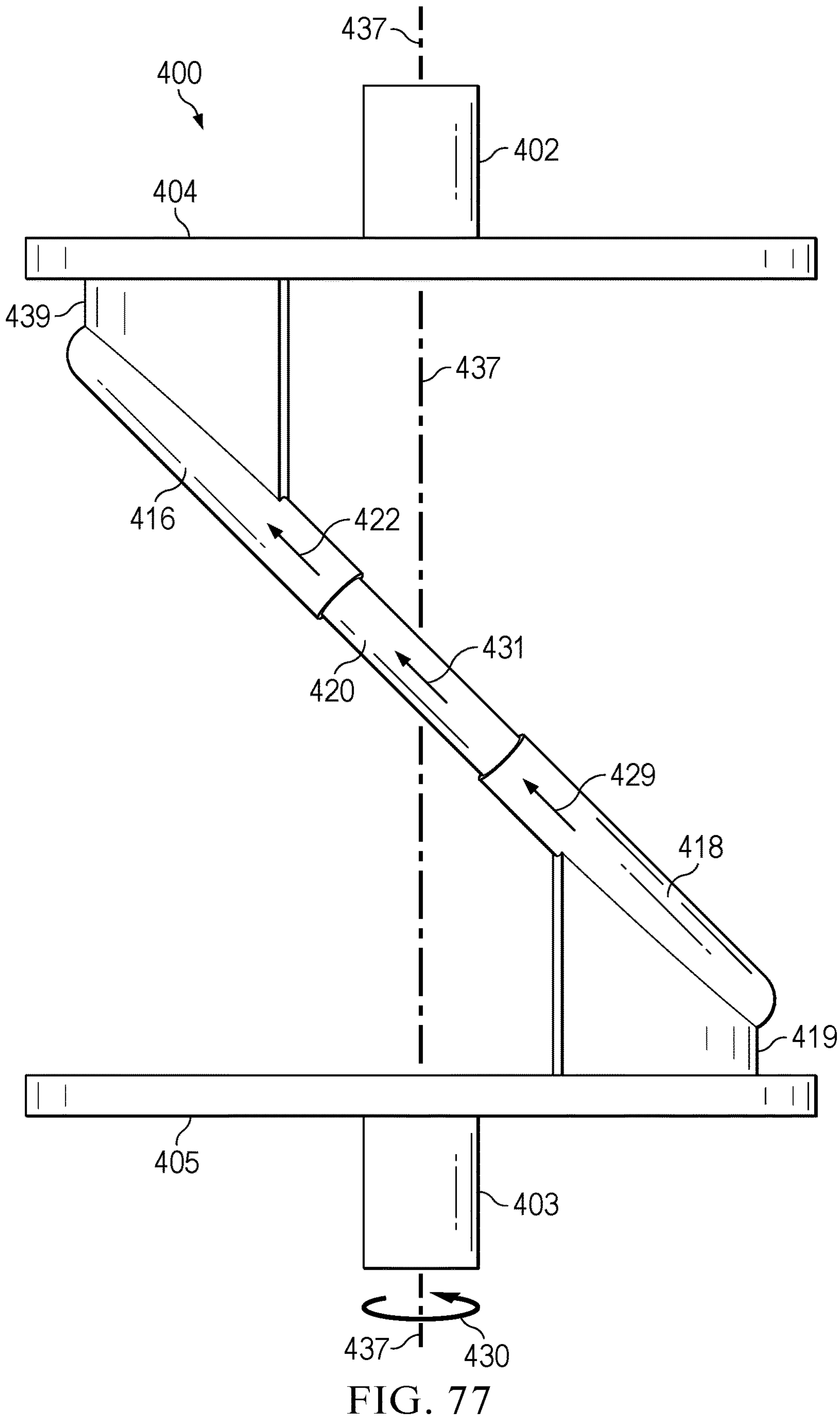
FIG. 77 shows a side view of a partial and/or incomplete version of the seventh embodiment of the present invention.

FIG. 77 shows a side view of the same partial and/or incomplete version of the embodiment 400 of the present disclosure that is illustrated in FIG. 76. The partial embodiment illustrated in FIG. 77 lacks the outer insulating cylindrical casing 401, and the central insulating disk 411. In addition, the partial embodiment illustrated in FIG. 77, lacks all but one of the embodiment's five elliptical fluid-flow tubes. The partial version of the embodiment 400 illustrated in FIG. 77 is provided so as to better illustrate the inclination of the plane parallel to which working fluid flows through the illustrated elliptical working-fluid-flow tube with respect to the embodiment's axis of rotation 437. The inclination of the working-fluid-flow plane with respect to the embodiment's axis of rotation is characteristic of each of the embodiment's five elliptical tubes.

Figure 78:
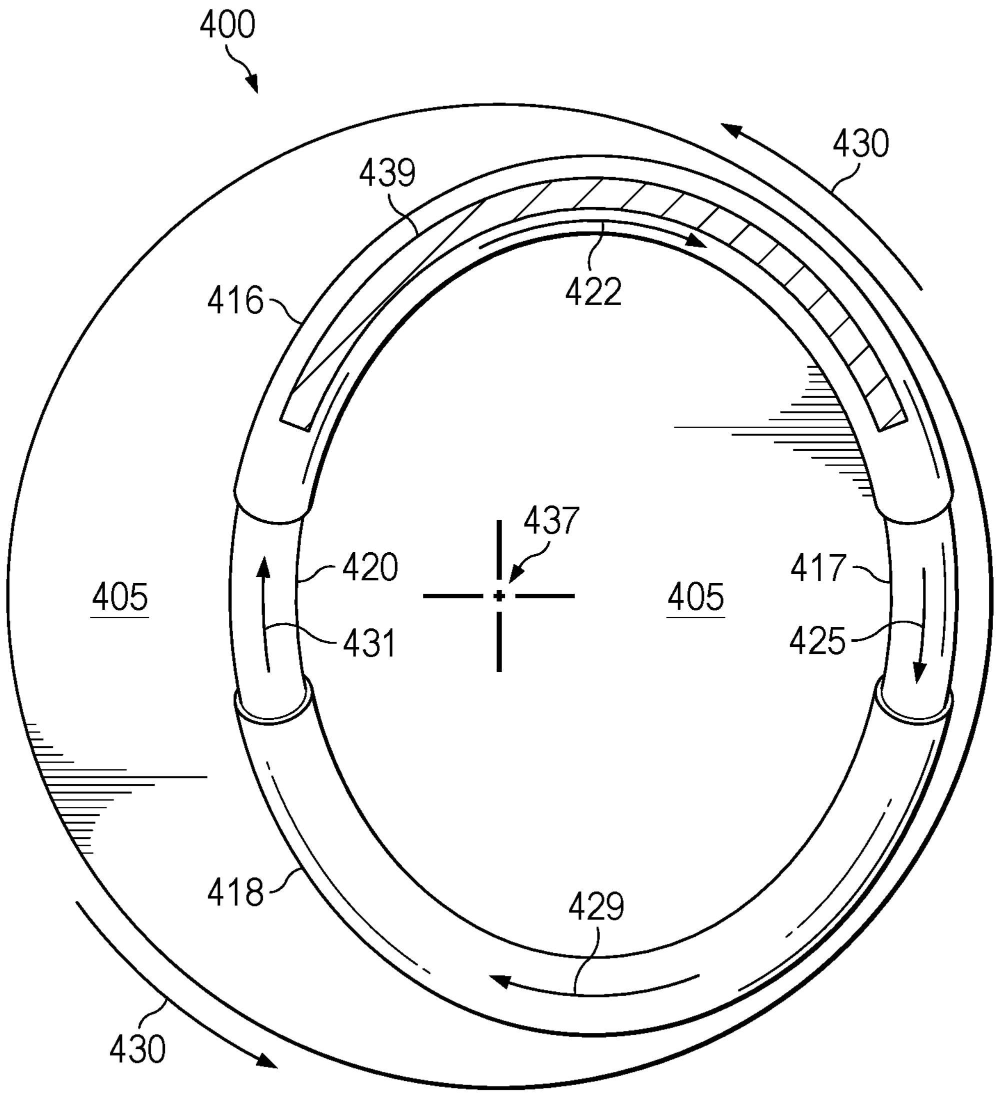
FIG. 78 shows a top-down sectional view of a partial and/or incomplete version of the seventh embodiment of the present invention.

FIG. 78 shows a top-down sectional view of the same partial and/or incomplete version of the embodiment 400 of the present disclosure that is illustrated in FIGS. 76 and 77. The partial embodiment illustrated in FIG. 78 lacks the outer insulating cylindrical casing 401, and the central insulating disk 411. In addition, the partial embodiment illustrated in FIG. 78, lacks all but one of the embodiment's five elliptical tubes. The sectional view of the partial and/or incomplete version of the embodiment 400 of the present disclosure has been employed to remove the hot thermal plate 404, and the hot shaft 402, so as to permit a top-down illustration of the single elliptical tube 416-418 and 420 illustrated in FIGS. 76-78. The horizontal section plane of the top-down sectional view illustrated in FIG. 78 is specified in FIG. 66 and the section is taken across line 71-71.

When an embodiment-appropriate temperature difference is created across the hot (404 in FIG. 76) and cold 405 thermal plates, working fluid (not shown) within the tubular channel within an interior of the illustrated elliptical tube 416-418 and 420 flows 422, 425, 429, and 431 in a clockwise direction about the embodiment's axis of rotation 437. In response to the thermally-driven, and/or thermally-induced, clockwise flow of the working fluid, the embodiment rotates 430 in a counterclockwise direction about the axis of rotation.

Figure 79:
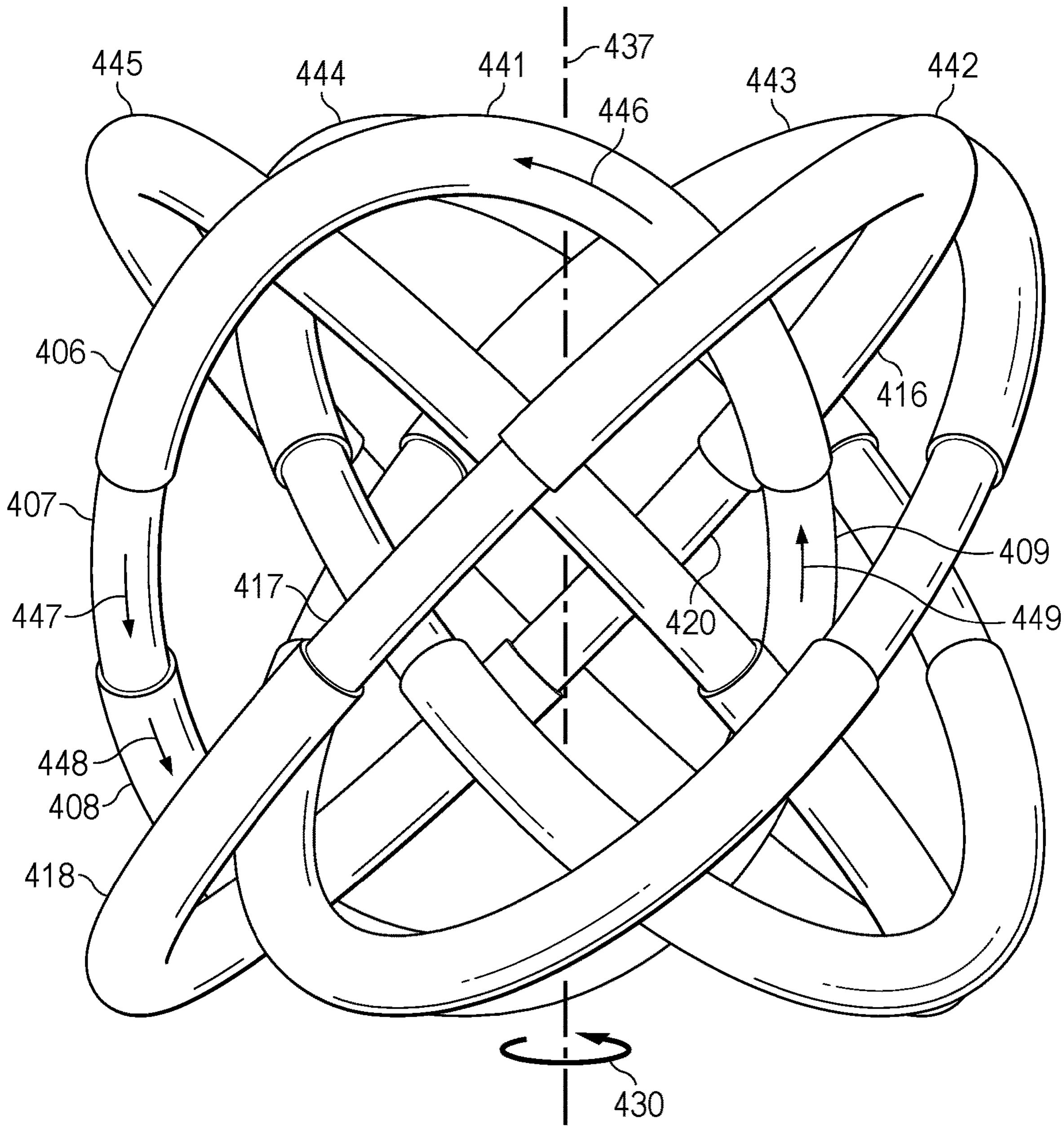
FIG. 79 shows a side view of a partial and/or incomplete version of the seventh embodiment of the present invention.

FIG. 79 shows a side view of a partial, and/or incomplete, version of the same embodiment 400 of the present disclosure that is illustrated in FIGS. 65-78. The partial embodiment illustrated in FIG. 79 includes only the embodiment's five elliptical fluid-flow tubes to better illustrate their relative positions and orientations.

The embodiment illustrated in FIGS. 65-79 includes five elliptical tubes 441-445. As is typical of each of the embodiment's five elliptical tubes, elliptical tube 441 is comprised of four portions, each portion of which differs in its effect on, and/or thermodynamic interaction with, working fluid (not shown) flowing therein, and/or therethrough. Elliptical tube 441 is comprised of an isothermal expansion portion, e.g., 406, within which working fluid is heated causing it to expand and flow 446. Elliptical tube 441 is further comprised of an adiabatic expansion portion, e.g., 407, within which heated working fluid depressurizes as it continues expanding and flowing 447 therethrough adiabatically. Elliptical tube 441 is further comprised of an isothermal contraction portion, e.g., 408, within which expanded and depressurized working fluid is chilled causing it to contract as it flows 448 therethrough. And elliptical tube 441 is further comprised of an adiabatic compression portion, e.g., 409, within which contracted and cooled working fluid is repressurized by mechanical compression as it is forced to flow 449 toward the isothermal expansion portion, e.g., 406, by the rotations 430 of the embodiment.

Similarly, elliptical tube 442 is comprised of an isothermal expansion portion, e.g., 416, an adiabatic expansion, portion, e.g., 417, an isothermal contraction portion, e.g., 418, and an adiabatic compression portion, e.g., 420.

While not individually identified, the remaining three elliptical tubes 443-445 share the same design, construction, geometry, thermodynamic properties, and/or tube portions, as do the elliptical tubes 441 and 442.

Figure 80:
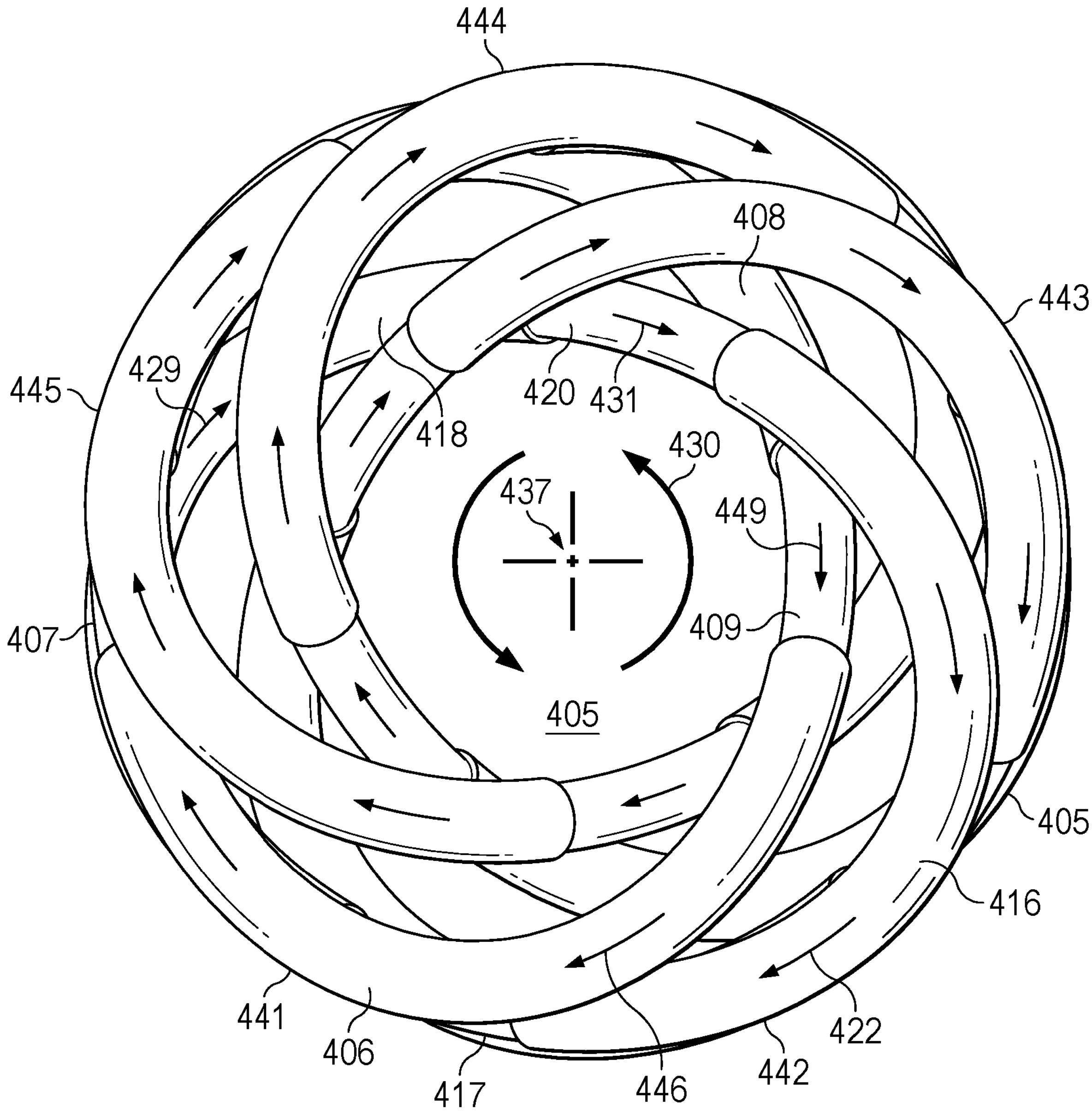
FIG. 80 shows a top-down view of a partial and/or incomplete version of the seventh embodiment of the present invention.

FIG. 80 shows a top-down view of a partial and/or incomplete version of the same embodiment 400 of the present disclosure that is illustrated in FIGS. 65-79. The partial embodiment illustrated in FIG. 79 includes the embodiment's five elliptical tubes, and its cold thermal plate 405, to better illustrate the relative positions and orientations of the elliptical tubes, as well as the relationship between the flow of working fluid (not shown) within each elliptical tube, and the rotation of the embodiment 430 about the embodiment's axis of rotation 437.

Figure 81:
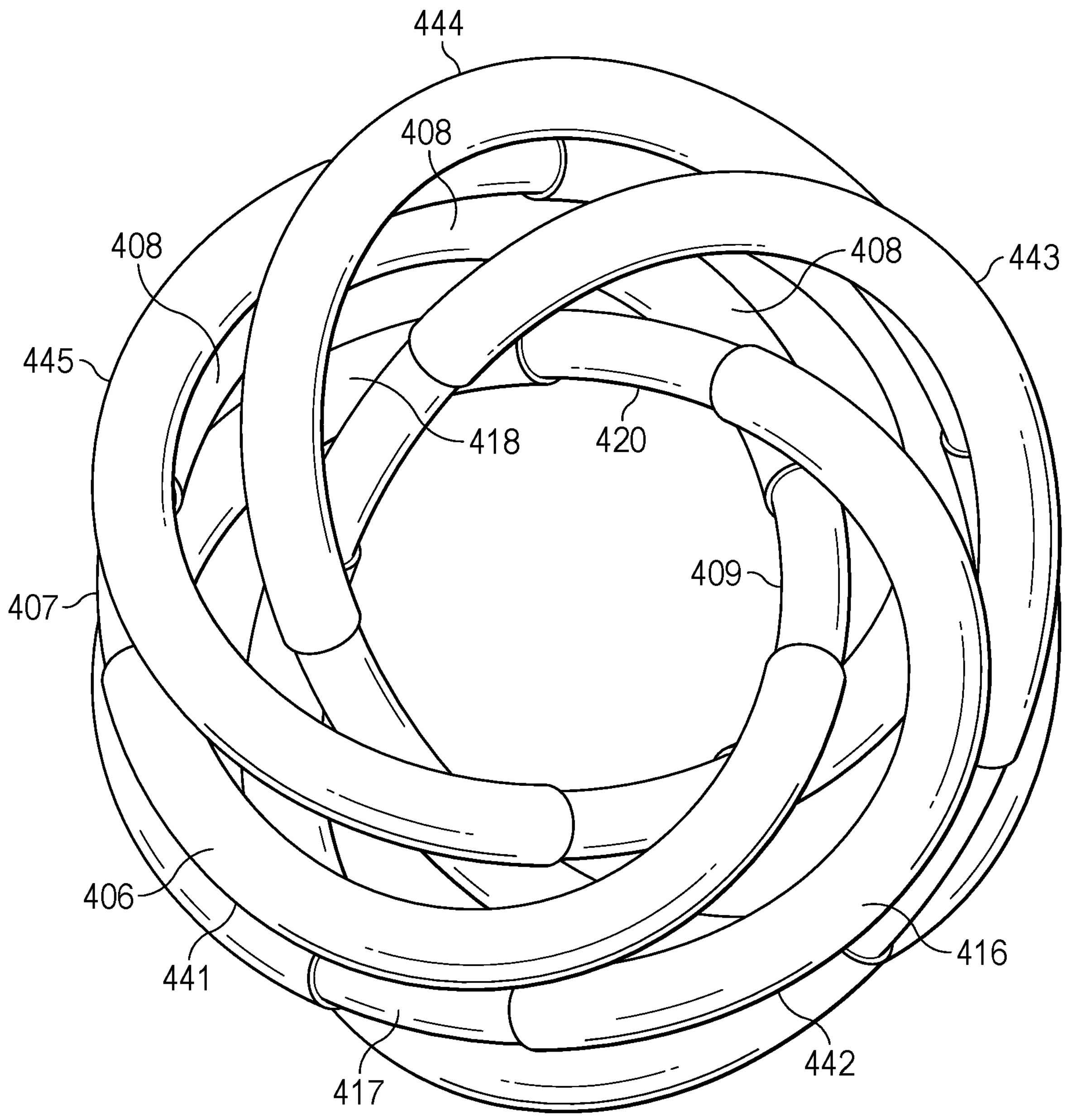
FIG. 81 shows a perspective top-down view of a partial and/or incomplete version of the seventh embodiment of the present invention.

FIG. 81 shows a perspective top-down view of the same partial and/or incomplete version of the embodiment 400 that is illustrated in FIG. 80. The embodiment 400 illustrated in FIG. 81 is the same embodiment of the present disclosure that is illustrated in FIGS. 65-80. The partial embodiment illustrated in FIG. 81 includes only the embodiment's five elliptical tubes to better illustrate their relative positions and orientations.

The varieties of embodiments, their geometries, their working fluids, their operations, and their applications, enumerated within the "Summary of the Invention" section of this disclosure apply to the embodiment illustrated and discussed in relation to FIGS. 65-81, and the scope of the present disclosure includes all such variations of the embodiment illustrated in FIGS. 65-81.

Disclosed in this specification, and in FIGS. 65-81, is a rotatable, closed-cycle heat engine comprising: upper and lower rotational shafts coaxial with a longitudinal axis; five elliptical working-fluid-flow tubes, each containing a working fluid, and radially arrayed about the upper and lower rotational shafts; a heat-receiving thermal conduit adapted to thermally connect to an external source of heat; a heat-dissipating thermal conduit adapted to thermally connect to an external thermal sink; wherein each elliptical working-fluid-flow tube is configured to cause a flow of working fluid within its respective tubular channel and in a first rotational direction about the longitudinal axis when the temperature of the heat-receiving thermal conduit is raised to a first temperature, and when the temperature of the heat-dissipating thermal conduit is lowered to a second temperature.

Figure 82:
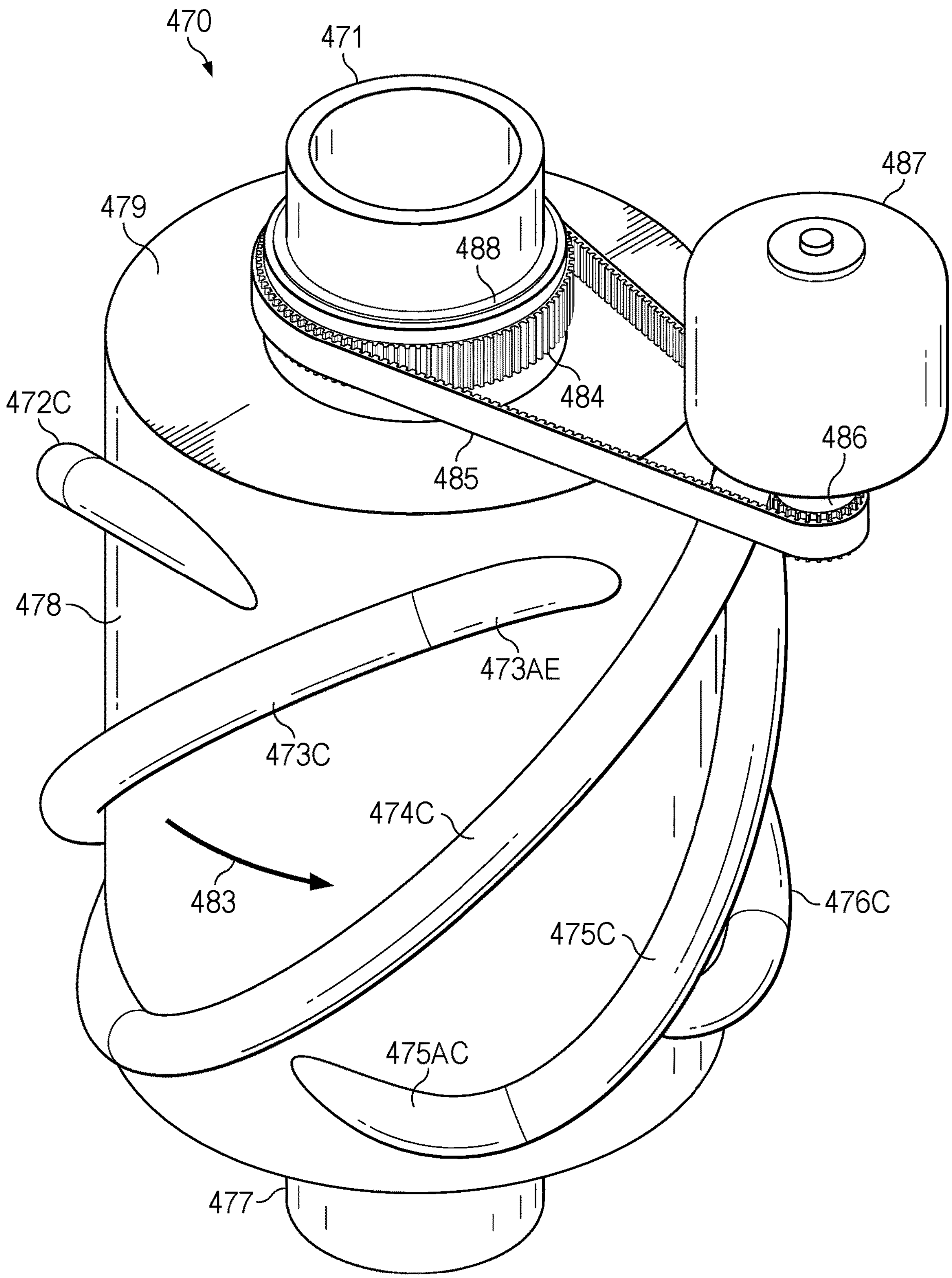
FIG. 82 shows a perspective side view of an eighth embodiment of the present invention.

FIG. 82 shows a perspective side view of an embodiment 470 of the present disclosure.

The embodiment illustrated in FIG. 82 receives a hot fluid (gas, liquid, particulates, and/or plasma) through a hot inlet 471 (e.g., when the mouth of that hot inlet is fluidly connected to a pipe through which a hot fluid flows to, into, and through, the embodiment). The hot fluid introduced to the embodiment through its hot inlet then flows through a heat discharge tube (not visible) within the embodiment. And a portion of the thermal energy of the hot fluid that flows through the embodiment is transmitted, transferred, and/or conducted, to the thermally-conductive walls of respective isothermal expansion portions (not visible) of five elliptical working-fluid-flow tubes 472-476 through which flow respective and fluidly-separate portions, masses, and/or quantities, of a working fluid (not shown).

After discharging, imparting, conducting, and/or transferring, a portion of its thermal energy to the embodiment 470, the thermally dissipated hot fluid (not shown) is discharged from the embodiment through a hot effluent outlet 477.

An interior of the embodiment 470, and a portion of each of the embodiment's five elliptical tubes 472-476, are surrounded by an insulating cylindrical tube 478, the upper and lower apertures of which are thermally sealed by respective upper 479 and lower (not visible) insulating end caps.

After being heated with heat, and/or thermal energy, imparted by the hot fluid (not shown) that flows into the embodiment's hot inlet 471, the working fluid flowing through the respective isothermal expansion portion (not visible) of each of the embodiment's five elliptical tubes 472-476 flows into a respective adiabatic expansion portion of each of the embodiment's five elliptical tubes. Each adiabatic expansion portion, e.g., 473AE, of each of the embodiment's five elliptical tubes, passes through the insulating cylindrical tube 478 thereby providing a channel through which the heated working fluid in each elliptical tube flows from an interior of the embodiment (i.e., within the interior of the insulating cylindrical tube) to an exterior of the embodiment (i.e., outside the insulating cylindrical tube).

After adiabatically expanding within the respective adiabatic expansion portion, e.g., 473AE, of each of the embodiment's five elliptical tubes 472-476, the working fluid within each of the embodiment's five elliptical tubes, flows into a respective and fluidly-connected isothermal contraction portion, e.g., 473C. The thermally-conductive wall of the isothermal contraction portion of each of the embodiment's five elliptical tubes are warmed by the working fluid (not shown) flowing therethrough. A portion of the thermal energy transferred, and/or conducted, from the working fluid to the wall of each respective isothermal contraction tube portion is then transferred to a relative cold exterior fluid (liquid or gas) outside the embodiment's insulating cylindrical tube 478. The embodiment illustrated in FIG. 82 may operate in air, and warm that, air as it transfers thermal energy from its working fluid to the walls of its isothermal contraction tube portions. The embodiment illustrated in FIG. 82 may operate partially or fully immersed in a cool fluid, e.g., water, with the water receiving thermal energy from the walls of the working-fluid-warmed isothermal contraction tube portions.

After losing thermal energy, while flowing through the embodiment's respective isothermal contraction tube portions, e.g., 473C, the working fluid within each of the embodiment's five isothermal contraction tube portions flows into a respective, and fluidly-connected, adiabatic compression tube portion, e.g., 475AC, wherein the rotations of the embodiment (i.e., in a counterclockwise direction 483 relative to a top-down perspective where the hot inlet 471 is at an upper end) cause the cooled and contracted working fluid in each respective adiabatic compression tube portion to be mechanically compressed.

In response to an inflow of a heated fluid into the embodiment's hot inlet 471, and a dissipation of thermal energy to an exterior fluid (liquid or gas, not shown) outside the embodiment, the embodiment 470 rotates about a longitudinal axis of rotation (not shown) coaxial with the radial axis of symmetry of the hot inlet and the hot effluent outlet 477. A driving gear 484, laterally, radially, and/or circumferentially, adjacent to the hot inlet, rotates with the embodiment. Rotations of the driving gear cause a gear belt 485 to be rotated about, and/or with, the driving gear. And, rotations of the gear belt cause an operably connected generator gear 486 to rotate, which rotates the rotor of a generator 487, thereby causing the generator to produce electrical power.

Upper 488 and lower (not visible) bearings facilitate rotations of the elliptical tube assembly, e.g., 472-476, and the rigidly interconnected structure (e.g., 478 and 479) of which it is a part, relative to the nominally fixed, and/or non-rotating, hot inlet 471 and hot effluent outlet 477.

Figure 83:
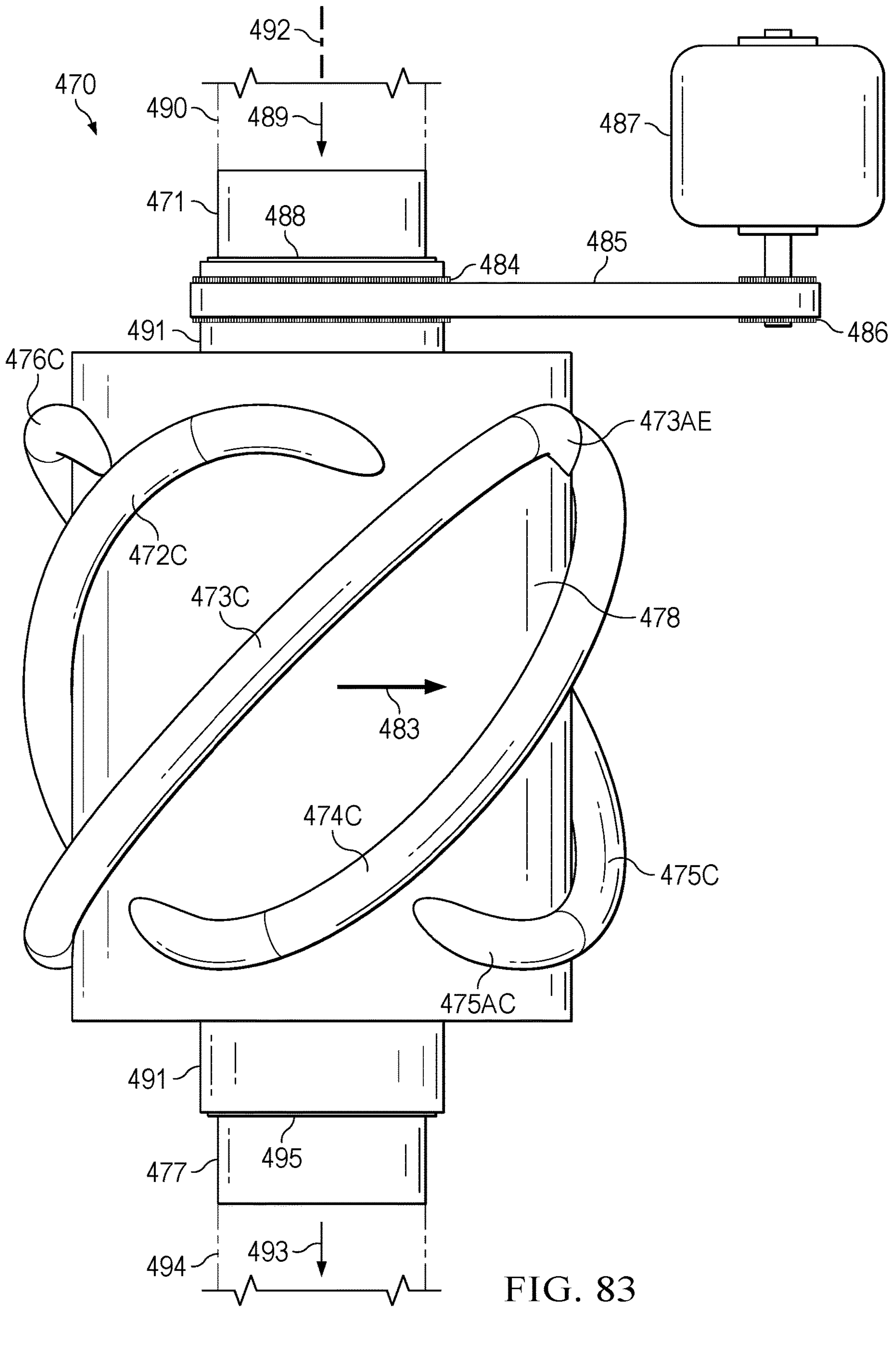
FIG. 83 shows a side view of the eighth embodiment of the present invention.

FIG. 83 shows a side view of the same embodiment 470 of the present disclosure that is illustrated in FIG. 82.

When a hot fluid (not shown, gas, liquid, particulates, and/or plasma) flows 489 from a hot fluid feed pipe (positioned as indicated by the dashed line 490 in FIG. 83) into the embodiment's hot inlet 471, and therethrough into the embodiment's hot tube 491, the rotatable portion of the embodiment, i.e., that portion of the embodiment that excludes the positionally fixed hot inlet and hot effluent outlet 477, will tend to rotate about a longitudinal, and/or rotational, axis 492 of the embodiment in a counterclockwise direction 483 of rotation (i.e., relative to a top-down perspective of the embodiment in the illustration of FIG. 83).

As the rotatable portion of the embodiment rotates 483, the driving gear 484 fixedly attached to the end of the embodiment's hot tube 491 proximate to, and rotatably connected to, the hot inlet 471, also rotates, thereby moving, driving, translating, and/or rotating, the gear belt 485, which rotates the generator gear 486, which, in turn, rotates the rotor (not shown) of the embodiment's generator 487, thereby causing the generator to produce electrical power.

After imparting, transferring, conducting, and/or giving up, a portion of its thermal energy to the working fluid flowing in, and/or through, the respective isothermal expansion portions (not visible) of each of the embodiment's five elliptical tubes 472-476, the thermally dissipated, depleted, and/or cooled, hot fluid (not shown, gas, liquid, particulates, and/or plasma) that entered 489 the embodiment through its hot inlet 471, flows 493 out of the embodiment through its hot effluent outlet 477, and therefrom flows into, and through, a hot fluid effluent pipe (positioned as indicated by the dashed line 494 in FIG. 83) fluidly connected to the hot effluent outlet.

The embodiment's hot tube 491 is able to rotate relative to the positionally-fixed hot effluent outlet 477 through an intermediate lower bearing 495 positioned therebetween.

Figure 84:
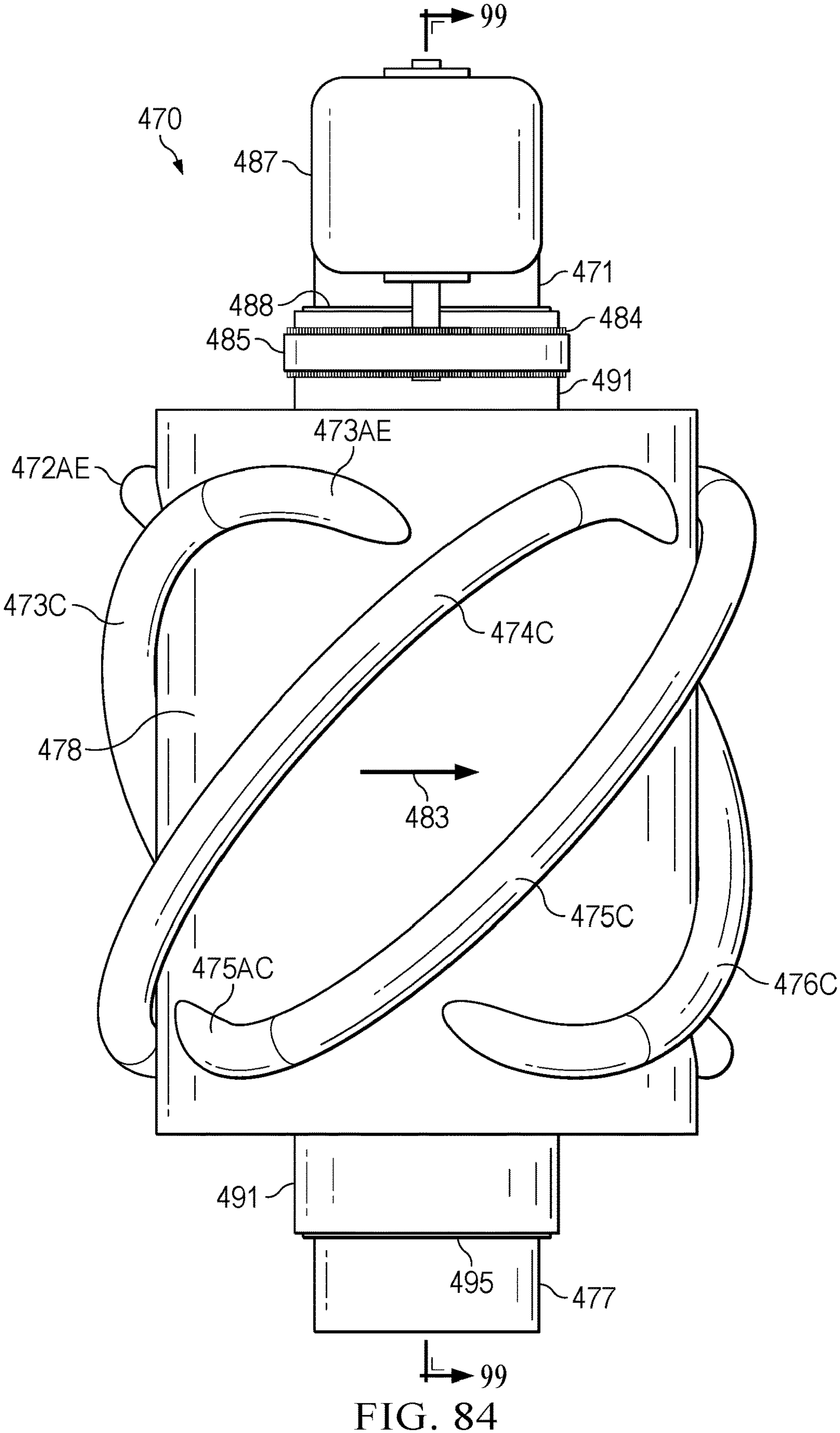
FIG. 84 shows a side view of the eighth embodiment of the present invention.

FIG. 84 shows a side view of the same embodiment 470 of the present disclosure that is illustrated in FIGS. 82 and 83.

Figure 85:
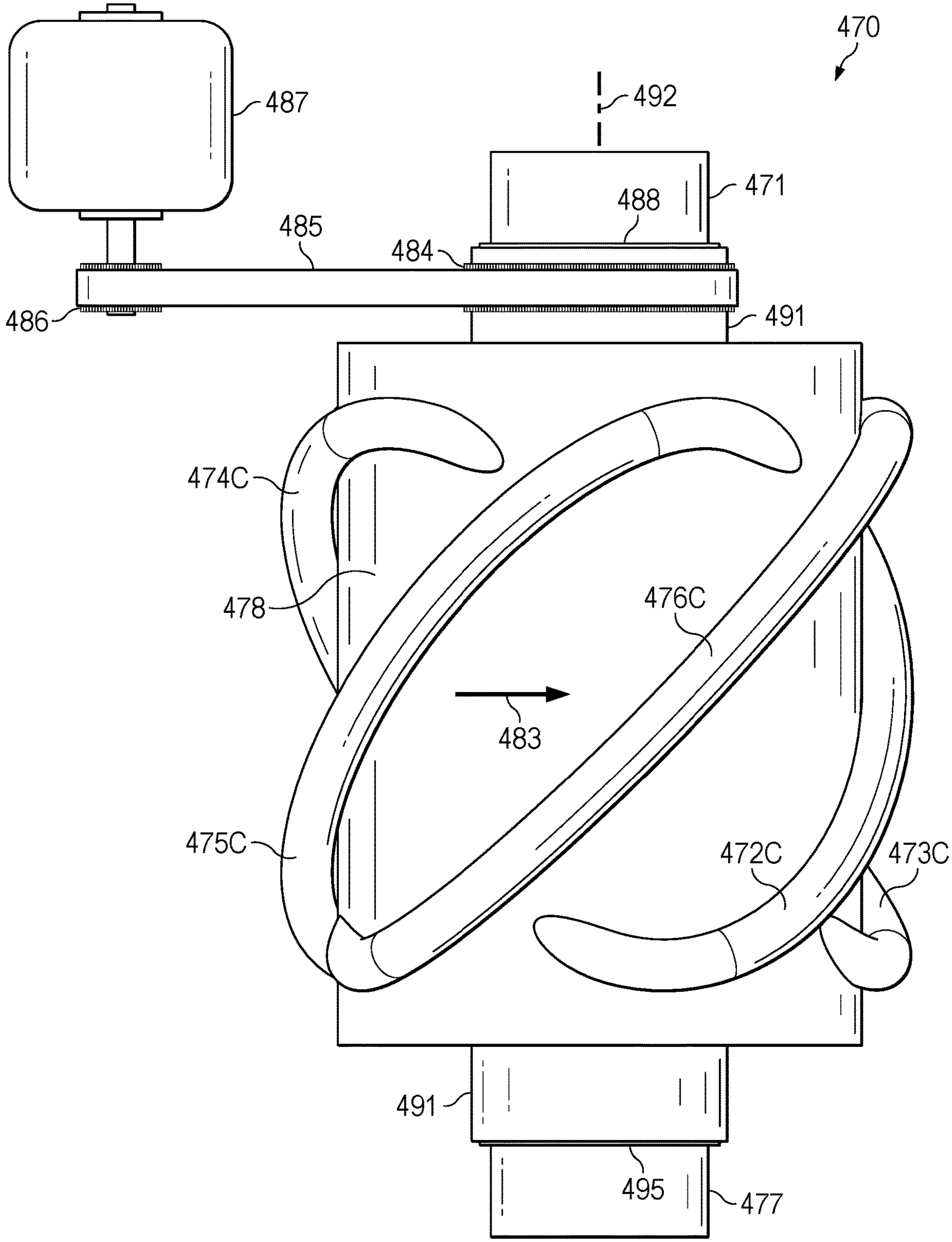
FIG. 85 shows a side view of the eighth embodiment of the present invention.

FIG. 85 shows a side view of the same embodiment 470 of the present disclosure that is illustrated in FIGS. 82-84.

Figure 86:
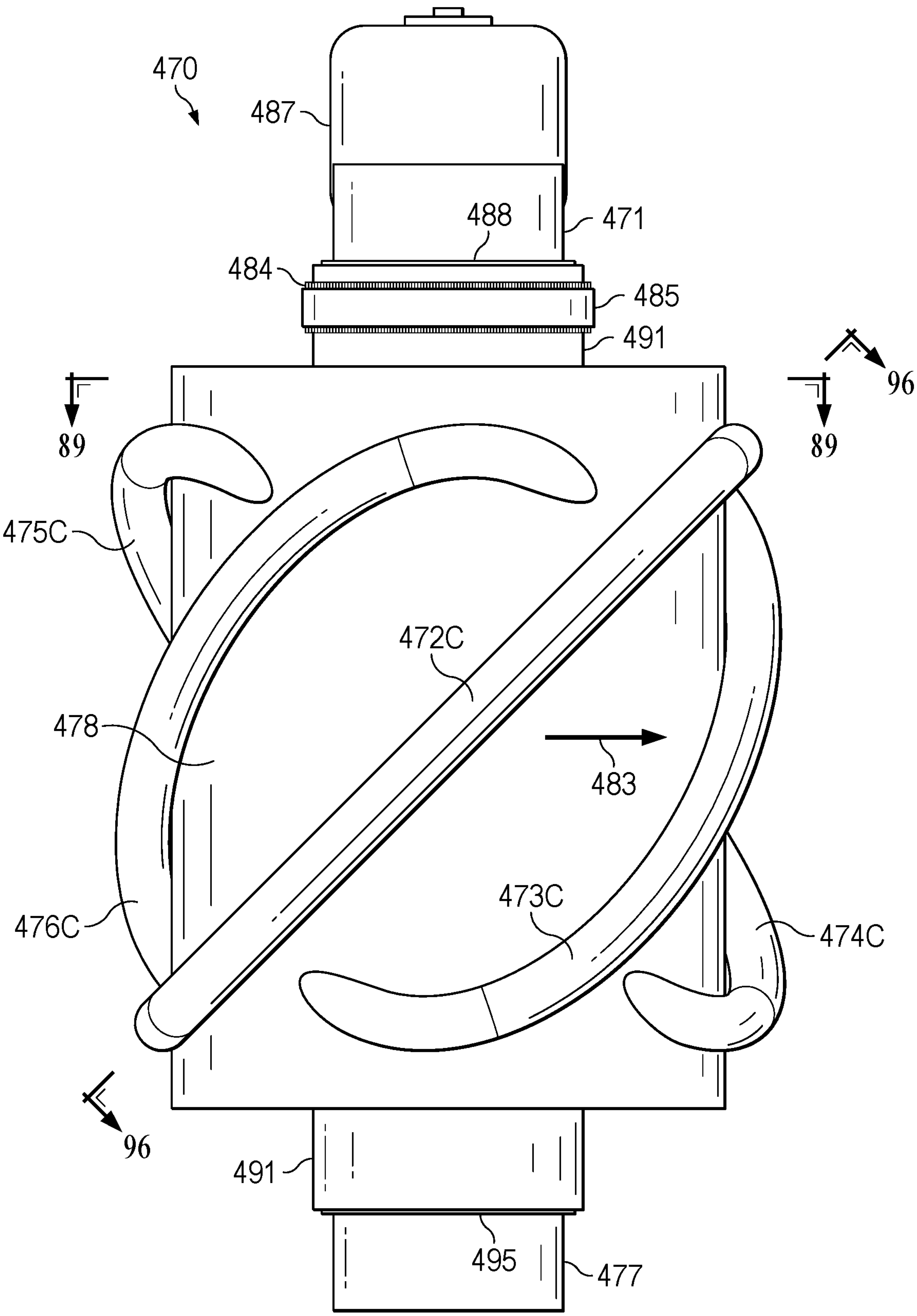
FIG. 86 shows a side view of the eighth embodiment of the present invention.

FIG. 86 shows a side view of the same embodiment 470 of the present disclosure that is illustrated in FIGS. 82-85.

Figure 87:
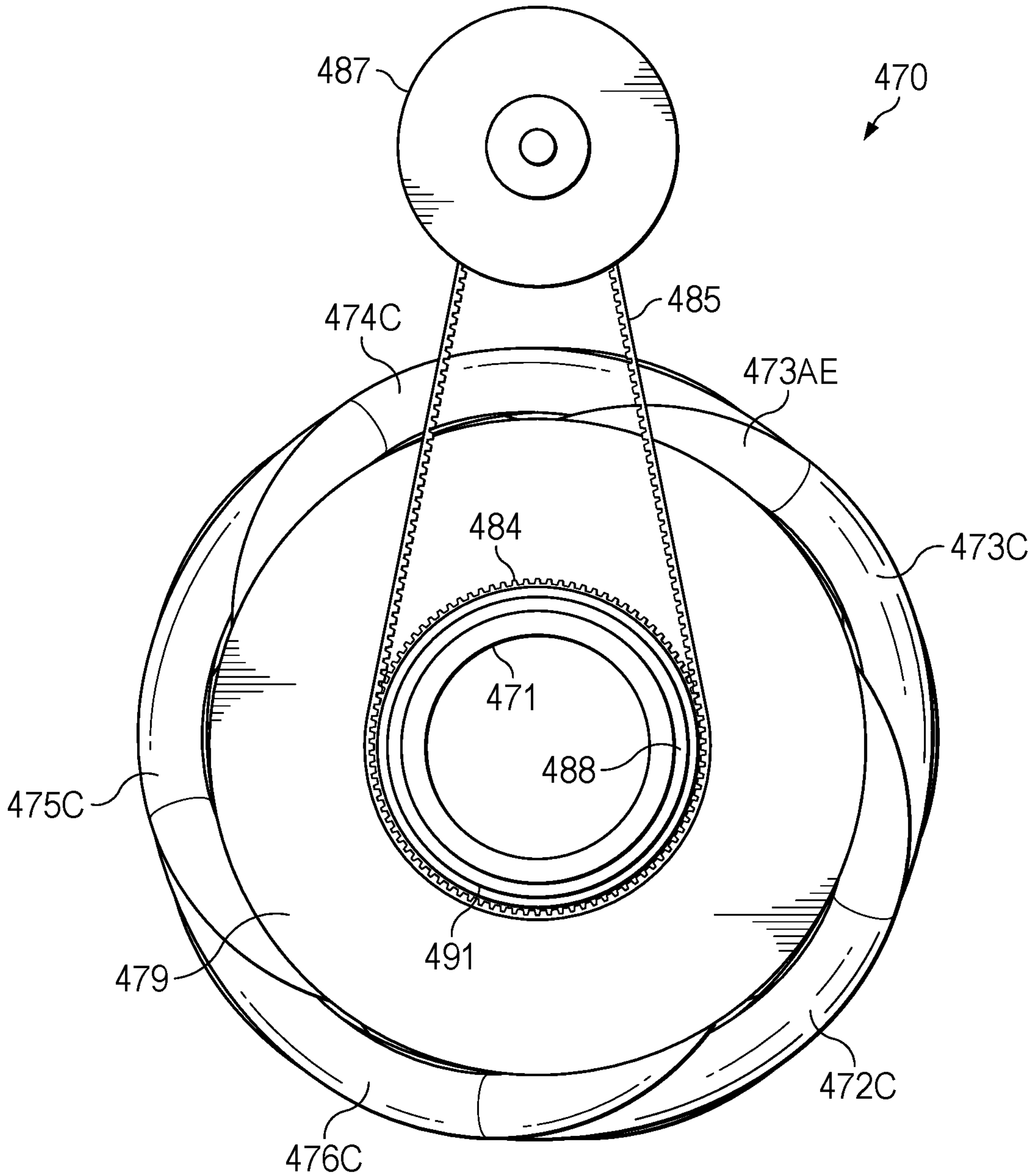
FIG. 87 shows a top-down view of the eighth embodiment of the present invention.

FIG. 87 shows a top-down view of the same embodiment 470 of the present disclosure that is illustrated in FIGS. 82-86.

Figure 88:
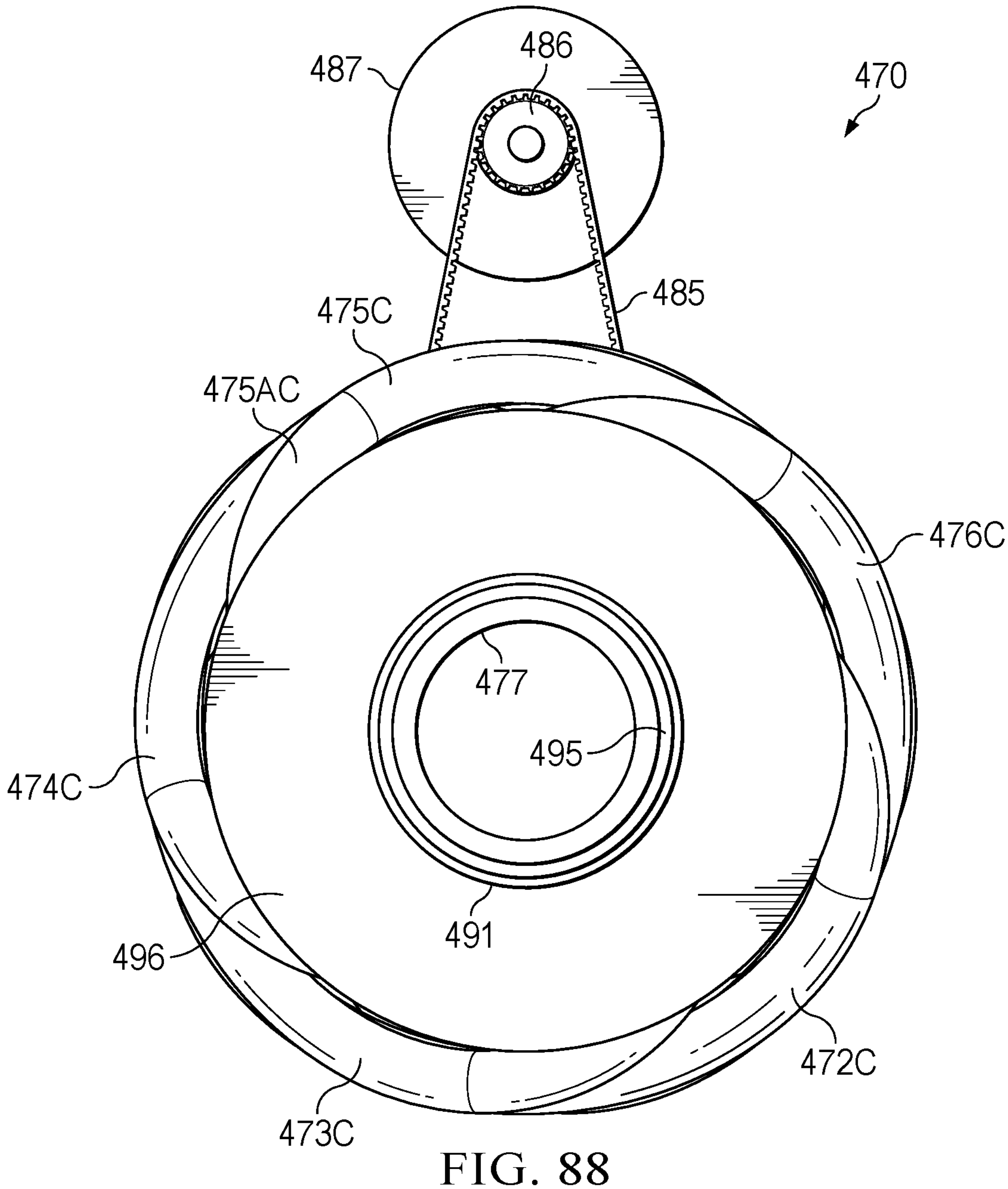
FIG. 88 shows a bottom-up view of the eighth embodiment of the present invention.

FIG. 88 shows a bottom-up view of the same embodiment 470 of the present disclosure that is illustrated in FIGS. 82-87.

Visible in FIG. 88 is the embodiment's lower insulating end cap 496 which, along with the upper insulating end cap (not visible, 479 in FIG. 82) and the insulating cylindrical tube (not visible, 478 in FIG. 82), provides an insulated chamber that preserves, and/or in which remains trapped, the thermal energy imparted to the embodiment by hot fluid (not shown) flowing into the embodiment's hot inlet (not visible, 471 in FIG. 82), and therethrough flowing through the embodiment's hot tube 491, and then flowing out from the embodiment's hot effluent outlet 477. The insulation provided by the insulating cylindrical tube, and its associated upper and lower insulating end caps, prevents a significant portion of the thermal energy imparted to the embodiment by a hot fluid being conducted, transferred, and/or transmitted, to the relatively cool fluid (liquid or gas) outside the embodiment, except by means of a heating and cooling of the working fluid within the embodiment's five elliptical tubes 472-476. The insulation that surrounds and thermally insulates the isothermal expansion portions of the embodiment's five elliptical tubes, increases, and/or preserves, the efficiency with which thermal energy imparted to the working fluid within the embodiment's five elliptical tubes 472-476 is able to manifest mechanical work at the rotor of the embodiment's generator 487.

Figure 89:
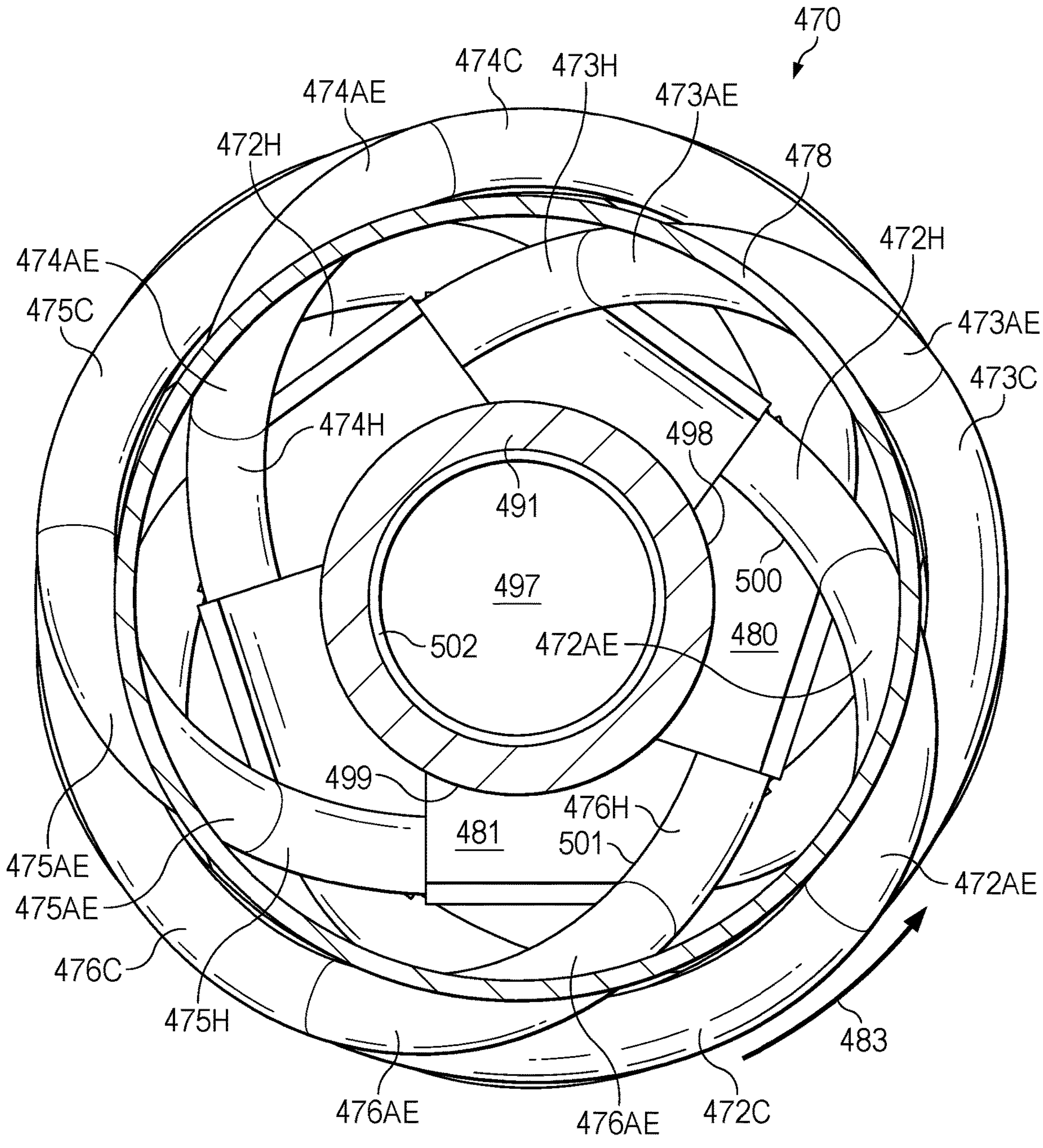
FIG. 89 shows a top-down sectional view of the eighth embodiment of the present invention.

FIG. 89 shows a top-down sectional view of the same embodiment 470 of the present disclosure that is illustrated in FIGS. 82-88 wherein the horizontal section plane is specified in FIG. 86 and the section is taken across line 89-89.

When a hot fluid (not shown, gas, liquid, particulates, and/or plasma) flows into the embodiment's hot inlet (not visible above the section plane, 471 in FIG. 82), it enters, and therefrom flows, through a tubular channel, and/or interior 497, of the embodiment's hot tube 491, and subsequently flows out from the embodiment's hot effluent outlet (not visible, 477 in FIG. 82). Thermal energy from the in-flowed hot fluid is conducted, transmitted, imparted, and/or transferred, to, and/or warms, the thermally-conductive wall of the hot tube. A portion of the thermal energy imparted by the hot fluid to the wall of the embodiment's hot tube is conducted, imparted, transferred, and/or transmitted, to one of five thermally-conductive heat bridges, e.g., 480 and 481. And, a portion of the thermal energy imparted to a heat bridge, e.g., 480 and 481, is then conducted, imparted, transferred, and/or transmitted, to the thermally-conductive tubular wall of a respective isothermal expansion tube portion, e.g., 472H and 476H, respectively, to which the heat bridge is physically and thermally connected. Each of the embodiment's five elliptical tubes 472-476 is thermally connected to the wall of the embodiment's heat tube 491 by a respective heat bridge. And, a portion of the thermal energy conducted, imparted, transferred, and/or transmitted, to the wall of an isothermal expansion tube portion is conducted, imparted, transferred, and/or transmitted, to a respective working fluid (not shown) flowing therethrough.

A portion of the thermal energy conducted, transmitted, imparted, and/or transferred, from a hot fluid (not shown) flowing through the embodiment's hot tube 491 to the thermally-conductive wall of that hot tube, is conducted, transmitted, imparted, and/or transferred, to a thermally-conductive heat bridge, e.g., 480 and 481, across a respective thermally-conductive junction, e.g., 498 and 499, therebetween. A portion of the thermal energy conducted, transmitted, imparted, and/or transferred, to one of the embodiment's five heat bridges, e.g., 480 and 481, is therethrough conducted, transmitted, imparted, and/or transferred, to a respective isothermal expansion tube portion, e.g., 472H and 476H, across respective thermally-conductive junction, e.g., 500 and 501, therebetween.

An upper and inner edge 502 of the wall of the embodiment's hot tube 491 is beveled in order to minimize any turbulent disruption to a flow of hot fluid (not shown) from the embodiment's non-rotating, and positionally-fixed, hot inlet (not visible, 471 in FIG. 82) and into the tubular channel, and/or interior 497, of the embodiment's rotating hot tube 491.

Figure 90:
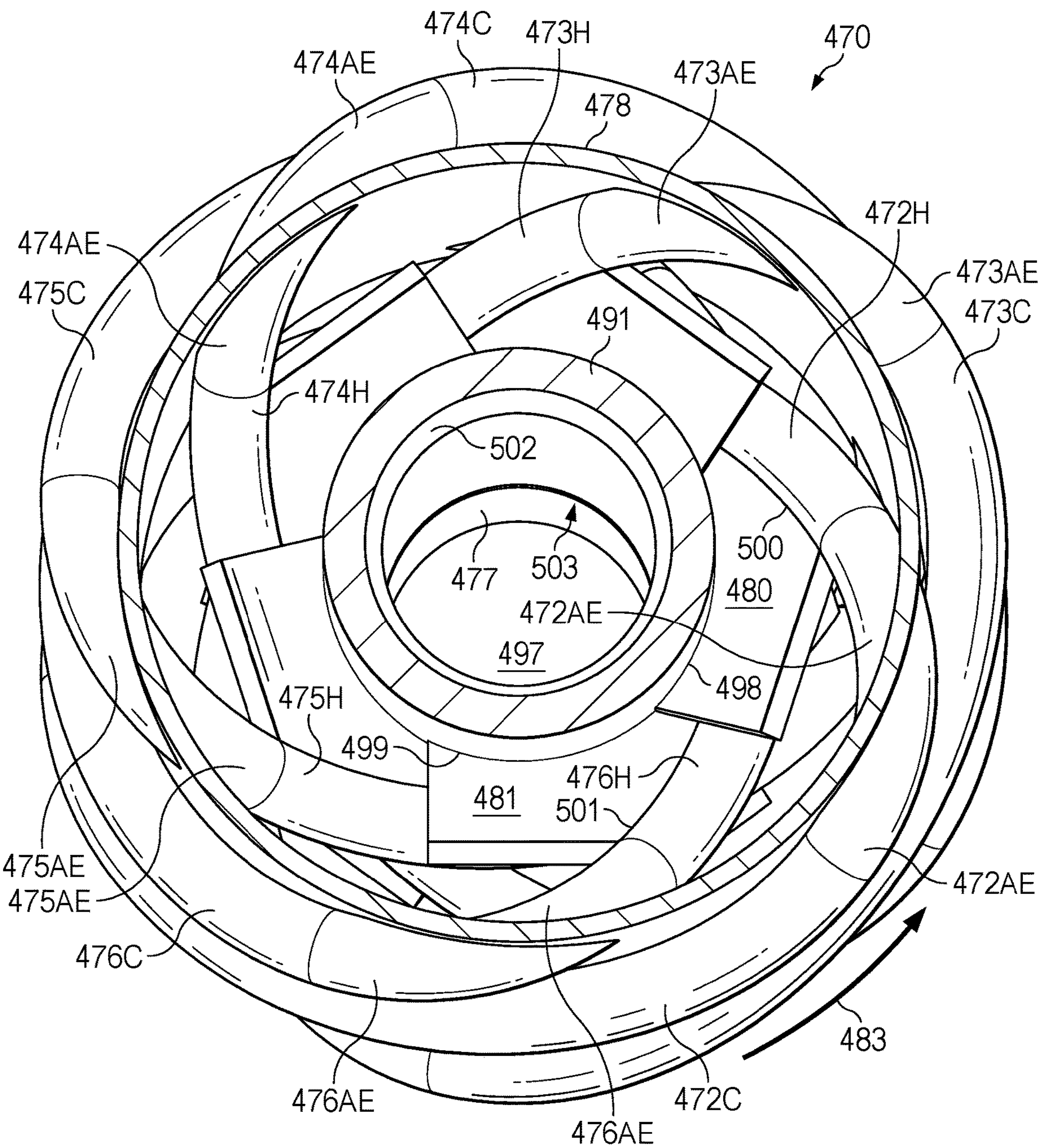
FIG. 90 shows a perspective view of a top-down sectional view of the eighth embodiment of the present invention.

FIG. 90 shows a perspective view of the top-down sectional view of the embodiment 470 of the present disclosure that is illustrated in FIG. 89, which is the same embodiment illustrated in FIGS. 82-88, wherein the horizontal section plane of the illustration is specified in FIG. 86 and the section is taken across line 89-89.

FIG. 90 illustrates a view of an interior of the embodiment's hot tube 491. Visible in FIG. 90 is a gap 503, separation, seam, and/or fissure which separates the rotating hot tube from the non-rotating, and positionally-fixed, hot effluent outlet 477.

Figure 91:
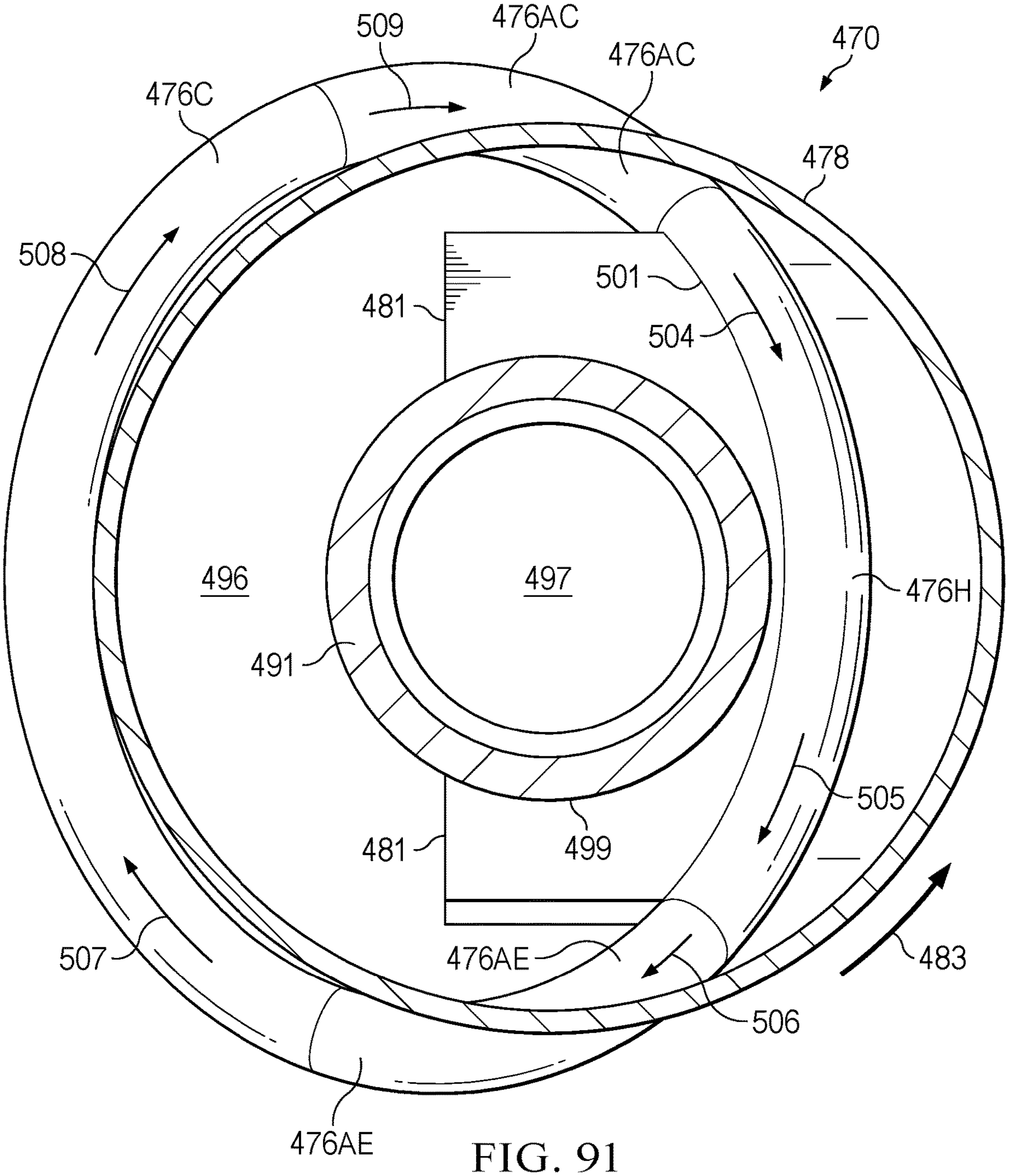
FIG. 91 shows a top-down sectional view of the eighth embodiment of the present invention.

FIG. 91 shows a top-down sectional view of the embodiment 470 of the present disclosure that is illustrated in FIGS. 82-90, wherein the horizontal section plane of the illustration is specified in FIG. 86 and the section is taken across line 89-89. The illustration in FIG. 91 is similar to the illustration in FIG. 89 except that the illustration in FIG. 91 illustrates only one 476 of the embodiment's five elliptical tubes.

When thermal energy from a hot fluid (not shown), flowing through the lumen 497, channel, and/or interior, of hot tube 491, warms the wall of that hot tube, a portion of that wall-absorbed thermal energy flows across thermally-conductive junction 499 and therefrom flows into thermally-conductive heat bridge 481, from where a portion of that thermal energy flows across thermally-conductive junction 501 and into the thermally-conductive wall of the isothermal expansion portion 476H of the elliptical tube 476. A portion of the thermal energy imparted to the wall of the isothermal expansion tube portion 476H flows into, and/or is imparted to, working fluid (not shown) flowing 504 therethrough. As working fluid flows through the channel within the isothermal expansion tube portion, it continues to absorb thermal energy from the wall of that tube portion, which causes that working fluid to expand and flow 505 until it flows out of the isothermal expansion tube portion, and thereafter flows 506 into the physically and fluidly connected adiabatic expansion tube portion 476AE. Within the adiabatic expansion tube portion, the warmed working fluid continues to expand adiabatically causing its volume per unit working-fluid mass to increase, and causing its pressure to fall.

When the working fluid (not shown) flows out of the adiabatic expansion tube portion 476AE, and therefrom flows 507 into the physically and fluidly connected isothermal contraction portion 476C of the elliptical tube 476, a portion of the thermal energy of the working fluid is conducted, transmitted, imparted, and/or transferred, to the wall of that isothermal contraction tube portion. And, a portion of the thermal energy transferred to the wall of the isothermal contraction tube portion is thereafter conducted, transmitted, imparted, and/or transferred, to the fluid (not shown, e.g., liquid, gas, water, or air) outside the embodiment through which the isothermal contraction portions of the embodiment's five elliptical tubes move, and/or rotate.

As working fluid (not shown) continues to flow 508 through the isothermal contraction portion 476C of the elliptical tube 476, it continues to impart thermal energy to the wall of that tube portion, and to thereby, and/or therefore, to continue cooling. As the working fluid cools, it contracts, and its volume per unit mass of working fluid decreases, and it is made more dense.

As cooled and denser working fluid flows out of the isothermal contraction portion 476C of the elliptical tube 476, it therefrom flows 509 into the physically and fluidly connected adiabatic compression portion 476AC of that elliptical tube 476, wherein rotations 483 of the embodiment, and rotations of the elliptical tube 476 therein, in a direction opposite that of the elliptical flow path of the working fluid (not shown), causes rotational energy of the embodiment to act on, do work on, and/or mechanically compress, the working fluid, thereby, and/or therefore, increasing the pressure of that working fluid.

And, as the cooled and compressed working fluid (not shown) flows out of the adiabatic compression portion 476AC of the elliptical tube 476, and therefrom flows 504 into the physically and fluidly connected isothermal expansion portion 476H of that elliptical tube, thermal energy in the wall of that externally-heated isothermal expansion tube portion, causes the working fluid flowing therethrough to warm and expand. And, the cyclic flow of working fluid through the elliptical tube 476 continues as long as the temperature of the hot fluid is appropriate and sufficient, and the temperature and heat capacity of the cooler fluid outside the embodiment are appropriate and sufficient.

The space, volume, and/or chamber, created by, and/or existing within, the insulating cylindrical tube 478, and the upper (not visible, 479 in FIG. 82) and lower 496 insulating end caps, tends to trap the heat that flows from the hot fluid (not shown), flowing within, and/or through, the hot-tube lumen 497, and therefrom flows into the wall of the hot tube 491, the heat bridges, e.g., 481, and the walls of the isothermal expansion tube portions, e.g., 476H, so that most, if not all, of that hot-fluid thermal energy flows from the hot fluid into the working fluid flowing through those isothermal expansion tube portions, rather escaping and flowing directly into, and/or being cooled directly by, the relatively cool fluid outside the embodiment.

The discussion regarding the flow of thermal energy from the hot tube 491 into the working fluid of the one elliptical tube 476 illustrated in FIG. 91 applies equally to each of the embodiment's five elliptical tubes 472-476. FIG. 91 illustrates a single of the embodiment's five elliptical tubes in order to better explain and illustrate the flow of thermal energy through the embodiment, and the embodiment's subsequent, and/or resultant, rotations 483.

Note that the adiabatic expansion tube portion 476AE of the elliptical tube 476 illustrated in FIG. 91 penetrates the insulating cylindrical tube 478 and thereby enables working fluid flowing through that adiabatic expansion tube portion to pass from an interior of the insulated chamber 478, to an exterior of that insulated chamber. Also note that the adiabatic compression portion 476AC of the elliptical tube 476 illustrated in FIG. 91 penetrates the insulating cylindrical tube 478 and thereby enables working fluid flowing through that adiabatic compression tube portion to pass from an exterior of the insulated chamber 478, to an interior of that insulated chamber.

Figure 92:
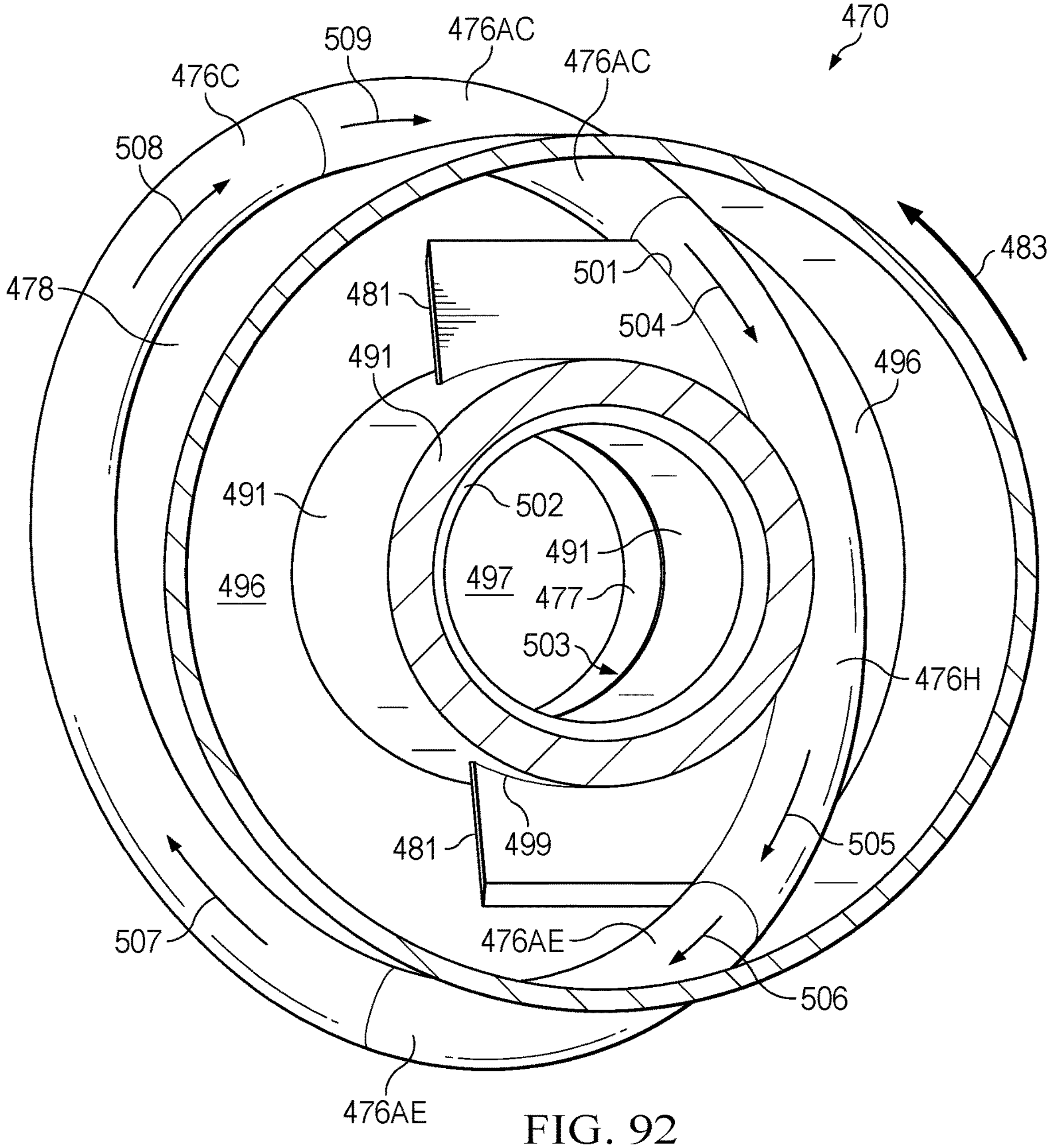
FIG. 92 shows a perspective view of a top-down sectional view of the eighth embodiment of the present invention.

FIG. 92 shows a perspective view of the top-down sectional view of the embodiment 470 of the present disclosure that is illustrated in FIG. 91, which is the same embodiment illustrated in FIGS. 82-91, wherein the horizontal section plane of the illustration is specified in FIG. 86 and the section is taken across line 89-89. As with the illustration of FIG. 91, the illustration of FIG. 92 illustrates only one 476 of the embodiment's five elliptical tubes.

Figure 93:
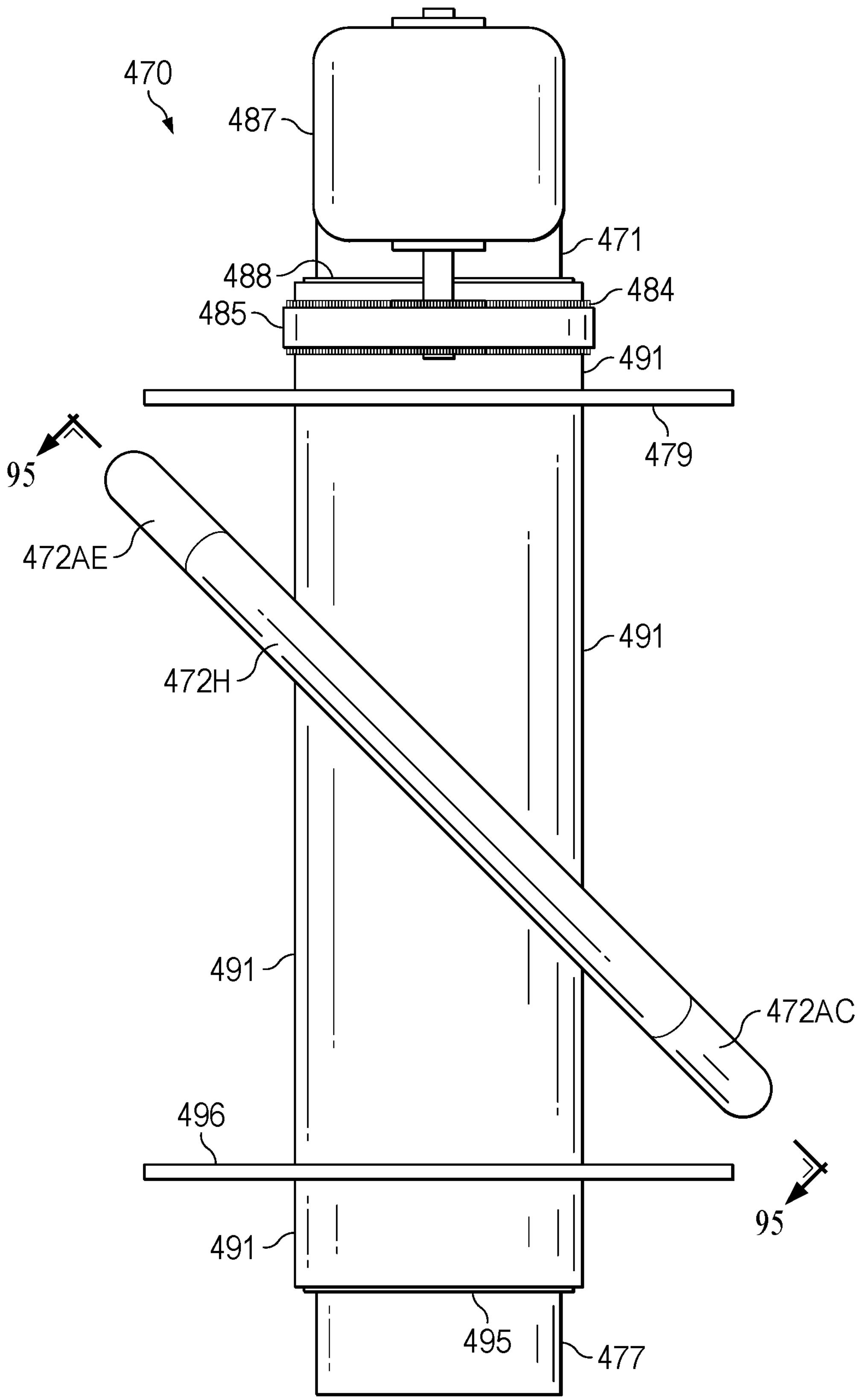
FIG. 93 shows a side view of the eighth embodiment of the present invention.

FIG. 93 shows a side view of the same embodiment 470 of the present disclosure that is illustrated in FIGS. 82-92. However, for the purpose of visibility and explanation, the illustration of embodiment 470 provided in FIG. 93 omits the embodiment's insulating cylindrical tube (478 in FIG. 82), and as with the illustrations of FIGS. 91 and 92, the illustration of FIG. 93 illustrates only one 472 of the embodiment's five elliptical tubes.

The elliptical tube 472 illustrated in FIG. 93 is oriented such that a plane defined by, and/or containing, a centerline, and/or a flow path of the working fluid (not shown) within elliptical tube 472, is neither normal to, or parallel to, the longitudinal axis (492 in FIG. 85) of the embodiment's hot tube 491. The flow path of elliptical tube 472 follows an oblique angle (relative to a longitudinal axis of the hot tube) about the embodiment's hot tube.

Figure 94:
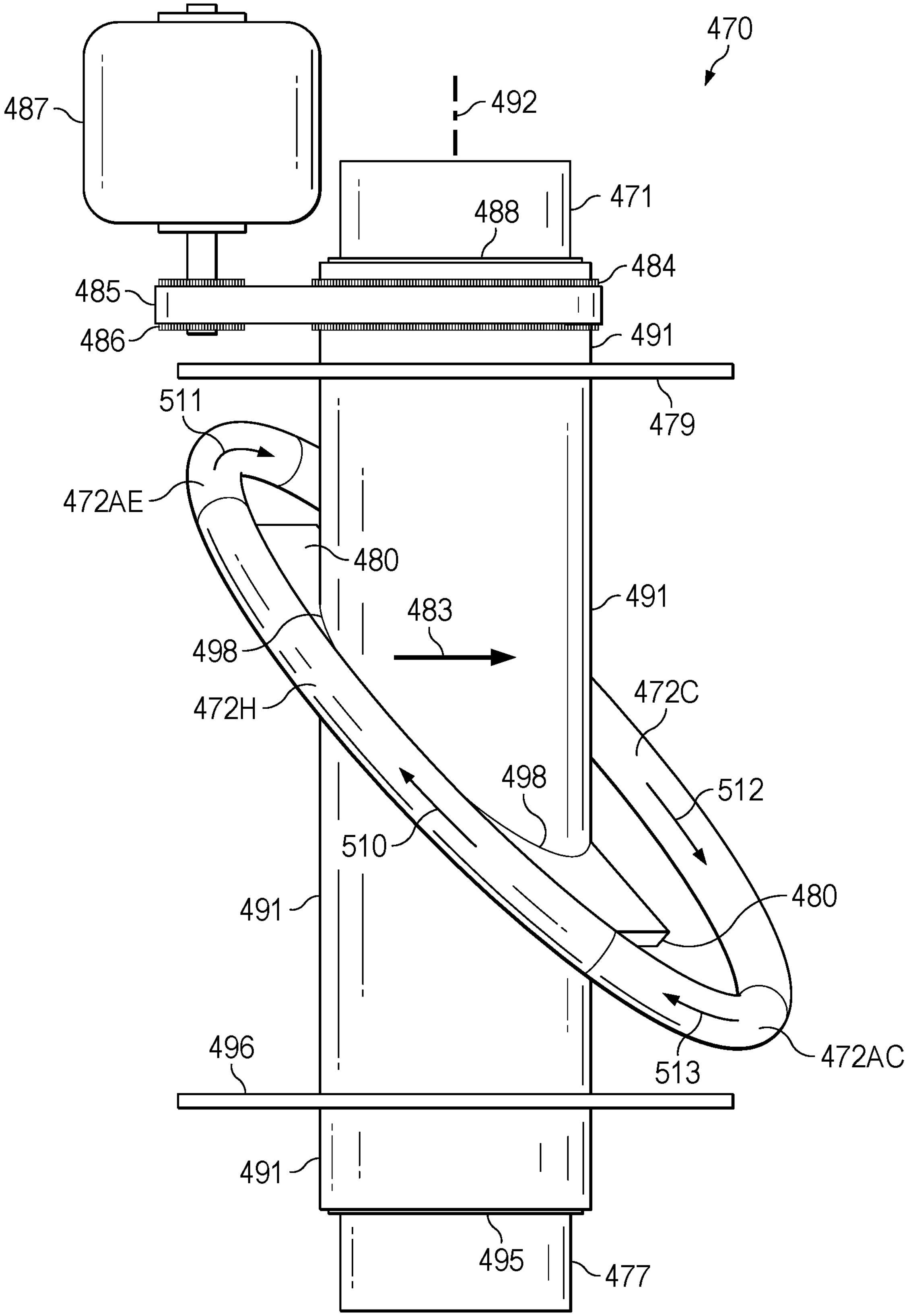
FIG. 94 shows a side view of the eighth embodiment of the present invention.

FIG. 94 shows a side view of the same embodiment 470 of the present disclosure that is illustrated in FIGS. 82-93. However, as was true for the illustration in FIG. 93, for the purpose of visibility and explanation, the illustration in FIG. 94 omits the embodiment's insulating cylindrical tube (478 in FIG. 82), and as with the illustrations of FIGS. 91-93, the illustration of FIG. 94 illustrates only one 472 of the embodiment's five elliptical tubes.

As working fluid (not shown) flows through an interior channel (not visible) within the illustrated elliptical tube 472 its rotational momentum in a clockwise direction (relative to a top-down perspective of the embodiment) about the embodiment's longitudinal axis of rotation 492 causes the embodiment to manifest a rotation 483 in the opposite counterclockwise direction.

When working fluid (not shown) within the isothermal expansion portion 472H of the illustrated elliptical tube 472 is exposed to, and absorbs, thermal energy from the wall of that tube portion, it expands and flows 510 in an upward and clockwise direction about the embodiment's longitudinal axis of rotation 492. When heated working fluid flows from the isothermal expansion tube portion and therefrom flows 511 into and through the physically and fluidly connected adiabatic expansion tube portion 472AE it continues flowing in a clockwise direction as it expands adiabatically. When the working fluid flows from the adiabatic expansion tube portion and therefrom flows 512 into and through the isothermal contraction tube portion 472C it continues flowing in a clockwise direction as it cools and contracts. Finally, when the working fluid flows from the isothermal contraction tube portion and therefrom flows 513 into and through the adiabatic compression tube portion 472AC the rotation 483 of the embodiment, and the elliptical tube 472 therein, forces the contracted and relatively cold working fluid therein to continue flowing in a clockwise direction, e.g., due to its inertial and its inability to thermally expand, thereby mechanically compressing that working fluid.

Figure 95:
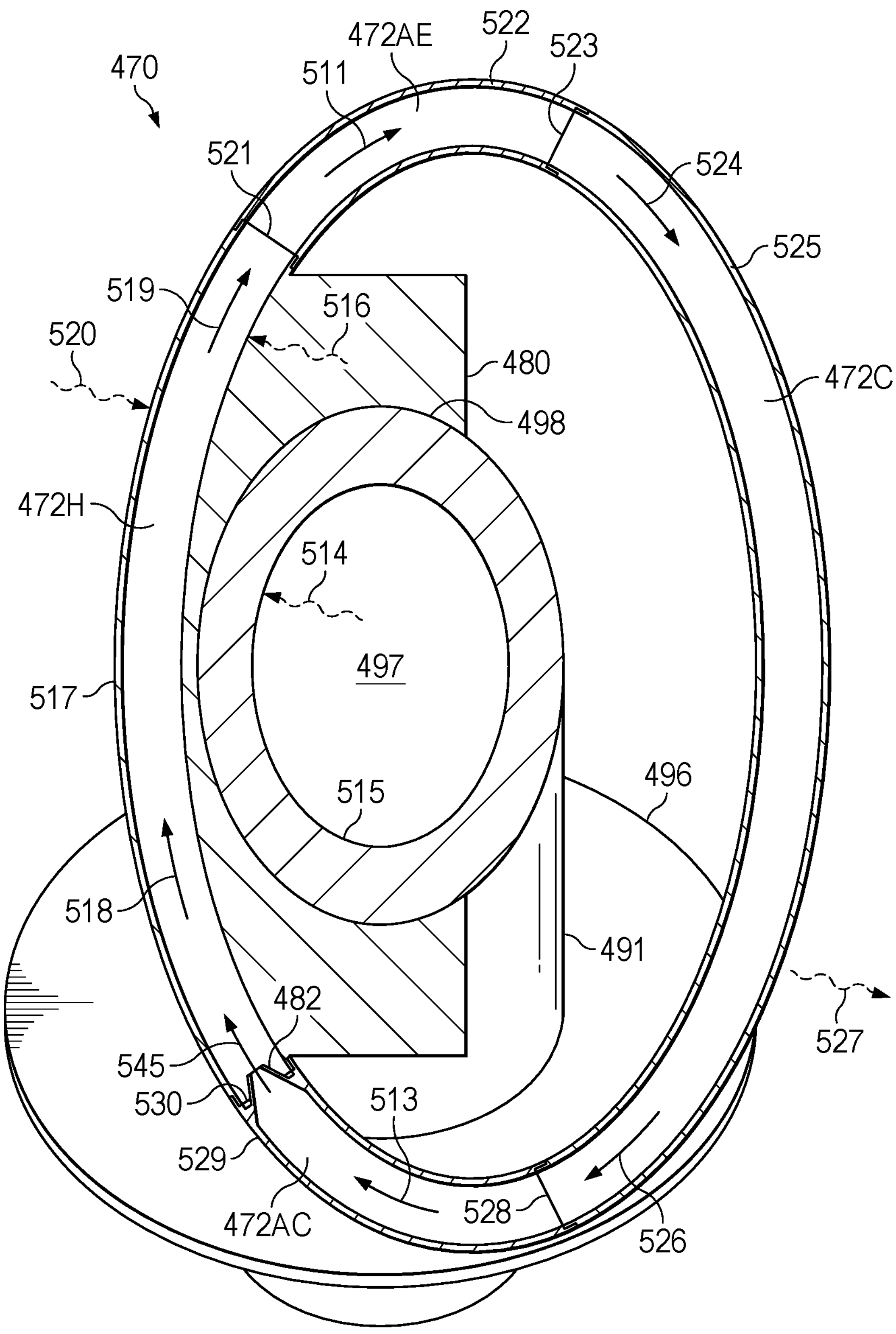
FIG. 95 shows a perspective sectional view of the eighth embodiment of the present invention.

FIG. 95 shows a perspective sectional view of the same embodiment 470 of the present disclosure that is illustrated in FIGS. 82-94. However, as was true for the illustrations in FIGS. 93 and 94, for the purpose of visibility and explanation, the sectional illustration in FIG. 95 omits the embodiment's insulating cylindrical tube (478 in FIG. 82), and as with the illustrations of FIGS. 91-94, the illustration of FIG. 95 illustrates only one 472 of the embodiment's five elliptical tubes. The oblique section plane is specified in FIG. 93 and the section is taken across line 95-95.

When a hot fluid (not shown) flows through an interior 497 of the embodiment's hot tube 491, a portion of the hot fluid's thermal energy is conducted 514, transmitted, imparted, and/or transferred, into the thermally-conductive wall 515 of that hot tube. A portion of that thermal energy within the wall of the hot tube is similarly conducted, transmitted, imparted, and/or transferred, across the thermally-conductive junction 498, which thermally connects the hot tube wall to the thermally-conductive heat bridge 480. And, a portion of the thermal energy conducted across the thermally-conductive junction 498 to the heat bridge is subsequently conducted 516, transmitted, imparted, and/or transferred, to, and/or into, the thermally-conductive wall 517 of the isothermal expansion portion 472H of the illustrated elliptical tube 472.

Working fluid (not shown) entering, and/or flowing into 518, the isothermal expansion tube portion 472H of the illustrated elliptical tube 472 absorbs thermal energy from the thermally-conductive wall of that tube portion which causes that heated working fluid to expand and to flow 519 out of the isothermal expansion tube portion. Some of the thermal energy conducted, transmitted, imparted, and/or transferred, from the hot fluid (not shown) to the wall of the hot tube 491, the heat bridge 480, and the wall 517 of the isothermal expansion tube portion, escapes into an interior of the insulated chamber comprised of the insulating cylindrical tube (478 in FIG. 82), and the upper (479 in FIG. 82) and lower 496 insulating end caps. A portion of that escaped thermal energy is subsequently conducted 520, transmitted, imparted, and/or transferred, into the wall of the isothermal expansion tube portion (or into the walls of the isothermal expansion portions of one of the embodiment's other four elliptical tubes (not shown in FIG. 95) from where that escaped thermal energy is able to warm the working fluid flowing therethrough.

Heated working fluid (not shown) flows 519 out of the isothermal expansion tube portion 472H and across an H-AE (i.e., a "hot-adiabatic-expansion") tube junction 521 and therethrough flows 511 into and through the adiabatic expansion portion 472AE of the elliptical tube 472. The wall 522 of the adiabatic expansion tube portion is insulating, and/or not thermally conducting, and working fluid flowing therethrough continues expanding while not receiving a continuing influx, and/or inflow, of any additional thermal energy which might otherwise thermally power, and/or maintain the working fluid's pressure during, that continued working-fluid expansion. Therefore, the working fluid expanding within the adiabatic expansion tube portion of the elliptical tube 472 tends to experience, and/or manifest, a reduction in its pressure, as well as an increase in its volume per unit working-fluid mass. The adiabatic expansion tube portion of the elliptical tube 472 carries, and/or permits a flow, of the expanding working fluid therein out from an interior of the insulated chamber (comprised of the insulating cylindrical tube, 478 in FIG. 82, and the upper, 479 in FIG. 82, and lower 496 insulating end caps) to an exterior of that insulated chamber.

Adiabatically expanding working fluid (not shown) flows 511 out of the adiabatic expansion tube portion 472AE and across an AE-C (i.e., "adiabatic-expansion-cold") tube junction 523 and therethrough flows 524 into the isothermal contraction portion 472C of the elliptical tube 472. The wall 525 of the isothermal contraction tube portion is thermally-conductive and thermally connected to a relatively cool fluid (liquid or gas, e.g., air) outside the insulated chamber (comprised of the insulating cylindrical tube, 478 in FIG. 82, and the upper, 479 in FIG. 82, and lower 496 insulating end caps). Working fluid flowing 524 and 526 within, and/or through, the isothermal contraction tube portion of the elliptical tube conducts, transmits, imparts, and/or transfers, a portion of its thermal energy to the thermally-conductive wall 525 of that isothermal contraction tube portion. And, a portion of the thermal energy so imparted is then conducted 527, transmitted, imparted, and/or transferred, to the relatively cool fluid (liquid or gas, e.g., air) outside the insulated chamber (not shown), thereby cooling the working fluid. The cooling of the working fluid as it flows through the isothermal contraction tube portion causes it to contract, and/or causes its volume per unit working-fluid mass to decrease.

Cooled working fluid (not shown) flows 526 out of the isothermal contraction tube portion 472C and across a C-AC (i.e., a "cold-adiabatic-contraction") tube junction 528 and therethrough flows 513 into and through the adiabatic compression portion 472AC of the elliptical tube 472. The wall 529 of the adiabatic compression tube portion is insulating, and/or not thermally-conducting, and working fluid flowing therethrough is mechanically compressed by a rotational force applied to it by, and/or as a consequence of, the rotation (483 in FIG. 94) of the embodiment, and the elliptical tube 472 therein. Due to the absence of an outflow of thermal energy, and as a consequence of the rotation of the embodiment, the working fluid within the adiabatic compression tube portion is mechanically compressed and its pressure tends to increase as a result of that mechanical compression. The adiabatic compression tube portion carries, and/or permits a flow, of the working fluid therein from an exterior of the insulated chamber (not shown, and comprised of the insulating cylindrical tube, 478 in FIG. 82, and the upper, 479 in FIG. 82, and lower 496 insulating end caps) to an interior of that insulated chamber.

Adiabatically compressed working fluid (not shown) flowing 513 through the adiabatic compression tube portion 472AC of the elliptical tube 472 flows to an AC-H (i.e., an "adiabatic-compression-hot") tube junction 530 whereat the working fluid flows 545 into and through a frustoconical diodic valve 482, thereafter flowing into 518 the isothermal expansion portion 472H of the elliptical tube 472, where it is once again heated, e.g., 516 and 520, causing it to once again expand and flow 519. The frustoconical diodic valve facilitates a flow 545 of working fluid from the adiabatic compression tube portion into the isothermal expansion tube portion, however, the frustoconical diodic valve inhibits and/or partially obstructs a flow of working fluid of an opposite flow direction from the isothermal expansion tube portion and into the adiabatic compression tube portion.

Figure 96:
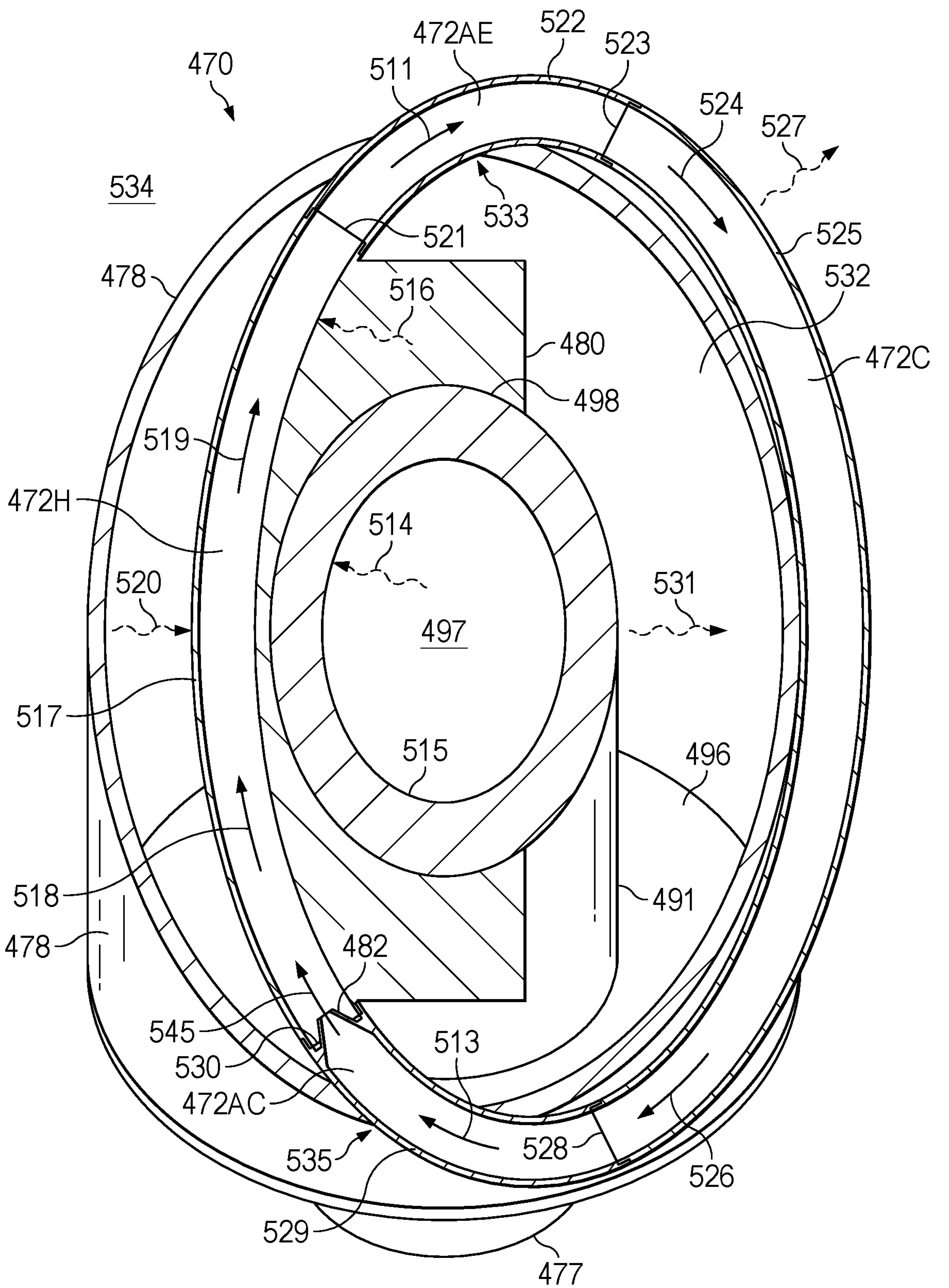
FIG. 96 shows a perspective sectional view of the eighth embodiment of the present invention.

FIG. 96 shows a perspective sectional view of the same embodiment 470 of the present disclosure that is illustrated in FIGS. 82-95. The sectional view of FIG. 96 is similar to that of FIG. 95. However, whereas in FIGS. 93-95 the embodiment's insulating cylindrical tube 478 was omitted, it is included within the sectional illustration of FIG. 96. As with FIGS. 91-95, the illustration in FIG. 96 includes only one of the embodiment's five elliptical tubes. The oblique section plane of FIG. 96 is specified in FIG. 86 and the section is taken across line 96-96.

A portion of the heat conducted 514, transmitted, imparted, and/or transferred, from hot fluid (not shown) flowing through an interior channel 497 of the embodiment's hot tube 491 into the thermally-conductive material of the hot tube wall is conducted, transmitted, imparted, and/or transferred, to working fluid (not shown) flowing 518 and 519 through the isothermal expansion portion 472H of the illustrated elliptical tube 472. However, another portion of that thermal energy escapes, and/or is conducted 531, transmitted, imparted, and/or transferred, into an interior fluid (gas or liquid, e.g., air, water, or oil) within an interior 532 of the embodiment's insulated chamber (comprised of the insulating cylindrical tube, 478 in FIG. 82, and the upper, 479 in FIG. 82, and lower 496 insulating end caps) where it heats that interior fluid. A portion of the thermal energy conducted, transmitted, imparted, and/or transferred, from the hot fluid to the interior fluid 532 is conducted 520, transmitted, imparted, and/or transferred, back into the wall 517 of the isothermal expansion tube portion 472H where it increases a temperature of the working fluid therein. It is obvious that a portion of the escaped, e.g., 531, thermal energy may be transmitted, and/or absorbed, into the heat bridge 480, or even back into the wall of the hot tube 491. In either case, escaped thermal energy will tend to remain trapped within the interior 532 of the insulated chamber until it is transmitted to, and/or absorbed by, working fluid within the isothermal expansion portion of one of the embodiment's five elliptical tubes 472-476.

At an AE junction 533 within the embodiment's insulating cylindrical tube 478, and/or at a corresponding aperture, and/or channel, through that insulating cylindrical tube, the adiabatic expansion portion 472AE of the illustrated elliptical tube 472 transits, and/or passes through, the insulating cylindrical tube from an interior 532 of the embodiment's insulated chamber to an exterior 534 of that insulated chamber. Thus, working fluid (not shown) flows into the insulated adiabatic expansion tube portion at a location positioned within the interior of the insulated chamber, and subsequently flows out of that insulated adiabatic expansion tube portion at a location positioned outside of that insulated chamber. Thereafter, when the working fluid flows out of the adiabatic expansion tube portion and into the fluidly connected isothermal contraction tube portion 472C, it surrenders, looses, conducts, and/or imparts, a portion of its heat, and/or thermal energy, to the wall 525 of that isothermal contraction tube portion which is cooled 527 by the relatively cooler fluid (liquid or gas, e.g., air) outside 534 the embodiment's insulated chamber.

At an AC junction 535 within the embodiment's insulating cylindrical tube 478, and/or at a corresponding aperture, and/or channel, through that insulating cylindrical tube, the adiabatic compression portion 472AC of the illustrated elliptical tube 472 transits, and/or passes through, the insulating cylindrical tube from an exterior 534 of the embodiment's insulated chamber to an interior 532 of that insulated chamber. Thus, working fluid (not shown) flows into the insulated adiabatic compression tube portion at a location positioned outside of the insulated chamber, and subsequently flows out of that insulated adiabatic compression tube portion at a location positioned within the interior of that insulated chamber. Thereafter, when the working fluid flows out of the adiabatic compression tube portion and into the fluidly connected isothermal expansion tube portion 472H, it is exposed to, and absorbs heat, and/or thermal energy, from, the wall 517 of that isothermal expansion tube portion which is directly 516 and indirectly 520 heated by the relatively warmer fluid (gas, liquid, particulates, and/or plasma) flowing through the lumen 497, channel, and/or interior, of hot tube (491 in FIG. 82).

Figure 97:
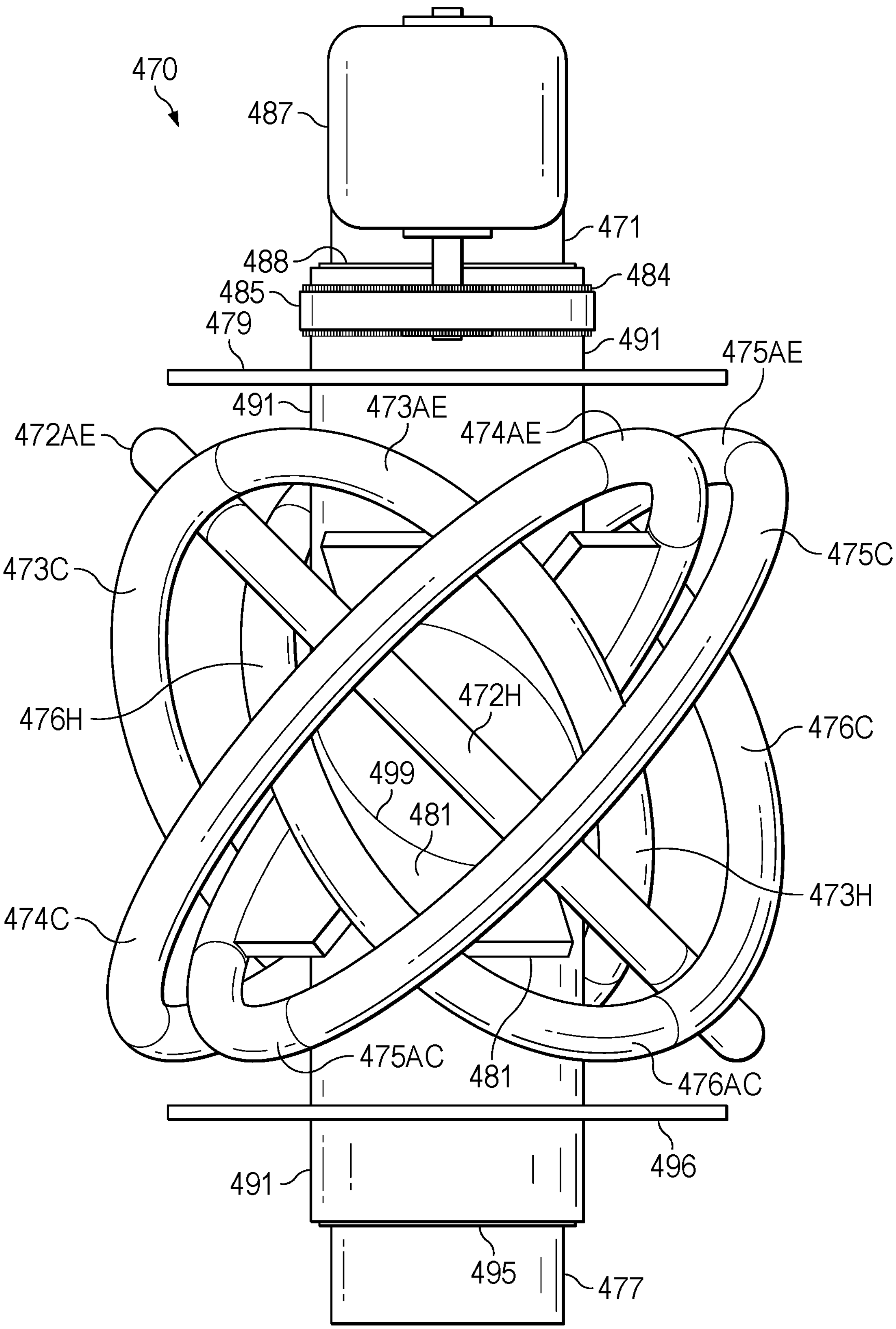
FIG. 97 shows a side view of the eighth embodiment of the present invention.

FIG. 97 shows a side view of the same embodiment 470 of the present disclosure that is illustrated in FIGS. 82-96. However, for the purpose of visibility and explanation, the illustration in FIG. 97 omits the embodiment's insulating cylindrical tube (478 in FIG. 82).

Five elliptical tubes 472-476 carry working fluid (not shown) in, along, and/or through, oblique orbital paths about the embodiment's hot tube 491, and about the embodiment's longitudinal axis of rotation (492 in FIG. 85) about which the hot tube exhibits radial symmetry. Those orbital paths carry the working fluid close to the hot tube (within the embodiment's insulated chamber to an interior, 532 in FIG. 96, of that insulated chamber) where a respective heat bridge, e.g., 481, conducts, transmits, and/or transfers, thermal energy from the wall (515 in FIG. 96) of the hot tube to the wall of a respective isothermal expansion tube portion, e.g., 476H. These orbital working-fluid-flow paths also carry the working fluid outside the insulated chamber where a portion of the thermal energy of the working fluid is removed by, and/or transferred to, the relatively cool wall of a respective isothermal contraction tube portion, e.g., 476C.

Figure 98:
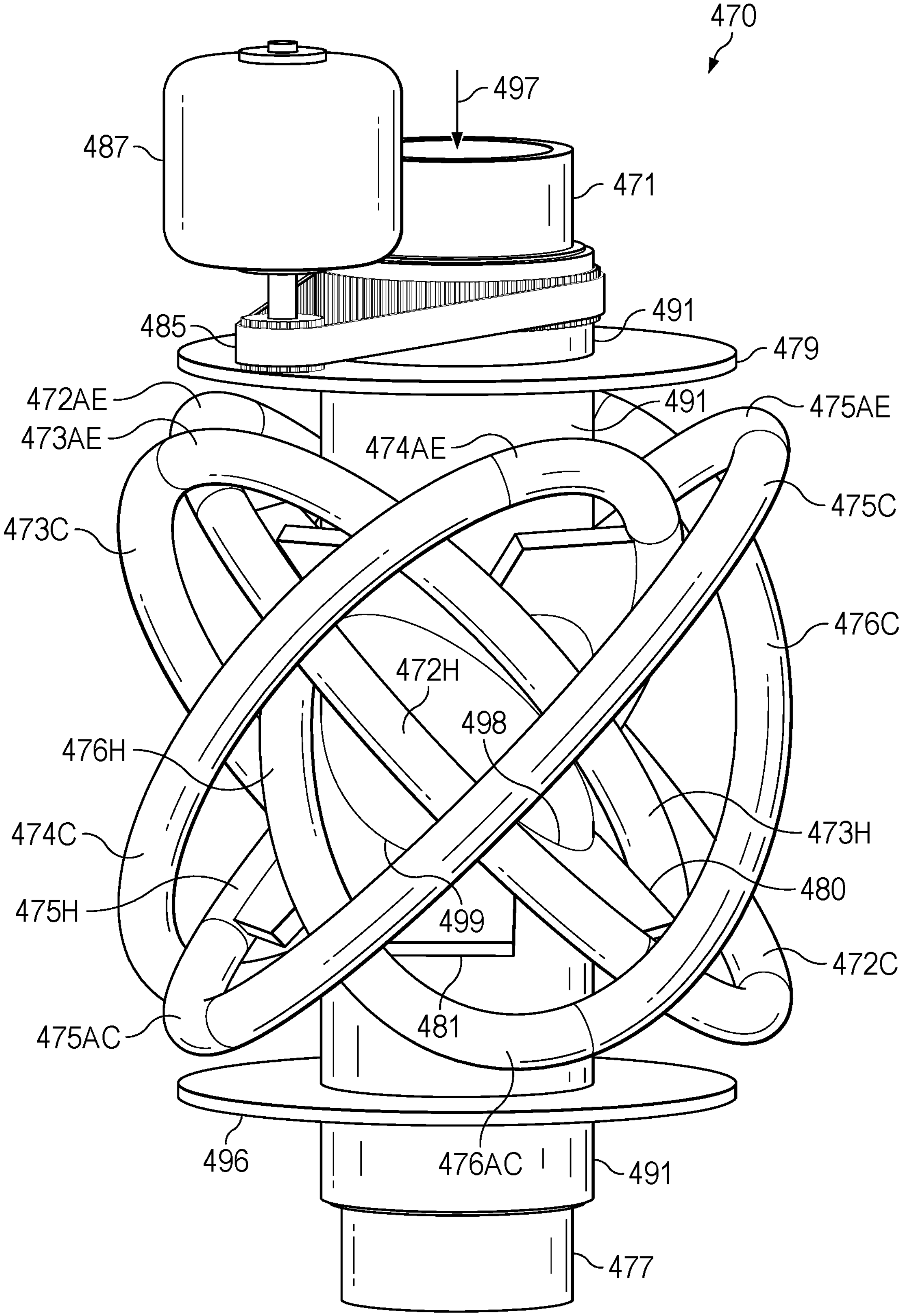
FIG. 98 shows a perspective side view of the eighth embodiment of the present invention.

FIG. 98 shows a perspective side view of the same embodiment 470 of the present disclosure that is illustrated in FIGS. 82-97. However, for the purpose of visibility and explanation, the illustration in FIG. 98 omits the embodiment's insulating cylindrical tube (478 in FIG. 82).

Figure 99:
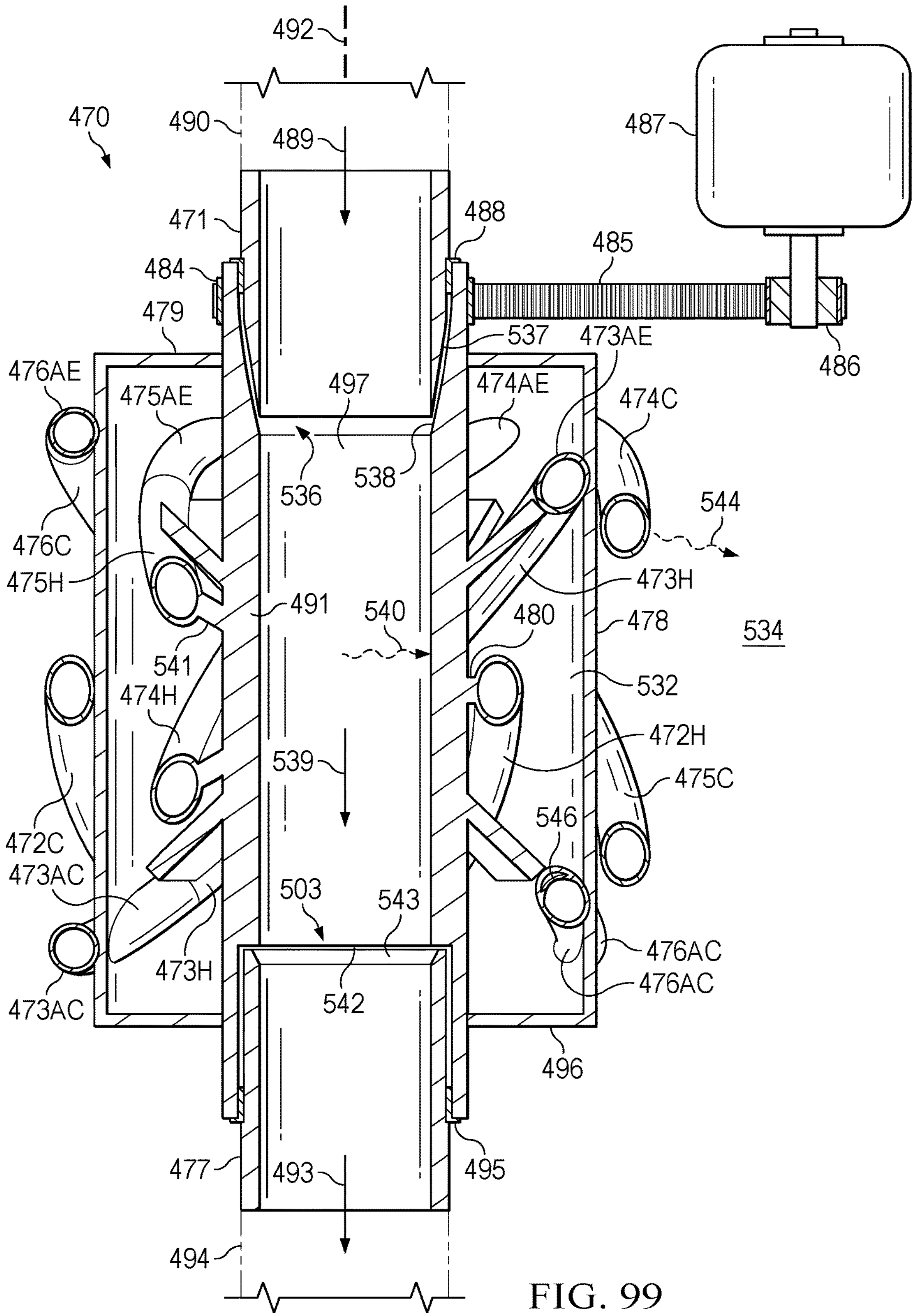
FIG. 99 shows a side sectional view of the eighth embodiment of the present invention.

FIG. 99 shows a side sectional view of the same embodiment 470 of the present disclosure that is illustrated in FIGS. 82-98 wherein the vertical section plane is specified in FIG. 84 and the section is taken across line 99-99. The generator 487 and its shaft are not sectioned.

In an operation of the embodiment 470, a hot fluid (not shown, gas, liquid, particulates, and/or plasma) flows 489 from a hot fluid feed pipe (not shown, positionally illustrated by dashed line 490) and into and through the embodiment's hot inlet 471. The hot inlet is nominally non-rotating, and/or positionally fixed. Hot fluid flowing through the hot inlet reaches, and flows over, a hot inlet effluent junction gap 536 and thereafter flows into and through a lumen 497, and/or channel, within the embodiment's hot tube 491. The hot inlet effluent junction gap is formed by a beveled wall 537 at a lower, and/or distal, end of the hot inlet 471 which is adjacent to a complementary beveled wall 538 at an upper, and/or a proximal, end of the hot tube. The movement of the nominally rotating hot tube relative to the non-rotating, and/or stationary, hot inlet is facilitated by an upper bearing 488 which is both a radial and a thrust bearing.

Hot fluid flowing 539 within the lumen 497, and/or channel, within the embodiment's hot tube 491, conducts 540, transmits, imparts, and/or transfers, a portion of its heat, and/or thermal energy, to, and/or into, the thermally-conductive wall of the hot tube. And, a portion of the thermal energy transferred into the thermally-conductive wall of the hot tube is conducted, transmitted, imparted, and/or transferred to each of the embodiment's five thermally-conductive heat bridges, e.g., 480 and 541. For example, a portion of the thermal energy within the thermally-conductive wall of the hot tube is conducted, transmitted, imparted, and/or transferred to the heat bridge 480 which then conducts, transmits, imparts, and/or transfers a portion of that thermal energy to the thermally-conductive wall of its respective thermally-connected isothermal expansion portion 472H of its respective elliptical tube 472. And, as another example, a portion of the thermal energy within the thermally-conductive wall of the hot tube is conducted, transmitted, imparted, and/or transferred to, and/or into, the heat bridge 541 which then conducts, transmits, imparts, and/or transfers a portion of its thermal energy to the thermally-conductive wall of its respective thermally-connected isothermal expansion portion 475H of its respective elliptical tube 475.

After transferring some of its thermal energy to the wall of the embodiment's hot tube 491, the hot fluid cools, and the cooled hot fluid effluent flows to and over a hot effluent outlet junction gap 503, and thereafter flows into and through the embodiment's hot effluent outlet 477. The hot effluent outlet junction gap is formed by a circumferential edge 542 at a lower, and/or distal, end of the hot tube which is adjacent to a beveled wall, and/or edge, 543 at an upper, and/or a proximal, end of the hot effluent outlet. The movement of the nominally rotating hot tube relative to the non-rotating, and/or stationary, hot effluent outlet is facilitated by a lower bearing 495 which is both a radial and a thrust bearing.

Hot fluid flowing 493 out of the embodiment's hot effluent outlet 477 therefrom flows into and through a hot fluid effluent pipe (not shown, positionally illustrated by dashed line 494).

Working fluid (not shown) flowing through the isothermal expansion portion, e.g., 474H, of an elliptical tube, e.g., 474, is heated by thermal energy imparted to the hot tube 491 by a hot fluid (not shown) flowing 539 through the hot tube, which causes that working fluid to expand and flow, within the respective isothermal expansion tube portion, toward a respective succeeding, and adjacent, adiabatic expansion portion, e.g., 474AE, where it continues expanding adiabatically while decreasing in pressure. Depressurized working fluid flowing out of an adiabatic expansion portion, e.g., 474AE, then flows into and through a succeeding, and adjacent, respective isothermal contraction tube portion, e.g., 474C, where it conducts, transmits, imparts, and/or transfers, a portion of its thermal energy to the wall of the respective isothermal contraction tube portion. And, a portion of the thermal energy transferred from the working fluid to the wall of a respective isothermal contraction tube portion is then conducted 544, transmitted, imparted, and/or transferred, to a relatively cooler fluid 534 (not shown, e.g., liquid or gas) outside the embodiment, and/or outside the embodiment's insulating cylindrical tube 478.

The heat-driven flow of working fluid (not shown) through the embodiment's five elliptical tubes 472-476 causes the embodiment's hot tube 491, as well as its attached elliptical tubes, heat bridges, e.g., 480 and 541, insulating cylindrical tube 478, upper insulating end cap 479, and lower insulating end cap 496, to rotate about the embodiment's longitudinal, and/or rotational, axis 492. As the hot tube rotates, so too does the driving gear 484 thereto attached, which rotationally translates the gear belt 485, which rotates the generator gear 486, which causes the generator to produce electrical power.

A portion 546 of the frustoconical diodic valve, positioned at the AC-H tube junction (e.g., 530 in FIG. 95) between the adiabatic compression portion 476AC of the elliptical tube 476, and that tube's isothermal expansion portion (not visible in front of the section plane), is visible behind the section plane.

Figure 100:
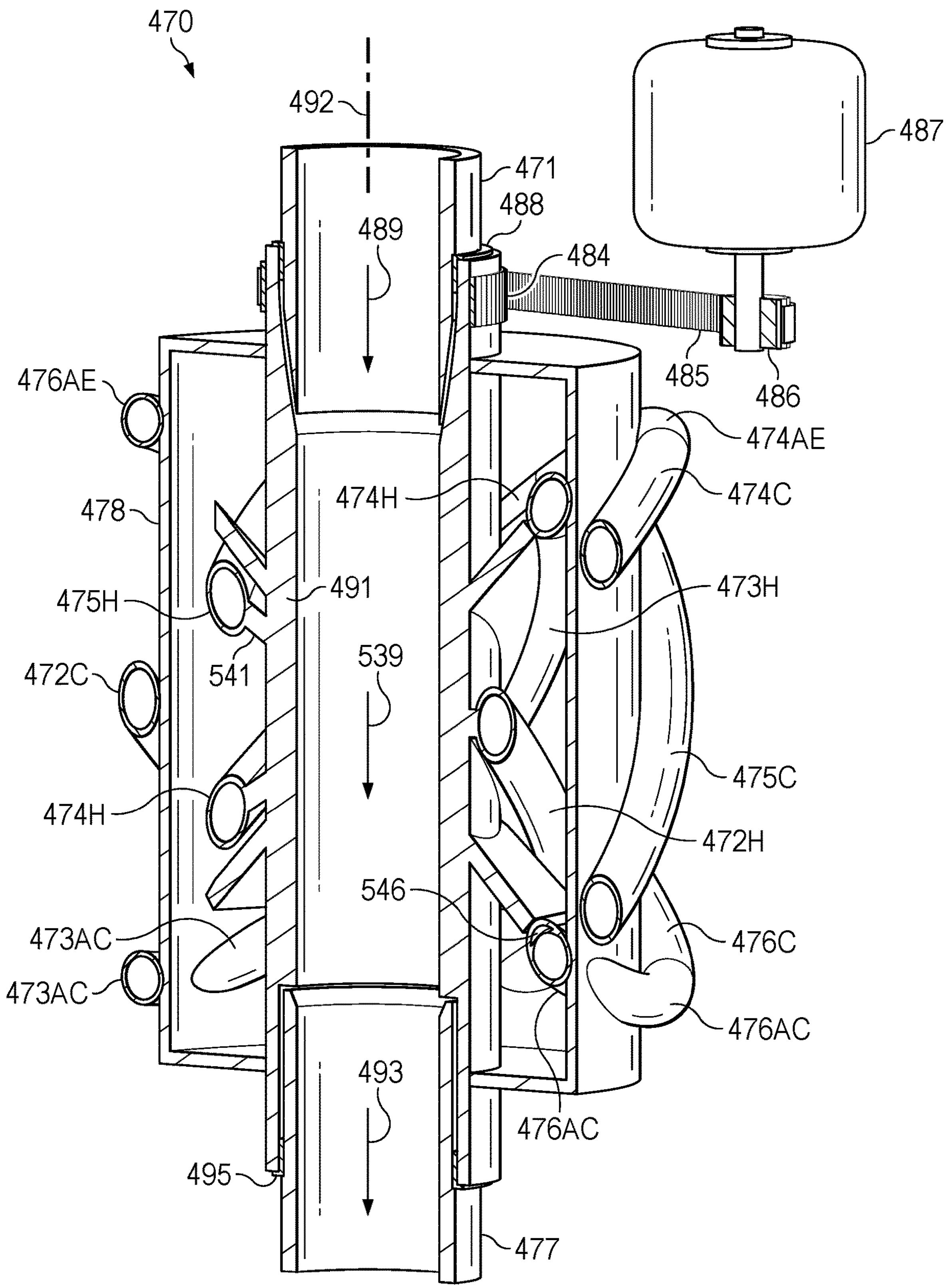
FIG. 100 shows a perspective side view of the eighth embodiment of the present invention.

FIG. 100 shows a perspective side view of the same embodiment 470 of the present disclosure that is illustrated in FIGS. 82-99.

Figure 101:
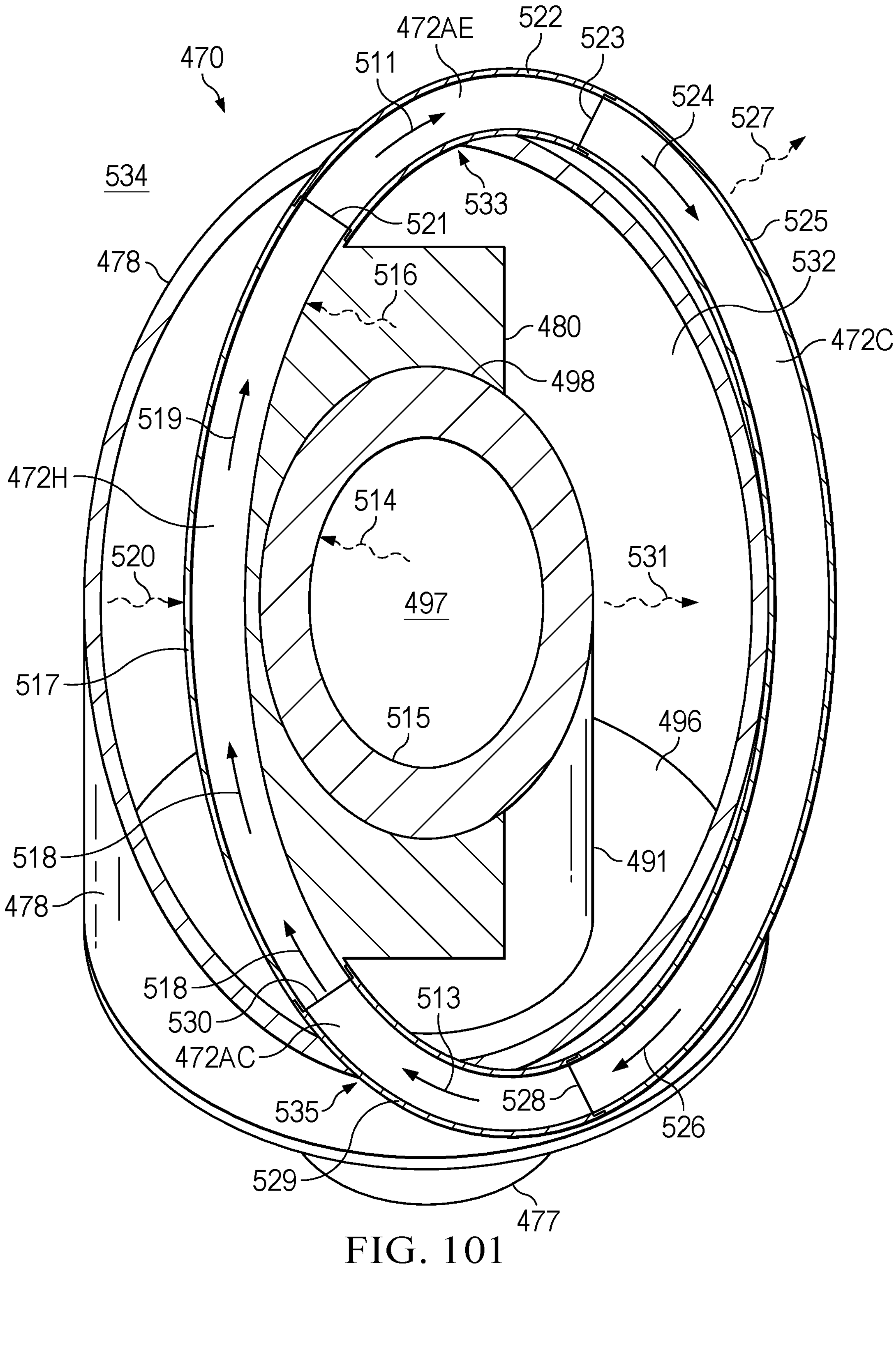
FIG. 101 shows a perspective sectional view of an alternate version of the eighth embodiment of the present invention.

FIG. 101 shows a perspective sectional view of an alternate version 470B of the same embodiment 470 of the present disclosure that is illustrated in FIGS. 82-100. The sectional view of FIG. 101 includes only one 472 of the embodiment's five elliptical tubes. The oblique section plane is the same as that specified in FIG. 86 with respect to the original version of the embodiment, and the section is taken across line 96-96 of FIG. 86.

The alternate embodiment 470B illustrated in FIG. 101 omits the frustoconical diodic valve (482 in FIG. 96) from each of its five elliptical tubes 472-476, and instead allows the working fluid within each of its elliptical tubes, e.g., within elliptical tube 472, to flow without restriction, obstruction, and/or diodicity. When the alternate embodiment is exposed to a hot fluid (not shown) flowing through the interior channel 497 within its hot tube 491, and exposed to a relatively cool fluid (not shown) outside 534 its insulating cylindrical tube 478, then it will begin to rotate in one of two possible directions, e.g., clockwise or counterclockwise around its longitudinal, and/or rotational, axis (492 in FIG. 100) relative to a top-down perspective. Before the embodiment is exposed to relatively hot and cold fluids, or after the embodiment begins rotating in the "wrong," and/or in an undesired rotational direction, the embodiment's generator (e.g., 487 in FIG. 82) which is adapted, and/or configured so as, to also be able to operate as an electrical motor) is energized so as to rotate the embodiment's array of elliptical tubes in a favored, desirable, and/or operational, direction of rotation. Such a forced rotation of sufficient duration will cause the working fluid (not shown) within each of the embodiment's elliptical tubes to flow in the direction which would correspond to a rotation of the embodiment in the favored, desirable, and/or operational, direction of rotation. After the working fluid within each of the embodiment's elliptical tubes is flowing in the rotational direction (e.g., clockwise or counterclockwise around its longitudinal, and/or rotational, axis, 492 in FIG. 100, relative to a top-down perspective) which would correspond to, and/or produce, a rotation of the embodiment in the favored, desirable, and/or operational, direction of rotation, then the generator/motor can be reconfigured to operate as a generator again, rather than as a motor, and a nominal electrical-power-generating operation of the embodiment can proceed.

The varieties of embodiments, their geometries, their working fluids, their operations, and their applications, enumerated within the "Summary of the Invention" section of this disclosure apply to the embodiment illustrated and discussed in relation to FIGS. 82-101, and the scope of the present disclosure includes all such variations of the embodiment illustrated in FIGS. 82-101.

Disclosed in this specification, and in FIGS. 82-101, is a closed-cycle heat engine, comprising: a central, longitudinal tube adapted to receive a flow of a heated fluid, and to absorb into its tube wall a portion of the heated-fluid's thermal energy; a plurality of elliptical working-fluid-flow tubes, each containing a working fluid therein; an electrical generator operationally connected to the central tube; wherein each of the plurality of elliptical working-fluid-flow tubes comprises a thermally-conductive isothermal expansion tube portion configured to impart thermal energy received from the heated fluid to the working fluid therein, thereby heating that working fluid; wherein each of the plurality of elliptical working-fluid-flow tubes comprises a thermally-conductive isothermal contraction tube portion configured to absorb thermal energy from the working fluid therein, and to impart that thermal energy to a fluid outside the isothermal contraction tube portion, thereby cooling that working fluid; wherein the plurality of elliptical working-fluid-flow tubes are configured to rotate the central tube when working fluid is heated within the isothermal expansion tube portion of each of the plurality of elliptical working-fluid-flow tubes, and is cooled within the isothermal contraction tube portion of each of the plurality of elliptical working-fluid-flow tubes.

Figure 102:
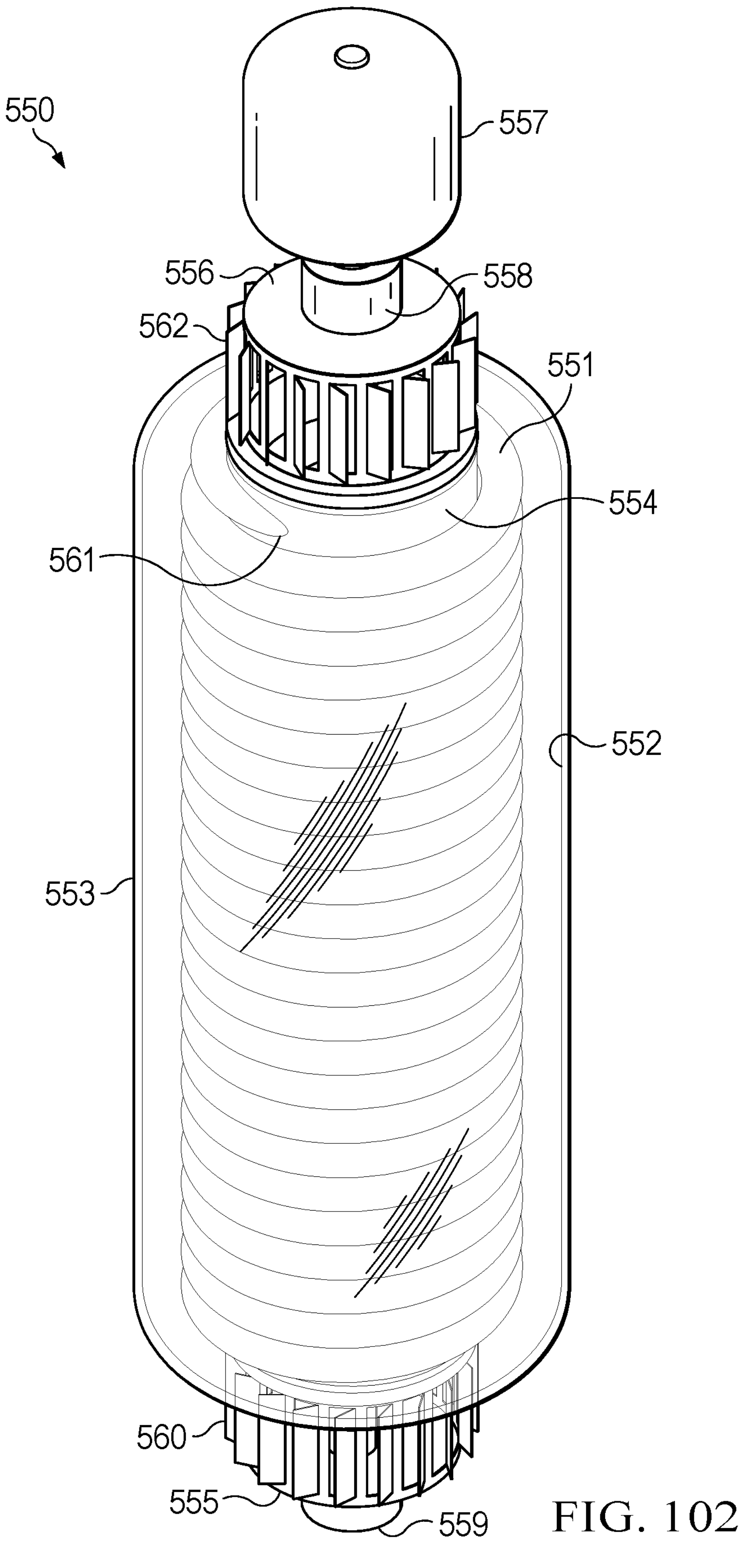
FIG. 102 shows a perspective side view of a ninth embodiment of the present invention.

FIG. 102 shows a perspective side view of an embodiment 550 of the present disclosure.

The embodiment 550 illustrated in FIG. 102 is adapted and configured to absorb electromagnetic radiation, e.g., from the Sun, and convert a portion of the absorbed radiation into heat which is then imparted, conducted, transmitted, and/or transferred, to a working fluid (not shown) within a doubly-spiraled hollow tube 551, causing that working fluid to expand and flow within the doubly-spiraled hollow tube, thereby also causing the doubly-spiraled hollow tube to rotate in an opposite direction to that of the working fluid therein.

The embodiment illustrated in FIG. 102 includes two coaxial, approximately cylindrical, e.g., pill-shaped, transparent enclosures—an inner transparent enclosure 552, and an outer transparent enclosure 553. Together, these transparent enclosures allow electromagnetic radiation (of a range of wavelengths, e.g., visible light) to pass through, e.g., from an external source, e.g., the Sun, to an interior of the inner transparent enclosure, while trapping heat resulting from, and/or created by, an absorption of the electromagnetic radiation by a surface of an outer portion 551 of the doubly-spiraled hollow tube, and/or by a surface of exposed portions of a cylindrical insulating barrier 554. The outer portion of the doubly-spiraled hollow tube, and the exposed portions of the cylindrical insulating barrier, are covered, painted, and/or their surfaces are altered, and/or configured, such that they tend to efficiently absorb incident electromagnet radiation, e.g., visible light, and efficiently convert that absorbed radiative energy into thermal energy, and/or heat.

When a relative heating of the embodiment's working fluid (not shown) causes the working fluid to rotate in a counterclockwise direction (relative to a top-down perspective) about a vertical longitudinal axis of rotation (not shown, and coaxial with a longitudinal axis of the generator and its shaft, not visible) of the embodiment, which, in turn, causes the doubly-spiraled tube 551 to rotate in a clockwise direction about that axis of rotation, then a lower air pump 555 rotates with the doubly-spiraled tube to which it fixedly attached, via their mutual fixed attachment to the embodiment's generator shaft (not visible). When rotated in a clockwise direction by the rotation of the working-fluid-driven doubly-spiraled tube, the turbine blades, e.g., 560, of the lower air pump draw, pump, pull, and/or push, air into an approximately cylindrical, interior ventilation duct (not visible). The relatively cool air forced into, and/or through, and consequently rising within, the ventilation duct provides the embodiment with a thermal sink, and draws thermal energy from the working fluid circulating through an inner portion of the embodiment's doubly-spiraled tube, thereby cooling that working fluid and causing it to contract.

When the relatively cool, but warming, air rising through the embodiment's ventilation duct reaches an upper end of that ventilation duct, it is drawn, pumped, and/or pulled, out of the ventilation duct by the clockwise rotation of an upper air pump 556, whose turbine blades, e.g., 562, which, when rotated in a clockwise direction about the embodiment's axis of rotation (not shown), cause a reduction in pressure at the upper end of the ventilation duct, thereby causing warmed air within the ventilation duct to be pulled, and/or expelled, from the embodiment.

The embodiment also comprises, in part, a generator 557, operably connected to a generator shaft (not visible). A rotation of the generator shaft is facilitated by upper 558 and lower 559 shaft bearings. The generator shaft is fixedly attached to the generator's rotor, as well as to the embodiment's doubly-spiraled hollow tube 551, while the outer surfaces of the upper and lower shaft bearings, as well as the generator's stator, are configured to be attached, connected, and/or affixed, to a non-rotating, and/or a differently-rotating, structure, framework, object, and/or mechanism.

Relative to a top-down perspective (i.e., proximate to the upper shaft bearing 558, and with respect to which the generator would be in the foreground), the outer-portion 551 of the doubly-spiraled tube ascends from a lower end (e.g., proximate to the lower shaft bearing 559) of the embodiment to an upper end (e.g., proximate to the upper shaft bearing) while spiraling in a counterclockwise direction. When heated within the outer-portion 551 of the doubly-spiraled tube, the working fluid therein will expand and flow, and/or rotate, in a counterclockwise direction (relative to the generator shaft) as it flows upward within an interior of the outer-portion of the doubly-spiraled tube.

At each upper and lower end of the embodiment, the outer-portion of the doubly-spiraled tube passes through the cylindrical insulating barrier 554. For example, an upper end of the outer-portion of the doubly-spiraled tube passes through the cylindrical insulating barrier at a position, location, and/or point 561. After passing from a position outside an upper end of the insulating barrier to a laterally, and/or radially, adjacent position inside the upper end of that insulating barrier, the outer portion (relative to the cylindrical insulating barrier) of the doubly-spiraled hollow tube transitions to an inner portion (relative to the cylindrical insulating barrier) of that doubly-spiraled hollow tube, and continues spiraling within the interior of the insulating barrier from that upper end, to the lower end, also in a counterclockwise direction (relative to a top-down perspective). As working fluid within the inner portion of that doubly-spiraled hollow tube is cooled therein, that working fluid contracts. And, at a lower end of the inner portion (not visible) of the doubly-spiraled tube, that inner portion (not visible) of the doubly-spiraled tube passes through the cylindrical insulating barrier (at a position, location, and/or point that is not visible in FIG. 102) to transition back to the fluidly connected outer portion of the doubly-spiraled hollow tube, and from there to again resume an upward, counterclockwise spiral.

Figure 103:
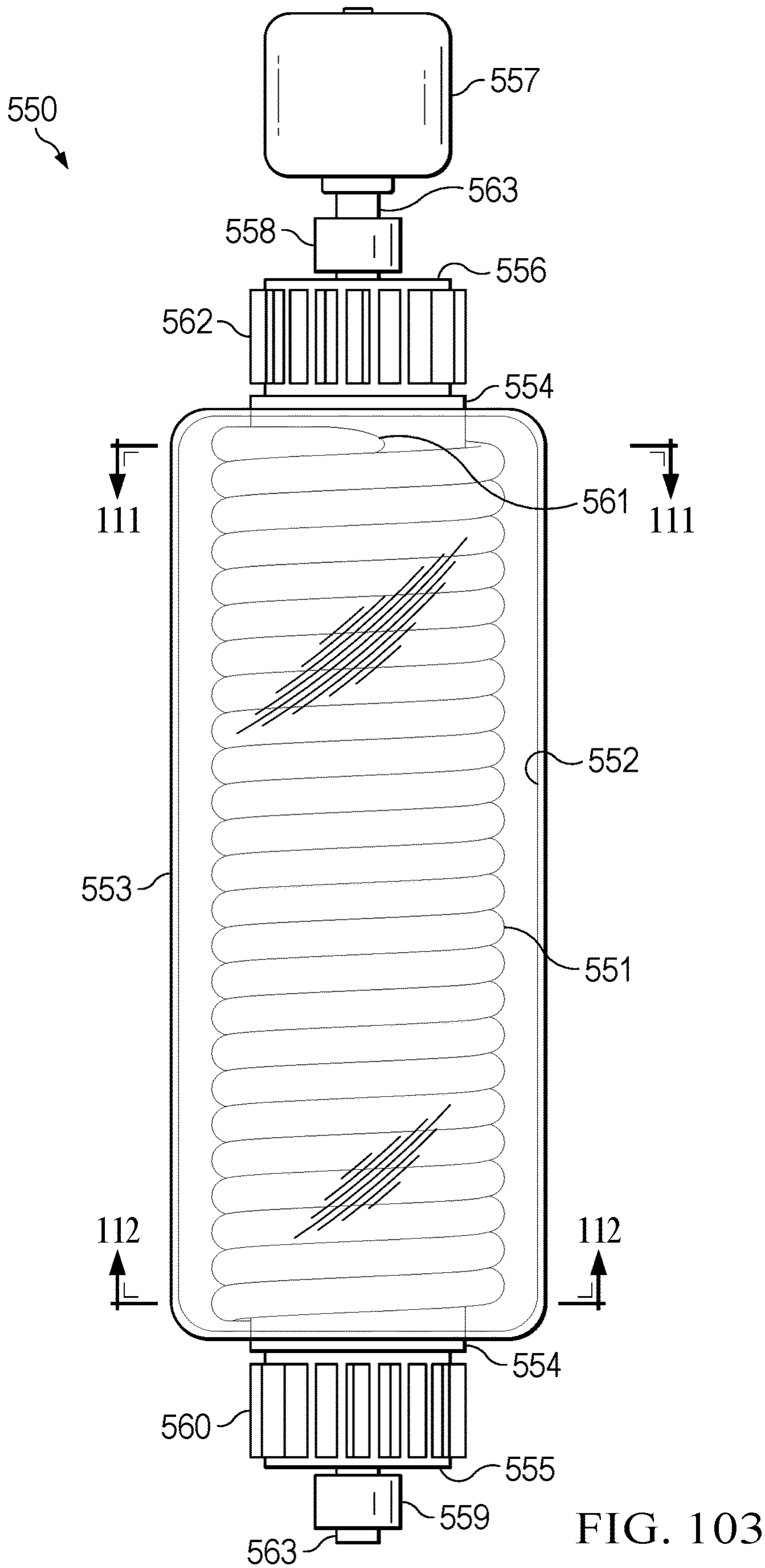
FIG. 103 shows a side view of the ninth embodiment of the present invention.

FIG. 103 shows a side view of the same embodiment 550 of the present disclosure that is illustrated in FIG. 102. Visible in the illustration of FIG. 103 is the generator shaft 563. The embodiment's doubly-spiraled tube 551, its upper 556 and lower 555 air pumps, its cylindrical insulating barrier 554, and its inner 552 and outer 553 transparent enclosures, are directly or indirectly fixedly attached to the embodiment's radially-centered generator shaft. As working fluid (not shown) within the embodiment's doubly-spiraled tube flows, thereby causing the doubly-spiraled tube, and the fixedly attached generator shaft, to rotate, the non-rotating, and/or differently-rotating, generator 557, which is rotatably, and/or operably, connected to the generator shaft, is energized and produces electrical power.

Figure 104:
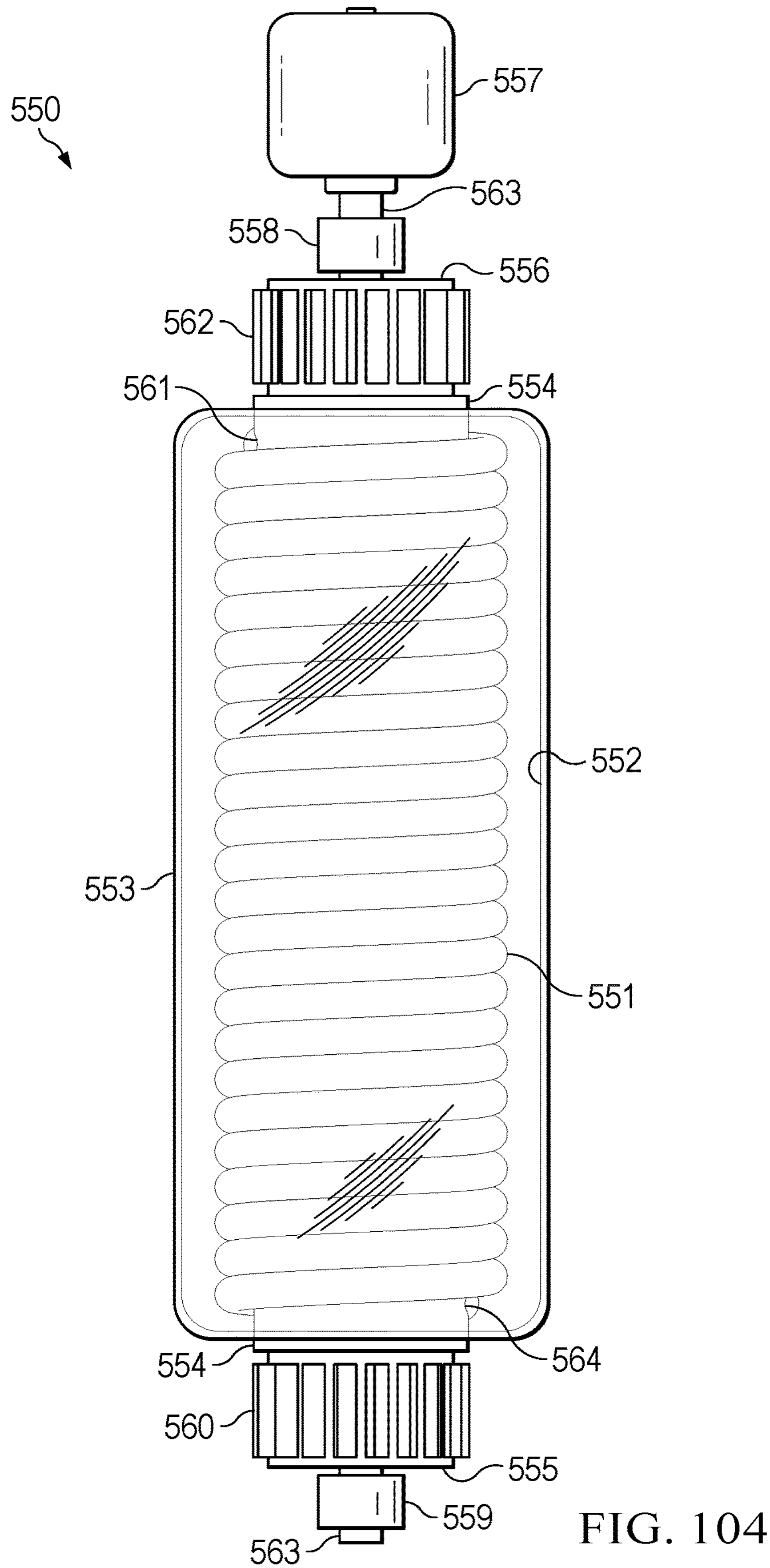
FIG. 104 shows a side view of the ninth embodiment of the present invention.

FIG. 104 shows a side view of the same embodiment 550 of the present disclosure that is illustrated in FIGS. 102 and 103.

At each upper and lower end of the embodiment, the outer-portion of the doubly-spiraled tube transits, and/or passes through, the cylindrical insulating barrier 554. An upper end of the outer-portion 551 of the doubly-spiraled tube passes through the cylindrical insulating barrier at a position, location, and/or point 561 thereby transitioning to, and/or into, an upper end of the inner-portion (not visible) of the hermetically-sealed, and fluidly interconnected, and/or fluidly continuous, doubly-spiraled tube. Similarly, a lower end of the inner-portion (not visible) of the doubly-spiraled tube passes through the cylindrical insulating barrier at a position, location, and/or point 564 thereby transitioning to, and/or into, a lower end of the outer-portion 551 of the doubly-spiraled tube. The embodiment's single doubly-spiraled tube spirals upward in a counterclockwise revolution direction (with respect to the embodiment's axis of rotation, not shown, which is coaxial with a longitudinal axis of the generator 557 and the generator shaft 563, and with respect to a top-down perspective) after which it passes through the wall of the cylindrical insulating barrier 554 at position 561 and then spirals downward in a counterclockwise revolution direction after which it passes through the wall of the cylindrical insulating barrier at position 564 and then closes the fluidly-connected closed-cycle loop and resumes its upward counterclockwise spiral.

Figure 105:
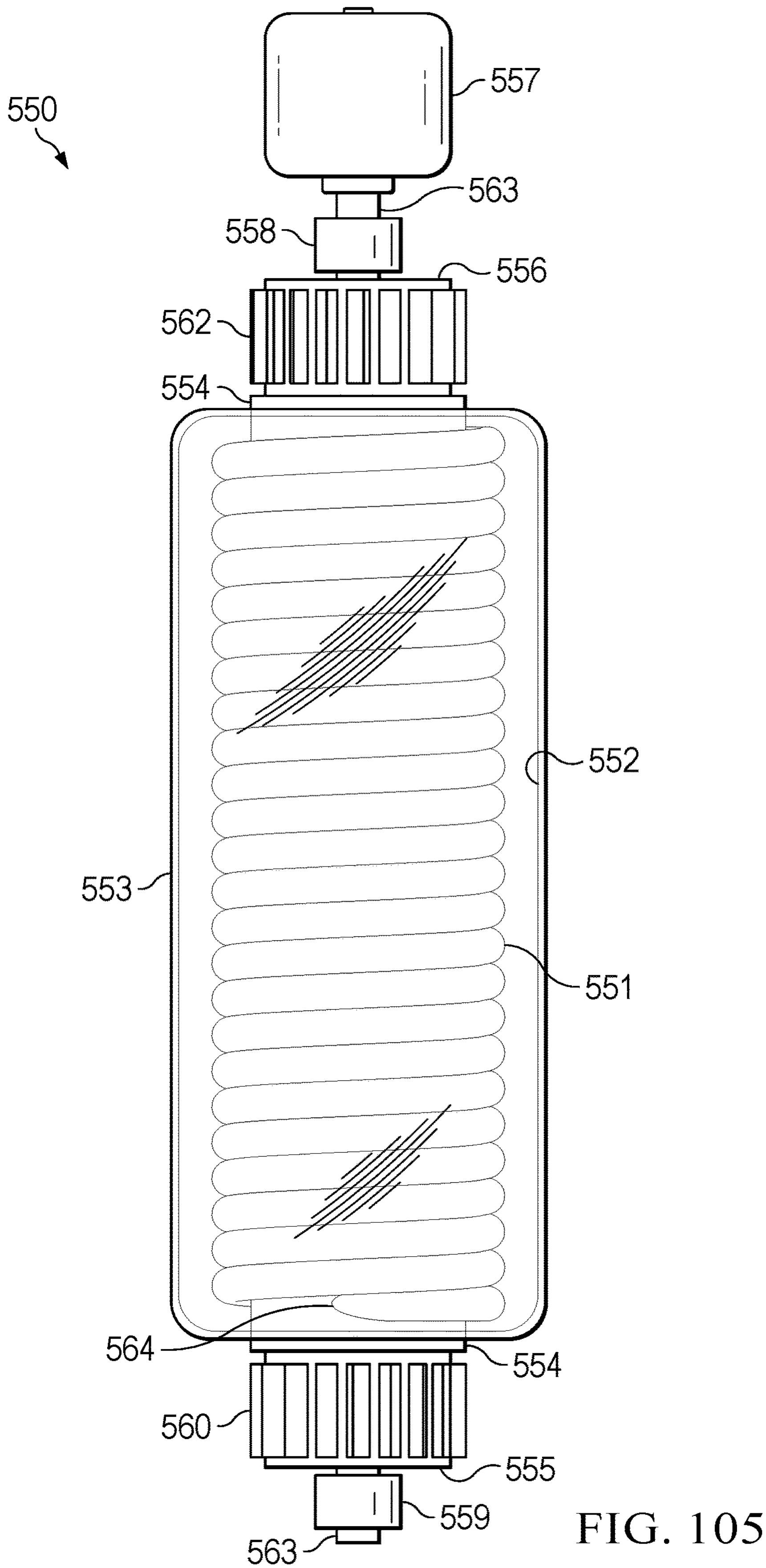
FIG. 105 shows a side view of the ninth embodiment of the present invention.

FIG. 105 shows a side view of the same embodiment 550 of the present disclosure that is illustrated in FIGS. 102-104.

Figure 106:
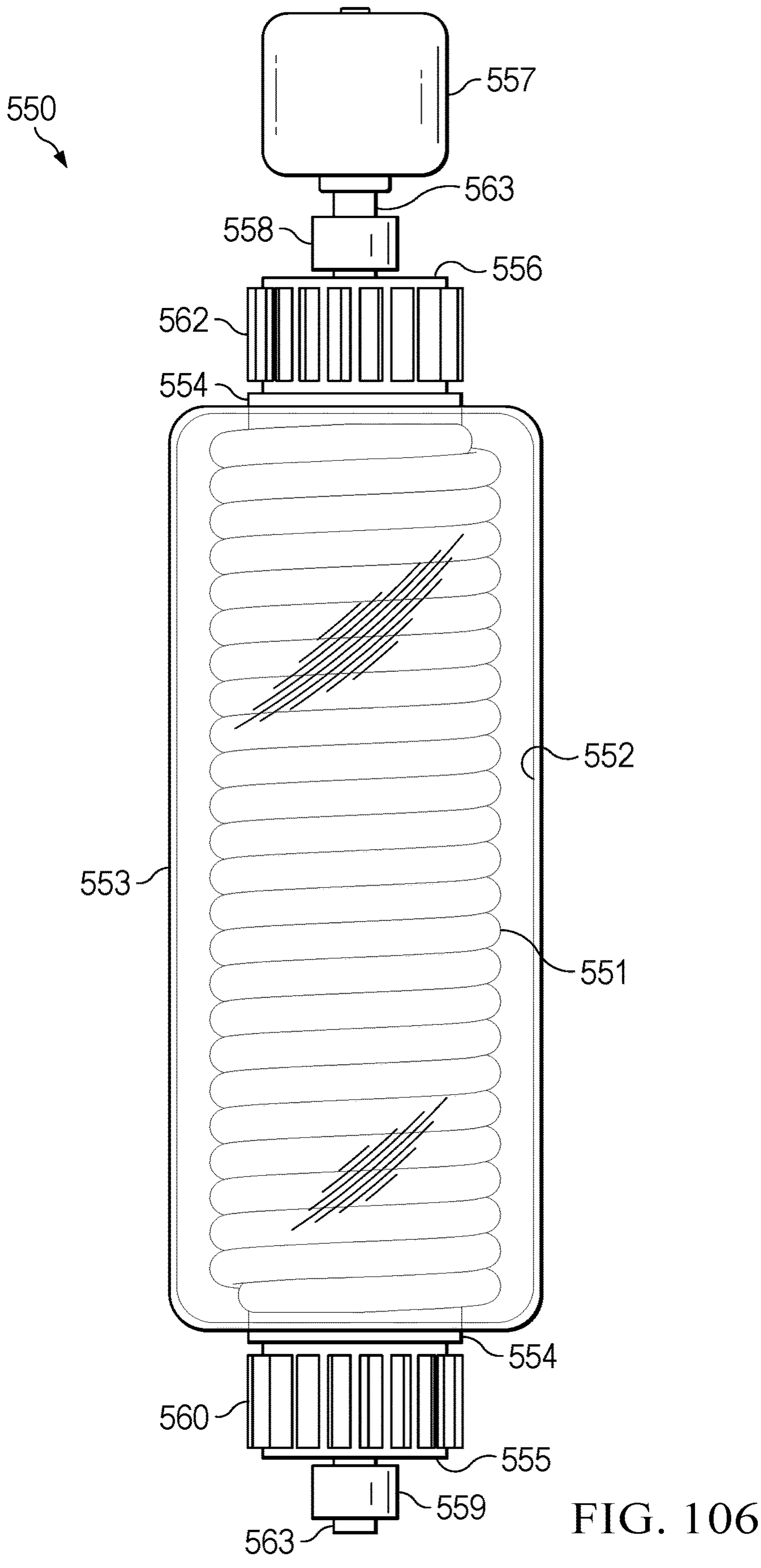
FIG. 106 shows a side view of the ninth embodiment of the present invention.

FIG. 106 shows a side view of the same embodiment 550 of the present disclosure that is illustrated in FIGS. 102-105.

Figure 107:
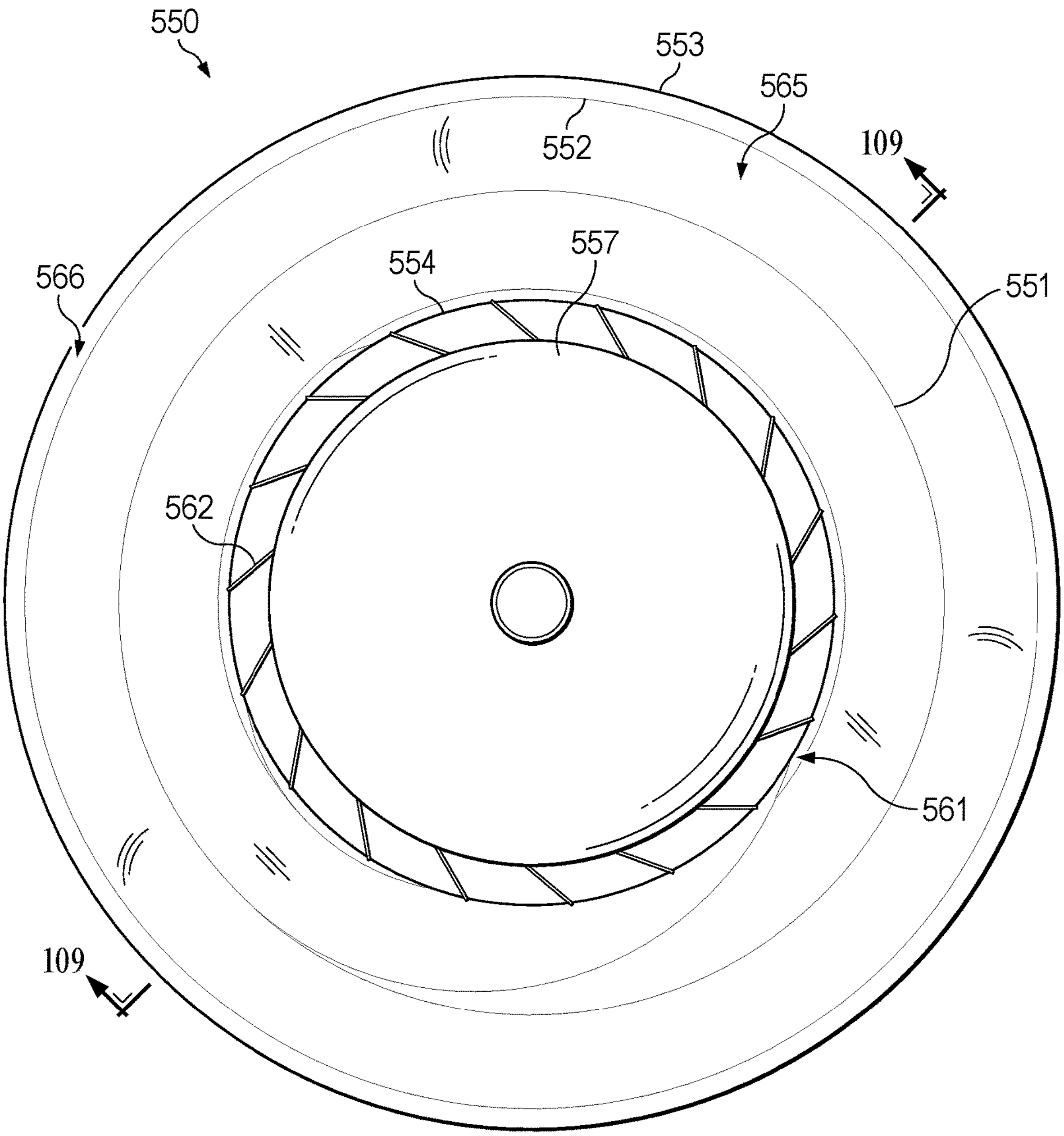
FIG. 107 shows a top-down view of the ninth embodiment of the present invention.

FIG. 107 shows a top-down view of the same embodiment 550 of the present disclosure that is illustrated in FIGS. 102-106.

Between the outer-portion 551 of the doubly-spiraled tube and the inner transparent enclosure 552 is a nitrogen-filled gap 565, space, and/or void, which transmits electromagnetic radiation from an external source to an outer surface of the doubly-spiraled tube, and an outer surface of the cylindrical insulating barrier 554, where a portion of that incident radiation is absorbed and then, and/or thereby, converted to thermal energy, and/or heat. A portion of the heat produced by, and/or through, the absorption of incident radiation is retained within the gas occupying the gap 565 and the heated gas is thereafter able to conduct, transmit, impart, and/or transfer, a portion of the thermal energy of that heated gas to the outer-portion of the doubly-spiraled tube.

Between the inner transparent enclosure 552 and the outer transparent enclosure 553 is a nitrogen-filled gap 566, space, and/or void. Electromagnetic radiation that originates at an external source, e.g., the Sun, passes through the outer transparent enclosure 553, and then passes through the nitrogen-filled gap 566, and then passes through the inner transparent enclosure 552, and then passes through the nitrogen-filled gap 565, whereafter it irradiates a radially outer surface of the outer-portion 551 of the doubly-spiraled tube.

An embodiment similar to the one illustrated in FIGS. 102-107 employs, includes, incorporates, utilizes, and/or comprises, a carbon dioxide gas between the outer-portion 551 of the doubly-spiraled tube and the inner transparent enclosure 552, as well as between the inner transparent enclosure 552 and the outer transparent enclosure 553. Embodiments of the present disclosure utilize other gases and liquids to fill the gaps, spaces, voids, and/or chambers, within their structures, including, but not limited to: air, nitrogen, carbon dioxide, methane, ammonia, water, oil, and phase-changing materials. The scope of the present disclosure is not limited to, and/or by, the fluid (e.g., gas or liquid) used within the embodiment.

Figure 108:
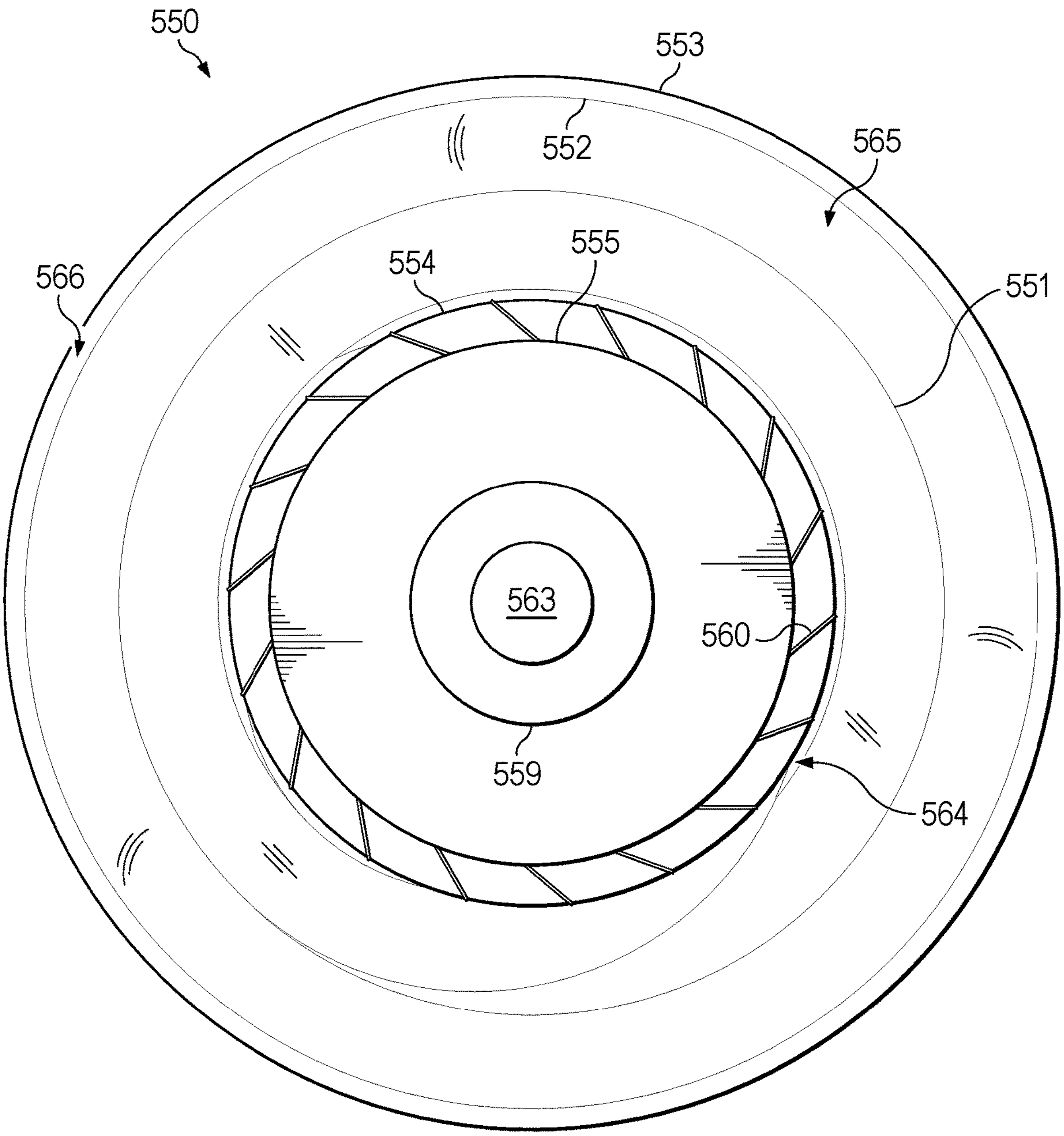
FIG. 108 shows a bottom-up view of the ninth embodiment of the present invention.

FIG. 108 shows a bottom-up view of the same embodiment 550 of the present disclosure that is illustrated in FIGS. 102-107.

Figure 109:
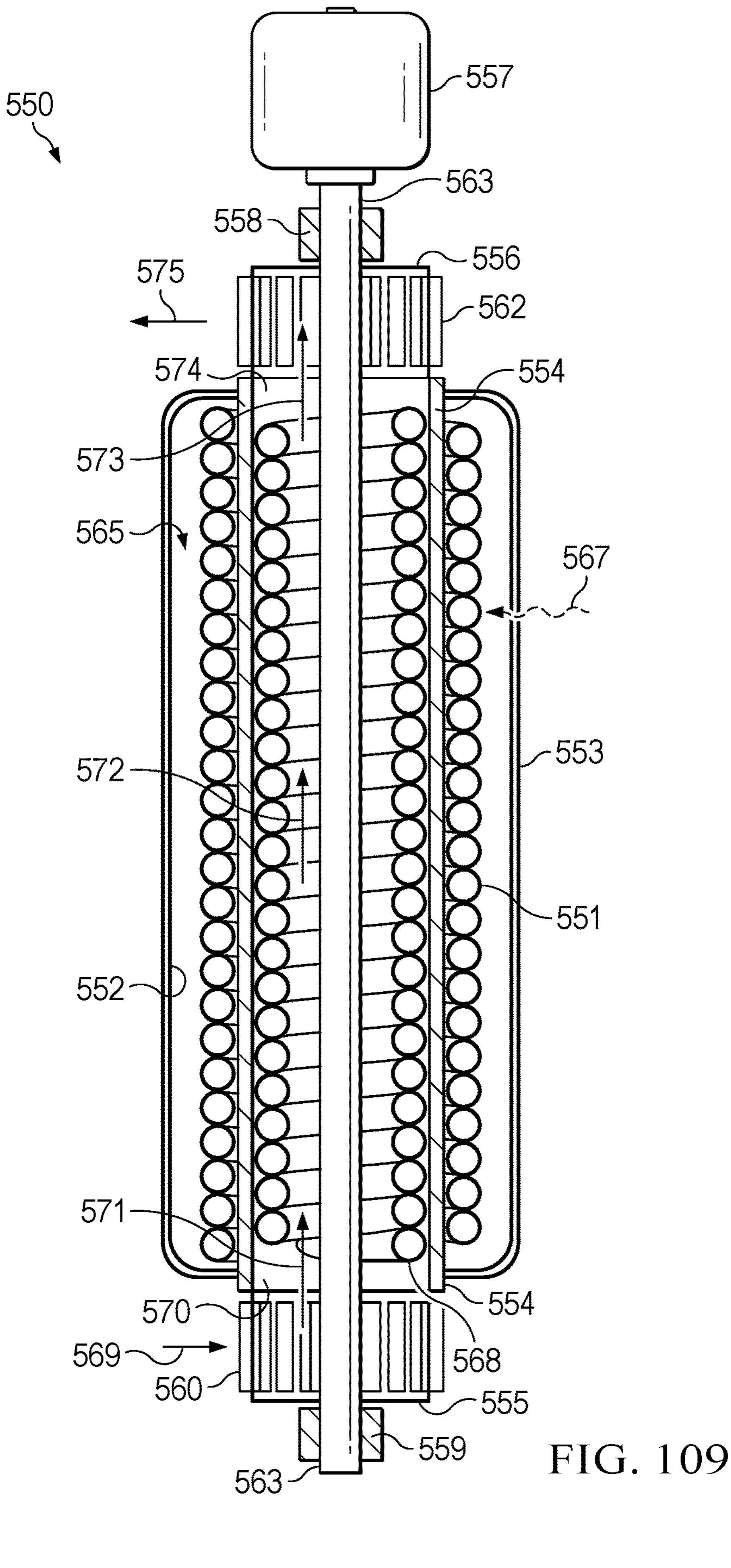
FIG. 109 shows a side sectional view of the ninth embodiment of the present invention.

FIG. 109 shows a side sectional view of the same embodiment 550 of the present disclosure that is illustrated in FIGS. 102-108 wherein the vertical section plane is specified in FIGS. 107 and 108, and the section is taken across line 109-109. The generator 557 and its shaft 563 are not sectioned.

Electromagnetic radiation 567, e.g., visible light, encounters, and passes through, an outer transparent (relative to the wavelength of the electromagnetic radiation) acrylic, and approximately cylindrical, enclosure 553. It then encounters, and passes through, a transparent nitrogen-filled void (566 in FIG. 108, and between the outer 553 and inner 552 transparent enclosures), whereafter it encounters, and passes through, the inner transparent acrylic, and approximately cylindrical, enclosure 552. The electromagnetic radiation then passes through a second transparent nitrogen-filled void 565, whereafter it is absorbed by an outer surface of the outer-portion 551 of the embodiment's doubly-spiraled tube, and/or by an outer surface of the cylindrical insulating barrier 554.

A portion of the thermal energy, and/or heat, produced by, and/or resulting from, the absorption of electromagnetic radiation, e.g., 567, by the outer portion 551 of the doubly-spiraled tube, and/or by the cylindrical insulating barrier 554, is then conducted, transmitted, imparted, and/or transferred, to a working fluid (not shown) within that outer portion 551 of the doubly-spiraled tube, and/or it is then conducted, transmitted, imparted, and/or transferred, to the nitrogen within the gas-filled gap 565, whereafter a portion of that thermal energy, and/or heat, is conducted, transmitted, imparted, and/or transferred, from the heated nitrogen to the thermally-conductive wall of the outer portion 551 of the doubly-spiraled tube, and therethrough to, and/or into, the working fluid within the outer portion 551 of the doubly-spiraled tube.

Upon absorbing thermal energy, and/or heat, from the thermally-conductive wall of the outer-portion 551 of the doubly-spiraled tube, working fluid (not shown) therein expands causing it to flow upward within the outer-portion of the doubly-spiraled tube. And, as the working fluid flows upward within the outer-portion of the doubly-spiraled tube, it also flows in a counterclockwise direction (relative to a top-down perspective) about the generator shaft 563 thereby causing the doubly-spiraled tube, and the other embodiment components, parts, features, and/or structures, fixedly attached to the embodiment's generator shaft, to counter-rotate in a clockwise direction.

The rotation of the generator shaft 563 causes the operably connected, and non-rotating, and/or differently-rotating, generator 557 to produce electrical power which may then be used to energize an electrical mechanism, to produce a chemical reaction, e.g., a production of hydrogen gas through an electrolysis of water, or to accomplish some other desirable result.

As the "rotatable portion" of the embodiment, i.e., the generator shaft 563, the inner 568 and outer 551 portions of the doubly-spiraled tube, the cylindrical insulating barrier 554, the upper 556 and lower 555 air pumps, and the inner 552 and outer 553 transparent enclosures, are caused to rotate by the heating of the working fluid within the outer portion of the doubly-spiraled tube, the upper and lower air pumps are also caused to rotate and thereby cooperatively pump air through the interior of the cylindrical insulating barrier 554 thereby cooling the inner 568 portion of the doubly-spiraled tube.

As the lower air pump 555 rotates, its turbine blades, e.g., 560, are oriented, and/or configured, such that they tend to draw 569, and/or push, air from outside the embodiment into a lower portion 570 of the embodiment's central heat-dissipation vent (the vertical annular channel of air positioned radially outside of the generator shaft 563, and radially inside the inner 568 portion of the doubly-spiraled tube). Air pumped into the central heat-dissipation vent by the lower air pump then, and/or thereafter, flows 571 upward within the central heat-dissipation vent. The air entering 569 the central heat-dissipation vent will be relatively cool (compared to the electromagnetically-heated working fluid), and, as it rises, e.g., 572, within the central heat-dissipation vent that relatively cool air tends to remove thermal energy, and/or heat, from the thermally-conductive wall of the inner 568 portion of the doubly-spiraled tube, which, in turn, tends to remove thermal energy, and/or heat, from the working fluid within, and/or flowing through, that inner portion of the doubly-spiraled tube. The resulting cooling of the working fluid within the inner portion of the doubly-spiraled tube causes that working fluid to contract, which causes it to flow downward within that inner portion of the doubly-spiraled tube. As the cooling and contracting working fluid flows downward within the inner portion of the doubly-spiraled tube, it flows in a counterclockwise direction (relative to a top-down perspective) about the generator shaft 563 thereby causing the doubly-spiraled tube, and the other embodiment components, parts, features, and/or structures, fixedly attached to the embodiment's generator shaft, to counter-rotate in a clockwise direction.

Both the upward flow of the expanding working fluid through the outer-portion 551 of the embodiment's doubly-spiraled tube, and the downward flow of the contracting working fluid through the inner-portion 568 of the embodiment's doubly-spiraled tube, are in a counterclockwise direction relative to a top-down perspective, and the generator shaft's frame of reference. And, the resulting, and/or consequent, rotation of the "rotatable portion" of the embodiment, i.e., the generator shaft 563, the inner 568 and outer 551 portions of the doubly-spiraled tube, the cylindrical insulating barrier 554, the upper 556 and lower 555 air pumps, and the inner 552 and outer 553 transparent enclosures, is in an opposite, and/or clockwise, direction.

The clockwise rotation of the embodiment's rotatable portion, caused by the ascent of the heated working fluid (not shown) within the outer-portion 551 of the embodiment's doubly-spiraled tube, combines with the clockwise rotation of the embodiment's rotatable portion, caused by the descent of the cooled working fluid within the inner-portion 568 of the embodiment's doubly-spiraled tube, to impart a clockwise torque to the embodiment's generator shaft 563 which thereby, and/or therefore, causes the non-rotating generator 557, which is operably connected to the generator shaft, to produce electrical power.

As the upper air pump 556 rotates, its turbine blades, e.g., 562, are oriented, and/or configured, such that they tend to draw 573, and/or pull, air warmed and/or heated by the thermally-conductive wall of the inner-portion 568 of the embodiment's doubly-spiraled tube, from inside an upper portion 574 of the embodiment's central heat-dissipation vent, and to thereby expel 575 that air from the inside of the upper portion of the central heat-dissipation vent to the atmosphere outside the embodiment. The rotation-driven drawing in of air through the lower air pump 555, combined with the rotation-driven drawing out (i.e., expulsion) of air from the upper air pump 556, creates an upward flow 571-573 of air through the central heat-dissipation vent.

Thus, thermal energy imparted to the embodiment by incident electromagnetic radiation, e.g., 567, is used to cause a relatively cool working fluid (not shown) inside an outer-portion 551 of the embodiment's doubly-spiraled tube to expand and rise, thereby driving the rotatable portion of the embodiment in a clockwise direction. And, thermal energy removed from the a relatively warm working fluid inside an inner-portion 568 of the embodiment's doubly-spiraled tube is used to contract and descend, thereby contributing, amplifying, and/or increasing, the working-fluid-flow-induced torque rotating the rotatable portion of the embodiment in a clockwise direction.

The embodiment 550 illustrated in FIGS. 102-109 converts an energy received, and/or extracted, from electromagnetic radiation to a torque and a rotation that enables a production of electrical power (with a subsequent, and/or related, warming of air outside the embodiment with waste heat).

Figure 110:
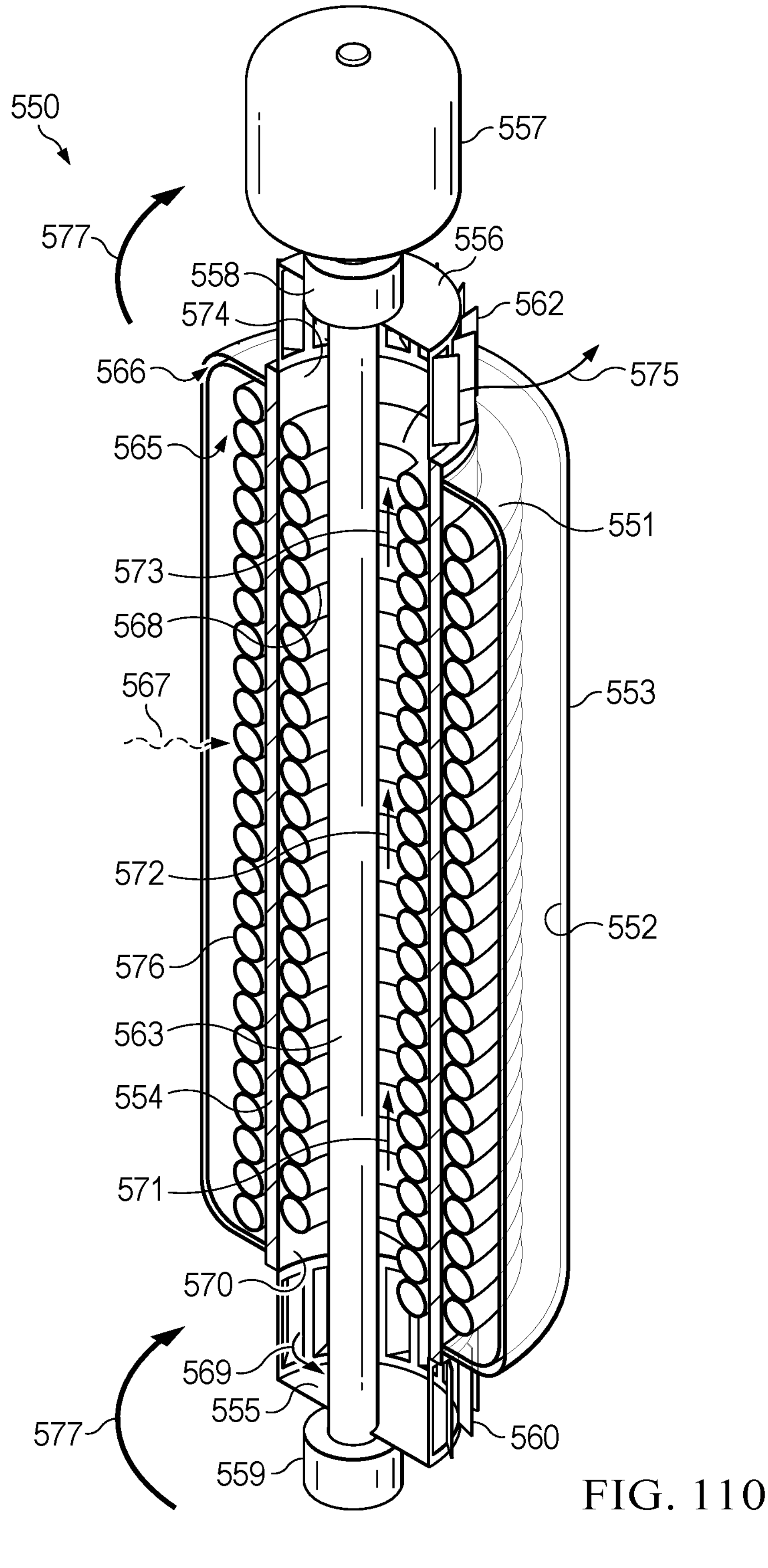
FIG. 110 shows a perspective side sectional view of the ninth embodiment of the present invention.

FIG. 110 shows a perspective side sectional view of the same embodiment 550 of the present disclosure that is illustrated in FIGS. 102-109 wherein the vertical section plane is specified in FIGS. 107 and 108, and the section is taken across line 109-109. The generator 557, its shaft 563, and the upper 558 and lower 559 shaft bearings, are not sectioned.

When electromagnetic radiation 567, e.g., visible light, passes through the outer 553 and inner 552 transparent enclosures, and through the nitrogen gas in the void and/or space 566 between the outer and inner transparent enclosures, it then passes through the nitrogen-filled void and/or space 565 within the interior of the inner transparent enclosure, and therethrough reaches and is absorbed by a surface of a portion 576 and/or part the outer-portion of the doubly-spiraled tube thereby warming and/or heating that portion of the thermally-conductive wall of the outer-portion of the doubly-spiraled tube. A portion of the heat imparted to the thermally-conductive wall of the outer-portion of the doubly-spiraled tube is then conducted, transmitted, imparted, and/or transferred, to a working fluid (not shown) within, and/or flowing through, that isothermal expansion tube portion, causing that working fluid to expand and flow upward and/or toward the generator 557.

Heated and expanded working fluid flows upward within the outer-portion 551 of the doubly-spiraled tube until it reaches a portion of that tube which passes through the thermally-insulating wall of the cylindrical insulating barrier 554, thereby passing from outside the cylindrical insulating barrier to an interior of that cylindrical insulating barrier, and therethrough into an upper end of the inner-portion 568 of the embodiment's doubly-spiraled tube, whereafter the heated working fluid (not shown) flows downward through that inner-portion of the embodiment's doubly-spiraled tube. As it flows downward through the inner-portion, and/or isothermal contraction portion, of the embodiment's doubly-spiraled tube, the working fluid conducts, transmits, imparts, and/or transfers, a portion of its heat and/or thermal energy to the thermally-conductive wall of that inner-portion of the embodiment's doubly-spiraled tube, which, in turn conducts, transmits, imparts, and/or transfers, a portion of that heat, and/or thermal energy, to a column of air rising 571-573 through a central heat-dissipation vent, e.g., 570 and 574.

As the embodiment is driven to rotate 577 in a clockwise direction (with respect to a top-down perspective) about its generator shaft 563, blades, scoops, and/or projections, e.g., 560, radially arrayed about the periphery of a lower air pump 555 draw 569, pump, move, push, pull, and/or drive, air from outside the embodiment into a lower portion 570 of the embodiment's central heat-dissipation vent, whereupon that air is drawn, and/or pulled, e.g., 571, upward within that central heat-dissipation vent due to thermal heating of the air therein, as well as due to the removal of air from an upper end of that central heat-dissipation vent by the complementary upper air pump 556. As air rises, e.g., 572, within the embodiment's central heat-dissipation vent, that relatively cool rising air absorbs heat and/or thermal energy from the thermally-conductive walls of the inner-portion 568 of the embodiment's doubly-spiraled tube, thereby cooling those thermally-conductive tube walls and the working fluid (not shown) flowing therethrough, and warming the rising air.

Rotations 577 of the upper air pump 556 in a clockwise direction about a longitudinal axis of the generator shaft 563 cause the blades, scoops, and/or projections, e.g., 562, radially arrayed about the periphery of the upper air pump 556 to draw 575, remove, pump, and/or pull, warmed air from an upper end 574 of the embodiment's central heat-dissipation vent, thereby expelling the warmed air within the central heat-dissipation vent to, and/or into, the atmosphere outside the embodiment, and thereby promoting a drawing-in of additional quantities of relatively cool air from the lower air pump 555.

Figure 111:
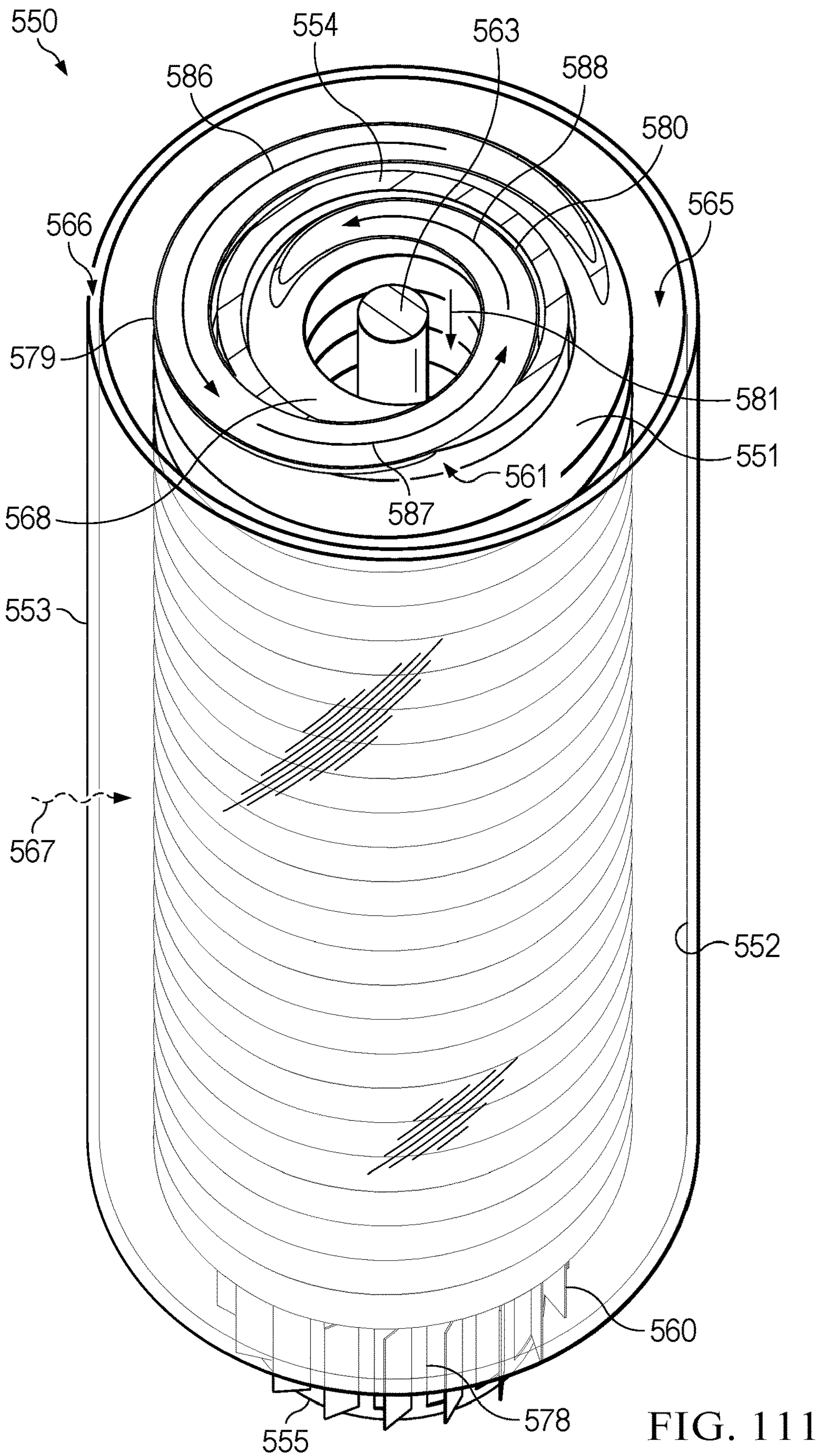
FIG. 111 shows a perspective top-down sectional view of the ninth embodiment of the present invention.

FIG. 111 shows a perspective top-down sectional view of the same embodiment 550 of the present disclosure that is illustrated in FIGS. 102-110 wherein the horizontal section plane is specified in FIG. 103, and the section is taken across line 111-111.

The lower 555 and upper (not visible, 556 in FIG. 110) air pumps incorporate, include, and/or utilize, rectangular apertures, e.g., 578, each of which is paired with a complementary angled rectangular blade, flap, wall, and/or scoop, e.g., 560. The angular orientation of each blade, relative to its respective aperture, determines whether the clockwise rotations of the rotatable portions of the embodiment will (as is the case for the lower air pump 555) push outside air into and through the respective rectangular aperture, and therethrough into the central heat-dissipation vent, or, (as is the case for the upper air pump 556) will draw air out of the central heat-dissipation vent, and into the atmosphere outside the embodiment.

At an upper end of the embodiment's doubly-spiraled tube (i.e., an upper end of both the outer 551 and inner 568 portions of the doubly-spiraled tube), the portion of the doubly-spiraled tube comprising the outer-portion 551 of that doubly-spiraled tube passes through the embodiment's cylindrical insulating barrier 554 thereby, and/or therethrough, being, and/or becoming, fluidly connected with the portion of the doubly-spiraled tube comprising the inner-portion 568 of that embodiment's doubly-spiraled tube. The uppermost portion, e.g., 579, of the outer-portion 551 of the doubly-spiraled tube passes through the cylindrical insulating barrier at 561, thereafter, at the point at which its passage through the cylindrical insulating barrier is complete, constituting, and/or transitioning into, the uppermost portion, e.g., 580, of the fluidly connected, and/or fluidly interconnected, inner-portion 568 of that doubly-spiraled tube.

Working fluid (not shown) flowing upward through the outer-portion 551 of the doubly-spiraled tube is heated by the energy received from incident electromagnetic radiation, e.g., 567, the heating thereof causing that working fluid to expand and flow upward through the outer-portion of the doubly-spiraled tube. Within the outer-portion of the doubly-spiraled tube, the heated working fluid flows 586 toward the uppermost portion of the outer-portion of the doubly-spiraled tube. And, as the heated working fluid flows 587 through that portion of the embodiment's doubly-spiraled tube that transits, and/or passes through, the upper portion of the cylindrical insulating barrier 554, i.e., that portion of the doubly-spiraled tube that fluidly connects, and/or interconnects, the uppermost ends of the outer 551 and inner 568 portions of the doubly-spiraled tube, the heated working fluid flows 588 into the uppermost portion 580 of the inner-portion of the doubly-spiraled tube. Thereafter, as the working fluid flows downward through the inner-portion of the doubly-spiraled tube, it cools and contracts as it conducts, transmits, imparts, and/or transfers, a portion of its thermal energy to the relatively cool air that rises through the central heat-dissipation vent.

Figure 112:
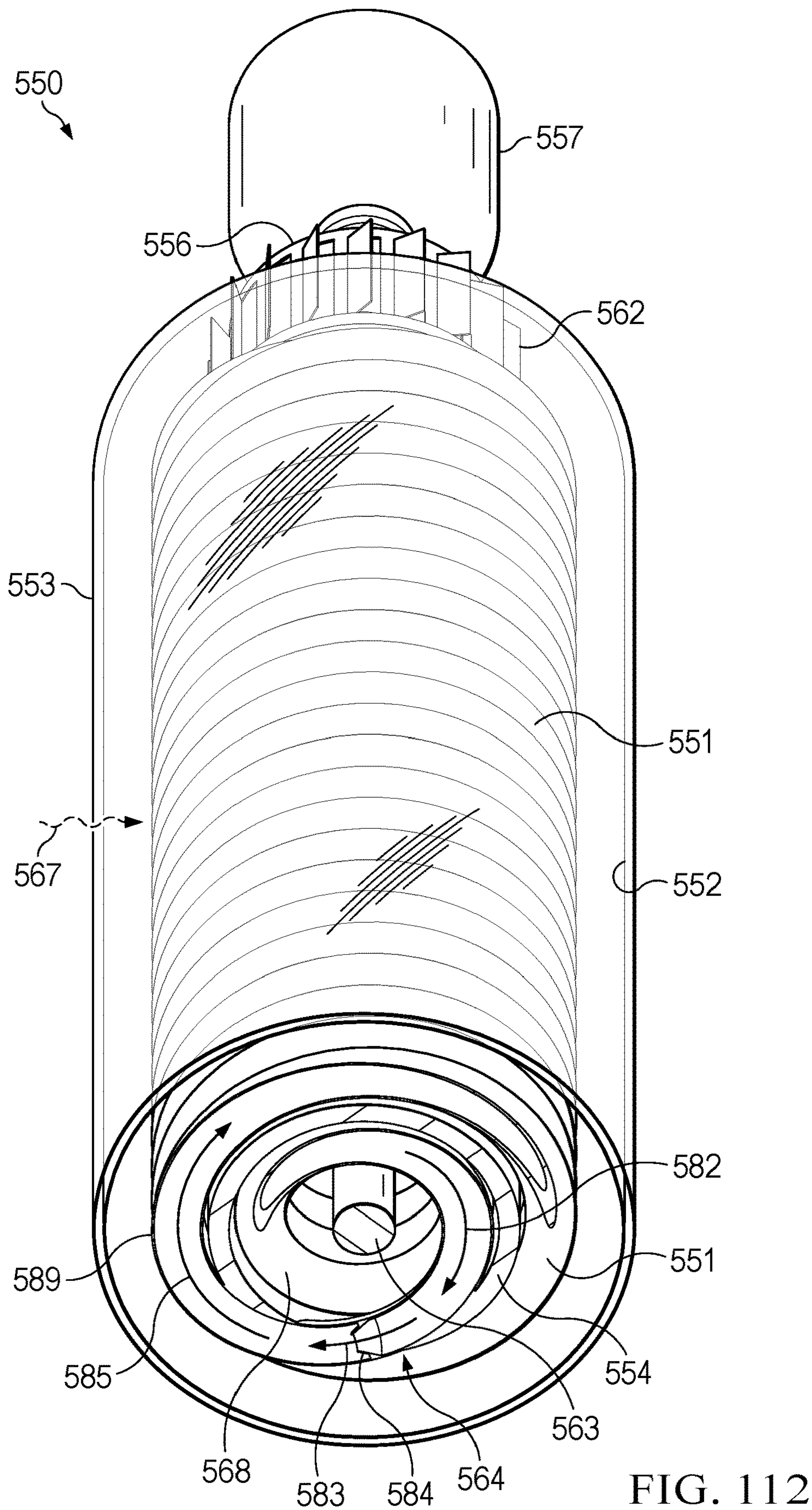
FIG. 112 shows a perspective bottom-up sectional view of the ninth embodiment of the present invention.

FIG. 112 shows a perspective bottom-up sectional view of the same embodiment 550 of the present disclosure that is illustrated in FIGS. 102-111 wherein the horizontal section plane is specified in FIG. 103, and the section is taken across line 112-112.

Working fluid (not shown) that has cooled during its passage down through the inner-portion 568 of the embodiment's doubly-spiraled tube flows 582 toward the lowermost portion of the inner-portion of the doubly-spiraled tube. And, as the cooled working fluid flows 583 through that portion of the embodiment's doubly-spiraled tube that passes through the lower portion of the cylindrical insulating barrier 554, i.e., that portion of the doubly-spiraled tube that fluidly connects, and/or interconnects, the lowermost ends of the inner 568 and outer 551 portions of the doubly-spiraled tube, which occurs at location 564, the cooled working fluid flows 583 through a diodic valve 584 that does not significantly impede working-fluid flow in the preferred direction (e.g., direction 583, as shown in FIG. 112), but does significantly inhibit, and/or obstruct, working-fluid flow in an opposite direction (not shown).

After flowing through the diodic valve 584, the cooled working fluid flows into and through the lowermost portion 589 of the outer-portion 551 of the doubly-spiraled tube. And, as the working fluid thereafter flows upward through the outer-portion of the doubly-spiraled tube, it is warmed, and/or heated, by energy imparted to that outer-portion of the doubly-spiraled tube by incident electromagnetic radiation, e.g., 567, and that working fluid consequently expands and flows upward in response to its warming that results from that influx of thermal energy.

The embodiment illustrated in FIGS. 102-112 might be vertical and free standing, responding to incident sunlight that directly impinges on its transparent enclosures. It might be positioned horizontally, centered on the long axis of a cylindrical parabolic mirror that concentrates greater amounts of sunlight on the embodiment, as well as adjusting its orientation so as to track the sun, in order to increase the amount of potentially available sunlight that heats the embodiment. And, other applications are possible, and all such applications are included within the scope of the present disclosure.

The inner 552 and outer 553 transparent enclosures of the embodiment may be fabricated, in whole or in part, of any material having a non-zero degree of transparency at one or more wavelengths of interest, including, but not limited to, the materials: glass, polycarbonate, fused silica, acrylic, and plastic. The void (566 in FIG. 111), gap, and/or space, between the inner and outer transparent enclosures, as well as the void (565 in FIG. 111), gap, and/or space, between the inner transparent enclosure and the outer-portion 551 of the doubly-spiraled tube, may be filled, in whole or in part, with any fluid (e.g., gas or liquid), including, but not limited to: nitrogen, air, $CO_2$, methane, hydrogen, water, alcohol, and oil. Either or both spaces 565 and 566 may also be devoid of any gas, i.e., may constitute a vacuum. Either or both spaces 565 and 566 may also be filled, and/or comprise, in whole or in part, a sufficiently transparent solid, preferably an insulating solid.

An embodiment similar to the one illustrated in FIGS. 102-112, and included within the scope of the present disclosure, surrounds the outer portion of the doubly-spiraled tube with a solid transparent light-absorbing material that does not contain a gaseous space surrounding the outer portion of the doubly-spiraled tube. Such an embodiment might, or might not, incorporate, retain, and/or utilize, the inner 552 and outer 553 transparent enclosures. One advantage that might be enjoyed by such a similar embodiment would be an improved ability to operate within an environment characterized by sudden, and/or large fluctuations in the pressure of the gas outside, and/or surrounding, the embodiment (e.g., which might lead to a fatigue, cracking, and/or shattering, of a transparent enclosure.

The varieties of embodiments, their geometries, their working fluids, their operations, and their applications, enumerated within the "Summary of the Invention" section of this disclosure apply to the embodiment illustrated and discussed in relation to FIGS. 102-112, and the scope of the present disclosure includes all such variations of the embodiment illustrated in FIGS. 102-112.

Disclosed in this specification, and in FIGS. 102-112, is a closed-cycle heat engine, comprising: a generator and a generator shaft; an insulated cylindrical tube coaxial with, and fixedly attached to, the generator shaft; a transparent enclosure surrounding an outer surface of the insulated cylindrical tube, and creating an annular heat chamber therebetween; a thermally-conductive spiraling fluid-flow tube fixedly attached to the insulated cylindrical tube and containing a working fluid, said spiraling fluid-flow tube having radially-adjacent inner and outer spiraling fluid-flow channel sectors; wherein the inner spiraling fluid-flow channel sector is radially adjacent to an inner surface of the insulated cylindrical tube and is cooled by air moving through that insulated cylindrical tube; wherein the outer spiraling fluid-flow channel sector is located within the annular heat chamber and is radially adjacent to an outer surface of the insulated cylindrical tube therein; wherein electromagnetic radiation that penetrates the transparent enclosure of the annular heat chamber, heats the outer spiraling fluid-flow channel sector therein; wherein the spiraling fluid-flow tube is configured to rotate when working fluid therein is heated within the outer spiraling fluid-flow channel sector, and cooled within the inner spiraling fluid-flow channel sector; wherein a rotation of the spiraling fluid-flow tube causes a rotation of the fixedly attached generator shaft thereby causing the generator to produce an electrical power.

Figure 113:
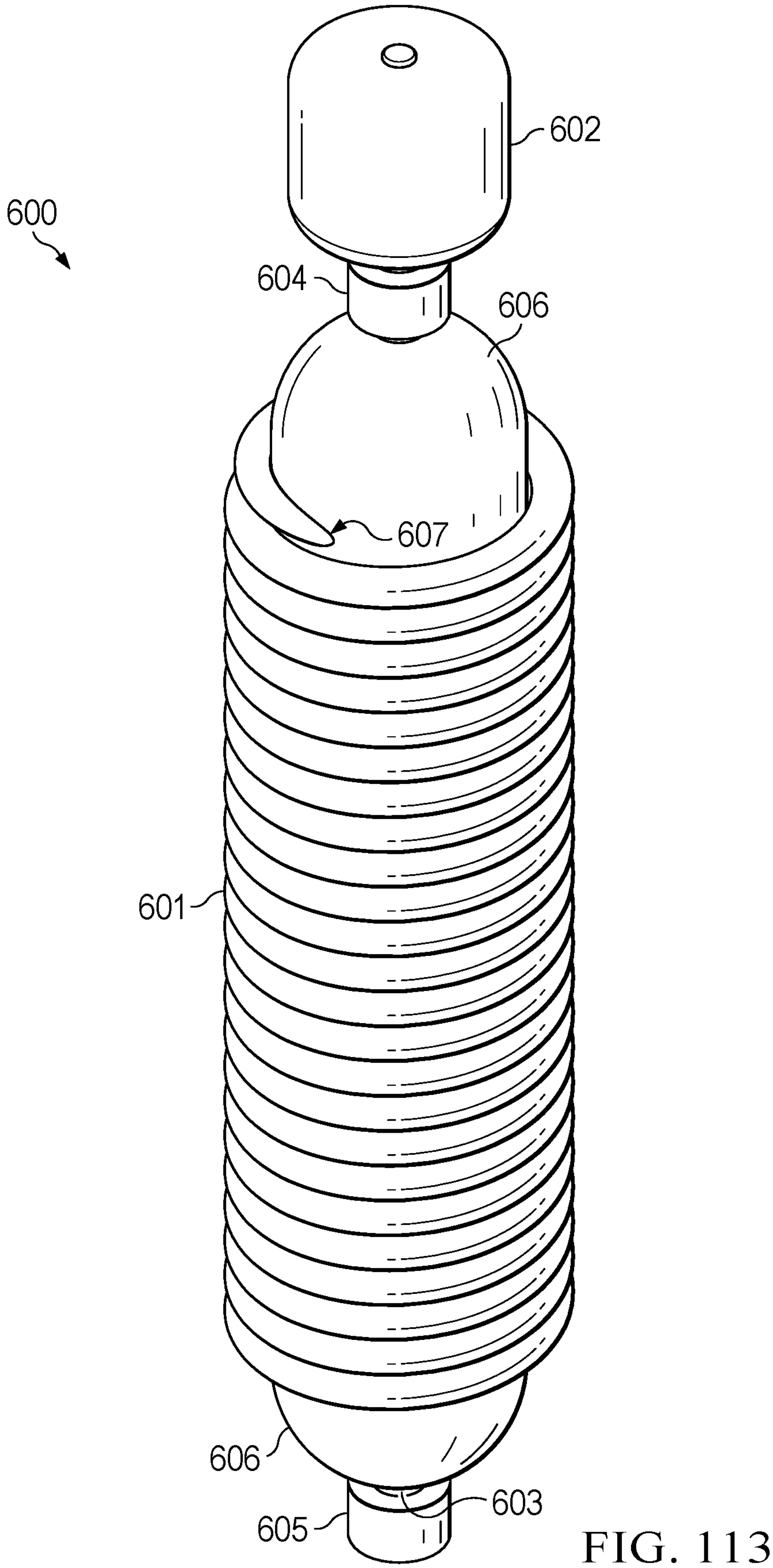
FIG. 113 shows a perspective side view of a tenth embodiment of the present invention.

FIG. 113 shows a perspective side view of an embodiment 600 of the present disclosure.

The embodiment 600 illustrated in FIG. 113 contains a tube, and/or an annulus, of radioactive material which produces heat as it decays. The radioactive material is encased within a pill-shaped insulating jacket that directs most, if not all, of the decay heat into the isothermal expansion portion (not visible) of the embodiment's doubly-spiraled tube, an outer portion 601 of which is visible in FIG. 113, thereby causing working fluid (not shown) therein to expand and flow through the isothermal expansion tube portion in a direction toward an upper end of the embodiment, and/or toward the end of the embodiment where the generator 602 is connected.

The fluid (not shown, e.g., air, space, water, seawater, etc.) outside the embodiment removes thermal energy, and/or heat, from the isothermal contraction portion 601 of the doubly-spiraled tube, thereby causing the working fluid (not shown) flowing therethrough to contract and to flow through the isothermal contraction tube portion in a downward direction, and/or toward the end of the embodiment opposite the end where the generator 602 is connected.

The embodiment 600 comprises, in part, and/or includes, utilizes, and/or contains, a generator 602, a generator shaft 603, upper 604 and lower 605 shaft bearings, and a thermal-source insulation chamber 606. FIG. 113 illustrates the point 607 at which the isothermal expansion portion (not visible) of the embodiment's doubly-spiraled tube, positioned within the thermal-source insulation chamber, passes through an upper part, and/or portion, of that thermal-source insulation chamber, and transitions to the fluidly connected isothermal contraction portion 601 of that doubly-spiraled tube, positioned outside embodiment's thermal-source insulation chamber.

Figure 114:
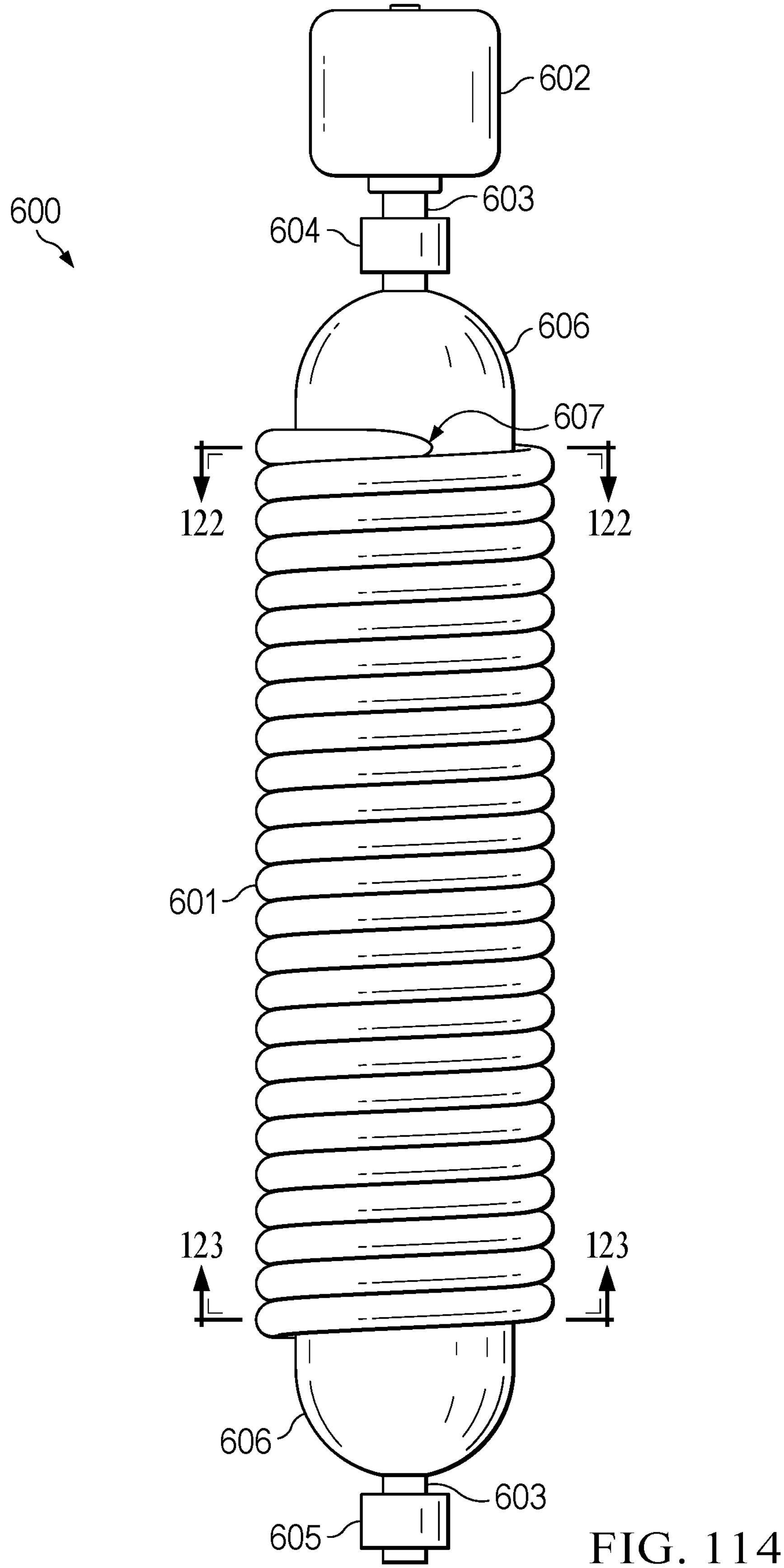
FIG. 114 shows a side view a perspective side view of the tenth embodiment of the present invention.

FIG. 114 shows a side view of the same embodiment 600 of the present disclosure that is illustrated in FIG. 113.

Figure 115:
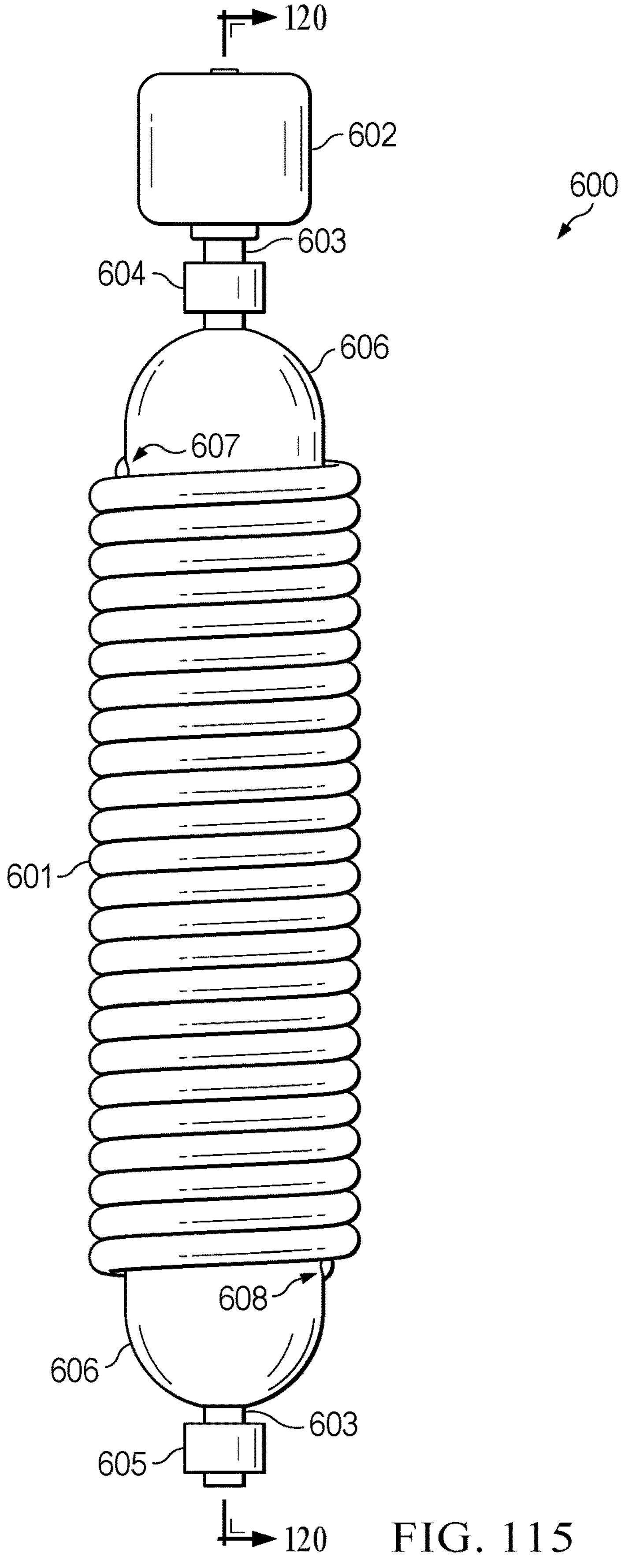
FIG. 115 shows a side view of the tenth embodiment of the present invention.

FIG. 115 shows a side view of the same embodiment 600 of the present disclosure that is illustrated in FIGS. 113 and 114.

FIG. 115 illustrates the point 608 at which the thermal contraction portion 601 of the embodiment's doubly-spiraled tube, positioned outside the thermal-source insulation chamber, passes through a lower part, and/or portion, of the embodiment's thermal-source insulation chamber, and transitions to the fluidly connected isothermal expansion portion (not visible) of that doubly-spiraled tube positioned, positioned within the embodiment's thermal-source insulation chamber.

Figure 116:
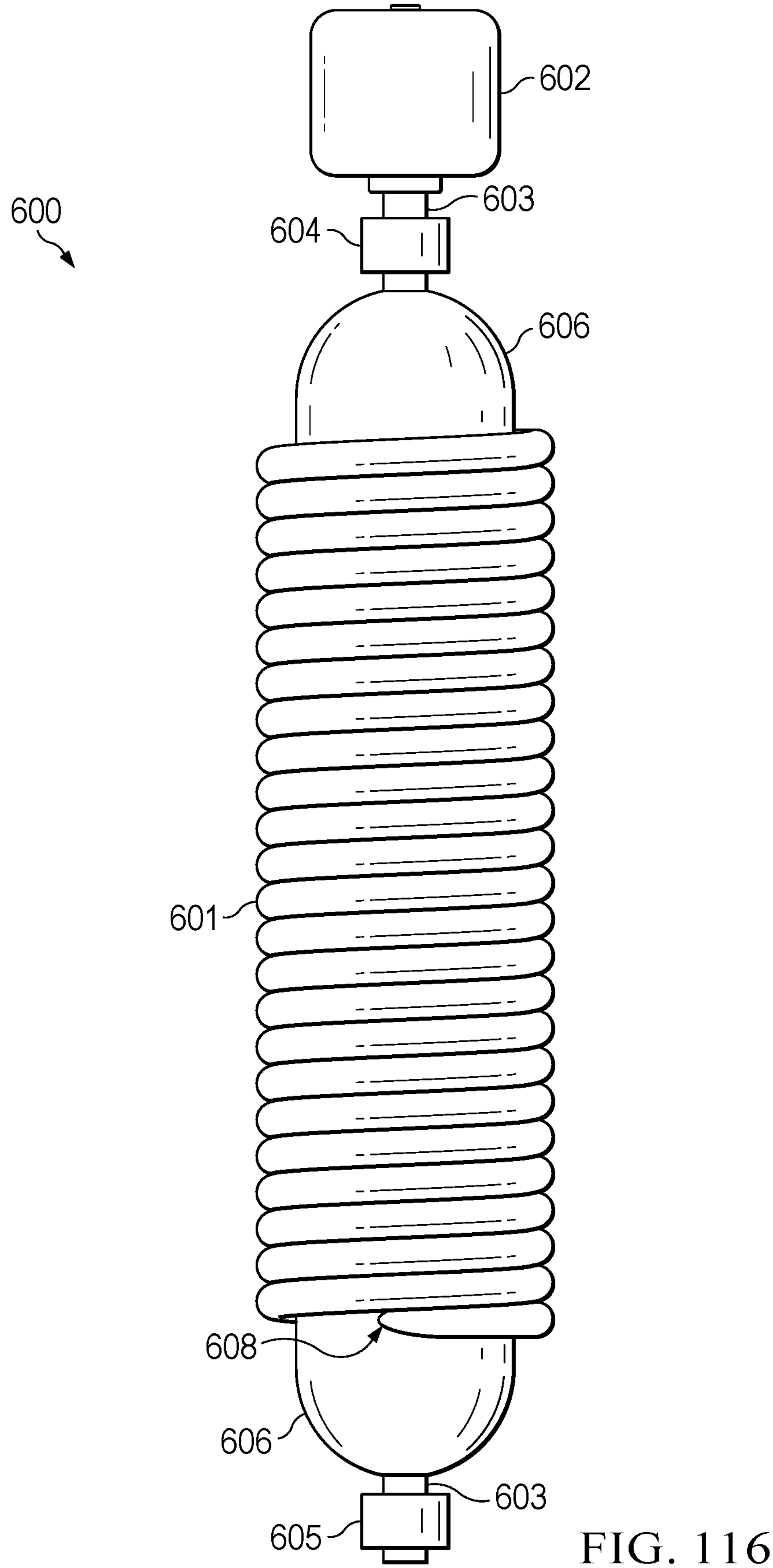
FIG. 116 shows a side view of the tenth embodiment of the present invention.

FIG. 116 shows a side view of the same embodiment 600 of the present disclosure that is illustrated in FIGS. 113-115.

Figure 117:
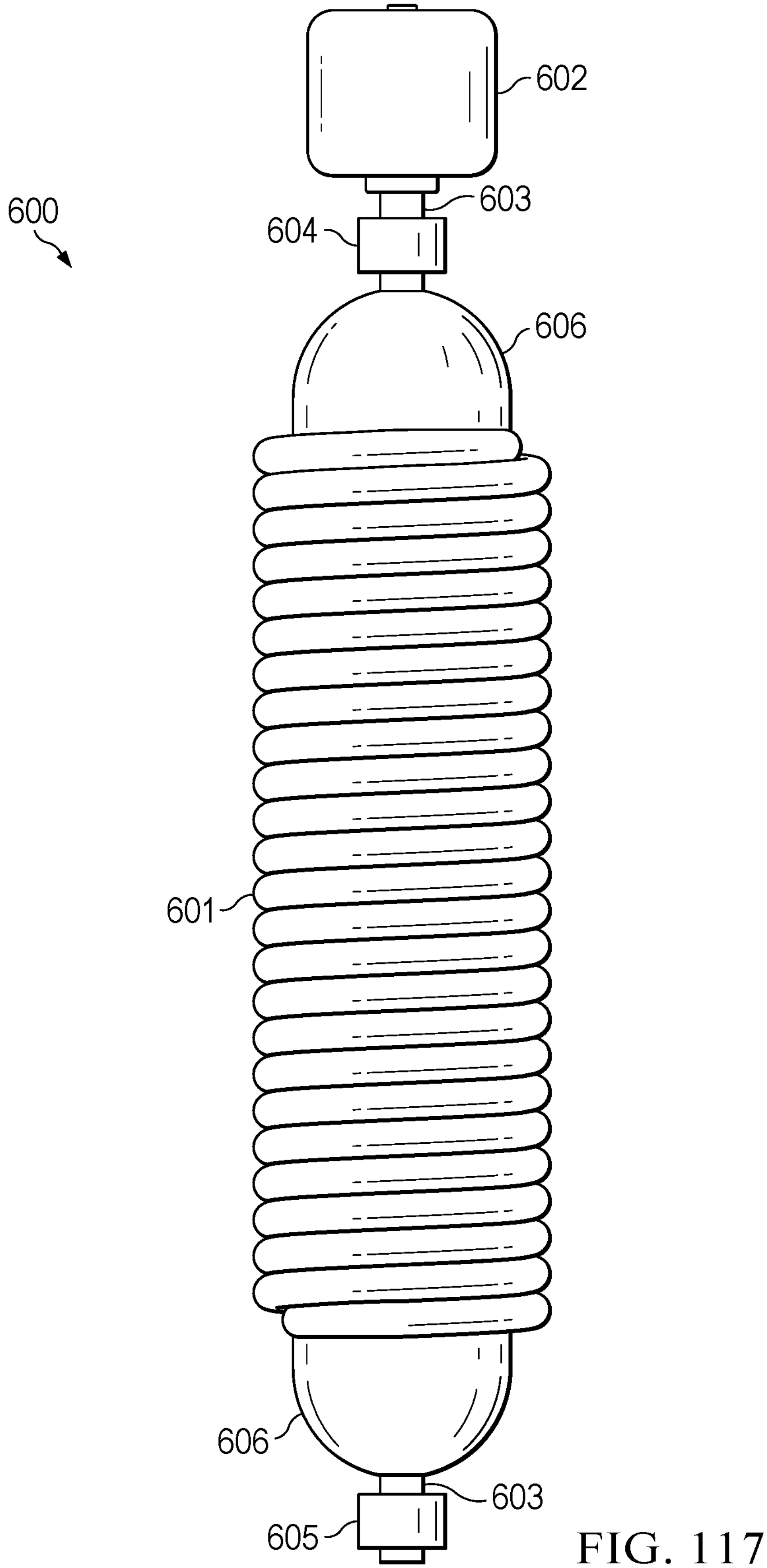
FIG. 117 shows a side view of the tenth embodiment of the present invention.

FIG. 117 shows a side view of the same embodiment 600 of the present disclosure that is illustrated in FIGS. 113-116.

Figure 118:
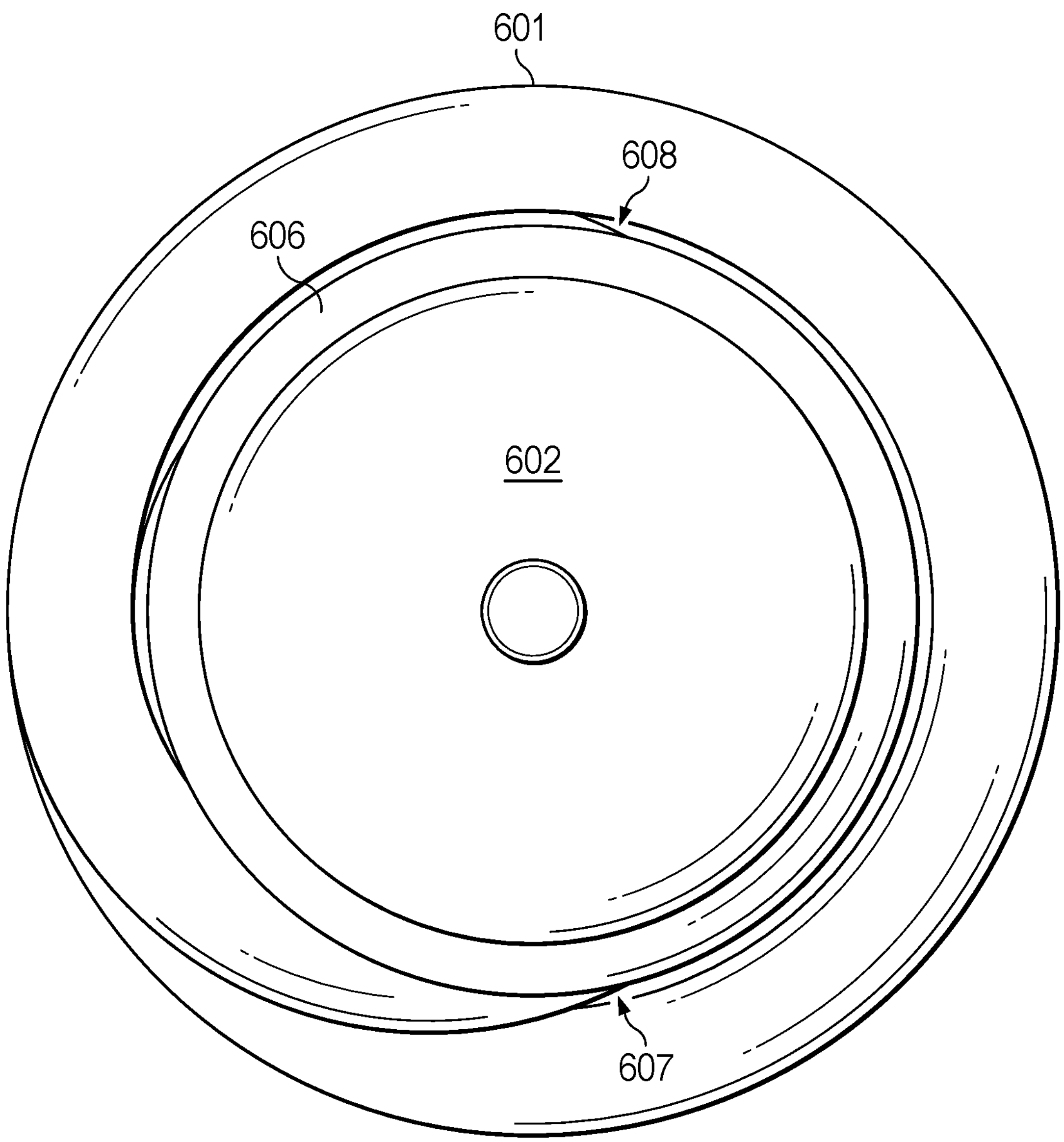
FIG. 118 shows a top-down view of the tenth embodiment of the present invention.

FIG. 118 shows a top-down view of the same embodiment 600 of the present disclosure that is illustrated in FIGS. 113-117.

Figure 119:
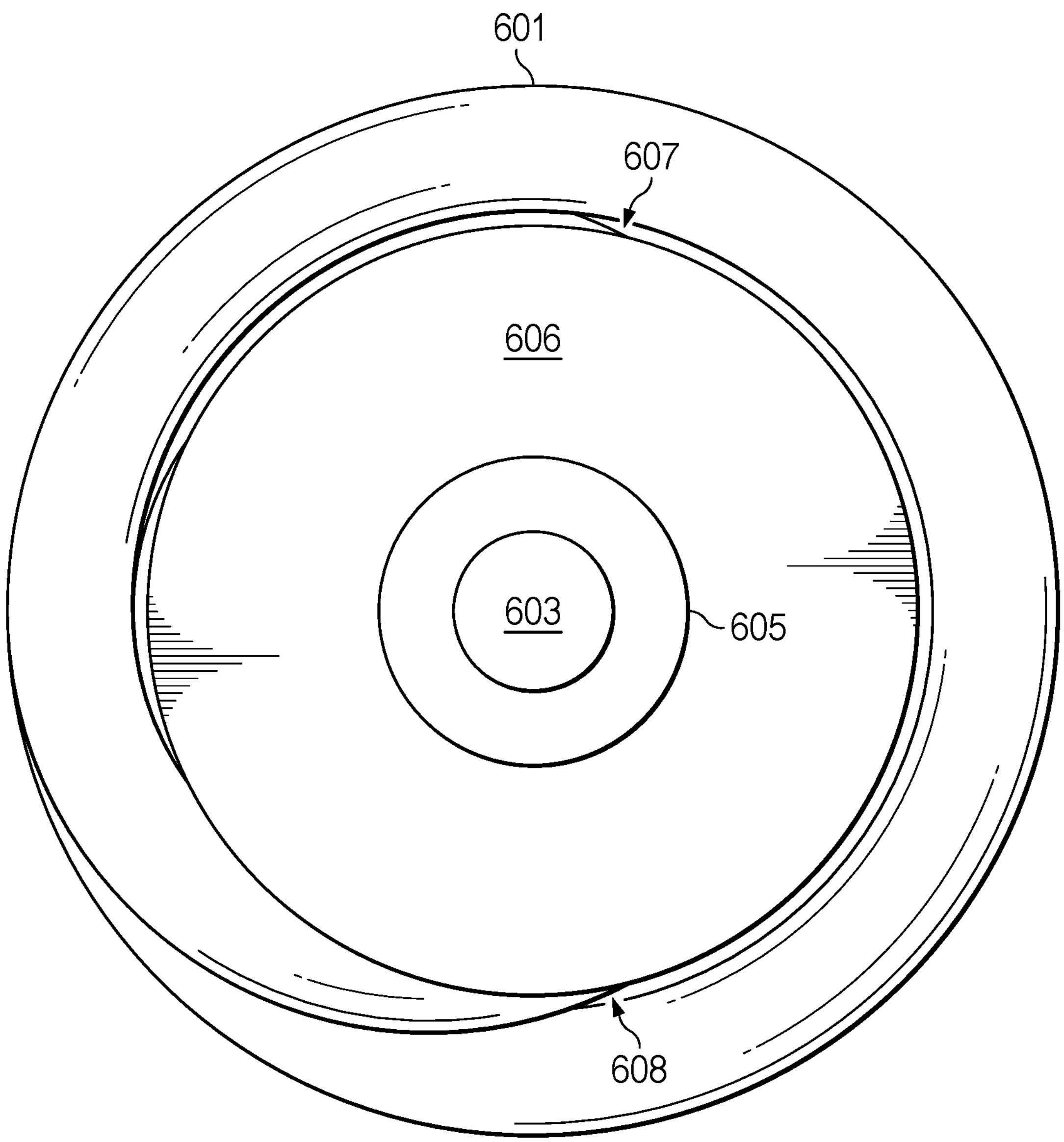
FIG. 119 shows a bottom-up view of the tenth embodiment of the present invention.

FIG. 119 shows a bottom-up view of the same embodiment 600 of the present disclosure that is illustrated in FIGS. 113-118.

Figure 120:
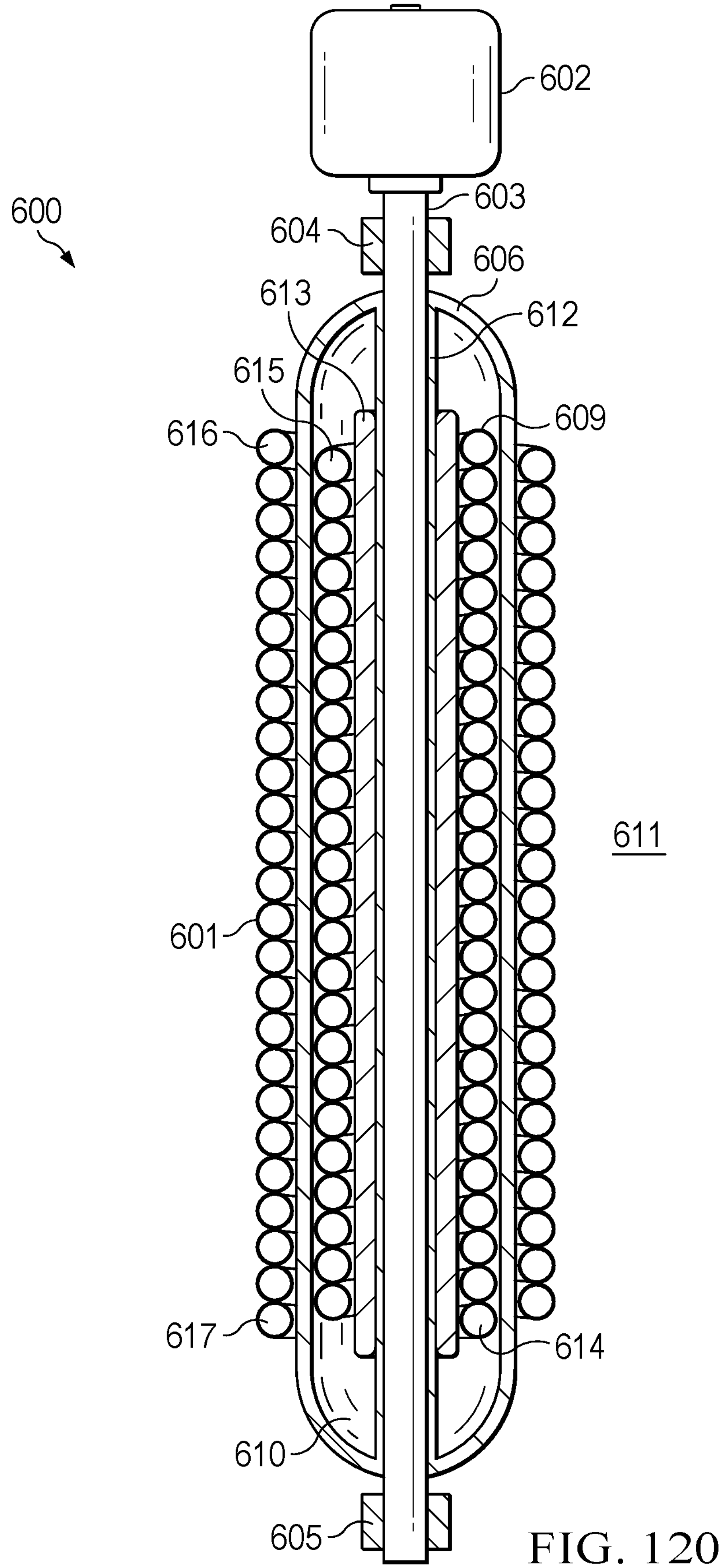

FIG. 120 shows a side sectional view of the same embodiment 600 of the present disclosure that is illustrated in FIGS. 113-119 wherein the vertical section plane is specified in FIG. 115, and the section is taken across line 120-120. The generator 602 and its shaft 603 are not sectioned.

The embodiment comprises, in part, a doubly-spiraled fluid-flow tube. An "inner" part 609, and/or portion, of that doubly-spiraled tube is positioned within a thermal-source insulation chamber 606, which thermally isolates an interior 610 of that thermal-source insulation chamber, and permits a temperature therein to exceed that of a fluid (e.g., air or atmosphere, and/or water) outside, e.g., 611, the embodiment, without exchanging, and/or imparting, significant thermal energy to that outside fluid.

Embodiments similar to the one illustrated in FIGS. 113-120, operate outside of the Earth's atmosphere, where they are surrounded by the vacuum of space. Some of these similar embodiments attach thermal radiators, e.g., fins, to outer portions, and/or surfaces, of the thermal contraction portions 601 of their respective doubly-spiraled tubes, so as to promote a radiative dissipation of thermal energy to, and/or into, space, e.g., through a radiation of infrared light into space. In such applications, the fins do not experience significant drag while rotating in the vacuum of space, which drag might otherwise inhibit a rotation of the respective doubly-spiraled tubes, and/or a rotation of the respective generator shafts, in a non-vacuous environment.

Within the thermal-source insulation chamber 606, a layer, and/or barrier, of shaft insulation 612 thermally isolates the generator shaft 603 from the interior 610 of the thermal-source insulation chamber, thereby providing an inner insulating tube that thermally isolates the interior of the thermal-source insulation chamber from the generator shaft, and thereby permits an achievement and maintenance of a temperature within the thermal-source insulation chamber that exceeds that of the generator shaft, while also preventing the generator shaft from providing a thermal conduit through which thermal energy from within the interior of the thermal-source insulation chamber can flow to the fluid 611 (e.g., air or atmosphere) outside the embodiment.

Fixedly attached to an interior 610 of the thermal-source insulation chamber 606/612 is a tubular mass 613, tube, pipe, cylinder, and/or annulus, of nuclear material, whose radioactive decay creates heat, and/or thermal energy, which heats the interior 610 of the thermal-source insulation chamber. The exterior 606 and interior 612 thermally insulated walls of the thermal-source insulation chamber, are resistant to pressure, and are able to maintain their structural integrity even when the pressure of a fluid (not shown) within an interior, e.g., 610, of the thermal-source insulation chamber is significant, e.g., 50 bars. The walls of the thermal-source insulation chamber, as well as the fluid contained therein, contain materials (not shown), e.g., lead, which inhibit the passage of products of radioactive decay, e.g., neutrons and gamma rays, from the radioactive material to an outside, e.g., 611, of the embodiment.

Heat, and/or thermal energy, produced by, and/or through, the radioactive decay of portions of the tubular nuclear material 613 heat a fluid (not shown, e.g., molten salt, oil, and/or molten lead) contained within the interior 610 of the embodiment's thermal-source insulation chamber 606/612. A portion of the heat, and/or thermal energy, conducted, transmitted, imparted, and/or transferred, by the tubular nuclear material to the fluid in which it is bathed, is subsequently, and/or thereafter, conducted, transmitted, imparted, and/or transferred, from that fluid to the thermally-conductive tubular walls, and therethrough to a working fluid (not shown) within, the inner, and/or isothermal expansion portion 609, of the embodiment's doubly-spiraled tube, thereby causing that working fluid (not shown) within that portion of the doubly-spiraled tube to expand and to flow upward (i.e., in a direction toward the embodiment's generator 602) within that portion of the embodiment's doubly-spiraled tube.

Whereas relatively cool working fluid enters the interior, e.g., 614, of a lower end of the isothermal expansion portion 609 of the embodiment's doubly-spiraled tube, the working fluid (not shown) that reaches the interior, e.g., 615, of an upper end of that isothermal expansion portion of the embodiment's doubly-spiraled tube is hotter, has expanded, and is therefore of a greater volume per unit working-fluid mass, and of a lesser density, than is the working fluid entering the interior of the lower end of the doubly-spiraled tube. The upward flow of the warming, and/or warmed, working fluid along a spiral path, approximately coaxially centered about the embodiment's generator shaft 603, and/or about a longitudinal axis of rotation of the embodiment, which longitudinal axis of rotation is coaxial with that generator shaft, causes a counter rotation of the doubly-spiraled tube, and of the generator shaft to which it is fixedly attached, which thereby causes the generator 602, which is operably connected to the generator shaft, to produce electrical power.

The generator 602, and outer portions, surfaces, and/or parts, of the upper 604 and lower 605 shaft bearings, are nominally connected, affixed, and/or fixedly attached, to an external non-rotating, and/or differently-rotating, external structure, platform, mechanism, and/or apparatus, which enables the rotations and torque of the generator shaft 603 to energize the non-rotating generator rather than to cause the generator to rotate with the generator shaft.

Heated working fluid (not shown) that flows to an upper end, e.g., 615, of the isothermal expansion portion 609 of the embodiment's doubly-spiraled tube, thereafter flows out of the thermal-source insulation chamber 606/612 through a portion of the doubly-spiraled tube that passes through, and/or transits, the outer wall 606 of that thermal-source insulation chamber, i.e., at point 607 in FIGS. 113 and 115. The heated working fluid that flows from the upper end of the isothermal expansion portion 609 of the embodiment's doubly-spiraled tube, and through the outer wall 606 of the thermal-source insulation chamber, flows into an upper end, e.g., 616, of the fluidly connected isothermal contraction portion 601 of that doubly-spiraled tube.

Heated working fluid (not shown) that flows into an upper end, e.g., 616, of the isothermal contraction portion 601 of the doubly-spiraled tube thereafter flows downward through that portion of the doubly-spiraled tube as its loss of thermal energy to the thermally-conductive wall of that isothermal contraction portion of the doubly-spiraled tube, and the wall's loss of thermal energy to the fluid (not shown) outside, e.g., 611, the embodiment, causes that working fluid to cool and contract. The contraction of the working fluid that results from the cooling of that working fluid causes that working fluid to be "drawn" and/or "pulled" downward through the isothermal contraction portion of the doubly-spiraled tube by a partial-vacuum gradient that intensifies from the upper end, e.g., 616, to the lower end, e.g., 617, of the isothermal contraction portion of the doubly-spiraled tube. The downward, contraction-driven, flow of the cooling working fluid within the isothermal contraction tube portion, causes a counter rotation of the doubly-spiraled tube, and of the generator shaft to which it is fixedly attached, which thereby causes the generator 602, that is operably connected to the generator shaft, to produce electrical power.

Both the upward, heat-driven expansion and flow of the working fluid (not shown) within the isothermal expansion portion 609 of the embodiment's doubly-spiraled tube, as well as the downward, cooling-driven contraction and flow of the working fluid within the isothermal contraction portion 601 of the doubly-spiraled tube, contribute, and/or impart, torque to the generator shaft 603 to which the doubly-spiraled tube is fixedly attached, and both thermally-driven flows of working fluid upward and downward through the embodiment's doubly-spiraled tube contribute power to the generator, via torque applied to the generator shaft, which produces an electrical power in response to that shaft-applied torque.

Cooled working fluid (not shown) that flows downward to, and/or into, the interior, e.g., 617, of a lower end of the isothermal contraction portion 601 of the doubly-spiraled tube, thereafter flows into the thermal-source insulation chamber 606/612 through a portion of the doubly-spiraled tube that passes through, and/or transits, the outer wall 606 of that thermal-source insulation chamber, i.e., at point 608 in FIGS. 115 and 116. The cooled working fluid that flows from the lower end of the isothermal contraction portion 601 of the embodiment's doubly-spiraled tube, and through the outer wall 606 of the thermal-source insulation chamber, flows to, and/or into, an interior, e.g., 614, of the lower end of the isothermal expansion portion 609 of the embodiment's doubly-spiraled tube positioned.

Cooled working fluid (not shown) that flows into the lower end, e.g., 614, of the isothermal expansion portion 609 of the doubly-spiraled tube, thereafter flows upward through that portion of the doubly-spiraled tube in response to its heating and expansion therein. And, the cyclic flow of working fluid through the embodiment's doubly-spiraled tube continues.

Figure 121:
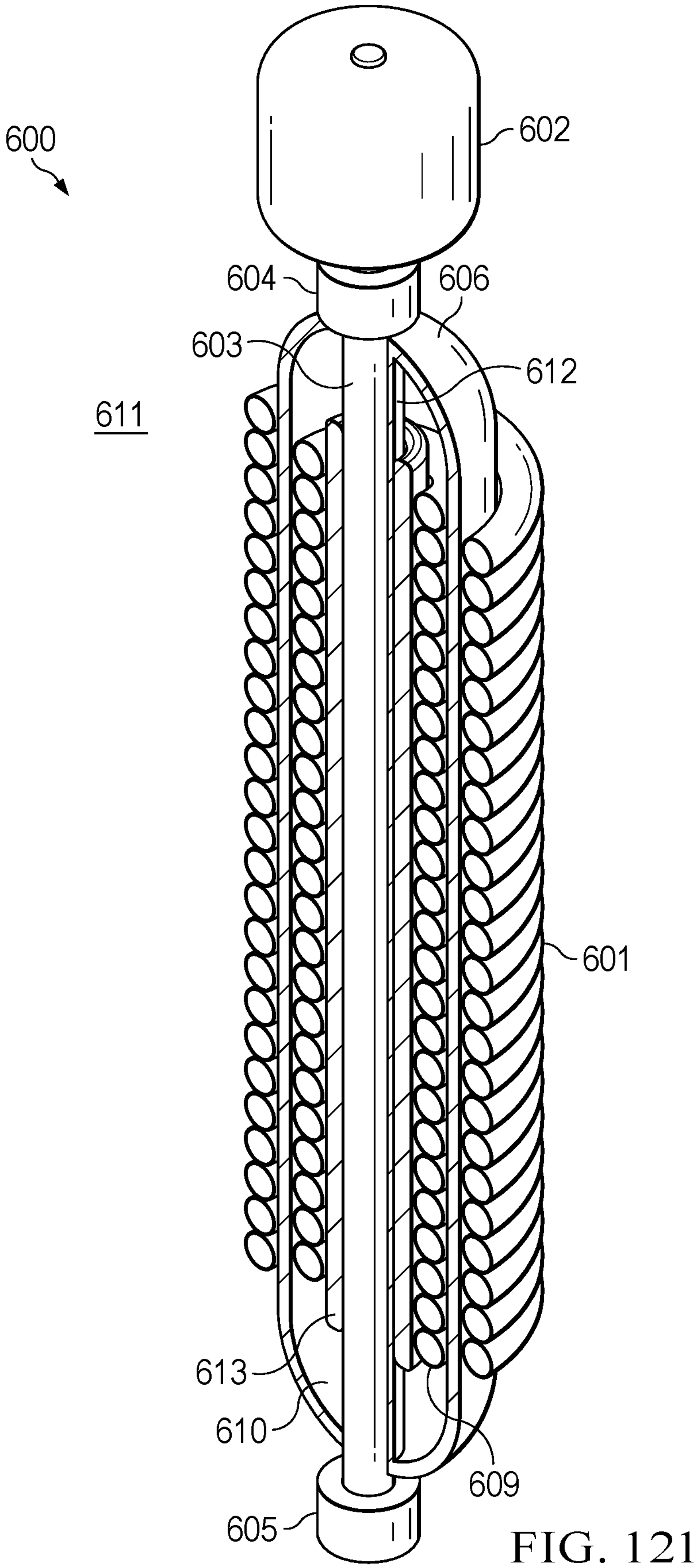

FIG. 121 shows a perspective side sectional view of the same embodiment 600 of the present disclosure that is illustrated in FIGS. 113-120 wherein the vertical section plane is specified in FIG. 115 and the section is taken across line 120-120. The generator 602, its shaft 603, and the upper 604 and lower 605 shaft bearings, are not sectioned.

Figure 122:
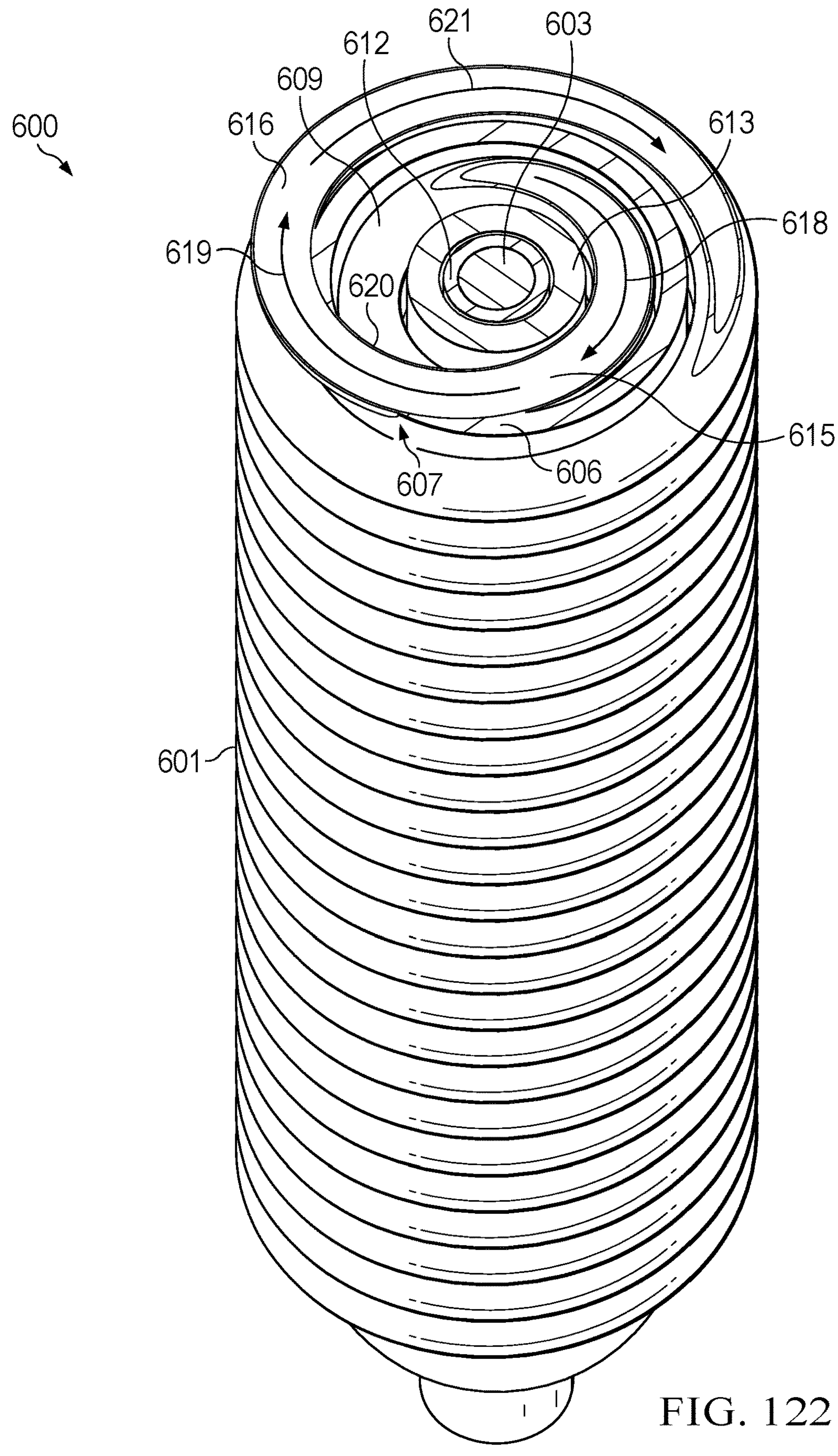

FIG. 122 shows a perspective top-down sectional view of the same embodiment 600 of the present disclosure that is illustrated in FIGS. 113-121 wherein the horizontal section plane is specified in FIG. 114 and the section is taken across line 122-122.

Working fluid (not shown) that has flowed upward through the isothermal expansion portion 609 of the embodiment's doubly-spiraled tube, absorbing heat and expanding as it flowed, flows 618 into an interior 615 of the upper end of that isothermal expansion tube portion, after which it flows 619 through a relatively short portion 620 of the doubly-spiraled tube that passes through, and/or transits, the exterior wall 606 of the thermal-source insulation chamber, e.g., at point, and/or position, 607, thereby flowing 619 into an interior 616 of the upper end of the isothermal contraction portion 601 of the embodiment's doubly-spiraled tube. Thereafter the working fluid flows 621 downward through that isothermal contraction tube portion of the doubly-spiraled tube, losing heat and contracting as it flows downward toward the bottom end of that isothermal contraction tube portion, losing thermal energy and contracting as it flows.

Figure 123:
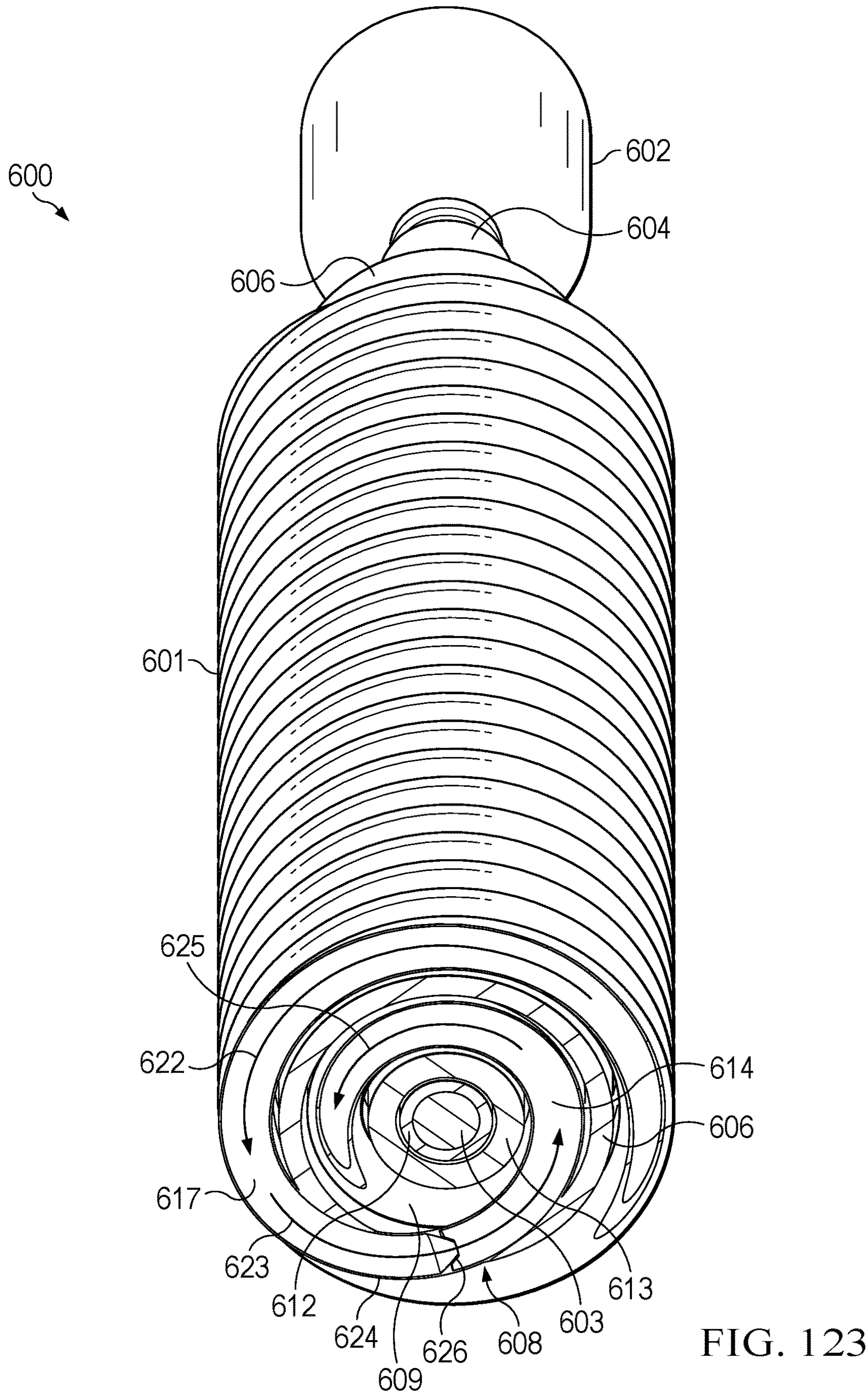

FIG. 123 shows a perspective bottom-up sectional view of the same embodiment 600 of the present disclosure that is illustrated in FIGS. 113-122 wherein the horizontal section plane is specified in FIG. 114 and the section is taken across line 123-123.

Working fluid (not shown) that has flowed downward through the isothermal contraction portion 601 of the embodiment's doubly-spiraled tube, losing heat and contracting as it flowed, flows 622 into an interior 617 of the lower end of that isothermal contraction tube portion, after which it flows 623 through a relatively short portion 624 of the doubly-spiraled tube that passes through, and/or transits, the exterior wall 606 of the thermal-source insulation chamber, e.g., at point, and/or position, 608, thereby flowing 623 into an interior 614 of the lower end of the isothermal expansion portion 609 of the embodiment's doubly-spiraled tube. Thereafter, the working fluid flows 625 upward toward the upper end of that isothermal expansion tube portion, absorbing heat and expanding as it flows.

Within the relatively short portion 624 of the doubly-spiraled tube that passes through, and/or transits, the exterior wall 606 of the thermal-source insulation chamber there is, positioned within that short portion of the doubly-spiraled tube, a diodic valve 626 which minimally inhibits a flow of working fluid from the isothermal contraction portion 601 of the embodiment's doubly-spiraled tube into the isothermal expansion portion of that doubly-spiraled tube, while significantly inhibiting, if not obstructing, a counter, and/or reversed, flow of working fluid in an opposite direction.

The varieties of embodiments, their geometries, their working fluids, their operations, and their applications, enumerated within the "Summary of the Invention" section of this disclosure apply to the embodiment illustrated and discussed in relation to FIGS. 113-123, and the scope of the present disclosure includes all such variations of the embodiment illustrated in FIGS. 113-123.

Disclosed in this specification, and in FIGS. 113-123, is a closed-cycle heat engine comprising: a generator having a rotatably connected generator shaft; an insulated annular chamber, coaxially centered about a longitudinal axis of the generator shaft, and fixedly attached to the generator shaft; an annular tube of a radioactive material, coaxially centered about the longitudinal axis of the generator shaft, and positioned within, and fixedly attached to, the insulated annular chamber; a thermally-conductive spiral hollow tube, hermetically encasing a working fluid therein, and fixedly attached to the insulated annular chamber; wherein the spiral tube is comprised in part of an inner spiral tube portion, positioned within the insulated annular chamber, and radially adjacent to the annular tube of the radioactive material; wherein the spiral tube is further comprised in part of an outer spiral tube portion, positioned outside, and radially adjacent to, the insulated annular chamber; wherein heat produced by the annular tube of the radioactive material warms working fluid within the inner spiral tube portion causing that warmed working fluid to expand and flow from a first end of the spiral tube to a second end of that spiral tube; wherein a thermal sink outside the outer spiral tube portion cools working fluid therein causing that cooled working fluid to contract and flow from a second end of the spiral tube to a first end of that spiral tube; and, wherein the flow of working fluid through the spiral tube causes a rotation of the generator shaft, thereby causing the generator to produce an electrical power.

Figure 124:
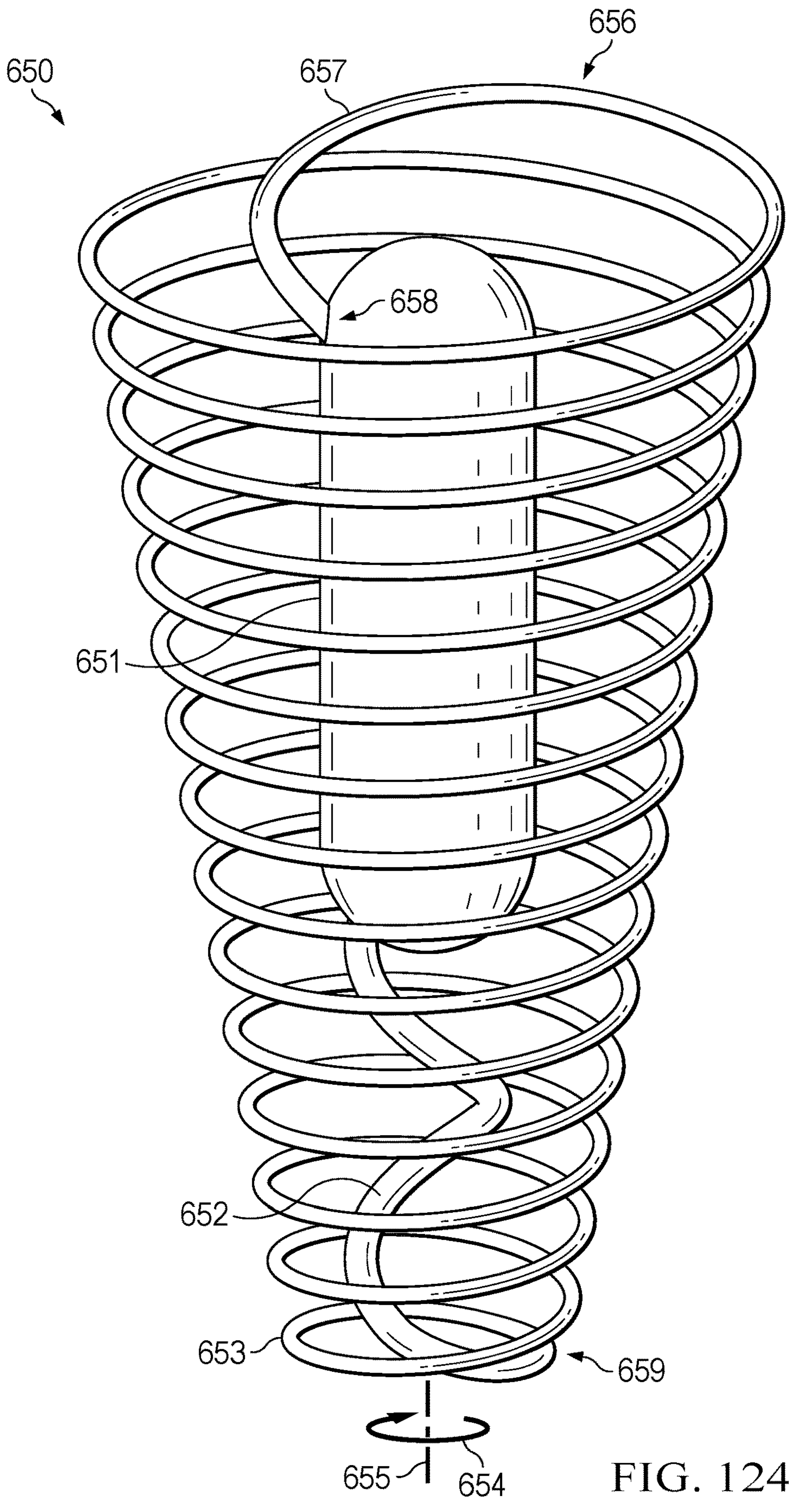

FIG. 124 shows a perspective side view of an embodiment 650 of the present disclosure.

The embodiment 650 illustrated in FIG. 124 contains a tube, and/or an annulus, of radioactive material (not visible) which produces heat as it decays. The radioactive material is encased within a pill-shaped insulating jacket 651, and/or thermal-source insulation chamber, that directs most, if not all, of the radioactive-decay heat into an isothermal expansion portion (not visible) of the embodiment's doubly-spiraled tube thereby causing working fluid (not shown) therein to warm, expand, and flow through that isothermal expansion tube portion in a downward direction (relative to the orientation of the embodiment illustrated in FIG. 124) toward a lower end of the embodiment where the heated working fluid flows into and through an isothermal contraction portion 652 of the embodiment's doubly-spiraled tube.

After cooling and contracting within the isothermal contraction portion 652 of the embodiment's doubly-spiraled tube, the working fluid (not shown) flows radially outward and into an isothermal compression portion 653 of the embodiment's doubly-spiraled tube. Unlike the adiabatic compression tube portions of other embodiment's illustrated earlier in this disclosure, the adiabatic compression portion of the fluid channel of the embodiment illustrated in FIG. 124 follows, conforms to, and/or manifests, an expanding spiral path, i.e., a spiraling path within, and/or conformal to, a virtual frustoconical surface, wherein the radial distance of the adiabatic compression tube portion increases with the linear upward distance travelled by the working fluid flowing therein.

As the embodiment 650, in response to a thermally-driven flow of working fluid (not shown) through the embodiment's doubly-spiraled tube, e.g., 652-653, rotates 654 about a vertical longitudinal axis of rotation 655, cooled working fluid within, and/or flowing through, the embodiment's isothermal compression tube portion 653 is subjected to a radial centrifugal force that drives the fluid away, and/or outward, from the radial center 655 of the embodiment. Because the radial distance of the embodiment's adiabatic compression tube portion increases in the direction of the working fluid's upward flow (i.e., upward with respect to the orientation of the embodiment illustrated in FIG. 124), the working fluid flowing within that adiabatic compression tube portion is forced to rise, and/or to flow, in an upward direction as a consequence of its flow in an ever-widening circular, and/or tangential, direction about the radial center 655 of the embodiment. Thus, the rotations, e.g., 654, of the embodiment, which are driven by the flow of the working fluid within the embodiment's doubly-spiraled tube, both compress the cooled working fluid and cause that working fluid to flow upward (e.g., against the force of gravity).

At a point, e.g., 656, approximately vertically adjacent to an upper end of the embodiment 650, the isothermal compression tube portion 653 of the embodiment's doubly-spiraled tube, which has directed the flow of working fluid along an upward and radially-outward, and/or radially-expanding, path, changes its relative orientation, and/or geometrical configuration, and directs the upward flow of working fluid therefrom along a path which carries it in a downward, and radially-inward, direction. Compressed working fluid flowing within the ascending, and outwardly expanding, portion, e.g., 653, of the isothermal compression tube portion of the embodiment's doubly-spiraled tube, tends to create a forward pressure that forces the working fluid to continue flowing to, and beyond, the point 656, after which point the path of the flowing working fluid is inflected to travel through a descending, and inwardly contracting, portion of the adiabatic compression tube portion of the embodiment's doubly-spiraled tube (e.g., where centrifugal forces no longer promote an outward and upward flow of working fluid through the embodiment's doubly-spiraled tube in the same direction of flow characterized by working fluid flowing through the isothermal contraction portion 652 of the embodiment's doubly-spiraled tube. In this final portion 657 of the embodiment's adiabatic compression tube, the working fluid will tend to experience, and/or be subjected to, maximally compressive forces.

Cooled and compressed working fluid flowing through the final portion 657 of the embodiment's isothermal compression tube 653, thereafter flows through a portion of the embodiment's doubly-spiraled tube that transits, enters, and/or passes through, the wall of the insulating jacket 651, and/or thermal-source insulation chamber, at a point 658.

Working fluid (not shown) thereafter flows through the isothermal expansion portion (not visible) of the embodiment's doubly-spiraled tube, wherein the working fluid is subjected to heat produced by the radioactive decay of the material encapsulated within the insulating jacket 651, and/or thermal-source insulation chamber, thereby being warmed and, as a result of that warming, being caused, and/or made, to expand and flow downward, thereby causing the embodiment to rotate 654 about a longitudinal axis 655 of rotation.

The embodiment 650 illustrated in FIG. 124 omits a generator, a generator shaft, and respective shaft bearings. Such an augmented configuration of the embodiment 650 will be obvious to those skilled in the art. The embodiment 650 will have many applications for its rotational power, and/or torque, many of which will not involve electrical generators. The scope of the present disclosure includes all embodiment applications, embodiment configurations, and embodiment designs, whether or not those embodiment applications, embodiment configurations, and embodiment designs are explicitly disclosed herein.

A properly configured and/or designed version of the embodiment 650 illustrated in FIG. 124 should be able to operate even in the presence of forward accelerations parallel to its longitudinal axis 655 of rotation, and in an upward direction away from the junction 659 of its isothermal contraction tube portion 652 and its isothermal compression tube portion 653, and in an upward direction toward the point 656 (at which the path of the flowing working fluid is inflected to travel downwardly and inwardly toward the isothermal expansion tube portion, not visible, within insulating jacket 651, and/or thermal-source insulation chamber.

One configuration, and/or design parameter, relevant to the implementation of an acceleration-resistant configuration, and/or design, of the embodiment 650 would be the adjustment, determination, and/or specification, of the included angle of the approximately conical virtual surface (not shown) that will define the path of the radially-expanding isothermal compression tube portion 653, e.g., with a greater included angle tending to better resist operational interruptions due to forward accelerations of the embodiment (while also tending to require a greater mass of working fluid within the embodiment's doubly-spiraled tube), though also potentially consuming a greater proportion of the embodiment's rotational kinetic energy (e.g., to lift a greater mass of working fluid, having a greater acceleration-augmented weight, through the isothermal compression tube portion 653, along a path, along a circuit, and/or within a tube, of greater length).

Another configuration, and/or design parameter, relevant to the implementation of an acceleration-resistant configuration, and/or design, of the embodiment 650 would be the adjustment, determination, and/or specification, of the number of spirals of the isothermal compression tube portion 653, and/or the vertical spacing between adjacent spiral portions of the adiabatic compression tube portion, e.g., with a greater number of spirals per unit vertical distance increasing the resistance of the embodiment to operational interruptions due to forward accelerations of the embodiment.

Another configuration, and/or design parameter, relevant to the implementation of an acceleration-resistant configuration, and/or design, of the embodiment 650 would be the adjustment, determination, and/or specification, of the vertical angle, and/or vertical height, as well as the length, of the final portion 657 of the embodiment's adiabatic compression tube. A less sharply turning final portion of the embodiment's adiabatic compression tube, and/or a final portion of the embodiment's adiabatic compression tube of greater length, will tend to better resist operational interruptions due to forward accelerations of the embodiment (while also tending to require a greater mass of working fluid within the embodiment's doubly-spiraled tube).

Figure 125:
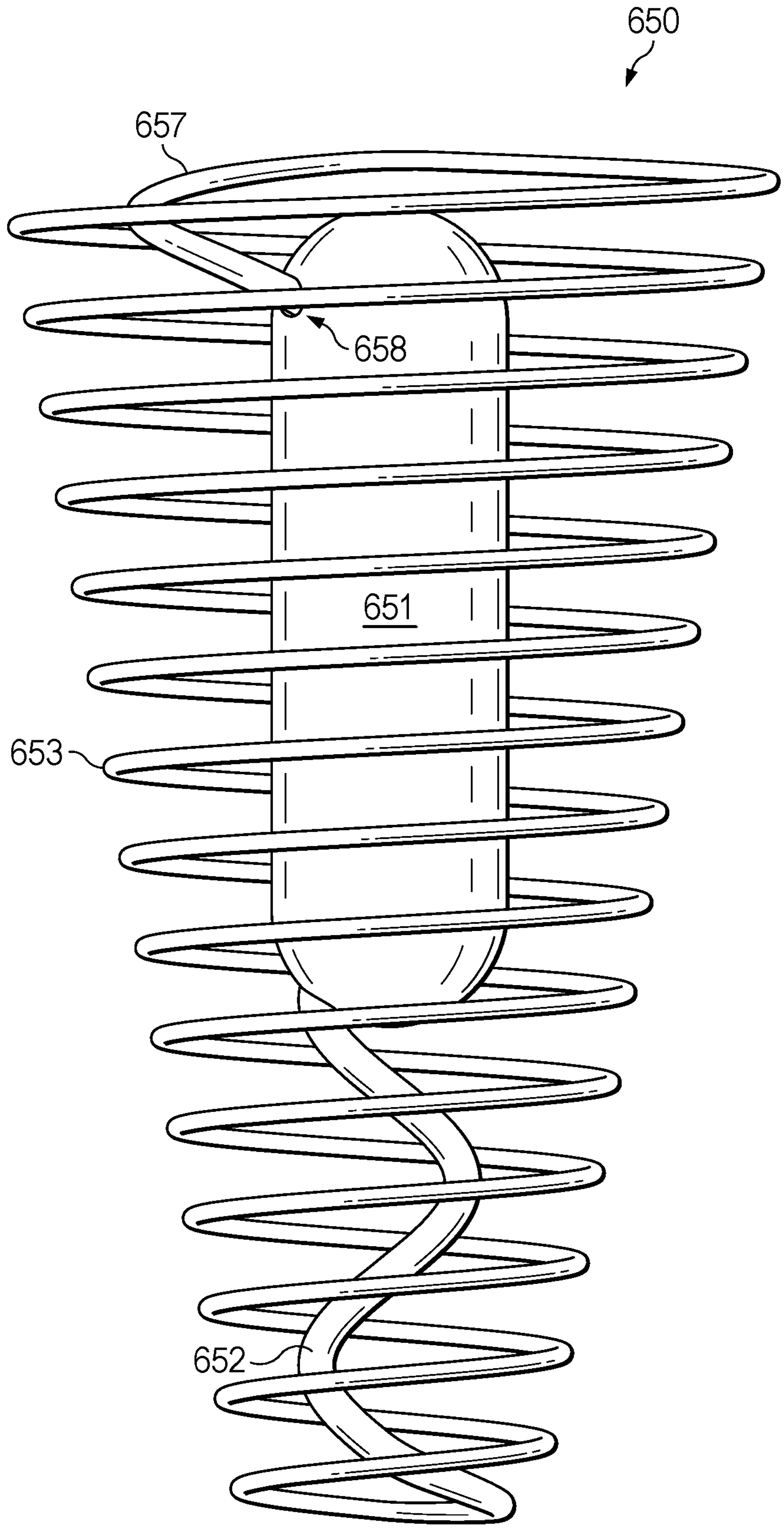

FIG. 125 shows a side view of the same embodiment 650 of the present disclosure that is illustrated in FIG. 124.

Figure 126:
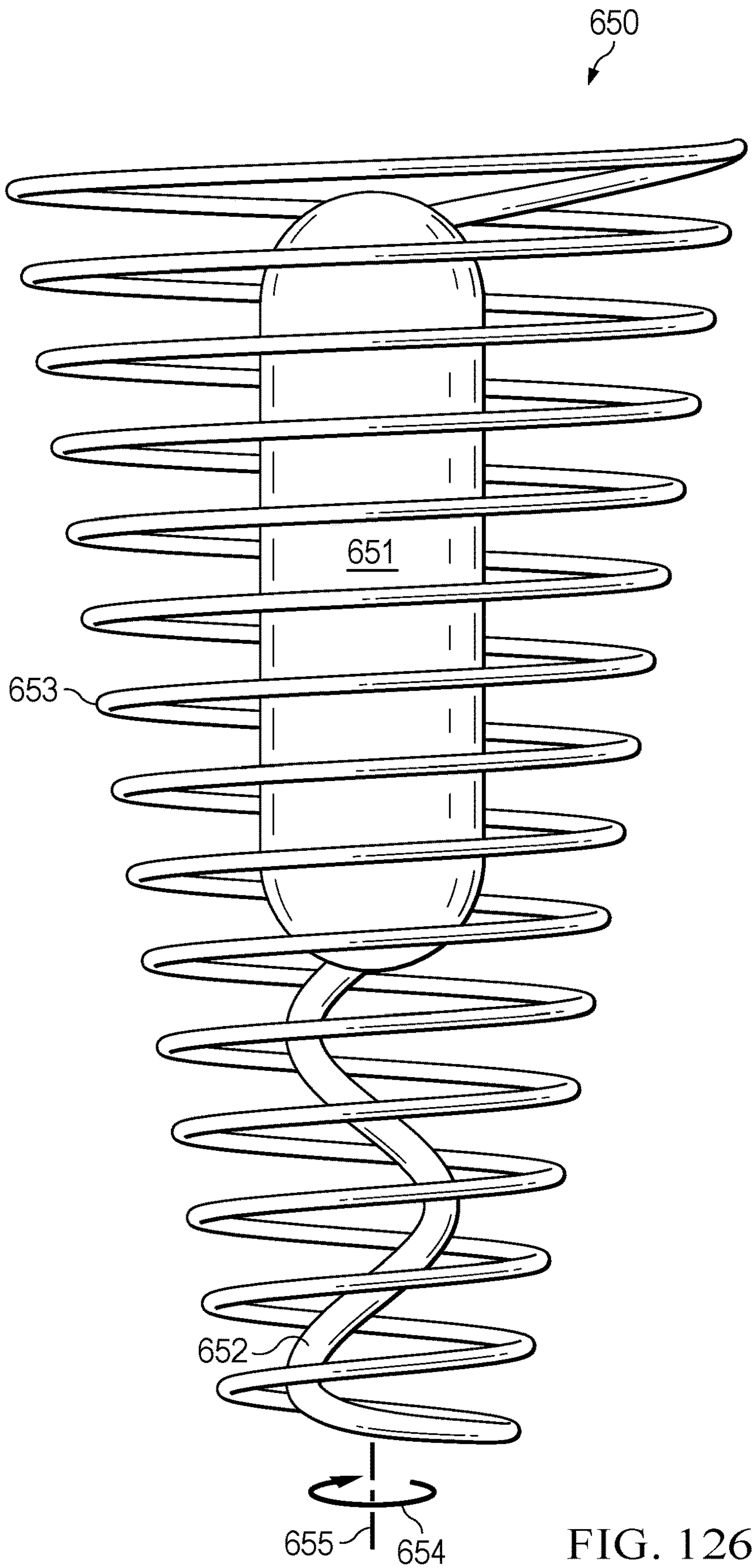

FIG. 126 shows a side view of the same embodiment 650 of the present disclosure that is illustrated in FIGS. 124 and 125.

Figure 127:
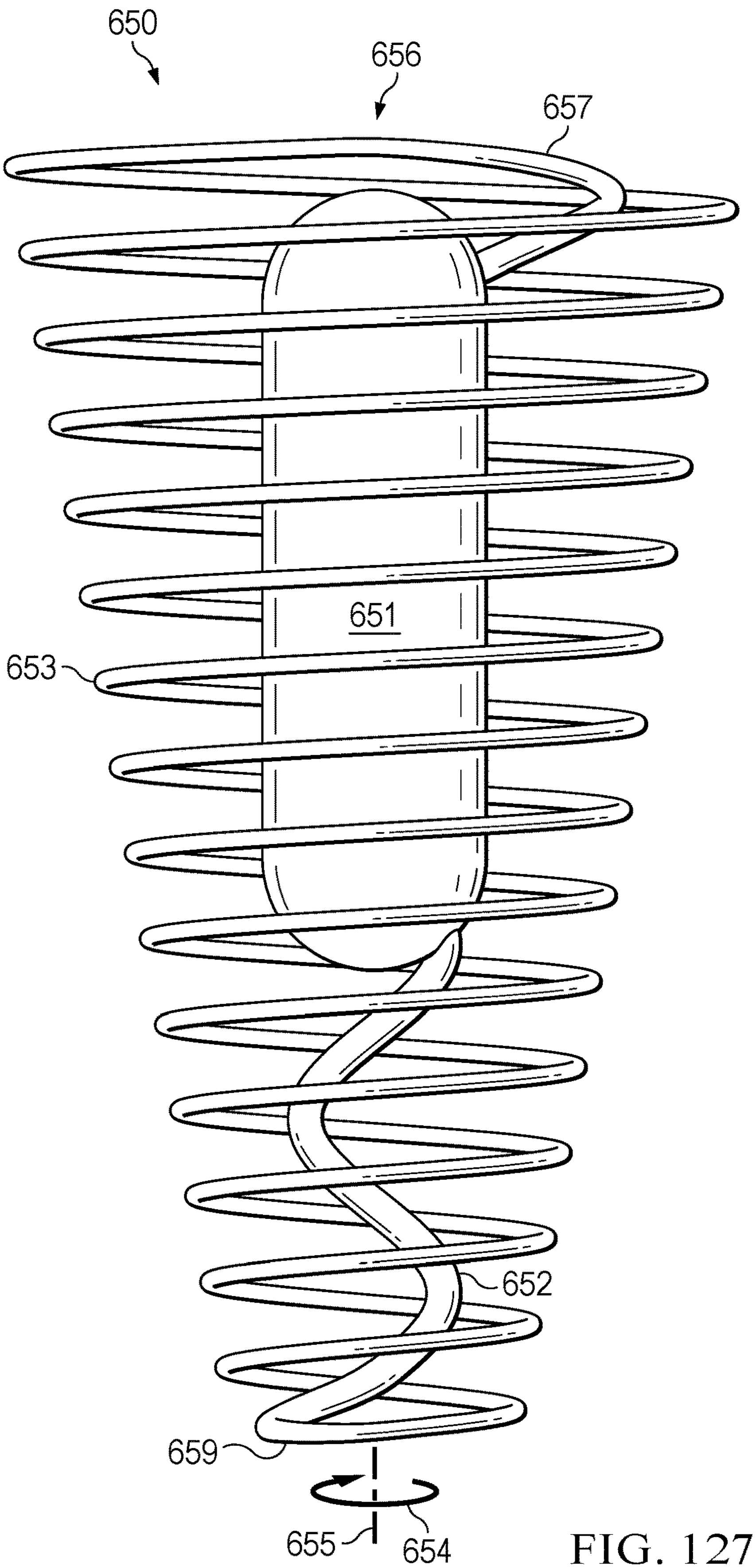

FIG. 127 shows a side view of the same embodiment 650 of the present disclosure that is illustrated in FIGS. 124-126.

Figure 128:
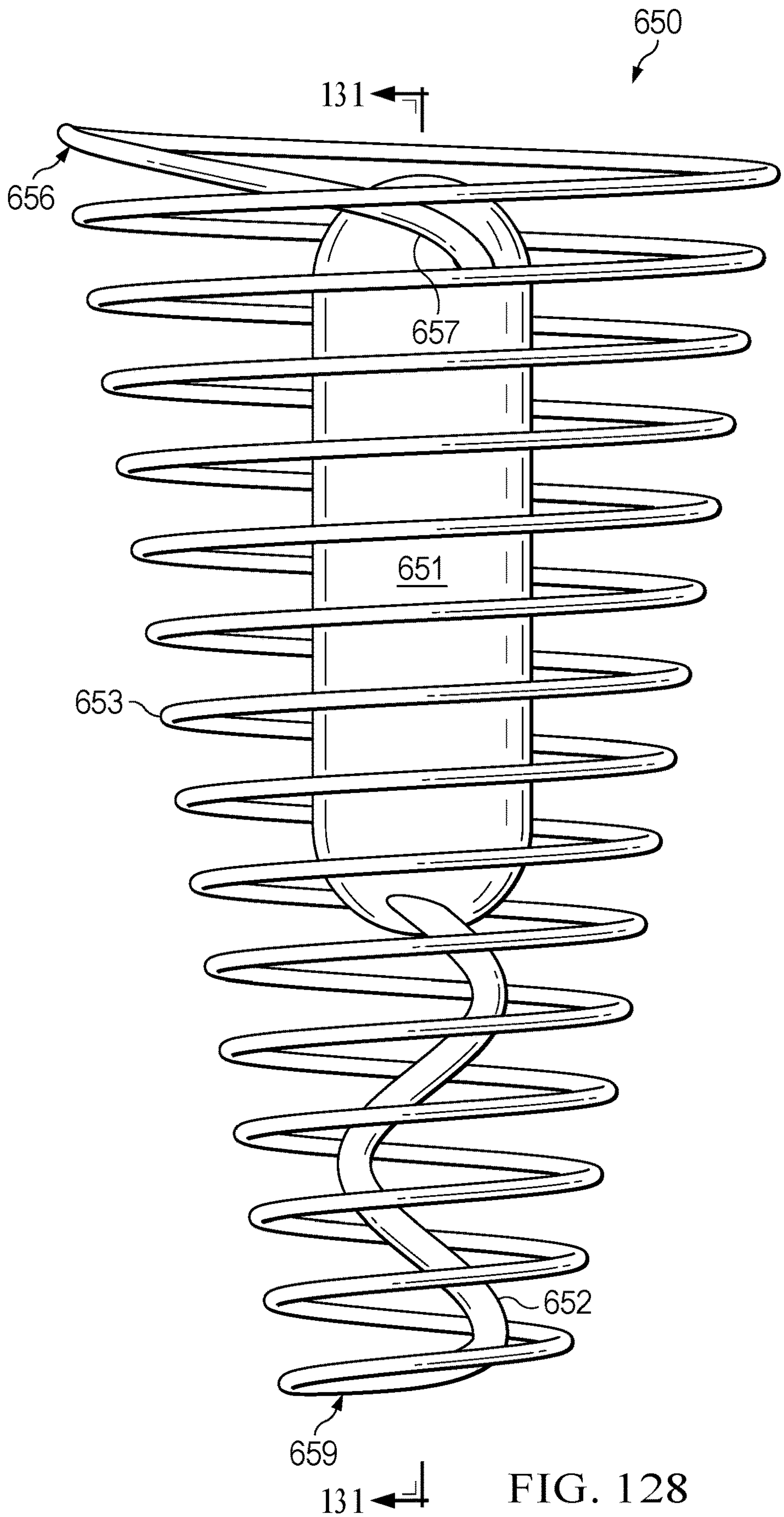

FIG. 128 shows a side view of the same embodiment 650 of the present disclosure that is illustrated in FIGS. 124-127.

Figure 129:
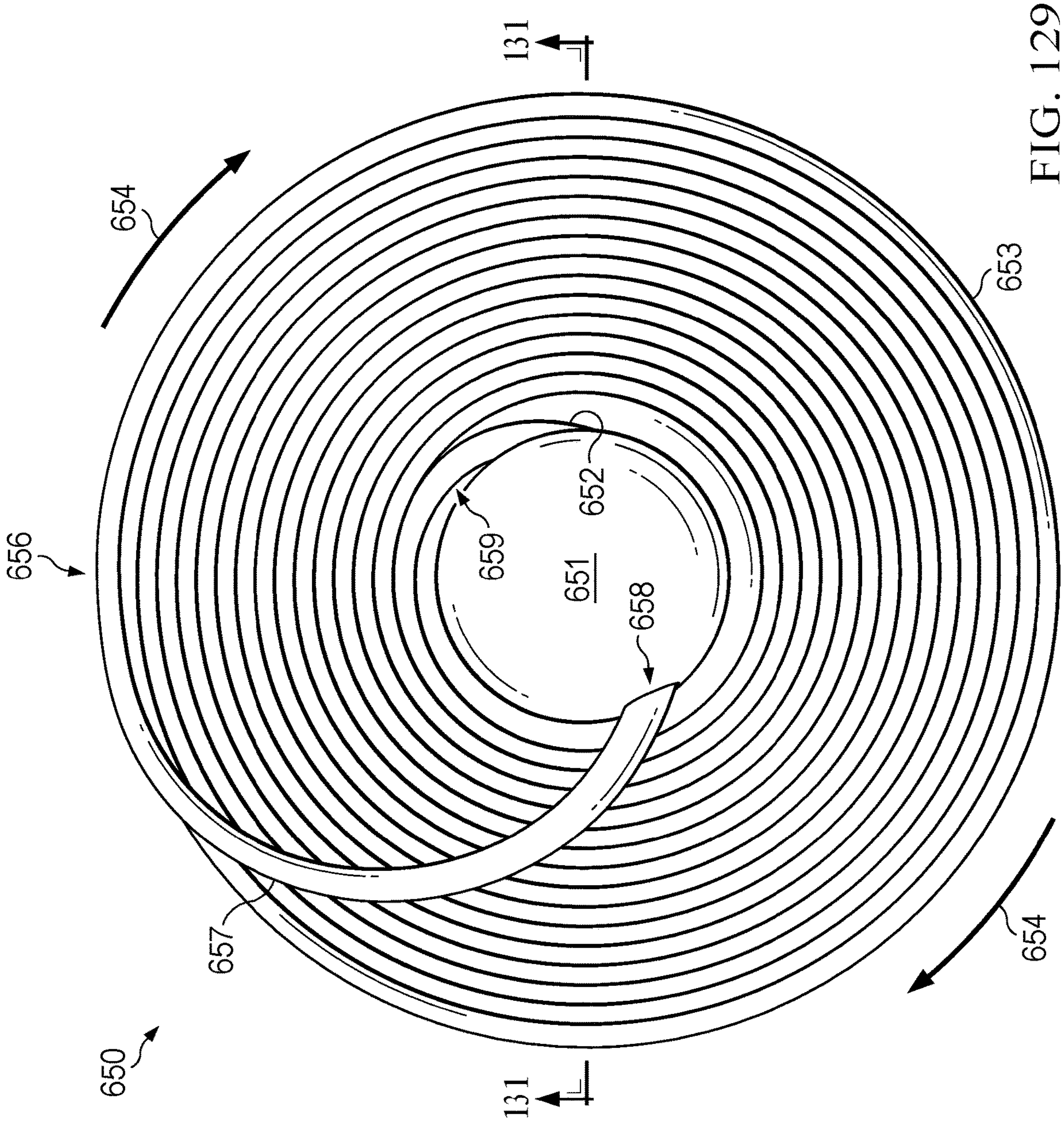

FIG. 129 shows a top-down view of the same embodiment 650 of the present disclosure that is illustrated in FIGS. 124-128.

Figure 130:
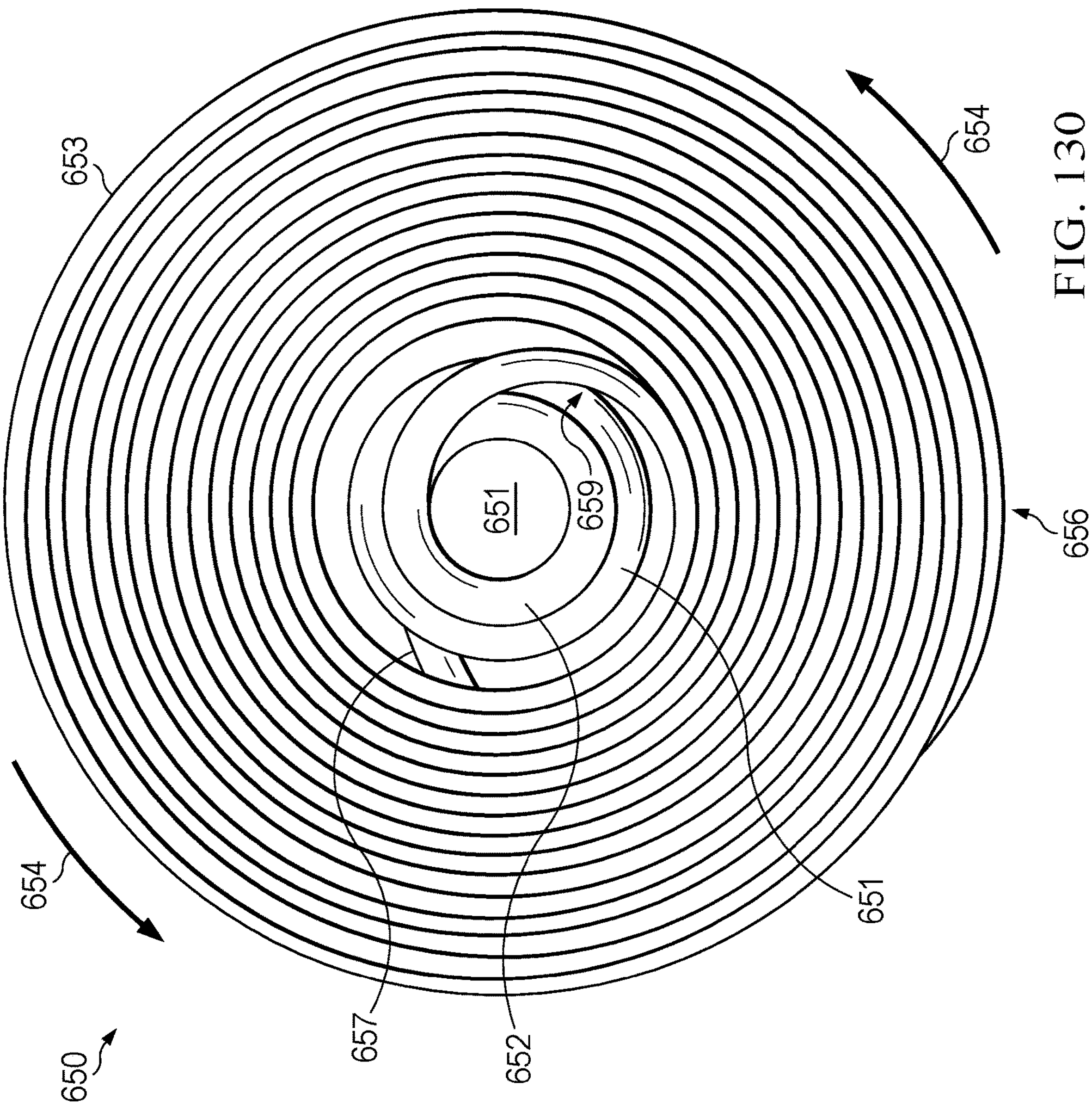

FIG. 130 shows a bottom-up view of the same embodiment 650 of the present disclosure that is illustrated in FIGS. 124-129.

Figure 131:
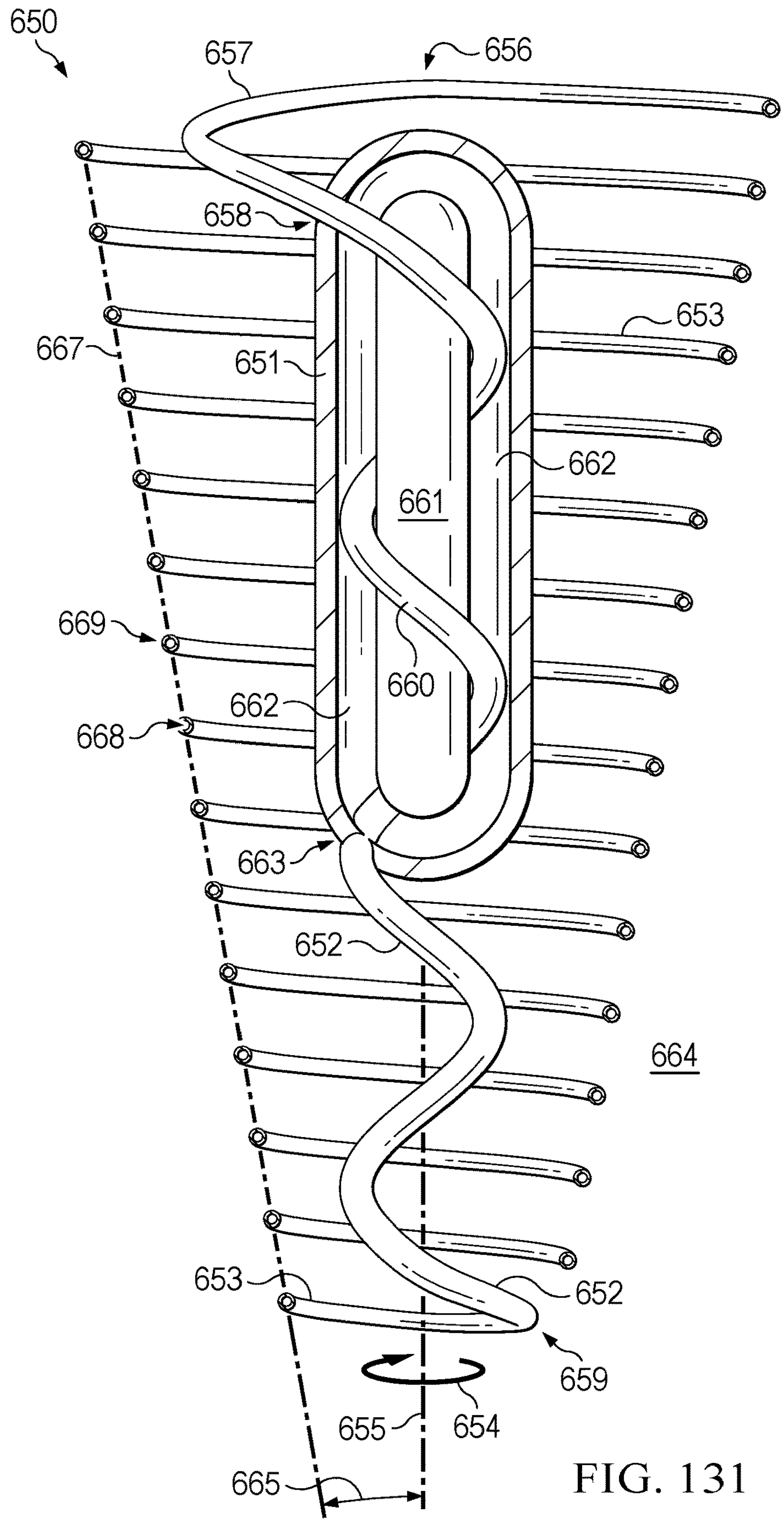

FIG. 131 shows a side sectional view of the same embodiment 650 of the present disclosure that is illustrated in FIGS. 124-130 wherein the vertical section plane is specified in FIGS. 128-130 and the section is taken across line 131-131. The final portion 657 of the embodiment's adiabatic compression tube, the embodiment's isothermal expansion tube portion 660, the embodiment's isothermal contraction portion 652, and the rod, cylinder, capsule, tube, and/or pellet, of radioactive material 661 within the embodiment's insulating jacket and/or thermal-source insulation chamber 651, are not sectioned.

A working fluid (not shown) flows within the embodiment's single doubly-spiraled tube, e.g., 652, 653, 656, 657, and 660. As the working fluid flows through the insulating wall of the insulating jacket 651, and/or thermal-source insulation chamber, at the penetration aperture 658, the working fluid flows therethrough into an isothermal expansion portion 660 of the doubly-spiraled tube that is warmed by thermal energy and/or heat produced as a byproduct of radioactive decay within, and/or adjacent to, the rod, cylinder, capsule, tube, and/or pellet, of radioactive material 661 that is incorporated, fixed within, and/or fixedly attached to, an interior 662 of the thermal-source insulation chamber.

A portion of the thermal energy, and/or heat, produced by the rod of radioactive material 661, within the thermal-source insulation chamber 651, is conducted, transmitted, imparted, and/or transferred to the isothermal expansion tube portion 660 either directly or via a flow of thermal energy through a material (not shown), e.g., melted salt, within the interior 662 of the thermal-source insulation chamber.

A portion of the thermal energy, and/or heat, transferred from the rod of radioactive material 661 to the thermally-conducting wall of the isothermal expansion tube portion 660 of the embodiment's doubly-spiraled tube is then conducted, transmitted, imparted, and/or transferred to the working fluid flowing therein. The influx of thermal energy to the working fluid flowing through the isothermal expansion tube portion 660, causes that working fluid to expand and flow downward (i.e., toward the isothermal contraction tube portion 652), e.g., toward the adjacent isothermal contraction tube portion 652 wherein working fluid is contracting and is of a lesser volume per unit working-fluid mass.

That thermally-driven flow of working fluid downward, along a flow path spiraling around a vertical longitudinal axis of rotation 655 of the embodiment causes the embodiment to experience a torque, and/or rotation, tangential to that longitudinal axis of rotation and in an opposite direction to that of the flow of the working fluid. The torque produced by the thermally-driven flow of working fluid downward, along a flow path spiraling around the embodiment's vertical longitudinal axis of rotation, tends to cause the embodiment to counter rotate 654 (i.e., if the embodiment is free to rotate in response to the torque produced by the flow of the working fluid) in a circular direction about the longitudinal axis of rotation that is opposite that of the working fluid.

When the warmed and expanding, downwardly-flowing, working fluid (not shown) reaches the lower end of the isothermal expansion tube portion 660, it then flows through the wall of the insulating jacket 651, and/or thermal-source insulation chamber, at the penetration aperture 663. The working fluid that flows therethrough, flows into an isothermal contraction portion 652 of the doubly-spiraled tube. The thermally-conductive walls of the isothermal contraction tube portion impart thermal energy to, and are cooled by, the fluid 664, e.g., air or water, outside, and/or surrounding, the embodiment. And, the working fluid flowing into, and/or through, the isothermal contraction tube portion imparts a portion of its thermal energy to the relatively cool thermally-conductive walls of that isothermal contraction tube portion, thereby being cooled by that isothermal contraction tube portion.

In response to its cooling, and/or loss of thermal energy, within the isothermal contraction tube portion 652, the cooling working fluid (not shown) contracts, thereby creating a partial vacuum within the interior of the isothermal contraction tube portion which partial vacuum tends to pull, and/or cause to flow, the working fluid downward, i.e., toward the lower end of the embodiment, and to, and through, the point 659 at which the isothermal contraction tube portion fluidly connects to, and/or with, the isothermal compression tube portion 653.

That cooling- and/or contraction-driven flow of working fluid downward, along a flow path spiraling downward, around a vertical longitudinal axis of rotation 655 of the embodiment, causes the embodiment to experience a torque tangential to that longitudinal axis of rotation, and in an opposite direction to that of the working-fluid flow. The torque produced by the thermally-driven flow of working fluid downward, along a flow path spiraling around the embodiment's vertical longitudinal axis of rotation, tends to cause the embodiment to rotate 654 (i.e., if the embodiment is free to rotate in response to the torque produced by the flow of the working fluid) in a circular direction about the longitudinal axis of rotation that is opposite that of the working fluid.

The heat-driven expansive flow of the working fluid within the isothermal expansion tube portion 660, and the cooling-driven contractive flow of the working fluid within the isothermal contraction tube portion 652, both, and/or each, impart to the embodiment a torque in the same tangential direction about the embodiment's vertical longitudinal axis of rotation 655, thereby each contributing to a rotation 654 of the embodiment about that longitudinal axis of rotation.

Due to the heat- and cold-driven rotation 654 of the embodiment, the cooled working fluid (not shown) within the isothermal compression portion 653 of the embodiment's doubly-spiraled tube is driven through that adiabatic compression tube portion by centrifugal forces. And, because the upward spiral of the adiabatic compression tube portion approximately defines, and/or conforms to, a virtual frustoconical surface (defined by an included angle 665 of an angular deflection of a cross-sectional edge 667 of that virtual frustoconical surface) as the rotational centrifugal forces imparted to the working fluid flowing within the adiabatic compression tube portion compress that working fluid, those rotational centrifugal forces also tend to drive the working fluid upward into portions of the adiabatic compression tube portion characterized by approximately circular paths of ever increasing radii, and therefore of ever decreasing centrifugal rotational forces. Thus, the heat- and cold-driven rotations of the embodiment, tend to drive the cooled working fluid from lower-most portions of the adiabatic compression tube portion (i.e., where working fluid flows into the adiabatic compression tube portion from the isothermal contraction tube portion 652) to the upper-most portions of that adiabatic compression tube portion (i.e., where working fluid flows from the adiabatic compression tube portion back into the isothermal expansion tube portion 660).

For this reason, when the embodiment 650 accelerates upward, approximately parallel to its vertical longitudinal axis of rotation 655, the cooled working fluid within its isothermal compression tube portion 653, is still driven from the bottom of the embodiment to its top where it can again be heated and cooled within the respective isothermal expansion 660 and the isothermal contraction 652 portions of the embodiment's doubly-spiraled tube.

After working fluid (not shown) has flowed upward, to an upper end of the isothermal compression tube portion 653, it then flows into a transitional portion 657 of the embodiment's adiabatic compression tube in which the radius of the tube's curvature decreases, and the tube's path carries the working fluid flowing therein downward instead of upward. Within its transitional portion 657, the adiabatic compression tube portion transitions from an upward path of ever-increasing spiral-curvature radius, to a downward path of relatively quickly decreasing spiral-curvature radius. And, the center of the transitional portion 657 of the adiabatic compression tube portion is approximately positioned at a point 656 on the doubly-spiraled tube.

The embodiment's doubly-spiraled tube, e.g., 660, 652, 653, and 657, includes an inner channel or lumen, e.g., 668, that is surrounded by a thermally-conductive tube wall, e.g., 669. In the embodiment 650 illustrated in FIG. 131, the tube walls of all portions of the embodiment's doubly-spiraled tube are thermally-conductive and not insulated. With respect to the embodiment 650, the portion of the working-fluid-flow tube in which rotational, and/or a centrifugal, force is applied to the cooled working fluid, thereby resulting in a mechanical compression of that working fluid, is thermally-conductive rather than adiabatic as it is in some other embodiments.

FIG. 132 shows a perspective view of the same side sectional view illustrated in FIG. 131, which is a side sectional view of the same embodiment 650 of the present disclosure that is illustrated in FIGS. 124-130 wherein the vertical section plane is specified in FIGS. 128-130 and the section is taken across line 131-131.

FIG. 133 shows a side view of a modified version, and/or configuration, of the embodiment 650 of the present disclosure that is illustrated in FIGS. 124-132. The modified version of the embodiment 650 illustrated in FIG. 133 includes a rotational shaft, comprising an upper rotational shaft 667 and a lower rotational shaft 668, about which the embodiment rotates when energized by a sufficient thermal gradient such as that provided by its radioactive heat source 661 and by the external cold sink, and/or cooling fluid (664 in FIG. 131), outside, and/or surrounding, the embodiment.

The rotational shaft 667/668 may be rotatably attached and/or connected to an external, non-rotating, and/or differently-rotating, framework, structure, and/or machine, e.g., by upper and lower shaft bearings, such that the embodiment 650 may rotate relative to that non-rotating, and/or differently-rotating, framework, structure, and/or machine. A gear attached to the shaft 667/668 may rotate the rotor of a generator, and/or the rotor of a generator may be directly coupled to the shaft 668, in order to convert the potential energy of the thermal difference between the heat source and the cold sink into an electrical power.

The varieties of embodiments, their geometries, their working fluids, their operations, and their applications, enumerated within the "Summary of the Invention" section of this disclosure apply to the embodiment illustrated and discussed in relation to FIGS. 124-133, and the scope of the present disclosure includes all such variations of the embodiment illustrated in FIGS. 124-133.

Disclosed in this specification, and in FIGS. 124-133, is a closed-cycle heat engine, comprising: a thermal-source insulation chamber; a rod of radioactive material fixedly attached to an interior of the thermal-source insulation chamber; a doubly-spiraled and thermally-conductive hollow tube having therein a working fluid; wherein an isothermal expansion portion of the doubly-spiraled tube is positioned within the thermal-source insulation chamber and is configured to receive thermal energy from the rod of radioactive material therein; wherein an isothermal contraction portion of the doubly-spiraled tube is positioned outside of the thermal-source insulation chamber and is configured to dissipate thermal energy to a thermal sink; wherein an isothermal compression portion of the doubly-spiraled tube is positioned outside of the thermal-source insulation chamber and is configured to elevate working fluid when rotated in a first rotational direction; wherein a first end of the isothermal contraction portion of the doubly-spiraled tube is fluidly connected to a first end of the isothermal expansion portion of the doubly-spiraled tube; wherein a second end of the isothermal contraction portion of the doubly-spiraled tube is fluidly connected to a first end of the isothermal compression portion of the doubly-spiraled tube; wherein a second end of the isothermal compression portion of the doubly-spiraled tube is fluidly connected to a second end of the isothermal expansion portion of the doubly-spiraled tube; wherein the isothermal expansion portion of the doubly-spiraled tube is configured to rotate in the first rotational direction in response to a warming of the working fluid therein; wherein the isothermal contraction portion of the doubly-spiraled tube is configured to rotate in the first rotational direction in response to a cooling of the working fluid therein; and wherein the isothermal compression portion of the doubly-spiraled tube is configured to mechanically compress working fluid therein when rotated in the first rotational direction.

FIG. 134 shows a perspective side view of an embodiment 700 of the present disclosure.

The embodiment 700 illustrated in FIG. 134 contains a central, longitudinal tube 701/702 through which a working fluid (not shown) is first caused to expand by its exposure, within an upper portion 701 of the central longitudinal tube, to the heat produced by an annulus of radioactive material (not visible), and that working fluid then caused to contract by its exposure, within a lower portion 702 of the central longitudinal tube, to a lower temperature of an external thermal sink (not shown). As the contracting working fluid then flows through the lower portion of the central longitudinal tube, it interacts with spiral vanes therein (not visible) thereby causing the embodiment to rotate 703 about a longitudinal axis 704 of the central longitudinal tube.

The interaction of the downward-flowing and contracting working fluid (not shown), with spiral vanes within the lower portion 702 of the central longitudinal tube, and the consequent rotation 703 of the embodiment 700, causes cooled working fluid that has flowed out of the lower portion of the central longitudinal tube, and flowed into a thermally-conductive peripheral spiral tube 705, to flow upward through the peripheral spiral tube, as that cooled working fluid flows upward under centrifugal compression within, and/or through, the ever-widening spirals of the peripheral spiral tube.

After flowing upward through the peripheral spiral tube 705, and being centrifugally compressed therein, the cooled and compressed working fluid (not shown) flows out of an upper end 706 of the peripheral spiral tube and therefrom flows into an upper end 707 of the upper portion 701 of the central longitudinal tube, whereupon the working fluid is (again) heated and caused to expand, thereby causing that working fluid to be propelled, and/or accelerated, downward within the lumen of the upper portion of the central longitudinal tube.

FIG. 135 shows a side view of the same embodiment 700 of the present disclosure that is illustrated in FIG. 134.

After being cooled within the lower portion 702 of the central longitudinal tube, working fluid (not shown) flows out of the lower portion of the central longitudinal tube and into the peripheral spiral tube 705 at a fluidly-connected junction 708 between the two.

FIG. 136 shows a side view of the same embodiment 700 of the present disclosure that is illustrated in FIGS. 134 and 135.

FIG. 137 shows a side view of the same embodiment 700 of the present disclosure that is illustrated in FIGS. 134-136.

FIG. 138 shows a side view of the same embodiment 700 of the present disclosure that is illustrated in FIGS. 134-137.

FIG. 139 shows a top-down view of the same embodiment 700 of the present disclosure that is illustrated in FIGS. 134-138.

FIG. 140 shows a bottom-up view of the same embodiment 700 of the present disclosure that is illustrated in FIGS. 134-139.

FIG. 141 shows a side sectional view of the same embodiment 700 of the present disclosure that is illustrated in FIGS. 134-140 wherein the vertical section plane is specified in FIGS. 139 and 140 and the section is taken across line 141-141.

The upper portion 701 of the central longitudinal tube is surrounded by an outer thermally insulating layer and/or covering 709. The outer insulating layer surrounds, and/or thermally insulates from the fluid, e.g., air, outside, and/or surrounding, the embodiment, an annular frustoconical tube 710 comprised of radioactive uranium 235. That tube of uranium is outside, and/or surrounds, an adjacent frustoconical tube 711 comprised of steel, wherein that steel tube promotes an even distribution of heat produced by the decaying uranium. And, the frustoconical tube of steel surrounds, and/or is adjacent to, a portion of the embodiment's thermally-conductive isothermal expansion tube wall 712 and 713.

As working fluid (not shown) flows 714 from an upper end 706 of the peripheral spiral tube 705, and into an upper end, e.g., at 717, of the interior 715, and/or lumen, of the embodiment's isothermal expansion tube, it is exposed to heat produced by the radioactive decay of the uranium 710 and conducted to the thermally-conductive wall 712/713 of the isothermal expansion tube by the intermediary steel heat diffusion and distribution tube 711. The heat within the thermally-conductive wall of the isothermal expansion tube warms the working fluid therein causing it to expand and flow 716 downward through the interior 715 of the isothermal expansion tube. Variations in the flow-normal cross-sectional area of the lumen of the isothermal expansion tube tend to facilitate a transfer of thermal energy from the wall of the isothermal expansion tube to the working fluid, e.g., when the working fluid flows from a relatively wide portion, e.g., 712, of the isothermal expansion tube into, and/or past, a relatively narrow portion, e.g., 713, a longitudinal speed of the working-fluid flow increases, and a static pressure of that working fluid decreases, thereby facilitating its absorption of thermal energy from the thermally-conductive wall, e.g., 713, of the isothermal expansion tube.

When the warmed and expanded working fluid (not shown) flows from a lower end, e.g., at 718, of the isothermal expansion tube and flows into an adjacent, and fluidly connected, isothermal contraction portion 702 of the central longitudinal tube, the flowing working fluid is directed into one of eight spiral conduits. Each spiral conduit is bounded by the thermally-conductive exterior wall 719 of the lower portion 702 of the central longitudinal tube, by a central vane rod 720, and by a pair of adjacent spiral vanes, e.g., 721 and 722.

Working fluid (not shown) flowing 723 downward behind spiral vane 721 is directed to flow in a clockwise direction (relative to a top-down perspective) as it flows downward through the lower portion 702 of the central longitudinal tube. This clockwise flow of working fluid adjacent to spiral vane 721 imparts a counterclockwise torque to the embodiment, thereby causing the embodiment to rotate 703 in a counterclockwise direction about the longitudinal axis 704 of the central longitudinal tube. Likewise, working fluid flowing 724 downward in front of spiral vane 725 is directed to flow in a clockwise direction as it flows downward through the lower portion of the central longitudinal tube. This clockwise flow of working fluid adjacent to spiral vane 725 imparts a counterclockwise torque to the embodiment, thereby further contributing to the rotation 703 of the embodiment in a counterclockwise direction about the longitudinal axis of the central longitudinal tube.

Working fluid (not shown) that flows past the spiral vanes, e.g., 721, then flows 726 downward toward a junction, and/or fluid connection, between a lower end of the lower portion 702 of the central longitudinal tube and a lower end, e.g., 727, of the peripheral spiral tube 705. After the working fluid flows into the peripheral spiral tube 705, it then flows, e.g., 728, upward in a spiral fashion through the peripheral spiral tube. The radius of spiral-curvature of the peripheral spiral tube continually increases with increasing upward distance from the junction between the lower end of the lower portion 702 of the central longitudinal tube and the lower end, e.g., 727, of the peripheral spiral tube. And, in other words, the radius of curvature of the peripheral spiral tube continually increases with decreasing distance of the peripheral spiral tube from the upper end 706 of the peripheral spiral tube, and the upper end 717 of the upper portion 701 of the central longitudinal tube. For example, the radius of curvature of the peripheral spiral tube at 729 is greater than the radius of curvature of the peripheral spiral tube at 727.

As the embodiment 700 rotates 703, in response to working fluid (not shown) flowing past and against the spiral vanes, e.g., 721, within the lower portion 702 of the central longitudinal tube, the cooled working fluid flowing through the peripheral spiral tube 705 is centrifugally compressed as it is pushed outward and upward within that peripheral spiral tube. The wall of the peripheral spiral tube is thermally-conductive in order to promote additional cooling of the working fluid flowing therethrough.

Within the peripheral spiral tube 705 portion of the embodiment's working-fluid flow channel, the cooled working fluid flows in response to the rotations of the embodiment, and the rotations of the embodiment force the cooled working fluid outward within the peripheral spiral tube, and that working fluid is thereby centrifugally compressed against the radially-outermost portions of the interior surface of the peripheral spiral tube wall as a result of centrifugal forces caused by the embodiment's rotation and imparted to the working fluid within the peripheral spiral tube. As working fluid flows under centrifugal compression within a peripheral spiral tube of relaxing, and/or lessening, curvature, i.e., within a spiral tube the radius-of-curvature of which is increasing with increasing flow distance, that working fluid flows upward through the peripheral spiral tube in order to minimize its centrifugal and/or compressive potential energy.

After cooled working fluid (not shown) flows within, and through, the peripheral spiral tube 705, and then flows 730 into, and through, an upper end, e.g., 731, of that peripheral spiral tube, the cooled and compressed working fluid then flows 714 through an upper end 706 of the peripheral spiral tube and into an upper end, e.g., at 717, of the upper 701, and/or isothermal expansion, portion of the central longitudinal tube, whereafter the cycle of thermally-driven working-fluid flow repeats.

The wall of the entire fluid channel, including, but not limited to: the wall, e.g., 712 and 713, of the isothermal expansion portion of the central longitudinal tube; the wall 719 of the isothermal contraction portion 702 of the central longitudinal tube; and the wall of the peripheral spiral tube 705, is thermally-conductive.

FIG. 142 shows a top-down sectional view of the same embodiment 700 of the present disclosure that is illustrated in FIGS. 134-141 wherein the horizontal section plane is specified in FIG. 141 and the section is taken across line 142-142.

Visible within the interior of the lower, and/or the isothermal contraction, portion (702 in FIG. 141) of the central longitudinal tube are eight spiral vanes, e.g., 721, 722, and 725. Each of the eight separate spiral fluid conduits, and/or channels, within the isothermal contraction portion of the embodiment's fluid-flow tube, is approximately wedge-, and/or pie-, shaped, and is bounded on the radial outside by the wall 719 of the isothermal contraction portion of the central longitudinal tube, bounded on the radial inside by the central vane rod 720, and bounded laterally by a respective adjacent pair of the eight spiral vanes 721, 722, 725, 733, 735, 738, 739, and 740. Each of the eight spiral working-fluid-flow channels is bounded by a unique pair of spiral vanes. Each radially adjacent pair of spiral vanes establishes, creates, forms, and/or comprises, a separate working-fluid-flow channel through the isothermal contraction portion of the central longitudinal tube, and through which cooling working fluid (not shown) may flow therethrough. The working-fluid-flow path designated as 724 in FIG. 141 flows into and through the channel 732 bounded by spiral vanes 725 and 733. The working-fluid flow path designated as 723 in FIG. 141 flows into and through the channel 734 bounded by spiral vanes 721 and 735.

As cooling working fluid (not shown) flows downward through the spiral channels within the isothermal contraction portion (702 in FIG. 141) of the central longitudinal tube, e.g., through spiral channels 732 and 734, a torque is thereby imparted to the embodiment which rotates 703 the embodiment about the longitudinal axis (704 in FIG. 141) of its central longitudinal tube. And, due to the rotation of the embodiment induced and/or produced by the spiral flow of cooling working fluid, cooled working fluid flows, e.g., 728, into a lower end 727 of the peripheral spiral tube 705. And, the continuing rotation of the embodiment, causes a mechanical compression of the working fluid flowing through that peripheral spiral tube. Furthermore, as a consequence of an increasing radius of curvature within, and/or of, the peripheral spiral tube, with respect to the direction 728 and 736 of working-fluid flow, the working fluid flows, e.g., 736, upward within the lumen 737 of the peripheral spiral tube so as to minimize the centrifugal rotational forces to which it is subjected within the peripheral spiral tube.

FIG. 143 shows a perspective view of the same side sectional view illustrated in FIG. 141, which is a side sectional view of the same embodiment 700 of the present disclosure that is illustrated in FIGS. 134-140 wherein the vertical section plane is specified in FIGS. 139 and 140 and the section is taken across line 141-141.

FIG. 144 shows a side sectional view of the same embodiment 700 of the present disclosure that is illustrated in FIGS. 134-143 wherein the vertical section plane is specified in FIGS. 139 and 140 and the section is taken across line 144-144.

Cold and compressed working fluid (not shown) flows 714 into the lumen 715 of the isothermal expansion portion 701 of the embodiment's working-fluid-flow channel (i.e., the continuous, sealed, closed, and fluidly interconnected tubular channel through which working fluid flows through and/or within the embodiment). As working fluid flows 741 through the isothermal expansion portion of the working-fluid-flow channel, it absorbs thermal energy and/or heat from the thermally-conductive wall, e.g., 712 and 713, thereof, that thermal energy having originated at, and/or been produced in part, if not entirely, by, the radioactive decay of the uranium 710 positioned, and/or affixed, between the thermally-conductive wall of the isothermal expansion portion of the embodiment's working-fluid-flow channel (and its adjacent intermediary steel heat diffusion and distribution tube 711), and the outer thermally insulating layer and/or covering 709. As the working fluid is heated within the isothermal expansion portion of the embodiment's working-fluid-flow channel, it expands and accelerates downward through the embodiment's working-fluid-flow channel, and toward the isothermal contraction portion 702 of that working-fluid-flow channel.

While flowing through the isothermal contraction portion of the working-fluid-flow channel, the working fluid gives up thermal energy to the relatively cool thermally-conductive wall 719 of that portion of the working-fluid-flow channel. A portion of the thermal energy imparted to the thermally-conductive wall of the isothermal contraction portion of the working-fluid-flow channel is conducted to the fluid, and/or thermal sink, outside, e.g., 742, the embodiment.

Within the isothermal contraction portion 702 of the embodiment's working-fluid-flow channel, the working fluid flows through one of eight spiral working-fluid-flow channels, with each spiral working-fluid-flow channel being bounded by an adjacent pair of spiral vanes, e.g., one of the eight spiral working-fluid-flow channels is bounded by spiral vanes 721 and 735. The disruption of the flow of the working fluid caused by its passage through the spiral working-fluid-flow channels imparts a torque to the embodiment causing it to rotate 703 about its longitudinal axis 704.

Because of the embodiment's rotation 703, cooled working fluid (not shown) flowing, e.g., 726, out of the isothermal contraction portion 702 of the embodiment's working-fluid-flow channel, flows into the fluidly-connected junction 708 between the isothermal contraction portion 702 of the embodiment's working-fluid-flow channel and therethrough flows into, and flows, e.g., 728, through, a proximate end, e.g., 743, of the peripheral spiral tube 705.

Because of the embodiment's rotation 703, cooled working fluid flowing, e.g., 728, into and through the peripheral spiral tube 705 is mechanically compressed. And, because of the loosening, relaxing, and/or widening, curvature of the peripheral spiral tube (with respect to upward flow through the peripheral spiral tube), as the working fluid is mechanically compressed by centrifugal rotational forces, it is also driven upward and through the peripheral spiral tube, until it flows, e.g., 744, through an uppermost, and/or distal, end 745 of the peripheral spiral tube. After flowing upward through the peripheral spiral tube, the cooled and compressed working fluid, flows into an upper end 706 of the peripheral spiral tube 705. Therefrom, cooled working fluid flows through the upper end 706 of the peripheral spiral tube 705 and therethrough flows, e.g., 714, into, and through, the isothermal expansion portion 701 of the embodiment's working-fluid-flow channel, and thereafter repeats the cyclic working-fluid flow pattern, transferring thermal energy from the tube of decaying radioactive uranium 710 to the fluid outside, e.g., 742, the embodiment, and thereby causing the embodiment 700 to rotate 703 about the embodiment's longitudinal axis 704.

FIG. 145 shows a perspective view of the same side sectional view illustrated in FIG. 144, which is a side sectional view of the same embodiment 700 of the present disclosure that is illustrated in FIGS. 134-143 wherein the vertical section plane is specified in FIGS. 139 and 140 and the section is taken across line 144-144.

The varieties of embodiments, their geometries, their working fluids, their operations, and their applications, enumerated within the "Summary of the Invention" section of this disclosure apply to the embodiment illustrated and discussed in relation to FIGS. 134-145, and the scope of the present disclosure includes all such variations of the embodiment illustrated in FIGS. 134-145.

Disclosed in this specification, and in FIGS. 134-145, is a closed-cycle heat engine, comprising: a thermally-conductive isothermal expansion working-fluid-flow tube having an isothermal-expansion-tube inlet and an isothermal-expansion-tube outlet; a thermally-conductive isothermal contraction working-fluid-flow tube having an isothermal-contraction-tube inlet and an isothermal-contraction-tube outlet; a peripheral spiral working-fluid-flow tube having a peripheral-spiral-tube inlet and a peripheral-spiral-tube outlet; a tube of radioactive material outside, and radially adjacent to, the isothermal expansion working-fluid-flow tube; wherein the isothermal contraction working-fluid-flow tube is radially adjacent to a thermal sink; wherein the isothermal-expansion-tube outlet is fluidly connected to the isothermal-contraction-tube inlet; wherein the isothermal-contraction-tube outlet is fluidly connected to the peripheral-spiral-tube inlet; wherein the peripheral-spiral-tube outlet is fluidly connected to the isothermal-expansion-tube inlet; and, wherein a radius of curvature of the peripheral spiral tube increases between the peripheral-spiral-tube inlet and the peripheral-spiral-tube outlet.

FIG. 146 shows a perspective side view of a modified version of the embodiment 700 of the present disclosure that is illustrated in FIGS. 134-145. The modified version of the embodiment 700 illustrated in FIG. 146 does not utilize the radioactive decay of a uranium tube (710 in FIGS. 141 and 144) to produce heat in order to create a thermal gradient sufficient to cause the embodiment to rotate. Instead, the modified version of the embodiment 700 illustrated in FIG. 146 utilizes a tubular assemblage of resistive elements (not visible, e.g., resistors in series) which produce thermal energy in response to an appropriately configured flow of electrical power through those resistive elements within the tubular assemblage of those elements.

The modified version of the embodiment 700 illustrated in FIG. 146 also includes an upper 746 and a lower 747 shaft. Each shaft is attached, and/or connected, to the central longitudinal tube 701/702 by a respective shaft connector, e.g., 748. The modified version of the embodiment is adapted to rotate within upper and lower shaft bearings (not shown) positioned at respective distal ends of the upper 746 and lower 747 shafts, wherein the upper and lower shaft bearings rotatably connect the rotating embodiment to a non-rotating, stationary, and/or differently-rotating (e.g., at a different rate of rotation), mechanical fixture, assembly, apparatus, framework, and/or object.

In order to energize the resistive heating elements within the rotating embodiment 700 illustrated in FIG. 146, a pair of commutators 754 and 755 are affixed to the upper shaft (nominally between the upper end of the central longitudinal tube and the respective upper shaft bearing). A complementary pair of stationary upper and lower electrical brushes (not shown) electrically connect the respective rotating, and/or rotatable, upper 754 and lower 755 commutators to an external source of electrical power, thereby enabling an external source of electrical power, e.g., positioned at, on, and/or within, the non-rotating, stationary, or other rotating, mechanical fixture, assembly, apparatus, framework, and/or object, to be operably connected to the rotating, and/or rotatable, embodiment, and to thereby, and/or therethrough, impart electrical power to the rotating embodiment.

In the embodiment illustrated in FIG. 146, the upper electrical brush (not shown) is connected to a source of relatively positive direct-current voltage and current. And, the lower electrical brush (not shown) is connected to a source of relatively negative direct-current voltage and current, and/or to a relative electrical ground. Thus, when electrically connected to the upper and lower electrical brushes, the respective upper and lower commutators 754 and 755 enable the external electrical power supply to impart electrical power to the rotating tubular assemblage of resistive elements which, relative to the cool of the thermal sink, and/or fluid, e.g., air, outside the embodiment, creates a thermal difference sufficient to cause the embodiment to rotate.

Upper shaft 746 is attached, and/or connected, to an upper end (not visible) of isothermal expansion portion 701 of the embodiment's working-fluid-flow channel by an upper shaft connector 748. An upper end, e.g., 749, of the embodiment's peripheral spiral tube 705 fluidly connects to an upper end (not visible) of the isothermal expansion portion of the embodiment's working-fluid-flow channel through an aperture 750 in the upper shaft connector.

Lower shaft 747 is attached, and/or connected, to a lower end (not visible) of isothermal contraction portion 702 of the embodiment's working-fluid-flow channel by a lower shaft connector 751. A lower end, e.g., 752, of the embodiment's peripheral spiral tube 705 fluidly connects to a lower end (not visible) of the isothermal contraction portion of the embodiment's working-fluid-flow channel through an aperture 753 in the lower shaft connector.

The modified version of the embodiment 700 illustrated in FIG. 146 also includes peripheral-spiral-tube resistive heating elements 761-763 at three locations along the embodiment's peripheral spiral tube 705. These peripheral-spiral-tube resistive elements may be energized in order to initiate, and/or accelerate, an upward flow of working fluid (not shown) through the peripheral spiral tube portion of the embodiment's working-fluid-flow channel, and may subsequently be deenergized after the embodiment has begun rotating.

FIG. 147 shows a top-down view of the same modified version of embodiment 700 of the present disclosure that is illustrated in FIG. 146.

FIG. 148 shows a side sectional view of the same modified version of embodiment 700 of the present disclosure that is illustrated in FIGS. 146 and 147 wherein the vertical section plane is specified in FIG. 147 and the section is taken across line 148-148.

Upper shaft 746 is nominally rotatably connected to an upper shaft bearing (not shown) the nominal position of which is illustrated by the dashed shaft bearing outline 756. Lower shaft 747 is nominally rotatably connected to a lower shaft bearing (not shown) the nominal position of which is illustrated by the dashed shaft bearing outline 757.

Upper commutator 754 is nominally electrically connected to an upper electrical brush (illustrated by dashed upper brush outline 758) which provides the upper commutator with a relatively positive direct-current voltage and current. The upper electrical brush, nominally electrically connected to upper commutator 754, is nominally electrically connected to an electrical power source external to the embodiment, e.g., mounted, and/or attached, to a non-rotating mechanical apparatus and/or framework (not shown).

Lower commutator 755 is nominally electrically connected to a lower electrical brush (illustrated by dashed lower brush outline 759) which provides the lower commutator with a relatively negative direct-current voltage and current, and/or with a connection to electrical ground. The lower electrical brush, nominally electrically connected to lower commutator 755, is nominally electrically connected to the same electrical power source, and/or circuit, to which upper commutator 754 is electrically connected.

Electrical power received via, and/or through, the commutators 754 and 755 flows through electrical conduits (not shown), wires, cables, and/or conductors, and thereby energizes resistors, and/or resistive elements, within an electrically-powered tubular heater 760. Whereas the version of the embodiment 700 illustrated in FIGS. 134-145 derived thermal energy from a radioactive heating element, the modified version of the same embodiment illustrated in FIGS. 146-148 derives its thermal energy from electrically-powered resistors.

When engaged, actuated, and/or so connected, electrical power received via and/or through the commutators 754 and 755 flows through electrical conduits (not shown), wires, cables, and/or conductors, and thereby energizes peripheral-spiral-tube resistive elements 761-763. The operation of the embodiment 700 requires that the embodiment rotate so as to centrifugally drive working fluid up and through the peripheral spiral tube, and therethrough to drive working fluid into the embodiment's isothermal expansion portion 712/713 of the central longitudinal tube. When initially energized, after having been deenergized, and/or at rest, the working fluid (not shown) within the embodiment 700 may require some time to begin flowing, and, consequently, when initially energized, after having been deenergized, and/or at rest, the embodiment may require some time to begin rotating. This initial operational latency may be shortened through an energizing of the peripheral-spiral-tube resistive elements 761-763.

When at rest, cooled and compressed working fluid (not shown) will tend to reside, and/or to be accumulated within, the interior, and/or lumen, of the peripheral spiral tube 705. When the peripheral-spiral-tube resistive elements 761-763 are energized, and thereafter produce heat, a portion of that heat is imparted to the working fluid within a respective local portion of the peripheral spiral tube. The working fluid within the peripheral spiral tube so warmed will tend to expand flow upward (i.e., flow away from the pooled working fluid in the lower portions of the peripheral spiral tube) through the peripheral spiral tube toward the upper end 706 of that peripheral spiral tube, after which that working fluid will receive additional thermal energy as it flows into and through the lumen 715 of the isothermal expansion portion 701 of the embodiment's working-fluid-flow channel. Thus, the energizing of the peripheral-spiral-tube resistive elements 761-763 will tend to promote an initial flow of working fluid to and through the isothermal expansion portion of the embodiment's working-fluid-flow channel, which will, in turn, promote an initial flow of working fluid to and through the isothermal contraction portion of the embodiment's working-fluid-flow channel, and past the eight spiral vanes, e.g., 721 and 722, therein, thereby initiating a rotation of the embodiment.

Once the embodiment has begun to rotate, the conduction of electrical power from the commutators 754-755 to the peripheral-spiral-tube resistive elements 761-763 may be stopped, ended, and/or terminated (e.g., by computerized control circuit utilizing an accelerometer to activate the peripheral-spiral-tube resistive elements when the embodiment is rotating at a rotational speed, e.g., RPM, below a threshold minimal rotational speed, and, correspondingly, to deactivate the spiral-tube resistive elements when the embodiment is rotating at a speed at or greater than the threshold minimum rotational speed).

Aside from the incorporation of upper 746 and lower 747 shafts, electrical commutators 754 and 755, an electrically-powered tubular heater 760, and three peripheral-spiral-tube resistive elements 761-763, the other aspects, features, and behaviors of the modified version of the embodiment 700 illustrated in FIGS. 145-148 are identical to those described in relation to the version of the embodiment illustrated in FIGS. 134-144, and they will not be repeated here.

The varieties of embodiments, their geometries, their working fluids, their operations, and their applications, enumerated within the "Summary of the Invention" section of this disclosure apply to the embodiment illustrated and discussed in relation to FIGS. 146-148, and the scope of the present disclosure includes all such variations of the embodiment illustrated in FIGS. 146-148.

Disclosed in this specification, and in FIGS. 146-148, is a closed-cycle heat engine, comprising: a thermally-conductive isothermal expansion working-fluid-flow tube having an isothermal-expansion-tube inlet and an isothermal-expansion-tube outlet; a thermally-conductive isothermal contraction working-fluid-flow tube having an isothermal-contraction-tube inlet and an isothermal-contraction-tube outlet; a peripheral spiral working-fluid-flow tube having a peripheral-spiral-tube inlet and a peripheral-spiral-tube outlet; an annular array of electrically-resistive heaters outside, and radially adjacent to, and thermally-connected to, the isothermal expansion working-fluid-flow tube; one or more electrically-resistive heaters fixedly attached to, and thermally-connected to, the peripheral spiral working-fluid-flow tube; wherein the isothermal contraction working-fluid-flow tube is radially adjacent to a thermal sink; wherein the isothermal-expansion-tube outlet is fluidly connected to the isothermal-contraction-tube inlet; wherein the isothermal-contraction-tube outlet is fluidly connected to the peripheral-spiral-tube inlet; and, wherein the peripheral-spiral-tube outlet is fluidly connected to the isothermal-expansion-tube inlet; wherein a radius of curvature of the peripheral spiral tube increases between the peripheral-spiral-tube inlet and the peripheral-spiral-tube outlet.

FIG. 149 shows a perspective side view of an embodiment 800 of the present disclosure.

The embodiment 800 illustrated in FIG. 149 causes working fluid (not shown) within a pair of circular, and/or annular, fluid channels (not visible), contained, embedded, and/or incorporated within, a fluid channel casing 801, to flow in respective circular paths about a central shaft 802, thereby causing the embodiment and its shaft to rotate within upper 803 and lower (not visible) shaft bearings to which the embodiment is rotatably connected. Each upper and lower bearing is typically affixed, connected, attached, and/or mounted to, an external non-rotating, stationary, and/or differently rotating (e.g., at a different rate of rotation), mechanical fixture, assembly, apparatus, framework, and/or object. The rotatable, and/or rotating, portion of the embodiment (including the shaft and fluid channel casing) is typically rotatably connected to such an external non-rotating, stationary, and/or differently rotating (e.g., at a different rate of rotation), mechanical fixture, assembly, apparatus, framework, and/or object, by the upper and lower shaft bearings.

The embodiment 800 illustrated in FIG. 149 comprises fluidly separated upper and lower fluid channels (not visible), positioned within the fluid channel casing 801, through each of which a working fluid (not shown) flows. Heat and cold are provided, manifested, and/or imparted, to the working fluid within the upper and lower fluid channels by Peltier thermoelectric heat pumps (not visible). When energized by electrical power transmitted, communicated, and/or conducted, to the Peltier thermoelectric heat pumps within the embodiment from an external electrical power source (not shown) via, through, and/or by means of, a pair of non-rotating electrical brushes 804 and 805, and respective rotating electrical commutators 806 and 807, each Peltier thermoelectric heat pump produces heat on one of its sides, and cold on the other, and/or opposing, side. Each Peltier thermoelectric heat pump is positioned between the upper and lower fluid channels. The heat from each Peltier thermoelectric heat pump heats working fluid flowing through the isothermal expansion portion of one of the upper and lower fluid channels, and chills working fluid flowing through the isothermal contraction portion of the other lower and upper fluid channels. Thus, each Peltier thermoelectric heat pump uses electrical power supplied by an external source (not shown) to remove thermal energy from an isothermal contraction portion of a first of two fluid channels, and to impart thermal energy to an isothermal expansion portion of a second of the two fluid channels.

The circular and/or annular fluid channel casing 801 is rigidly affixed, fixedly attached, connected, and/or attached, to the central shaft 802 by upper 808 and lower (not visible) connecting plates.

When supplied with electrical direct-current (DC) power (e.g., a DC current of an appropriate electrical voltage) of a first polarity, e.g., positive DC voltage at the upper electrical brush 804, and upper electrical commutator 806, and negative DC voltage (or ground) at the lower electrical brush 805, and lower electrical commutator 807, the embodiment's Peltier thermoelectric heat pumps (not visible) produce thermal gradients within the embodiment that cause the embodiment's working fluid (not shown) to flow in a first direction, e.g., clockwise about the longitudinal axis of the central shaft with respect to a top-down perspective. When supplied with electrical direct-current (DC) power (e.g., a DC current of an appropriate electrical voltage) of a second polarity, opposite the first polarity, e.g., negative DC voltage, or ground, at the upper electrical brush 804, and upper electrical commutator 806, and positive DC voltage at the lower electrical brush 805, and lower electrical commutator 807, the embodiment's Peltier thermoelectric heat pumps (not visible) produce thermal gradients within the embodiment that cause the embodiment's working fluid (not shown) to flow in a second direction, opposite the first direction, e.g., counterclockwise about the longitudinal axis of the central shaft with respect to a top-down perspective.

The embodiment 800 illustrated in FIG. 149 may be used as a replacement for a traditional electrical motor in order to turn a shaft, e.g., and thereby turn a wheel. Whereas a traditional electrical motor typically utilizes a rotor comprising magnets and a complementary stator containing electrically energized magnetic-field-producing field coils in order to cause the respective rotor shaft to turn, the embodiment illustrated in FIG. 149 uses Peltier thermoelectric heat pumps, and a thermally-driven flow of working fluid, to cause its respective central shaft 802 to rotate, and/or to produce a torque. With respect to some applications, the embodiment illustrated in FIG. 149 might prove to be a more reliable source of rotational mechanical power. The embodiment illustrated in FIG. 149 might be used in conjunction with a source of electrical power such as a battery or a photovoltaic solar cell (or another source of DC electrical power) in order to rotate a reaction wheel, a vehicle wheel, or a propeller.

FIG. 150 shows a side view of the same embodiment 800 of the present disclosure that is illustrated in FIG. 149.

Upper 803 and lower 809 shaft bearings enable the rotatable connection of the rotating portions of the embodiment, e.g., the fluid channel casing 801 and the central shaft 802, to an external non-rotating, stationary, and/or differently rotating (e.g., at a different rate of rotation), mechanical fixture, assembly, apparatus, framework, and/or object.

FIG. 151 shows a side view of the same embodiment 800 of the present disclosure that is illustrated in FIGS. 149 and 150.

FIG. 152 shows a side view of the same embodiment 800 of the present disclosure that is illustrated in FIGS. 149-151.

FIG. 153 shows a side view of the same embodiment 800 of the present disclosure that is illustrated in FIGS. 149-152.

FIG. 154 shows a top-down view of the same embodiment 800 of the present disclosure that is illustrated in FIGS. 149-153.

FIG. 155 shows a bottom-up view of the same embodiment 800 of the present disclosure that is illustrated in FIGS. 149-154.

The circular and/or annular fluid channel casing 801 is rigidly connected to the central shaft 802 by upper (not visible, 808 in FIG. 149) and lower 810 connecting plates.

FIG. 156 shows a top-down sectional view of the same embodiment 800 of the present disclosure that is illustrated in FIGS. 149-155 wherein the horizontal section plane is specified in FIG. 151 and the section is taken across line 156-156. In the illustration of FIG. 156, only the fluid channel casing 801 has been sectioned, thereby revealing the interior of the embodiment's upper fluid channel. The upper fluid channel is bounded, enclosed, encased, and/or isolated and separated from a lower fluid channel (not visible), in part, by the embodiment's channel separation barrier which is comprised of first and second Peltier thermoelectric heat pumps (not visible). Each Peltier thermoelectric heat pump is clad by upper and lower thermally-conductive cladding plates. Visible in FIG. 156 is the upper cladding plate 821 which overlies the first Peltier thermoelectric heat pump, and the upper cladding plate 825 which overlies the second Peltier thermoelectric heat pump.

Separating the first and second Peltier thermoelectric heat pumps are first 813 and second 816 thermal insulation bridging plates. The first and second thermal insulation bridging plates are thermally insulating and create, within the upper and lower fluid channels, adiabatic expansion, and adiabatic compression, portions of each respective fluid channel. The adiabatic expansion portion of one of the embodiment's two fluid channels that is created on an upper or lower side of each thermal insulation bridging plate, is complemented by the creation of a corresponding adiabatic compression channel portion that is created on the respective and opposing lower or upper side of each respective thermal insulation bridging plate.

FIG. 157 shows a perspective view of the same side sectional view illustrated in FIG. 156, which is a top-down sectional view of the same embodiment 800 of the present disclosure that is illustrated in FIGS. 149-155 wherein the horizontal section plane is specified in FIG. 151 and the section of the embodiment's fluid channel casing 801 is taken across line 156-156.

FIG. 158 shows a side sectional view of the same embodiment 800 of the present disclosure that is illustrated in FIGS. 149-157 wherein the vertical section plane is specified in FIGS. 154 and 156 and the section is taken across line 158-158.

The circular, and/or annular, fluid channel casing 801 includes, incorporates, encases, and/or surrounds, upper 811 and lower 812 fluid channels. The upper and lower fluid channels are separated by an oblique, and/or an inclined, planar, and/or flat, channel separation barrier, e.g., of which the first thermal insulation bridging plate 813 is a part.

The section plane (line 158-158 of FIGS. 154 and 156), at which the embodiment illustrated in FIG. 158 has been sectioned, passes through that portion of, and/or angular position in, the annular fluid channel casing 801 at which is located the adiabatic compression portion 811 of the upper fluid channel, and the vertically complementary adiabatic expansion portion 812 of the lower fluid channel. The section plane (line 158-158 of FIGS. 154 and 156) at which the embodiment illustrated in FIG. 158 has been sectioned also passes through that position 817 of the upper fluid channel at which that fluid channel's flow-normal cross-sectional area (relative to a plane containing the longitudinal axis of the central shaft 802) is minimal, as well as that position 818 of the lower fluid channel at which that fluid channel's flow-normal cross-sectional area (relative to a plane containing the longitudinal axis of the central shaft 802) is maximal.

Similarly, and in a complementary fashion, the section plane (line 158-158 of FIGS. 154 and 156) at which the embodiment illustrated in FIG. 158 has been sectioned passes through that portion of, and/or angular position in, the annular fluid channel casing 801 at which is located the adiabatic expansion portion 814 of the upper fluid channel, and the vertically complementary adiabatic compression portion 815 of the lower fluid channel. The section plane (line 158-158 of FIGS. 154 and 156) at which the embodiment illustrated in FIG. 158 has been sectioned also passes through that position 819 of the upper fluid channel at which that fluid channel's flow-normal cross-sectional area (relative to a plane containing the longitudinal axis of the central shaft 802) is maximal, as well as that position 820 along the lower fluid channel at which that fluid channel's flow-normal cross-sectional area (relative to a plane containing the longitudinal axis of the central shaft 802) is minimal.

Regardless of the direction in which working fluid flows through, and/or around, the upper and lower fluid channels of the annular fluid channel casing 801, the upper fluid channel portion, and/or region, 811, is always, and/or always manifests the thermodynamic behavior, and/or function of, the adiabatic compression portion of the upper fluid channel, and, similarly, the lower fluid channel portion, and/or region, 815, is always, and/or always manifests the thermodynamic behavior, and/or function of, the adiabatic compression portion of the lower fluid channel. Likewise, regardless of the direction in which working fluid flows through, and/or around, the upper and lower fluid channels of the annular fluid channel casing 801, the upper fluid channel portion, and/or region, 814, is always, and/or always manifests the thermodynamic behavior, and/or function of, the adiabatic expansion portion of the upper fluid channel, and, similarly, the lower fluid channel portion, and/or region, 812, is always, and/or always manifests the thermodynamic behavior, and/or function of, the adiabatic expansion portion of the lower fluid channel.

The sectioned portion of the first channel separation barrier 813, which separates the adiabatic compression portion 811 of the upper fluid channel from the adiabatic expansion portion 812 of the lower fluid channel, is fabricated of a thermally insulating material such that thermal energy, and/or heat, may not pass between the upper and lower fluid channels at that portion of the channel separation barrier. Likewise, the sectioned portion of the second channel separation barrier 816, which separates the adiabatic expansion portion 814 of the upper fluid channel from the adiabatic compression portion 815 of the lower fluid channel, is fabricated of a thermally insulating material such that thermal energy and/or heat may not pass between the upper and lower fluid channels at that portion of the channel separation barrier.

In the embodiment illustrated in FIGS. 149-158, the exterior walls of the portions, and/or parts, of the annular fluid channel casing 801, surrounding the adiabatic expansion portions, and the vertically adjacent adiabatic compression portions, of the fluid channels therein, are fabricated, constructed, and/or comprised, of a thermally insulating material; while the exterior walls of the portions, and/or parts, of the annular fluid channel casing surrounding the isothermal expansion portions, and the vertically adjacent isothermal contraction portions, of the fluid channels therein, are fabricated, constructed, and/or comprised, of a thermally-conductive material.

In an embodiment similar to the embodiment illustrated in FIGS. 149-158, the exterior walls of the annular fluid channel casing 801 are comprised of a thermally-conductive material. In another embodiment similar to the embodiment illustrated in FIGS. 149-158, the exterior walls of the annular fluid channel casing 801 are comprised of a thermally insulating material.

FIG. 159 shows a perspective view of the same side sectional view illustrated in FIG. 158, which is a side sectional view of the same embodiment 800 of the present disclosure that is illustrated in FIGS. 149-157 wherein the vertical section plane is specified in FIGS. 154 and 156 and the section is taken across line 158-158.

Visible in the illustration of FIG. 159 is an upper thermally-conductive cladding plate 821 adjacent to, and overlying, the first (not visible) of the embodiment's two Peltier thermoelectric heat pumps. The embodiment contains, incorporates, utilizes, and/or comprises, two Peltier thermoelectric heat pumps, each of which is clad with upper and lower thermally-conductive plates.

FIG. 160 shows a side sectional view of the same embodiment 800 of the present disclosure that is illustrated in FIGS. 149-159 wherein the vertical section plane is specified in FIGS. 154 and 156 and the section is taken across line 160-160.

The section plane (line 160-160 of FIG. 154) at which the embodiment illustrated in FIG. 160 has been sectioned passes through that portion of, and/or angular position in, the annular fluid channel casing 801 at which are located the first 822 and second 823 Peltier thermoelectric heat pumps. The first Peltier thermoelectric heat pump 822 is vertically encased by upper 821 and lower 824 thermally-conductive cladding plates. The second Peltier thermoelectric heat pump 823 is vertically encased by upper 825 and lower 826 thermally-conductive cladding plates.

When the DC electrical power has a first polarity, wherein a positive voltage is applied to the upper electrical commutator 806 and a negative voltage, or ground, is applied to the lower electrical commutator 807, and has a sufficient current, the first 822 Peltier thermoelectric heat pump discharges 827 heat into the upper fluid channel which therefore causes working fluid therein to expand and flow causing the affected portion of the upper fluid channel to constitute, and/or to act, behave, and/or operate as, an isothermal expansion portion 828 of that upper fluid channel. And, when the DC electrical power is of the first polarity, the first 822 Peltier thermoelectric heat pump removes 829 heat from, and/or chills, the lower fluid channel which therefore causes working fluid therein to contract and flow causing the affected portion of the lower fluid channel to constitute, and/or to act, behave, and/or operate as, an isothermal contraction portion 830 of that lower fluid channel.

When the DC electrical power is of the first polarity, wherein a positive voltage is applied to the upper electrical commutator 806 and a negative voltage, or ground, is applied to the lower electrical commutator 807, and has a sufficient current, the second 823 Peltier thermoelectric heat pump discharges 831 heat into the lower fluid channel which therefore causes working fluid therein to expand and flow causing the affected portion of the lower fluid channel to constitute, and/or to act, behave, and/or operate as, an isothermal expansion portion 832 of that lower fluid channel. And, when the DC electrical power is of the first polarity, the second 823 Peltier thermoelectric heat pump removes 833 heat from, and/or chills, the upper fluid channel which therefore causes working fluid therein to contract and flow causing the affected portion of the upper fluid channel to constitute, and/or to act, behave, and/or operate as, an isothermal contraction portion 834 of that upper fluid channel.

FIG. 161 shows a perspective view of the same side sectional view illustrated in FIG. 160, which is a side sectional view of the same embodiment 800 of the present disclosure that is illustrated in FIGS. 149-159 wherein the vertical section plane is specified in FIGS. 154 and 156 and the section is taken across line 160-160.

FIG. 162 is an illustration of the embodiment's channel separation barrier in isolation from the rest of the embodiment. FIG. 162 includes the central shaft 802 for visual perspective and orientation. In the full embodiment (800 in FIGS. 149-161), the channel separation barrier separates the interior of the fluid channel casing (801 in FIGS. 149-161) into fluidly isolated upper and lower fluid channels.

In FIG. 162, the first 821, 822, and 824, and second 825, 823, and 826, cladded Peltier assemblies are vertically separated to facilitate their viewing and examination. In an operational configuration of the embodiment (800 in FIGS. 149-161), the cladded Peltier assemblies are vertically compact with the upper and lower cladding of each cladded Peltier assembly being immediately vertically adjacent to each respective Peltier thermoelectric heat pump.

The embodiment's (800 in FIGS. 149-161) channel separation barrier is comprised of four parts and/or portions. First 813 and second 816 thermal insulation bridging plates thermally insulate those respective vertically adjacent portions of the upper (e.g., 811 and 814 in FIG. 158) and lower (e.g., 812 and 815 in FIG. 158) fluid channels. They also thermally insulate the horizontally adjacent first 821, 822, and 824, and second 823, 825, and 826, cladded Peltier assemblies, e.g., preventing a mixing of their electrically-produced heat and cold.

Each thermal insulation bridging plate, 813 and 816, physically and horizontally abuts, and thermally separates, and/or isolates, each of the embodiment's first 822 and second 823 Peltier thermoelectric heat pumps. However, the upper, e.g., 821, and lower, e.g., 824, cladding which covers the upper and lower broad surfaces of each respective Peltier thermoelectric heat pump, e.g., 822, extend past the radial, and/or circumferential, ends, e.g., 835, of each respective Peltier thermoelectric heat pump. For example, radial ends 836 and 837, of respective upper 821 and lower 824 cladding plates, extend radially, and/or circumferentially, further, and/or past, the radial end 835 of the respective Peltier thermoelectric heat pump 822. In a complementary fashion, the radial end 838 of the adjacent thermal insulation bridging plate 813 extends into the radial, and/or circumferential, gap, and/or space, formed by the unequal radial positions of the radial ends of the upper and lower cladding plates and the radial end of the Peltier thermoelectric heat pump. Thus, the interleaving of the thermal insulation bridging plate 813 with the cladded Peltier assembly 821, 822, and 824, tends to minimize any leakage of heat from a first side of the respective Peltier thermoelectric heat pump to the other, and/or second, side of that Peltier thermoelectric heat pump, just as it tends to minimize any leakage of cold from the second side of the respective Peltier thermoelectric heat pump to the other, and/or first, side of that Peltier thermoelectric heat pump. The interleaving of each thermal insulation bridging plate with the radially, and/or circumferentially, adjacent cladded Peltier assemblies also tends to minimize the opportunity for thermal energy to leak from one of the upper and lower fluid channels to the other lower and upper fluid channels. The interleaving of each side of each of the first and second thermal insulation bridging plates with the radially, and/or circumferentially, adjacent cladded Peltier assemblies also tends to enhance the structural strength of the embodiment's channel separation barrier.

FIG. 163 is a perspective, top-down illustration of the embodiment (800 in FIGS. 149-161) in which the upper, lower, and radially outermost walls of the embodiment's fluid channel casing 801 have been removed (leaving only the radially innermost wall of that fluid channel casing visible in the illustration). Visible in FIG. 163 is the embodiment's upper fluid channel.

When a DC electrical power of a first polarity is electrically connected to the embodiment, i.e., when a relatively positive DC voltage and current source is electrically connected to the embodiment's upper electrical commutator 806, via the upper electrical brush 804, and a relatively negative DC voltage and current source, and/or ground, is electrically connected to the embodiment's lower electrical commutator 807, via the lower electrical brush 805, then the first Peltier thermoelectric heat pump (not visible, 822 in FIG. 162) will heat its adjacent upper cladding plate 821, which, in turn, will heat 839 the working fluid (not shown) within the vertically adjacent portion of the upper fluid channel thereby causing that working fluid to flow in a first, and/or clockwise, flow direction (as graphically illustrated by flow arrow 840), i.e., a flow direction that carries the expanding working fluid away from the point (817 in FIG. 158), and/or fluid-channel portion, above the thermal insulation bridging plate 813 where the flow-normal cross-sectional area of the upper fluid channel is minimal, and toward the point (819 in FIG. 158), and/or fluid-channel portion, above the thermal insulation bridging plate 816 where the flow-normal cross-sectional area of the upper fluid channel is maximal.

Likewise, when a DC electrical power of a first polarity is electrically connected to the embodiment, then the second Peltier thermoelectric heat pump (not visible, 823 in FIG. 162) will cool its adjacent upper cladding plate 825, which, in turn, will cool, and/or remove heat 841 from, the working fluid (not shown) within vertically adjacent portions of the upper fluid channel thereby also causing that working fluid to flow in the first, and/or clockwise, flow direction (as graphically illustrated by flow arrow 842), i.e., a flow direction that carries the contracting working fluid away from the point (819 in FIG. 158), and/or fluid-channel portion, above the thermal insulation bridging plate 816 where the flow-normal cross-sectional area of the upper fluid channel is maximal, and toward the point (817 in FIG. 158), and/or fluid-channel portion, above the thermal insulation bridging plate 813 where the flow-normal cross-sectional area of the upper fluid channel is minimal.

Thus, when energized by a DC electrical power source of a first polarity, both the first (not visible, 822 in FIG. 162) and second (not visible, 823 in FIG. 162) Peltier thermoelectric heat pumps create areas of respective heating and cooling which causes the working fluid within the upper fluid channel to flow in the first, and/or clockwise, flow direction (as graphically illustrated by respective flow arrows 840 and 842). The thermally-driven flow of working fluid (not shown) through the embodiment's upper fluid channel in the first, and/or clockwise, flow direction causes the embodiment to rotate 843 in the opposite, and/or counterclockwise, direction.

When a DC electrical power of a first polarity is electrically connected to the embodiment, working fluid (not shown) flowing through that portion of the upper fluid channel which is above, and/or vertically adjacent to, the upper cladding plate 821 flows through what is effectively, and/or operationally, the upper fluid channel's isothermal expansion portion. Working fluid flowing through that portion of the upper fluid channel which is above, and/or vertically adjacent to, the second thermal insulation bridging plate 816 flows through the upper fluid channel's adiabatic expansion portion. Working fluid flowing through that portion of the upper fluid channel which is above, and/or vertically adjacent to, the upper cladding plate 825 flows through what is effectively, and/or operationally, the upper fluid channel's isothermal contraction portion. And, working fluid flowing through that portion of the upper fluid channel which is above, and/or vertically adjacent to, the first thermal insulation bridging plate 813 flows through the upper fluid channel's adiabatic compression portion.

FIG. 164 is a perspective, bottom-up illustration of the embodiment (800 in FIGS. 149-161) in which the upper, lower, and radially outermost walls of the embodiment's fluid channel casing 801 have been removed (leaving only the radially innermost wall of the fluid channel casing visible in the illustration). Visible in FIG. 164 is the embodiment's lower fluid channel.

When a DC electrical power of a first polarity is electrically connected to the embodiment, i.e., when a relatively positive DC voltage and current source is electrically connected to the embodiment's upper electrical commutator (806 in FIG. 163), via the upper electrical brush (804 in FIG. 163), and a relatively negative DC voltage and current source, and/or ground, is electrically connected to the embodiment's lower electrical commutator (807 in FIG. 163), via the lower electrical brush (805 in FIG. 163), then the first Peltier thermoelectric heat pump (not visible, 822 in FIG. 162) will cool its adjacent lower cladding plate 824, which, in turn, will cool, and/or remove heat 844 from, the working fluid (not shown) within the vertically adjacent portion of the lower fluid channel thereby causing that working fluid to flow in the first, and/or clockwise, flow direction (e.g., clockwise about the longitudinal axis of the central shaft with respect to a top-down perspective, and as graphically illustrated by flow arrow 845), i.e., a flow direction that carries the contracting working fluid away from the point (818 in FIG. 158), and/or fluid-channel portion, below the thermal insulation bridging plate 813 where the flow-normal cross-sectional area of the lower fluid channel is maximal, and toward the point (820 in FIG. 158), and/or fluid-channel portion, below the thermal insulation bridging plate 816 where the flow-normal cross-sectional area of the lower fluid channel is minimal.

Likewise, when a DC electrical power of a first polarity is electrically connected to the embodiment, then the second Peltier thermoelectric heat pump (not visible, 823 in FIG. 162) will heat its adjacent lower cladding plate 826, which, in turn, will heat 846 the working fluid (not shown) within the vertically adjacent portion of the lower fluid channel thereby also causing that working fluid to flow in the first, and/or clockwise, flow direction (as graphically illustrated by flow arrow 847), i.e., a flow direction that carries the expanding working fluid away from the point (820 in FIG. 158), and/or fluid-channel portion, below the thermal insulation bridging plate 816 where the flow-normal cross-sectional area of the lower fluid channel is minimal, and toward the point (818 in FIG. 158), and/or fluid-channel portion, below the thermal insulation bridging plate 813 where the flow-normal cross-sectional area of the lower fluid channel is maximal.

The thermally-driven flow of working fluid (not shown) through the embodiment's lower fluid channel in the first, and/or clockwise, flow direction causes the embodiment to rotate 848 in the opposite direction.

When a DC electrical power of a first polarity is electrically connected to the embodiment, working fluid (not shown) flowing through that portion of the lower fluid channel which is below, and/or vertically adjacent to, the lower cladding plate 826 flows through what is effectively, and/or operationally, the lower fluid channel's isothermal expansion portion. Working fluid flowing through that portion of the lower fluid channel which is below, and/or vertically adjacent to, the first thermal insulation bridging plate 813 flows through the lower fluid channel's adiabatic expansion portion. Working fluid flowing through that portion of the lower fluid channel which is below, and/or vertically adjacent to, the lower cladding plate 824 flows through what is effectively, and/or operationally, the lower fluid channel's isothermal contraction portion. And, working fluid flowing through that portion of the lower fluid channel which is below, and/or vertically adjacent to, the second thermal insulation bridging plate 816 flows through the lower fluid channel's adiabatic compression portion.

Thus, when energized by a DC electrical power source of a first polarity, both the first (not visible, 822 in FIG. 162) and second (not visible, 823 in FIG. 162) Peltier thermoelectric heat pumps create respective patterns of heating and cooling which cause the working fluid within the lower fluid channel to flow in the same first, and/or clockwise, flow direction (as graphically illustrated by flow arrows 845 and 847) in which flows the working fluid within the vertically adjacent upper fluid channel. Thus, when energized by a DC electrical power source of a first polarity, the pattern of heating and cooling created by the first and second Peltier thermoelectric heat pumps causes working fluid in both the upper and lower fluid channels to flow in the same, first, and/or clockwise direction, e.g., clockwise about the longitudinal axis of the central shaft with respect to a top-down perspective. And, similarly, when energized by a DC electrical power source of a first polarity, the heating and cooling created by the first and second Peltier thermoelectric heat pumps causes the embodiment (800 in FIG. 149-161) to rotate in the same counterclockwise direction about the longitudinal axis of the central shaft with respect to a top-down perspective (843 in FIG. 163, and 848 in FIG. 164).

FIG. 165 is an illustration of the embodiment (800 in FIGS. 149-161) in which the upper, lower, and radially outermost walls of the embodiment's fluid channel casing 801 have been removed (leaving only the radially innermost wall of the fluid channel casing visible in the illustration). Visible in FIG. 165 is the embodiment's upper fluid channel.

The illustration in FIG. 165 is similar to the illustration in FIG. 163 except that FIG. 165 illustrates the configuration of the embodiment (800 in FIGS. 149-161) when the embodiment is energized by a DC electrical power of a second polarity, opposite that of the first polarity.

When a DC electrical power of a second polarity is electrically connected to the embodiment, i.e., when a relatively negative DC voltage and current source, and/or ground, is electrically connected to the embodiment's upper electrical commutator 806, via the upper electrical brush 804, and a relatively positive DC voltage and current source is electrically connected to the embodiment's lower electrical commutator 807, via the lower electrical brush 805, then the first Peltier thermoelectric heat pump (not visible, 822 in FIG. 162) will cool, and/or remove heat from, its adjacent upper cladding plate 821, which, in turn, will cool, and remove heat 849 from, the working fluid (not shown) within the vertically adjacent portion of the upper fluid channel thereby causing that working fluid to flow in a second, and/or counterclockwise, flow direction (as graphically illustrated by flow arrow 850), i.e., a flow direction that carries the contracting working fluid away from the point (819 in FIG. 158), and/or fluid-channel portion, above the thermal insulation bridging plate 816 where the flow-normal cross-sectional area of the upper fluid channel is maximal, and toward the point (817 in FIG. 158), and/or fluid-channel portion, above the thermal insulation bridging plate 813 where the flow-normal cross-sectional area of the upper fluid channel is minimal.

Likewise, when a DC electrical power of a second polarity is electrically connected to the embodiment, then the second Peltier thermoelectric heat pump (not visible, 823 in FIG. 162) will heat its adjacent upper cladding plate 825, which, in turn, will heat 851 the working fluid (not shown) within the vertically adjacent portion of the upper fluid channel thereby also causing that working fluid to flow in the second, and/or counterclockwise, flow direction (as graphically illustrated by flow arrow 852) i.e., a flow direction that carries the expanding working fluid away from the point (817 in FIG. 158), and/or fluid-channel portion, above the thermal insulation bridging plate 813 where the flow-normal cross-sectional area of the upper fluid channel is minimal, and toward the point (819 in FIG. 158), and/or fluid-channel portion, above the thermal insulation bridging plate 816 where the flow-normal cross-sectional area of the upper fluid channel is maximal.

Thus, when energized by a DC electrical power source of a second polarity, both the first (not visible, 822 in FIG. 162) and second (not visible, 823 in FIG. 162) Peltier thermoelectric heat pumps create the respective heating and cooling which causes the working fluid within the upper fluid channel to flow in the second, and/or counterclockwise, flow direction (as graphically illustrated by flow arrows 850 and 852). The thermally-driven flow of working fluid (not shown) through the embodiment's upper fluid channel in the second, and/or counterclockwise, flow direction causes the embodiment to rotate 853 in the opposite, and/or clockwise, direction about the longitudinal axis of the central shaft with respect to a top-down perspective—opposite the direction manifested when the embodiment is energized by a DC electrical power source of the first polarity.

When a DC electrical power of a second polarity is electrically connected to the embodiment, working fluid (not shown) flowing through that portion of the upper fluid channel which is above, and/or vertically adjacent to, the upper cladding plate 825 flows through what is effectively, and/or operationally, the upper fluid channel's isothermal expansion portion. Working fluid flowing through that portion of the upper fluid channel which is above, and/or vertically adjacent to, the second thermal insulation bridging plate 816 flows through the upper fluid channel's adiabatic expansion portion. Working fluid flowing through that portion of the upper fluid channel which is above, and/or vertically adjacent to, the upper cladding plate 821 flows through what is effectively, and/or operationally, the upper fluid channel's isothermal contraction portion. And, working fluid flowing through that portion of the upper fluid channel which is above, and/or vertically adjacent to, the first thermal insulation bridging plate 813 flows through the upper fluid channel's adiabatic compression portion.

When the embodiment is energized by a DC electrical power of a second polarity, the upper fluid channel's isothermal expansion portion, and isothermal contraction portion, are functionally reversed, swapped, and/or exchanged, relative to when the embodiment is energized by a DC electrical power of a first polarity.

FIG. 166 is an illustration of the embodiment (800 in FIGS. 149-161) in which the upper, lower, and radially outermost walls of the embodiment's fluid channel casing 801 have been removed (leaving only the radially innermost wall of the fluid channel casing visible in the illustration). Visible in FIG. 166 is the embodiment's lower fluid channel.

The illustration in FIG. 166 is similar to the illustration in FIG. 164 except that FIG. 166 illustrates the configuration of the embodiment (800 in FIGS. 149-161) when the embodiment is energized by a DC electrical power of a second polarity, opposite that of the first polarity.

When a DC electrical power of a second polarity is electrically connected to the embodiment, i.e., when a relatively negative DC voltage and current source, and/or ground, is electrically connected to the embodiment's upper electrical commutator (806 in FIG. 163), via the upper electrical brush (804 in FIG. 163), and a relatively positive DC voltage and current source is electrically connected to the embodiment's lower electrical commutator (807 in FIG. 163), via the lower electrical brush (805 in FIG. 163), then the first Peltier thermoelectric heat pump (not visible, 822 in FIG. 162) will heat its adjacent lower cladding plate 824, which, in turn, will heat 854 the working fluid (not shown) within the vertically adjacent portion of the lower fluid channel thereby causing that working fluid to flow in the second, and/or counterclockwise, flow direction (e.g., counterclockwise about the longitudinal axis of the central shaft with respect to a top-down perspective, and as graphically illustrated by flow arrow 855), i.e., a flow direction that carries the expanding working fluid away from the point (820 in FIG. 158), and/or fluid-channel portion, below the thermal insulation bridging plate 816 where the flow-normal cross-sectional area of the lower fluid channel is minimal, and toward the point (818 in FIG. 158), and/or fluid-channel portion, below the thermal insulation bridging plate 813 where the flow-normal cross-sectional area of the lower fluid channel is maximal.

Likewise, when a DC electrical power of a second polarity is electrically connected to the embodiment, then the second Peltier thermoelectric heat pump (not visible, 823 in FIG. 162) will cool its adjacent lower cladding plate 826, which, in turn, will cool, and/or remove heat 856 from, the working fluid (not shown) within the vertically adjacent of the lower fluid channel thereby also causing that working fluid to flow in the second, and/or counterclockwise, flow direction (as graphically illustrated by flow arrow 857), i.e., a flow direction that carries the contracting working fluid away from the point (818 in FIG. 158), and/or fluid-channel portion, below the thermal insulation bridging plate 813 where the flow-normal cross-sectional area of the lower fluid channel is maximal, and toward the point (820 in FIG. 158), and/or fluid-channel portion, below the thermal insulation bridging plate 816 where the flow-normal cross-sectional area of the lower fluid channel is minimal.

The thermally-driven flow of working fluid (not shown) through the embodiment's lower fluid channel in the second, and/or counterclockwise, flow direction causes the embodiment to rotate 858 in the opposite, and/or first, clockwise direction.

When a DC electrical power of a second polarity is electrically connected to the embodiment, working fluid (not shown) flowing through that portion of the lower fluid channel which is below, and/or vertically adjacent to, the lower cladding plate 824 flows through what is effectively, and/or operationally, the lower fluid channel's isothermal expansion portion. Working fluid flowing through that portion of the lower fluid channel which is below, and/or vertically adjacent to, the first thermal insulation bridging plate 813 flows through the lower fluid channel's adiabatic expansion portion. Working fluid flowing through that portion of the lower fluid channel which is below, and/or vertically adjacent to, the lower cladding plate 826 flows through what is effectively, and/or operationally, the lower fluid channel's isothermal contraction portion. And, working fluid flowing through that portion of the lower fluid channel which is below, and/or vertically adjacent to, the second thermal insulation bridging plate 816 flows through the lower fluid channel's adiabatic compression portion.

Thus, when energized by a DC electrical power source of a second polarity, both the first (not visible, 822 in FIG. 162) and second (not visible, 823 in FIG. 162) Peltier thermoelectric heat pumps create respective patterns of heating and cooling which cause the working fluid within the lower fluid channel to flow in the same second, and/or counterclockwise, flow direction (as graphically illustrated by flow arrows 855 and 857) in which flows the working fluid within the vertically adjacent upper fluid channel. Thus, when energized by a DC electrical power source of a second polarity, the pattern of heating and cooling created by the first and second Peltier thermoelectric heat pumps causes working fluid in both the upper and lower fluid channels to flow in the same, second, and/or counterclockwise direction, e.g., counterclockwise about the longitudinal axis of the central shaft with respect to a top-down perspective. And, similarly, when energized by a DC electrical power source of a second polarity, the heating and cooling created by the first and second Peltier thermoelectric heat pumps causes the embodiment (800 in FIG. 149-161) to rotate in the same clockwise direction 858 about the longitudinal axis of the central shaft with respect to a top-down perspective (853 in FIG. 165, and 858 in FIG. 166).

By reversing the polarity of the DC electrical power used to energize the embodiment (800 in FIGS. 149-161), the embodiment's direction of rotation can be reversed. By adjusting, changing, and/or controlling, the polarity of the DC electrical power used to energize the embodiment, so too can the embodiment's direction of rotation be adjusted, changed, and/or controlled.

The varieties of embodiments, their geometries, their working fluids, their operations, and their applications, enumerated within the "Summary of the Invention" section of this disclosure apply to the embodiment illustrated and discussed in relation to FIGS. 149-166, and the scope of the present disclosure includes all such variations of the embodiment illustrated in FIGS. 149-166.

Disclosed in this specification, and in FIGS. 149-166, is an electrically-powered thermal motor, comprising: a hermetically-sealed annular chamber divided into vertically adjacent first and second annular fluid-flow channels by an inclined channel separation barrier positioned within the annular chamber, each annular fluid-flow channel having a working fluid therein; a central shaft fixedly attached to the annular chamber; first and second electrical commutators; first and second Peltier thermoelectric heat pumps, fixedly attached to the channel separation barrier at opposite sides of the central shaft, and electrically connected to the first and second electrical commutators; wherein, when energized at the first and second electrical commutators by an electrical power of a first polarity, the first Peltier thermoelectric heat pump warms a vertically adjacent portion of the first annular fluid-flow channel and cools a vertically adjacent portion of the second annular fluid-flow channel, causing the working fluid therein to flow in a first working-fluid-flow direction, and causing the central shaft to rotate in a first shaft-rotational direction, opposite the first working-fluid-flow direction, and the second Peltier thermoelectric heat pump cools a vertically adjacent portion of the first annular fluid-flow channel and warms a vertically adjacent portion of the second annular fluid-flow channel, also causing the working fluid therein to flow in the first working-fluid-flow direction, and also causing the central shaft to rotate in the first shaft-rotational direction; wherein, when energized at the first and second electrical commutators by an electrical power of a second polarity, opposite the first polarity, the first Peltier thermoelectric heat pump cools a vertically adjacent portion of the first annular fluid-flow channel and warms a vertically adjacent portion of the second annular fluid-flow channel, causing the working fluid therein to flow in a second working-fluid-flow direction, opposite the first working-fluid-flow direction, and causing the central shaft to rotate in a second shaft-rotational direction, opposite the first shaft-rotational direction, and the second Peltier thermoelectric heat pump warms a vertically adjacent portion of the first annular fluid-flow channel and cools a vertically adjacent portion of the second annular fluid-flow channel, causing the working fluid therein to flow in the second working-fluid-flow direction, and causing the central shaft to rotate in the second shaft-rotational direction.

FIG. 167 shows a perspective side view of an embodiment 900 of the present disclosure. The embodiment 900 is similar in many respects to the embodiment 800 illustrated in FIGS. 149-166. However, whereas the embodiment 800 uses Peltier thermoelectric heat pumps in order to heat one portion of working fluid in each of its two fluid channels, and chill another portion of working fluid in each of its two fluid channels, the embodiment 900 uses resistive electrical heaters to heat one portion of working fluid in each of its two fluid channels, and it uses passive cooling, augmented with Peltier thermoelectric coolers, to chill another portion of working fluid in each of those two fluid channels. And, embodiment 900 includes, incorporates, and/or utilizes, insulation to reduce the transfer (gain or loss) of thermal energy between the fluid (e.g., atmospheric air) outside the embodiment and the working fluid flowing through the interiors of the quasi-adiabatic compression portions, and the quasi-adiabatic expansion portions, of each of its two fluid channels.

"Quasi-adiabatic" fluid-channel portions and/or sectors are fluid-channel portions in which those fluid-channel portions are partially, but not completely, insulated from the environment, and thermal sink, outside the embodiment. Whereas "[fully-]adiabatic" fluid-channel portions are fully, and/or thoroughly, insulated, "quasi-adiabatic" fluid-channel portions are only partially insulated, so some thermal energy may leak into, or out from, the respective fluid-channel portions.

Embodiment 900 comprises, in part, a central shaft 901 to which is mounted, affixed, and/or rigidly connected, an annular tubular hollow chamber 902. A longitudinal axis of radial symmetry of the annular tubular hollow chamber is coaxial with a longitudinal axis of the central shaft. The annular chamber is rigidly affixed to the central shaft by upper 903 and lower (not visible) mounting plates. The annular chamber has an inner chamber side 904, an outer chamber side 905, an upper chamber side 906, and a lower chamber side (not visible).

Mounted and/or affixed to the upper chamber side 906 are two upper Peltier thermoelectric coolers 907 and 908. Mounted and/or affixed to the lower chamber side (not visible) are two lower Peltier thermoelectric coolers (not visible).

Mounted and/or affixed to the upper chamber side 906 are two upper thermal insulation patches 909 and 910 which inhibit a passage of thermal energy through them, e.g., between the adjacent upper portion of the interior of the annular chamber 902 and the exterior of the embodiment. Mounted and/or affixed to the lower chamber side (not visible) are two lower thermal insulation patches (not visible) which inhibit a passage of thermal energy through them, e.g., between the adjacent lower portion of the interior of the annular chamber 902 and the exterior of the embodiment.

Mounted and/or affixed to the outer chamber side 905 are five annular cooling fins 911-915. These cooling fins dissipate heat conducted to them from an interior of the embodiment's annular chamber 902 to its outer chamber side. As the embodiment rotates, the passage of fluid (e.g., atmospheric air) outside the embodiment tends to remove thermal energy from the cooling fins and thereby expedite a cooling of those fins, and the thermally-connected outer chamber side, which, in turn, tends to expedite the cooling of the interior of the annular chamber.

As the embodiment's annular chamber 902 rotates during the embodiment's operation, so too do the fixedly attached upper 903 and lower (not visible) mounting plates, as well as the central shaft 901, to which the mounting plates are fixedly attached. As the embodiment's central shaft rotates, upper 916 and lower (not visible) shaft bearings enable the embodiment's central shaft (as well as the other parts of the embodiment rigidly connected to the central shaft) to rotate while the embodiment 900 as a whole is rotatably connected to an external non-rotating, and/or differently rotating, mechanical and/or physical structure, framework, apparatus, and/or foundation (not shown), i.e., the interiors, and/or insides, of the embodiment's upper and lower shaft bearings are rotatably connected to the other parts of the embodiment, thereby permitting their rotation within, and/or relative to, the shaft bearings, while the outsides, and/or exteriors, of those shaft bearings may be affixed to an external non-rotating, and/or differently-rotating, mechanical and/or physical structure, framework, apparatus, and/or foundation (not shown).

Mounted to, and/or on, an upper part, and/or portion, of the embodiment's central shaft 901, are three electrical commutators 917-919. As the embodiment's central shaft rotates, so too does each of the embodiment's three commutators. Fixedly attached to an external non-rotating, or differently-rotating, structure, and/or framework, (not shown) are three non-rotating or differently-rotating electrical brushes 920-922.

When a positive direct-current (DC) electrical voltage, of an appropriate current, is electrically connected to electrical brush 920, and a corresponding negative-ground DC electrical voltage, and/or an electrical ground, is electrically connected to electrical brush 921, (and no electrical voltage is connected to electrical brush 922) then a first set of resistive heaters, and Peltier coolers, will be energized, thereby causing the embodiment's annular chamber 902 to rotate in a first, and/or clockwise, direction (relative to a top-down perspective). When a positive direct-current (DC) electrical voltage, of an appropriate current, is electrically connected to electrical brush 922, and a corresponding negative-ground DC electrical voltage, and/or an electrical ground, is electrically connected to electrical brush 921, (and no electrical voltage is connected to electrical brush 920) then a second set of resistive heaters, different from the first set of resistive heaters, and a second set of Peltier coolers, different from the first set of Peltier coolers, will be energized, thereby causing the embodiment's annular chamber 902 to rotate in a second, and/or counterclockwise, direction (relative to a top-down perspective).

FIG. 168 shows a side view of the same embodiment 900 of the present disclosure that is illustrated in FIG. 167.

Upper 916 and lower 923 shaft bearings enable the rotatable connection of the rotating portions of the embodiment, e.g., the annular chamber 902 and the central shaft 901, to an external non-rotating, stationary, and/or differently rotating (e.g., at a different rate of rotation), mechanical fixture, assembly, apparatus, framework, and/or object.

Seen in profile are the two upper thermal insulation patches 909 and 910, as well as one 908 of the embodiment's two upper Peltier thermoelectric coolers, which are mounted to the upper chamber side 906. Mounted to the lower chamber side 924 of the annular chamber 902, and visible in profile, are two lower thermal insulation patches 925 and 926, as well as one 927 of the embodiment's two lower Peltier thermoelectric coolers.

FIG. 169 shows a side view of the same embodiment 900 of the present disclosure that is illustrated in FIGS. 167 and 168.

Mounted to the upper chamber side 906 of the annular chamber 902, and visible in profile, are both of the embodiment's two upper Peltier thermoelectric coolers 907 and 908.

Mounted to the lower chamber side 924 of the annular chamber 902, and visible in profile, are both of the embodiment's two lower Peltier thermoelectric coolers 927 and 928.

FIG. 170 shows a side view of the same embodiment 900 of the present disclosure that is illustrated in FIGS. 167-169.

FIG. 171 shows a side view of the same embodiment 900 of the present disclosure that is illustrated in FIGS. 167-170.

FIG. 172 shows a top-down view of the same embodiment 900 of the present disclosure that is illustrated in FIGS. 167-171.

FIG. 173 shows a bottom-up view of the same embodiment 900 of the present disclosure that is illustrated in FIGS. 167-172. The annular chamber is rigidly affixed to the central shaft by upper (not visible, 903 in FIG. 167) and lower 929 mounting plates.

Visible in FIG. 173 are the embodiment's two lower thermal insulation patches 925 and 926, as well the embodiment's two lower Peltier thermoelectric coolers 927 and 928.

FIG. 174 shows a top-down sectional view of the same embodiment 900 of the present disclosure that is illustrated in FIGS. 167-173 wherein the horizontal section plane is specified in FIG. 168 and the section is taken across line 174-174. In the illustration of FIG. 174, only the annular chamber 902 has been sectioned, thereby removing the upper chamber side 906 of that annular chamber, as well as the two upper (909 and 910 in FIG. 168) thermal patches and the two upper Peltier thermoelectric coolers (907 and 908 in FIG. 168) that are fixedly attached to that upper chamber side, thereby revealing the interior of the embodiment's upper of two annular fluid channels. The upper annular fluid channel is bounded, enclosed, encased, and/or isolated, in part, by the embodiment's channel separation barrier which is comprised of first 930 and second 931 resistive electrical heaters, e.g., comprised of electrical resistors in series and embedded within a thermally-conductive substrate, and/or matrix.

Separating the first 930 and second 931 resistive electrical heaters are first 932 and second 933 thermal insulation bridges. Each thermal insulation bridge is a thickened portion of a thermally insulating foundation to which the upper and lower resistive elements are mounted, affixed, and/or attached, and which thermally insulating foundation comprises the foundation of the channel separation barrier.

The two thermal insulation bridges 932 and 933 are thermally insulating and create, within the upper and lower fluid channels, quasi-adiabatic expansion, and quasi-adiabatic compression, portions within each respective fluid channel. A quasi-adiabatic expansion portion created on an upper or lower side of one of the embodiment's two thermal insulation bridges, is complemented by a corresponding, and vertically adjacent, quasi-adiabatic compression channel portion created by the same thermal insulation bridge on the respective, vertically adjacent, and vertically opposing (lower or upper) side of the respective thermal insulation bridge.

A first operational configuration of the embodiment is created, and/or established, when a positive direct-current (DC) electrical voltage, of an appropriate current, is electrically connected to electrical brush 920, and a corresponding negative-ground DC electrical voltage, or an electrical ground, is electrically connected to electrical brush (not visible, 921 in FIG. 167), (and no electrical voltage is connected to electrical brush—not visible, 922 in FIG. 167).

A second operational configuration of the embodiment is created, and/or established, when a positive direct-current (DC) electrical voltage, of an appropriate current, is electrically connected to electrical brush 922, and a corresponding negative-ground DC electrical voltage, or an electrical ground, is electrically connected to electrical brush (not visible, 921 in FIG. 167), (and no electrical voltage is connected to electrical brush—not visible, 920 in FIG. 167).

When the embodiment 900 is in the first operational configuration, the resistive electrical heater 930 is energized by the electrical power supplied through electrical brushes 920 and 921, and therefore creates heat, and/or thermal energy, which is then imparted to working fluid (not shown) flowing thereover. When the embodiment 900 is in the first operational configuration, the resistive electrical heater 931 is not energized, and therefore does not impart heat, and/or thermal energy, to working fluid flowing thereover. When the embodiment 900 is in the first operational configuration, working fluid flowing within the upper fluid channel flows in a first, and/or clockwise, working-fluid-flow direction with respect to a top-down perspective (such as the perspective of FIG. 174). And, as a consequence of the clockwise flow of the working fluid through the upper fluid channel, the annular chamber 902, the upper 903 and lower (not visible, 929 in FIG. 173) mounting plates, and the central shaft 901 rotate in a first, and/or counterclockwise, shaft-rotational direction with respect to a top-down perspective.

When the embodiment 900 is in the second operational configuration, the resistive electrical heater 931 is energized by the electrical power supplied through electrical brushes 921 and 922, and therefore creates heat, and/or thermal energy, which is then imparted to working fluid flowing thereover. When the embodiment 900 is in the second operational configuration, the resistive electrical heater 930 is not energized, and therefore does not impart heat, and/or thermal energy, to working fluid flowing thereover. When the embodiment 900 is in the second operational configuration, working fluid flowing within the upper fluid channel flows in a second, and/or counterclockwise, working-fluid-flow direction with respect to a top-down perspective. And, as a consequence of the counterclockwise flow of the working fluid, the annular chamber 902, the upper 903 and lower (not visible, 929 in FIG. 173) mounting plates, and the central shaft 901 rotate in a second, and/or clockwise, shaft-rotational direction with respect to a top-down perspective.

FIG. 175 shows a perspective view of the same top-down sectional view illustrated in FIG. 174, which is a top-down sectional view of the same embodiment 900 of the present disclosure that is illustrated in FIGS. 167-173 wherein the horizontal section plane is specified in FIG. 168 and the section of the embodiment's annular chamber 902 is taken across line 174-174.

FIG. 176 shows a side sectional view of the same embodiment 900 of the present disclosure that is illustrated in FIGS. 167-175 wherein the vertical section plane is specified in FIGS. 172-174 and the section is taken across line 176-176.

The annular chamber 902 includes, incorporates, encases, and/or surrounds, two annular fluid-flow channels through each of which a working fluid (not shown) flows. The annular chamber comprises upper and lower fluid-flow channels. Each fluid-flow channel has four portions, zones, regions, parts, and/or segments. The four portions of each continuous, and fluidly-interconnected fluid-flow channel, confines the flow of the working fluid while altering its pressure and volume per unit working-fluid mass. Working fluid flowing through each of the upper and lower fluid-flow channels flows through, and is altered by its passage through: an isothermal expansion portion in which the working fluid is heated, causing its volume per unit of working-fluid mass to expand, and/or causing its mass per unit working-fluid volume, i.e., its density, to decrease, and also causing its pressure to decrease; which is followed by the heated working fluid's passage through a quasi-adiabatic expansion portion in which heated working fluid continues expanding but does so quasi-adiabatically, i.e., without receiving or losing any thermal energy, causing the working fluid's volume to increase, while also causing its pressure to decrease; which is followed by the working fluid's passage through an isothermal contraction portion in which thermal energy is removed from the working fluid causing its volume to decrease, while also causing its pressure to increase; which is followed by the working fluid's passage through a quasi-adiabatic compression portion in which the centrifugal forces imposed on the working fluid by the rotation of the embodiment's annular chamber does work on the working fluid, thereby mechanically compressing the working fluid, and causing its pressure and density to increase, while also causing its volume to decrease; which is followed by its return to the isothermal expansion portion of the same fluid-flow channel, and its repetition of that thermodynamically-orchestrated flow cycle.

Visible in FIG. 176, and vertically separated by the first thermal insulation bridge 932 of the channel separation barrier is the quasi-adiabatic compression portion 934 of the upper fluid channel and the quasi-adiabatic expansion portion 935 of the lower fluid channel. Also visible in FIG. 176, and vertically separated by the second thermal insulation bridge 933 of the channel separation barrier is the quasi-adiabatic expansion portion 936 of the upper fluid channel and the quasi-adiabatic compression portion 937 of the lower fluid channel. These four fluid channel portions characterize both the embodiment's first and second operational configurations, i.e., whether the working fluid in the upper and lower fluid channels flows through these annular fluid-flow channels, and/or rotates, in a first, and/or clockwise, working-fluid-flow direction (with respect to a top-down perspective) or in a second, and/or counterclockwise, working-fluid-flow direction (with respect to a top-down perspective).

The embodiment's five circular, and/or annular, cooling fins 911-915 dissipate thermal energy imparted to the thermally-conductive walls of the annular chamber 902. They provide cooling throughout the upper and lower fluid channels (hence the "quasi-adiabatic" nature of the associated expansion and compression fluid-channel portions). However, despite this generalized cooling, the thermal gradients responsible for the rotation of the embodiment's annular chamber remain effective and cause the annular chamber to rotate when the embodiment is configured in its first or second operational configuration, and appropriate electrical energy, e.g., of an appropriate polarity, is imparted to the appropriate configuration-specific electrical brushes.

Note that the vertical, and/or flow-normal (relative to a plane normal to the direction of working-fluid flow), cross-sectional areas of the quasi-adiabatic compression portions 934 and 937 are significantly smaller than the respective flow-normal cross-sectional areas of the complementary quasi-adiabatic expansion portions 935 and 936. The flow-normal cross-sectional area of each of the upper and lower fluid-flow channels increases from a minimal flow-normal cross-sectional area at the center of the respective quasi-adiabatic compression fluid-channel portion to a maximal flow-normal cross-sectional area at the center of the respective quasi-adiabatic expansion fluid-channel portion. This non-uniformity in the flow-normal cross-sectional areas characteristic of each of the upper and lower fluid channels, in combination with the heating and cooling within each fluid channel, creates a diodicity which causes the working fluid within each isothermal expansion portion of each fluid channel to flow away from the respective, and volumetrically constrictive, quasi-adiabatic compression portion, and toward the respective, and volumetrically spacious, quasi-adiabatic expansion portion, and likewise causes the working fluid within each isothermal contraction portion of each fluid channel to flow away from the respective, and volumetrically spacious, quasi-adiabatic expansion portion, and toward the respective, and volumetrically constrictive, quasi-adiabatic compression portion.

The geometric configuration of each of the lower fluid channels is the equivalent of a vertically inverted, and rotated, and/or relatively angularly offset, by 180 degrees, copy of the upper fluid channel. As a result, each fluid channel's quasi-adiabatic compression portion is on an opposite lateral, and/or radial, side of the annular chamber 902. Also as a complementary result, the heat generated by the respective upper and lower resistive electrical heaters is applied to each of the upper and lower fluid channels at opposite sides of the annular chamber. Therefore, despite the relatively inverted nature of their respective geometries, the working fluid within each of the upper and lower fluid channels rotates in the same direction, with respect to each of the first and second operational configurations.

FIG. 177 shows a perspective view of the same side sectional view illustrated in FIG. 176, which is a side sectional view of the same embodiment 900 of the present disclosure that is illustrated in FIGS. 167-175 wherein the vertical section plane is specified in FIGS. 172-174 and the section is taken across line 176-176.

FIG. 178 shows a side sectional view of the same embodiment 900 of the present disclosure that is illustrated in FIGS. 167-177 wherein the vertical section plane is specified in FIGS. 172-174 and the section is taken across line 178-178.

The embodiment's channel separation barrier is a flat, planar, and disk-like, structure that is positioned at an inclined angle within the interior of the annular chamber. The channel separation barrier divides the interior of the annular chamber 902 into upper and lower fluid-flow channels. The upper and lower fluid-flow channels within the embodiment's annular chamber 902 are vertically separated, bounded, enclosed, encased, and/or isolated, by the embodiment's channel separation barrier. In the embodiment 900, the upper and lower fluid-flow channels are not fluidly connected.

The embodiment's channel separation barrier comprises a single, foundational, annular disk of a thermal insulating material, wall, plate, and/or substance. However, the embodiment's channel separation barrier comprises four distinct structural portions, zones, and/or segments, each of which is associated with a structural, functional, and/or thermodynamic, difference within that respective portion of the shared foundational channel separation barrier. At opposite sides of the channel separation barrier are the first (932 in FIG. 177) and second (933 in FIG. 177) thermal insulation bridges. Each thermal insulation bridge being a thickened region of the channel separation barrier which prevents thermal energy from traveling, moving, flowing, and/or being conducted, vertically between the upper and lower fluid channels. Between the thermal insulation bridges, and similarly at opposite sides of the channel separation barrier are "heat-emitting" segments of the channel separation barrier.

A first heat-emitting segment is comprised of an upper resistive electrical heater 930 and a lower resistive electrical heater 938 affixed to vertically opposite sides of the medial thermal insulating disk 939 of the channel separation barrier. A second heat-emitting segment is comprised of an upper resistive electrical heater 931 and a lower resistive electrical heater 940 affixed to vertically opposite sides of the medial thermal insulating disk 939 of the channel separation barrier.

When the embodiment is operating in a first operational configuration, a positive DC electrical voltage of an appropriate current, is electrically connected to commutator 917, by corresponding electrical brush (not visible, 920 in FIG. 177), and a corresponding negative-ground DC electrical voltage, or an electrical ground, is electrically connected to commutator 918, by corresponding electrical brush (not visible, 921 in FIG. 177) (and no electrical voltage, and/or negative-ground, is connected to commutator 919, and/or to electrical brush 922 in FIG. 177). When the embodiment is operating in a first operational configuration, a portion of the electrical power imparted to the embodiment through commutators 917 and 918 energizes resistive electrical heater 930, and Peltier thermoelectric cooler 908. When the embodiment is operating in a first operational configuration, the resistive electrical heater 931, and Peltier thermoelectric cooler 907, remain unenergized.

The creation of heat by the resistive electrical heater 930 heats working fluid (not shown) within the respective overlying portion of the upper fluid-flow channel, and the removal of heat by the Peltier thermoelectric cooler 908 within the respective underlying portion of the upper fluid-flow channel, causes working fluid within the upper fluid-flow channel to flow in a first, and/or clockwise, working-fluid-flow direction with respect to a top-down perspective. In the first operational configuration, the portion 941 of the upper fluid channel vertically adjacent to, and in fluid and thermal contact with, the resistive electrical heater 930, wherein working fluid is heated and caused to expand, functions as the isothermal expansion portion of the upper fluid-flow channel, and the portion 942 of the upper fluid channel vertically adjacent to, and below, the Peltier thermoelectric cooler 908, wherein working fluid is cooled and caused to contract, functions as the isothermal contraction portion of the upper fluid-flow channel.

Similarly, when the embodiment is operating in a first operational configuration, a portion of the electrical power imparted to the embodiment through commutators 917 and 918 energizes resistive electrical heater 940, and Peltier thermoelectric cooler 928. When the embodiment is operating in a first operational configuration, the resistive electrical heater 938, and Peltier thermoelectric cooler 927, remain unenergized.

The creation of heat by the resistive electrical heater 940 heats working fluid (not shown) within the respective underlying portion of the lower fluid-flow channel, and the removal of heat by the Peltier thermoelectric cooler 928 within the respective overlying portion of the lower fluid-flow channel, causes working fluid within the lower fluid-flow channel to flow in the same first, and/or clockwise, working-fluid-flow direction (with respect to a top-down perspective) as flows the working fluid in the upper fluid channel. In the first operational configuration, the portion 943 of the lower fluid channel vertically adjacent to the resistive electrical heater 940, wherein working fluid is heated and caused to expand, functions as the isothermal expansion portion of the lower fluid-flow channel, and the portion 944 of the lower fluid channel vertically adjacent to the Peltier thermoelectric cooler 928, wherein working fluid is cooled and caused to contract, functions as the isothermal contraction portion of the lower fluid-flow channel.

When the embodiment is operating in a second operational configuration, a positive DC electrical voltage of an appropriate current, is electrically connected to commutator 919, by corresponding electrical brush (not visible, 922 in FIG. 177) and a corresponding negative-ground DC electrical voltage, or an electrical ground, is electrically connected to commutator 918, by corresponding electrical brush (not visible, 921 in FIG. 177) (and no electrical voltage, and/or negative-ground, is connected to commutator 917, and/or to electrical brush 920 in FIG. 177). When the embodiment is operating in a second operational configuration, a portion of that electrical power energizes resistive electrical heater 931, and Peltier thermoelectric cooler 907. When the embodiment is operating in a second operational configuration, the resistive electrical heater 930, and Peltier thermoelectric cooler 908, remain unenergized.

The creation of heat by the resistive electrical heater 931 heats working fluid (not shown) within the respective overlying portion of the upper fluid channel, and the removal of heat by the Peltier thermoelectric cooler 907 within the respective underlying portion of the upper fluid channel, causes working fluid within the upper fluid channel to flow in a second, and/or counterclockwise, working-fluid-flow direction with respect to a top-down perspective. In the second operational configuration, the portion 942 of the upper fluid channel vertically adjacent to the resistive electrical heater 931, wherein working fluid is heated and caused to expand, functions as the isothermal expansion portion of the upper fluid channel, and the portion 941 of the upper fluid channel vertically adjacent to the Peltier thermoelectric cooler 907, wherein working fluid is cooled and caused to contract, functions as the isothermal contraction portion of the upper fluid channel.

Similarly, when the embodiment is operating in a second operational configuration, a portion of the electrical power received through commutators 919 and 918 energizes resistive electrical heater 938, and Peltier thermoelectric cooler 927. When the embodiment is operating in a second operational configuration, the resistive electrical heater 940, and Peltier thermoelectric cooler 928, remain unenergized.

The creation of heat by the resistive electrical heater 938 heats working fluid (not shown) within the respective underlying portion of the lower fluid channel, and the removal of heat by the Peltier thermoelectric cooler 927 within the respective overlying portion of the lower fluid channel, causes working fluid within the lower fluid channel to flow in the same second, and/or counterclockwise, working-fluid-flow direction (with respect to a top-down perspective) as does the working fluid in the upper fluid channel. In the second operational configuration, the portion 944 of the lower fluid channel vertically adjacent to the resistive electrical heater 938, wherein working fluid is heated and caused to expand, functions as the isothermal expansion portion of the lower fluid channel, and the portion 943 of the lower fluid channel vertically adjacent to the Peltier thermoelectric cooler 927, wherein working fluid is cooled and caused to contract, functions as the isothermal contraction portion of the lower fluid channel.

FIG. 179 shows a perspective view of the same side sectional view illustrated in FIG. 178, which is a side sectional view of the same embodiment 900 of the present disclosure that is illustrated in FIGS. 167-177 wherein the vertical section plane is specified in FIGS. 172-174 and the section is taken across line 178-178.

FIG. 180 is an illustration of the embodiment's channel separation barrier in isolation from the rest of the embodiment. FIG. 180 includes the central shaft 901 for visual perspective and orientation. In the full embodiment (900 in FIG. 167), the channel separation barrier separates the interior of the annular chamber (902 in FIG. 167) into fluidly isolated upper and lower fluid channels.

The embodiment's channel separation barrier comprises first 932 and second 933 thermal insulation bridges at opposite sides of the channel separation barrier. Each thermal insulation bridge is a thickened portion of a thermally insulating foundation 939 of which the entire channel separation barrier is comprised in part. The embodiment's channel separation barrier further comprises first and second heat-emitting segments. The first heat-emitting segment is comprised of upper 930 and a lower 938 resistive electrical heaters, each mounted and/or affixed to vertically opposite sides, and/or to a vertically medial layer, of the same thermally insulating foundation of which the thermal insulation bridges are comprised. Likewise, the second heat-emitting segment is comprised of upper 931 and a lower 940 resistive electrical heaters, each mounted and/or affixed to vertically opposite sides, and/or to a vertically medial layer, of the same thermally insulating foundation of which the thermal insulation bridges are comprised.

The upper 930 and lower 938 resistive electrical heaters of the first heat-emitting segment, as well as the upper 931 and lower 940 resistive electrical heaters of the second heat-emitting segment, are vertically separated in the illustration of FIG. 180 to facilitate their viewing and examination. In an operational configuration of the embodiment 900, the heat emitting segments are vertically compact unlike their illustration in FIG. 180.

FIG. 181 shows a perspective top-down sectional view of the same embodiment 900 of the present disclosure that is illustrated in FIGS. 167-179 wherein the horizontal section plane is specified in FIG. 168 and the section is taken across line 174-174. In the illustration of FIG. 181, only the annular chamber 902 has been sectioned, thereby removing the upper chamber side 906 of that annular chamber, and thereby revealing the interior of the embodiment's upper of two fluid channels.

The upper fluid channel is bounded, enclosed, encased, and/or isolated, in part, by the embodiment's channel separation barrier which is comprised of first 930 and second 931 resistive electrical heaters, e.g., comprised of electrical resistors in series and embedded within a thermally-conductive substrate, and/or matrix, that is affixed to an upper surface of the thermally insulating foundation of the embodiment's channel separation barrier. In the illustration of FIG. 181, despite the sectioned removal of the upper chamber side 906, the two upper thermal insulation patches 909 and 910, as well as the two upper Peltier thermoelectric coolers 907 and 908, are included within the illustration of FIG. 181, and are rendered transparently in order to permit the illustration of working-fluid flow beneath those overlying, and/or superficial, elements.

FIG. 181 illustrates the upper channel of an embodiment manifesting, executing, and/or operating in, the first operational configuration. Electrical power from an external power source is provided to the embodiment through an electrical circuit through the commutators 917 and 918 (via electrical brushes 920 and 921, respectively). Commutator 919 is not electrically connected to an external electrical power source.

The electrical power supplied via commutators 917 and 918 energizes resistive electrical heater 930 causing it to produce thermal energy, and/or heat, which is then imparted to a working fluid (not shown) within a portion of the upper fluid-flow channel overlying that resistive electrical heater and causing that heated working fluid to expand and flow 945 in a first, and/or clockwise, working-fluid-flow direction (with respect to a top-down perspective). The electrical power supplied via commutators 917 and 918 also energizes Peltier thermoelectric cooler 908 which then removes thermal energy, and/or cools, the working fluid (not shown) within a portion of the upper fluid-flow channel underlying, and vertically adjacent to, that Peltier thermoelectric cooler and causing that cooled working fluid to contract and to continue flowing 946 in the first, and/or clockwise, working-fluid-flow direction (with respect to a top-down perspective). Additional thermal energy is removed from the working fluid in the portion of the upper fluid-flow channel underlying, and vertically adjacent to, the Peltier thermoelectric cooler 908 through a conduction of thermal energy from the working fluid into the inner 904 and outer 905 side walls, and the cooling fins, e.g., 911, and therethrough into the fluid thermal sink (e.g., atmospheric air) outside the embodiment.

Relatively cold working fluid (not shown) flows 946 from what is effectively and operationally the isothermal contraction portion of the upper fluid-flow channel and then undergoes a quasi-adiabatic compression within the portion of the upper fluid-flow channel vertically beneath, and/or adjacent to, the upper thermal patch 909. The upper thermal patch 909 reduces the amount of thermal energy that is able to enter, and/or escape from, the quasi-adiabatic compression portion of the upper fluid-flow channel through the vertically adjacent overlying portion of the upper chamber side 906 of the annular chamber (902 in FIG. 167).

Relatively hot working fluid (not shown) flows 945 from what is effectively and operationally the isothermal expansion portion of the upper fluid-flow channel and then undergoes a quasi-adiabatic expansion within the portion of the upper fluid-flow channel vertically beneath, and/or adjacent to, the upper thermal patch 910. The upper thermal patch 910 reduces the amount of thermal energy that is able to escape the quasi-adiabatic expansion portion of the upper fluid-flow channel through the vertically adjacent overlying portion of the upper chamber side 906 of the annular chamber (902 in FIG. 167).

FIG. 182 shows a perspective bottom-up sectional view of the same embodiment 900 of the present disclosure that is illustrated in FIGS. 167-179 wherein the horizontal section plane is specified in FIG. 168 and the section is taken across line 182-182. In the illustration of FIG. 182, only the annular chamber 902 has been sectioned, thereby removing the lower chamber side 924 of that annular chamber, and thereby revealing the interior of the embodiment's lower of two fluid-flow channels.

The lower fluid-flow channel is bounded, enclosed, encased, and/or isolated, in part, by the embodiment's channel separation barrier which is comprised of first 940 and second 938 resistive electrical heaters, e.g., comprised of electrical resistors in series and embedded within a thermally-conductive substrate, and/or matrix, that is affixed to a lower surface of the thermally insulating foundation of the embodiment's channel separation barrier. In the illustration of FIG. 182, despite the sectioned removal of the lower chamber side 924, the two lower thermal insulation patches 925 and 926, as well as the two lower Peltier thermoelectric coolers 927 and 928, are included within the illustration of FIG. 182, and are rendered transparently in order to permit the illustration of working-fluid flow beneath those underlying elements.

FIG. 182 illustrates the lower channel of an embodiment manifesting, executing, and/or operating, in the first operational configuration. Electrical power from an external power source is provided to the embodiment through an electrical circuit through the commutators 917 and 918 (via electrical brushes 920 and 921, respectively). Commutator 919 is not electrically connected to an external electrical power source.

The electrical power supplied via commutators 917 and 918 energizes resistive electrical heater 940 causing it to produce thermal energy, and/or heat, which is then imparted to a working fluid (not shown) within a portion of the lower fluid-flow channel underlying that resistive electrical heater and causing that heated working fluid to expand and flow 947 in the first, and/or clockwise, working-fluid-flow direction (with respect to a top-down perspective). The electrical power supplied via commutators 917 and 918 also energizes Peltier thermoelectric cooler 928 which then removes thermal energy, and/or cools, the working fluid (not shown) within a portion of the lower fluid-flow channel overlying, and vertically adjacent to, that Peltier thermoelectric cooler and causing that cooled working fluid to contract and to continue flowing 948 in the first, and/or clockwise, working-fluid-flow direction (with respect to a top-down perspective). Additional thermal energy is removed from the working fluid in the portion of the lower fluid-flow channel overlying, and vertically adjacent to, the Peltier thermoelectric cooler 928 through a conduction of thermal energy from the working fluid into the inner 904 and outer 905 side walls, and the cooling fins, e.g., 915, and therethrough into the fluid thermal sink (e.g., atmospheric air) outside the embodiment.

Relatively cold working fluid (not shown) flows 948 from what is effectively and operationally the isothermal contraction portion of the lower fluid-flow channel and then undergoes a quasi-adiabatic compression within the portion of the lower fluid-flow channel vertically above, and/or adjacent to, the lower thermal patch 926. The lower thermal patch 926 reduces the amount of thermal energy that is able to enter, and/or escape from, the quasi-adiabatic compression portion of the lower fluid-flow channel through the vertically adjacent underlying portion of the lower chamber side 924 of the annular chamber (902 in FIG. 167).

Relatively hot working fluid (not shown) flows 947 from what is effectively and operationally the isothermal expansion portion of the lower fluid-flow channel and then undergoes a quasi-adiabatic expansion within the portion of the lower fluid-flow channel vertically above, and/or adjacent to, the lower thermal patch 925. The lower thermal patch 925 reduces the amount of thermal energy that is able to escape the quasi-adiabatic expansion portion of the lower fluid-flow channel through the vertically adjacent underlying portion of the lower chamber side 924 of the annular chamber (902 in FIG. 167).

FIG. 183 shows a perspective top-down sectional view of the same embodiment 900 of the present disclosure that is illustrated in FIGS. 167-179 wherein the horizontal section plane is specified in FIG. 168 and the section is taken across line 174-174. In the illustration of FIG. 183, only the annular chamber 902 has been sectioned, thereby removing the upper chamber side 906 of that annular chamber, and thereby revealing the interior of the embodiment's upper of two fluid-flow channels.

The upper fluid-flow channel is bounded, enclosed, encased, and/or isolated, in part, by the embodiment's channel separation barrier which is comprised of first 930 and second 931 resistive electrical heaters, e.g., comprised of electrical resistors in series and embedded within a thermally-conductive substrate, and/or matrix, that is affixed to an upper surface of the thermally insulating foundation of the embodiment's channel separation barrier. In the illustration of FIG. 183, despite the sectioned removal of the upper chamber side 906, the two upper thermal insulation patches 909 and 910, as well as the two upper Peltier thermoelectric coolers 907 and 908, are included within the illustration of FIG. 183, and are rendered transparently in order to permit the illustration of working-fluid flow beneath those overlying, and/or superficial, elements.

FIG. 183 illustrates the upper fluid-flow channel of an embodiment manifesting, executing, and/or operating, in the second operational configuration. Electrical power from an external power source is provided to the embodiment through an electrical circuit through the commutators 919 and 918 (via electrical brushes 922 and 921, respectively). Commutator 917 is not electrically connected to an external electrical power source.

The electrical power supplied via commutators 919 and 918 energizes resistive electrical heater 931 causing it to produce thermal energy, and/or heat, which is then imparted to a working fluid (not shown) within a portion of the upper fluid-flow channel overlying that resistive electrical heater causing that heated working fluid to expand and flow 949 in a second, and/or counterclockwise, working-fluid-flow direction (with respect to a top-down perspective). The electrical power supplied via commutators 919 and 918 also energizes Peltier thermoelectric cooler 907 which then removes thermal energy, and/or cools, the working fluid (not shown) within a portion of the upper fluid-flow channel underlying, and vertically adjacent to, that Peltier thermoelectric cooler and causing that cooled working fluid to contract and to continue flowing 950 in the second, and/or counterclockwise, working-fluid-flow direction (with respect to a top-down perspective). Additional thermal energy is removed from the working fluid in the portion of the upper fluid channel underlying, and vertically adjacent to, the Peltier thermoelectric cooler 907 through a conduction of thermal energy from the working fluid into the inner 904 and outer 905 side walls, and the cooling fins, e.g., 911, and therethrough into the fluid thermal sink (e.g., atmospheric air) outside the embodiment.

Relatively cold working fluid (not shown) flows 950 from what is effectively and operationally the isothermal contraction portion of the upper fluid-flow channel and then undergoes a quasi-adiabatic compression within the portion of the upper fluid-flow channel vertically beneath, and/or adjacent to, the upper thermal patch 909. The upper thermal patch 909 reduces the amount of thermal energy that is able to enter, and/or escape from, the quasi-adiabatic compression portion of the upper fluid channel through the vertically adjacent overlying portion of the upper chamber side 906 of the annular chamber (902 in FIG. 167).

Relatively hot working fluid (not shown) flows 949 from what is effectively and operationally the isothermal expansion portion of the upper fluid-flow channel and then undergoes a quasi-adiabatic expansion within the portion of the upper fluid-flow channel vertically beneath, and/or adjacent to, the upper thermal patch 910. The upper thermal patch 910 reduces the amount of thermal energy that is able to escape the quasi-adiabatic expansion portion of the upper fluid-flow channel through the vertically adjacent overlying portion of the upper chamber side 906 of the annular chamber (902 in FIG. 167).

FIG. 184 shows a perspective bottom-up sectional view of the same embodiment 900 of the present disclosure that is illustrated in FIGS. 167-179 wherein the horizontal section plane is specified in FIG. 168 and the section is taken across line 182-182. In the illustration of FIG. 184, only the annular chamber 902 has been sectioned, thereby removing the lower chamber side 924 of that annular chamber, and thereby revealing the interior of the embodiment's lower of two fluid-flow channels.

The lower fluid-flow channel is bounded, enclosed, encased, and/or isolated, in part, by the embodiment's channel separation barrier which is comprised of first 940 and second 938 resistive electrical heaters, e.g., comprised of electrical resistors in series and embedded within a thermally-conductive substrate, and/or matrix, that is affixed to a lower surface of the thermally insulating foundation of the embodiment's channel separation barrier. In the illustration of FIG. 184, despite the sectioned removal of the lower chamber side 924, the two lower thermal insulation patches 925 and 926, as well as the two lower Peltier thermoelectric coolers 927 and 928, are included within the illustration of FIG. 184, and are rendered transparently in order to permit the illustration of working-fluid flow beneath those underlying elements.

FIG. 184 illustrates the lower channel of an embodiment manifesting, executing, and/or operating, in the second operational configuration. Electrical power from an external power source is provided to the embodiment through an electrical circuit through the commutators 919 and 918 (via electrical brushes 922 and 921, respectively). Commutator 917 is not electrically connected to an external electrical power source.

The electrical power supplied via commutators 919 and 918 energizes resistive electrical heater 938 causing it to produce thermal energy, and/or heat, which is then imparted to a working fluid (not shown) within a portion of the lower fluid-flow channel underlying that resistive electrical heater and causing that heated working fluid to expand and flow 951 in the second, and/or counterclockwise, working-fluid-flow direction (with respect to a top-down perspective). The electrical power supplied via commutators 919 and 918 also energizes Peltier thermoelectric cooler 927 which then removes thermal energy, and/or cools, the working fluid (not shown) within a portion of the lower fluid-flow channel overlying, and vertically adjacent to, that Peltier thermoelectric cooler and causing that cooled working fluid to contract and to continue flowing 952 in the second, and/or counterclockwise, working-fluid-flow direction (with respect to a top-down perspective). Additional thermal energy is removed from the working fluid in the portion of the lower fluid-flow channel overlying, and vertically adjacent to, the Peltier thermoelectric cooler 927 through a conduction of thermal energy from the working fluid into the inner 904 and outer 905 side walls, and the cooling fins, e.g., 915, and therethrough into the fluid thermal sink (e.g., atmospheric air) outside the embodiment.

Relatively cold working fluid (not shown) flows 952 from what is effectively and operationally the isothermal contraction portion of the lower fluid-flow channel and then undergoes a quasi-adiabatic compression within the portion of the lower fluid-flow channel vertically above, and/or adjacent to, the lower thermal patch 926. The lower thermal patch 926 reduces the amount of thermal energy that is able to enter, and/or escape from, the quasi-adiabatic compression portion of the lower fluid-flow channel through the vertically adjacent underlying portion of the lower chamber side 924 of the annular chamber (902 in FIG. 167).

Relatively hot working fluid (not shown) flows 951 from what is effectively and operationally the isothermal expansion portion of the lower fluid-flow channel and then undergoes a quasi-adiabatic expansion within the portion of the lower fluid-flow channel vertically above, and/or adjacent to, the lower thermal patch 925. The lower thermal patch 925 reduces the amount of thermal energy that is able to escape the quasi-adiabatic expansion portion of the lower fluid-flow channel through the vertically adjacent underlying portion of the lower chamber side 924 of the annular chamber (902 in FIG. 167).

In the embodiment illustrated in FIGS. 167-184, the walls of the annular chamber 902 are comprised of a thermally-conductive material, albeit with overlaid thermal insulation patches. However, in another embodiment similar to the embodiment illustrated in FIGS. 167-184, the walls of the portions, and/or parts, of the annular chamber surrounding the isothermal expansion, and vertically adjacent isothermal contraction, portions of the fluid channels are fabricated, constructed, and/or comprised, of a thermally-conductive material, while the walls of the portions, and/or parts, of the annular chamber surrounding the quasi-adiabatic expansion, and vertically adjacent quasi-adiabatic compression, portions of the fluid channels are fabricated, constructed, and/or comprised, of a thermally insulating material (thereby eliminating the need for separate and/or additional thermal insulation patches).

The varieties of embodiments, their geometries, their working fluids, their operations, and their applications, enumerated within the "Summary of the Invention" section of this disclosure apply to the embodiment illustrated and discussed in relation to FIGS. 167-184, and the scope of the present disclosure includes all such variations of the embodiment illustrated in FIGS. 167-184.

Disclosed in this specification, and in FIGS. 167-184, is an electrically-powered thermal motor, comprising: a hermetically-sealed annular chamber divided into vertically adjacent upper and lower annular fluid-flow channels by an inclined channel separation barrier positioned within the annular chamber, the inclined channel separation barrier creating upper and lower channel constrictions at radially opposite sides of the first and second annular fluid-flow channels, with each annular fluid-flow channel having a working fluid therein; first, second, and third, electrical commutators; first and second upper electrical resistive heaters affixed to opposite radial sides of an upper side of the channel separation barrier, and positioned equal distances from the upper constriction; first and second lower electrical resistive heaters affixed to opposite radial sides of a lower side of the channel separation barrier, and positioned equal distances from the lower constriction, with the first lower electrical resistive heater being vertically adjacent to the first upper electrical resistive heater, and with the second lower electrical resistive heater being vertically adjacent to the second upper electrical resistive heater; first and second upper Peltier thermoelectric coolers positioned to be adjacent to the upper annular fluid-flow channel, and to be adjacent to the first and second upper electrical resistive heaters, respectively; first and second lower Peltier thermoelectric coolers positioned to be adjacent to the lower annular fluid-flow channel, and to be adjacent to the first and second lower electrical resistive heaters, respectively; wherein the first upper electrical resistive heater, the second upper Peltier thermoelectric cooler, the second lower electrical resistive heater, and the first lower Peltier thermoelectric cooler, are energized by electrical power applied to the first and second electrical commutators; and, wherein the second upper electrical resistive heater, the first upper Peltier thermoelectric cooler, the first lower electrical resistive heater, and the second lower Peltier thermoelectric cooler, are energized by electrical power applied to the second and third electrical commutators.

FIG. 185 shows a semi-transparent perspective side view of a modified version of the same embodiment 100 of the present disclosure that is illustrated in FIGS. 1-8. Interior features of the embodiment are displayed as dotted lines, and are provided to reveal the internal structure, geometry, and/or design, of the modified version of the embodiment. Unlike the unmodified version of the embodiment 100 illustrated in FIGS. 1-8, the modified version of the embodiment 100 illustrated in FIG. 185 contains internal radial fins, e.g., 953 and 955, inside the isothermal expansion portion 101, and inside the isothermal contraction portion 103, of its toroidal fluid channel.

The radial fins, e.g., 953 and 954, within the isothermal expansion portion 101 of the embodiment's toroidal fluid channel, increase the surface area across, and/or through, which heat 109 received from outside the embodiment may convectively flow into the working fluid (not shown) flowing through that portion of the toroidal fluid channel, thereby tending to improve the rapidity, and/or efficiency, with which the embodiment converts thermal energy differences to mechanical (rotary) power.

The radial fins, e.g., 955 and 956, within the isothermal contraction portion 103 of the embodiment's toroidal fluid channel increase the surface area across, and/or through, which heat 121 is removed from the working fluid (not shown) flowing therethrough and is then transmitted to a cold sink outside the embodiment, thereby tending to improve the rapidity, and/or efficiency, with which the embodiment converts thermal energy differences to mechanical (rotary) power.

In the modified version of the embodiment 100, the adiabatic expansion portion 102 of the embodiment's toroidal fluid channel does not contain, incorporate, and/or utilize, radial fins; nor is there any need for such fins since thermal energy is neither added nor removed from the working fluid (not shown) flowing 957 within, and/or through, the adiabatic expansion portion. So, an increase in the surface area of the interior channel wall of that adiabatic expansion portion would not facilitate the flow therethrough, nor would it increase the thermal efficiency of the embodiment.

In the modified version of the embodiment 100, the adiabatic compression portion 104 of the embodiment's toroidal fluid channel does not contain, incorporate, and/or utilize, radial fins; nor is there any need for such fins since thermal energy is neither added nor removed from the working fluid (not shown) flowing 958 within, and/or through, the adiabatic compression portion. So, an increase in the surface area of the interior channel wall of that adiabatic compression portion would not facilitate the flow therethrough, nor would it increase the thermal efficiency of the embodiment.

FIG. 186 shows a perspective top-down sectional view of a modified version of the same embodiment 100 of the present disclosure that is illustrated in FIG. 185 wherein the horizontal section plane is specified in FIGS. 3-6 and the section is taken across line 7-7. Unlike the unmodified version of the embodiment 100 illustrated in FIGS. 1-8, the modified version of the embodiment 100 illustrated in FIGS. 185 and 186 contains radial fins, e.g., 953 and 959, inside the isothermal expansion portion 101, and inside the isothermal contraction portion 103, of its toroidal fluid channel.

The radial fins, e.g., 953 and 954, within the isothermal expansion portion 101 of the embodiment's toroidal fluid channel increase the surface area across, and/or through, which heat 109 received from outside the embodiment may conductively warm the working fluid (not shown) flowing through that portion of the toroidal fluid channel, thereby tending to improve the efficiency with which the embodiment converts thermal energy differences to mechanical (rotary) power.

The radial fins, e.g., 959 and 960, within the isothermal contraction portion 103 of the embodiment's toroidal fluid channel increase the surface area across, and/or through, which heat 121 is removed from the working fluid (not shown) and transmitted to a cold sink outside the embodiment, thereby tending to improve the efficiency with which the embodiment converts thermal energy differences to mechanical (rotary) power.

FIG. 187 shows a perspective side sectional view of the same modified version of the embodiment 100 of the present disclosure that is illustrated in FIGS. 185 and 186, wherein the vertical section plane is specified in FIG. 7 and the section is taken across line 187-187. Unlike the unmodified version of the embodiment 100 illustrated in FIGS. 1-8, the modified version of the embodiment 100 illustrated in FIG. 187 contains radial fins, e.g., 953-954, inside the isothermal expansion portion 101, and also contains radial fins, e.g., 955, 959, and 960, inside the isothermal contraction portion 103, of its toroidal fluid channel.

The scope of the present disclosure includes working-fluid-flow channels containing, incorporating, and/or utilizing, any number of fins, surface variations, extrusions, intrusions, undulations, ridges, grooves, and/or sub-channels, within, and/or upon, interior surfaces, and/or walls, of those working-fluid-flow channels.

The scope of the present disclosure includes working-fluid-flow channels containing, incorporating, and/or utilizing, channels, and/or sub-channels, of any and all cross-sectional shapes, sizes, and interior surface areas.

The varieties of embodiments, their geometries, their working fluids, their operations, and their applications, enumerated within the "Summary of the Invention" section of this disclosure apply to the modified embodiment illustrated and discussed in relation to FIGS. 185-187, and the scope of the present disclosure includes all such variations of the modified embodiment illustrated in FIGS. 185-187.

FIG. 188 shows a semi-transparent perspective side view of a modified version of the same embodiment 100 of the present disclosure that is illustrated in FIGS. 1-8. Interior features of the embodiment are displayed as dotted lines and are provided to reveal the internal structure, geometry, and/or design, of the modified version of the embodiment. Unlike the unmodified version of the embodiment 100 illustrated in FIGS. 1-8, the modified version of the embodiment 100 illustrated in FIG. 188 contains a plurality of sub-channels, e.g., 961 and 965, inside the isothermal expansion portion 101, and inside the isothermal contraction portion 103, of its toroidal fluid channel.

The sub-channels, e.g., 961 and 962, within the isothermal expansion portion 101 of the embodiment's toroidal fluid channel increase the surface area across which heat 109 received from outside the embodiment may conductively flow into the working fluid (not shown) flowing through, and/or within, that portion of the toroidal fluid channel, thereby tending to improve the rapidity, and/or efficiency, with which the embodiment converts thermal energy differences to mechanical (rotary) power. Four, e.g., 961, of the five sub-channels within the isothermal expansion portion of the embodiment's toroidal fluid channel contain, and/or incorporate, respective radial fins, e.g., 963.

The sub-channels, e.g., 964 and 965, within the isothermal contraction portion 103 of the embodiment's toroidal fluid channel increase the surface area across, and/or through, which heat 121 is removed from the working fluid (not shown) and transmitted to a cold sink outside the embodiment, thereby tending to improve the rapidity, and/or efficiency, with which the embodiment converts thermal energy differences to mechanical (rotary) power.

In the modified version of the embodiment 100, the adiabatic expansion portion 102 of the embodiment's toroidal fluid channel does not contain, incorporate, and/or utilize, sub-channels; nor is there any need for such sub-channels since thermal energy is neither added nor removed from the working fluid (not shown) flowing 957 through, and/or within, the adiabatic expansion portion. So, an increase in the surface area of the interior channel wall of that adiabatic expansion portion would not facilitate the flow therethrough, nor would it increase the thermal efficiency of the embodiment.

In the modified version of the embodiment 100, the adiabatic compression portion 104 of the embodiment's toroidal fluid channel does not contain, incorporate, and/or utilize, sub-channels; nor is there any need for such sub-channels since thermal energy is neither added nor removed from the working fluid (not shown) flowing 958 through, and/or within, the adiabatic compression portion, so an increase in the surface area of the interior channel wall of that adiabatic compression portion would not facilitate the flow therethrough, nor would it increase the thermal efficiency of the embodiment.

FIG. 189 shows a perspective top-down sectional view of a modified version of the same embodiment 100 of the present disclosure that is illustrated in FIG. 188 wherein the horizontal section plane is specified in FIGS. 3-6 and the section is taken across line 7-7. Unlike the unmodified version of the embodiment 100 illustrated in FIGS. 1-8, the modified version of the embodiment 100 illustrated in FIG. 189 contains sub-channels, e.g., 962 and 969, inside the isothermal expansion portion 101, and inside the isothermal contraction portion 103, of its toroidal fluid channel.

The sub-channels, e.g., 962 and 966, within the isothermal expansion portion 101 of the embodiment's toroidal fluid channel increase the surface area across, and/or through, which heat 109 received from outside the embodiment may conductively flow into the working fluid (not shown) flowing through, and/or within, that portion of the toroidal fluid channel, thereby tending to improve the rapidity, and/or efficiency, with which the embodiment converts thermal energy differences to mechanical (rotary) power.

The sub-channels, e.g., 965, 967, 968, and 969, within the isothermal contraction portion 103 of the embodiment's toroidal fluid channel increase the surface area across, and/or through, which heat 121 is removed from the working fluid (not shown) and transmitted to a cold sink outside the embodiment, thereby tending to improve the rapidity, and/or efficiency, with which the embodiment converts thermal energy differences to mechanical (rotary) power.

FIG. 190 shows a perspective side sectional view of the same modified version of the embodiment 100 of the present disclosure that is illustrated in FIGS. 188 and 189, wherein the vertical section plane is specified in FIG. 7 and the section is taken across line 187-187. Unlike the unmodified version of the embodiment 100 illustrated in FIGS. 1-8, the modified version of the embodiment 100 illustrated in FIG. 190 contains sub-channels, e.g., 962, inside the isothermal expansion portion 101, and also contains sub-channels, e.g., 967, inside the isothermal contraction portion 103, of its toroidal fluid channel.

Four 961, 962, 970, and 971 of the five sub-channels within the isothermal expansion portion 101 of the embodiment's toroidal fluid channel are at the periphery of the channel, and each contains a radial fin, e.g., 972, to further increase the surface area of the interior of each sub-channel. One 966 of the five sub-channels within the isothermal expansion portion 101 of the embodiment's toroidal fluid channel is at the center of the channel and lacks a radial fin.

The isothermal contraction portion 103 of the embodiment's toroidal fluid channel contains a plurality of sub-channels, of three different diameters. Five sub-channels, e.g., 965, and 967-969, are of a relatively large diameter. Four sub-channels, e.g., 973, are of an intermediate diameter. And, four sub-channels, e.g., 974, are of a relatively small diameter.

The scope of the present disclosure includes any number of approximately parallel sub-channels, as well as channels and sub-channels of any and all cross-sectional shapes, sizes, and interior surface areas, and as well as channels and sub-channels containing, incorporating, and/or utilizing, radial fins, and/or other surface variations, extrusions, intrusions, undulations, ridges, and/or grooves.

An embodiment similar to the one illustrated in FIGS. 188-190 replaces the tubular channels embedded within the otherwise solid thermally conducting isothermal contraction portion 103 of the embodiment's toroidal fluid channel with individual parallel, and/or branching, tubes, each having a distinguishable full or partial tube wall. In this similar embodiment, a plurality of at least approximately parallel tubes each has an outer tube wall, and the plurality of parallel tubes is associated with interstitial spaces, and/or voids, between adjacent parallel tube walls.

The scope of the present disclosure includes embodiment's that include, incorporate, utilize, and/or comprise, any geometries, designs, structures, and/or modifications of a fluid-flow tube wall, and/or a lumen of a fluid-flow tube, which causes, creates, and/or provides, an increased surface area (e.g., relative to a minimally possible, e.g., cylindrical, surface area) of a fluid-flow tube, and/or an increased surface area of an interior surface of a respective fluid-flow tube wall, with respect to a respective isothermal expansion portion of the respective embodiment's toroidal fluid channel, and/or of a respective isothermal contraction portion of the respective embodiment's toroidal fluid channel.

The varieties of embodiments, their geometries, their working fluids, their operations, and their applications, enumerated within the "Summary of the Invention" section of this disclosure apply to the modified embodiment illustrated and discussed in relation to FIGS. 188-190, and the scope of the present disclosure includes all such variations of the modified embodiment illustrated in FIGS. 188-190.

I claim:

1. A heat engine, comprising:

a closed loop fluid flow conduit rotatable, in a first direction, about an axis of radial symmetry of the closed loop fluid flow conduit, said closed loop fluid flow conduit having:

a first portion formed with a curved channel from an inlet to an outlet, the inlet having a lesser cross-sectional area than a cross sectional area of the outlet;

a second portion formed with a curved channel from an inlet to an outlet, the inlet having a greater cross-sectional area than a cross-sectional area of the outlet;

a working fluid circulating within the closed loop fluid flow conduit in a second direction opposite said first direction;

a thermal energy source proximal the first portion of the closed loop fluid flow conduit; and a thermal energy sink proximal the second portion.

2. The heat engine of claim 1, wherein the first portion and the second portion are connected by a third portion, the third portion having a thermal conductivity less than a thermal conductivity of the first portion and less than a thermal conductivity of the second portion.

3. The heat engine of claim 2, wherein the second portion and first portion are connected by a fourth portion, the fourth portion having a thermal conductivity less than the thermal conductivity of the first portion and less than the thermal conductivity of the second portion.

4. The heat engine of claim 2, wherein the third portion of the closed loop fluid flow conduit is formed of at least one material not present in the first and second portions of the closed loop fluid flow conduit.

5. The heat engine of claim 1, wherein the closed loop fluid flow conduit is toroidal.

6. The heat engine of claim 1, wherein the closed loop fluid flow conduit has a non-constant wall thickness.

7. A heat engine, comprising:

a closed loop fluid flow conduit including:

a first portion formed of a material having a first thermal conductivity and configured with a curved inner channel having a greater cross sectional outlet area than a cross sectional inlet area;

a second portion formed of a material having a second thermal conductivity and configured with a curved inner channel having a greater cross sectional inlet area than a cross sectional outlet area;

a working fluid circulating within the closed loop fluid flow conduit;

a thermal energy source configured to impart thermal energy to the first portion; and a thermal energy sink configured to extract thermal energy from the second portion;

wherein the thermal energy source and thermal energy sink cooperate to move the working fluid within the closed loop fluid flow conduit in a first direction; and wherein movement of the working fluid in said first direction rotates the closed loop fluid flow conduit in a second, opposite direction to said first direction.

8. The heat engine of claim 7, wherein the first thermal conductivity is different from the second thermal conductivity.

9. The heat engine of claim 7, wherein the closed loop fluid flow conduit is radially symmetric about an axis passing normal to a center point of the closed loop.

* * * * *